US006368177B1

(12) United States Patent
Gabai et al.

(10) Patent No.: US 6,368,177 B1
(45) Date of Patent: Apr. 9, 2002

(54) METHOD FOR USING A TOY TO CONDUCT SALES OVER A NETWORK

(75) Inventors: Oz Gabai; Jacob Gabai, both of Tel Aviv; Nimrod Sandlerman, Ramat Gan, all of (IL)

(73) Assignee: Creator, Ltd., Givat Shmuel (IL)

( * ) Notice: Subject to any disclaimer, the term of this patent is extended or adjusted under 35 U.S.C. 154(b) by 0 days.

(21) Appl. No.: 09/389,710

(22) Filed: Sep. 3, 1999

Related U.S. Application Data

(63) Continuation-in-part of application No. 09/260,931, filed on Mar. 2, 1999, and a continuation-in-part of application No. 09/081,889, filed on May 20, 1998, which is a continuation-in-part of application No. PCT/IL96/00157, filed on Nov. 20, 1996, which is a continuation-in-part of application No. 08/561,316, filed on Nov. 20, 1995, now Pat. No. 5,752,880, application No. 09/389,710, which is a continuation-in-part of application No. 09/062,500, filed on Apr. 17, 1998.

(51) Int. Cl.[7] .................................................. A63H 5/00
(52) U.S. Cl. ...................... 446/404; 446/298; 446/397; 705/10; 705/41; 705/26; 705/44
(58) Field of Search .................................. 463/1, 39, 29, 463/25, 42; 446/268, 297, 397, 404; 434/307 R, 308; 235/375, 380; 705/64, 65, 67, 75, 76, 80, 1, 10, 14, 16–17, 26–27, 39, 41, 44

(56) References Cited

U.S. PATENT DOCUMENTS

| | | | | |
|---|---|---|---|---|
| 4,846,693 A | * | 7/1989 | Baer | 446/298 |
| 4,857,030 A | * | 8/1989 | Rose | 446/397 |
| 5,636,994 A | * | 6/1997 | Tong | 446/298 |
| 5,752,880 A | * | 5/1998 | Gabai | 446/298 |
| 5,769,269 A | * | 6/1998 | Peters | |

* cited by examiner

Primary Examiner—Mark Sager
(74) Attorney, Agent, or Firm—Abelman, Frayne & Schwab

(57) ABSTRACT

There is provided a method for using a toy for effecting sales over a public network, the method comprising: providing a toy having interactive speaking and listening functionality; connecting the toy via a public network to at least one server having transactional functionality; and effecting sales by employing the transactional functionality via the interactive speaking and listening functionality of said toy.

19 Claims, 242 Drawing Sheets

FIGURE 1A
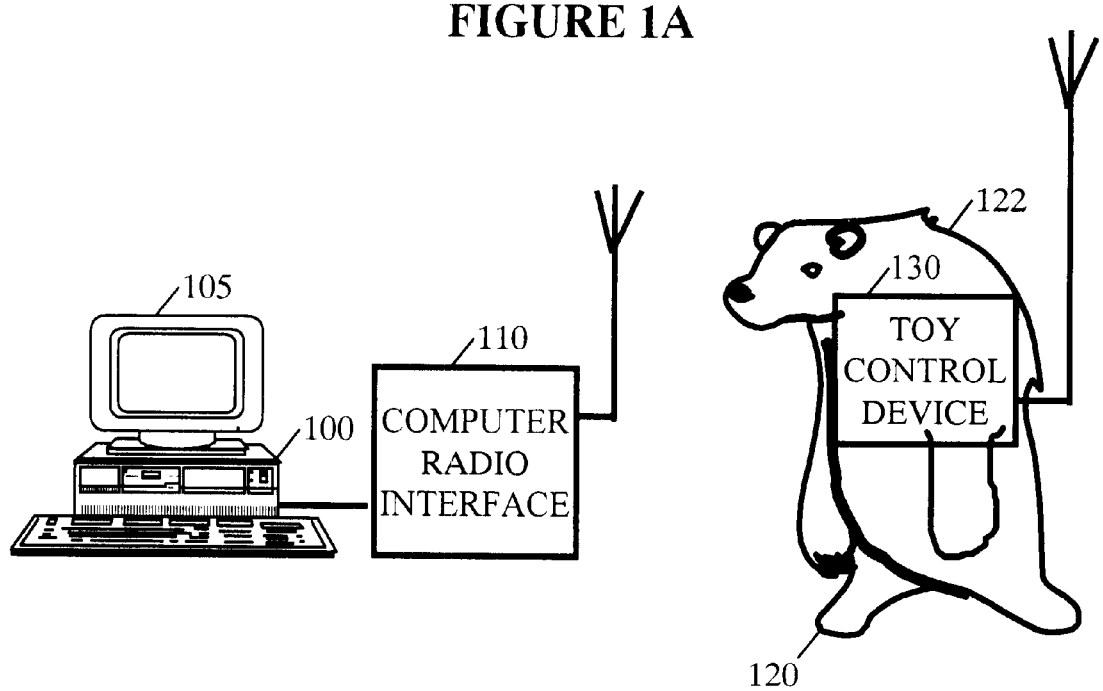
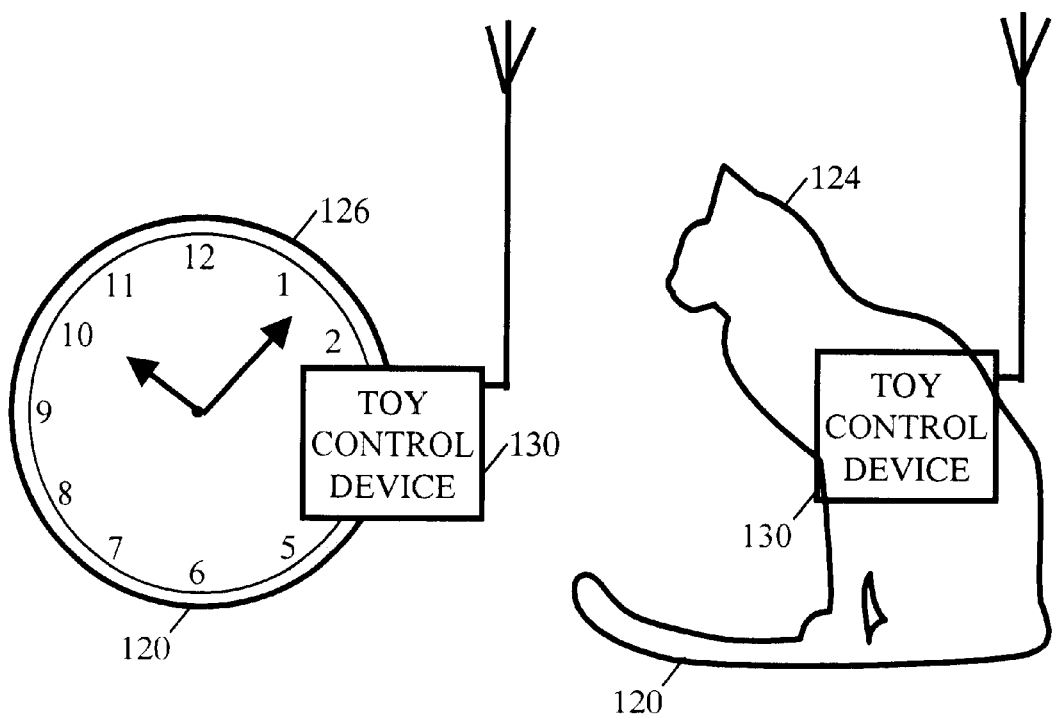

FIGURE 2B
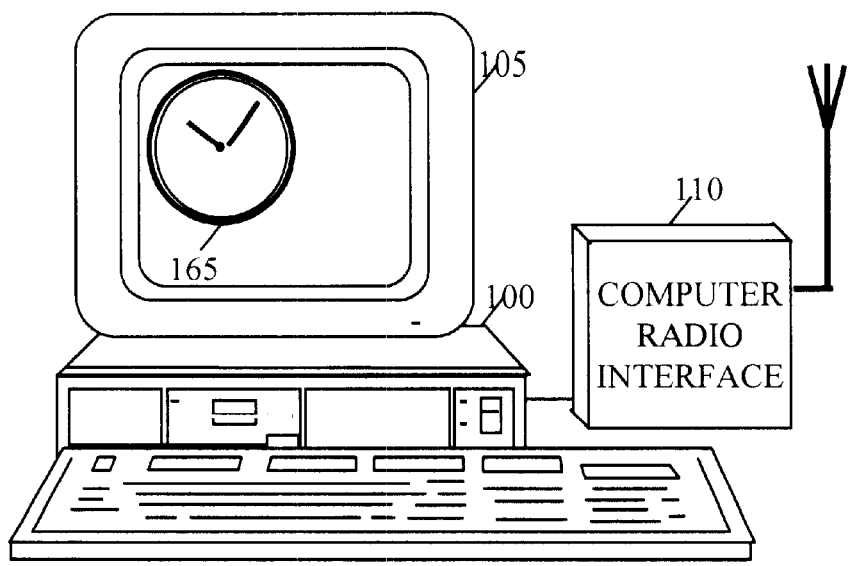
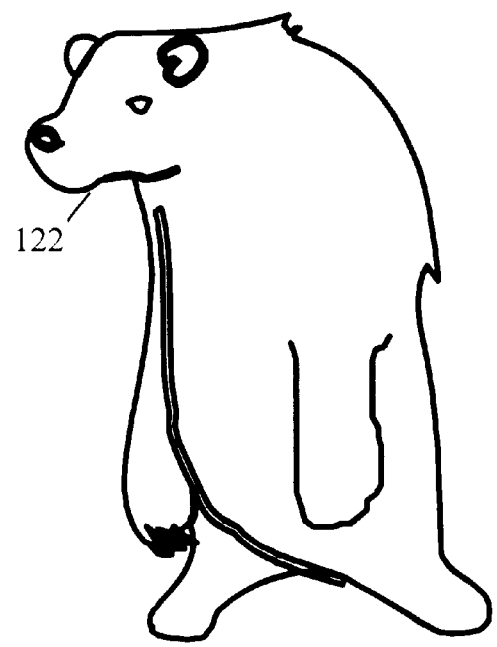

FIGURE 2C
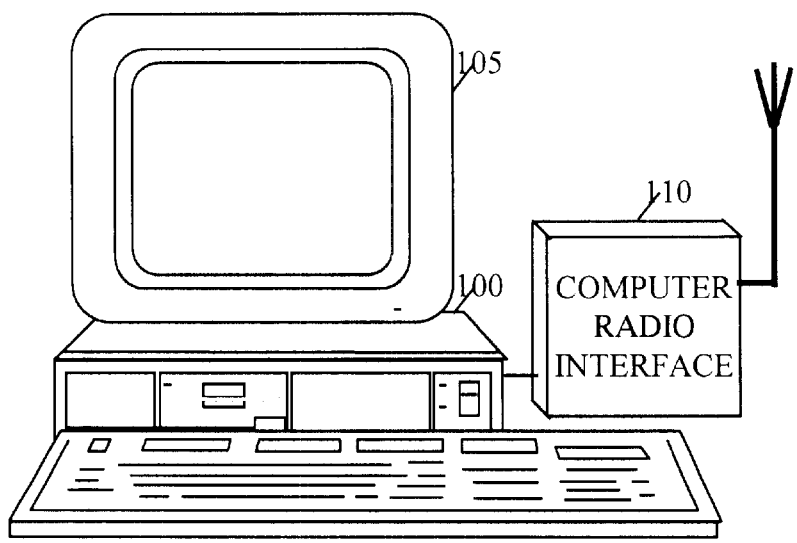
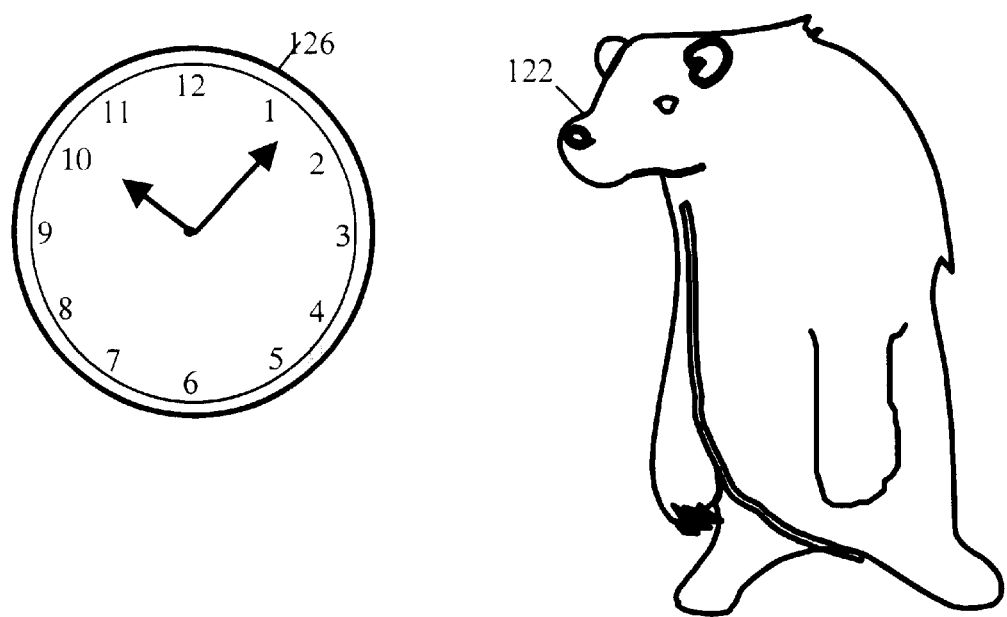

FIG. 5C
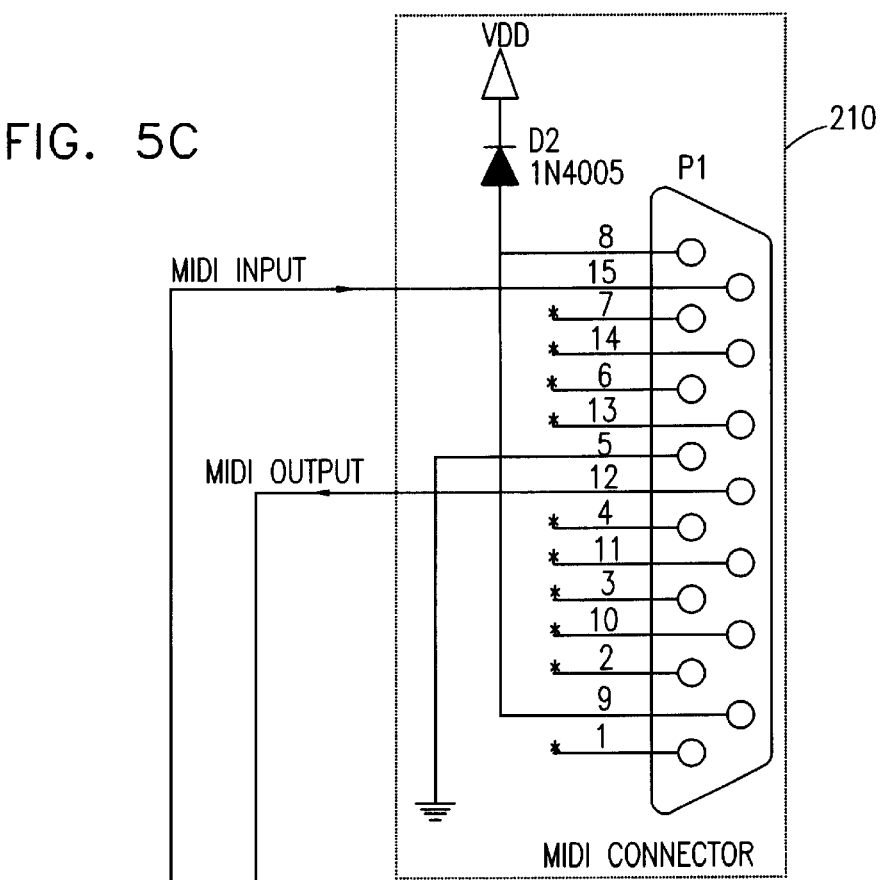
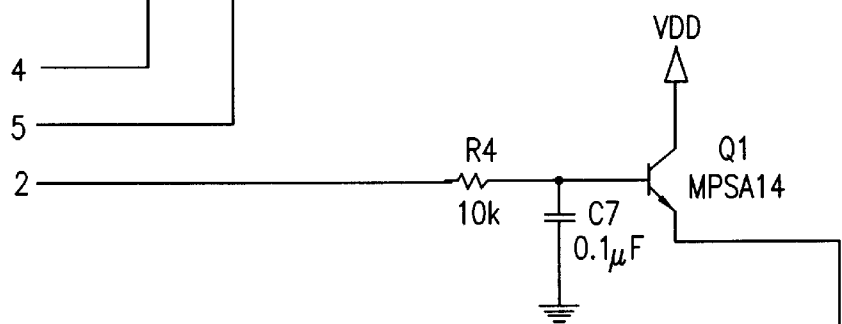
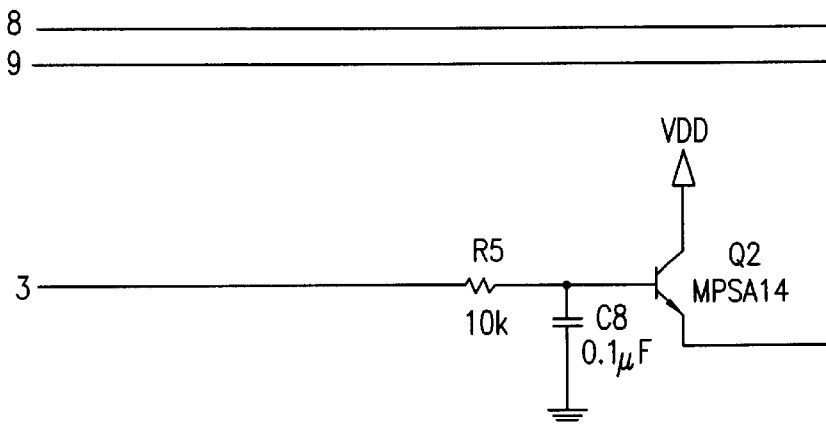

FIG. 15D

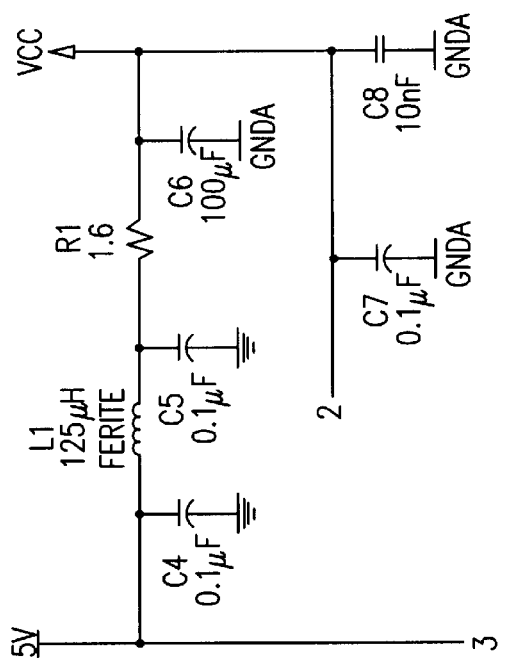
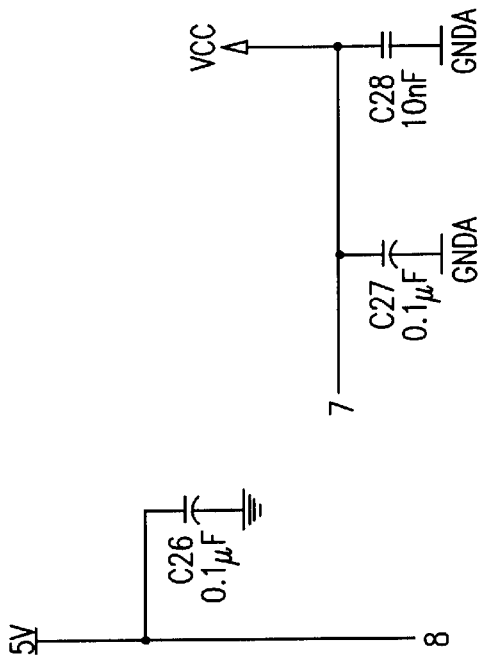
FIG. 29G
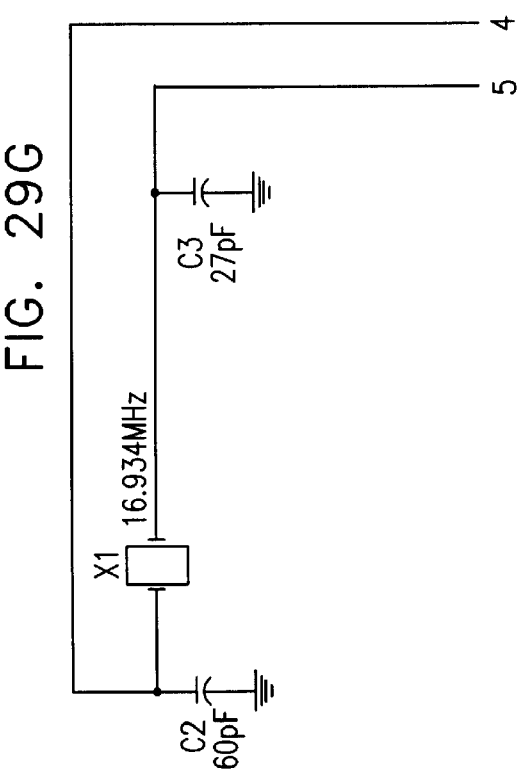
FIG. 29H
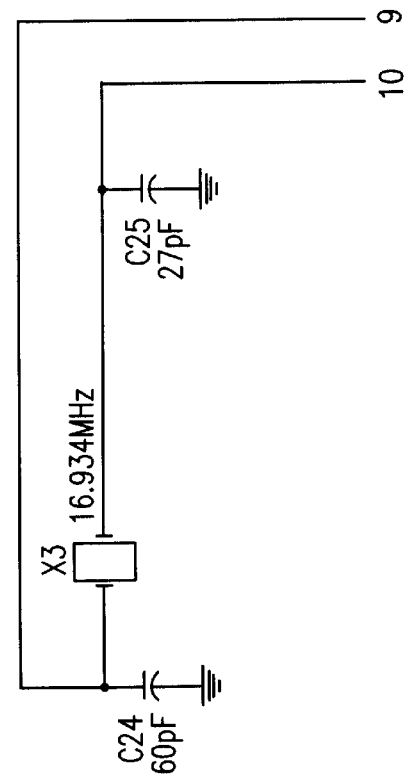

Sites and Actors: At Toy Maker HQ

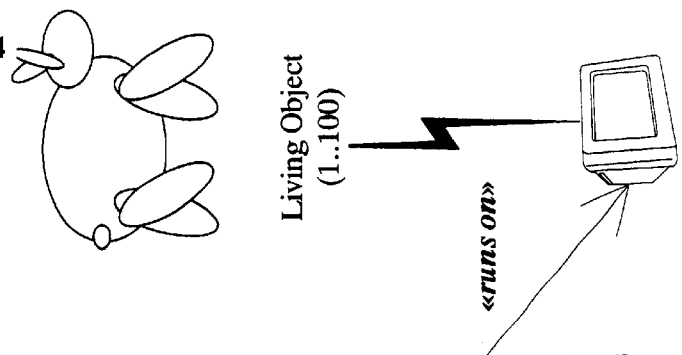
Figure 44
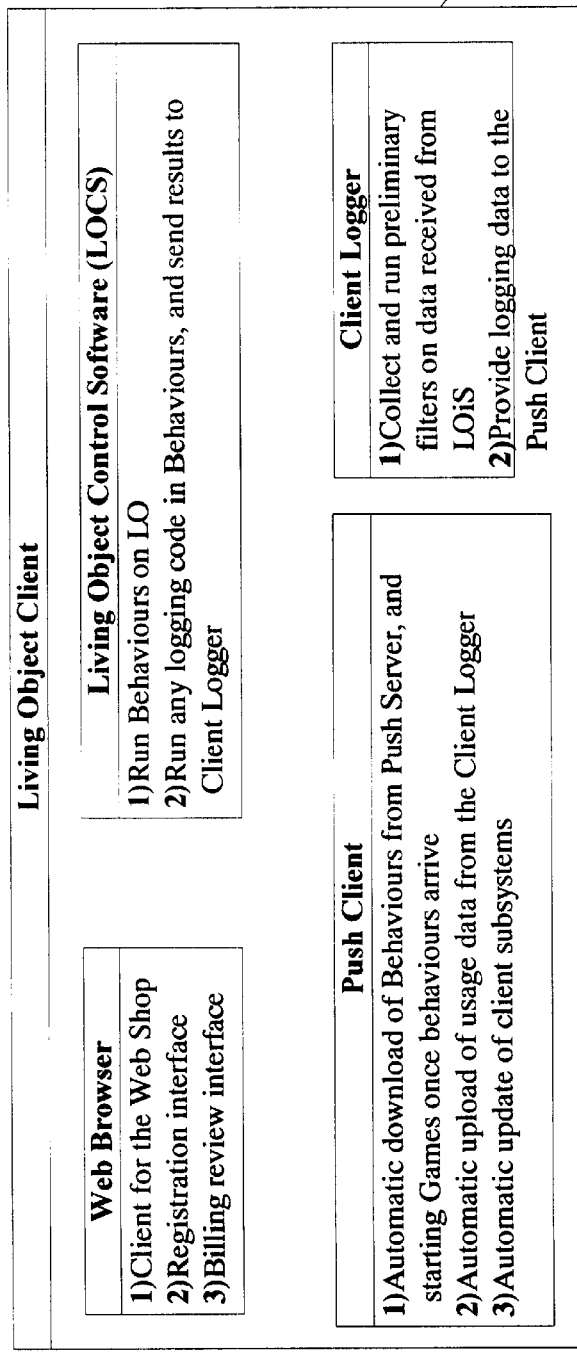
Sites and Subsystems: At Home

Sites and Subsystems: At Creator HQ

Sites and Subsystems: At Toy Maker HQ 1

State Diagrams: Client Logger

State Diagrams: Push Client

Collaboration Diagrams: Client Update

FIGURE 96

File  Edit  View  Tools  Window  Help

User Registration

Name        [ Stuart        ]           [△] Record name

Secret name [              ]            [△] Record secret name

Age         [ 10 ]

Gender      ●Boy  ○Girl

Language    [ English ▶]

Grade       [ D       ▶]

Relatives   [ Sister  ▶]     Name [ Beverly ]  [▶]

Friends     [ Sister  ▶]     Name [         ]

Teacher     [ Sister  ▶]     Name [         ]  [▶]

FIGURE 97

User Registration - Financial Data

File  Edit  View  Tools  Window  Help

Name: Stuart

Password: *****

Record voice signature

Monthly allowance: US$ 50 ◯ Updates on

Weekly allowance: US$ 10 ● Updates on

Daily allowance: US$ 5 ◯ Updates on  Sunday

Credit Card: Visa  Number

Current budget status: 37.70

FIGURE 98

| Name | Client side of living object update |
|---|---|
| Actors | The child is involved only in that s/he may trigger the use case, but there are other ways for it to be triggered. The child is the actor the use case is servicing. |
| Goal | That the living object be updated automatically. |
| Forces in Context | 1) Automatic, transparent<br>2) Graceful, silent handling of errors<br>3) Error correction, guaranteed delivery<br>4) Bandwidth 'niceness'<br>5) Security, privacy<br>6) Several providers per toy |
| Trigger | Depends on exact configuration.<br>1) Generally users will configure the push client to run updates at specific intervals, so the trigger is the scheduler<br>2) Users may manually initiate a download |
| Summary | This use case captures the scenario where the client requests and receives a new living object update.<br>1) client asks server for new updates<br>2) new updates are sent to the client<br>3) at the end of each complete living object update the operating client software is notified |
| Pre-conditions | 1) No download will occur if the client is completely refreshed<br>2) The push client must be installed first<br>3) The client must be registered first |
| Post-conditions | 1) There is now a new complete living object update on the user's hard disk drive<br>2) the operating client software is notified |
| Related use cases | 1) Registration is a requirement<br>2) Configuring the living object update process determines what is updated |

FIGURE 99

| Name | Installation of push client |
|---|---|
| Actors | Parent |
| Goal | That the push client be installed correctly, so that registration can commence. |
| Forces in Context | 1) Installshield type installation<br>2) There could have been previous installation, i.e. this could be a 2nd, 3rd, etc. Living Object<br>3) There are several different types of win32 OSs<br>4) The client itself must look unique and reflect some corporate identity, definitely not the 3rd party push software maker identity |
| Trigger | User manually starts the installation process from CD, or from a downloaded file |
| Summary | This use case captures the first, and later installations of the LOIS client.<br>1) User is asked several configuration parameters, or if this is not a first toy, old parameters are used<br>2) User advances to the registration use case |
| Pre-conditions | User downloaded the package, or has a CD |
| Post-conditions | Everything is setup for registration |
| Related use cases | 1) Registration should follow immediately, or be deferred to a later time at the users convenience |

FIGURE 100

| Name | Registration |
|---|---|
| Actors | Parent |
| Goal | That the specific living object, recently purchased, be registered at the central database, or that information previously entered in registration be modified |
| Forces in Context | 1) Should be similar in feel (to the user) to web site registrations<br>2) Security, privacy<br>3) The exact nature of the registration info connected is not fixed, and is determined by the big corporation<br>4) Layout and styling are important<br>5) There is probably optional, and required, registration information"<br>6) Changing registration information should be the same type of experience for the user<br>7) There is some information which needs to be passed to the server which should not be generated manually, but which is burnt on the installation CDROM |
| Trigger | 1) User has completed the installation of push client, and moves on to registration immediately or at a later time<br>2) User wishes to refresh any of his registration attributes |
| Summary | This use case captures the scenario where the user registers, or modifies his registration information.<br>1) User is taken to the registration web site automatically<br>2) User fills in form, or changes a form with existing values<br>3) User submit form<br>4) If form is complete user is shown a thank you<br>5) User is emailed a receipt |
| Pre-conditions | That the push client be installed |
| Post-conditions | Living object is now registered, user has received receipt |
| Related use cases | 1) Installation of push client should be completed<br>2) Configuring the registration process determines the specifics of the process |

FIGURE 101

| Name | Reviewing billing information |
|---|---|
| Actors | Parent |
| Goal | That the actor be able to review his/her billing status anytime, i.e. his subscriptions, history etc. |
| Forces in Context | 1) Should be a simple web page<br>2) Should include the option to communicate with technical, and billing support of the big corporation<br>3) Security, privacy<br>4) Support of multiple currencies |
| Trigger | User initializes the use case by going to a secure URL. This may be done by clicking the 'review billing' button in the push client, or on the big corporations web site |
| Summary | This use case captures the scenario where the user checks his/her billing status<br>1) User logs in to the billing page<br>2) All information is displayed on one page<br>3) User may cancel any outstanding subscriptions<br>4) User may contact billing or technical support through the page |
| Pre-conditions | That the user have at least one living object installed and registered |
| Post-conditions | User is now aware of the exact details concerning any billing he/she was involved with |
| Related use cases | 1) Registration should have been completed |

FIGURE 102

| Name | Buying behaviors |
|---|---|
| Actors | Parent |
| Goal | That the actor be able to purchase behaviors for his/her living object |
| Forces in Context | 1) Security, privacy<br>2) Should have the look and feel of normal web store fronts<br>3) Behaviors might be available as a single update, subscription, or a group of updates<br>4) Support of multiple currencies |
| Trigger | User may reach the web store though the big corporations web site, by clicking on a 'check out new behaviors' button in the push client, or by interacting with the living object |
| Summary | This use case captures the scenario where the user buys behaviors.<br>1) User logs in to the web store<br>2) User surfs the store, and adds to shopping bag wanted items<br>3) User is presented with billing information<br>4) User reviews billing, and once he/she approves the central server is notified about a change in policy concerning the user |
| Pre-conditions | That the user have at least one living object installed and registered |
| Post-conditions | Server should now attempt to push the new behaviors to the user |
| Related use cases | 1) Registration should have been completed |

FIGURE 103

| Name | Configuring the registration process |
|---|---|
| Actors | Big corporation |
| Goal | That the actor be able to configure the registration process |
| Forces in Context | 1) Security<br>2) Corporation wants to know as much as possible about users<br>3) Corporations don't want users to be totally aware of item 2<br>4) Corporations want to layout and style the process to their liking<br>5) Each corporation requires different registration information<br>6) There are some universally common aspects of such questionnaires, such as 'user name', 'user email' etc. Thus can give the users a jump start by providing several default questionnaires |
| Trigger | Big corporations have a button which takes them to the web page which configures the process |
| Summary | This use case captures the scenario where the user determines the specifics of registration<br>1) User adds/removes an existing question from the registration form<br>2) User edits an existing question: is it optional or required? What is its text? Is it a choice question, or a text box? Must it be numeric?<br>3) User can loop back to step 1<br>4) User designs an HTML template for the questionnaire, starting from the automatically generated template defined by the registration details |
| Pre-conditions | That the big corporation server software is installed |
| Post-conditions | Big corporation now has a registration web page for its users of living objects |
| Related use cases | 1) The Registration is determined by the results of this use case<br>2) Configuring the living object update process uses the registration information |

FIGURE 104

| Name | Gathering user profiling data |
|---|---|
| Actors | Big corporation server |
| Goal | That the actor be able to automatically gather *all* profiling data, and place it in the correct context, i.e. the user object which represents the user generating the data |
| Forces in Context | 1) Privacy<br>2) Corporation wants to know as much as possible about users<br>3) Corporations don't want users to be totally aware of item 2<br>4) Profiling data may come from: server logs of behavior downloads, living objects, registration, purchases of behaviors<br>5) This data may be potentially huge. Must allow some filtering, compression, or summaries to control the volume<br>6) The data must be placed in the correct context in the central database to support analysis |
| Trigger | 1) Server registers a download<br>2) Living object sends profiling data<br>3) Registration data has been accepted<br>4) A purchase in the web store has occurred |
| Summary | This use case captures the scenario where the server automatically gathers and sorts profiling data from a variety of sources. It is an automated process, where the user can only control which data is gathered (should be *all* by default), i.e. there is a form with checkboxes where the user may stop the server from gathering data from a specific aspect of the system |
| Pre-conditions | That registration be configured |
| Post-conditions | Big corporation now has all possible data about all its users |
| Related use cases | 1) The Configuring the registration process use case determines which data is available from registration<br>2) The Server side of update process use case contributes data<br>3) The Handle the server side of a purchase use case contributes data |

FIGURE 105

| Name | Configuring the living object update process |
|---|---|
| Actors | Big corporation |
| Goal | That the actor be able to configure the living object update |
| Forces in Context | 1) Security<br>2) Corporation want to match users with behaviors according to their ideas of 'match'<br>3) Corporations can have very different ideas on what 'match' means exactly<br>4) There is something in common among all 'match' ideas, namely that they can be best described as a vector of rules, and several rules which probably everybody will use, such as: 'decide by age', 'decide by subscription information', 'decide by locale', etc.<br>5) The match should be made (if needed) against all available profile data<br>6) Non-technical users should be able to configure a pretty good update process using rules which should be provided in the base package<br>7) Each living object should have its own set of configured rules<br>8) There are several views (by profile, toy, living object update) for designing an update process, users want to be able to choose |
| Trigger | Big corporations have a button which takes them to the web page which configures the process |
| Summary | This use case captures the scenario where the user determines the specifics of the living object update process. Here is an example:<br>1) User chooses a specific living object to configure<br>2) User adds/removes rules from the process. Rules are chosen from available rule classes<br>3) User modifies existing rules. Each available rule class has configuration parameters<br>4) User rearranges, copies and pastes rules<br>5) User can loop back to step 2<br>6) User tests the update process he/she has configured for the living object, and views prototypical results |
| Pre-conditions | 1) That the living object has been defined in the central server<br>2) That registration format is configured |

FIGURE 106

| Name | Server side of update process |
|---|---|
| Actors | Big corporation server |
| Goal | That the actor be able to implement the update process previously defined |
| Forces in Context | 1) Security, privacy<br>2) There could be up to 100,000 users, where 100s of them are updating at once<br>3) Servers are expensive, so the process should be as optimal as (practically) possible<br>4) Corporations should be able to increase their load capacity in a scalable manner, i.e. without a lot of work<br>5) The update process itself could be configured in any number of ways<br>6) Everything should be logged<br>7) The process could be interrupted while running (e.g. user disconnects, etc.) so saving exact state is important<br>8) There has to be built in default behavior when overloaded, so we never end up in a limbo state |
| Trigger | LOIS push client connects to the server and requests an update |
| Summary | This use case captures the scenario where the server is refreshing the clients<br>1) Server receives an update request<br>2) Server runs through the rules configured earlier, resulting in any number of updates which are now to be passed to the client<br>3) Server passes updates to the client |
| Pre-conditions | 1) That registered clients exist<br>2) That the living object update process has been completely defined |
| Post-conditions | Clients have been updated, or have been partially updated |
| Related use cases | 1) Add new living object updates is a requirement<br>2) Configuring the living object update process is a requirement |

FIGURE 107

| Name | Add new living object to the database |
|---|---|
| Actors | Big corporation |
| Goal | That the actor be able to add new living objects to the living objects database on the server |
| Forces in Context | 1) Security<br>2) Living objects can be very different from each other<br>3) There is much that all living objects share- they are all controlled by many living object updates, but only one at a time |
| Trigger | Actor pushes a button which takes him to the 'add living object' wizard |
| Summary | This use case captures the scenario where the actor tells the system that it must recognize a new living object<br>1) User fills in the minimum details needed to define a new living object<br>2) Server creates a new object modeling the living object |
| Pre-conditions | That the big corporation server software is installed |
| Post-conditions | The server is now aware of the new living object |
| Related use cases | 1) Add new living object updates is the next logical step |

FIGURE 108

| Name | Add new living object updates |
|---|---|
| Actors | Big corporation and their advertisers |
| Goal | That the actor be able to add new living objects updates to the server |
| Forces in Context | 1) Security<br>2) There can be many types of updates: text, scripts, multimedia, executables, etc.<br>3) This is one the most common processes, so it should be as streamlined as possible<br>4) This is the simplest place to interface between the software elements that produce behavior packs<br>5) This may be done at different places in the Internet |
| Trigger | Actor pushes a button which takes him to the 'add living object update' wizard |
| Summary | This use case captures the scenario where the actor tells the system that to add a new living object update to a specific living object<br>1) User chooses a living object<br>2) User uploads the update package<br>3) Server should notify all relevant observing objects of this new update |
| Pre-conditions | 1) That the living object has been defined in the central server<br>2) That the actor has specific files from which to create the living object update. The creation of these updates is beyond the scope of this document |
| Post-conditions | The server is now aware of the new living object update, and it will be available in the web store, rules manager, and analysis subsystems |
| Related use cases | 1) Add new living object to the database is a requirement |

FIGURE 109

| Name | Manage living object updates |
|---|---|
| Actors | Big corporation |
| Goal | That the actor be able to manage living object updates |
| Forces in Context | 1) Security<br>2) There can be many types of updates: text, scripts, multimedia, executables, etc.<br>3) This is one the most common processes, so it should be as streamlined as possible<br>4) There could be 100s of living object updates, so users must be able to quickly find the update they need to manage<br>5) There is no capability to manage the internals of an update pack, but it is important to provide a basis for interfacing with the operating client software in this use case |
| Trigger | Actor pushes a button which takes him/her to the 'manage living object update' wizard |
| Summary | This use case captures the scenario where the actor tells the system that to remove a living object update, change its properties, or replace it by another update<br>1) User chooses a living object<br>2) User chooses a living object update<br>3) User removes the living object update or edits its properties or replaces it by another he/she has previously prepared |
| Pre-conditions | That the living object update has been defined in the central server |
| Post-conditions | The living object is now different in one update from what it was |
| Related use cases | 1) Add new living object updates is a requirement |

FIGURE 110

| Name | Layout and style the web behaviors store |
|---|---|
| Actors | Big corporation |
| Goal | That the actor be able to determine what the store where living object updates are sold will look like |
| Forces in Context | 1) Security<br>2) Big corporations want their stores to look unique<br>3) There is much in common among all stores: they are basically a searchable, easy to navigate catalog<br>4) Thus it is possible to provide default templates<br>5) The templates must be simple to work with, with only HTML knowledge as a requirement<br>6) Users will want to integrate the store with the rest of their WWW infosystem<br>7) Users might already (and probably *will* already) have some kind of store, billing system, etc. of their own, as part of their web site |
| Trigger | Actor pushes a button which takes him to the 'style the web behaviors store' wizard |
| Summary | This use case captures the scenario where the actor manages all aspects of the web store<br>1) User chooses a page in the store, i.e. search results page, product page, etc.<br>2) User chooses a template<br>3) User reviews the effect of the template on the system by previewing<br>4) User replaces the current template with the new one and submits the change |
| Pre-conditions | 1) That living object updates are configured<br>2) That users have HTML files to use as templates for the store. Note that these could have originated from our default templates, or they could have been written according to our documentation |
| Post-conditions | The store is now styled according to the users preferences |
| Related use cases | 1) Manage living object updates is where big corporations determine prices, subscription information, etc. for living object updates<br>2) Handle the server side of a purchase is where the server interpolates the store templates into complete HTML pages sent to the users web browser |

FIGURE 111

| Name | Handle the server side of a purchase |
|---|---|
| Actors | Big corporation server |
| Goal | That the actor be able to respond correctly to web orders of living object updates, and to page requests for the catalog |
| Forces in Context | 1) Security<br>2) Many users could purchase at once, probably 100s<br>3) Billing, taxes |
| Trigger | Web browser client enters the store and starts interacting with it |
| Summary | This is just a normal web store process, like many others |
| Pre-conditions | 1) That templates for the web store are configured<br>2) That living object updates exist<br>3) That registered users exist |
| Post-conditions | The purchase is logged, billing details updated, living object update |
| Related use cases | 1) Layout and style the web behaviors store is where big corporations determine what the HTML pages will look like<br>2) Manage living object updates is where big corporations determine prices, subscription information, etc. for living object updates |

FIGURE 112

| Name | Manage users |
|---|---|
| Actors | Big corporation |
| Goal | That the actor be able to manually control the user database |
| Forces in Context | 1) Security<br>2) 100,000 users<br>3) Big corporations have people who can work with RDBMSs through Access<br>4) Users are objects which need to encapsulate many different types of information, which can not be known in advance. This includes all profiling data |
| Trigger | Actor presses button which takes him to the user management application |
| Summary | This is just a normal add/delete/modify type of use case |
| Pre-conditions | That users were registered |
| Post-conditions | User objects have been modified |
| Related use cases | 1) Configuring the registration process determines a lot of the properties of the corporations user object<br>2) Almost every other use case dumps logs into the user object |

FIGURE 113

| Name | Analyzing usage |
|---|---|
| Actors | Big corporation |
| Goal | That the actor be able to generate and view sophisticated reports about system usage |
| Forces in Context | 1) Big data<br>2) Corporations have standard report formats and tools<br>3) It is impossible to know in advance all the report that may be required but it is possible to design the most common reports |
| Trigger | Advertising management executive from big corporation starts the reporting tool |
| Summary | This depends on the tool used. Generally it should be:<br>1) Define a time period<br>2) Define a segment of users<br>3) Run a query on them, refine<br>4) Put query results in template and send to manager |
| Pre-conditions | 1) That there is usage data in the database |
| Post-conditions | A report has been generated |
| Related use cases | 1) Server side of update process is where the data we post-process here gets created<br>2) Gathering user profiling data also determines what gets logged |

Creative Manager
[at NANI]

End user
[at home]

FIGURE 123

| Goal In Context: | Add a new vendor to IRENA's products suppliers and submit all it's relevant info |
|---|---|
| Pre-Condition: | IRENA marketed it's services to vendors and issued general info about the services |
| Success End Condition: | New vendor info is submitted to the IRENA server |
| Primary Actor: | Vendor's products manager |
| Trigger Event: | New vendor wants to sell products through IRENA |
| Forces in context: | A new vendor must provide some essential info in advance in order to join IRENA services |
| General comments: | More negotiation might be needed in order to close specific details of the deal. |
| Open issues: | |

FIGURE 124

| Step | Actor | Action Description |
|---|---|---|
| 1 | product manager | Decides to join IRENA services |
| 2 | Product manager | Submits all relevant vendor info (including reporting preferences) to IRENA |
| | | • Vendor name<br>• Vendor contact info<br>• Product description<br>• Preferred category<br>• Transaction preferences<br>*Reporting preferences*<br>• Schedule<br>• Type<br>• Received as |

FIGURE 125

| Goal In Context: | Receive and analyze customized profiling reports from IRENA |
|---|---|
| Pre-Condition: | Set report preferences |
| Success End Condition: | Vendor has a clear and up to date picture on IRENA users |
| Primary Actor: | Vendor's product manager |
| Trigger Event: | IRENA sends a new profiling report |
| Forces in context: | The vendor wants to know as much as possible about IRENA users and their buying habits in order to improve advertising effectiveness by submitting the right products with the right tips |
| General comments: | The vendor can receive profiling info also from other sources |
| Open issues: | Will IRENA limit the profiling info the vendor can receive?, if so can the vendor pay for more detailed data? |

FIGURE 126

| Goal In Context: | Submit a new service with all it's relevant info into IRENA server |
|---|---|
| Pre-Condition: | The vendor is a member of IRENA services and has information on IRENA users |
| Success End Condition: | All relevant product info is submitted to IRENA |
| Primary Actor: | Vendor's product manager |
| Trigger Event: | Vendor decides to deliver a new product |
| Forces in context: | The vendor has the option to influence diferent aspects in pushing the products – scheduling, related info, recommended profiles, etc. |
| General comments | The vendor can either submit the product details through the submission form or designate a space on his server for IRENA to download the details in their original structure |
| Open issues: | |

FIGURE 127

| Step | Actor | Action Description |
|---|---|---|
| 1 | Product manager | Decides to deliver a new product |
|  | *Example*: | Decided to submit a new product model |
| 2 | Product manager | Places the relevant product details in a designated space on his server |
|  | *Example:* | Places the new product details in a HTTP accessible directory on his server |
| 4 | Product manager | Submits relevant product additional information and scheduling tips (some of the information might be available on the vendor's server and need not to be submitted again |
|  | *Fields* | • Product name<br>• General description<br>• Preferred time for advertising<br>• Relevant profiles<br>• Key words<br>• Recommended product categories<br>• Scripting tips<br>• Product pricing and Discount plan<br>• Other comments |

FIGURE 128

| Goal In Context: | Transfer vendors revenues from products sold |
|---|---|
| Pre-Condition: | Pre-set arrangements concerning payment policies.<br>Business results report. |
| Success End Condition: | Vendors get paid for products ordered by users |
| Primary Actor: | Commercial manager at IRENA. |
| Trigger Event: | IRENA received revenues for products sold |
| Forces in context: | IRENA can either charge a commission on each product sold or can get discounts from vendors |
| General comments: | IRENA will set the prices for end users |

FIGURE 129

| Step | Actor | Action Description |
|---|---|---|
| 1 | IRENA commercial manager | Processes new vendor registration and contacts him to close the details of the deal if necessary. |
| | | • Example deal options:<br>• IRENA gets 5% commission on all dell computer sales<br>• Dell charges IRENA 5% under the official price, IRENA is free to set it's own price |
| 2 | IRENA commercial manager | Opens an account for each vendor<br>• No. Of products sold.<br>• Revenues generated from products sale<br>• Balance |
| 3 | IRENA commercial manager | Transfers monthly payment to vendor |

FIGURE 130

| Goal In Context: | Receive payment from end-users |
|---|---|
| Pre-Condition: | Set prices for all of IRENA products |
| Success End Condition: | Sales revenues from end-users transferred to IRENA. |
| Primary Actor: | IRENA commercial manager |
| Trigger Event: | End-user bought a product |
| Forces in context: | IRENA will provide high value, targeted products through a revolutionary media. Users will do their on-line shopping through IRENA |
| Open issues: | |

FIGURE 131

| Step | Actor | Action Description |
|---|---|---|
| 1 | Commercial manager | Sets and updates price for each product. (Price is set according to the vendor terms and other parameters) *Example Fields* <br> • Price <br> • Discount |
| 2 | Commercial manager | Receives order reports from the profiling service |
| 3 | Commercial manager | Receives payment from end users through the transaction sub-system. |
| 4 | Commercial manager | Notify vendors on orders |

FIGURE 132

| Goal In Context: | Turn "raw" product items into behaviors. Create behaviors type for each product |
|---|---|
| Pre-Condition: | • Updated profiling service data (Synchronized with other companies data)<br>• Tips from the vendor |
| Success End Condition: | Full behaviors and behaviors type (teaser, promo) are ready for interacting with users |
| Primary Actor: | IRENA creative manager |
| Trigger Event: | New product item is downloaded from vendor's server |
| Forces in context: | The authoring process is meant to turn the product items into behaviors that can bring the best results within our new special framework. They should give the user the best experience and give IRENA the best possible business results. |
| General comments: | • The user can buy the product at any point in the behavior.<br>• The interaction with some of the behaviors will be entirely by means of the toy, with others it will proceed on the desktop. |
| Open issues: | |

FIGURE 133

| Step | Actor | Action Description | |
|---|---|---|---|
| 1 | Creative manager | Analyzes the relevant profile service data and vendor tips | |
| 2 | Creative manager | Author behaviors<br>*Behavior Type*        *Example* | |
| | | • "promo/teaser" for product | • An interactive script, in which the toy gives describes the product, talk about the advantages, etc. |
| 4 | Creative director and personalization manager | Set checkpoints within the behaviors (In order that varied logging info about the interaction progress can be supplied to the profiling service). | |

FIGURE 134

| Goal In Context: | Keeping all relevant products in a personalized web catalog /shop format<br>Presenting all of IRENA custom categories and vendors |
|---|---|
| Pre-Condition: | Profiling service data |
| Success End Condition: | Users can view all products and vendors through a web interface. Can buy a product. Can register to a vendor or to a IRENA custom category |
| Primary Actor: | IRENA creative manager |
| Trigger Event: | New vendor is signed up, new product is submitted |
| Forces in context: | • It is impossible to push all the subscriptions to the users. They should have the option to pull subscriptions, independently or as part of a behavior that brings them to the computer.<br>• Users can register to a vendor or an IRENA category. By doing so they agree to get all their teasers and they get discount for certain products. (club members)<br>• The user must submit a password and than get a customized interface generated by using the profiling service. (Targeted products, limited products for children, limited expenses for children etc.) |
| General comments: | Products can be located by a search mechanism. (sorted by category or by vendor) |
| Open issues: | It is possible also to choose a strategy in which products are only pushed to users and there is no option of a web catalog. |

FIGURE 135

| Goal In Context: | Keeping all relevant products in a personalized web catalog /shop format<br><br>Presenting all of IRENA custom categories and vendors |
|---|---|
| Pre-Condition: | Profiling service data |
| Success End Condition: | Users can view all products and vendors through a web interface. Can buy a product. Can register to a vendor or to a IRENA custom category |
| Primary Actor: | IRENA creative manager |
| Trigger Event: | New vendor is signed up, new product is submitted |
| Forces in context: | • It is impossible to push all the subscriptions to the users. They should have the option to pull subscriptions, independently or as part of a behavior that brings them to the computer.<br><br>• Users can register to a vendor or an IRENA category. By doing so they agree to get all their teasers and they get discount for certain products. (club members)<br><br>• The user must submit a password and than get a customized interface generated by using the profiling service. (Targeted products, limited products for children, limited expenses for children etc.) |
| General comments: | Products can be located by a search mechanism. (sorted by category or by vendor) |
| Open issues: | It is possible also to choose a strategy in which products are only pushed to users and there is no option of a web catalog. |

FIGURE 136

| Step | Actor | Action Description |
|---|---|---|
| 1 | IRENA creative manager | Forms all IRENA product categories and sub categories |
| | *Example:* | Category – Computers<br>Sub category – desktops, notebooks, modems etc. |
| 2 | IRENA creative manager | • Places a list of all vendors under the appropriate categories with an option to register to each vendor. (If a user registers to a vendor, he gets all his teasers and ads and special discounts for his behaviors). Under each vendor will appear also list of all its products<br>• Places all subscriptions under the appropriate IRENA categories and sub-categories with an option to buy a product and register to a IRENA category. |
| | *Example:* | Places a computers vendor under:<br>• Categories – Computers<br>Places the new notebook computer under:<br>• The computer vendor<br>• What's new?<br>• Computers/notebooks |
| 3 | IRENA personalization manager | Customize a catalog for each user.<br>• Relevant products and vendors<br>• Special pricing for the user<br>• Limited product for children<br>• The shop will prevent a child from exceeding his expense limit |

FIGURE 137

| Goal In Context: | Attaching behaviors scheduling tips for client customizer |
|---|---|
| Pre-Condition: | • Updated operational profile service data<br>• Vendor tips |
| Success End Condition: | All relevant scheduling tips are attached to the behavior |
| Primary Actor: | Personalization manager |
| Trigger Event: | New behavior in the system (After the authoring process) |
| Forces in context: | The scheduling tips are instructions and recommendations for the client customizer that needs to combine tips from many behaviors. The tips should be sufficient for the client customizer to schedule the behaviors, using it's very simple, preset set of rules. |
| General comments: | The term scheduling a behavior refers to – time, with what other behavior etc. Usually product behaviors will not be pushed independently but during other behaviors. (Unless users set their preferences differently) |
| Open issues: | . |

FIGURE 138

| Step | Actor | Action Description |
|---|---|---|
| 1 | IRENA personalization manager | Analyze the behavior using the parameters –<br>• type of the behavior<br>• profiling service data<br>• relevant vendor tips and demands |
| 2 | IRENA personalization manager | Attach scheduling tips:<br>• Priority<br>• Key words (In order to link to other behaviors)<br>• Time<br>• Other relevant tips |

FIGURE 139

| Goal In Context: | Collect and analyze profiling data and determine groups of profiles. |
|---|---|
| Pre-Condition: | Updated operational profile service sub-system (synchronized with the other companies profiling servers) |
| Success End Condition: | All data on each user is stored in the profiling service<br><br>Profiles are sorted into groups |
| Primary Actor: | Personalization manager |
| Trigger Event: | New data arrives from client logger. The data is obtained automatically or actively submitted by the user. |
| Forces in context: | The profile service logs all info about users – orders, buying habits, users preferences etc. The profiles will be sorted into groups that will make it easier to attach a behavior to users. |
| Open issues: | |

FIGURE 140

| Step | Actor | Action Description |
|---|---|---|
| 1 | Personalization manager (Profiling service sub-system) | All profile data is sorted by specific users |
| 2 | Personalization manager | Creating group of profiles<br>*Example:*<br>• University graduates<br>• Subscribers to the computers vendor's service<br>• Early adopters<br>• Spending over $1,000 per month on IRENA products |
| 3 | Personalization manager | Creating unified groups<br>*Example:*<br>• Univarsity graduates tah subscribed to the specific computer vendor's service |

FIGURE 141

| Goal In Context: | Match the behaviors and the groups of profiles |
|---|---|
| Pre-Condition: | Behaviors are "packaged" The profiles are updated and sorted into groups |
| Success End Condition: | Each profile group contains a list of behaviors |
| Primary Actor: | Personalization manager |
| Trigger Event: | A new packaged behavior A new profile |
| Forces in context: | This is a critical and complex stage. The personalization manager has considered many parameters in order to make the right matches. |
| Open issues: | |

FIGURE 142

| Step | Actor | Action Description |
|---|---|---|
| 1 | Personalization manager | Deciding which behaviors belong to which groups and sub groups. *Example:* |
| | | Group | Behaviors |
| | | • All users that are subscribes to the specific computer vendor's service | • All of the specific computer vendor's products |
| | | • IT professionals that subscribed to computer vendor's service | • All computer vendor's products and specific publisher books |

FIGURE 143

| Goal In Context: | Deliver the behaviors to end users |
|---|---|
| Pre-Condition: | The behavior space is configured |
| Success End Condition: | Each user gets the behaviors that are most suitable for him |
| Primary Actor: | Personalization manager. (The delivery subsystem) |
| Trigger Event: | Connection to end client opens. |
| Forces in context: | |
| Open issues: | • The connection with a client can be opened by more than one entity.<br>• The connection with a client can be set to open at a specific time.<br>• When there is a permanent internet access Irena can initiate a connection without requesting explicit consent of the user |

FIGURE 144

| Step | Actor | Action Description |
|---|---|---|
| 1 | Personalization manager | Receives user I.D of each of the end users on a certain client |
| 2 | Personalization manager | Matches the user I.D with the relevant profiling groups |
| 3 | Personalization manager | Checks the behavior space for new behaviors added to the relevant groups since last connection |
| 4 | Personalization manager | Delivers the new behaviors to client |

FIGURE 145

| Goal In Context: | Routinely Issue limited customized profile reports for each vendor |
|---|---|
| Pre-Condition: | Profiling data |
| Success End Condition: | |
| Primary Actor: | Personalization manager |
| Trigger Event: | |
| Forces in context: | Erena wants to issue effective but limited profiling reports. Much of this data is key business info that is very valuable |
| Open issues: | Irena will charge the vendors for more in-depth, valuable reports |

FIGURE 146

| Step | Actor | Action Description |
|---|---|---|
| 1 | Personalization manager | Set, according to the vendor's preferences and Erena's policy, the form of report and the time of issue. |
| 2 | Personalization manager | Process relevant profiling service data into a report |
| 3 | Personalization manager | Issue the report to a vendor |

FIGURE 147

| Goal In Context: | Identify users |
|---|---|
| Pre-Condition: | Each user gets a "key" for identification |
| Success End Condition: | The toy knows who is the user he interacts with |
| Primary Actor: | User |
| Trigger Event: | A user is about to interact with a toy |
| Forces in context: | Users must be identified in order that<br>• Suitable behaviors can be delivered<br>• Payment is drawn from the right account<br>• No unauthorized usage of accounts<br>• Preset limitations on child's expenses and exposure are inflicted |
| General comments | Different technologies can be used in this context – proximity smart cards, voice authentication etc. In any case the process should be automatic and immediate |
| Open issues: | |

FIGURE 148

| Goal In Context: | Set preferred time for receiving behaviors, limit certain behaviors from reaching children, limiting children expenses and other preferences. |
|---|---|
| Pre-Condition: | An interface to configure the client customizer |
| Success End Condition: | The user gets the behaviors according to his preferences |
| Primary Actor: | End user |
| Trigger Event: | User decides to change the preferences of receiving certain or all behaviors |
| Forces in context: | All customization data also reaches the profiling service (through the client logger), thanks to that, local customization preferences also effect the customized web catalog. |
| General comments: | The client customizer will prevent a child from buying a product if he exceeded the level of expenses allowed by the parent. |
| Open issues: | Will the client customizer interface be used also for collecting profiling info from user such as: age, income, field of interest and other personal characters. This should be done only once when first receiving the toy and registering |

FIGURE 149

| Step | Actor | Action Description |
|------|-------|-------------------|
| 1 | Parent | Configures his customization preferences for all the behaviors or certain behaviors:<br>*Example fields:*<br>• Preferred time to receive a behavior<br>• Child can spend x$ every month<br>• Do not present child teasers for products rated x,y,z<br>• Receive independent product behaviors (sort of a shopping channel) or just during other behaviors<br>• Choose or change password for him self or for child<br>• Latest hour to deliver a behavior to child? |
| 2 | Child | Configures his customization preferences for all the behaviors or certain behaviors (except of the preferences pre-configured by parent):<br>*Example fields:*<br>• Preferred time to receive a behavior |

FIGURE 150

| Goal In Context: | Buy a product through the Erena company |
|---|---|
| Pre-Condition: | An account enabling user to make a secure purchase automatically without filling any forms. (Involving an electronic wallet technology) |
| Success End Condition: | Product delivered to the User |
| Primary Actor: | End User |
| Trigger Event: | User decided to buy a certain product |
| Forces in context: | One of the foundations of the framework is the simplicity of the buying process. The user needs to choose his payment method only once. All he needs to do in order to buy a product is a short oral authorization. The fact that all transactions go through Erena, enables the user to have only one account for all his purchases. |
| General comments: | Orders go to the profiling service, and from there they are transferred through the commercial manager to the vendors. |
| Open issues: | |

FIGURE 151

| Step | Actor | Action Description |
|---|---|---|
| 1 | End user | Chooses his preferred payment method (once) |
| 2 | End user | Interacts with a behavior presenting the new notebook |
| 3 | End user | Decides to buy the notebook |
| 4 | End user | Tells the toy that he wants to but the notebook |
| 5 | End User | Receives the notebook |

FIGURE 152

Audio Push Registration and Customization

File  Edit  View  Tools  Window  Help

User name: Stuart ▶

Gender: ●Male  ○Female ▶

Language: English ▶

Age: 25

Living Object: Pooh bear ▶

Vocals: Marilyn Monroe ▶

Record name: △

Select Information Subjects and Sources

Subjects: Business ▶   Sources: ABC ▶

Set priorities of selects information subjects and sources

Stock ▶

Rate: 2 ▶ Items every 10 ▶ minutes

First level: 15 ▶ words

Second level: 30 ▶ words

FIGURE 153

Desktops   Multimedia   Software
Modems     Scanners     Printers
Handhelds  Notebooks    Upgrades Get your daily
technology fix See a sample issue Briefing Centers
Companies
Products
KillerDownloads
Shopping
Y2K
Search
Week in Review Community
TalkBack
Help
Home Berst Alert
TUESDAY, FEBRUARY 02, 1999
Y2K Countdown: Will You
Be in the Dark on Jan. 1,
2000?
Jesse Berst, Editorial Director
ZDNet AnchorDesk Residents of a rural island community here in
Washington State are ordering 55-gallon barrels to collect
rainwater and planning bulk purchases of wheat, rice and
honey. Others are packing up their families and heading for the
hills to escape turn-of-the-millennium calamity.

I'll be honest: I'm not stockpiling Power Bars. I don't think the sky
is falling. But with 11 months and counting -- speculation
mounts about whether you'll have lights and heat and a toilet
that flushes come Jan. 1, 2000. Should you be stowing away
space blankets and water jugs -- just in case? Use these
resources (and those in the sidebar) to help you make an
informed decision:

Consumer FAQ: Y2K specialist Mitch Ratcliffe points out that
just because your utility company is Y2K compliant doesn't

4200

BRIEFING CENTER:
Year 2000
READ MORE:
Jesse: How to Keep Y2K From
Pillaging Your Personal
Finances - ZDNet
Ultimate Y2K Guide - ZDNet
The Y2K Call to Arms -
Inter@ctive Week
Millennium Bug has Some
Americans Heading for Hills -
ZDNN
Power Companies Make Y2K
Claims - ZDNet
Consumer Alert FAQ -- Utilities -
ZDNet
LEARN HOW:
New Toll-Free Line Provides
Y2K Information to Consumers -
Internet

| | |
|---|---|
| Game State Record | |
| Game Name | Tree-Quiz |
| State Name | Ask Question |
| Node Name | Class Tree |
| Condition Set 1 | Visitor.History.Game-Name = Tree-Quiz and |
| | Visitor.Credits = Tree-Quiz |
| Condition Set 2 | Visitor.History.Game-Name = Not(Tree-Quiz) |
| Condition Set 3 | Visitor.History.Game-Name = Tree-Quiz and |
| | Visitor.Credits = Not(Tree-Quiz) and |
| | Visitor.Level < 3 and |
| | Local-Parameter-2 = Answer (Local-Parameter-1) |
| Condition Set 4 | Visitor.History.Game-Name = Tree-Quiz and |
| | Visitor.Credits = Not(Tree-Quiz) and |
| | Visitor.Level => 3 and |
| | Local-Parameter-2 = Answer (Local-Parameter-1) |
| Condition Set 5 | Visitor.History.Game-Name = Tree-Quiz and |
| | Visitor.Credits = Not(Tree-Quiz) and ( |
| | Local-Parameter-2 = Not (Answer (Local-Parameter-1)) |
| or | |
| | Local-Parameter-2 = No-Response) |
| Condition Set 6 | Visitor.History.Game-Name = Tree-Quiz and |
| | Visitor.Credits = Not(Tree-Quiz) and ( |
| | Local-Parameter-2 = Not (Answer (Local-Parameter-1)) |
| or | |
| | Local-Parameter-2 = No-Response) |
| | Visitor.Level = 0 |
| Condition Set 7 | Default |

Figure 156B

| | (Continued) |
|---|---|
| Action Set 1 | Play" <Visitor.Visitor-Name>, please proceed to another node." |
| Action Set 2 | Set Visitor.Game-Name = Tree-Quiz<br>Play "Hello <visitor.visitor-name>"<br>Select Question =<br>Tree-Quiz.(Visitor.Age)(visitor.Level)(Random-Number)<br>Set <Local-Parameter-1> = Question<br>Play Question |
| Action Set 3 | Play "Correct answer <visitor.visitor-name>,<br>    please proceed to the clown to receive your prize"<br>Set Visitor.Attribute-3 = Gift(Tree-Quiz)<br>Set Visitor.Attribute-4 = 0 |
| Action Set 4 | Play "Correct answer <visitor.visitor-name>,<br>to receive your prize you must visit the red clown in<br>thirty minutes, good luck."<br>Set Visitor.Attribute-3 = Gift(Tree-Quiz)<br>Set Visitor.Attribute-4 = Time(Time + 30) |
| Action Set 5 | Play "Sorry <visitor.visitor-name>,<br> but the correct answer is <answer(Local-Parameter-1)>."<br>decrement Visitor.Level |
| Action Set 6 | Play "Thank you <visitor.visitor-name> for your<br>participation, please proceed to another node" |
| Action Set 7 | None |
| Transition 1 | End Game |
| Transition 2 | Record Answer |
| Transition 3 | End-Game |
| Transition 4 | End-Game |
| Transition 5 | Self |
| Transition 6 | End Game |
| Transition 7 | State Default |

Figure 156C

| | (Continued) |
|---|---|
| Action Set 1 | Play" <Visitor.Visitor-Name>, please proceed to another game." |
| Action Set 2 | Set Visitor.Game-Name = Tree-Quiz<br>Play "Hello <visitor.visitor-name>"<br>Select Question = Tree-Quiz.(Visitor.Age)(visitor.Level)(Random-Number)<br>Set <Local-Parameter-1> = Question<br>Play Question |
| Action Set 3 | Play "Correct answer <visitor.visitor-name>,<br>       please proceed to the clown to receive your prize"<br>Increment Visitor.Attribute-3<br>Set Visitor.Attribute-4 = 0 |
| Action Set 4 | Play "Correct answer <visitor.visitor-name>,<br>to receive your prize you must visit the red clown in<br>thirty minutes, good luck."<br>Increment Visitor.Attribute-3<br>Set Visitor.Attribute-4 = Time(Time + 30) |
| Action Set 5 | Play "Sorry <visitor.visitor-name>,<br>  but the correct answer is <answer(Local-Parameter-1)>."<br>decrement Visitor.Level |
| Action Set 6 | Play "Thank you <visitor.visitor-name> for your<br>participation, please proceed to the clown to receive your<br>prize"<br>Decrement Visitor.Attribute-3 |
| Action Set 7 | None |
| Transition 1 | End Game |
| Transition 2 | Record Answer |
| Transition 3 | End-Game |
| Transition 4 | End-Game |
| Transition 5 | Self |
| Transition 6 | End Game |
| Transition 7 | State Default |

| Game State Record | |
|---|---|
| Game Name | Tree Quiz |
| State Name | Record Answer |
| Node Name | Class Tree |
| Condition Set 1 | Local-Parameter-3 = Not Recording |
| Condition Set 2 | Local-Parameter-3 = Recording and Silence greater than 5 seconds and no voice |
| Condition Set 2 | Local-Parameter-3 = Recording and Silence greater than 5 seconds and voice |
| Condition Set 3 | Local-Parameter-3 = Recording and Voice and no silence |
| Action Set 1 | Start Recording<br>Set Local-Parameter-3 = Recording(Local- Parameter-2) |
| Action Set 2 | Set Local-Parameter-2 = No-Response<br>Set Local-Parameter-3 = Not Recording |
| Action Set 3 | Set Local-Parameter-2 = Voice-recognition(local- Parameter-2)<br>Set Local-Parameter-3 = Not Recording |
| Action Set 4 | None |
| Transition 1 | Self |
| Transition 2 | Ask-Question |
| Transition 3 | Ask-Question |
| Transition 4 | Self |

⎯ 6810

| Game State Record | |
|---|---|
| Game Name | Any-Game |
| State Name | Give-Present |
| Node Name | Clown |
| Condition Set 1 | Visitor.Attribute-3 = Not Gift |
| Condition Set 1 | Visitor.Attribute-3 = Gift |
| Action Set 1 | Play "Hi <Visitor.Visito-Name>, please go and try a quiz"" |
| Action Set 2 | Play "Hi <Visitor.Visito-Name>, here is your present"<br>Dispense (Visitor.Attribute)<br>Set Visitor.Attribute = None |
| Transition 1 | End Game |
| Transition 2 | End Game |

Figure 158

| Visitor Profile Record | |
|---|---|
| Name | Tom |
| Surname | Whiller |
| Group | None |
| Sex | NA |
| Age | 10 |
| Accent | NA |
| Visitor ID | 879174276 |
| Level | 2 |
| Badge ID | 1594 |
| Current Location | Tree 37 |
| Current Game | Tree Quiz 14 |
| Current State | Get Prize |
| Attribute 1 | |
| Attribute 2 | |
| Attribute 3 | |

6790  6800

| Past Games Record | |
|---|---|
| Visitor ID | 879634276 |
| Game | Zoo Keeper |
| Level | 1 |
| Status | Finished |
| State | NA |
| Date&Time | 2507971430 |

6720  6830

| Credits Record | |
|---|---|
| Visitor ID | 879634276 |
| Game Name | Tree Quiz 14 |
| Credit 1 | 014 |

| Current Game Track Record | |
|---|---|
| Visitor ID | 879634276 |
| Game Name | Tree Quiz 14 |
| State Name | Get Prize |
| State Name | Ask Question |

6840

---

| Visitor Profile Record | |
|---|---|
| Name | George |
| Surname | White |
| Group | None |
| Sex | NA |
| Age | 40 |
| Accent | NA |
| Visitor ID | 879142376 |
| Level | 1 |
| Badge ID | 1544 |
| Current Location | Tree 37 |
| Current Game | Tree Quiz 14 |
| Current State | Ask Question |
| Attribute 1 | |
| Attribute 2 | |
| Attribute 3 | |

6790  6800

| Past Games Record | |
|---|---|
| Visitor ID | 879634276 |
| Game | Tree Quiz 09 |
| Level | 1 |
| Status | Finished |
| State | NA |
| Date&Time | 15089714 30 |

6720  6830

| Credits Record | |
|---|---|
| Visitor ID | 87963427 6 |
| Game Name | Tree Quiz 09 |
| Credit 1 | 047 |

| Current Game Track Record | |
|---|---|
| Visitor ID | 879634276 |
| Game Name | Tree Quiz 14 |
| State Name | Ask Question |

6840

Figure 159
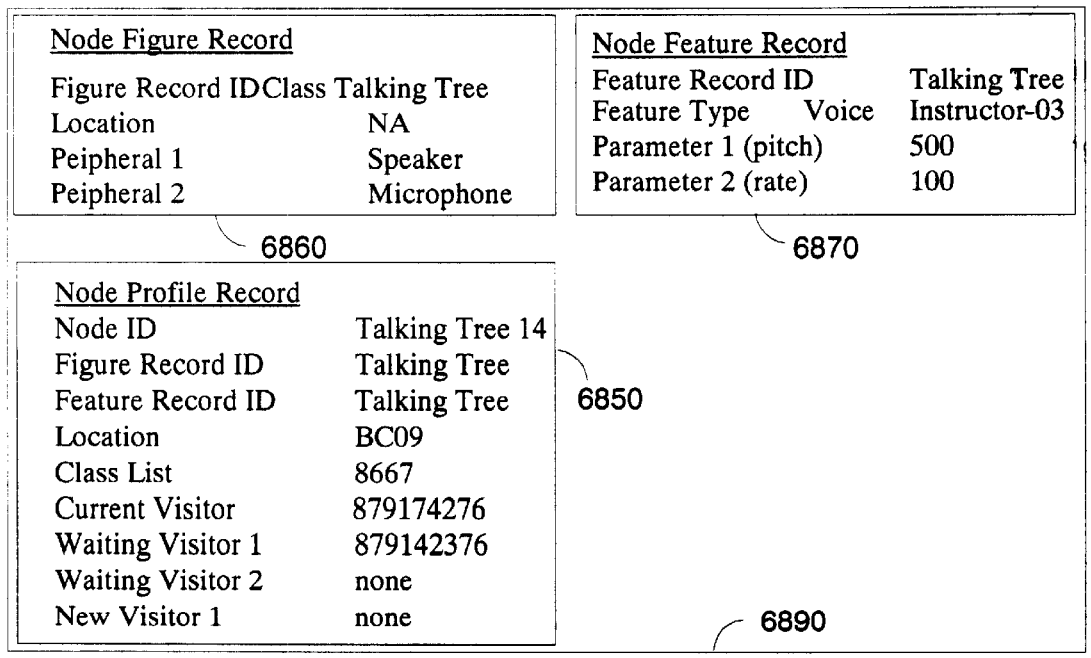
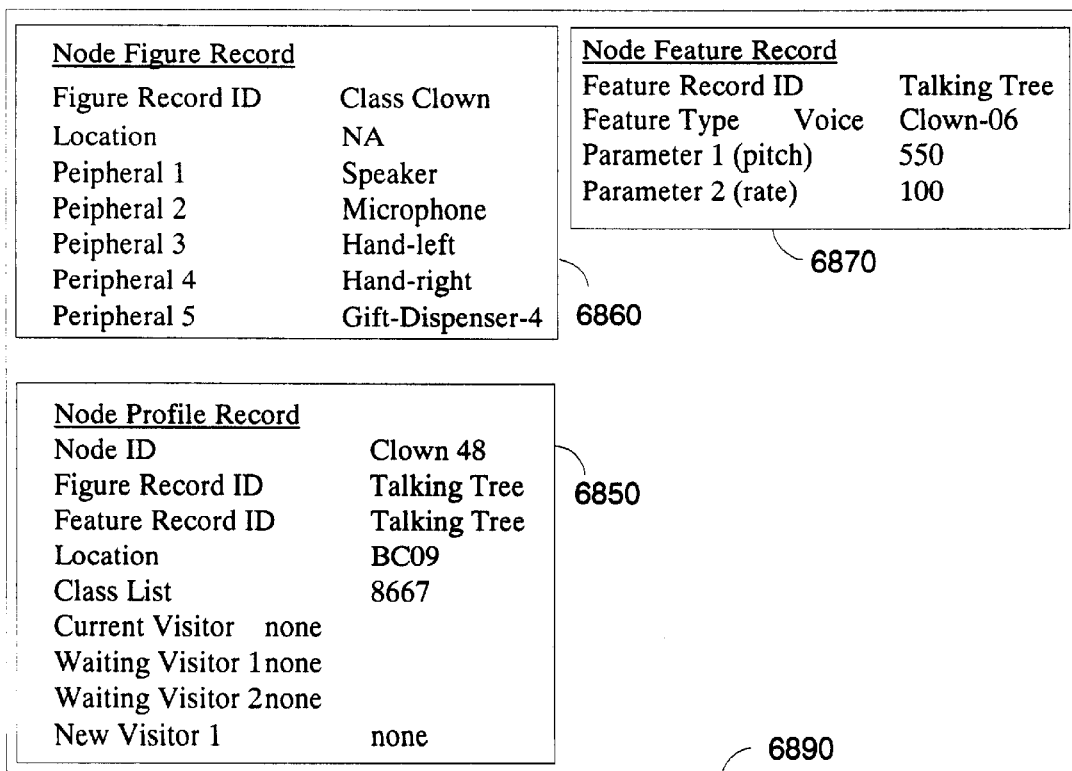

METHOD FOR USING A TOY TO CONDUCT SALES OVER A NETWORK

REFERENCE TO EARLIER FILED APPLICATIONS

This application is a continuation-in-part of application Ser. No. 09/062,500, filed Apr. 17, 1998, application Ser. No. 09/081,889, filed May 20, 1998, which is a continuation-in-part of PCT/IL,96/00157, filed Nov. 20, 1996, which is a continuation-in-part of application Ser. No. 08/561,316, filed Nov. 20, 1995, now U.S. Pat. No. 5,752,880, and copending application Ser. No. 09/260,931, filed Mar. 2, 1999. The disclosure of application Ser. No. 09/062,500, application Ser. No. 09/081,889, and application Ser. No. 09/260,931 are incorporated herein by reference.

FIELD OF THE INVENTION

The present invention relates to toys in general, particularly computer controlled toys that provide messages to the user or toys used in conjunction with a computer system.

BACKGROUND OF THE INVENTION

Printed television guides are known. A variety of advertising technologies are known.

Internet push technology is used to provide information, collated and collected from across the world wide web, to individual or corporate users who have requested such information. The types of information are selected by the user, however the particular informative items are not individually selected by the user. The informative items, which may include news, weather, sport, stock market updates etc. are sent directly over the Internet or an intranet to a user's computer. This technology benefits a user by providing selected types of information to a user without the user having to spend the time surfing the web to retrieve the information directly.

Information providers that utilize Internet push technology are listed by Frank Vaughan, 1997, in "Surfing the Internet: Push technology is one of the newest killer apps.", Computer Bits, Vol. 7, No. 10, and can be found at the following URL: http://iago.computerbits.com/archive/19971000/surf9710.htm.

Toys which are remotely controlled by wireless communication and which are not used in conjunction with a computer system are well known in the art. Typically, such toys include vehicles whose motion is controlled by a human user via a remote control device.

U.S. Pat. No. 4,712,184 to Haugerud describes a computer controlled educational toy, the construction of which teaches the user computer terminology and programming and robotic technology. Haugerud describes computer control of a toy via a wired connection, wherein the user of the computer typically writes a simple program to control movement of a robot.

U.S. Pat. No. 4,840,602 to Rose describes a talking doll responsive to an external signal, in which the doll has a vocabulary stored in digital data in a memory which may be accessed to cause a speech synthesizer in the doll to simulate speech.

U.S. Pat. No. 5,021,878 to Lang describes an animated character system with real-time control.

U.S. Pat. No. 5,142,803 to Lang describes an animated character system with real-time control.

U.S. Pat. No. 5,191,615 to Aldava et al. describes an interrelational audio kinetic entertainment system in which movable and audible toys and other animated devices spaced apart from a television screen are provided with program synchronized audio and control data to interact with the program viewer in relationship to the television program.

U.S. Pat. No. 5,195,920 to Collier describes a radio controlled toy vehicle which generates realistic sound effects on board the vehicle. Communications with a remote computer allows an operator to modify and add new sound effects.

U.S. Pat. No. 5,270,480 to Hikawa describes a toy acting in response to a MIDI signal, wherein an instrument-playing toy performs simulated instrument playing movements.

U.S. Pat. No. 5,289,273 to Lang describes a system for remotely controlling an animated character. The system uses radio signals to transfer audio, video and other control signals to the animated character to provide speech, hearing vision and movement in real-time.

U.S. Pat. No. 5,388,493 describes a system for a housing for a vertical dual keyboard MIDI wireless controller for accordionists. The system may be used with either a conventional MIDI cable connection or by a wireless MIDI transmission system.

German Patent DE 3009-040 to Neuhierl describes a device for adding the capability to transmit sound from a remote control to a controlled model vehicle. The sound is generated by means of a microphone or a tape recorder and transmitted to the controlled model vehicle by means of radio communications. The model vehicle is equipped with a speaker that emits the received sounds.

The disclosures of all publications mentioned in the specification and of the publications cited therein are hereby incorporated by reference.

SUMMARY OF THE INVENTION

The present invention seeks to provide methods and apparatus for toys, particularly computer controlled toys that provide messages to the user and can be used in effecting sales over a public network.

There is thus provided in accordance with a preferred embodiment of the present invention method for using a toy for effecting sales over a public network, the method comprising:

providing a toy having interactive speaking and listening functionality;

connecting the toy via a public network to at least one server having transactional functionality; and effecting sales by employing said transactional functionality via the interactive speaking and listening functionality of the toy.

It will be appreciated that the toy may effect sales in the course of on-line operation with respect to the transactional functionality of the server or alternatively in the course of off-line operation.

In a preferred embodiment of the invention, the step of effecting sales comprises employing said interactive speaking and listening functionality of said toy as an interface between a customer and the transactional functionality.

In accordance with another preferred embodiment of the invention, the step of effecting resulting sales comprises using the speaking and listening functionality to obtain payment authorization from the user.

In accordance with a preferred embodiment of the invention, the method also comprises recording sales effected through the toy and crediting a commercial entity associated with the toy.

In accordance with another preferred embodiment of the invention, the step of providing comprises providing a toy having a persona and wherein the step of effecting sales comprises providing a script according to which the interactive speaking and listening functionality operates.

In accordance with a preferred embodiment of the invention, the script matches the persona of the toy.

In accordance with another preferred embodiment of the invention, the step of effecting sales comprises actuating the toy to execute a reinforcing response if a sale is effected and to execute a negative response if a sale is not effected.

In accordance with a preferred embodiment of the invention, the method also comprises obtaining information regarding at least one users interacting with the toy and wherein the step of effecting sales is effected by differential operation of the interactive speaking and listening functionality for different users, depending on the information regarding said different users.

In accordance with another preferred embodiment of the invention, the method also comprises:

accepting a filtering request from a user; and modifying the scope of the sales effecting step responsive to said filtering request.

There is also provided, in accordance with another preferred embodiment of the invention, a method for using a toy for promoting sales over a public network, the method comprising:

providing a toy having interactive speaking and listening functionality;

connecting the toy via a public network to at least one server providing at least one sales promotion scripts;

actuating the interactive speaking and listening functionality of the toy, using at least one sales promotion scripts; and recording at least one parameter characterizing a user's response to the at least one sales promotion scripts.

In accordance with a preferred embodiment of the invention, the method also comprises automatically billing at least one entities associated respectively with the at least one sales promotion scripts, depending on the user's response to said at least one sales promotion scripts.

In accordance with another preferred embodiment of the invention, the method also comprises:

accepting a filtering request from a user; and modifying the scope of the actuating step responsive to said filtering request.

In accordance with a preferred embodiment of the invention, the step of actuating comprises providing a user with an entitlement to a discount, at a sales outlet.

In accordance with another preferred embodiment of the invention, the step of entitlement providing comprises the step of printing out a coupon.

There is also provided, in accordance with another preferred embodiment of the invention, a method for using a toy for enhancing television rating, the method comprising:

providing a toy having interactive speaking and listening functionality;

connecting the toy via a public network to at least one server providing at least one scripts promoting viewing of at least one program of an individual television channel; and actuating the interactive speaking and listening functionality of the toy, using at least one viewing promoting scripts.

In accordance with a preferred embodiment of the invention, the method also comprises recording at least one parameter characterizing a user's response to the at least one sales promotion scripts.

In accordance with another preferred embodiment of the invention, the step of recording comprises recognizing a broadcast of the program.

In accordance with a preferred embodiment of the invention, the step of recording comprises directly monitoring the user's response.

In accordance with another preferred embodiment of the invention, the method also comprises automatically billing at least one entities associated respectively with the at least one viewing promoting scripts, depending on the user's response to said at least one viewing promoting scripts.

BRIEF DESCRIPTION OF THE DRAWINGS AND APPENDICES

The present invention will be understood and appreciated from the following detailed description, taken in conjunction with the drawings and appendices in which:

FIG. 1A is a partly pictorial, partly block diagram illustration of a computer control system including a toy, constructed and operative in accordance with a preferred embodiment of the present invention;

FIGS. 2A–2C are simplified pictorial illustrations of a portion of the system of FIG. 1A in use;

Figure 3:
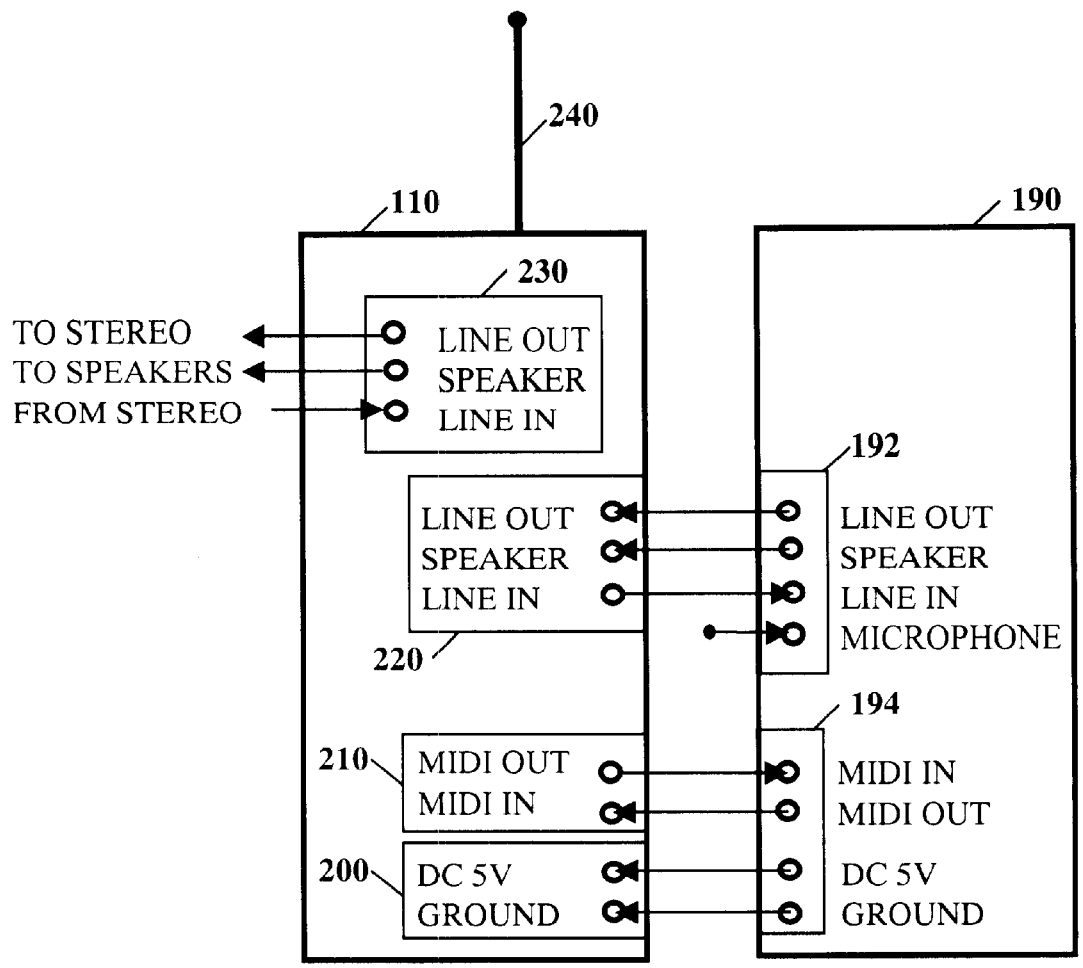
FIG. 3 is a simplified block diagram of a preferred implementation of the computer radio interface 110 of FIG. 1A.
Figure 4:
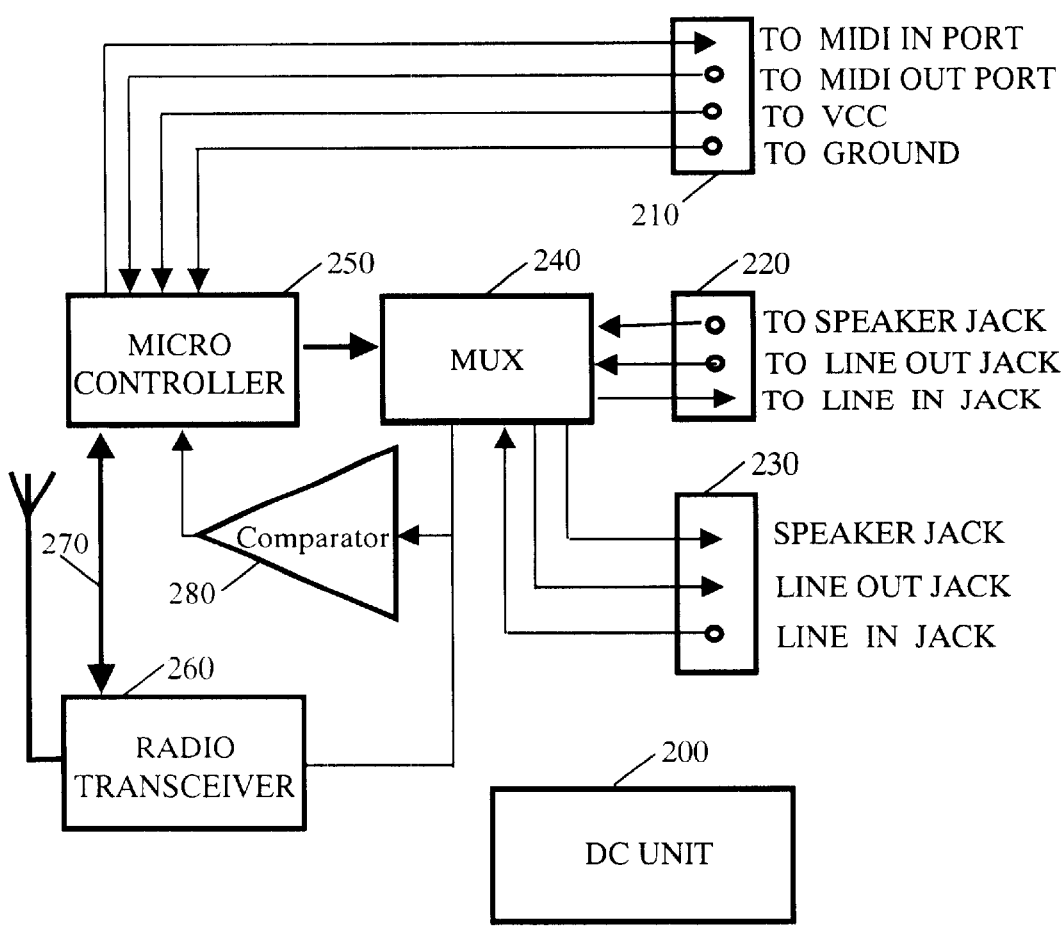
FIG. 4 is a more detailed block diagram of the computer radio interface 110 of FIG. 3.
Figure 5A:
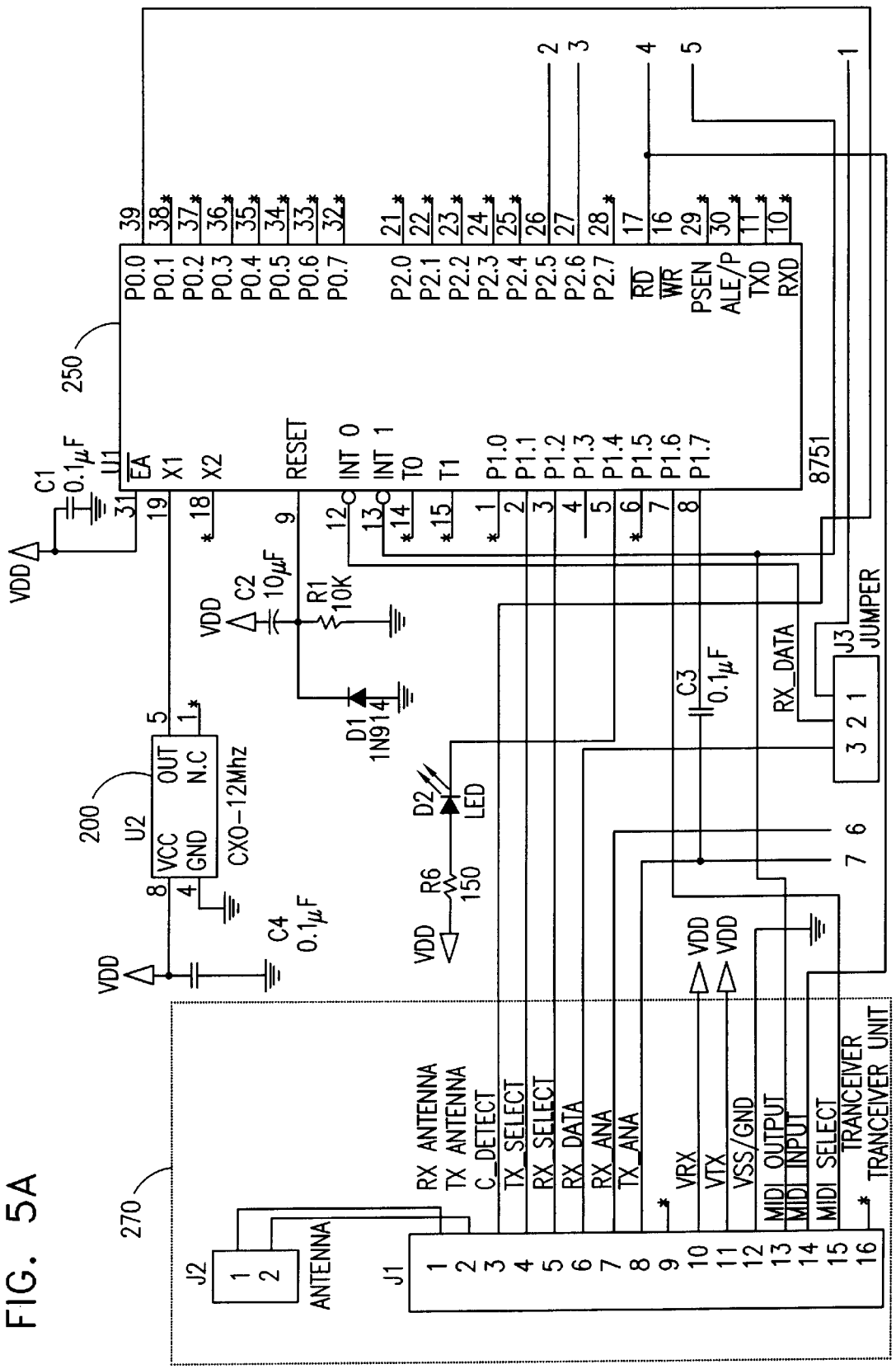
Figure 5B:
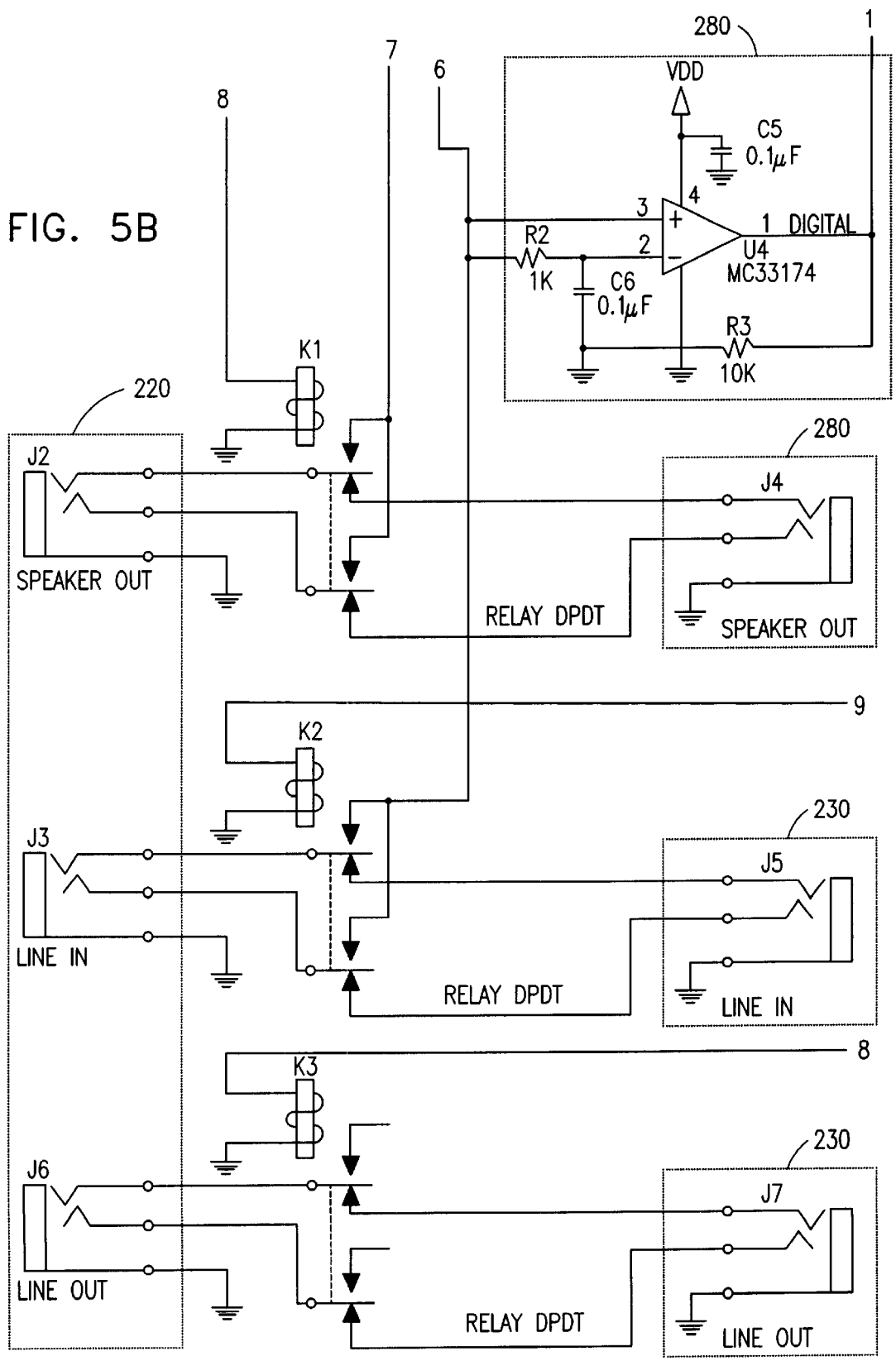
Figure 5D:
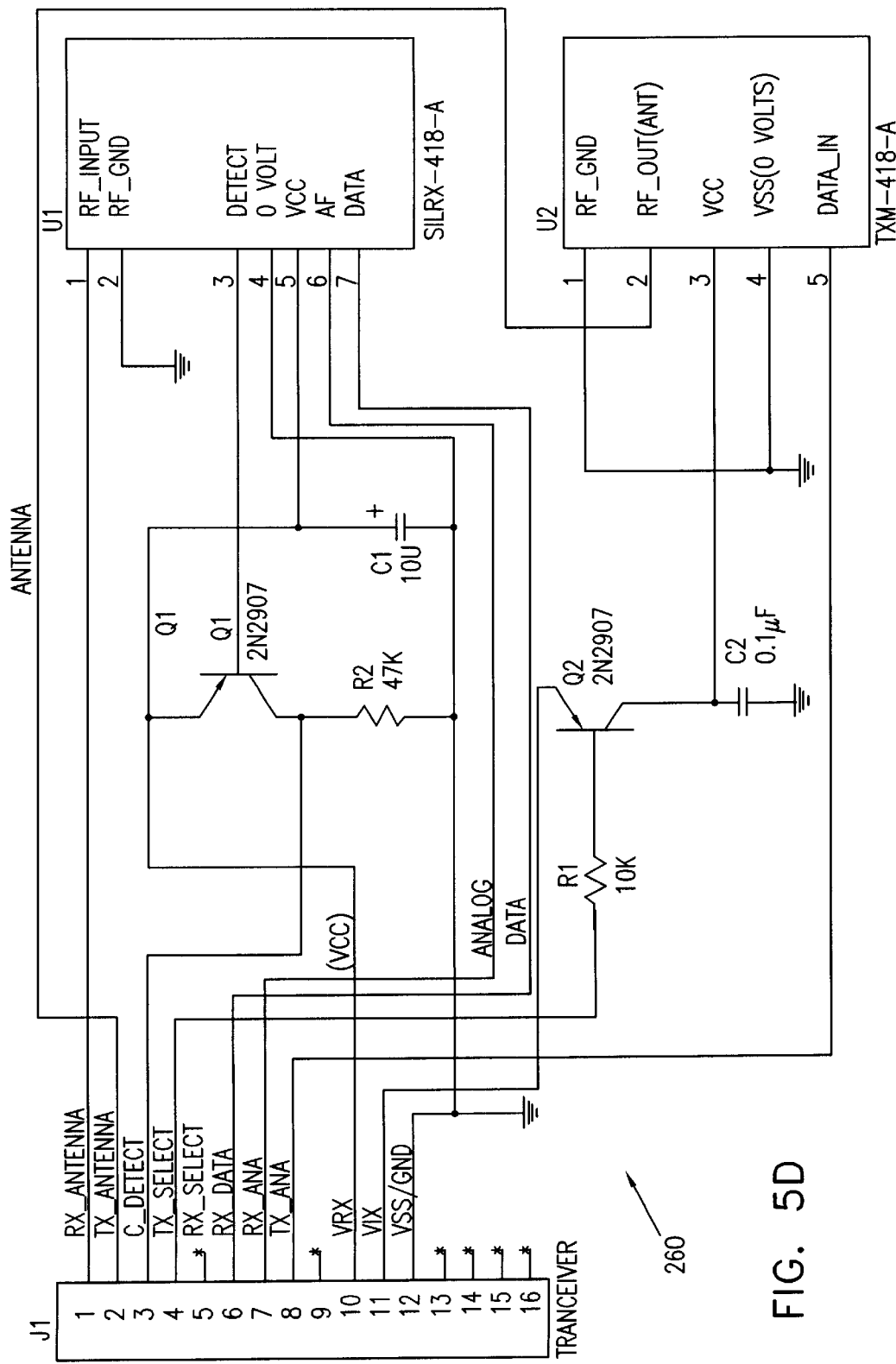
Figure 5E:
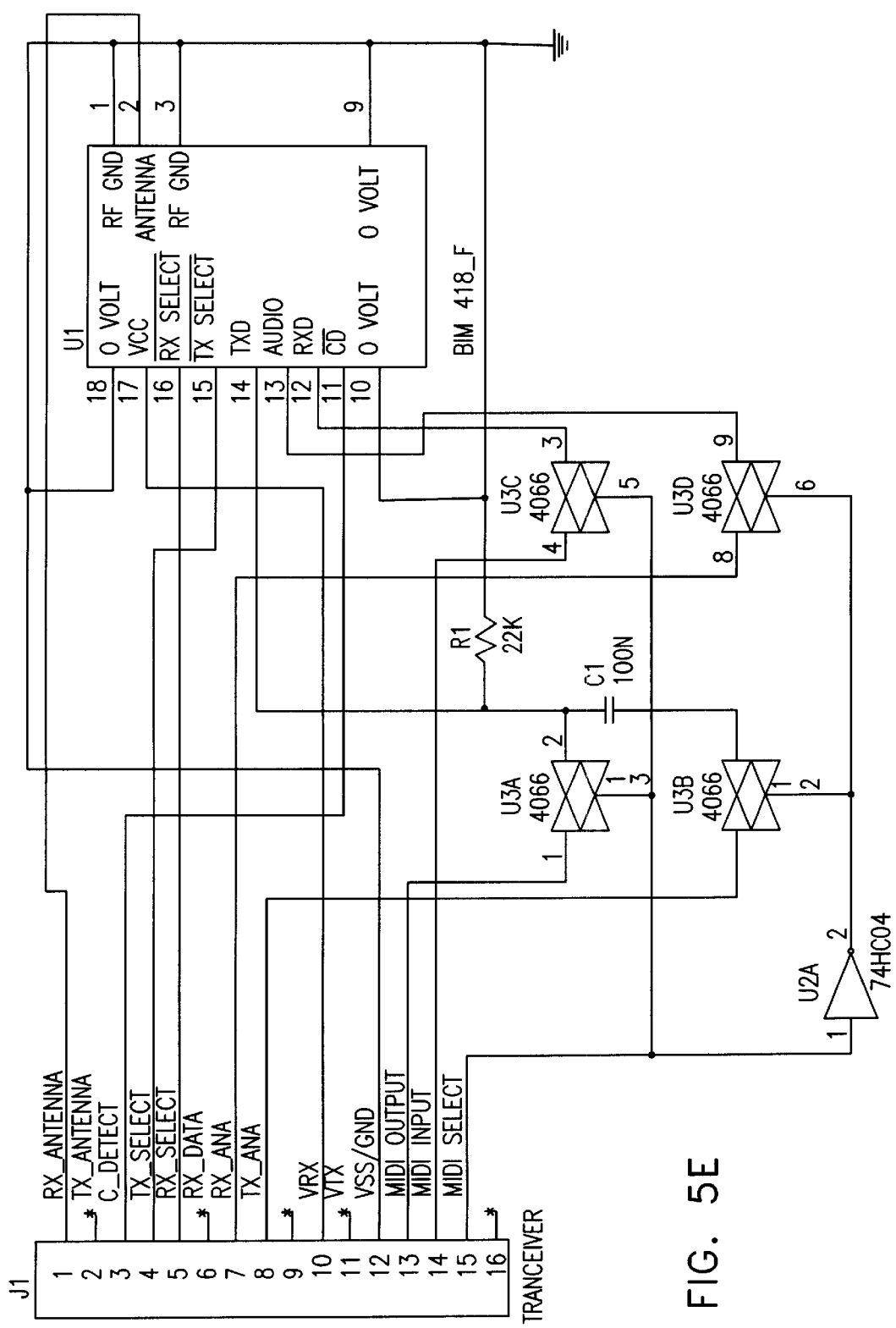
Figure 6:
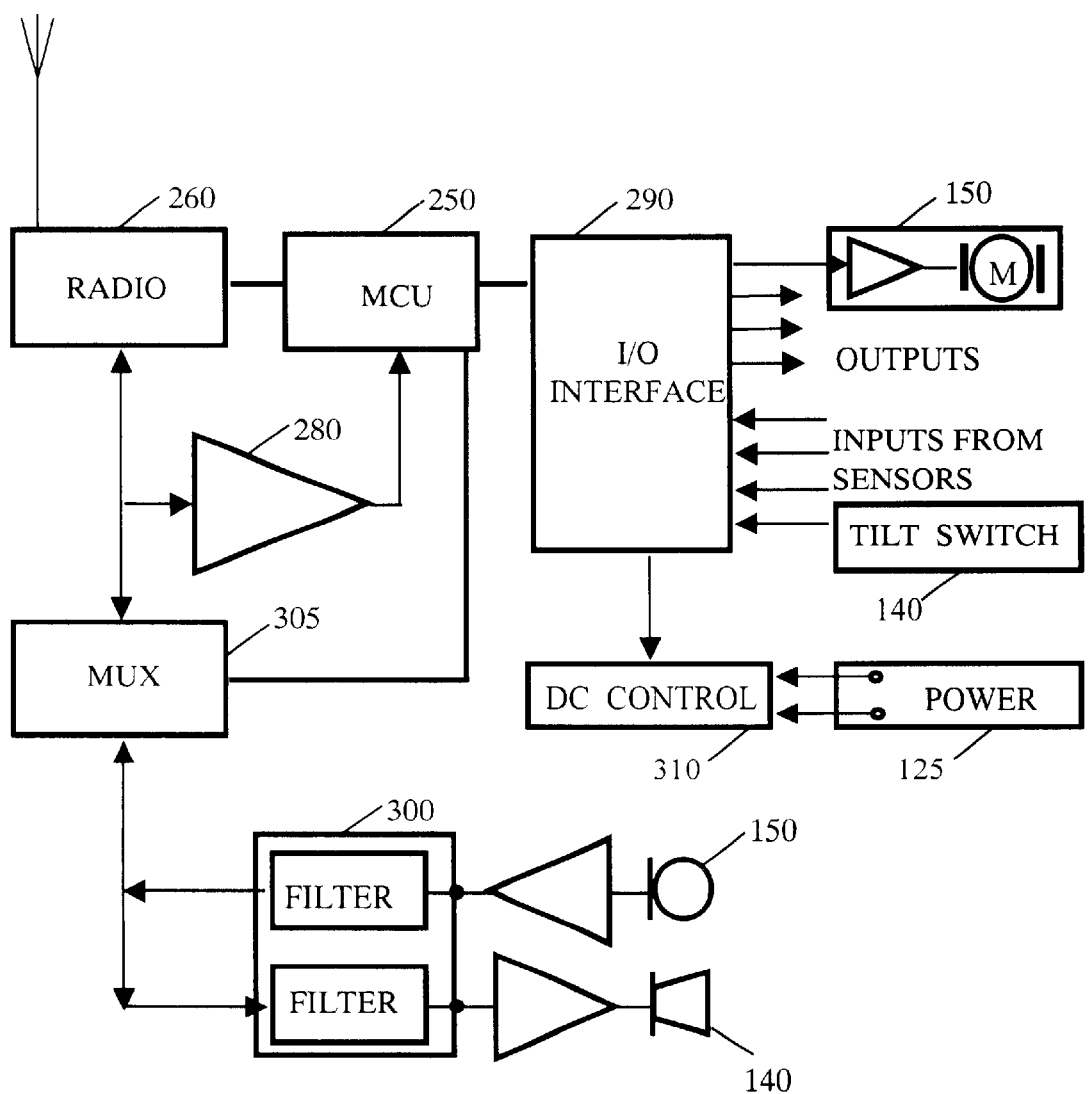
Figure 7A:
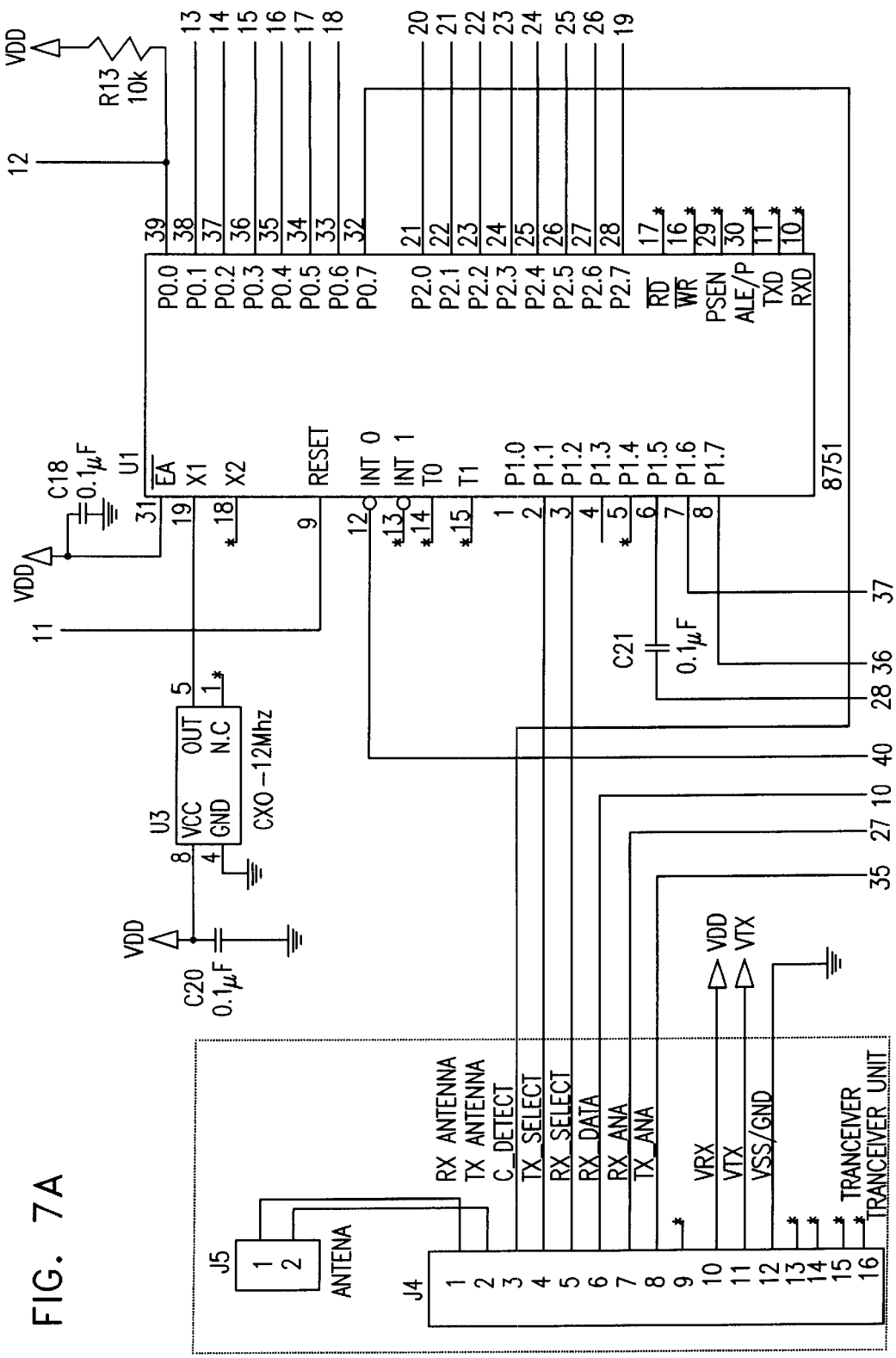
Figure 7B:
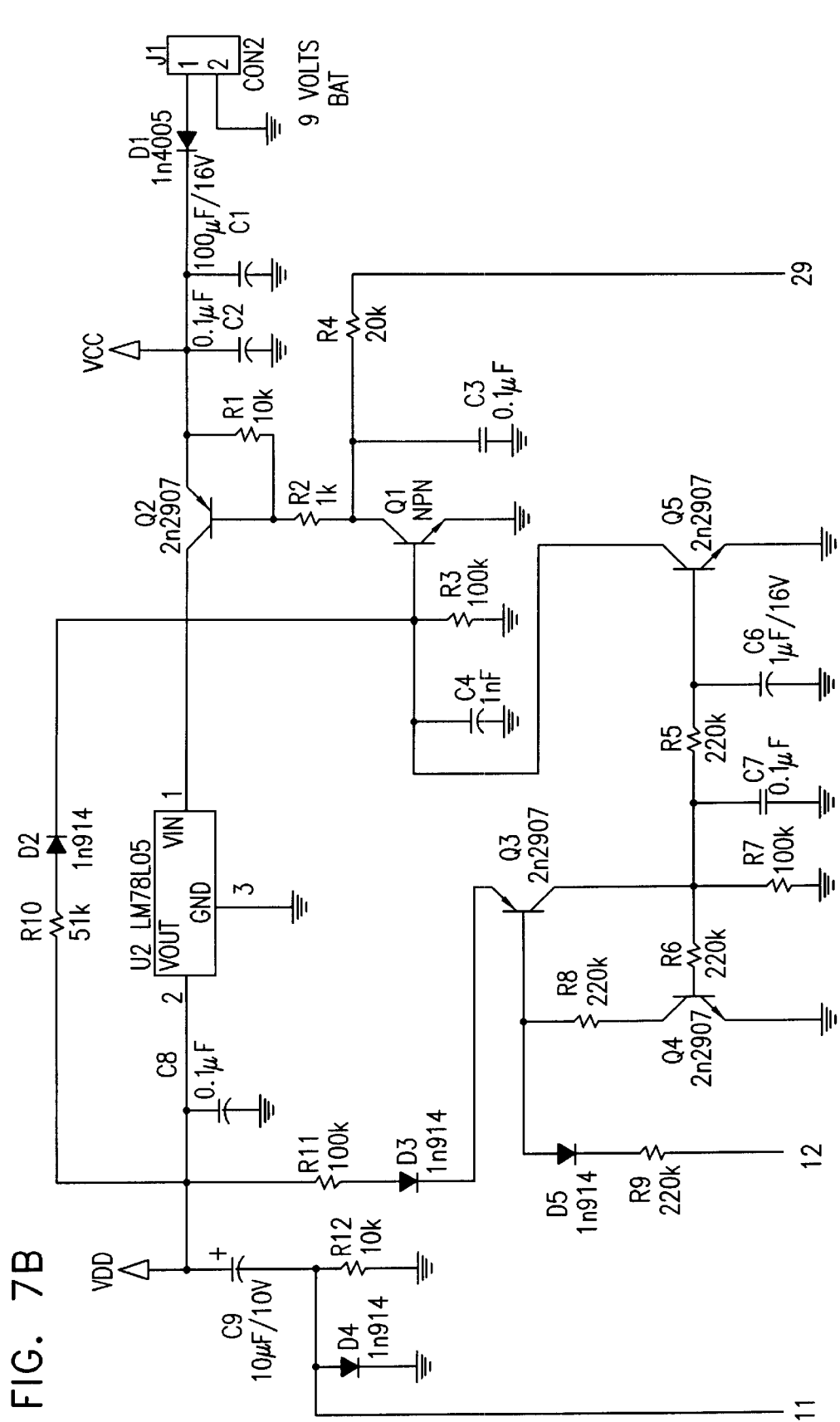
Figure 7C:
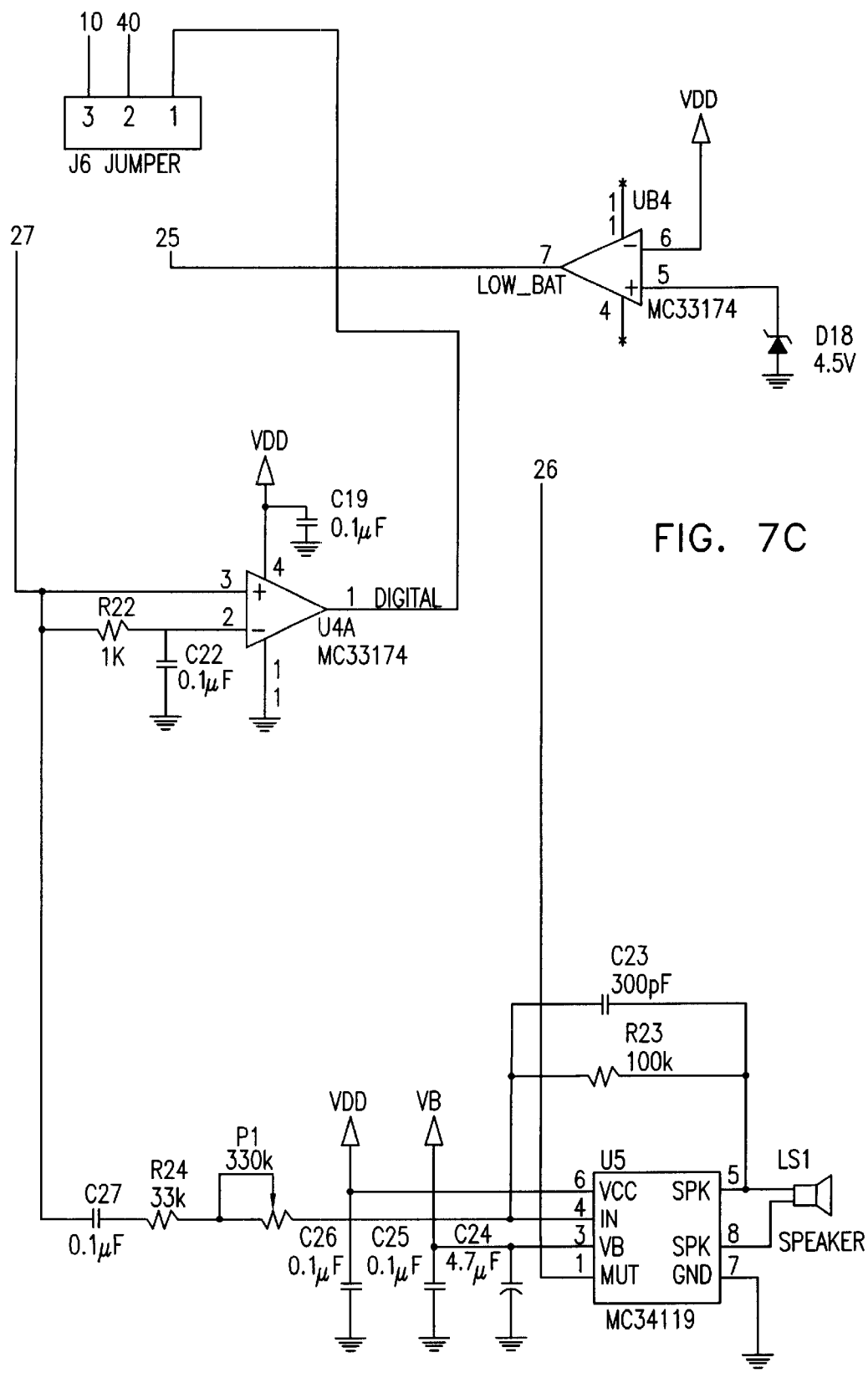
Figure 7D:
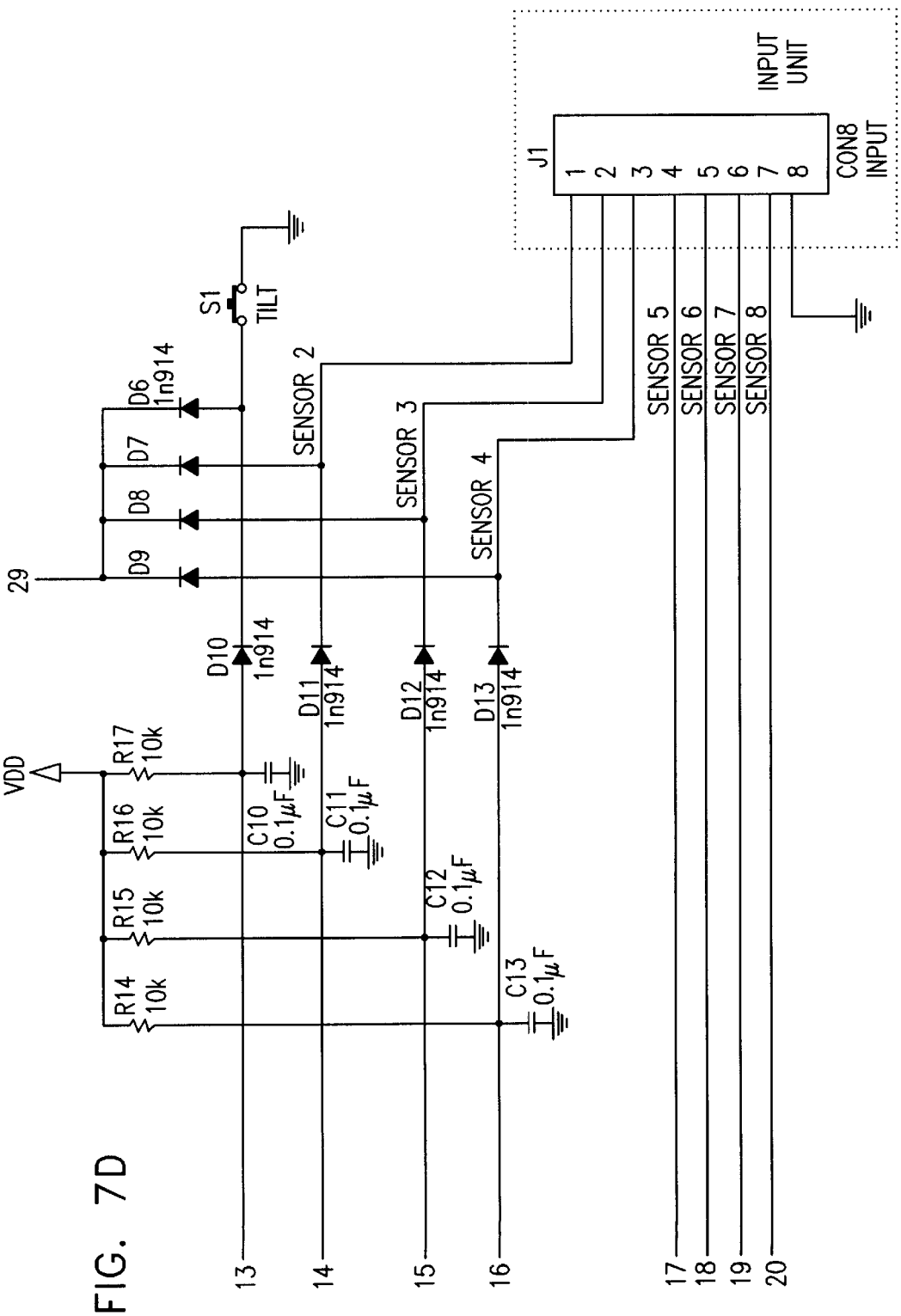
Figure 7E:
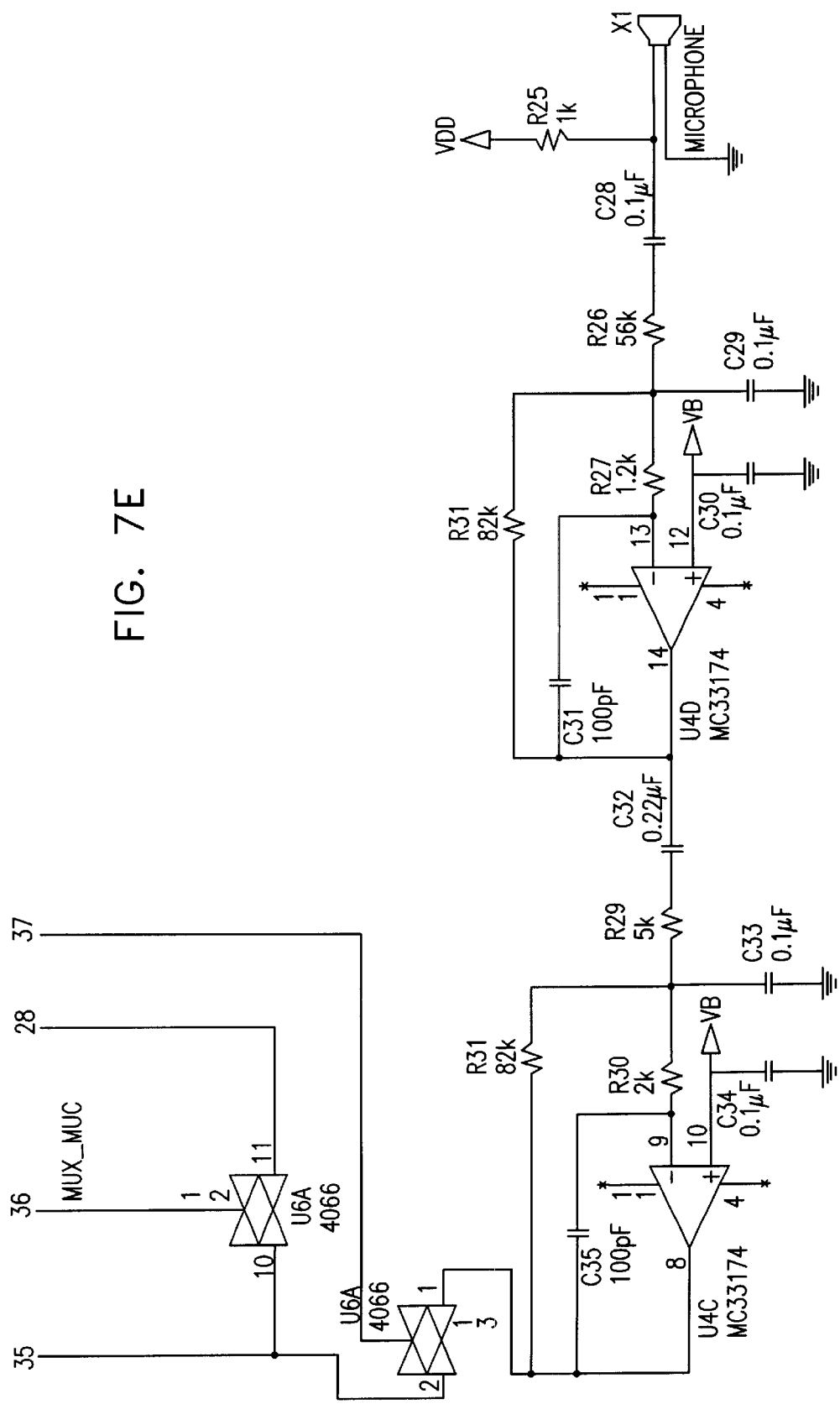
Figure 7F:
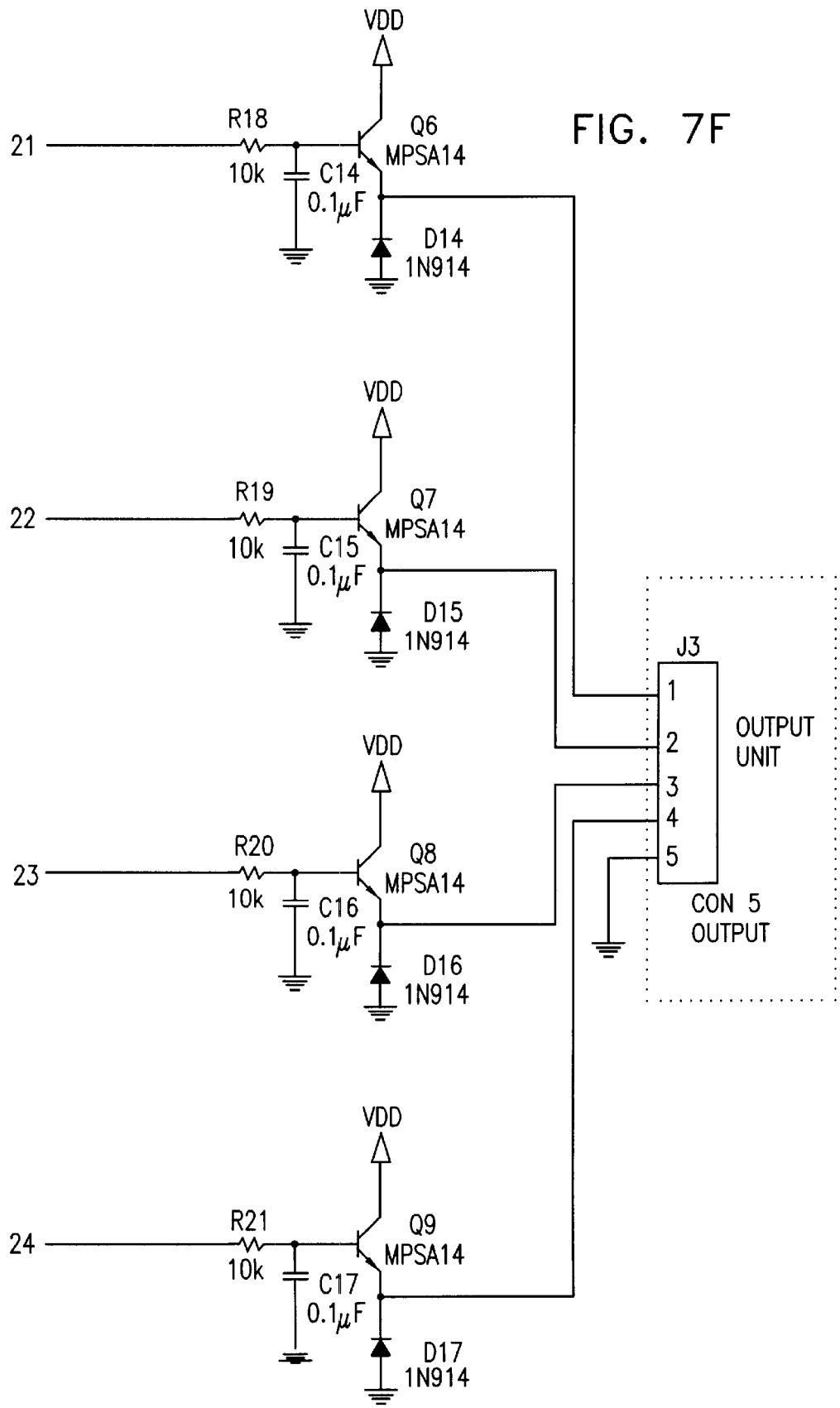
Figure 8A:
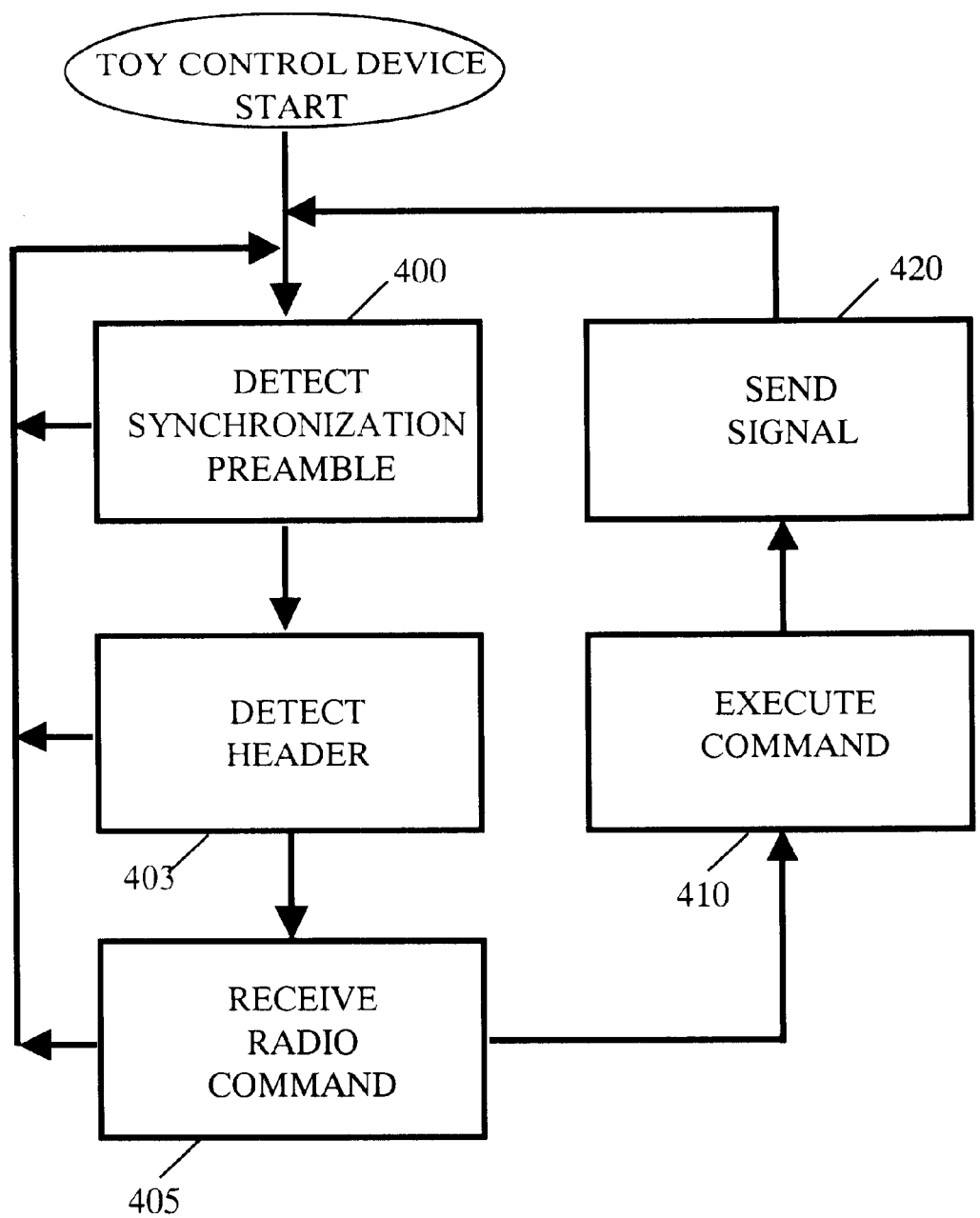
Figure 8B:
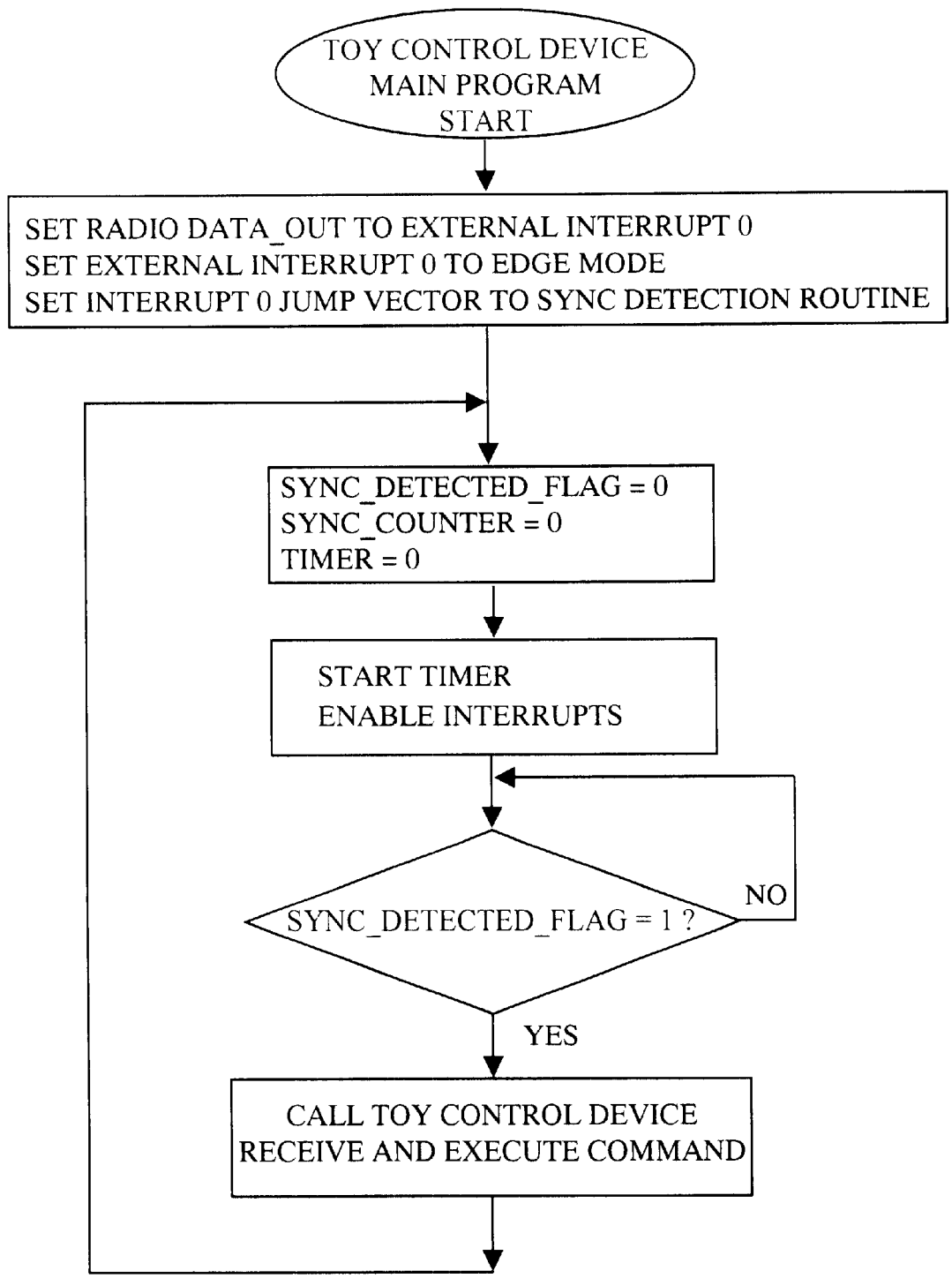
Figure 8C:
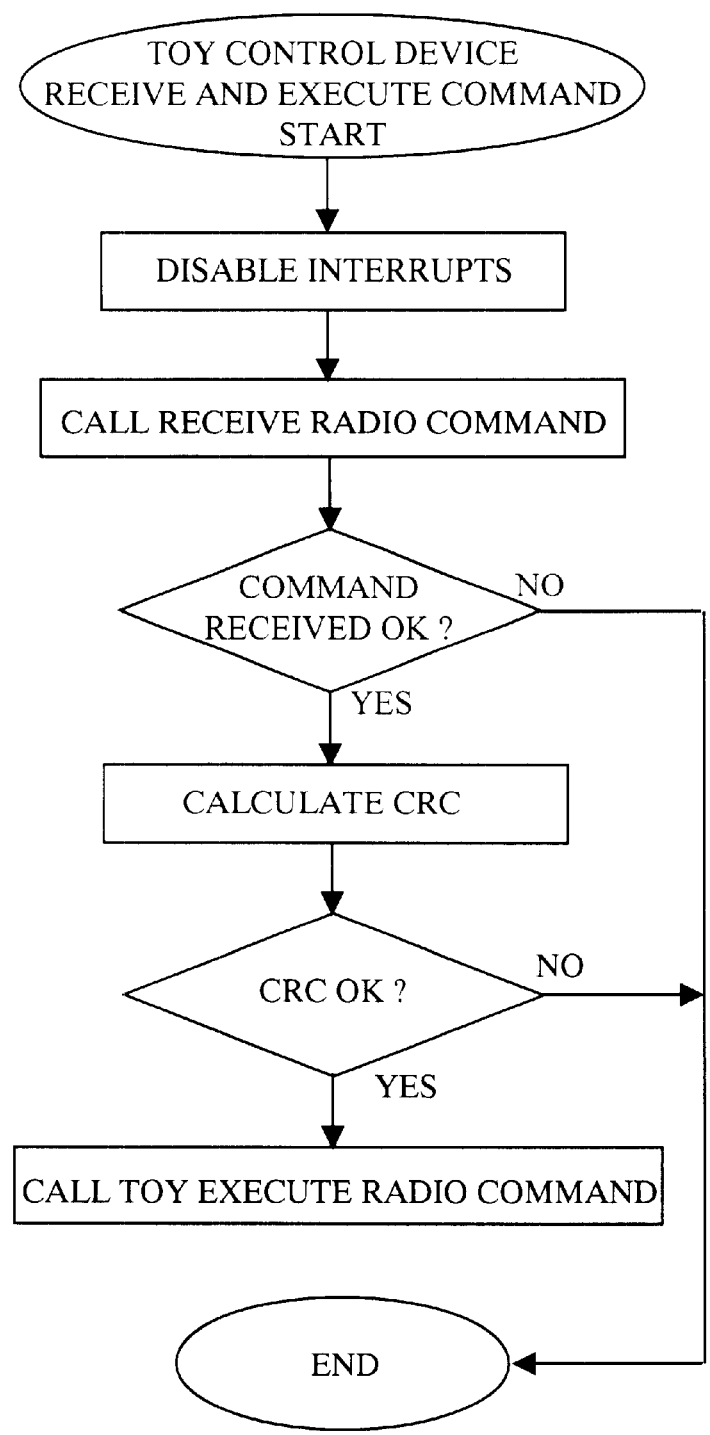
Figure 8D:
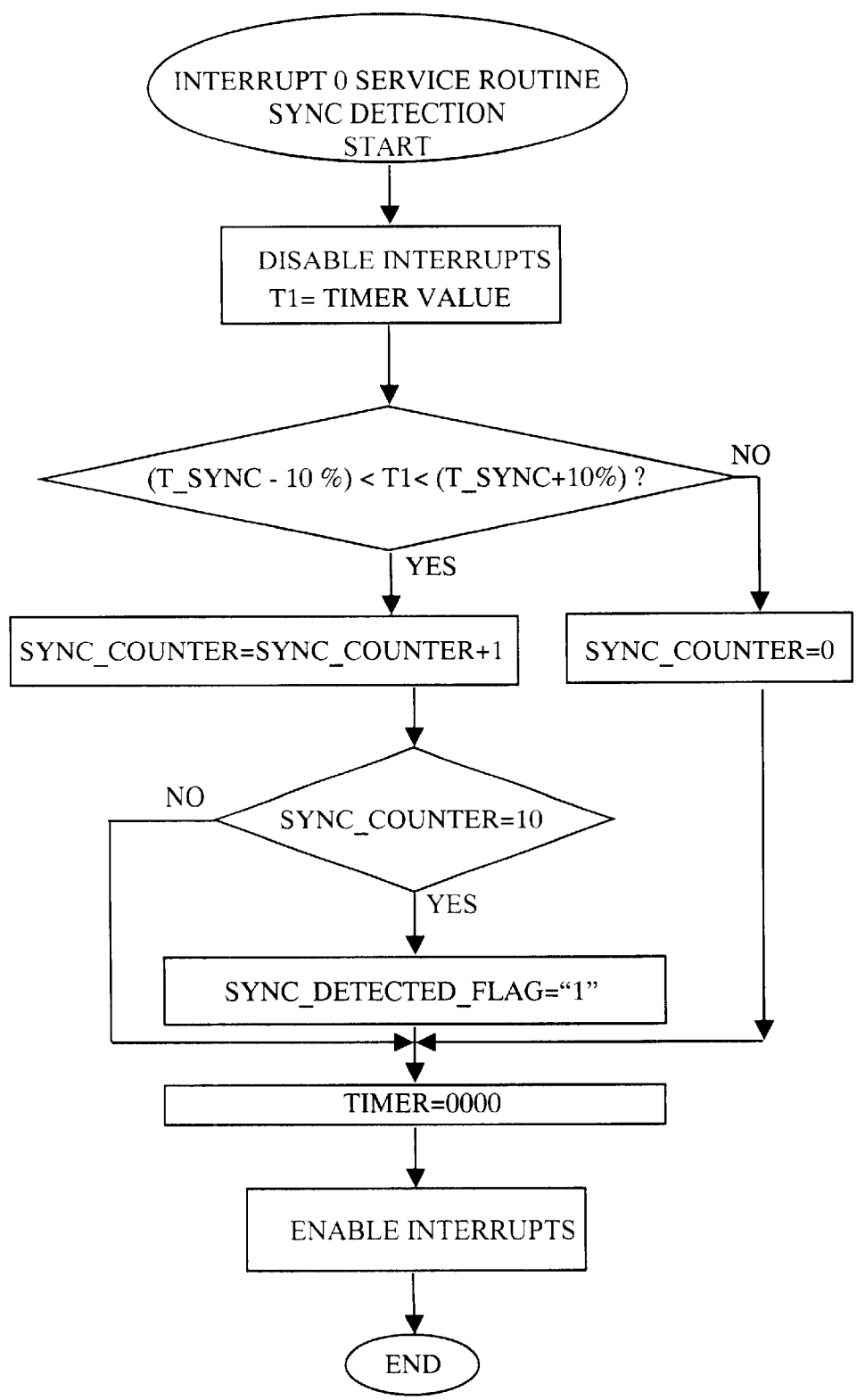
Figure 8E:
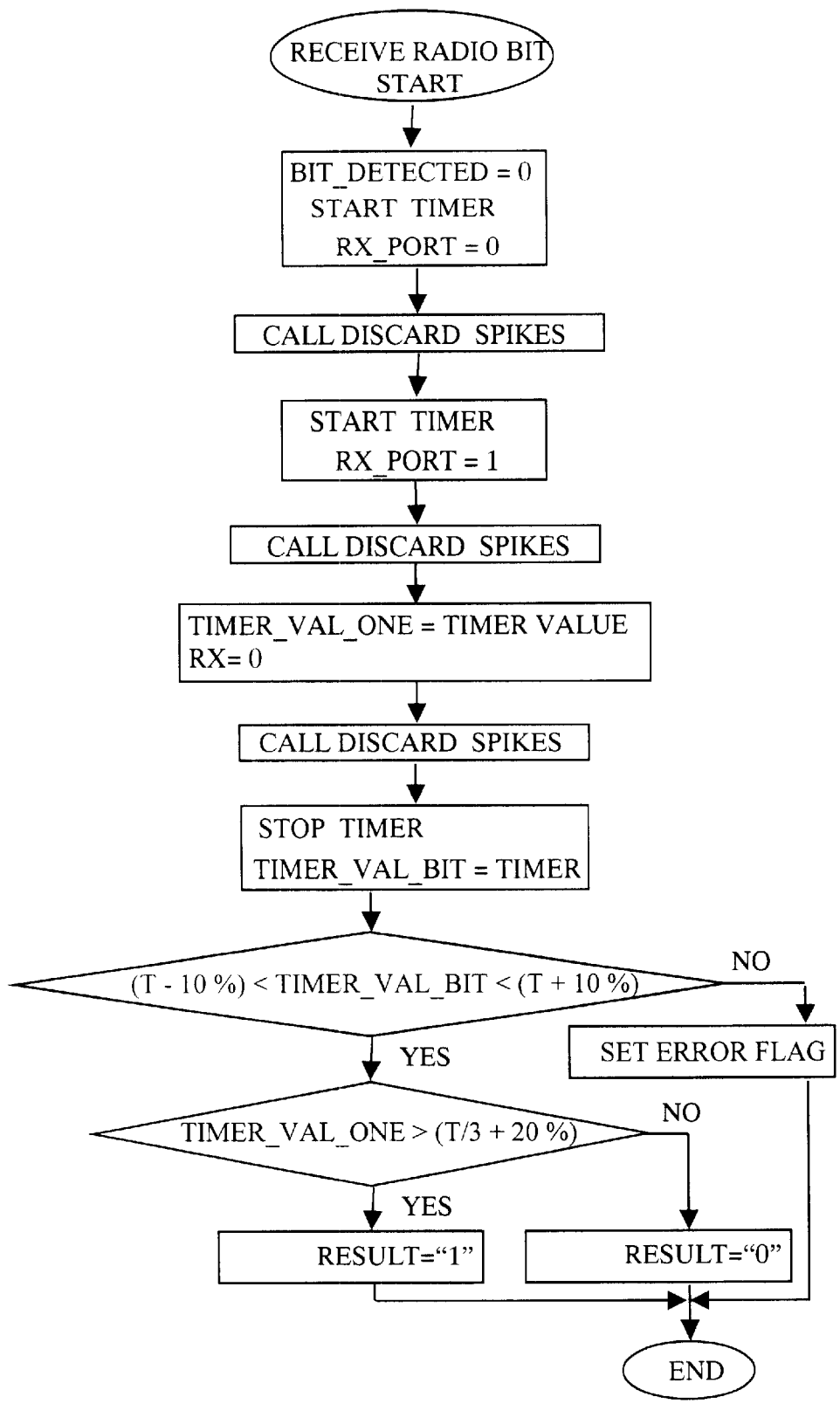
Figure 8F:
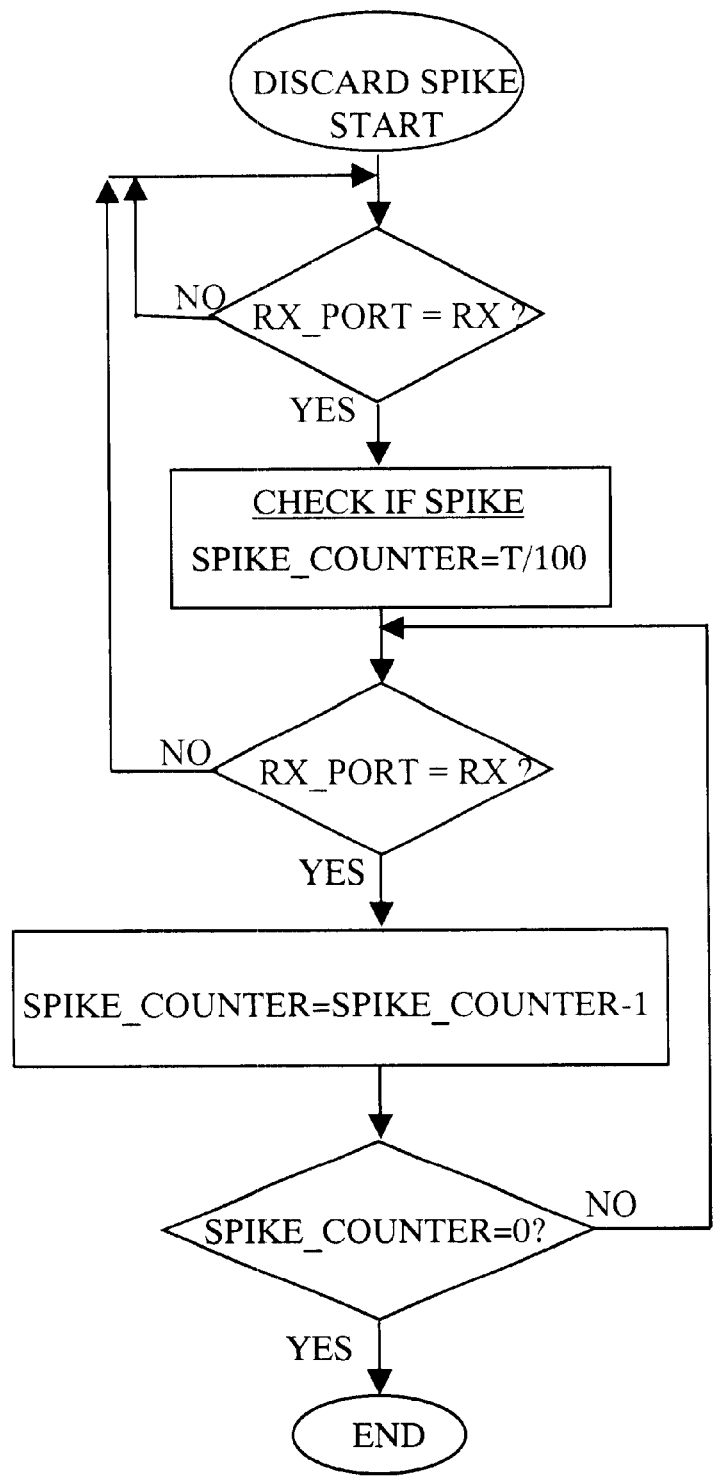
Figure 8G:
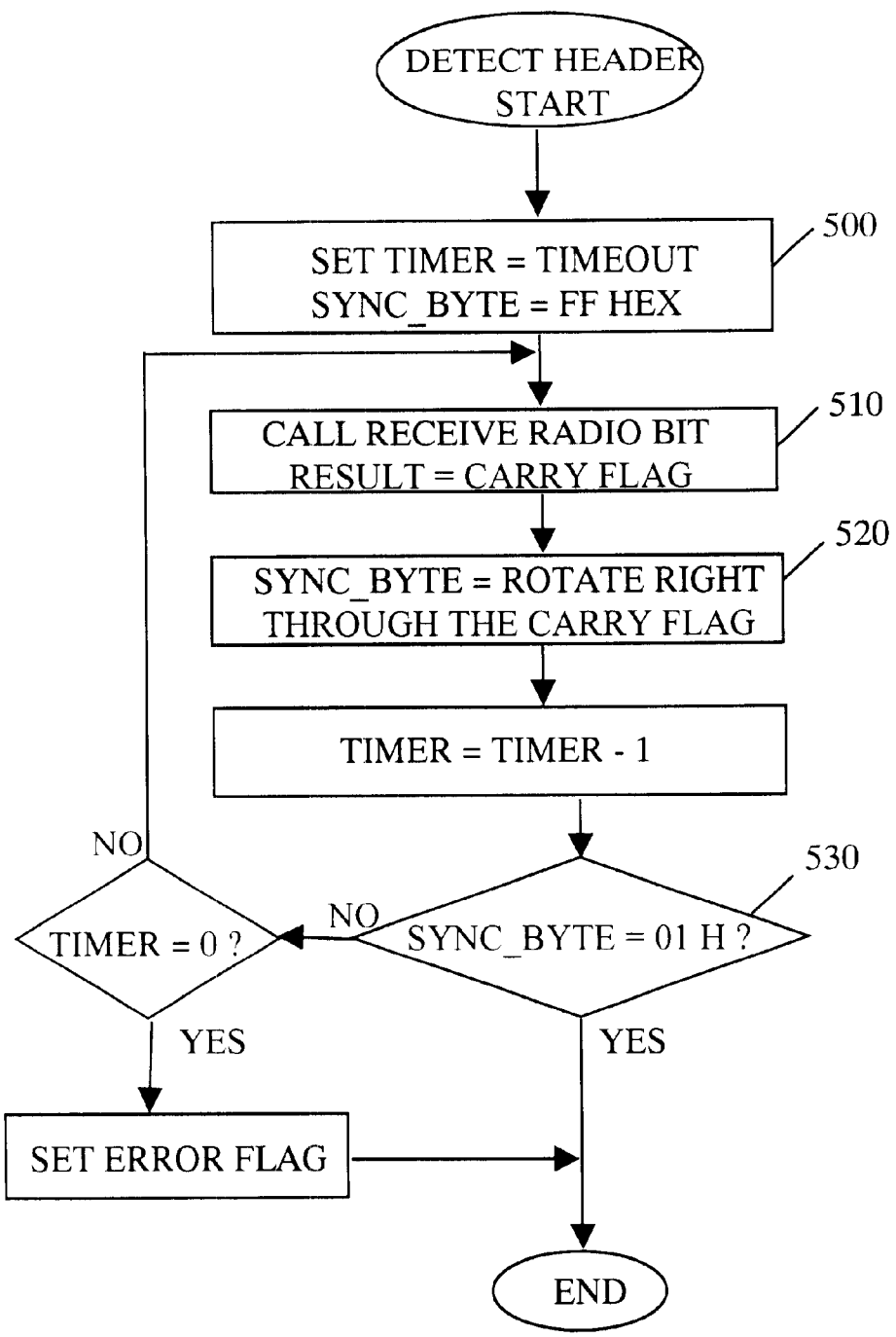
Figure 8H:
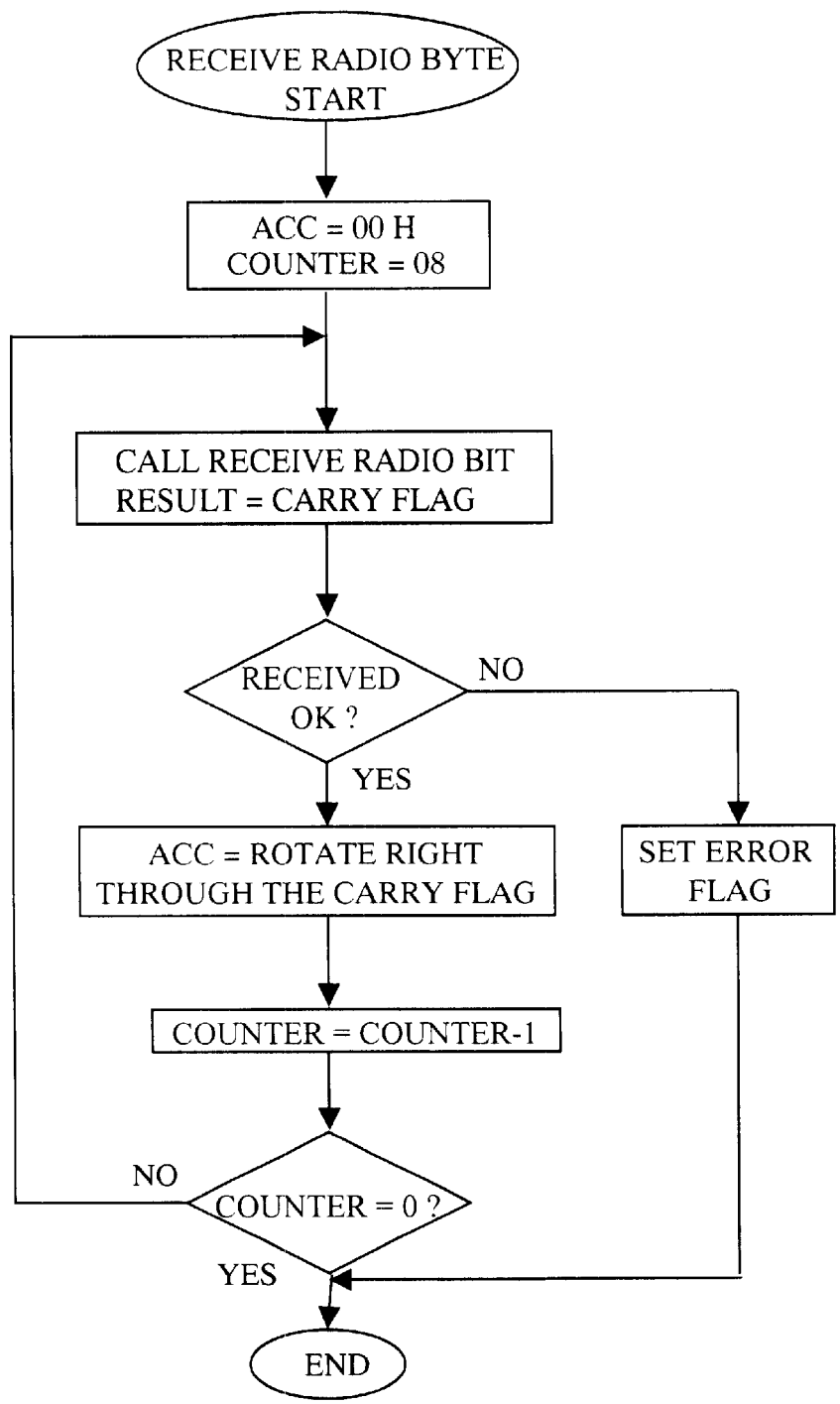
Figure 8I:
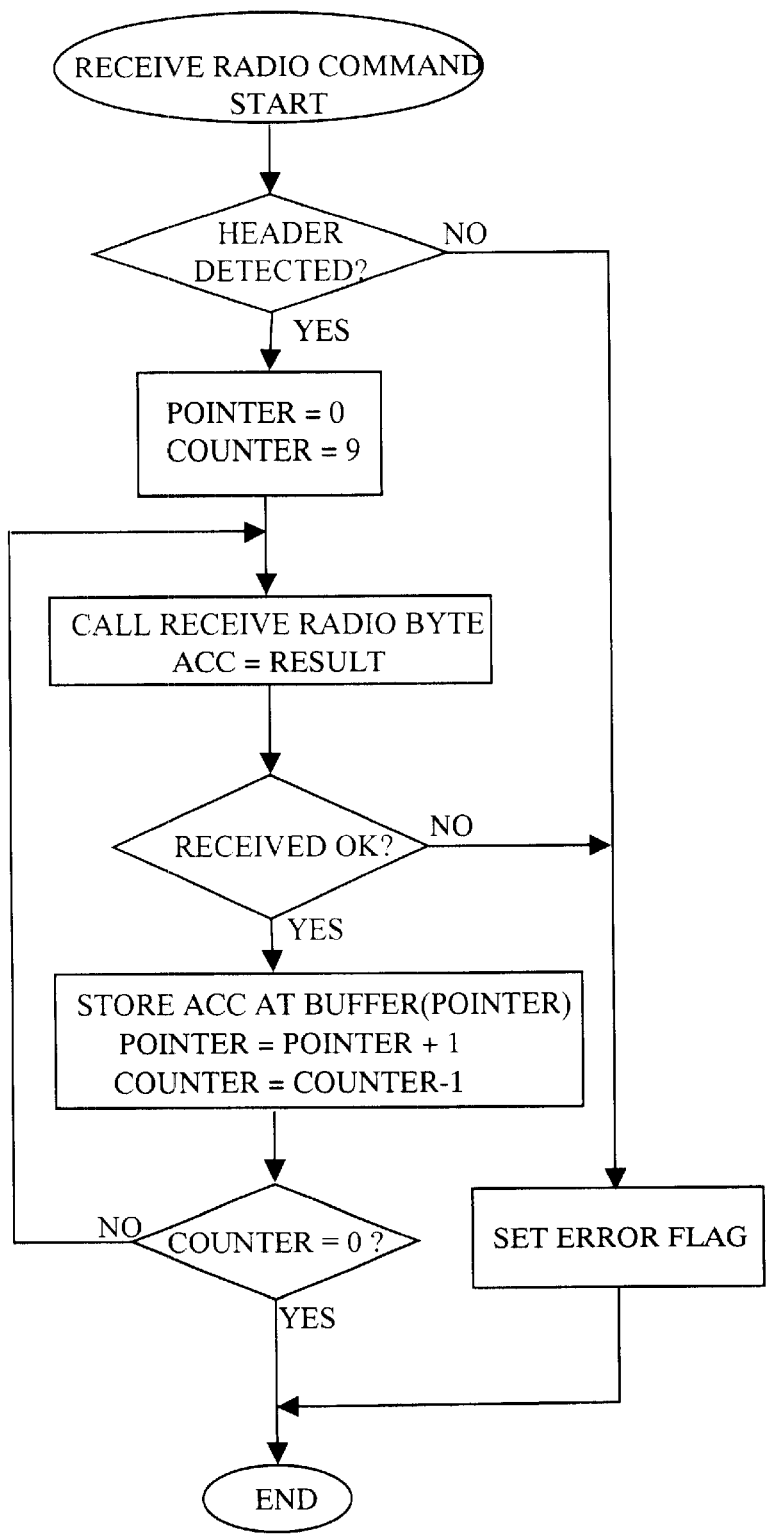
Figure 8J:
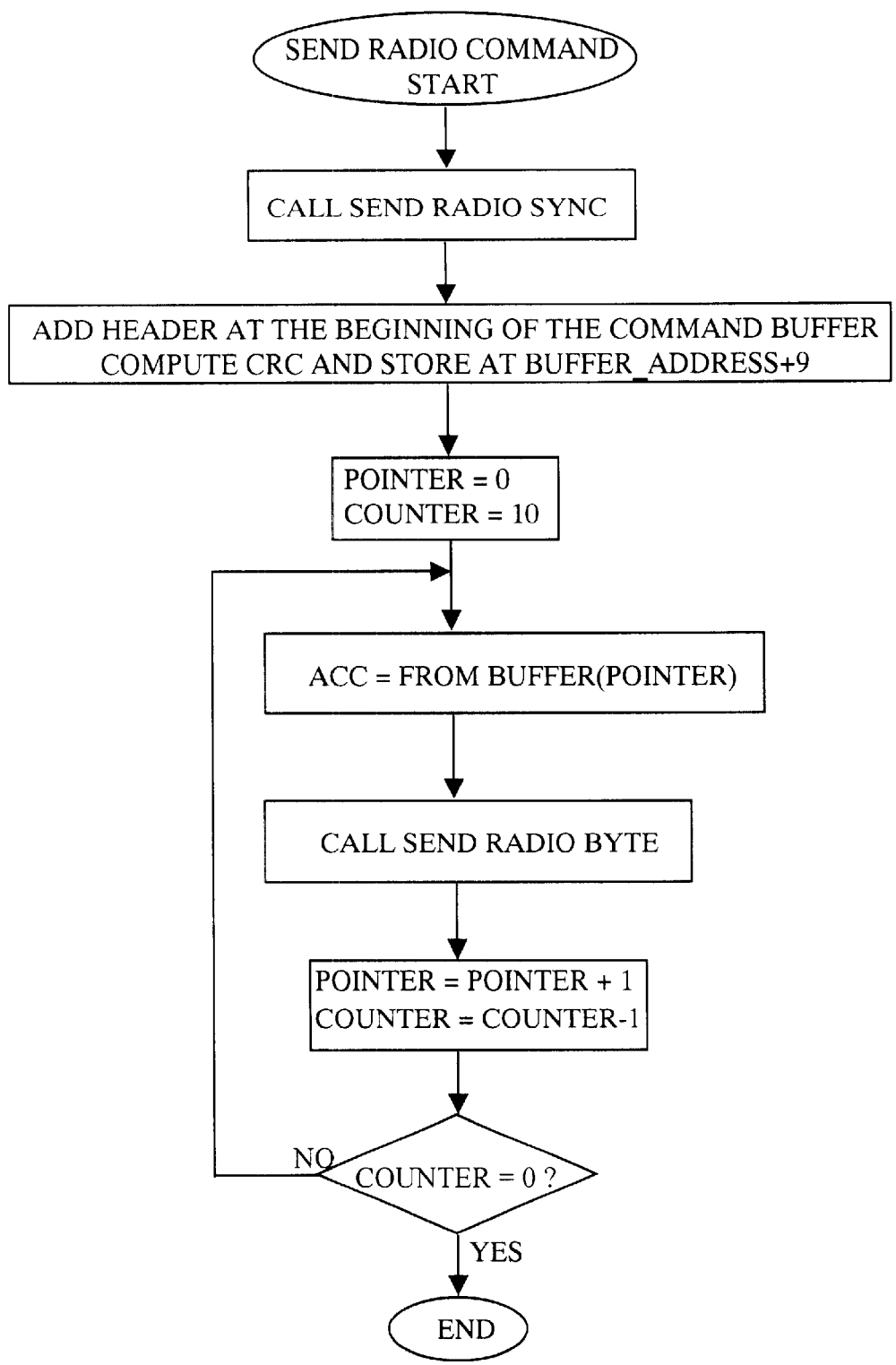
Figure 8K:
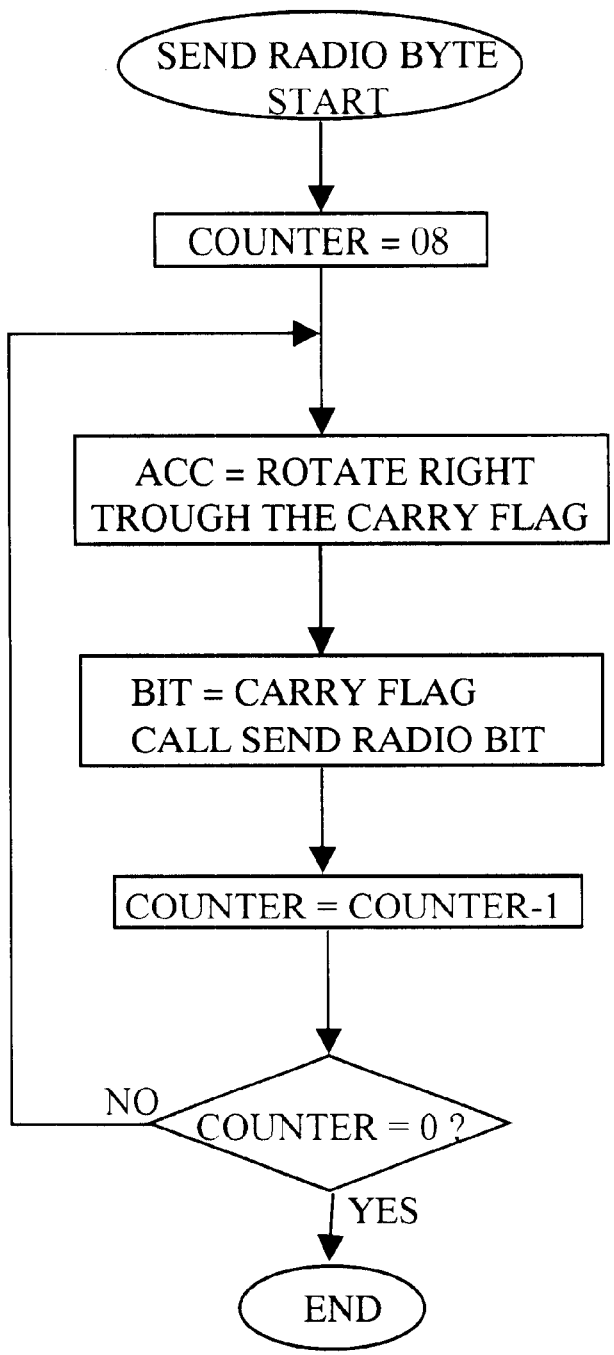
Figure 8L:
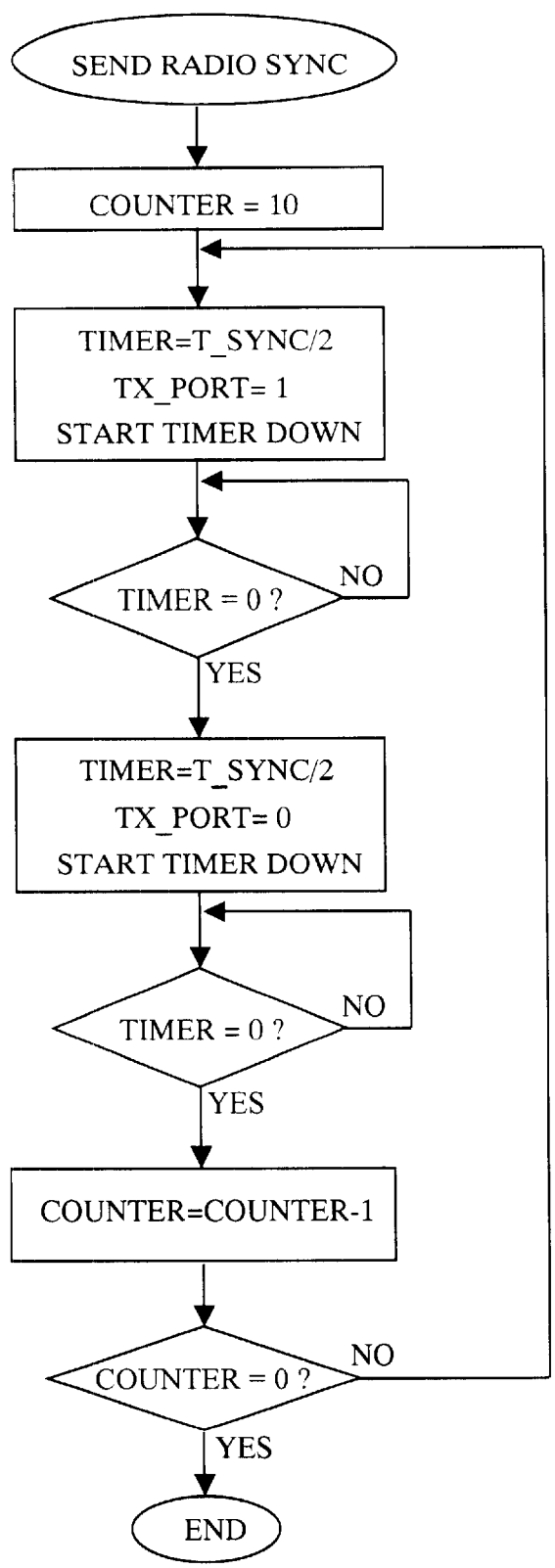
Figure 8M:
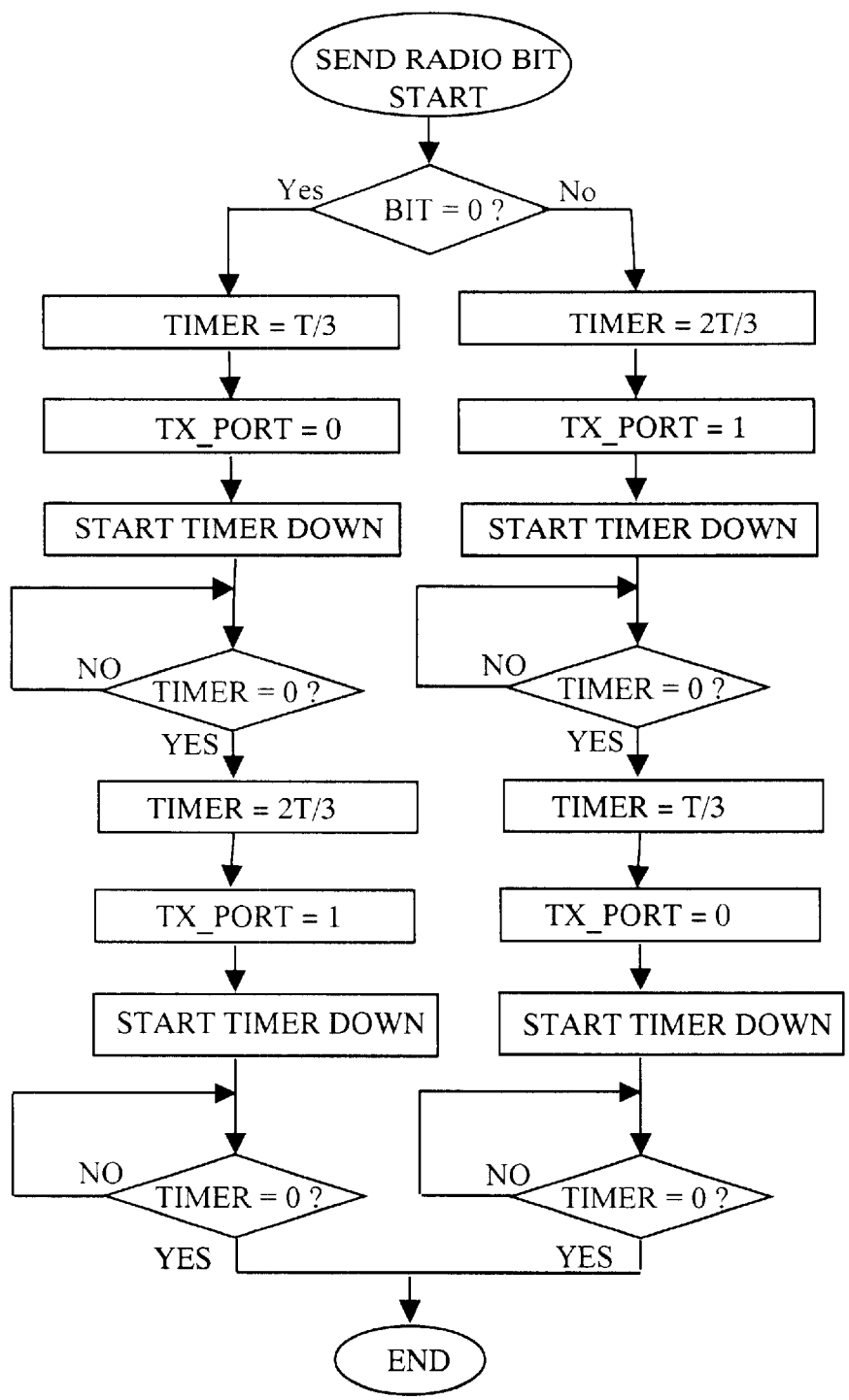
Figure 8N:
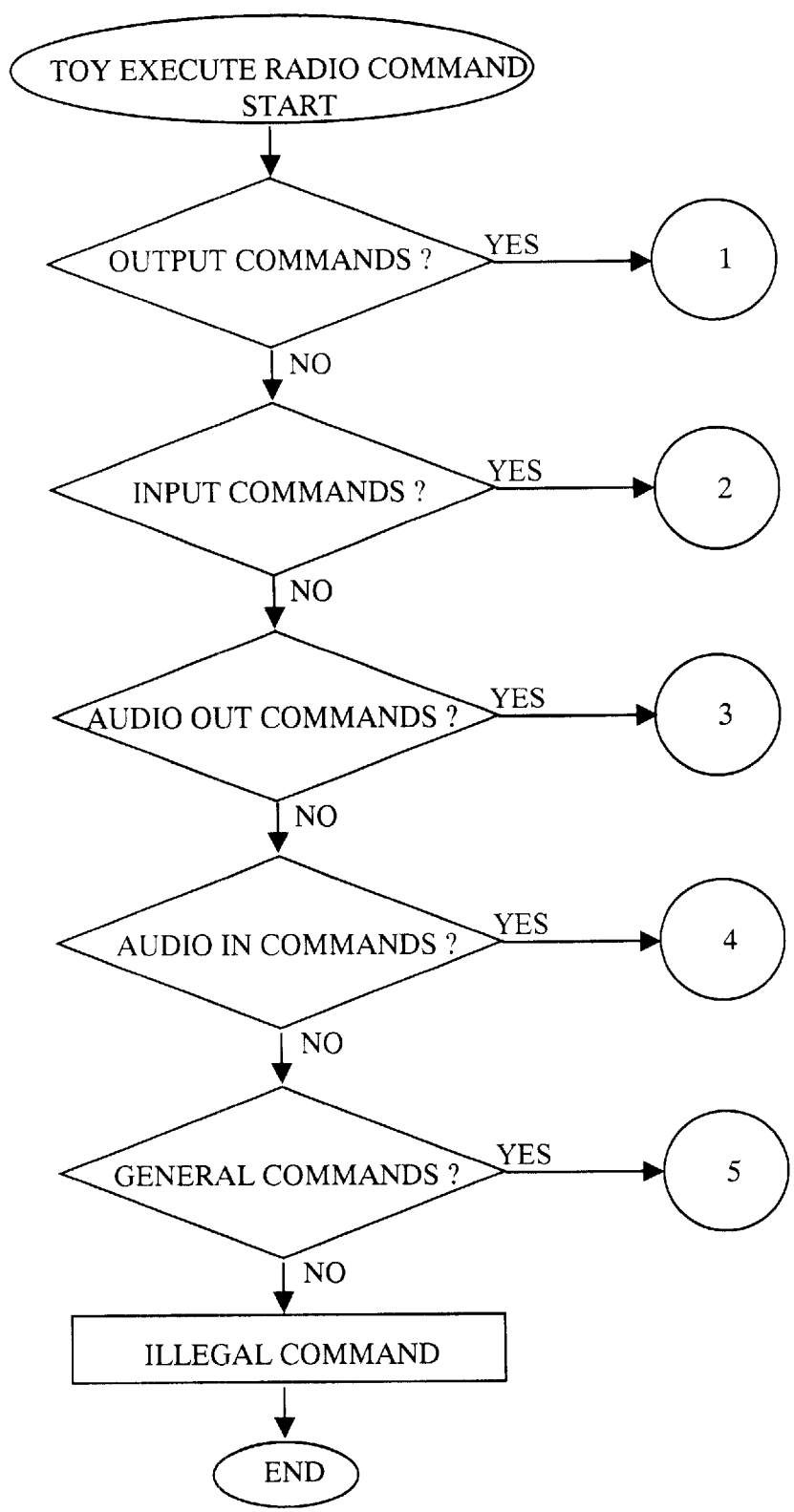
Figure 8O:
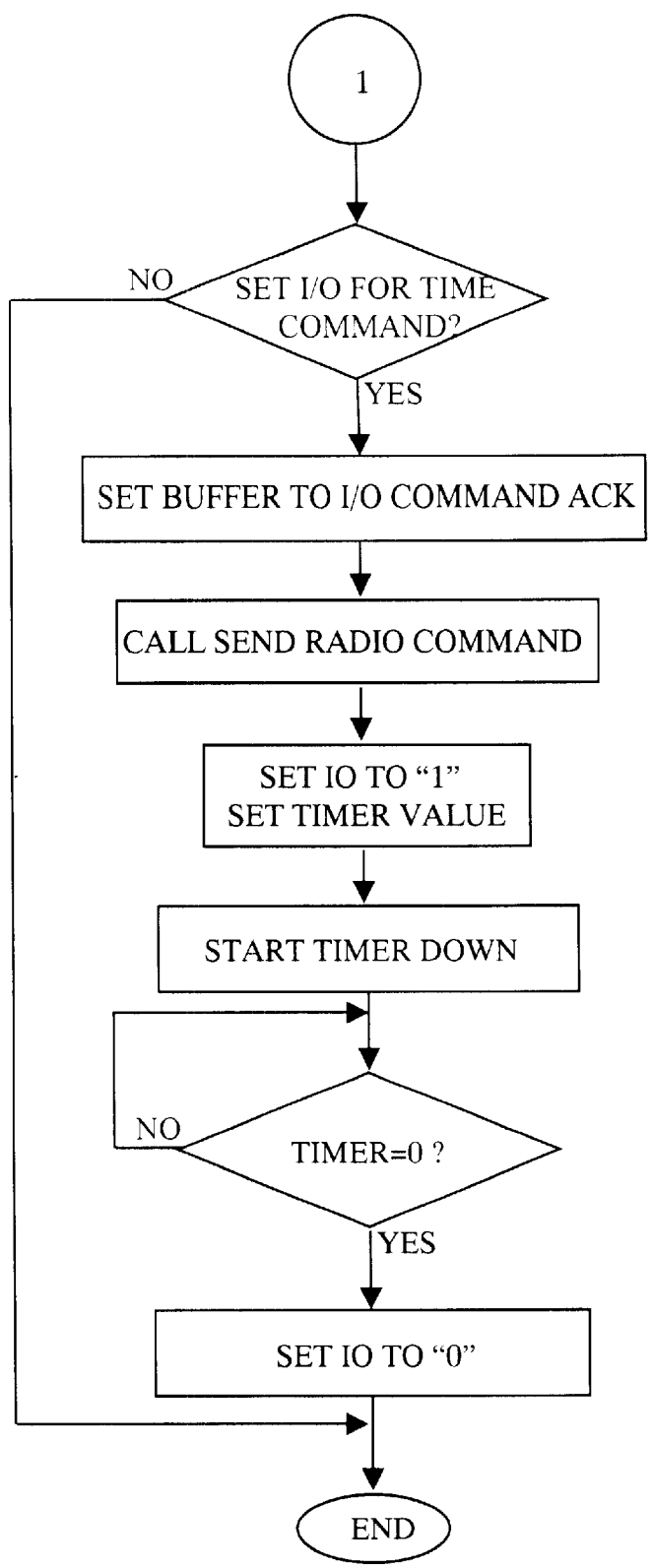
Figure 8P:
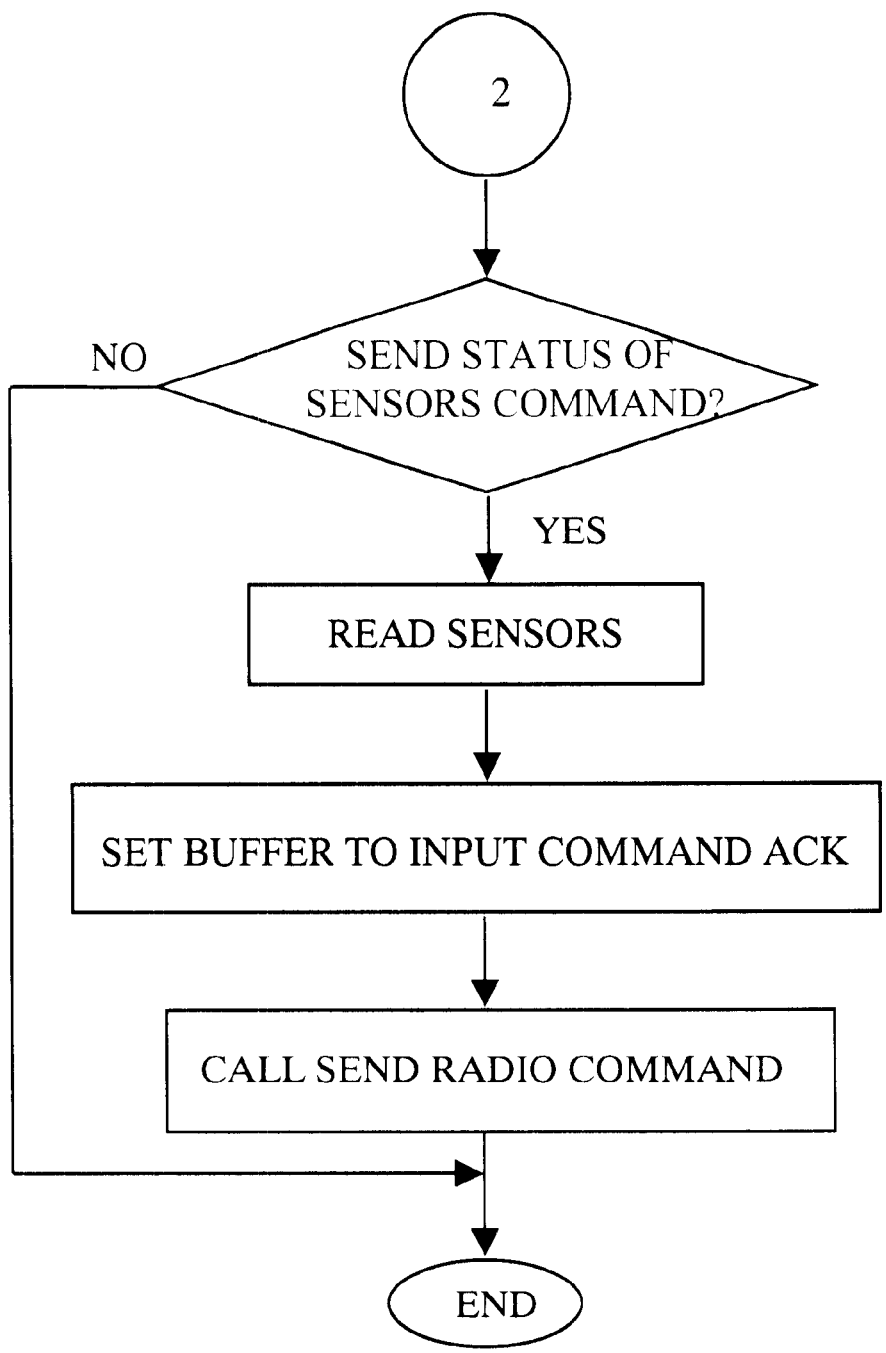
Figure 8Q:
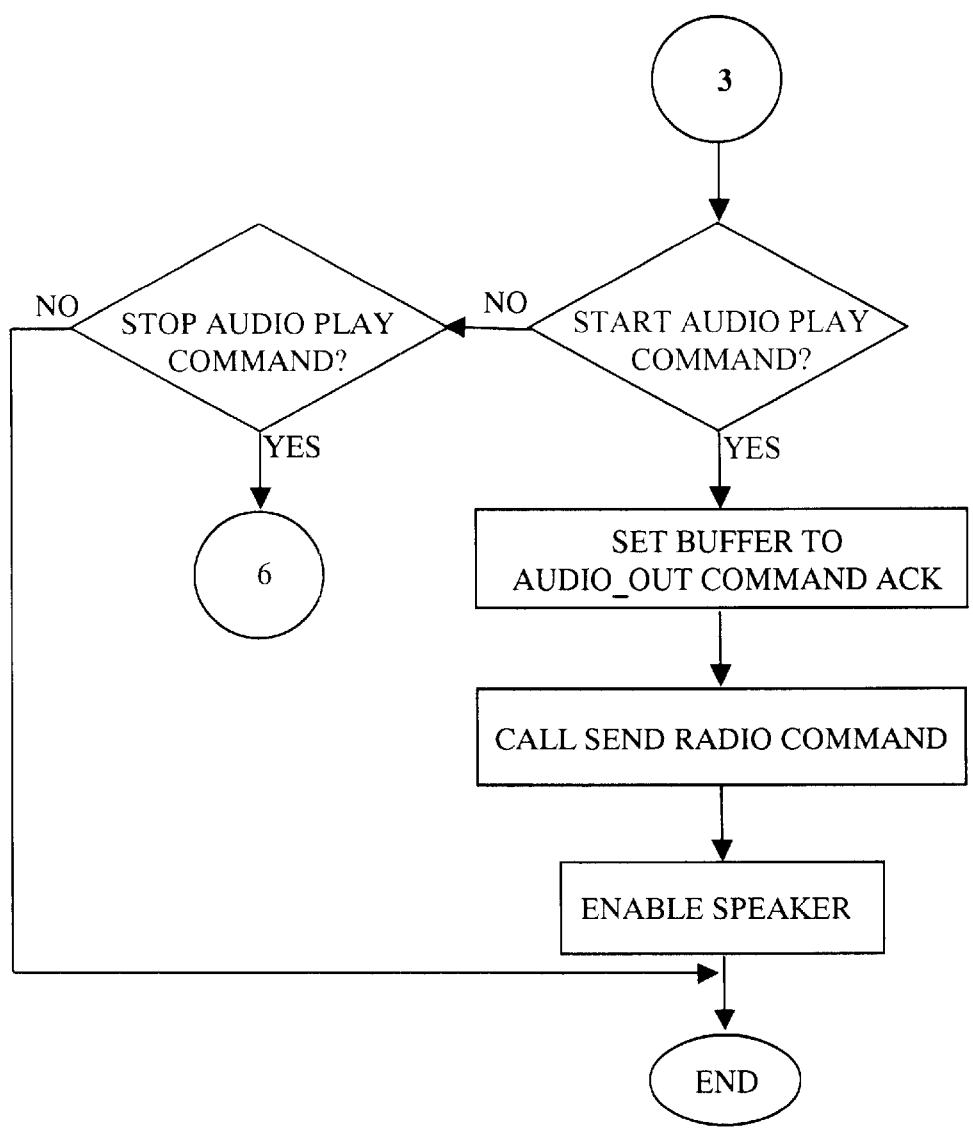
Figure 8R:
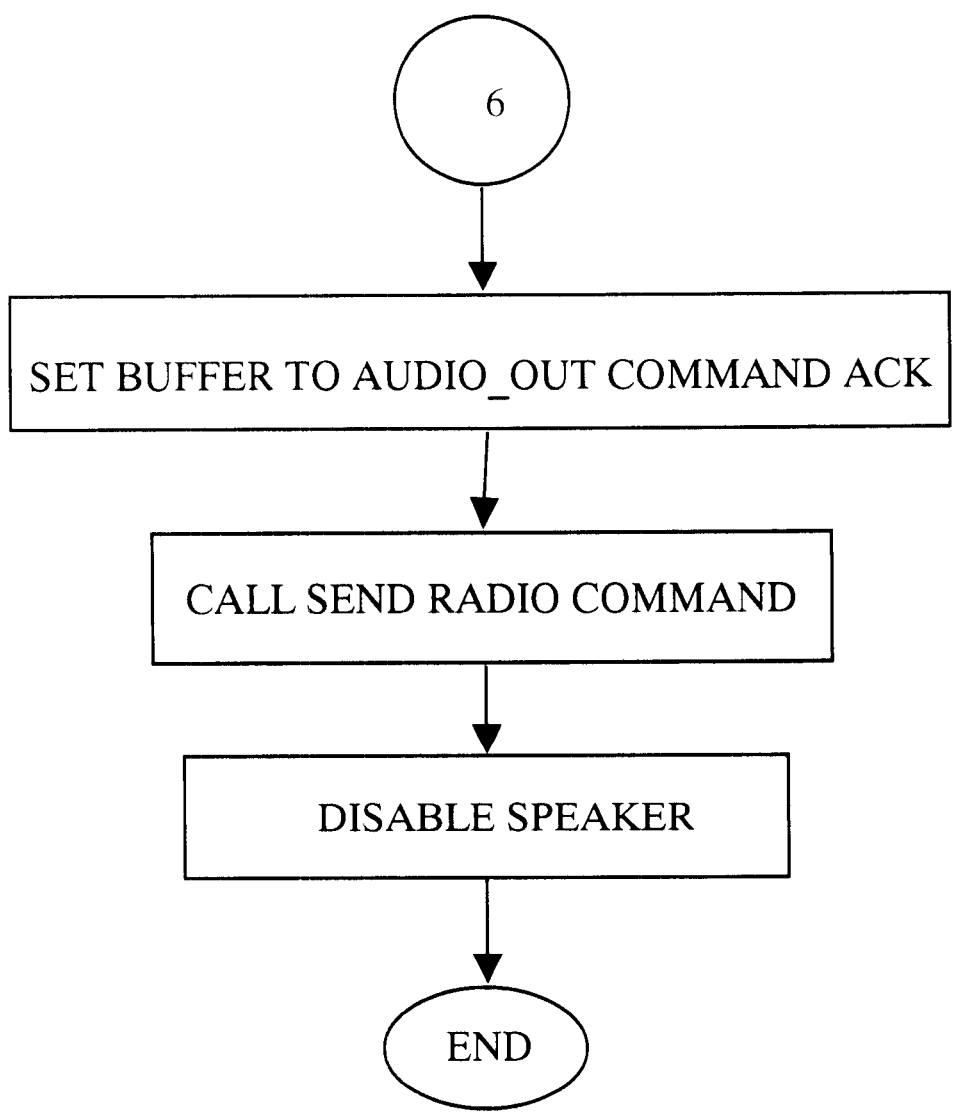
Figure 8S:
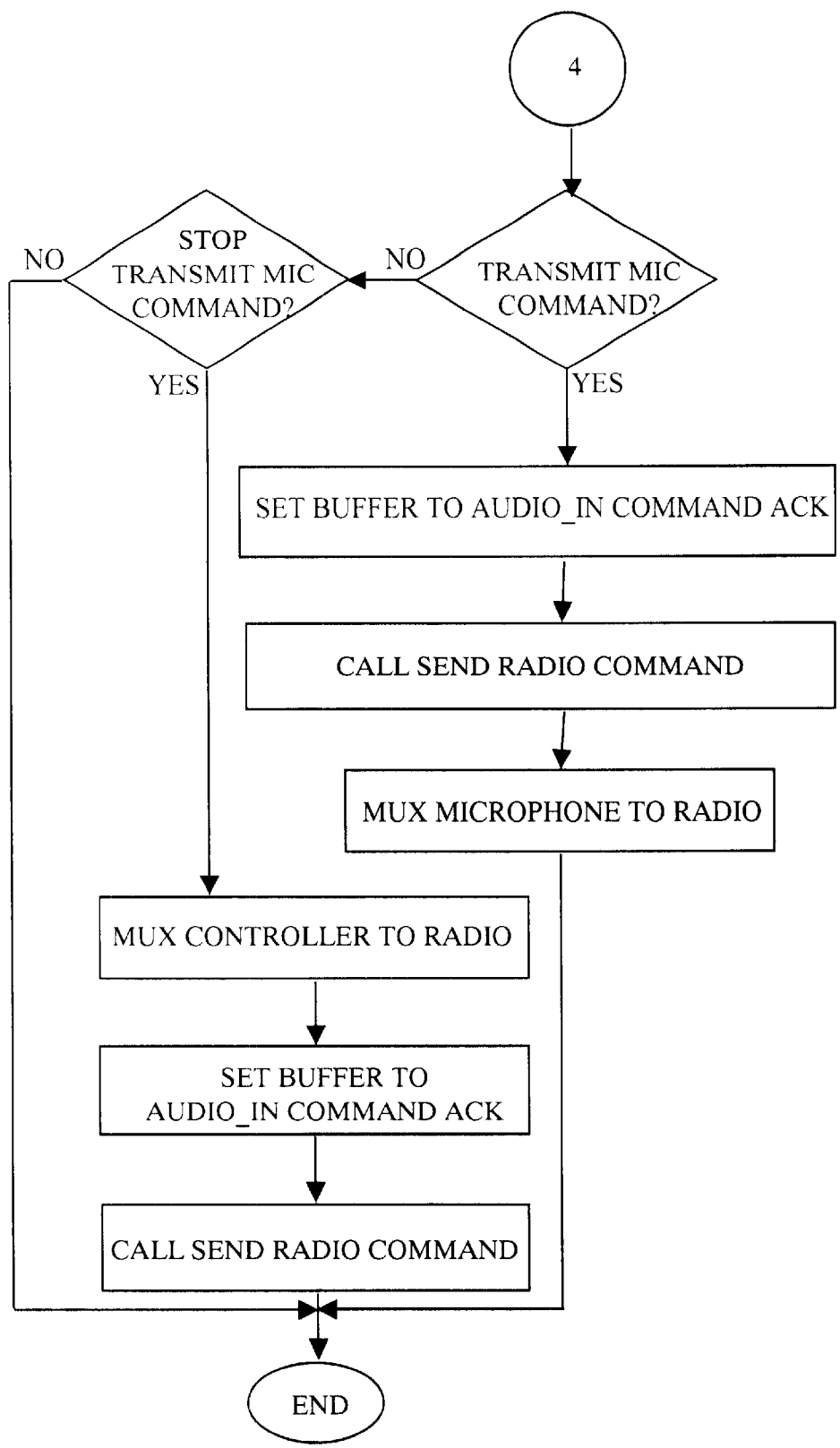
Figure 8T:
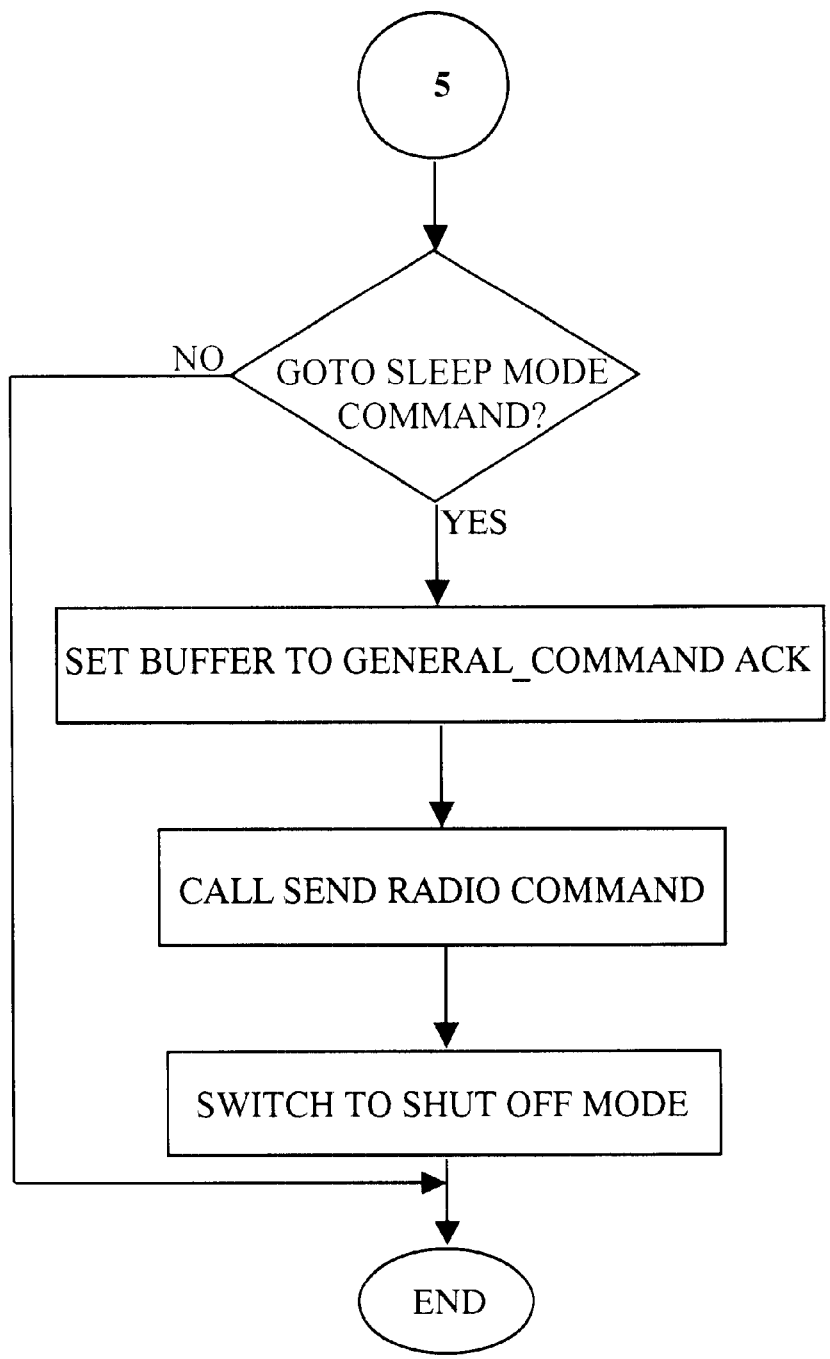
Figure 9A:
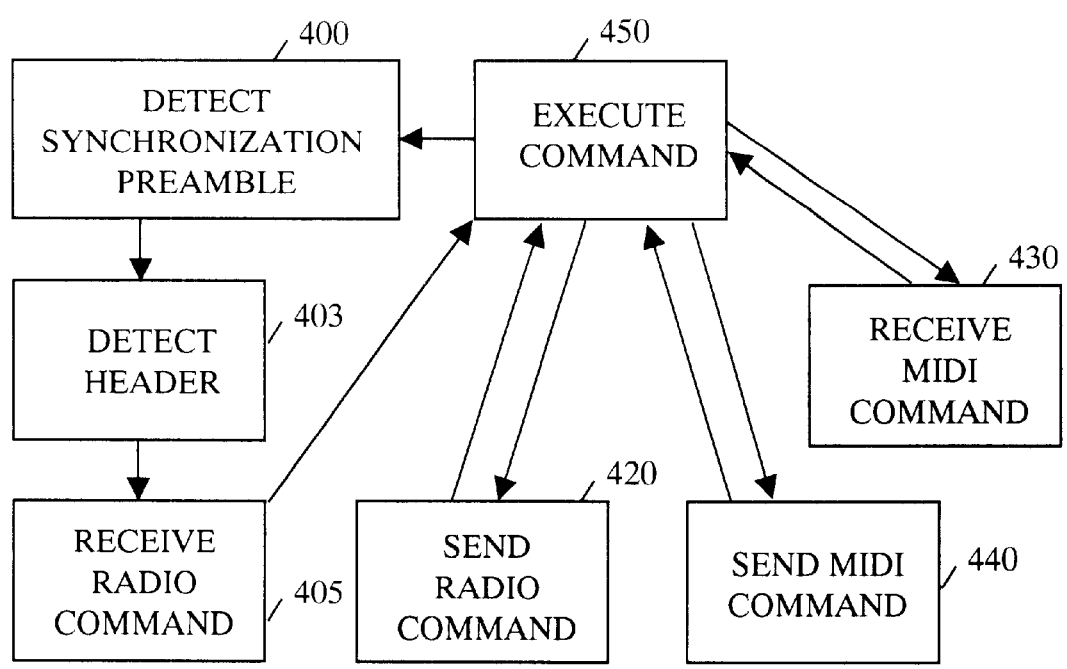
Figure 9B:
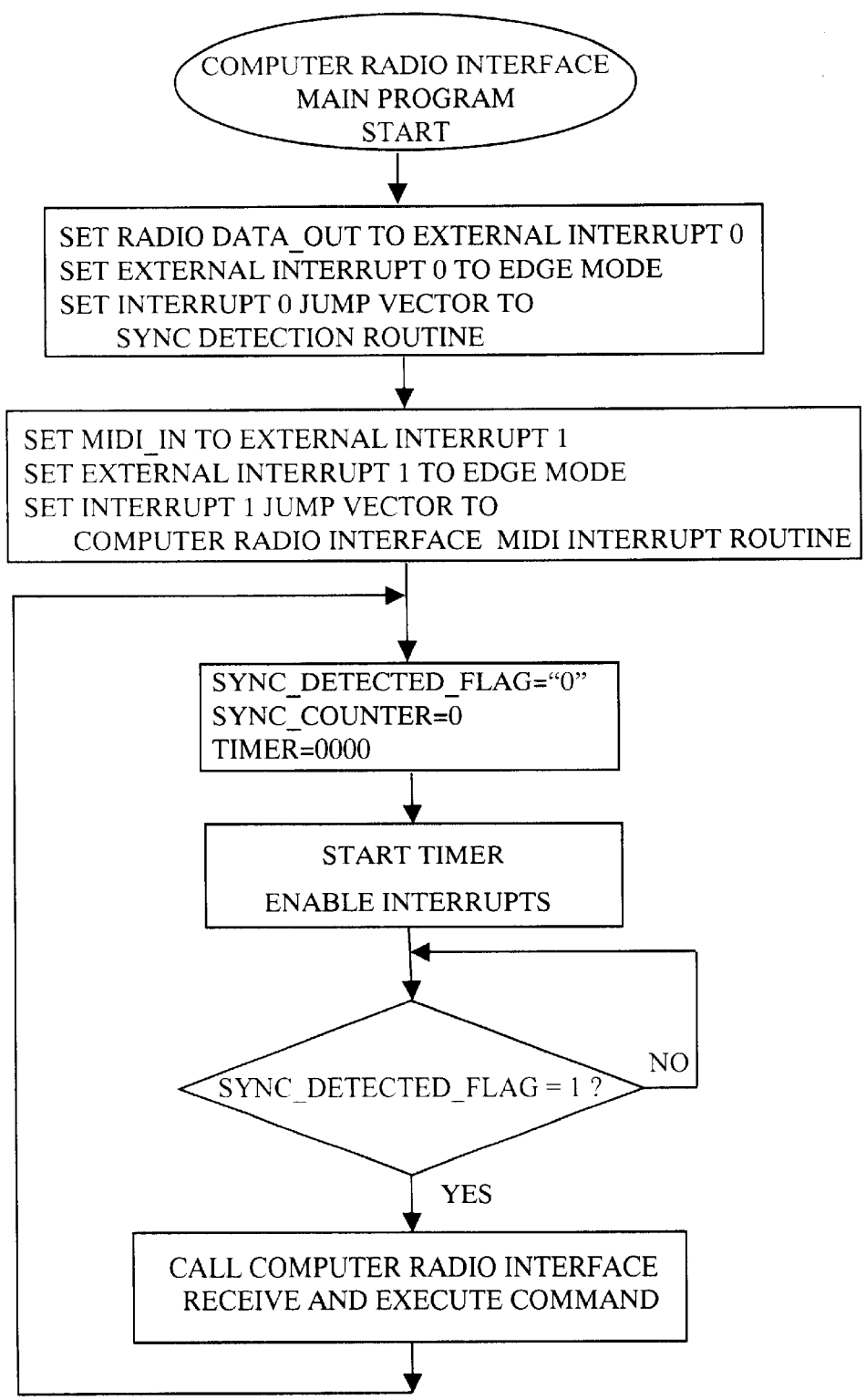
Figure 9C:
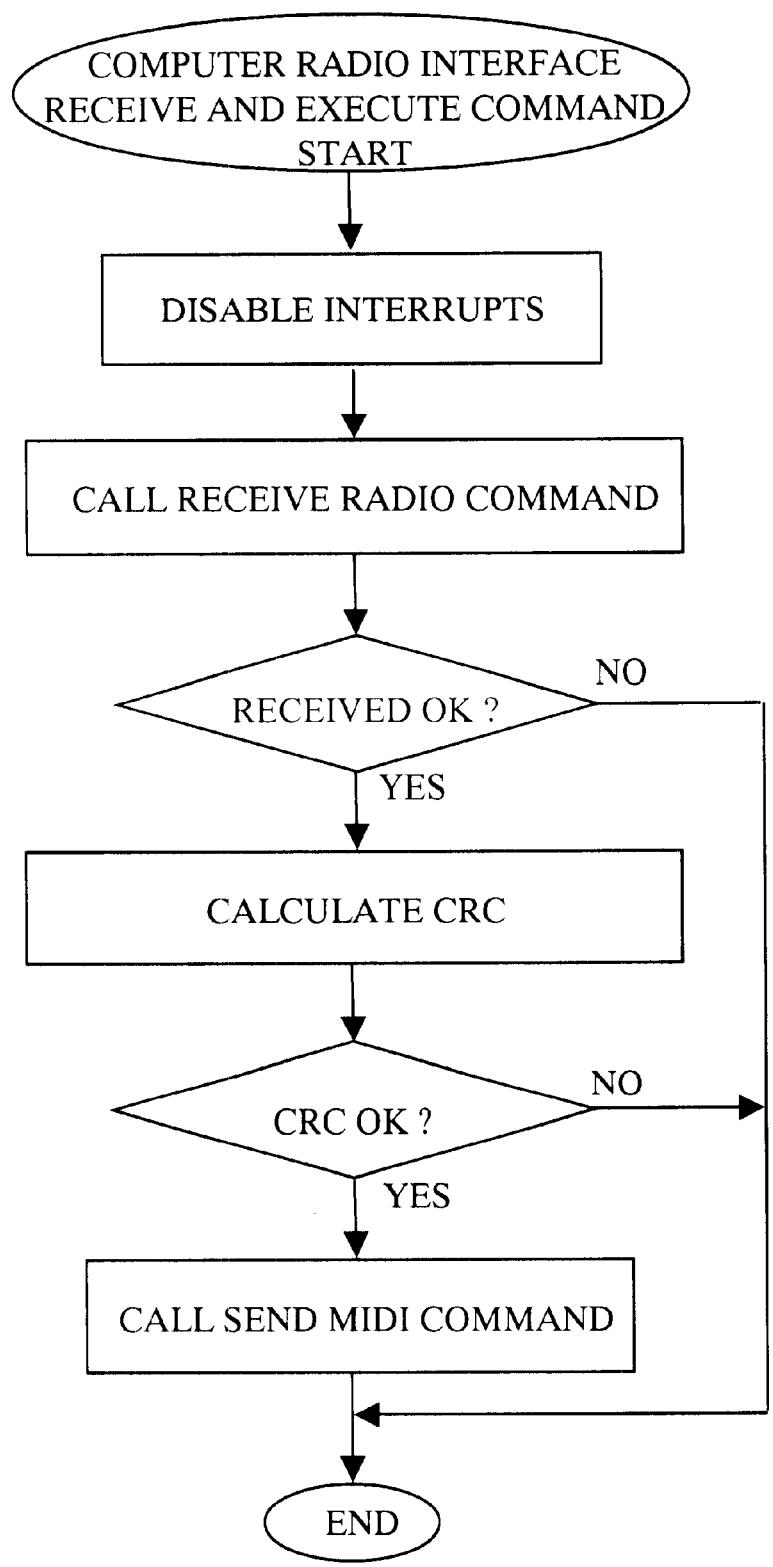
Figure 9D:
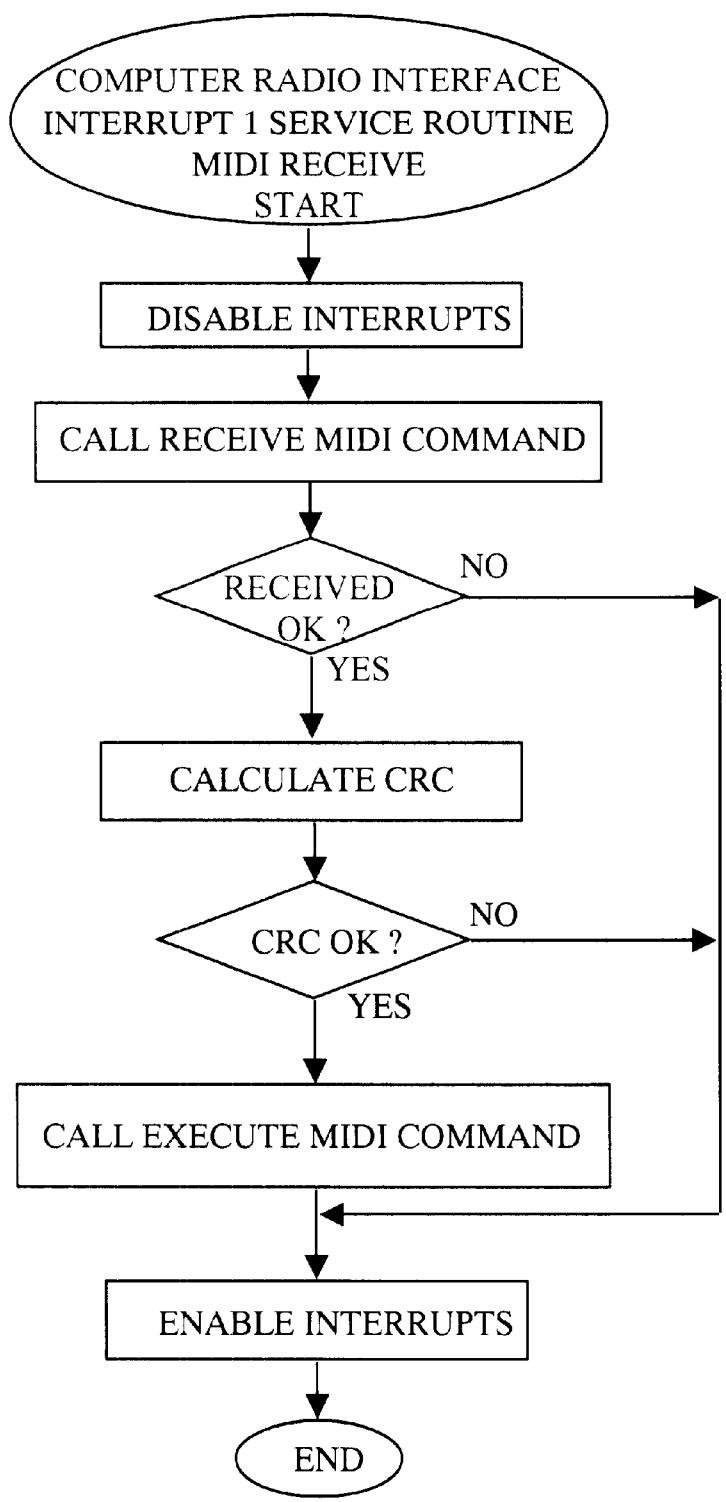
Figure 9E:
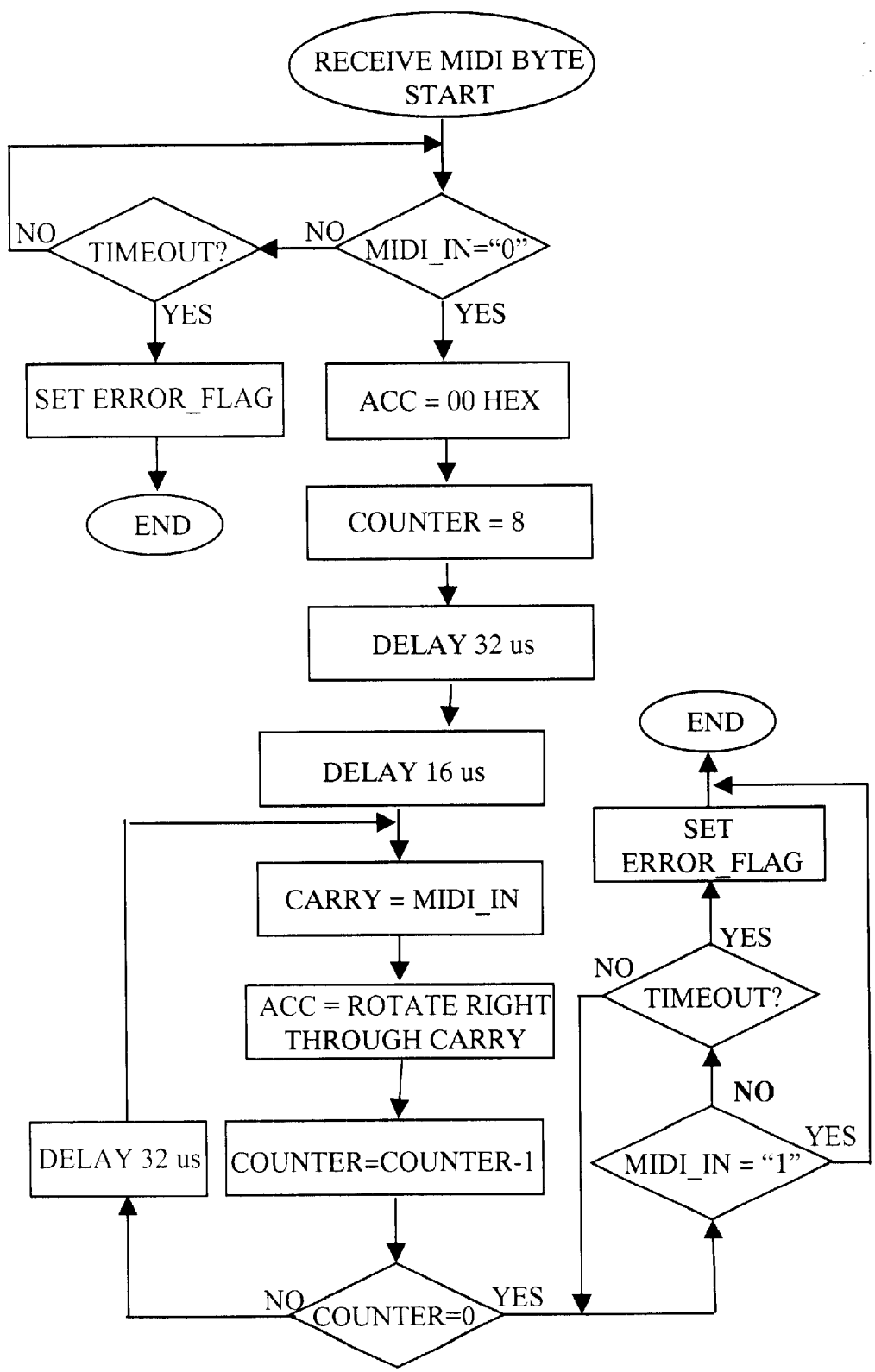
Figure 9F:
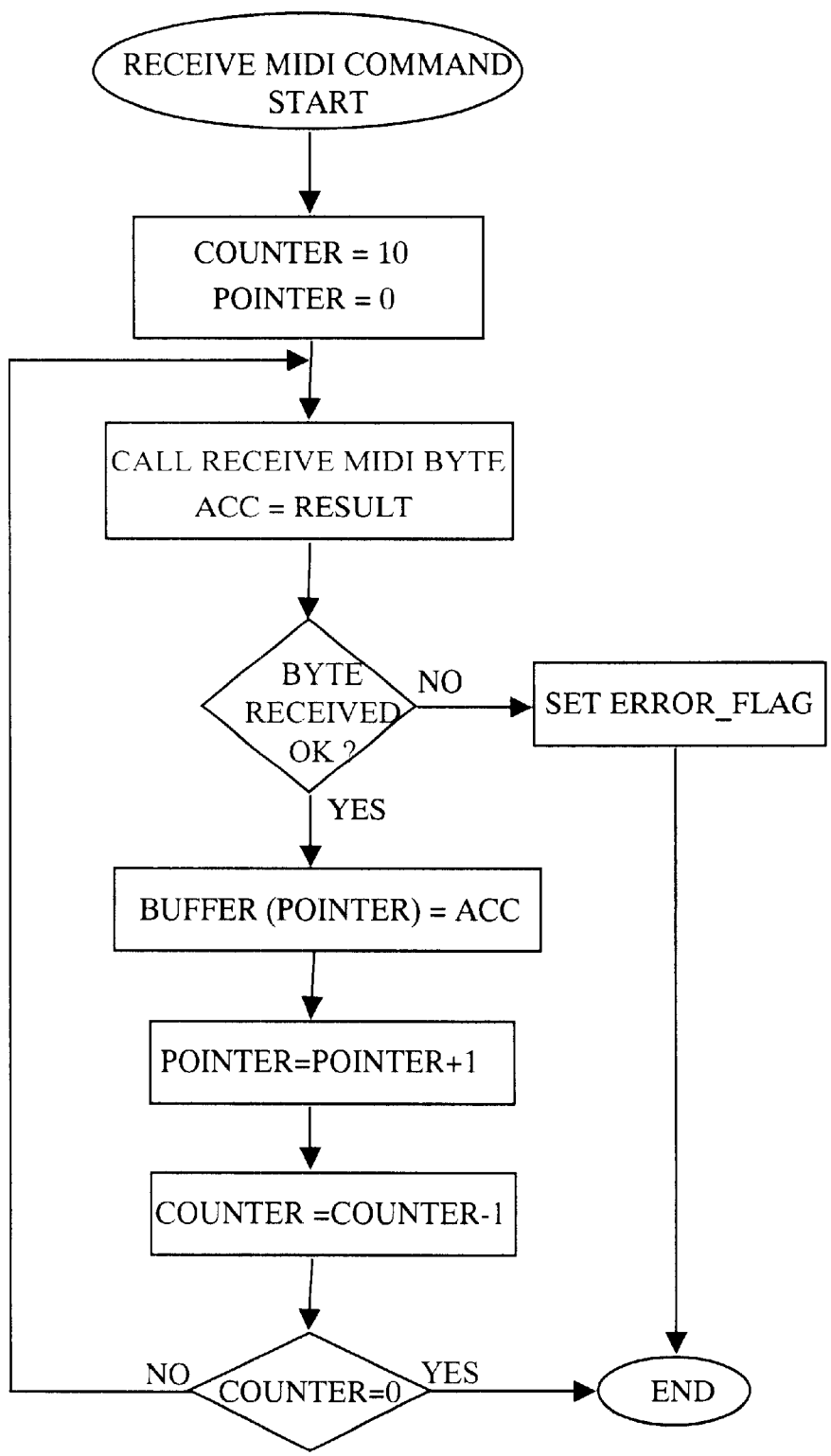
Figure 9G:
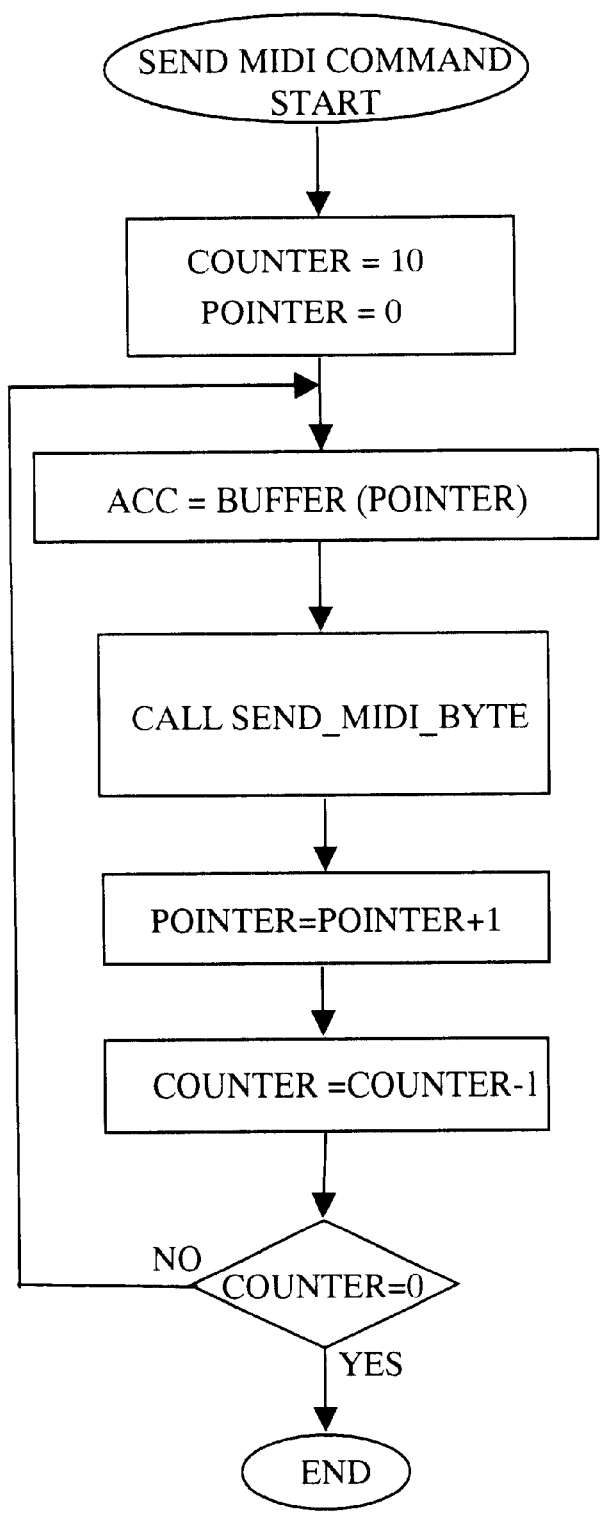
Figure 9H:
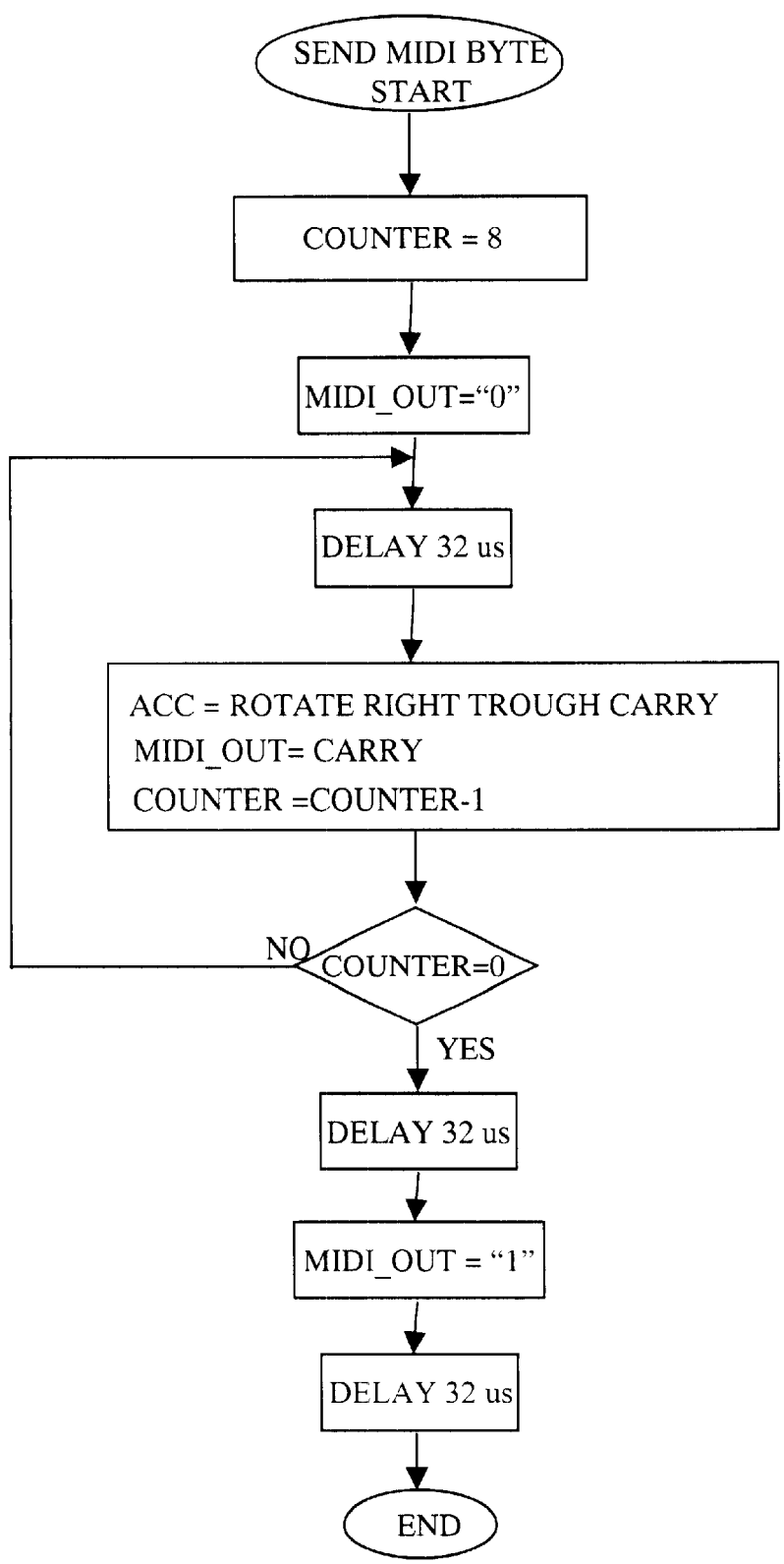
Figure 9I:
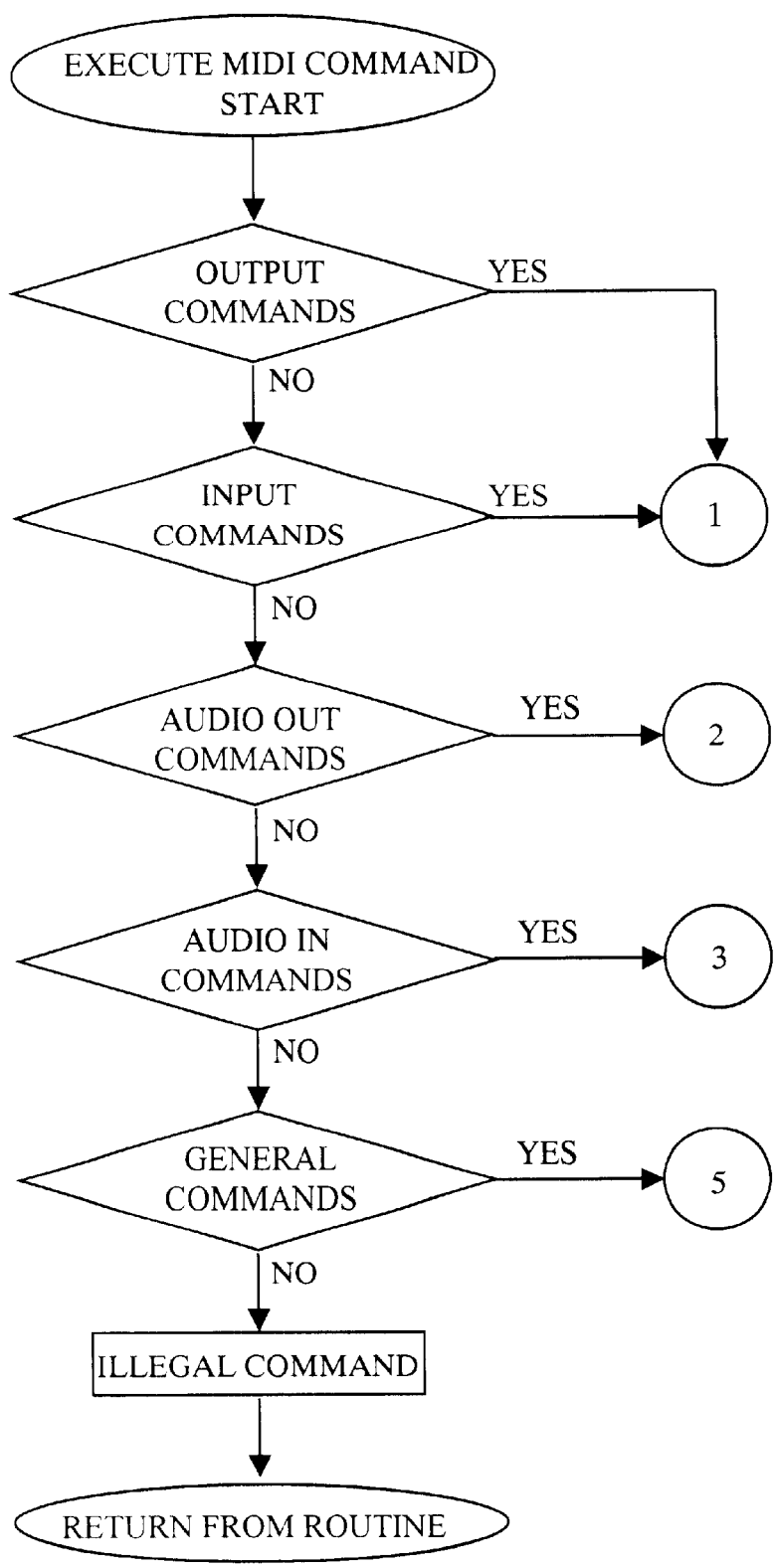
Figure 9J:
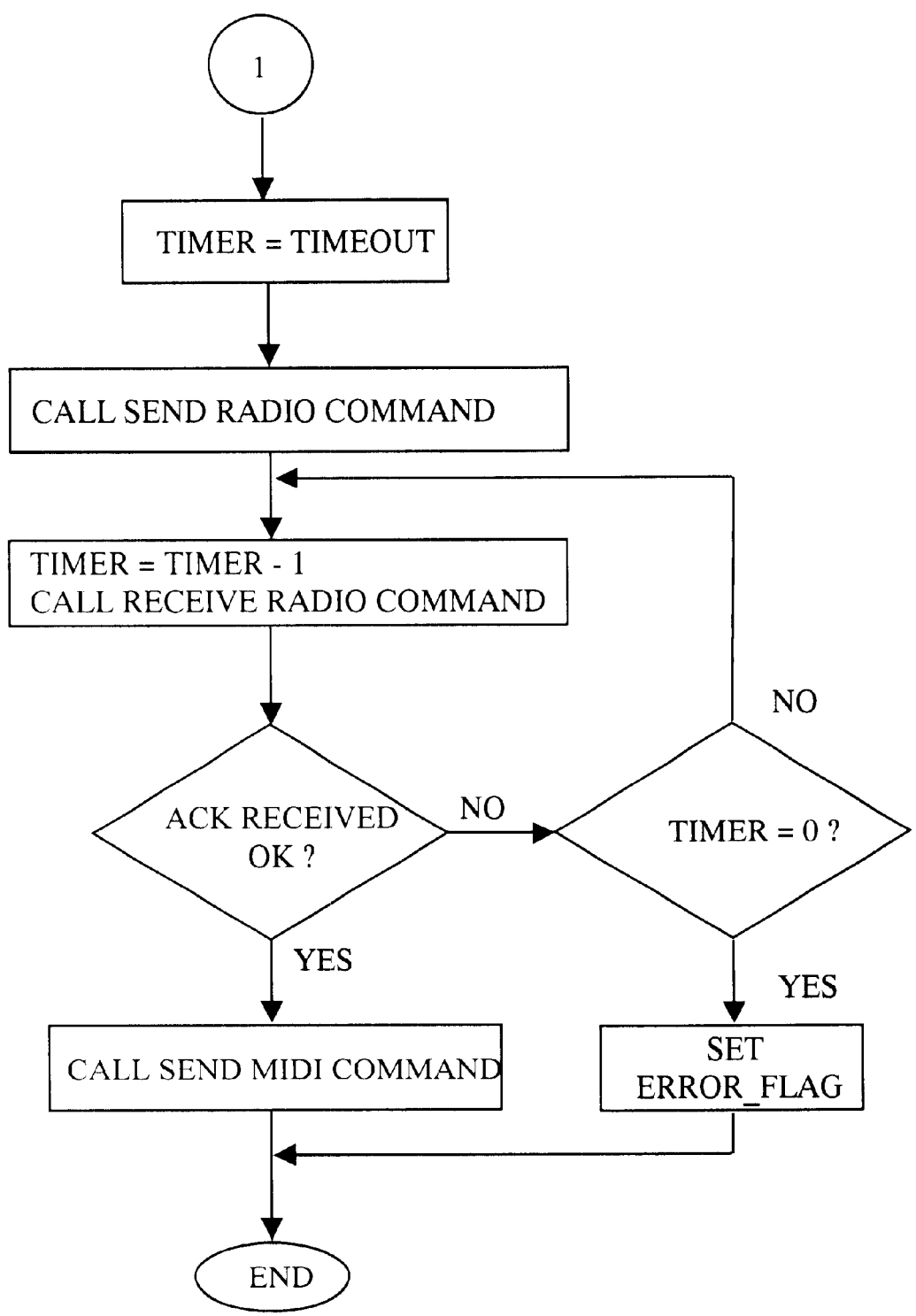
Figure 9K:
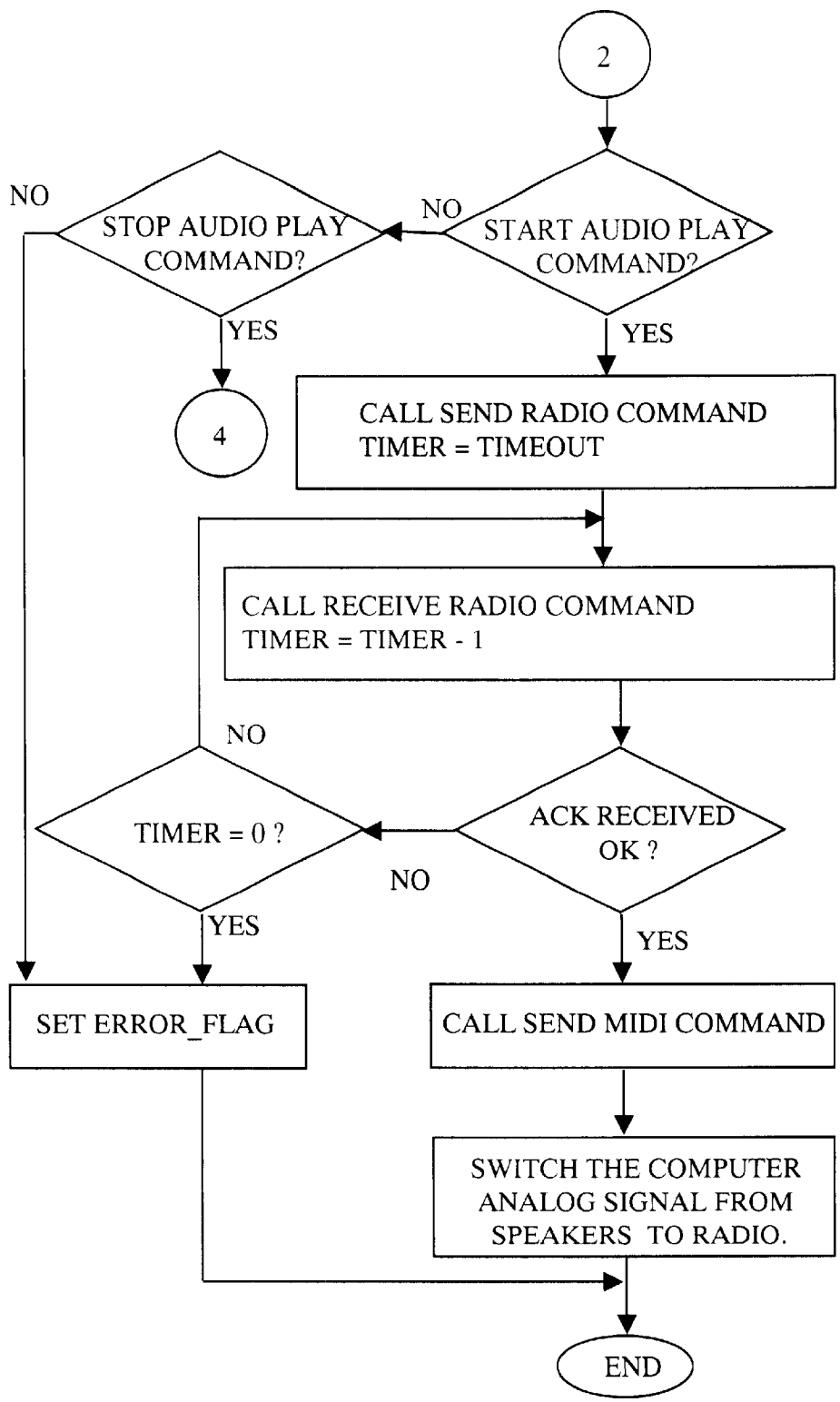
Figure 9L:
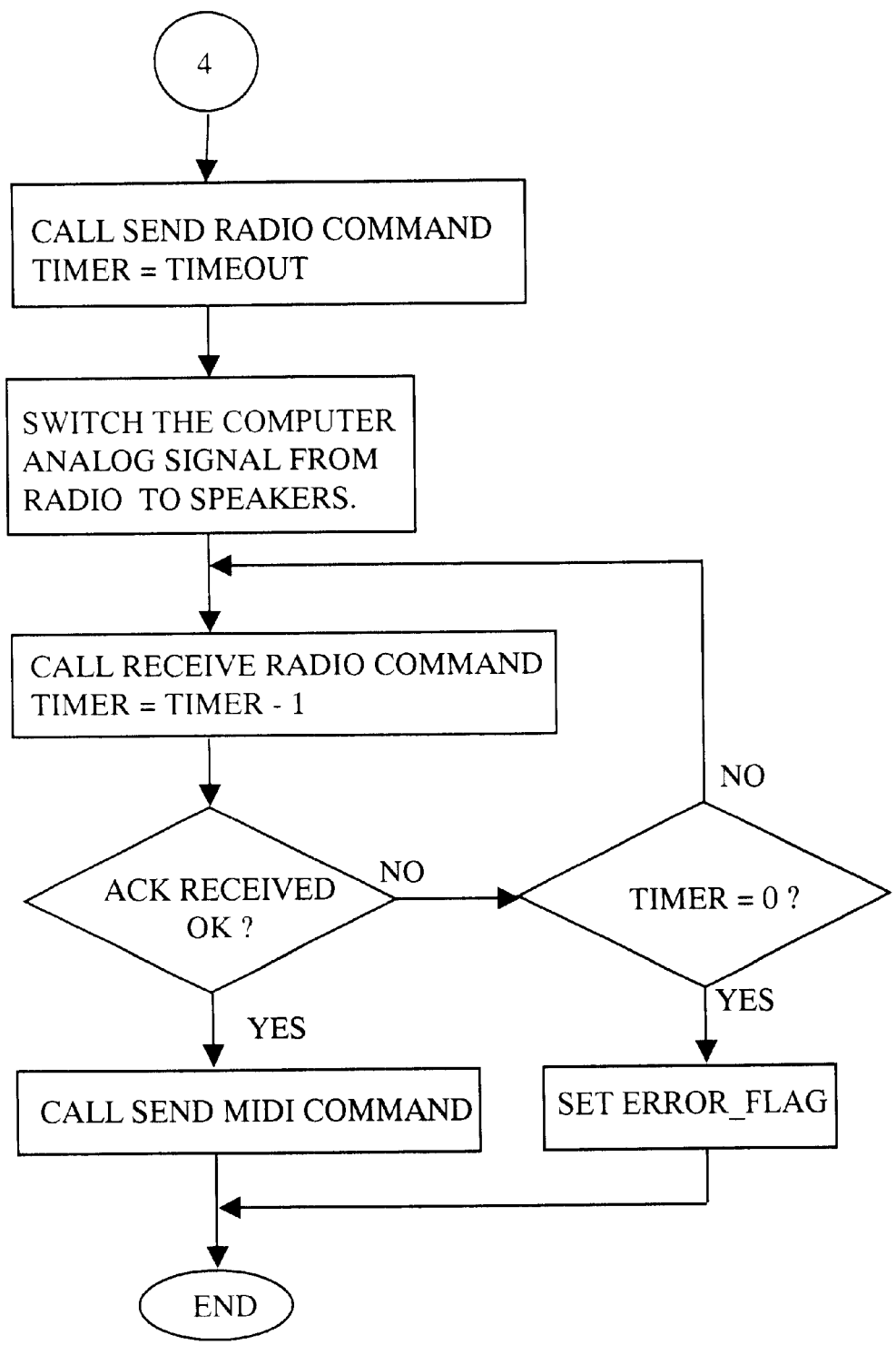
Figure 9M:
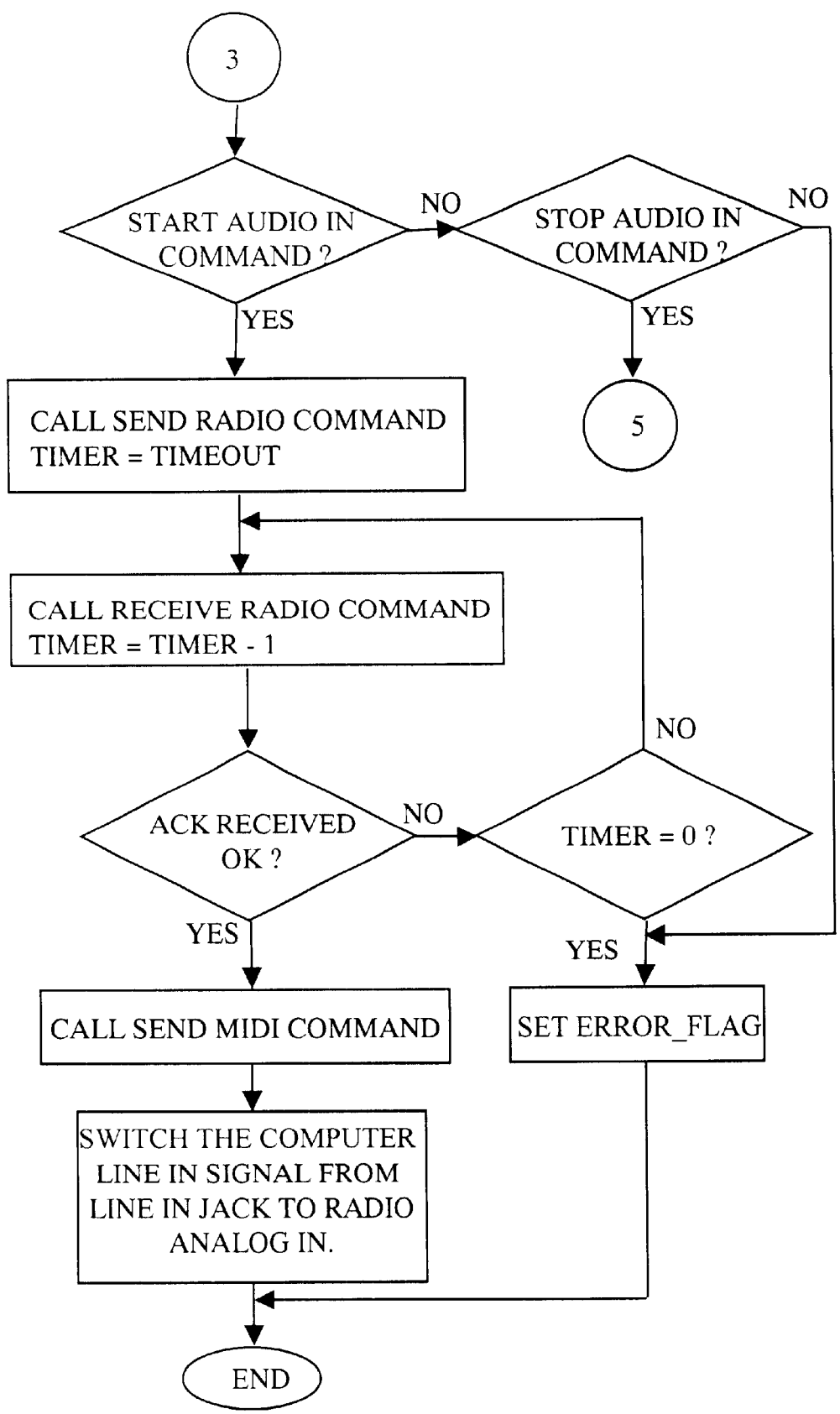
Figure 10A:
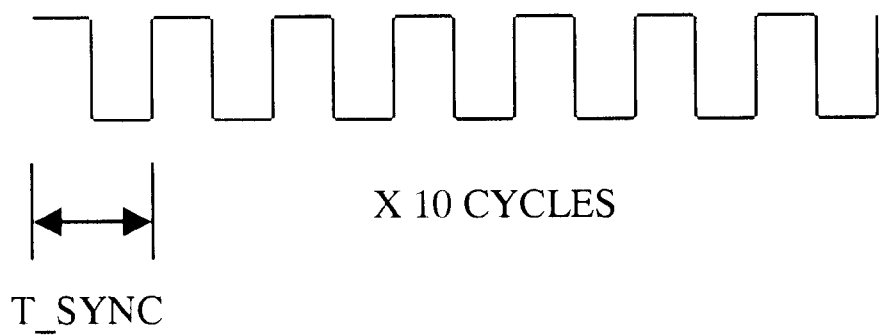
Figure 10B:
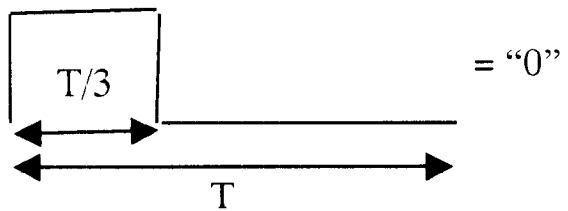
Figure 10C:
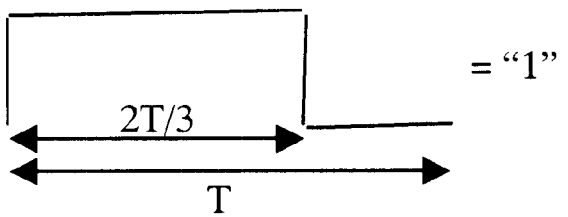
Figure 11:
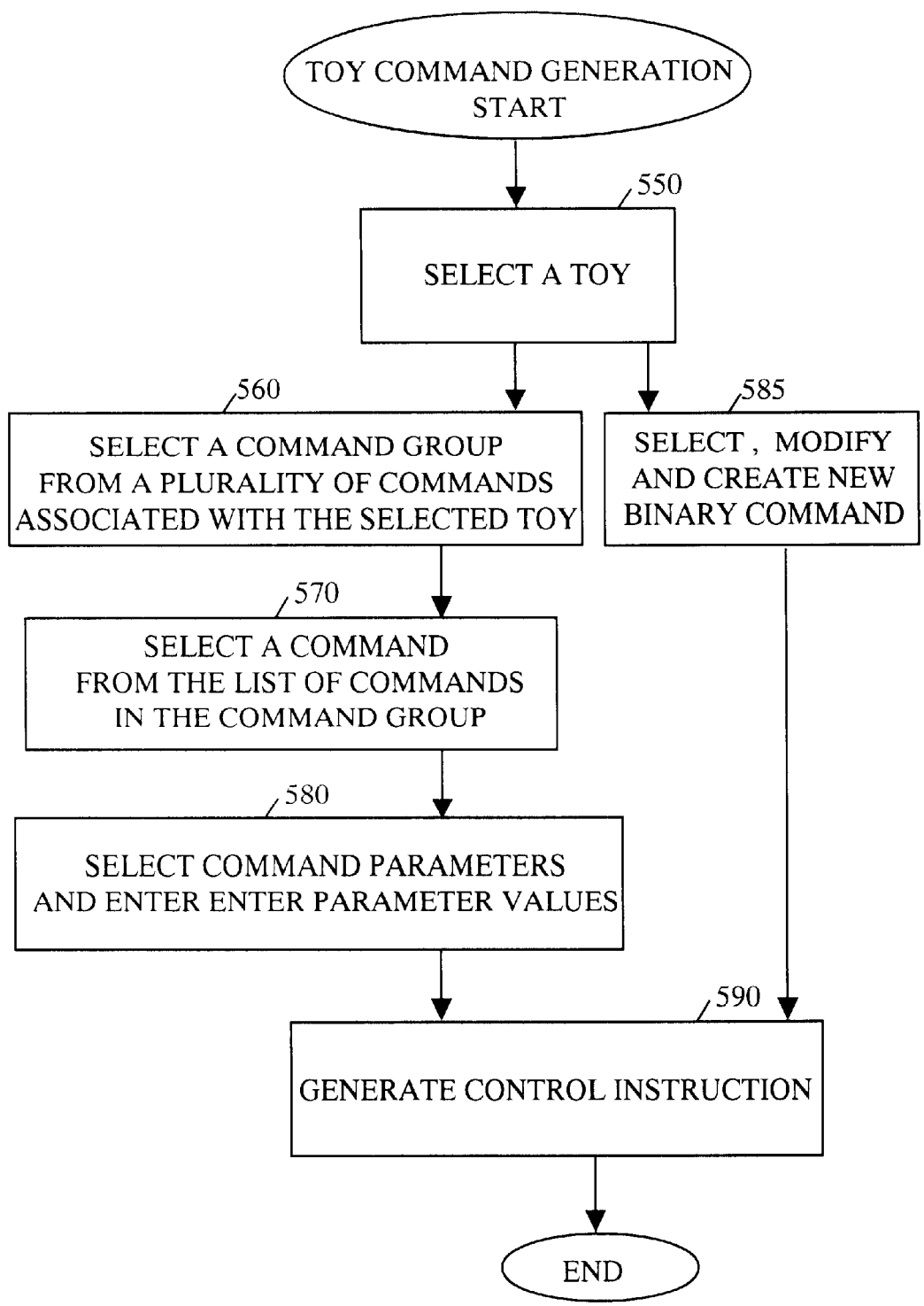
Figure 12A:
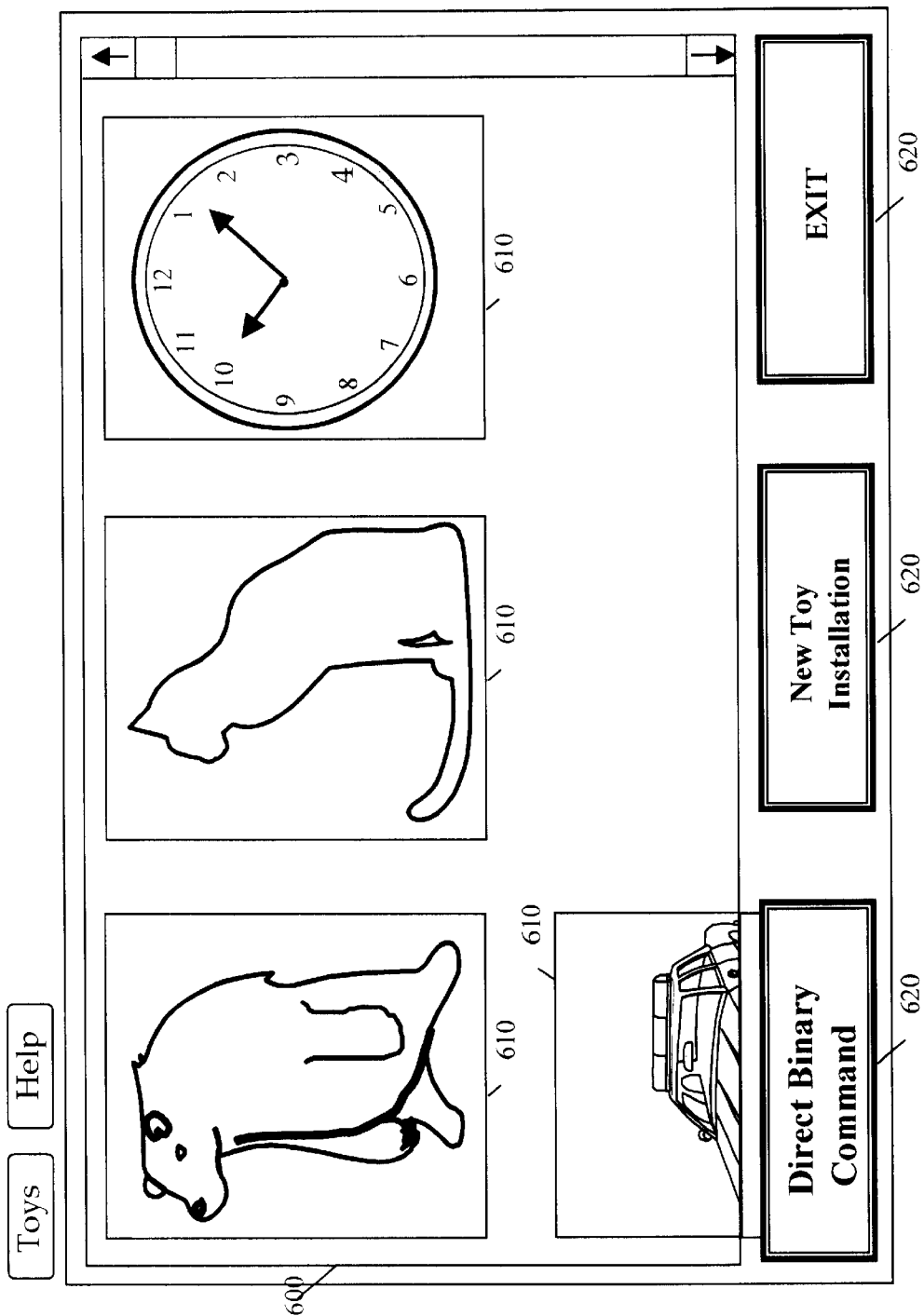
Figure 12B:
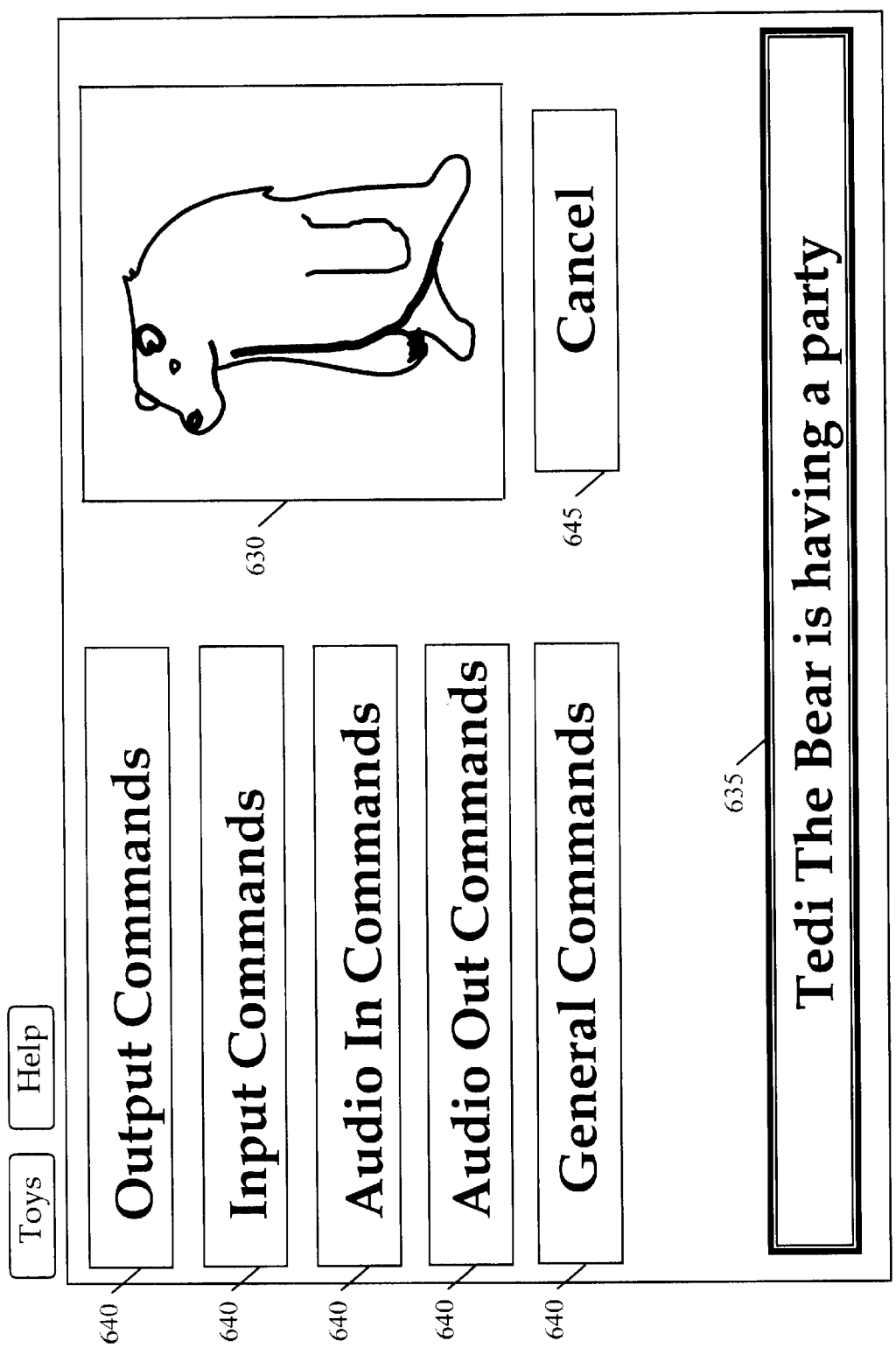
Figure 12C:
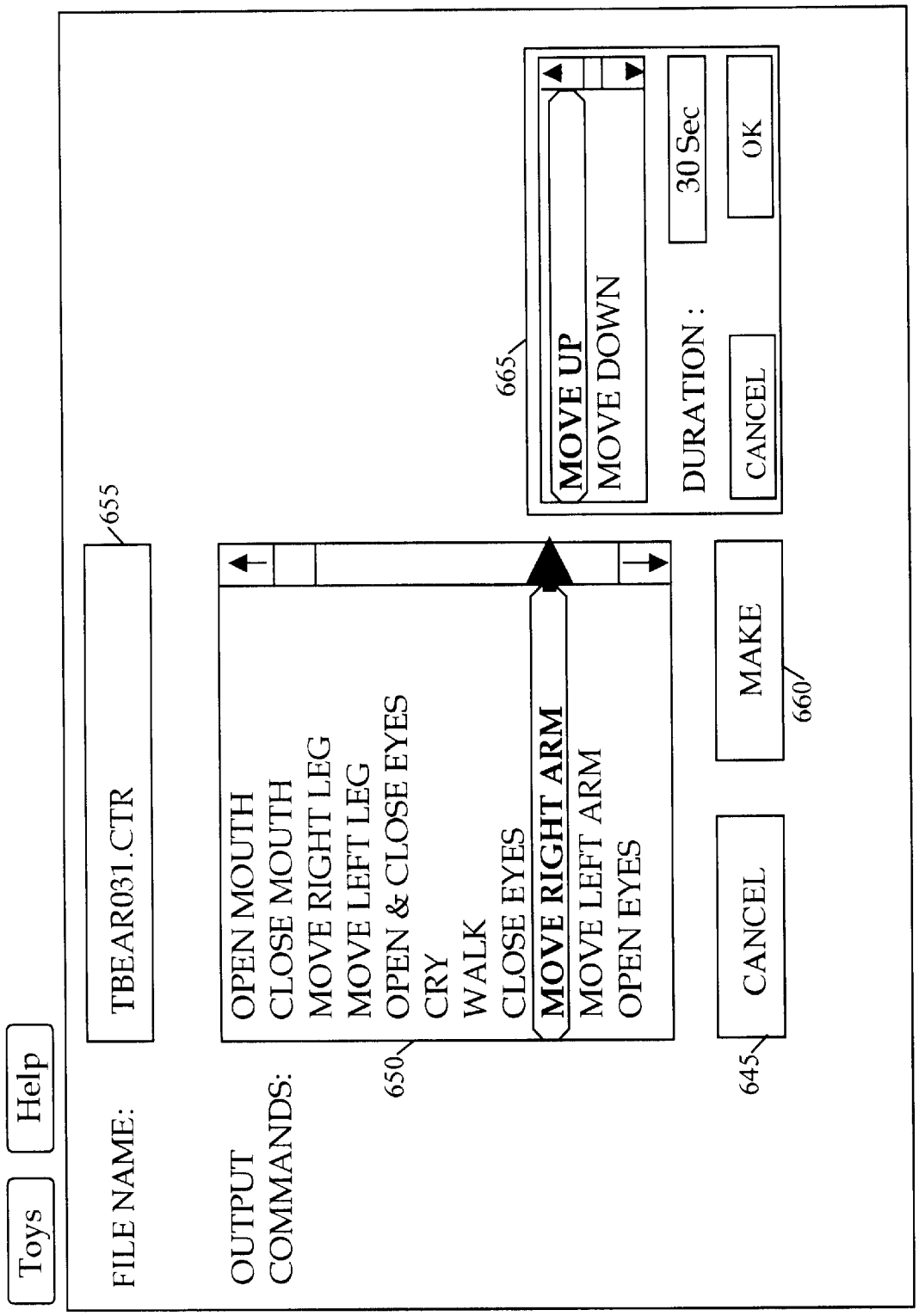
Figure 13:
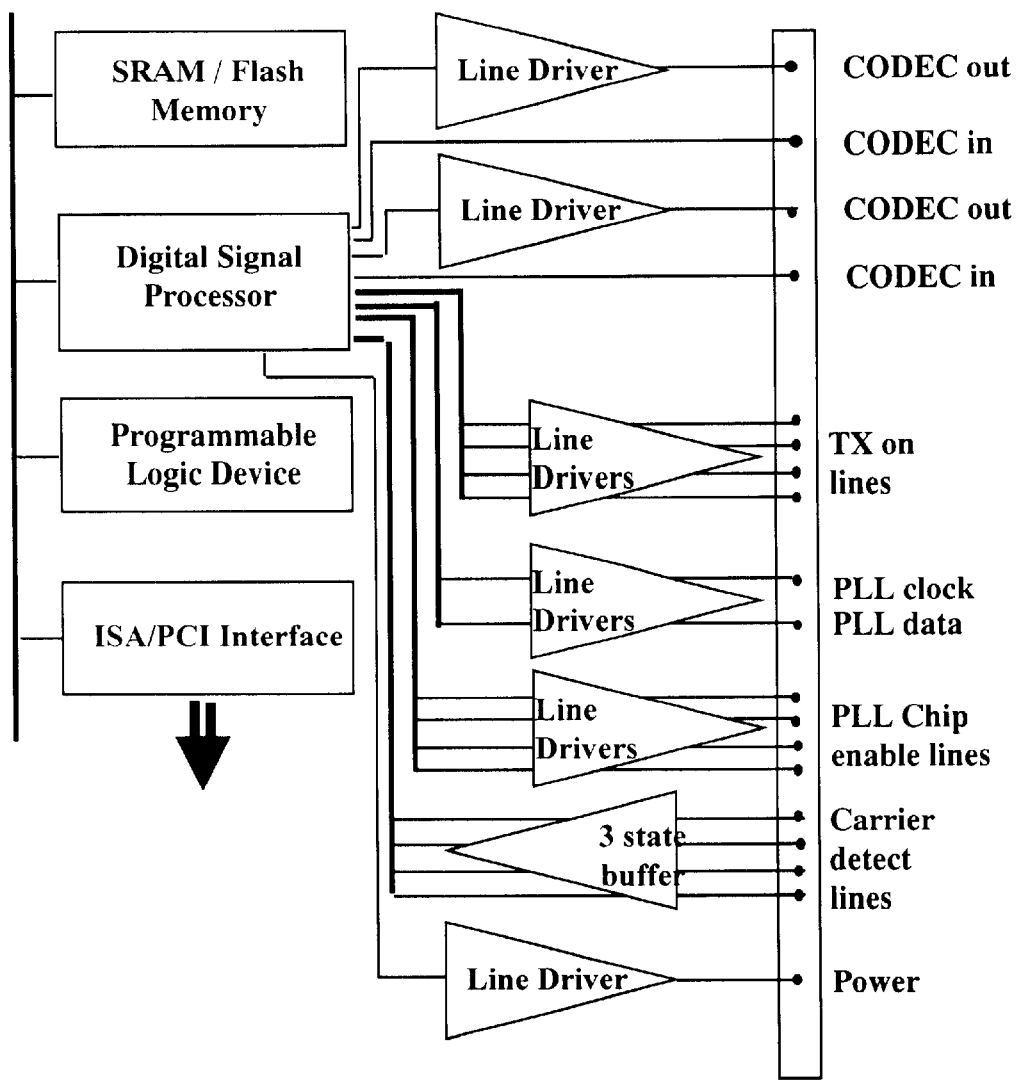
Figure 14:
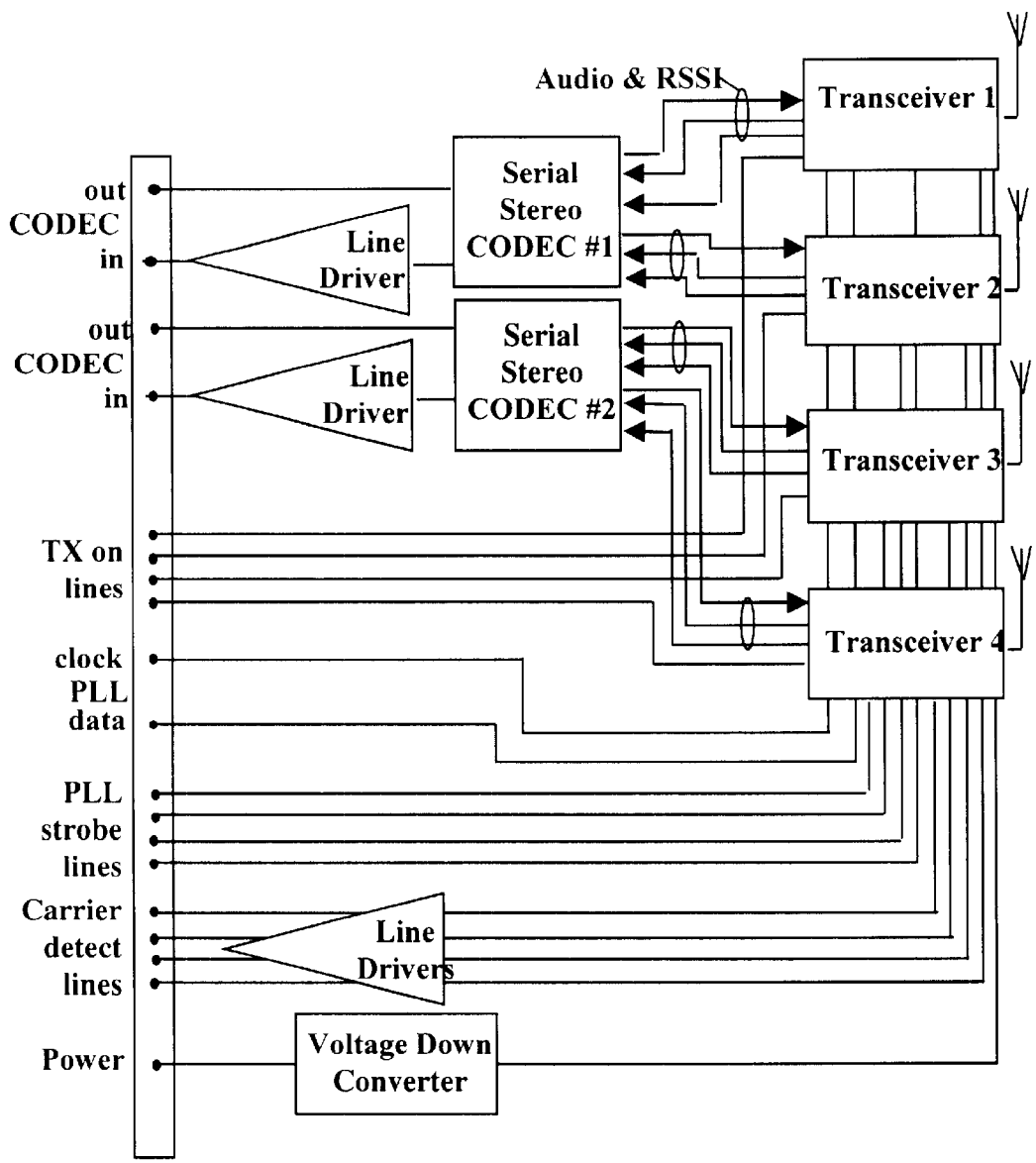
Figure 15A:
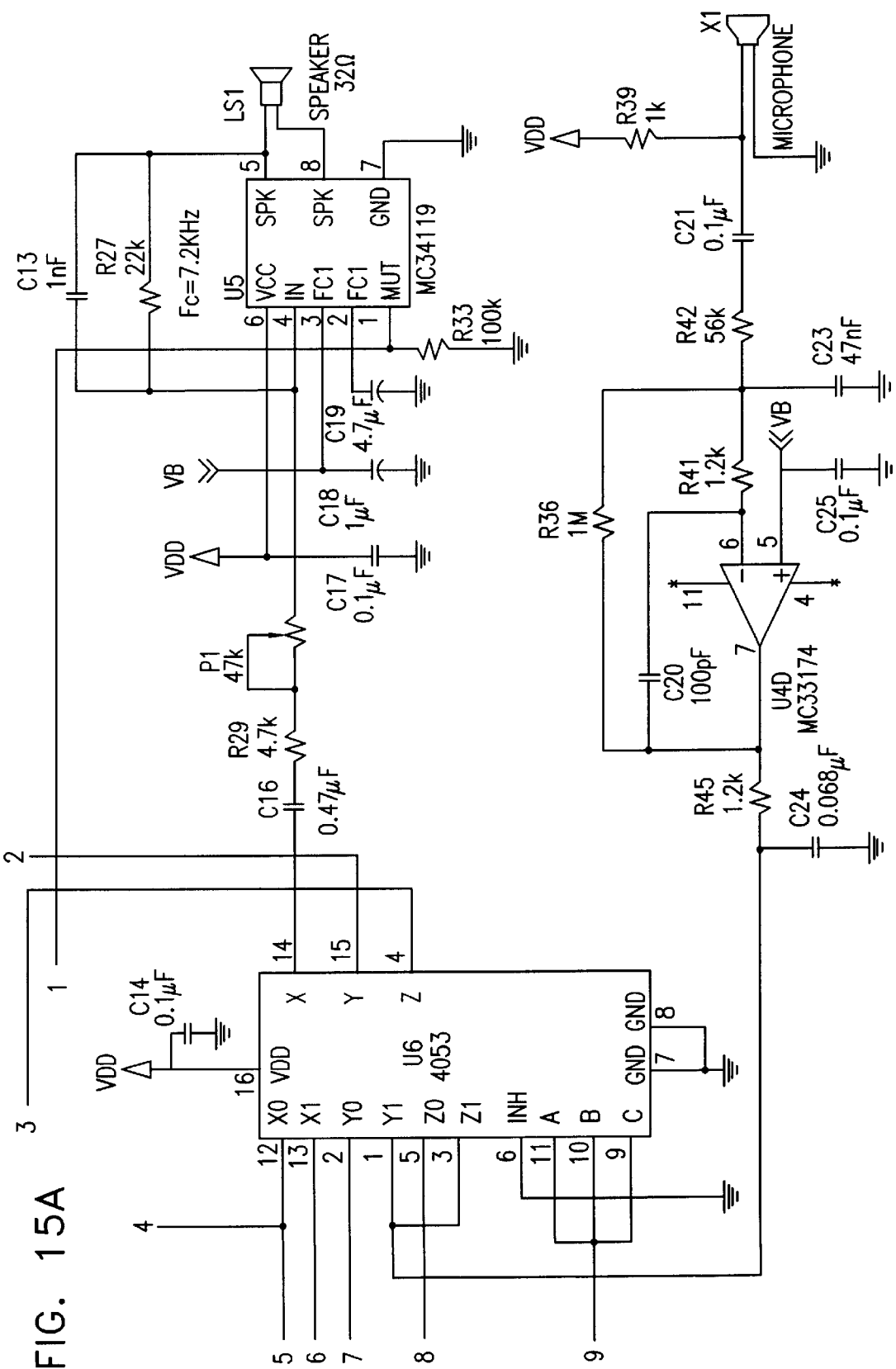
Figure 15B:
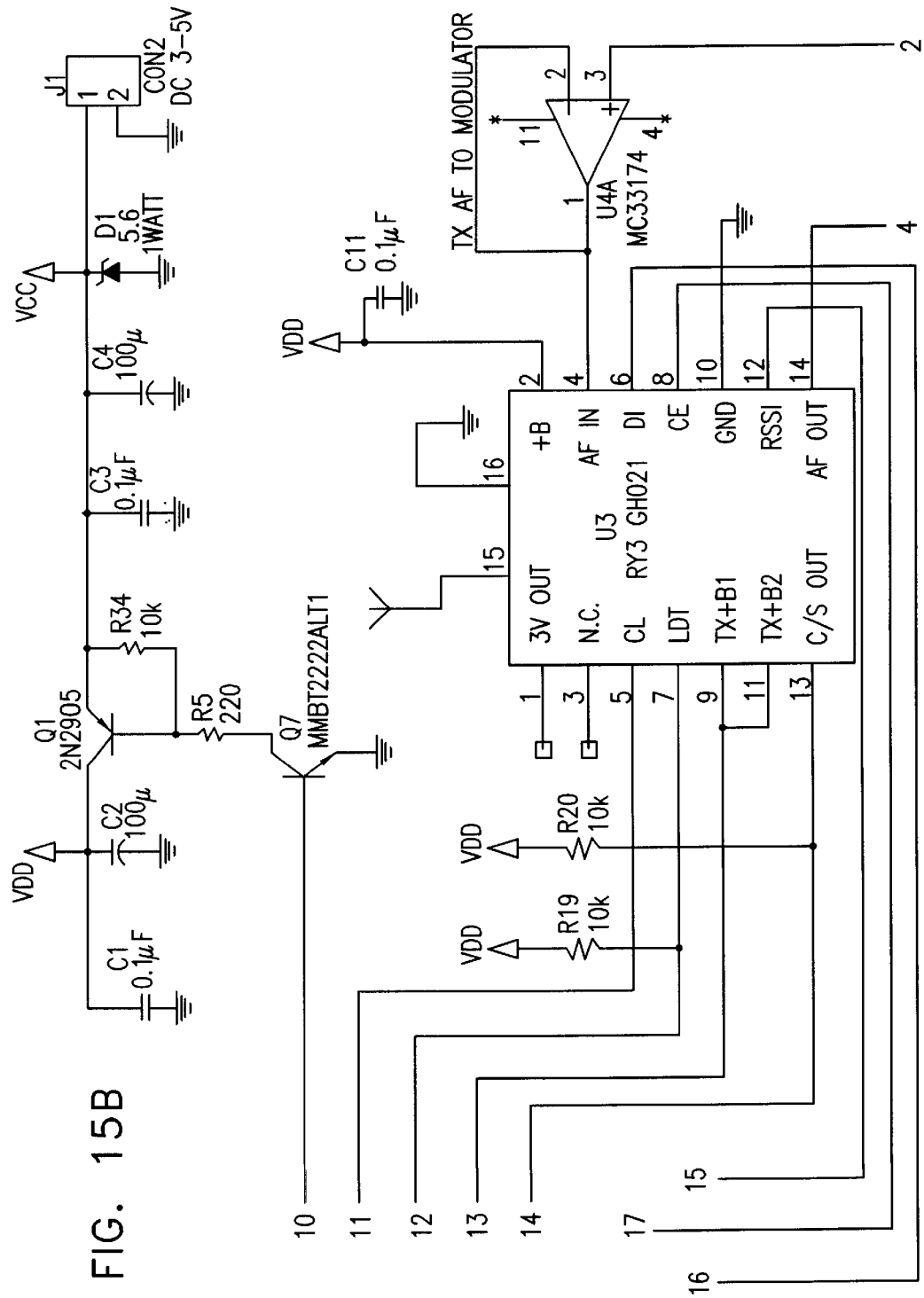
Figure 15C:
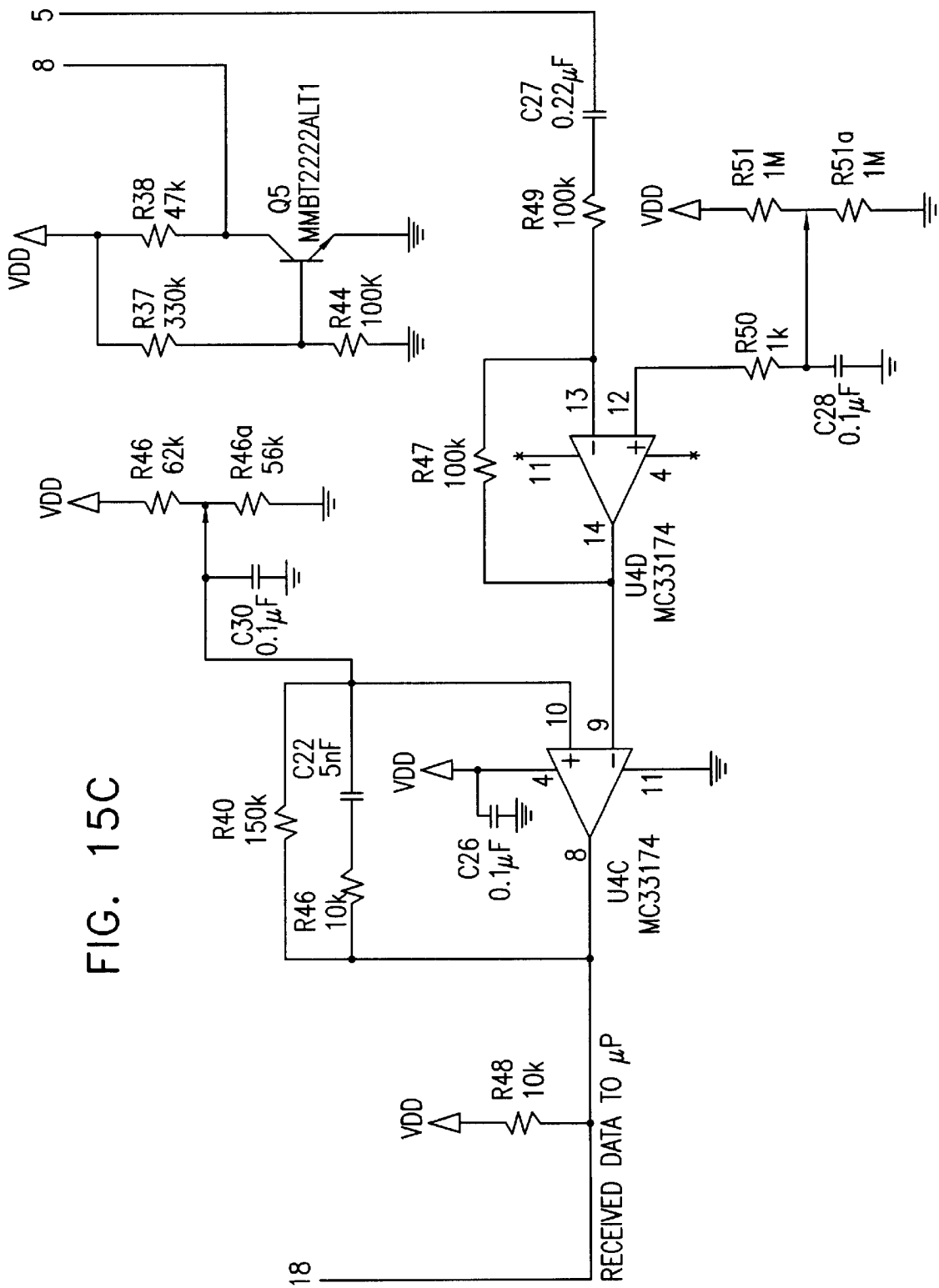
Figure 15E:
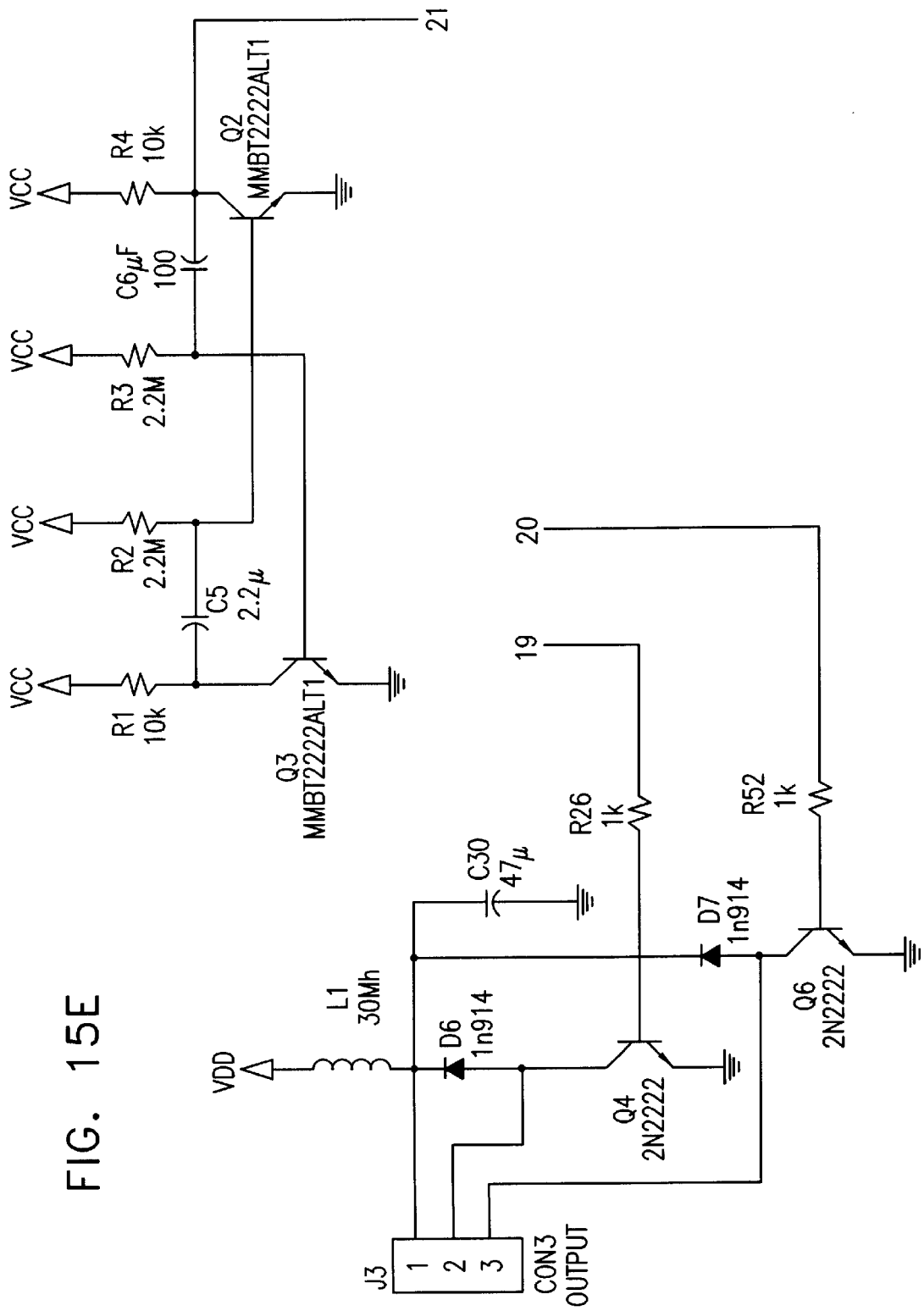
Figure 16:
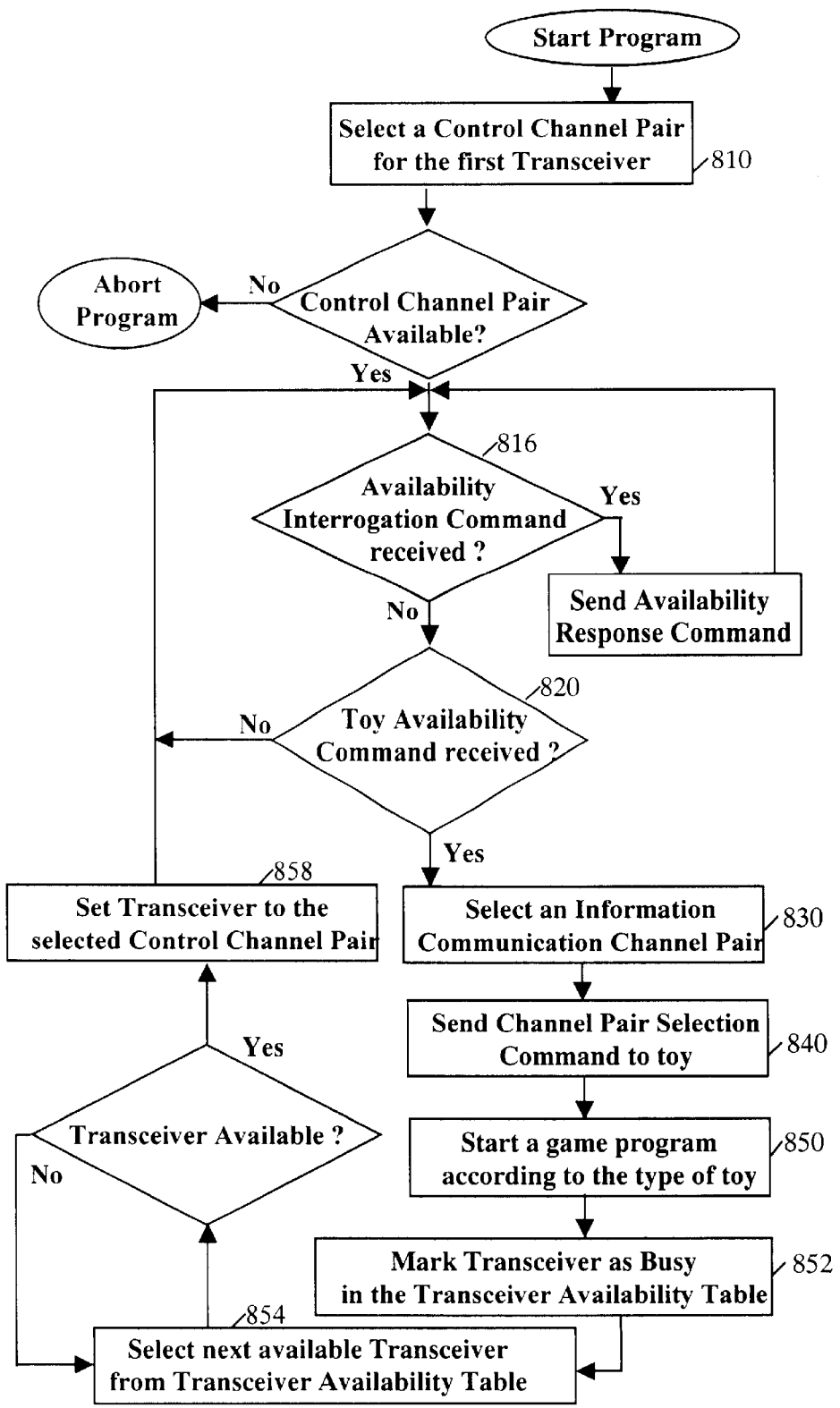
Figure 17:
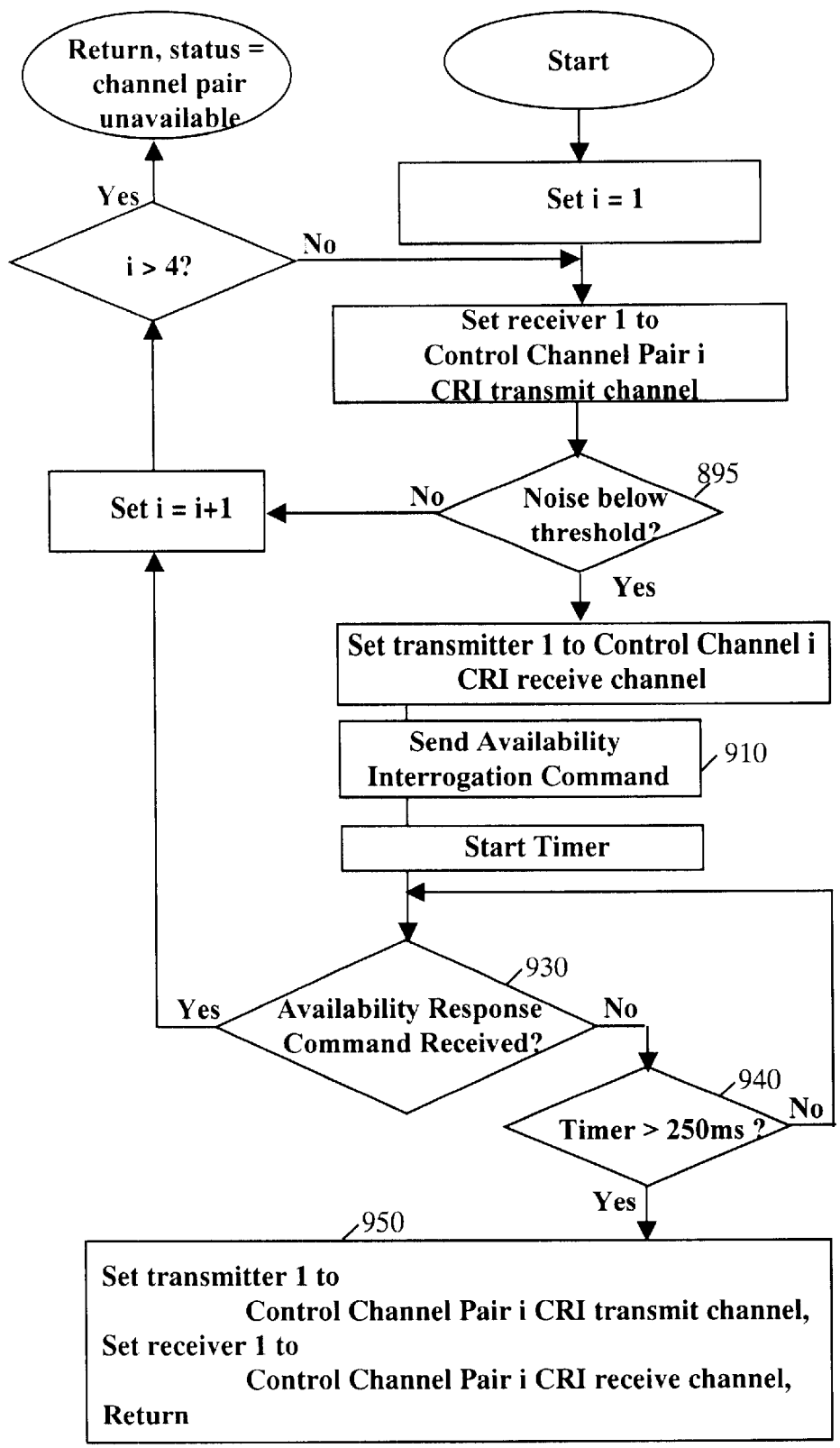
Figure 18A:
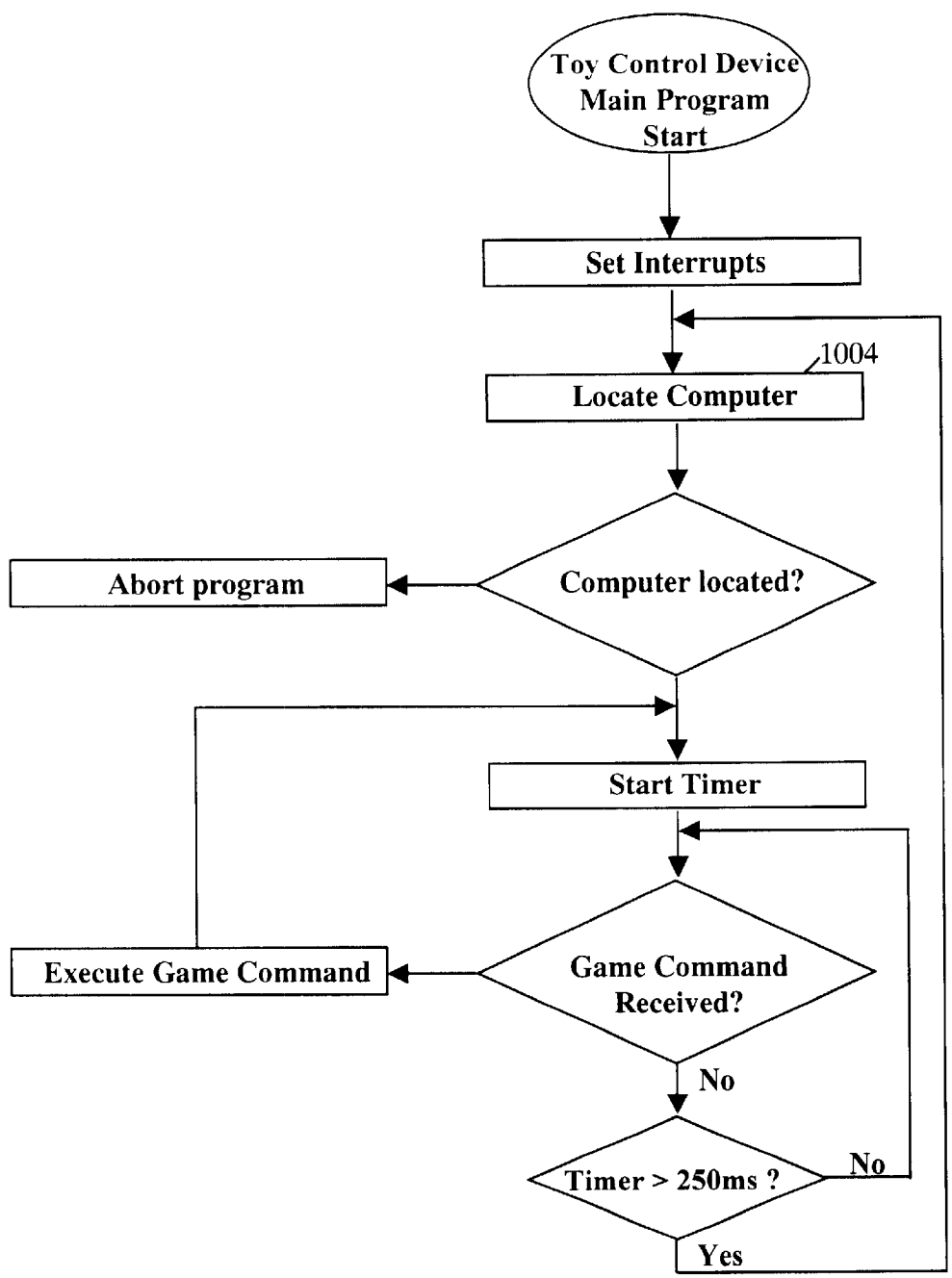
Figure 18B:
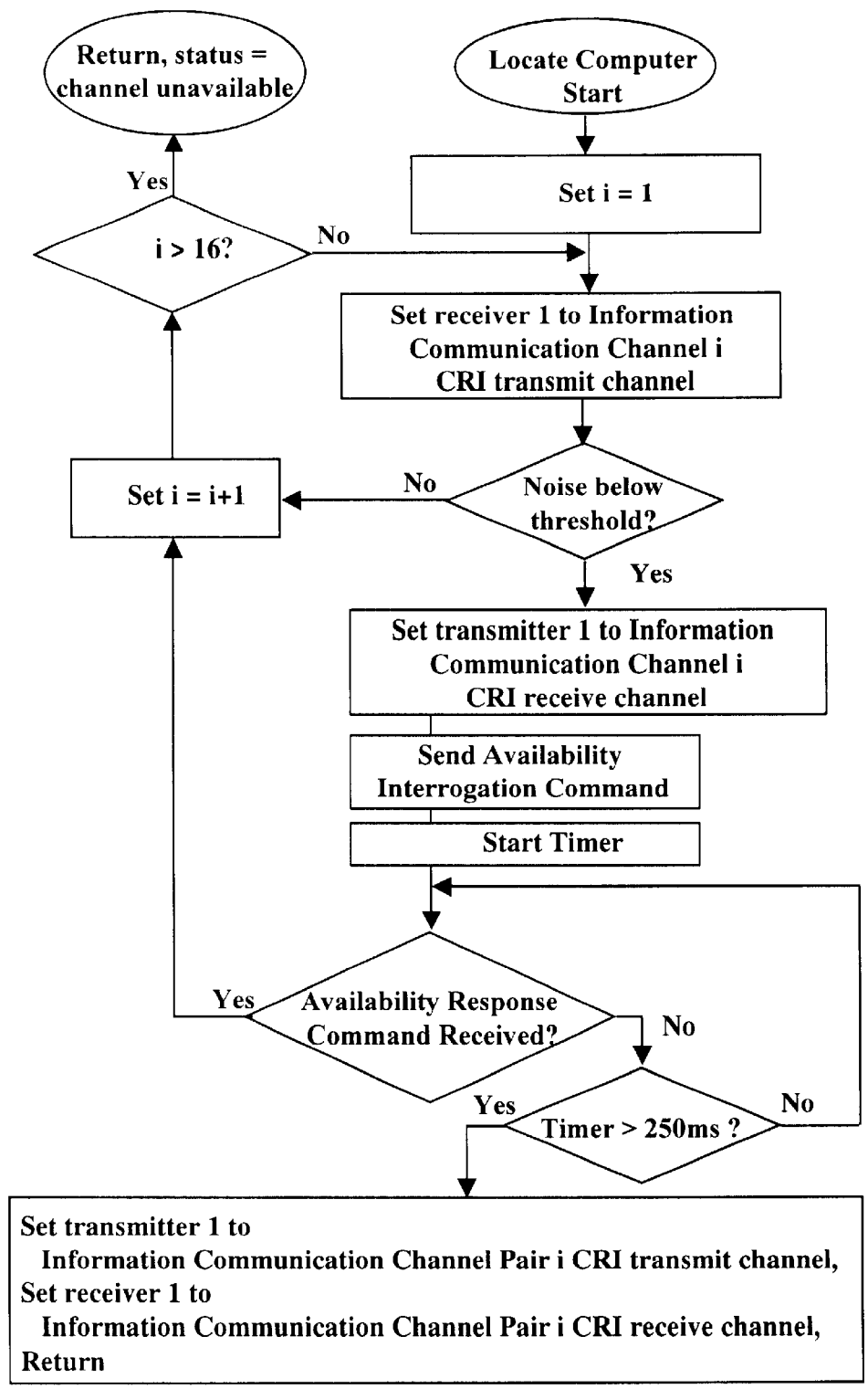
Figure 19:
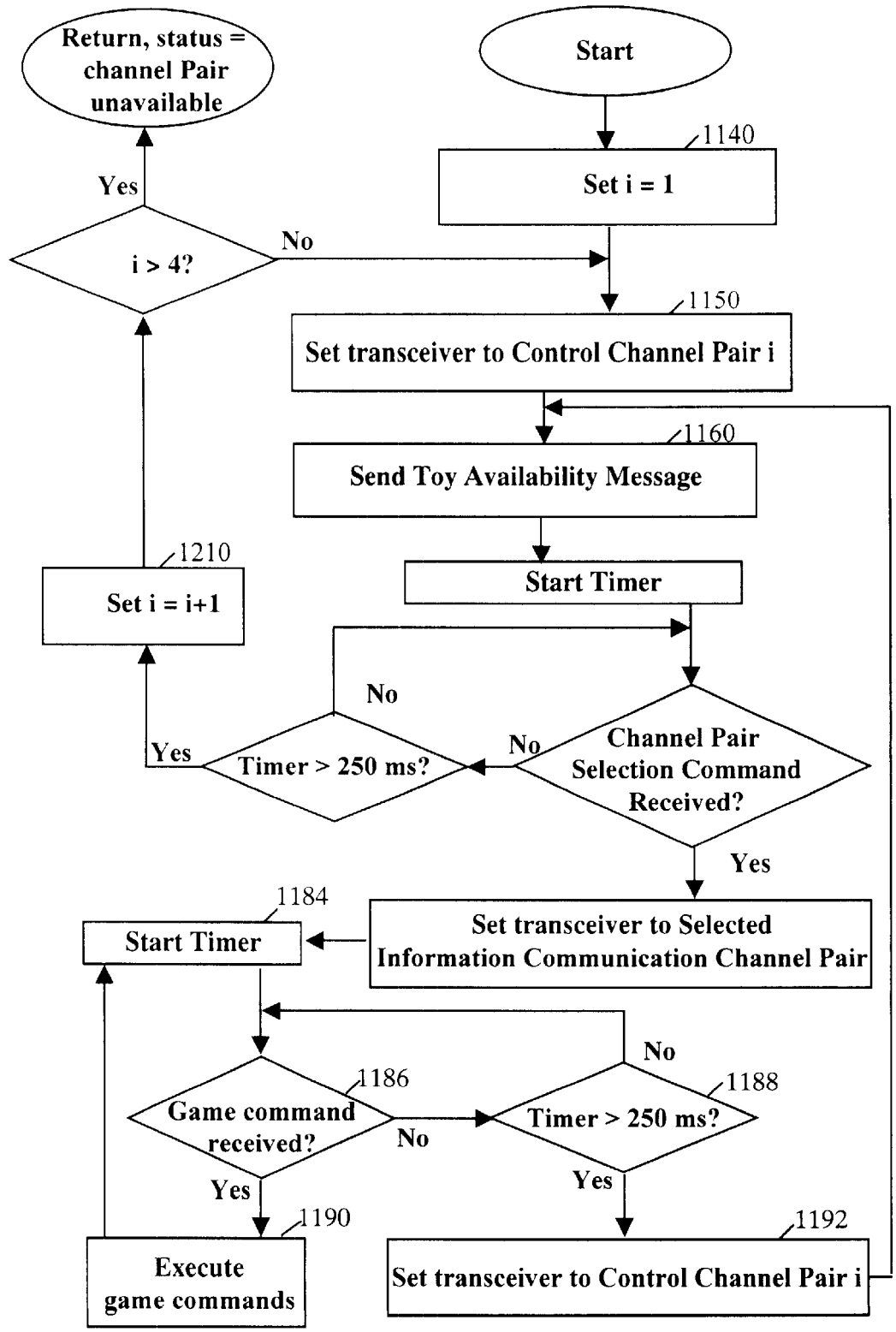
Figure 20:
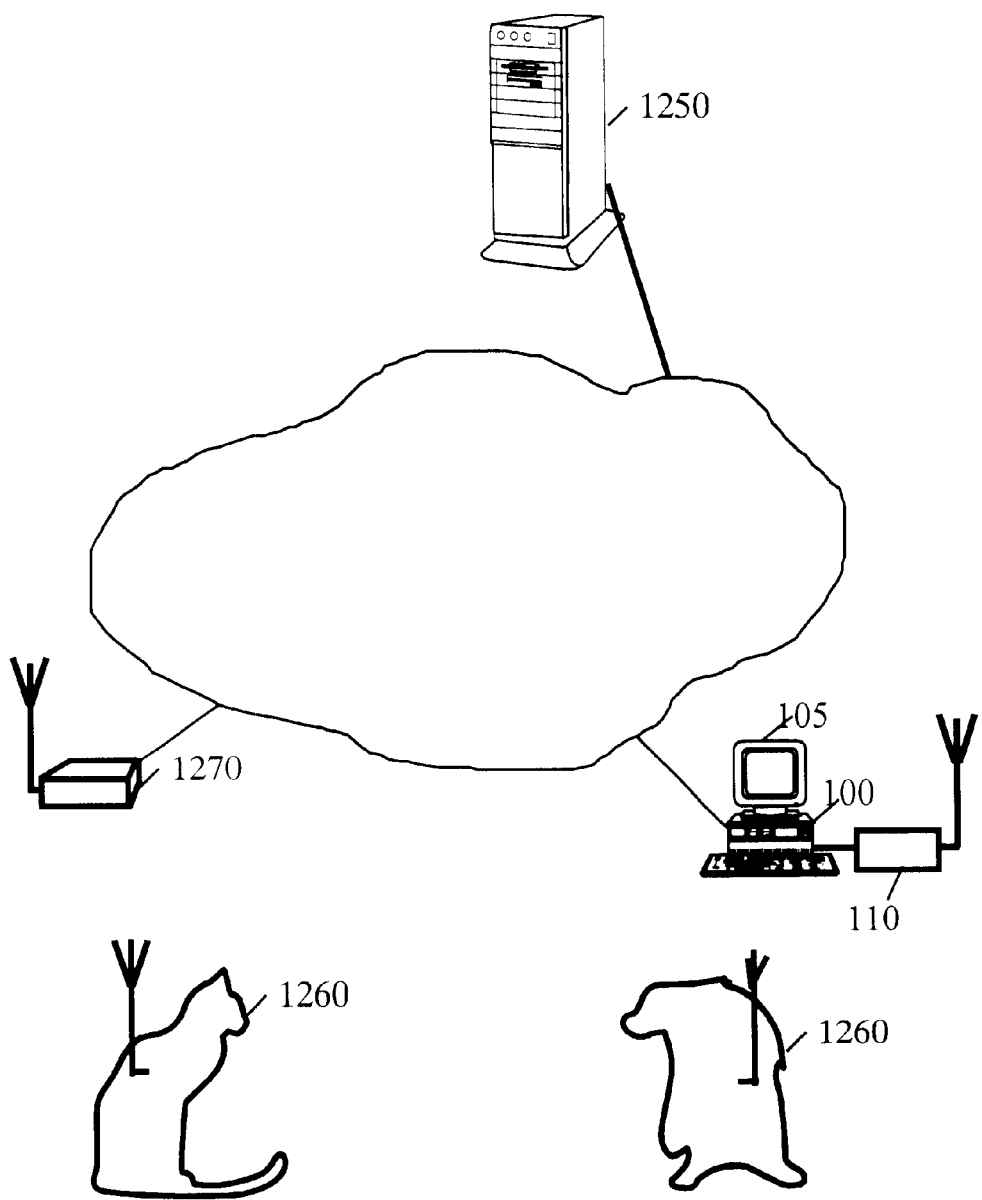
Figure 21:
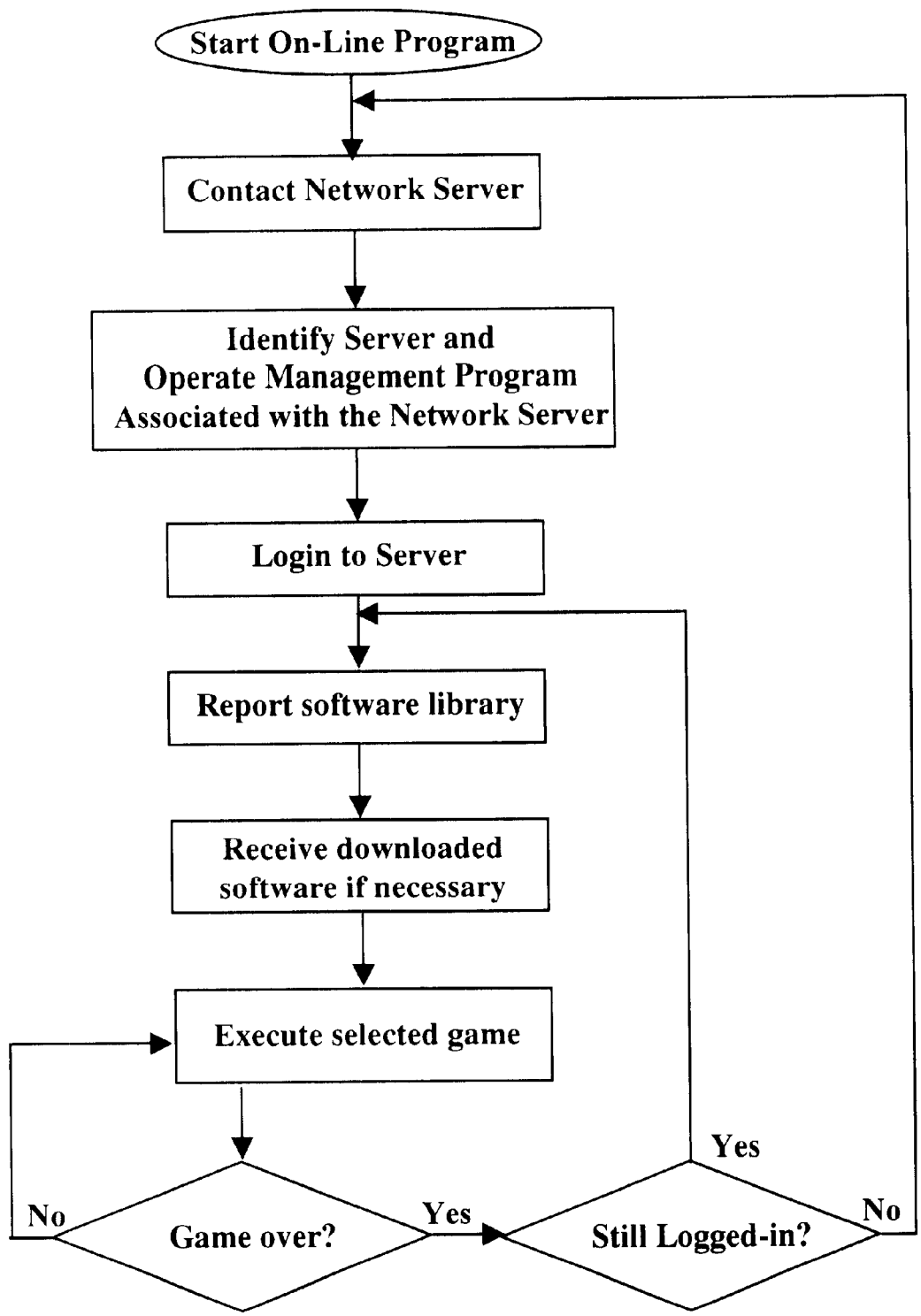
Figure 22:
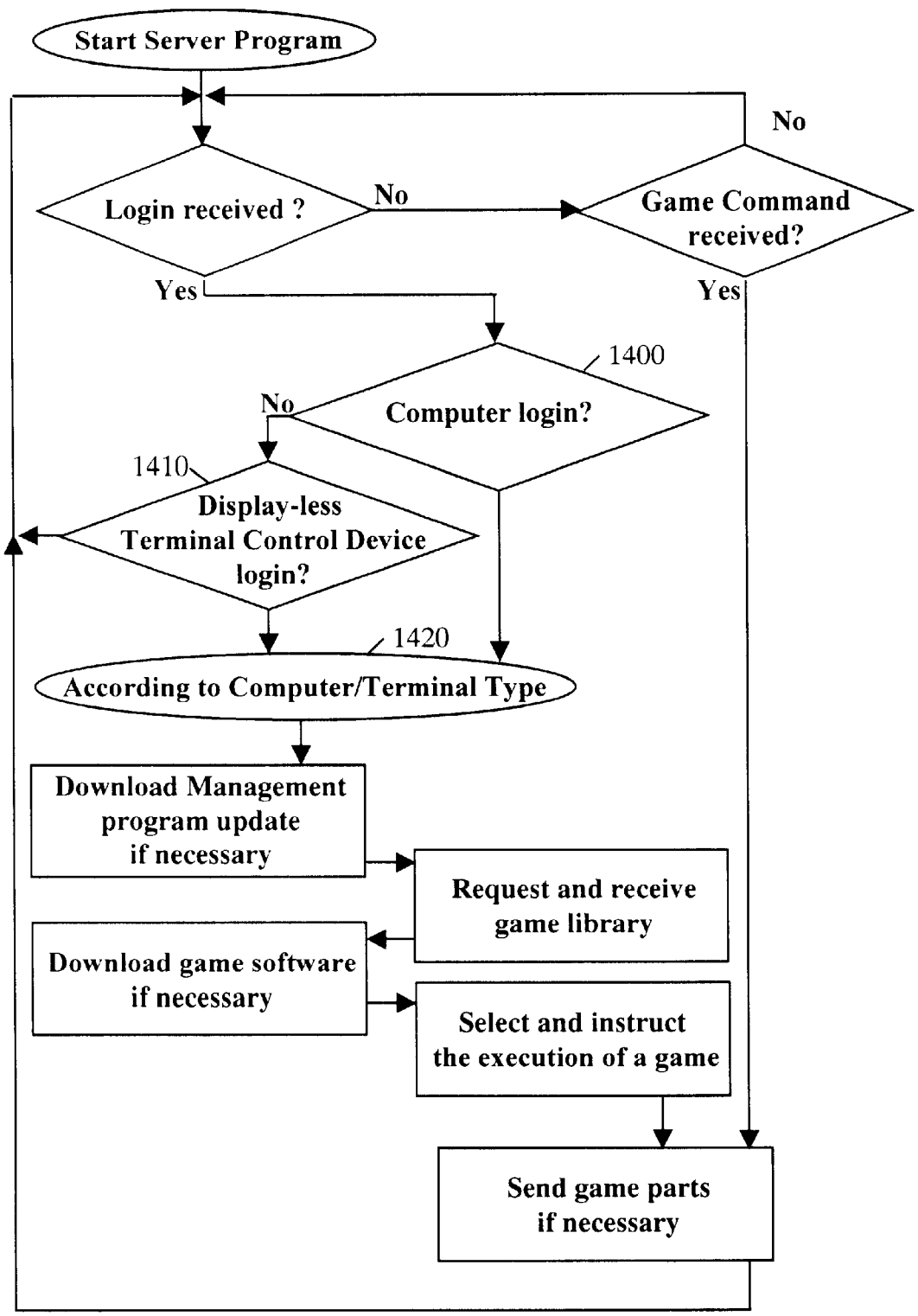
Figure 23:
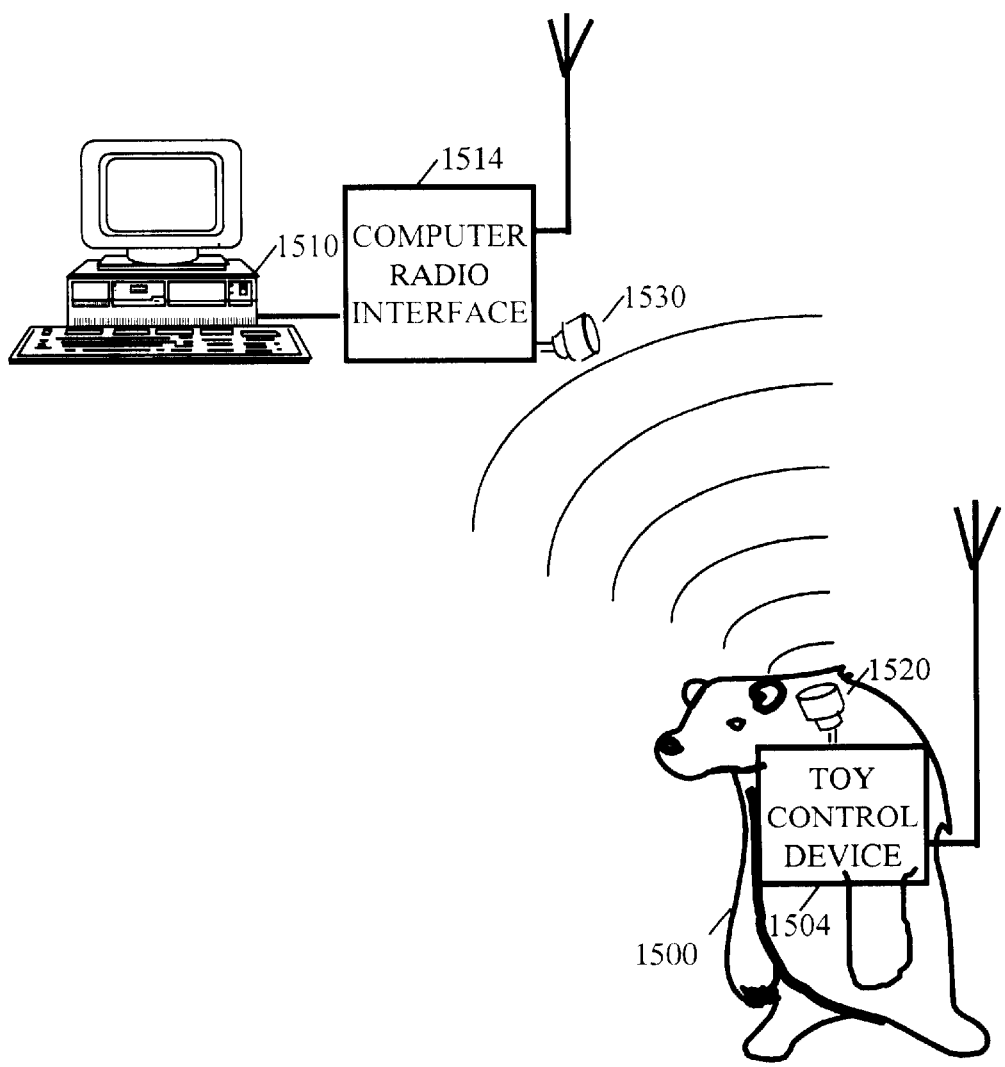
Figure 24A:
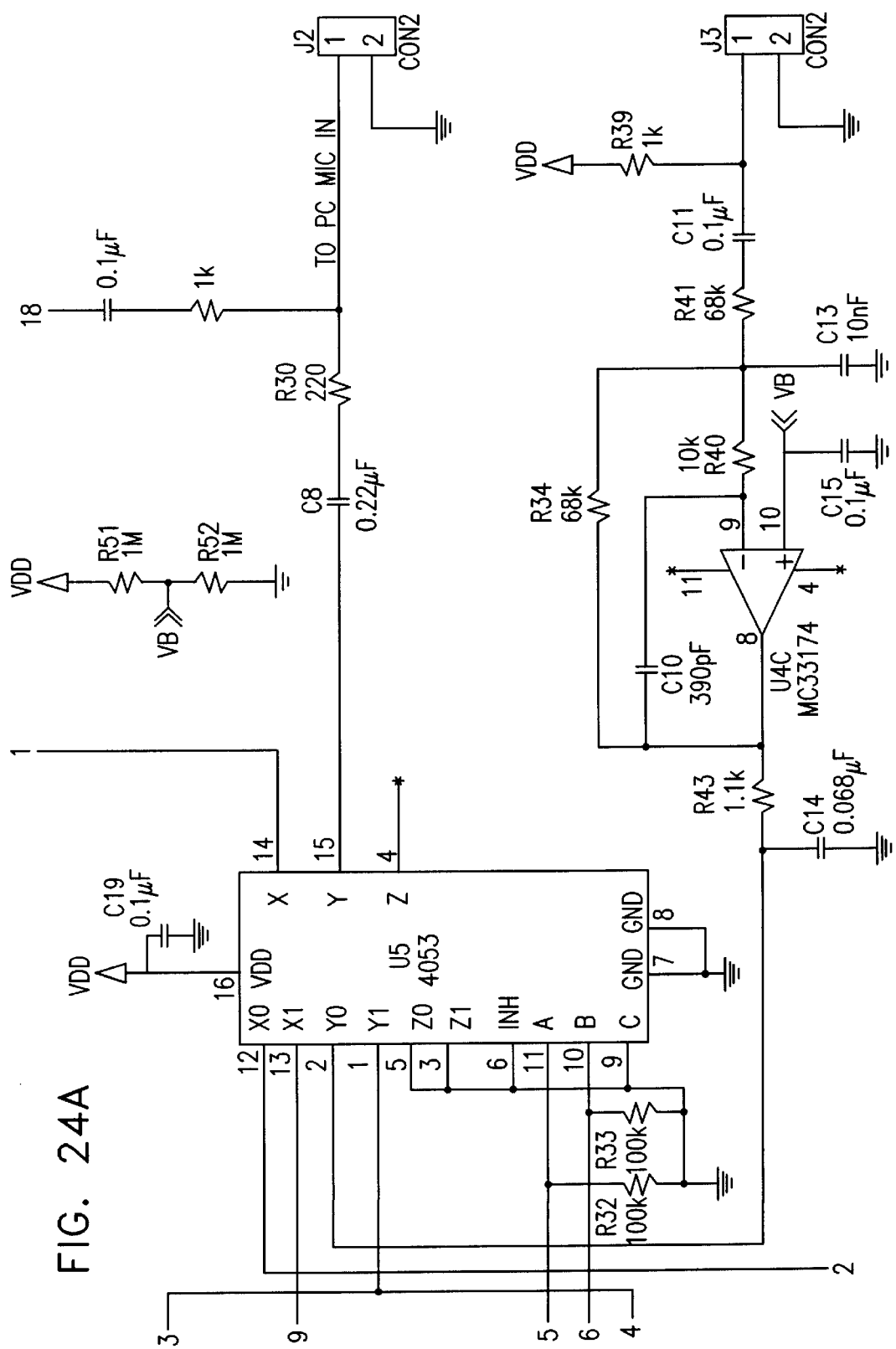
Figure 24B:
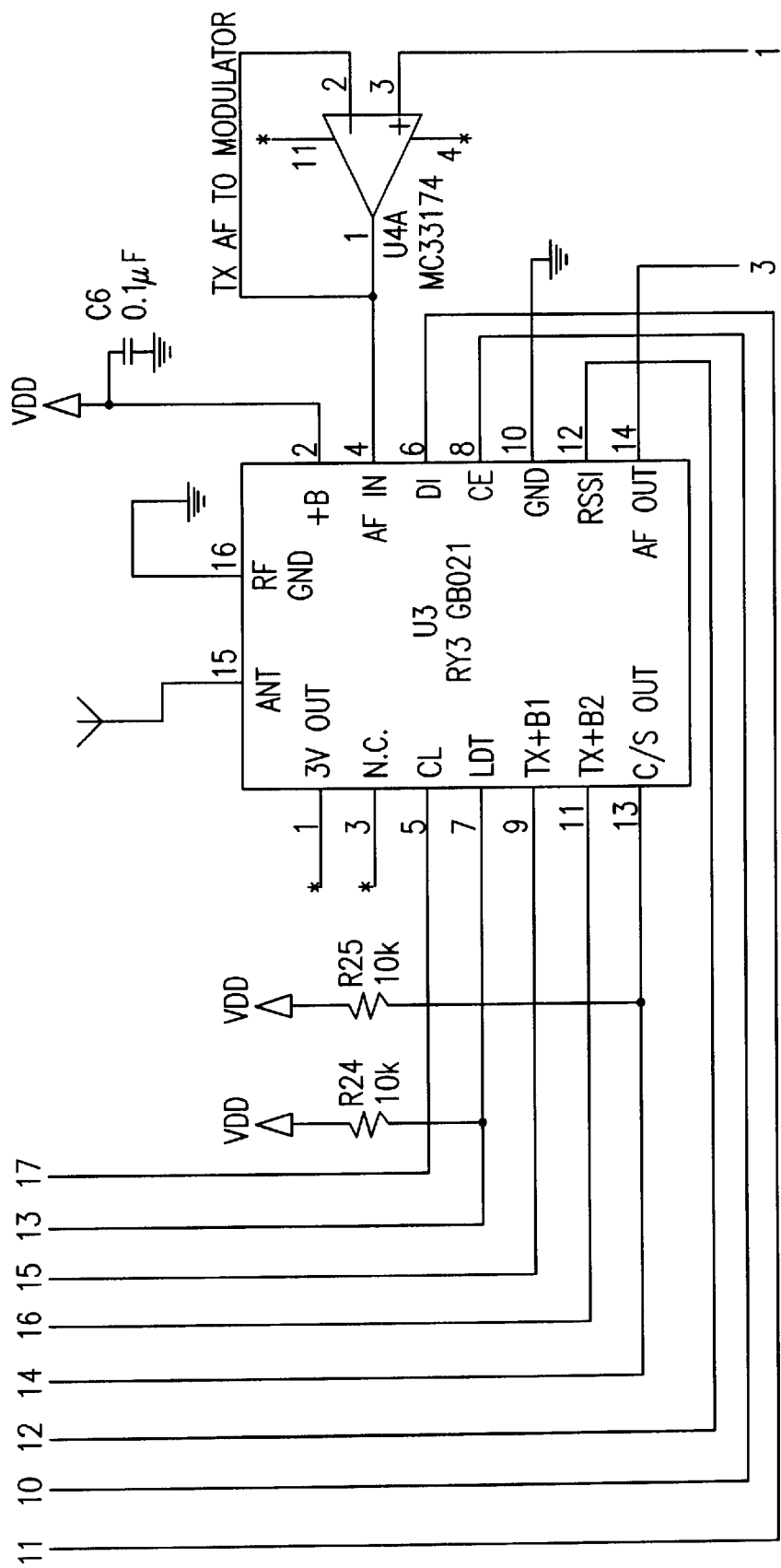
Figure 24C:
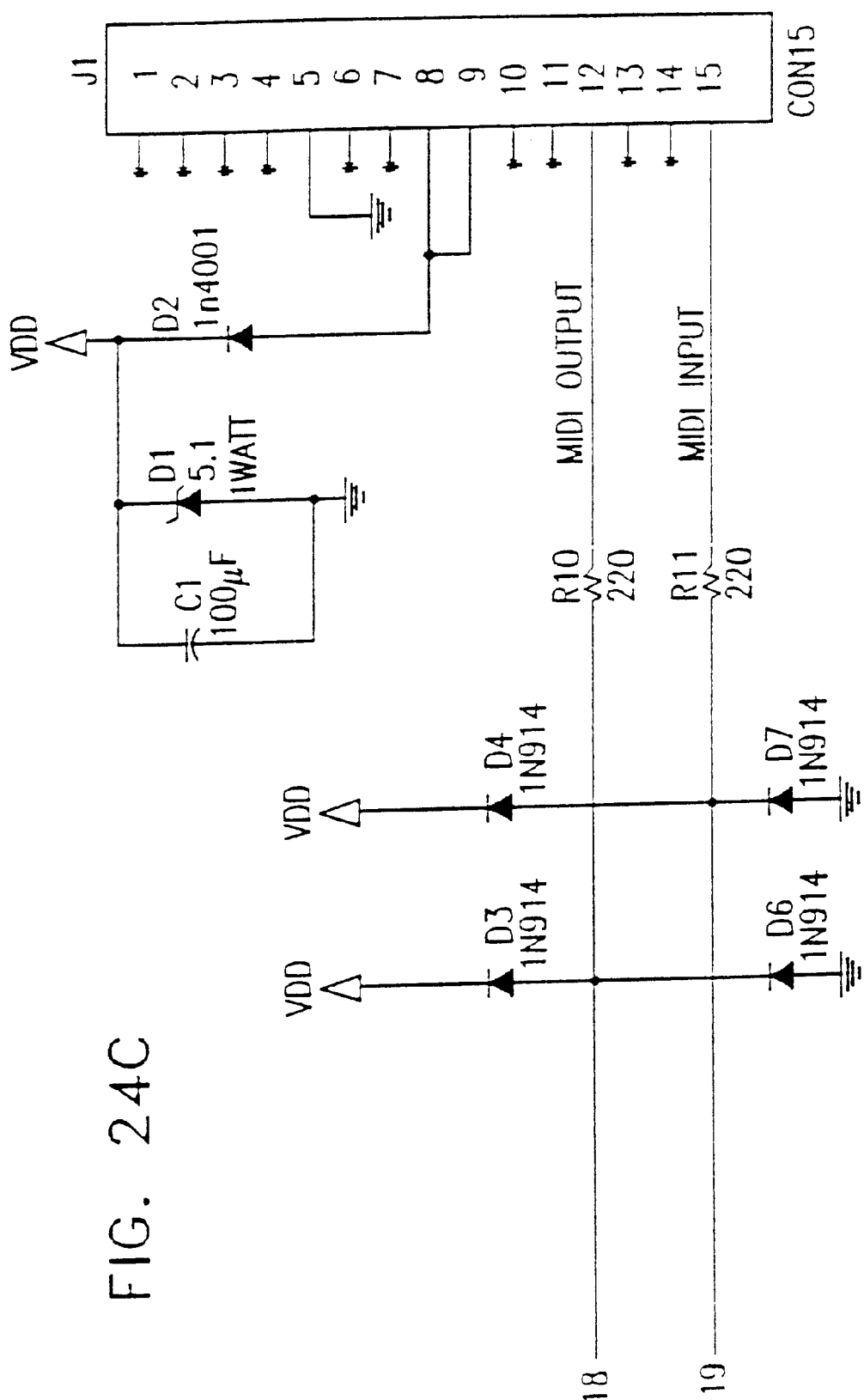
Figure 24D:
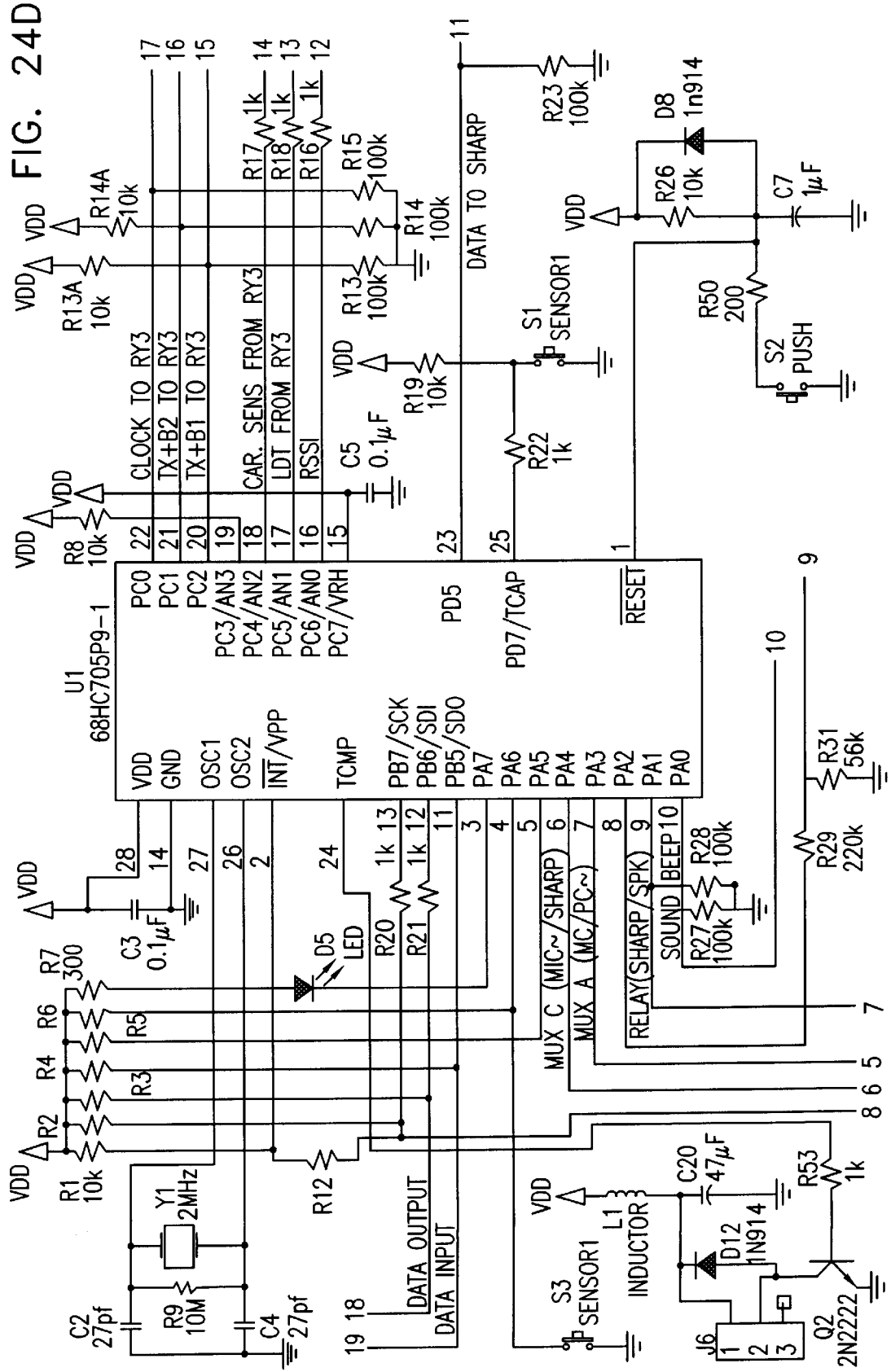
Figure 24E:
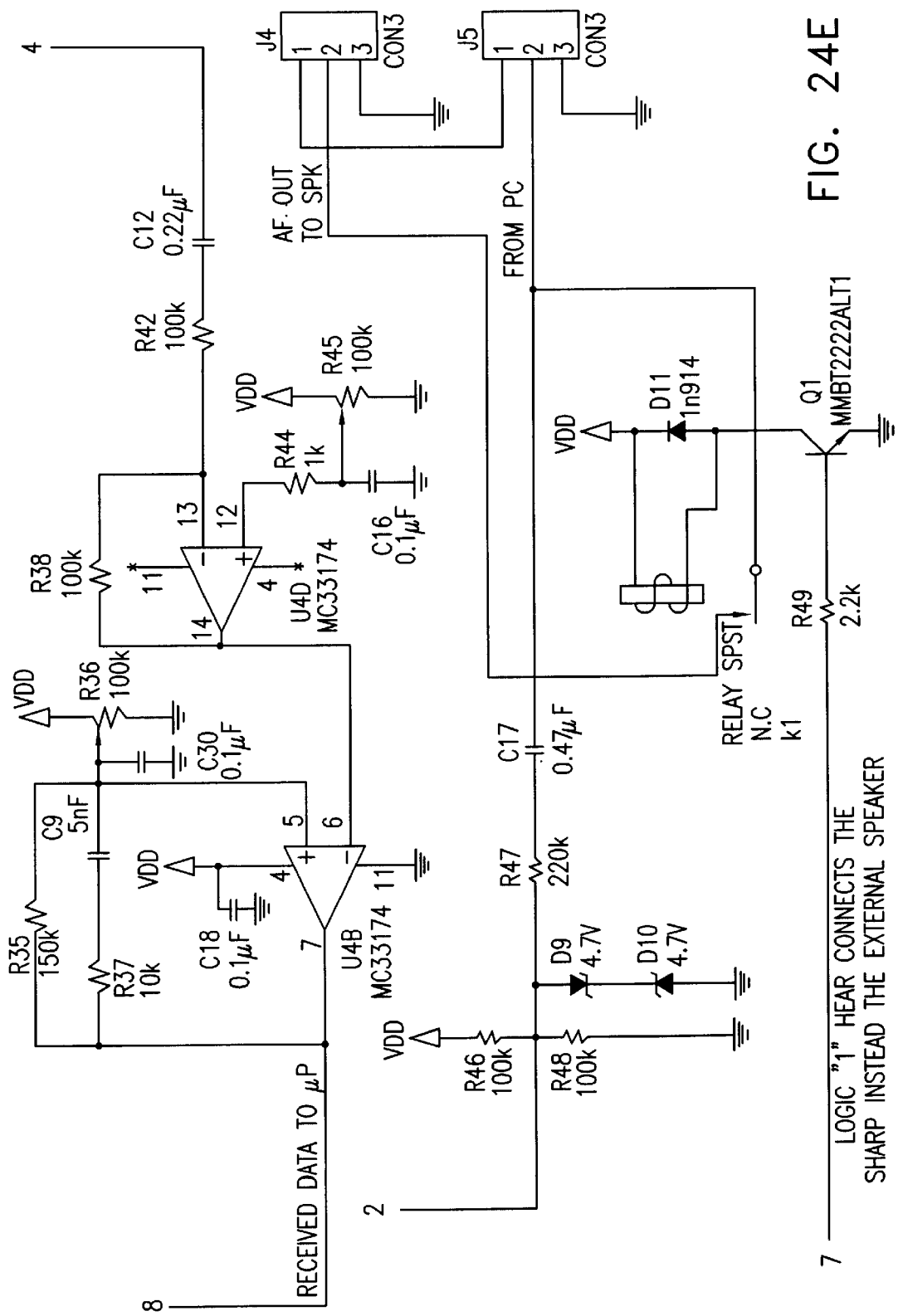
Figure 25A:
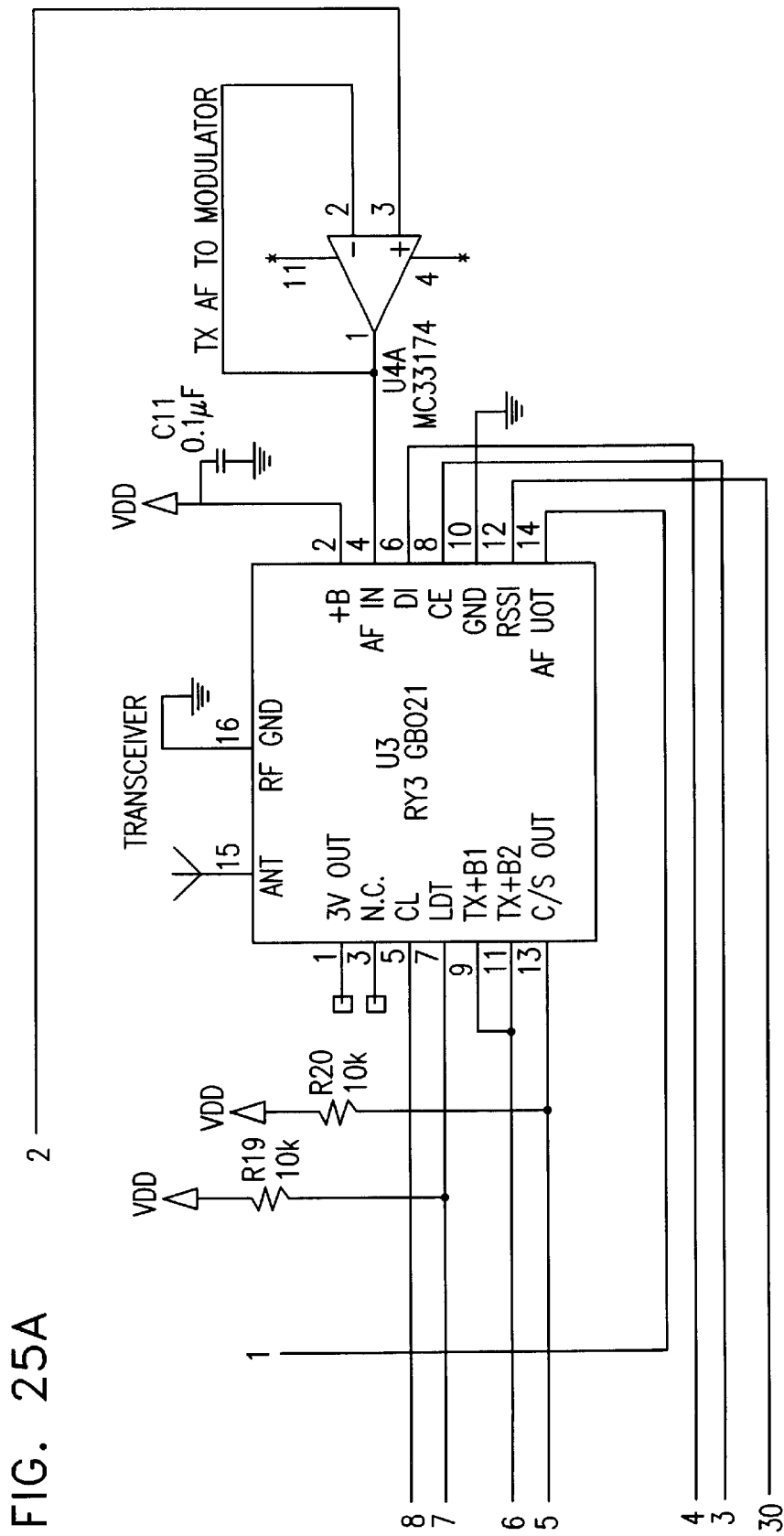
Figure 25B:
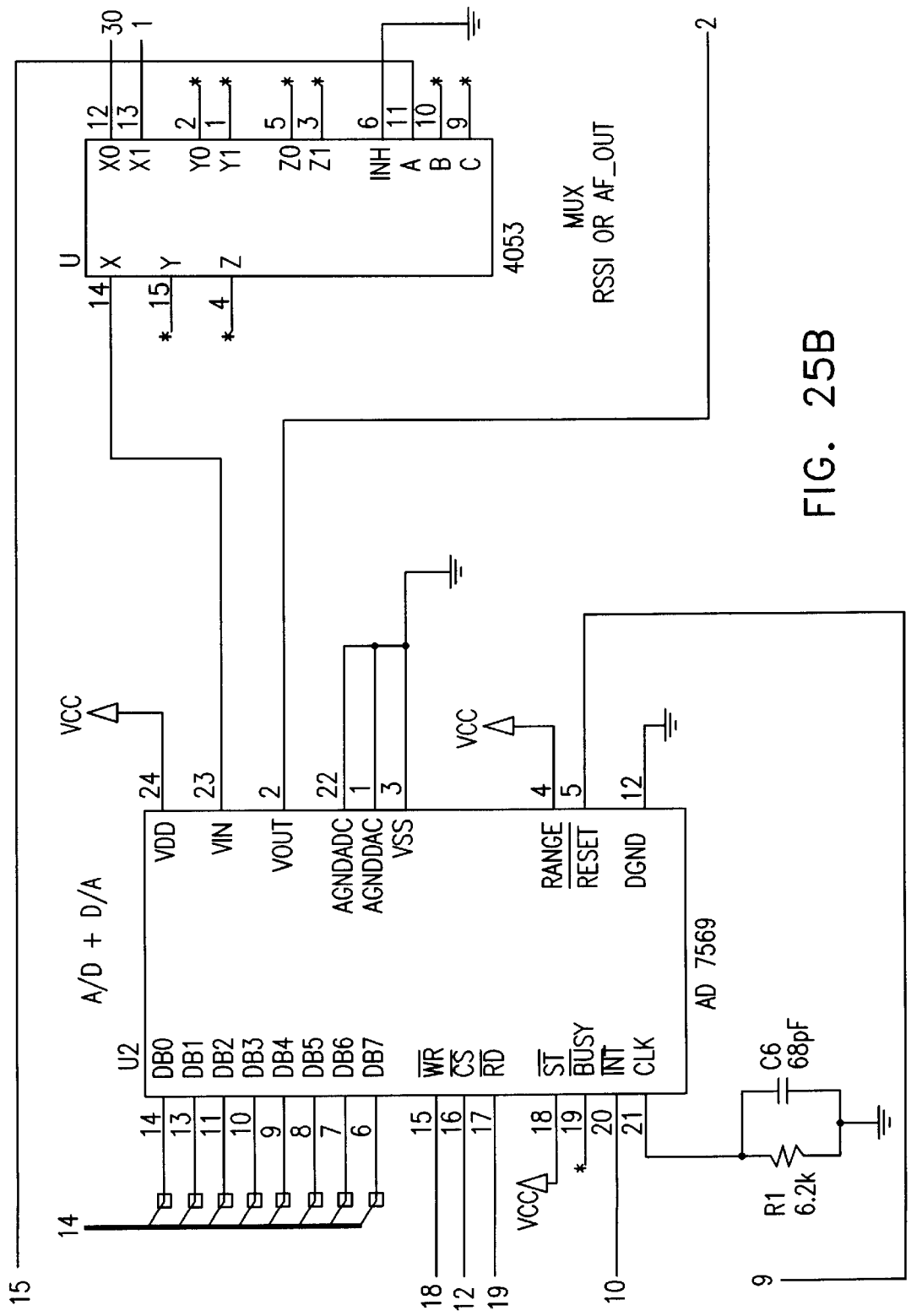
Figure 25C:
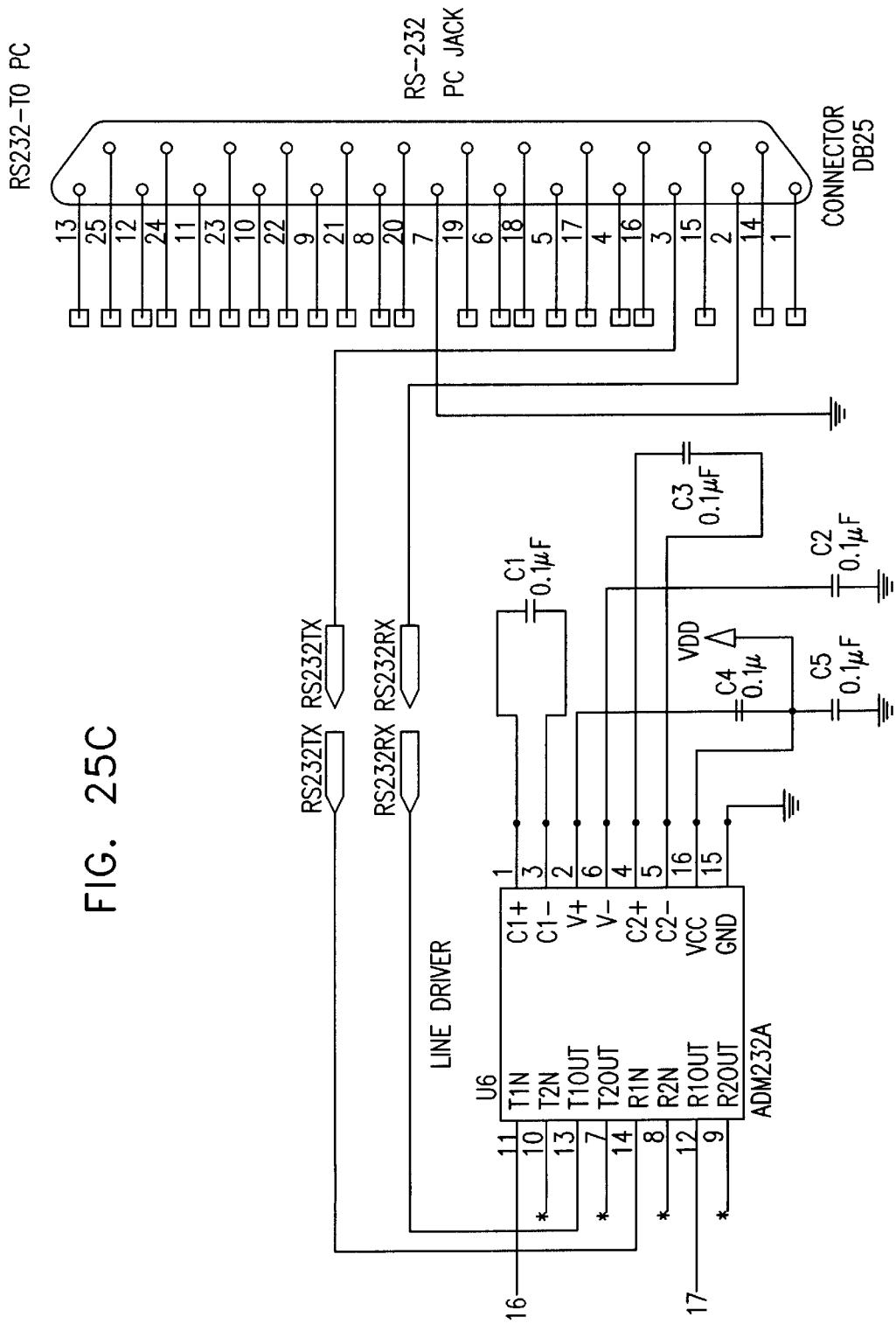
Figure 25D:
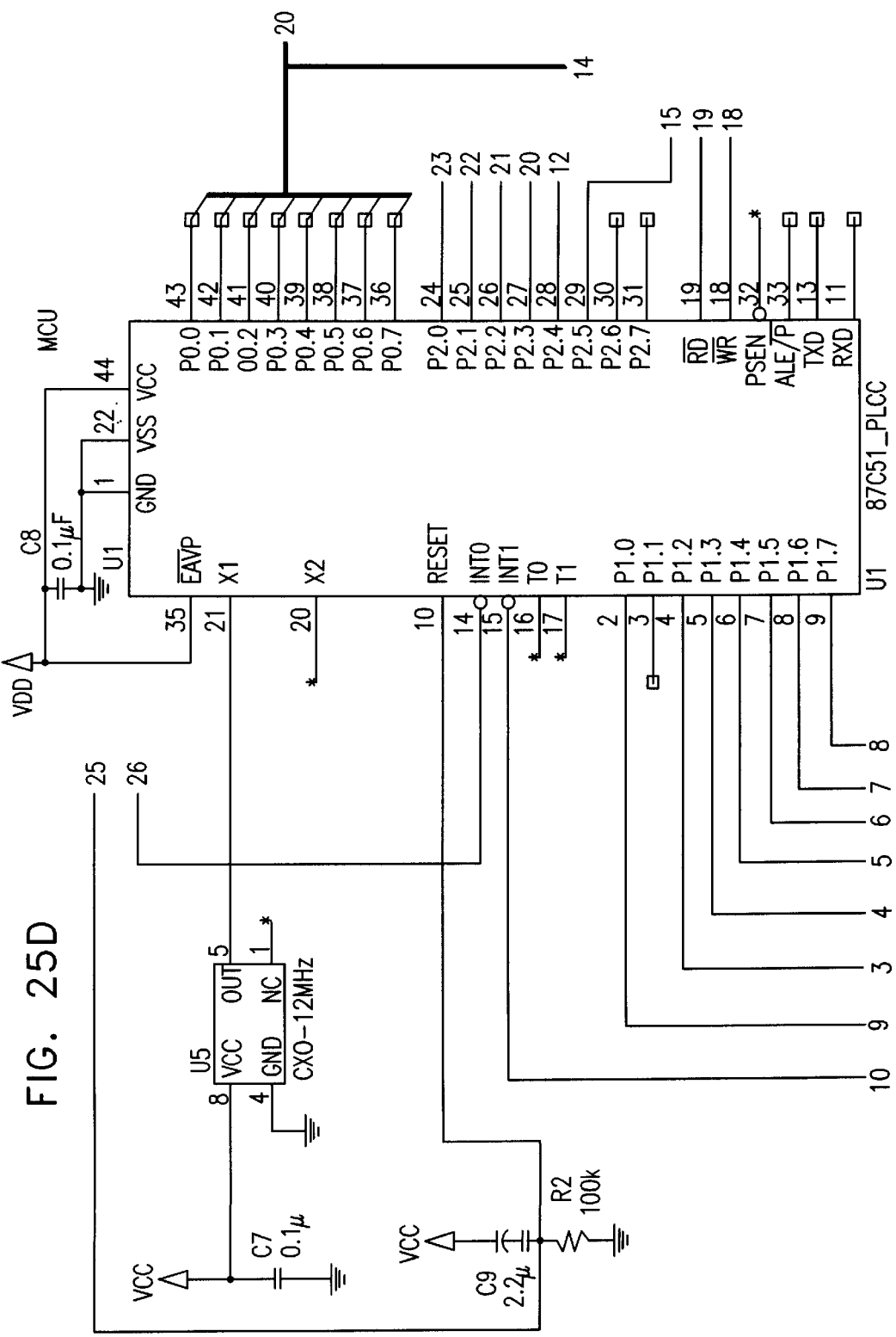
Figure 25E:
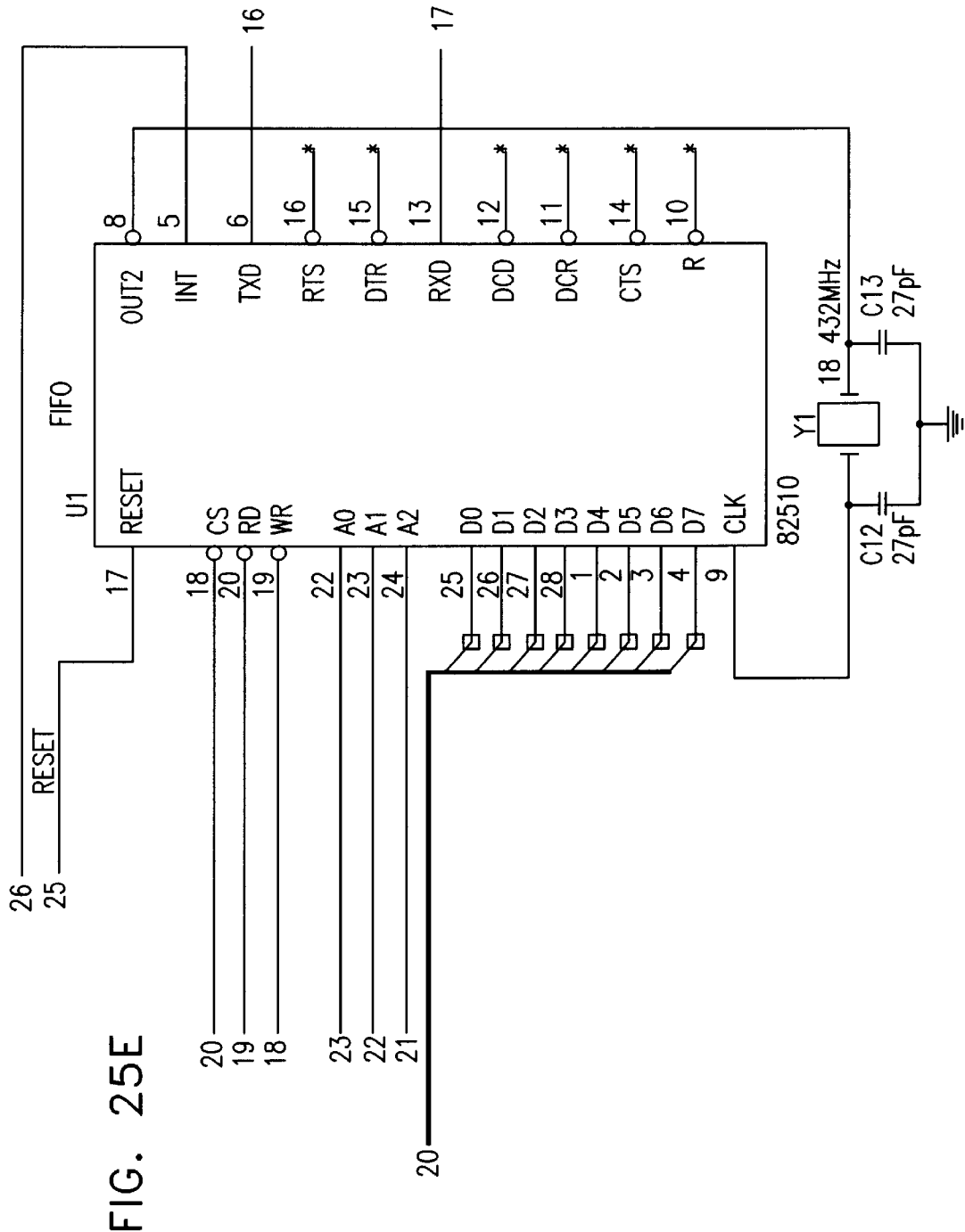
Figure 26A:
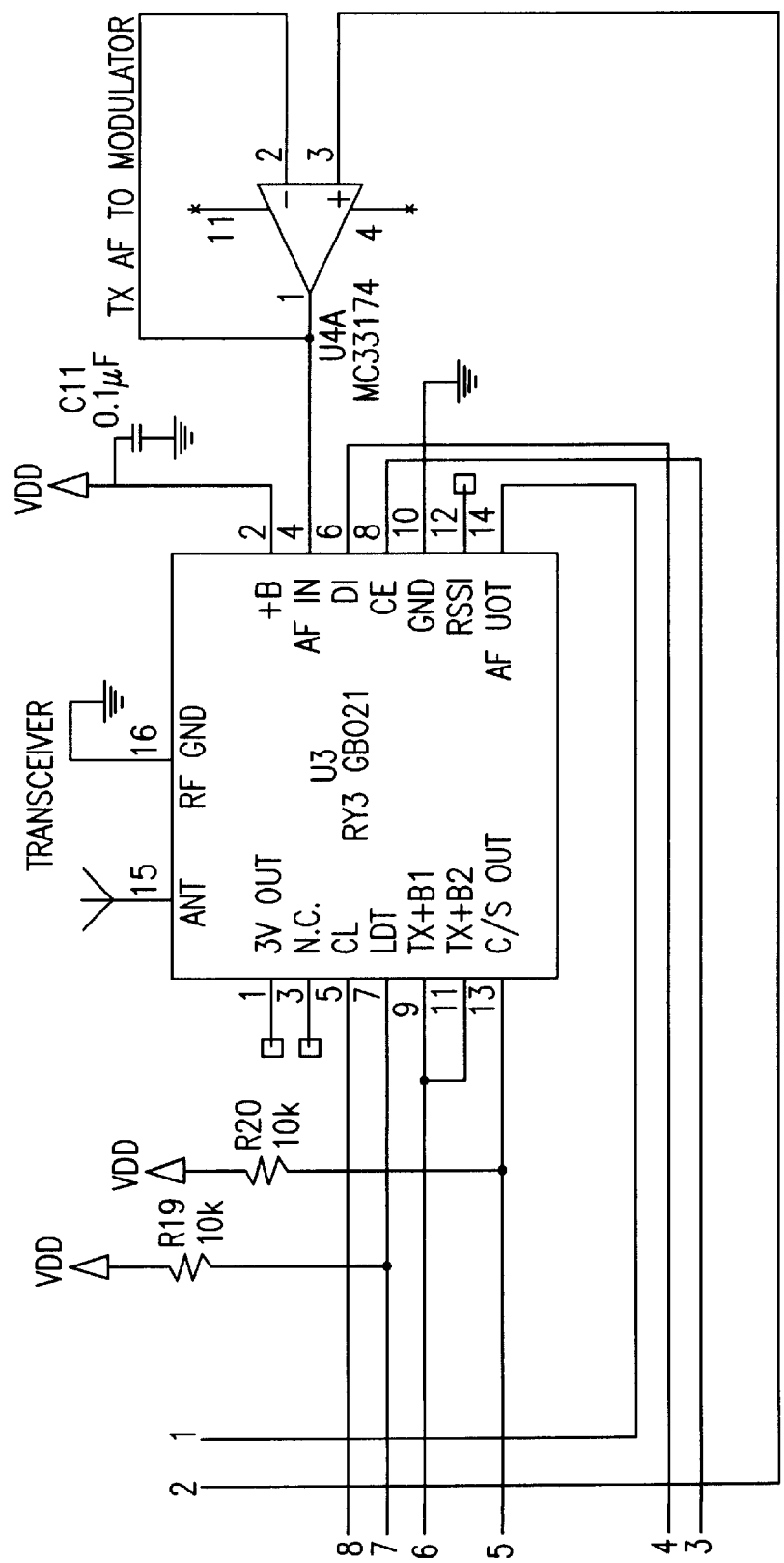
Figure 26B:
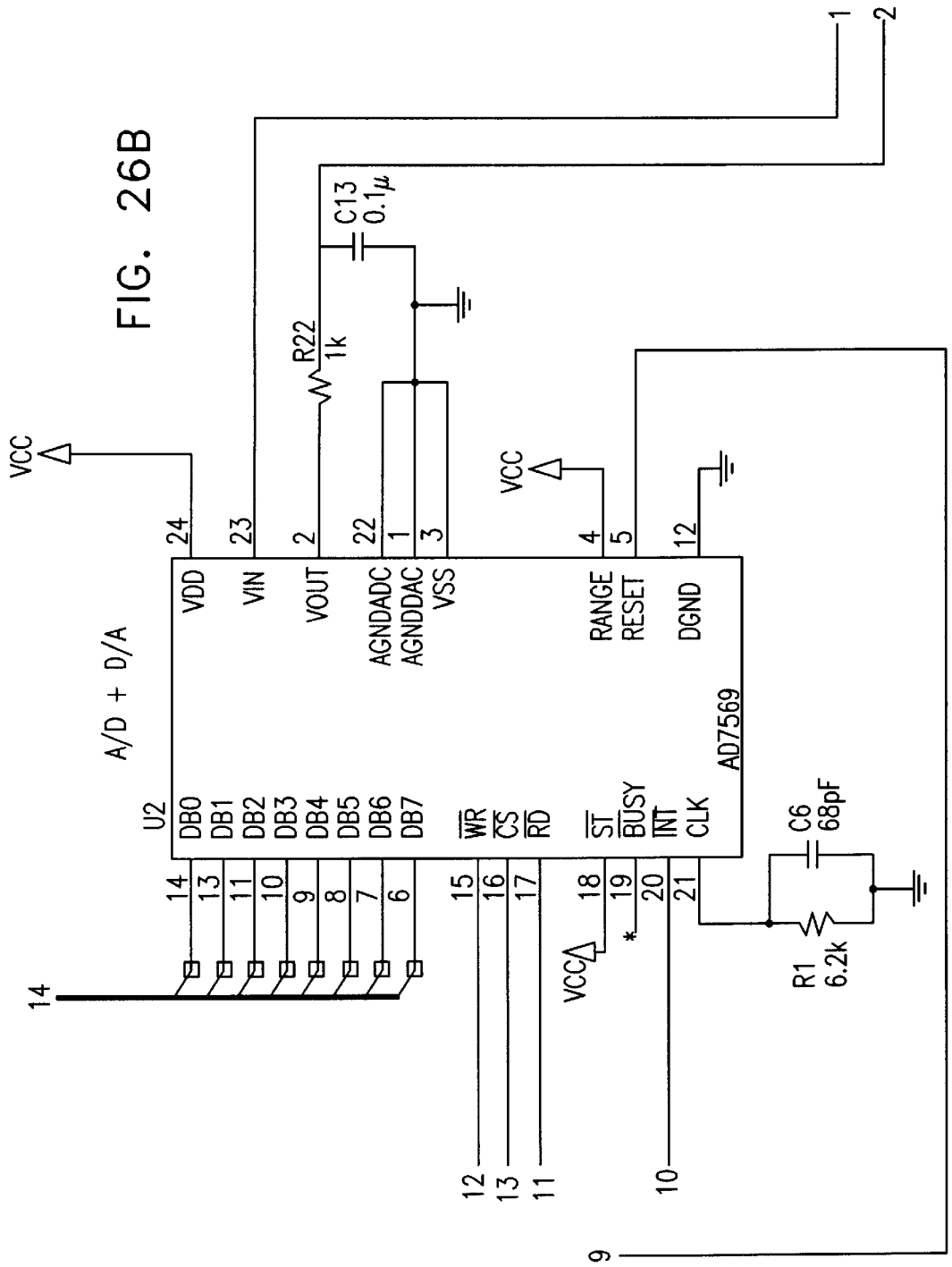
Figure 26C:
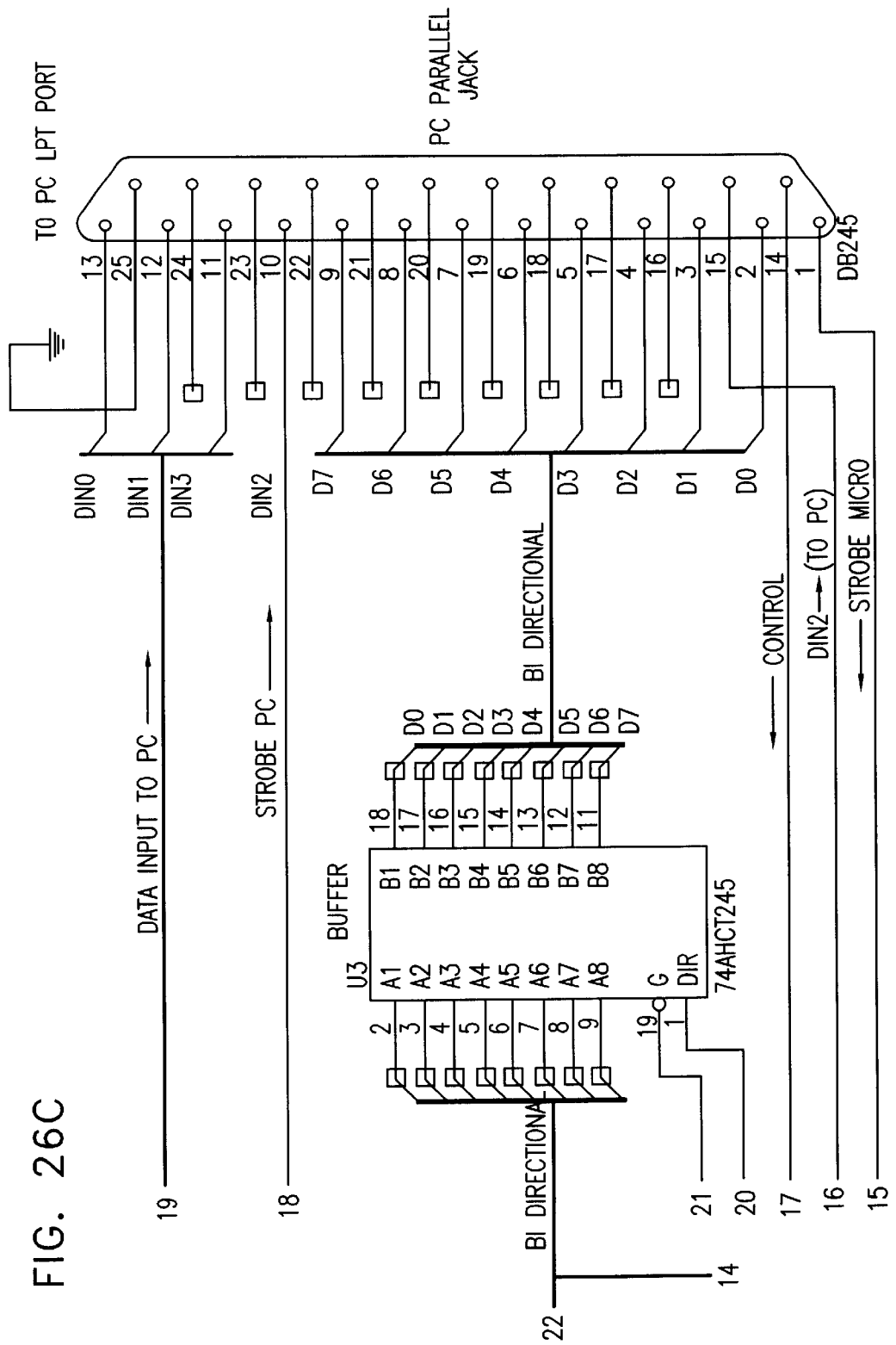
Figure 26D:
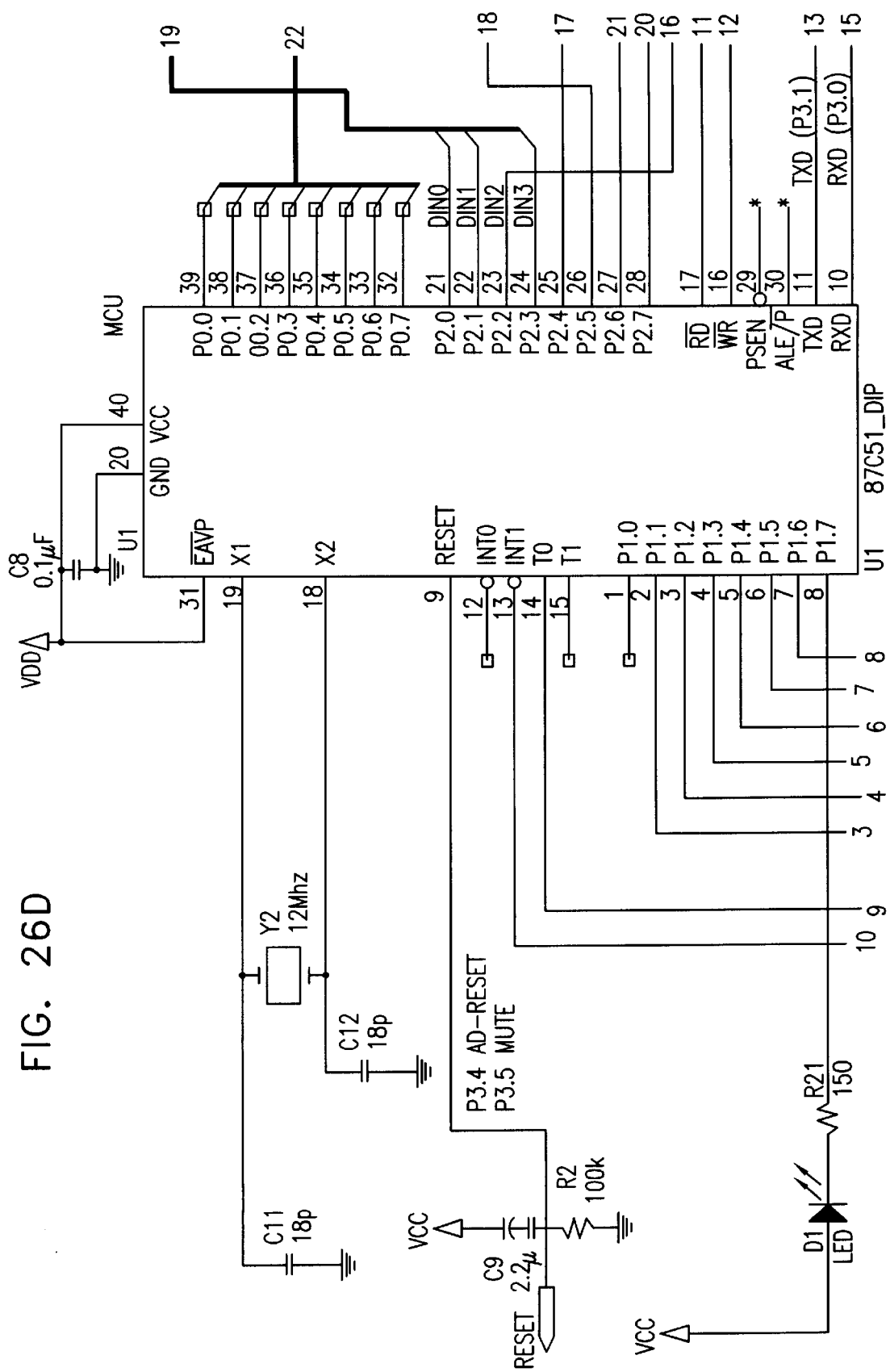
Figure 27A:
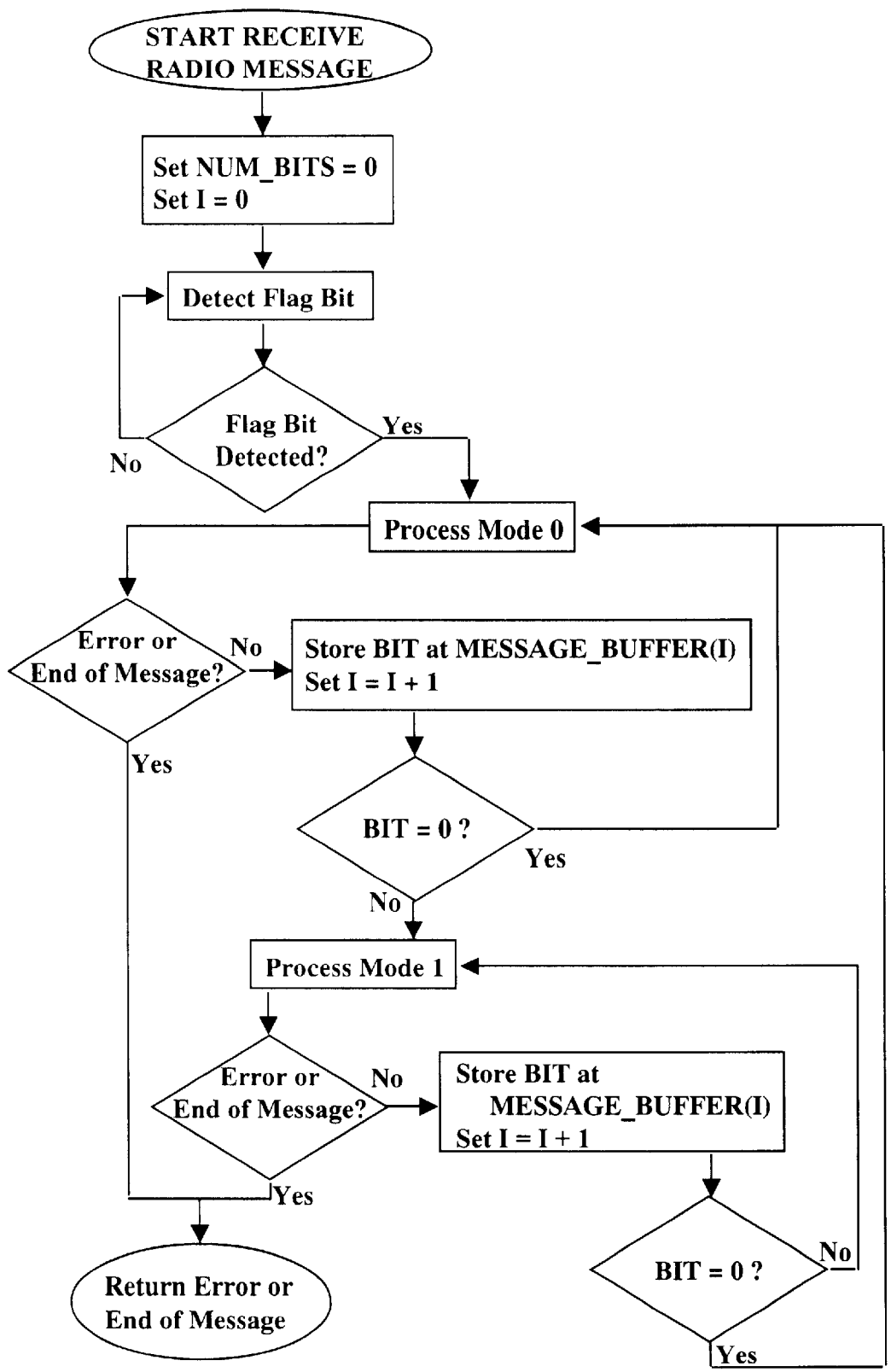
Figure 27B:
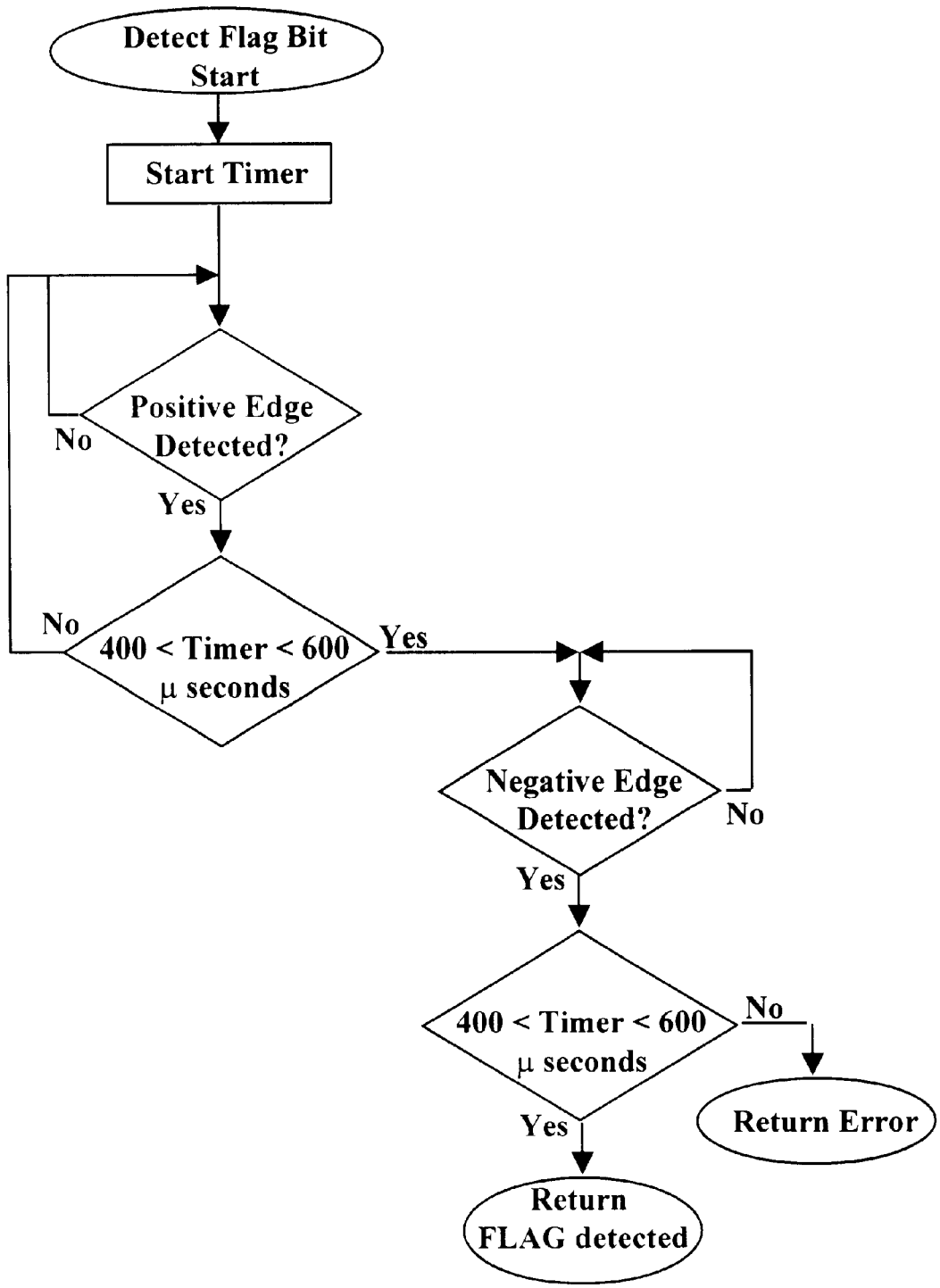
Figure 27C:
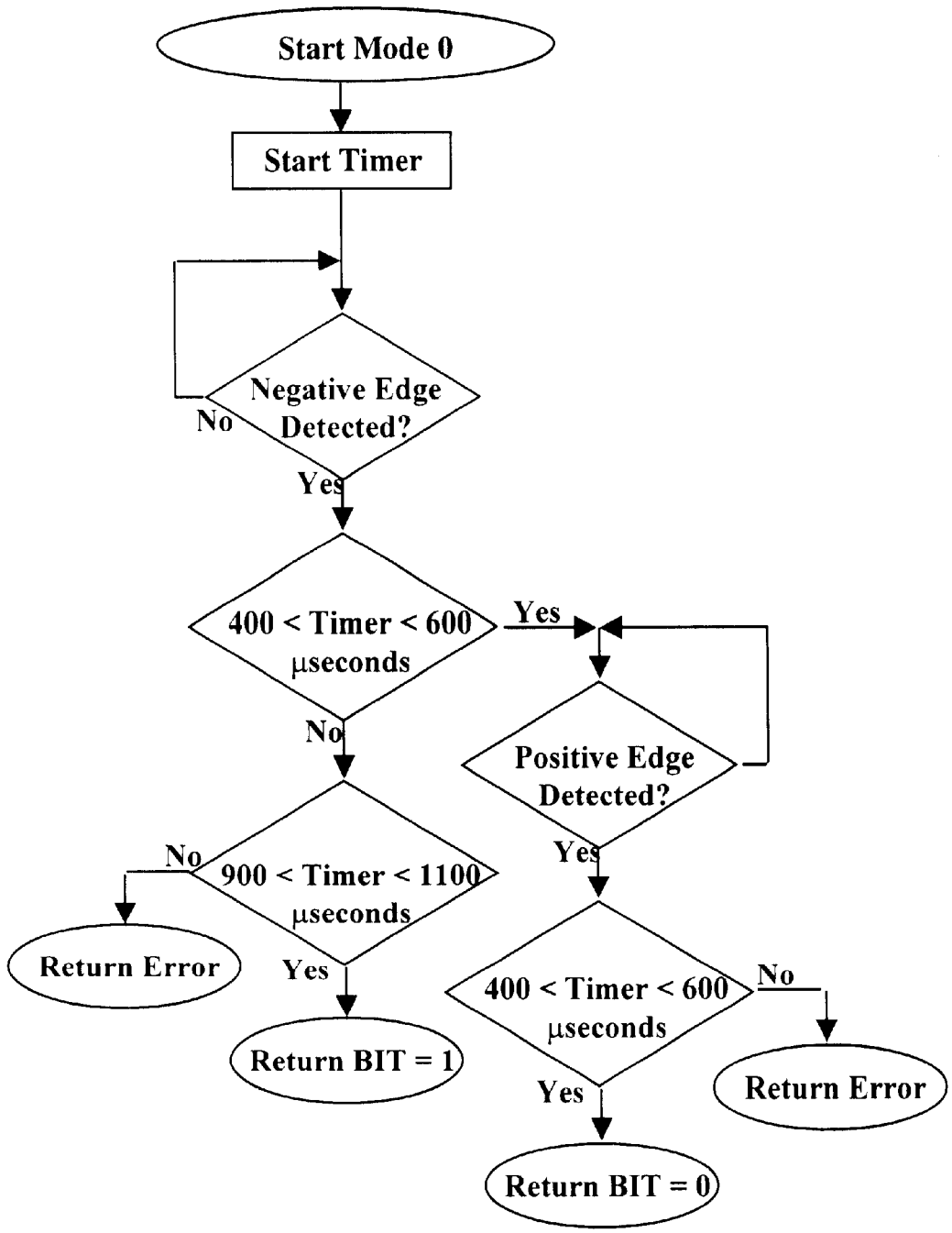
Figure 27D:
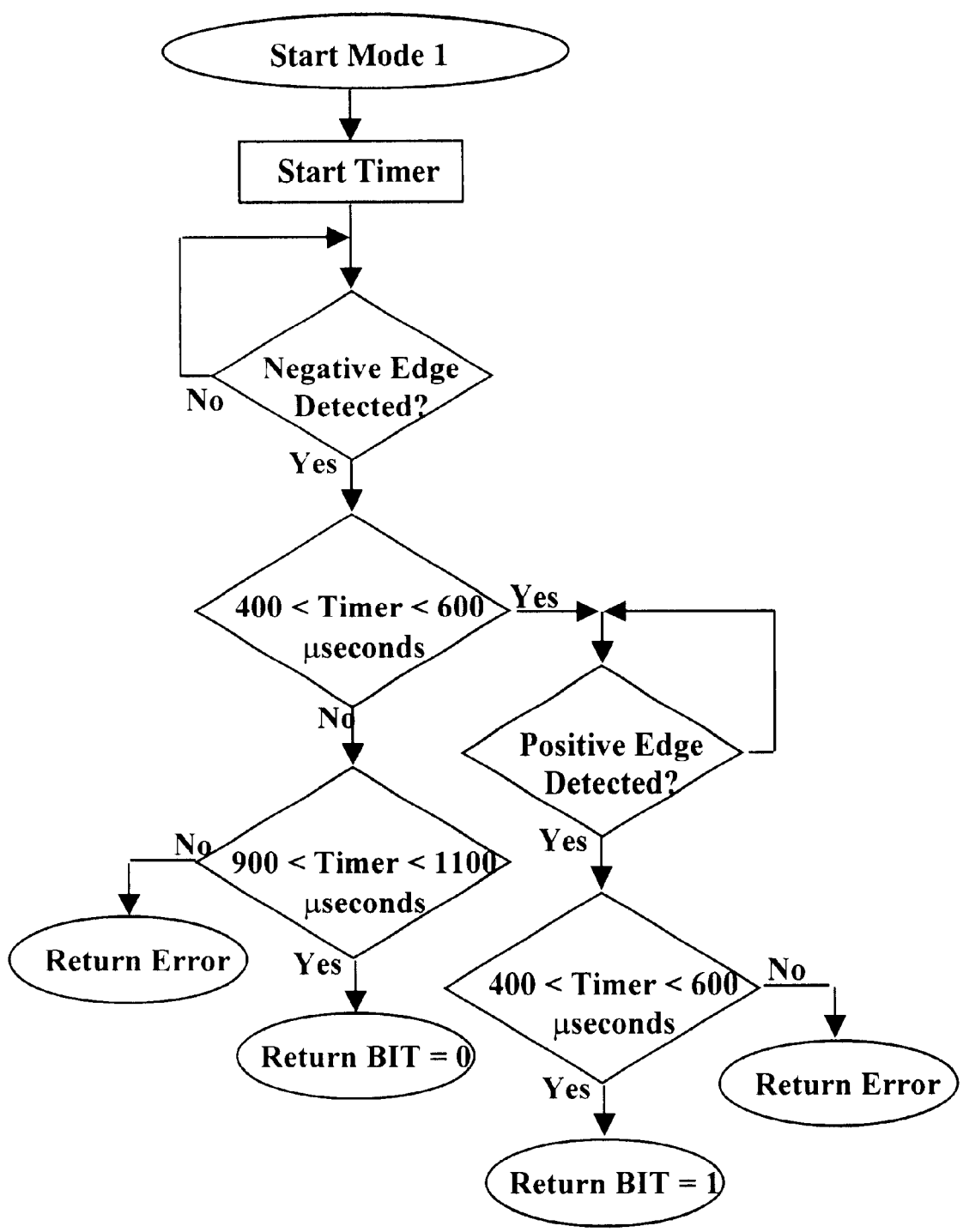
Figure 27E:
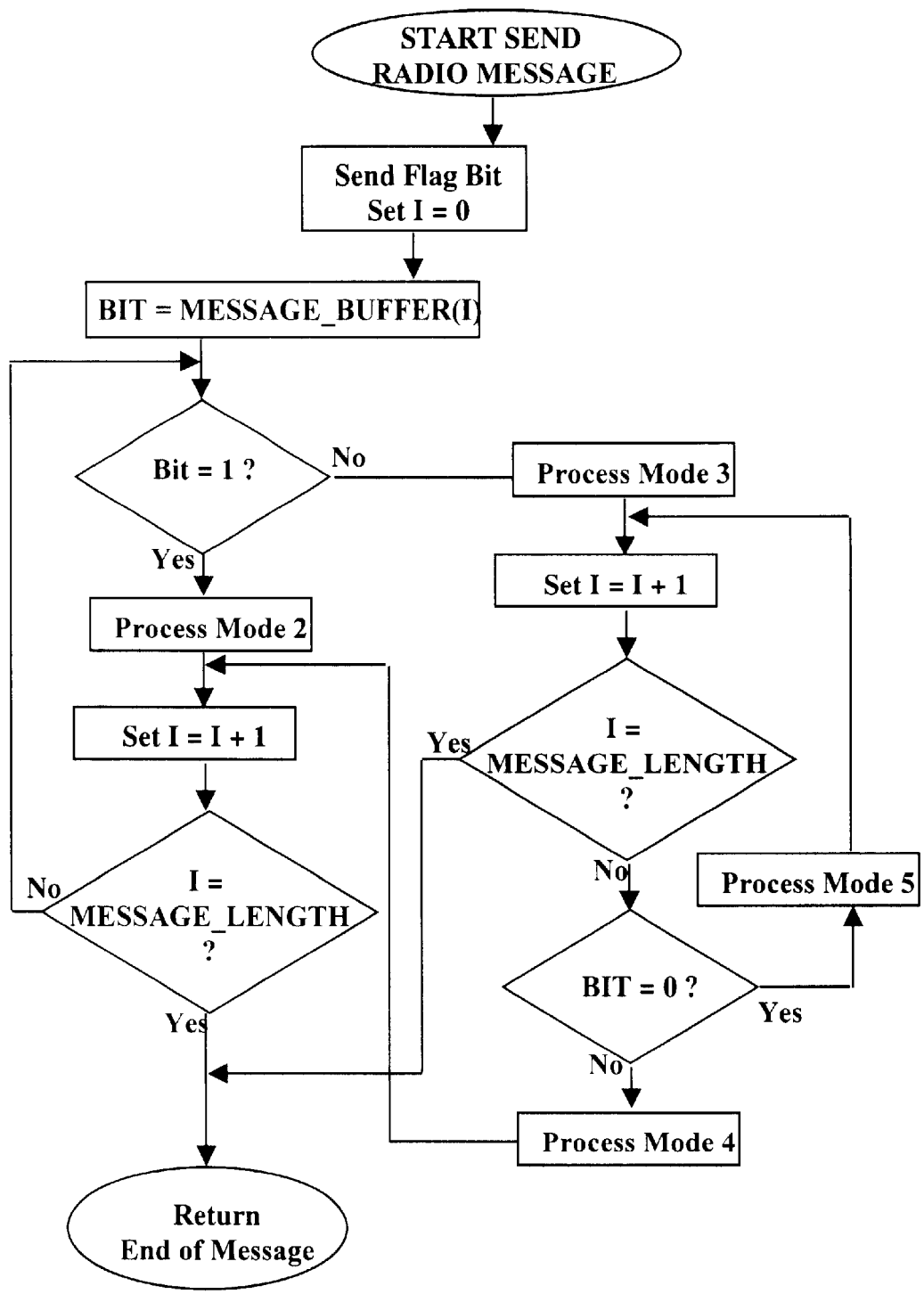
Figure 27F:
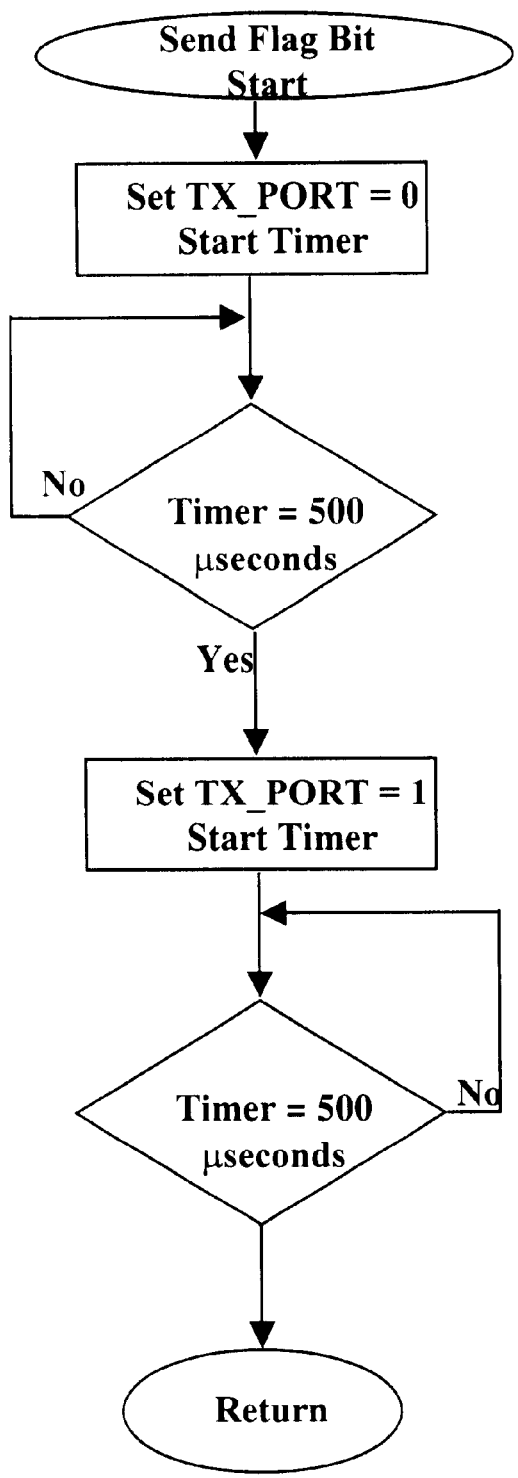
Figure 27G:
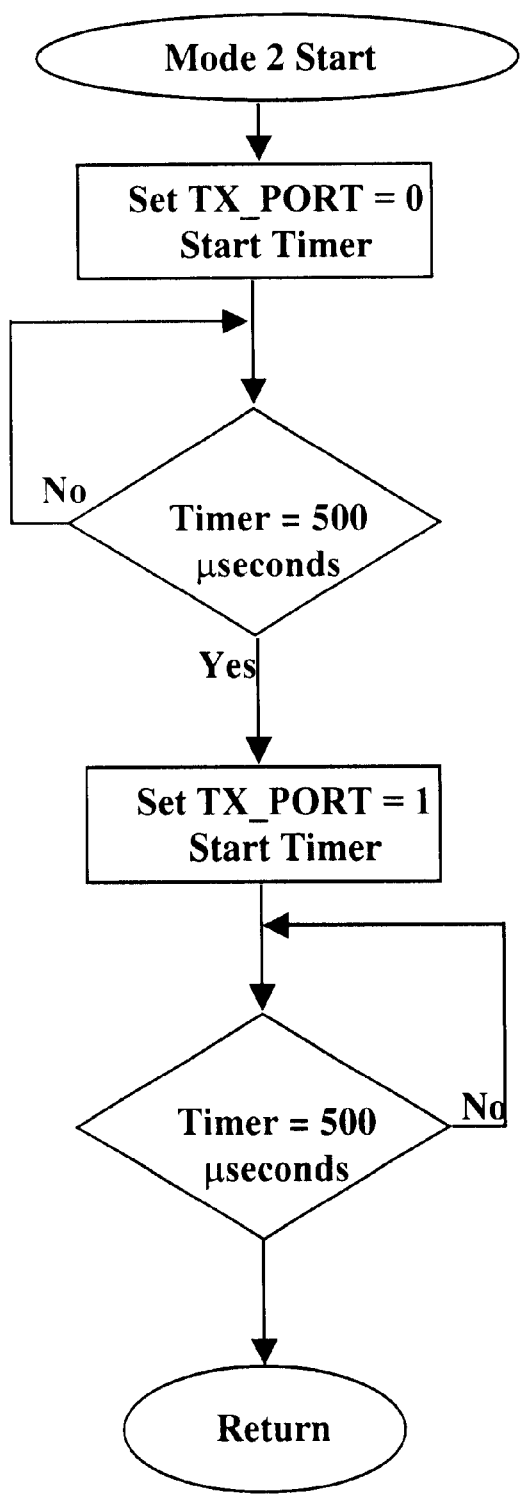
Figure 27H:
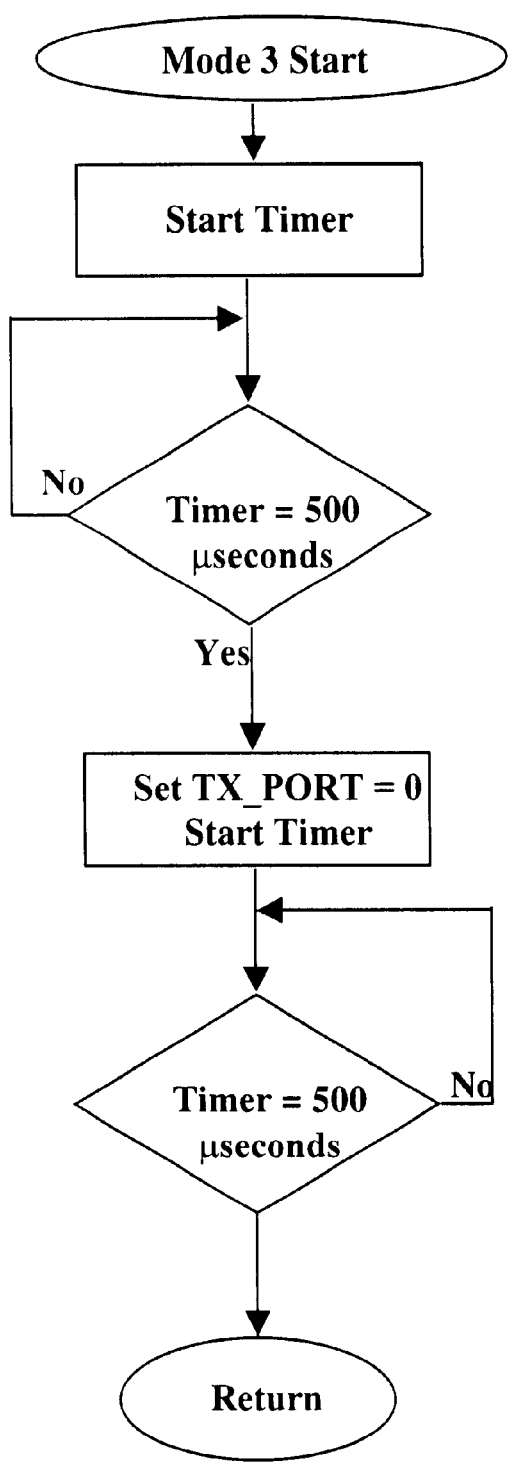
Figure 27I:
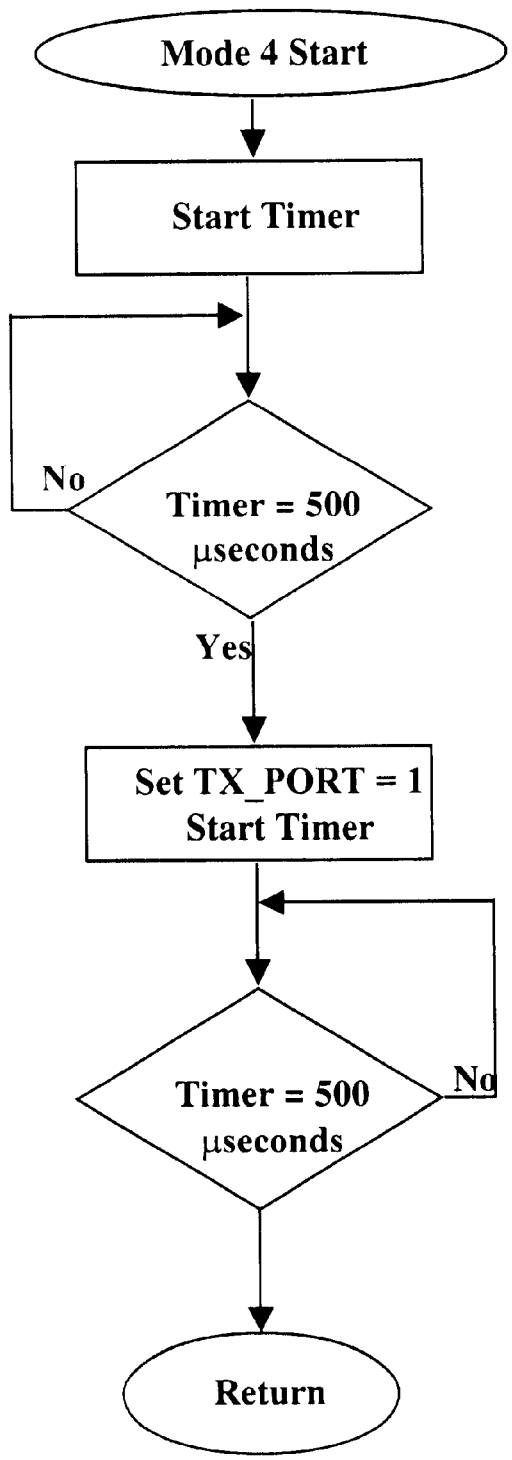
Figure 27J:
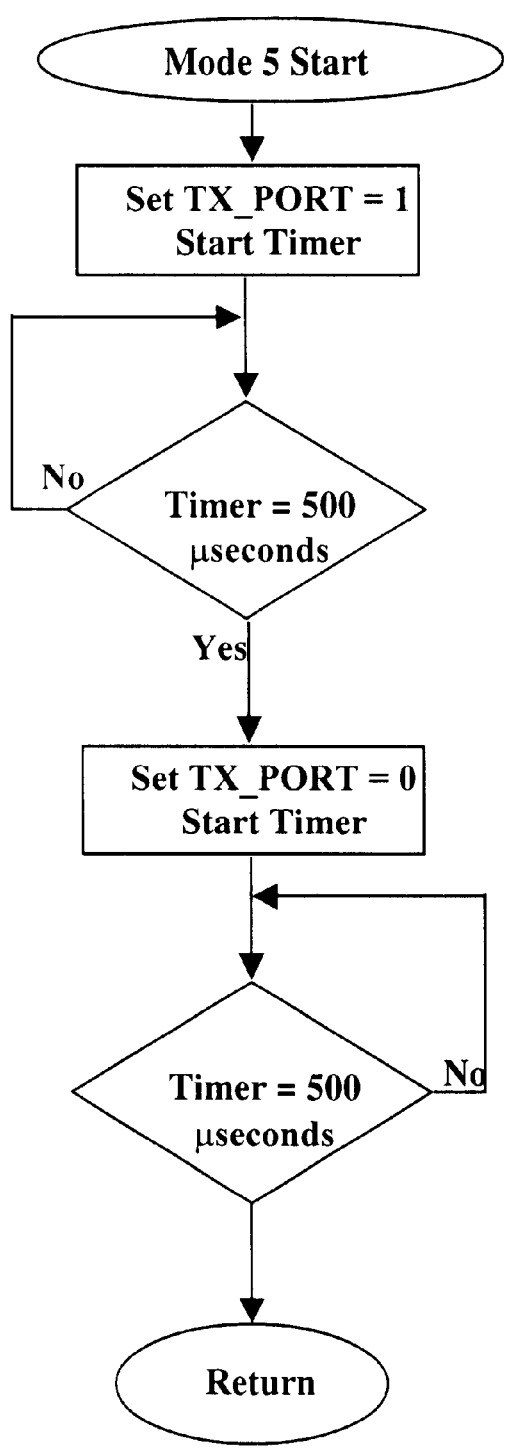
Figure 28A:
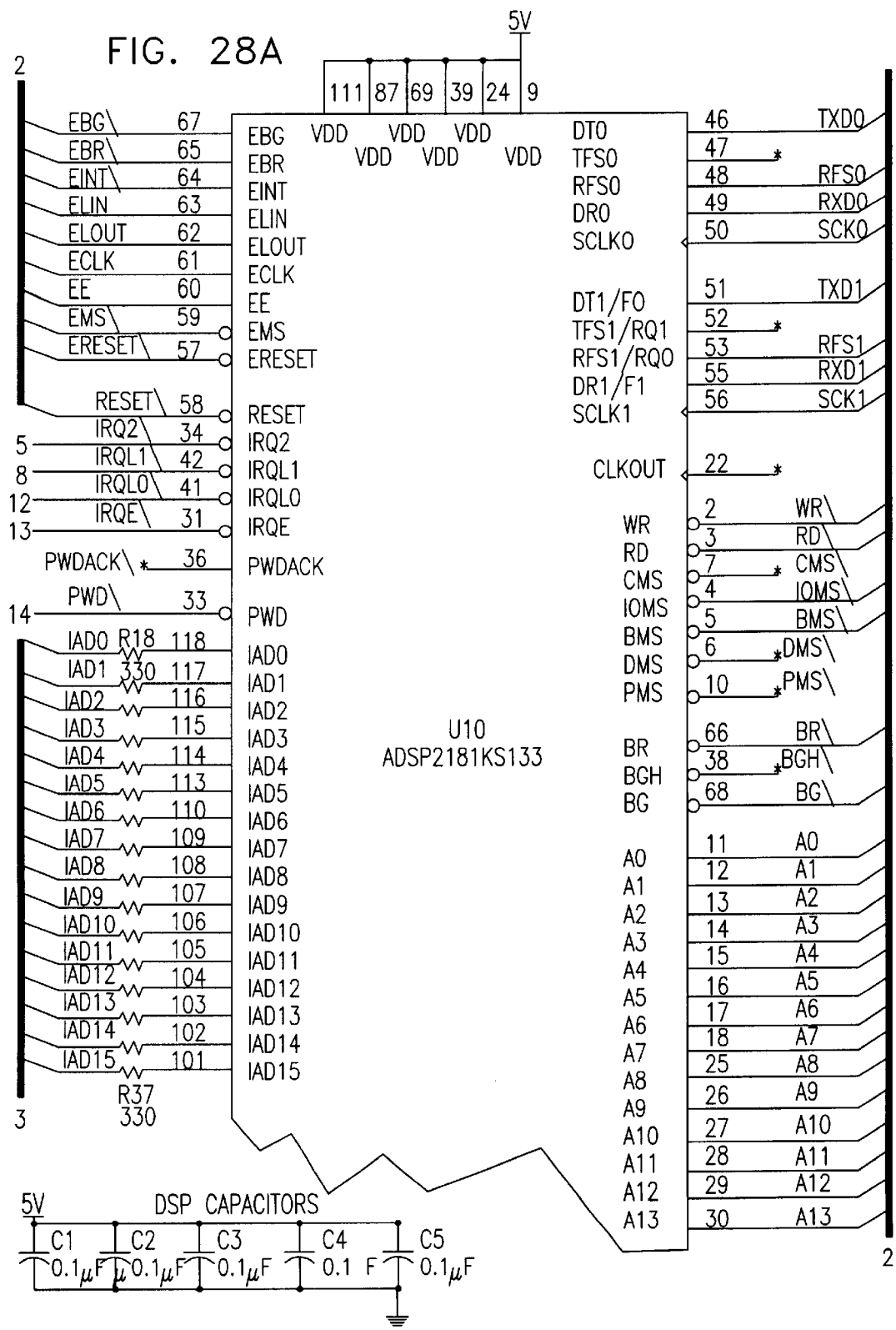
Figure 28B:
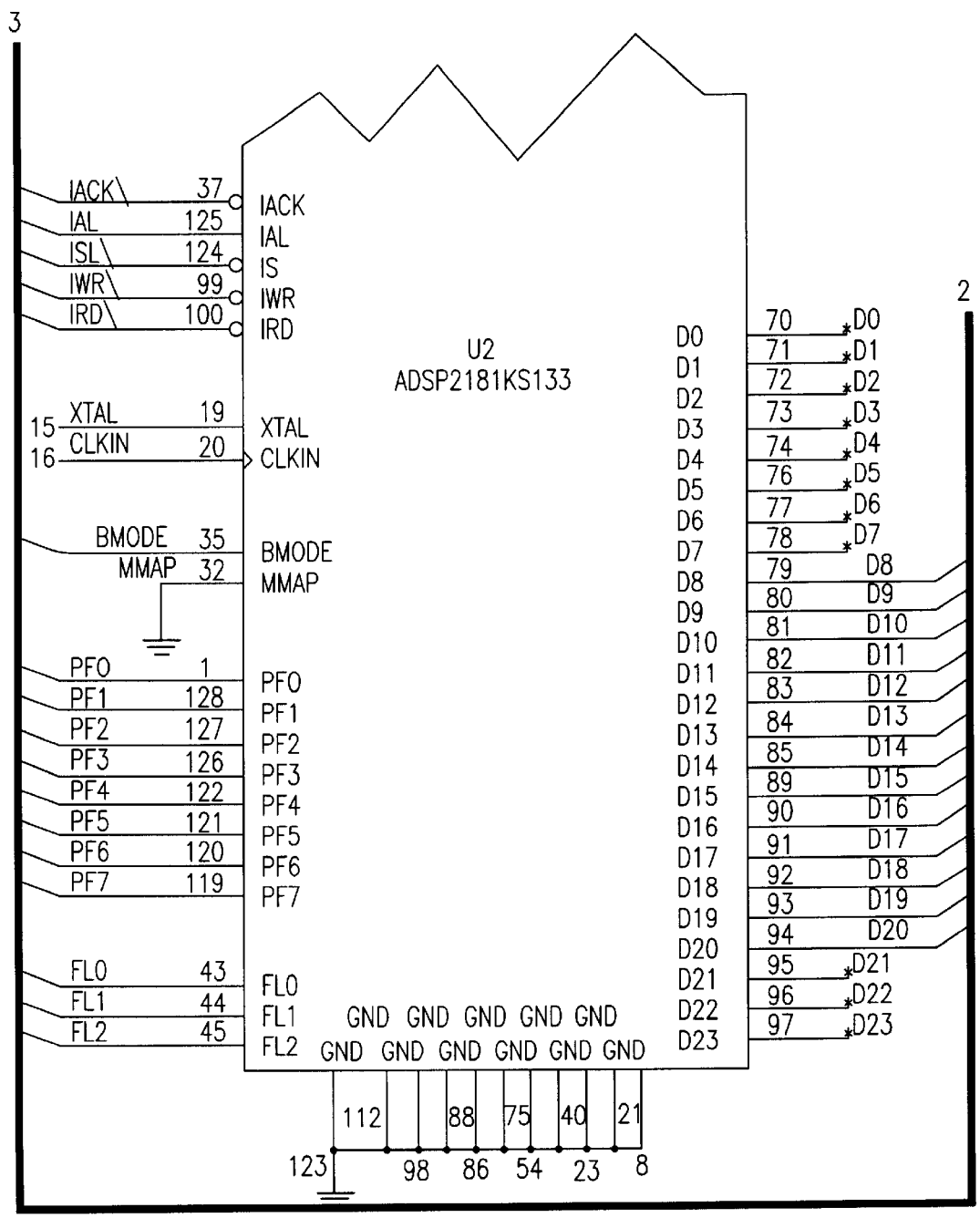
Figure 28C:
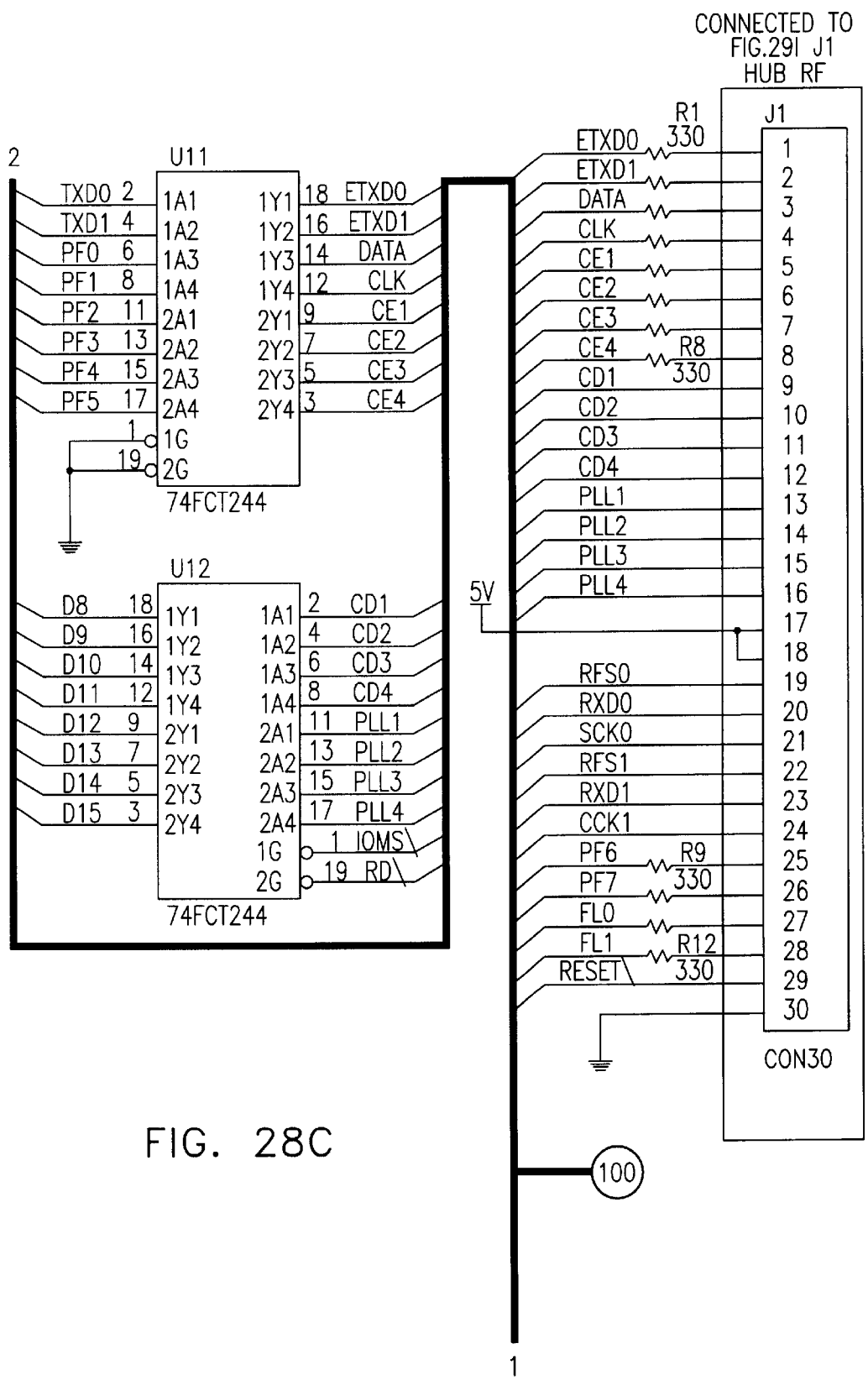
Figure 28D:
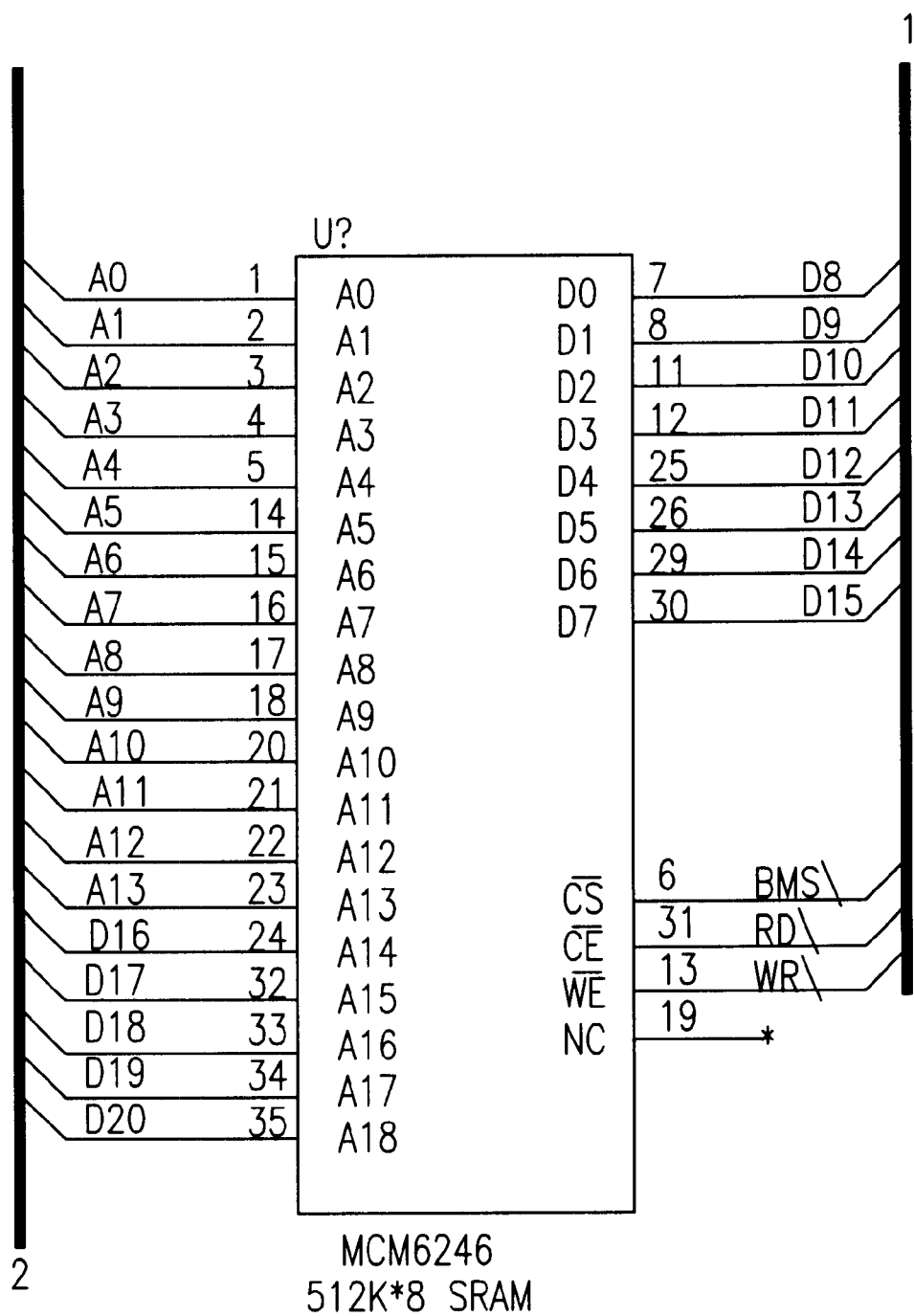
Figure 28E:
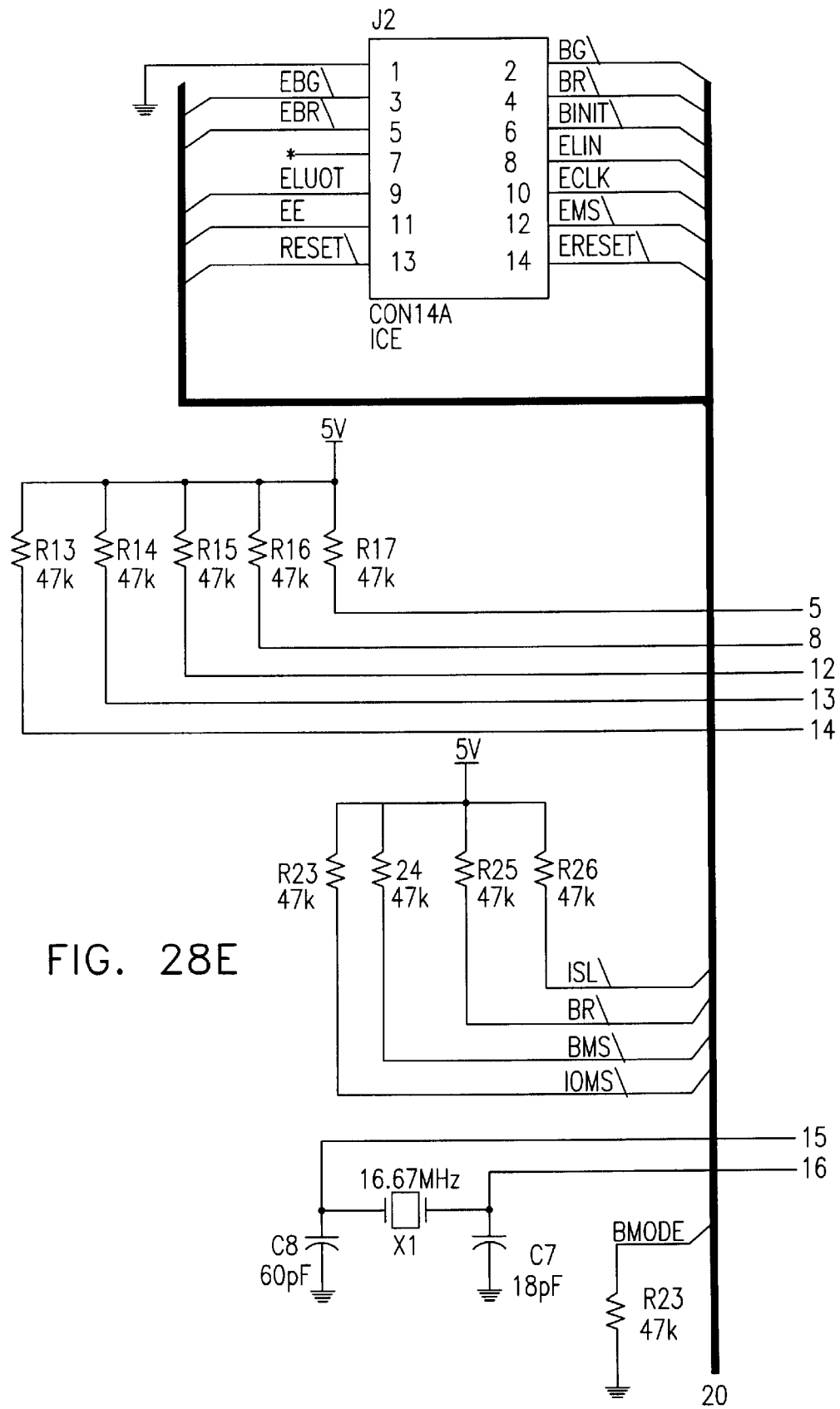
Figure 28F:
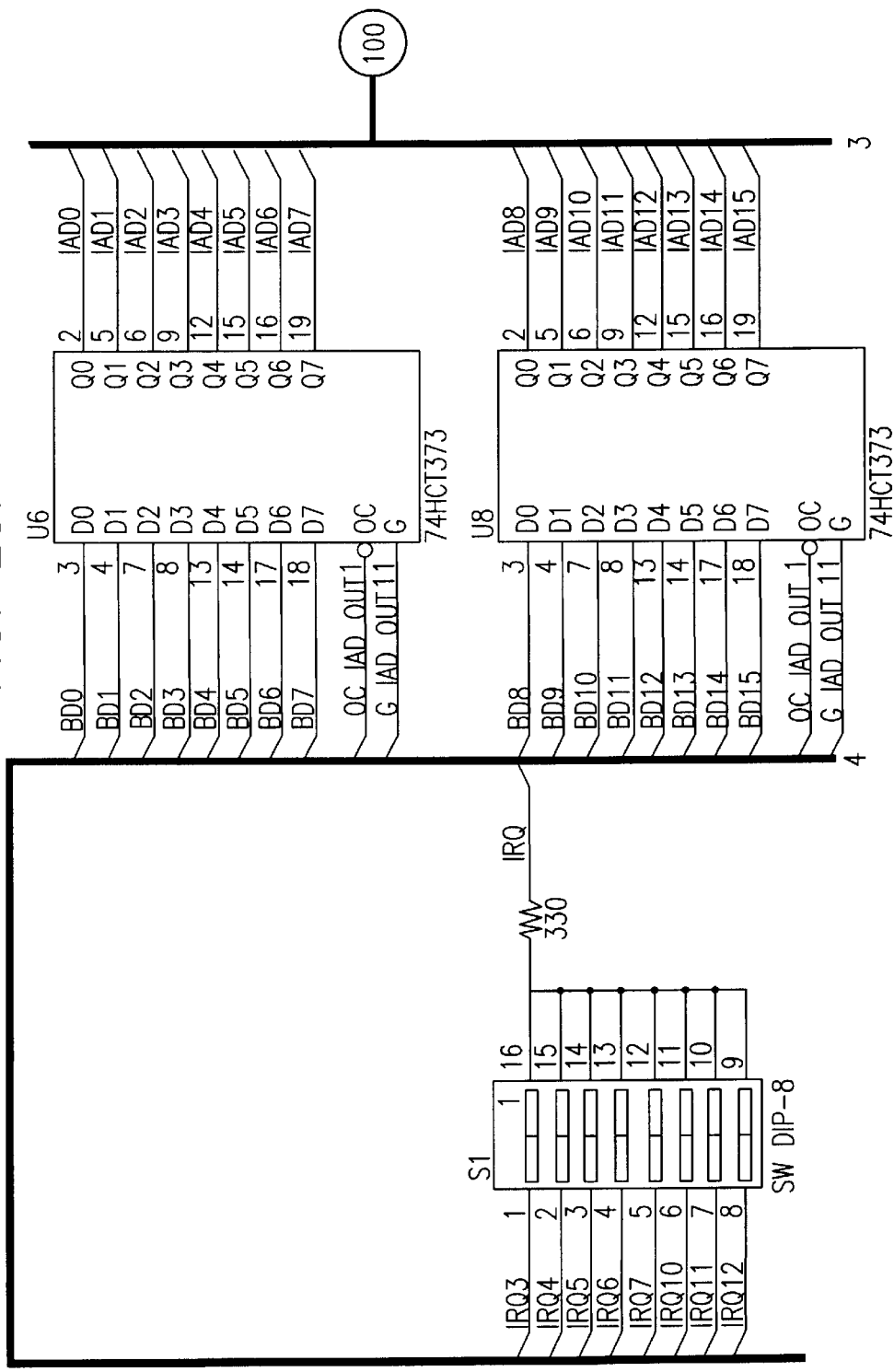
Figure 28G:
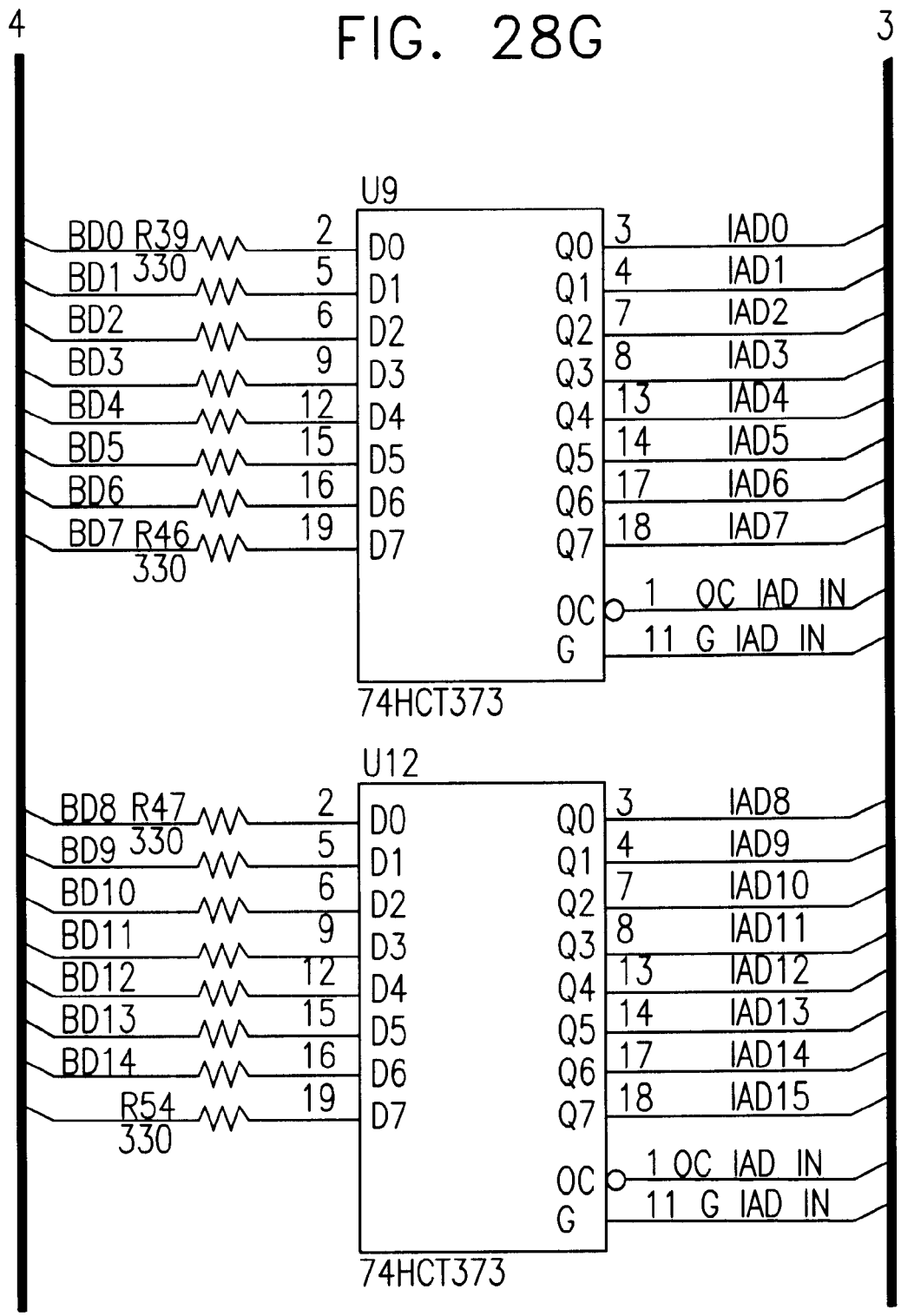
Figure 28H:
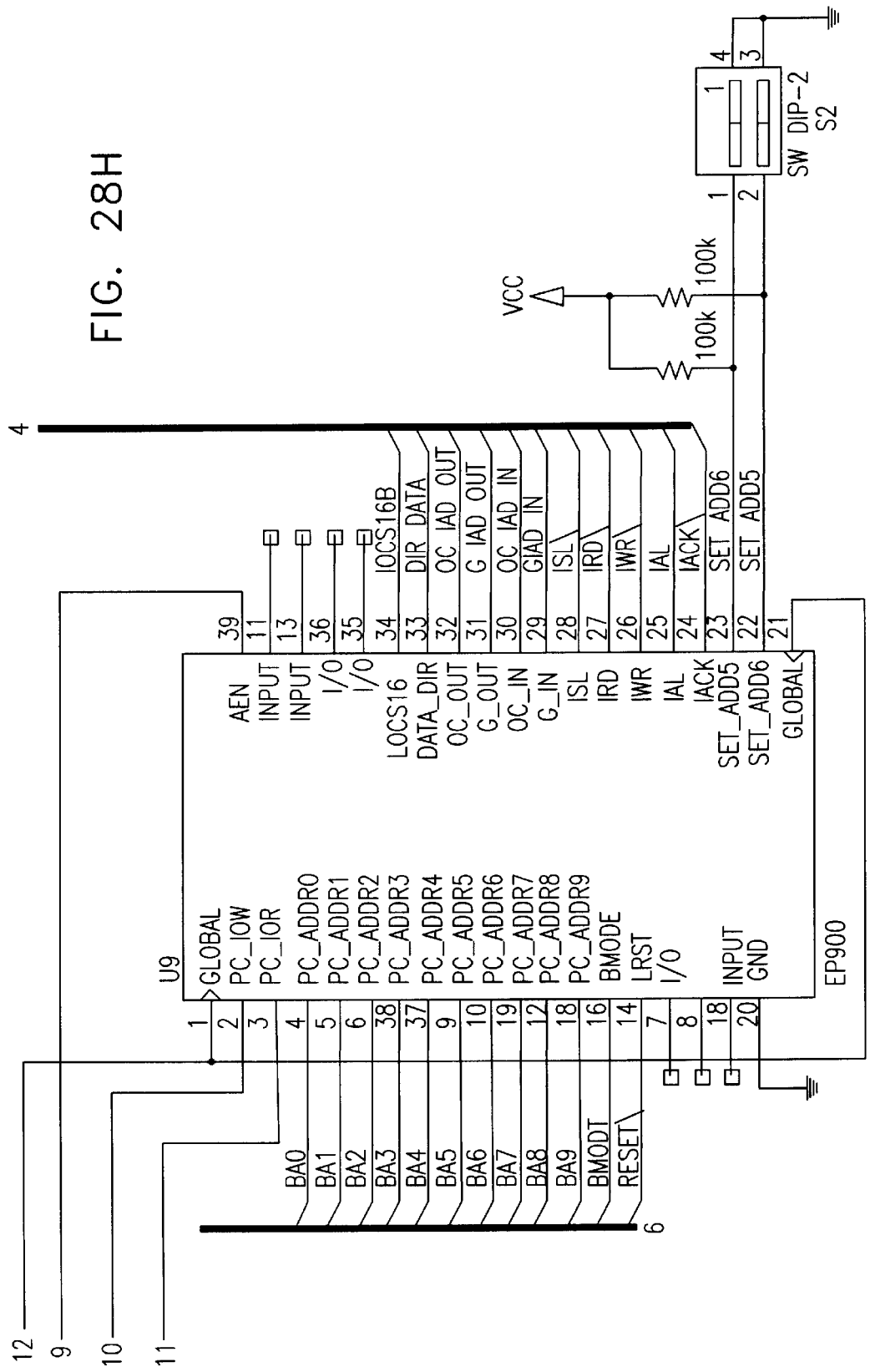
Figure 281:
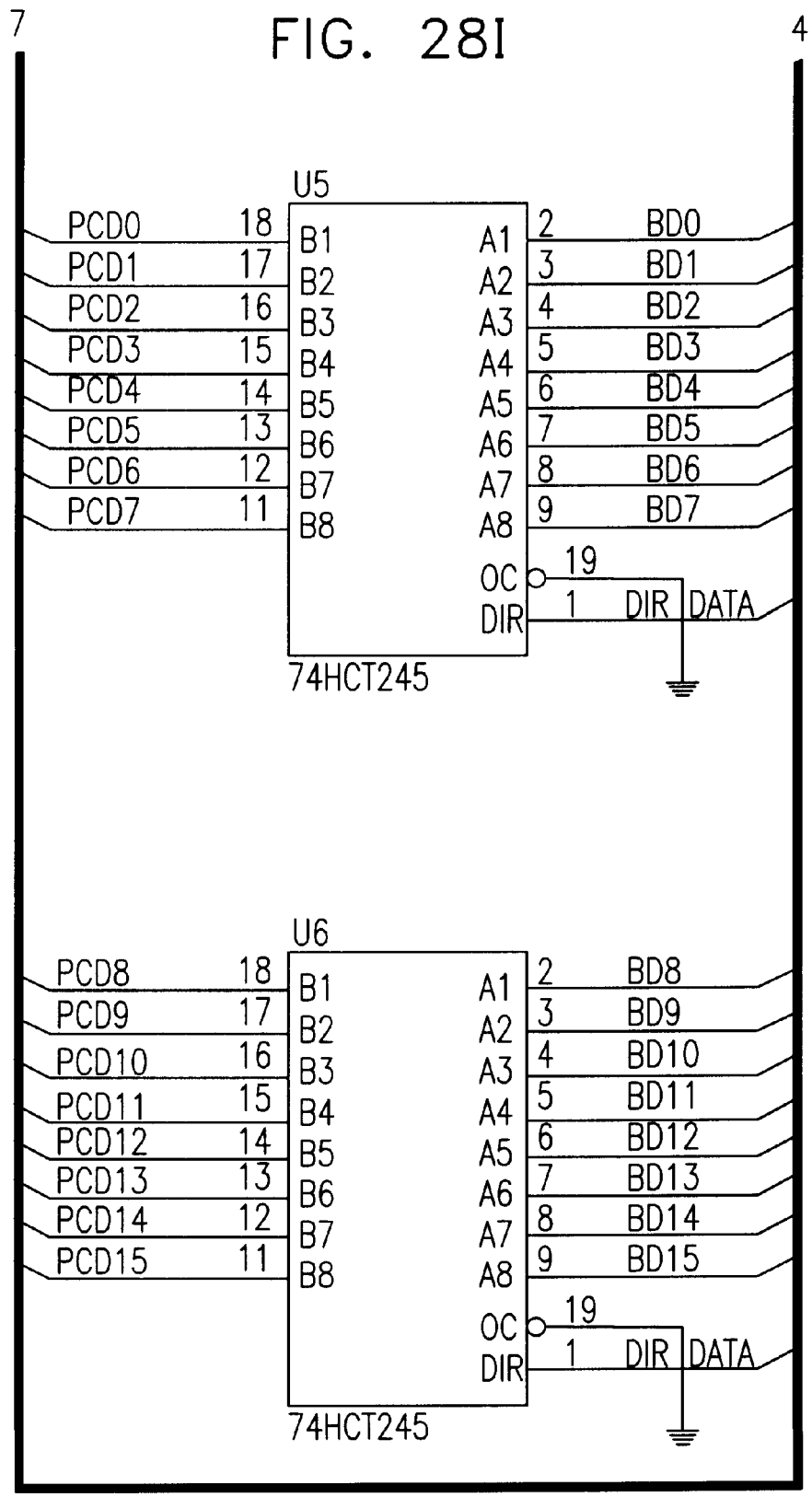
Figure 28J:
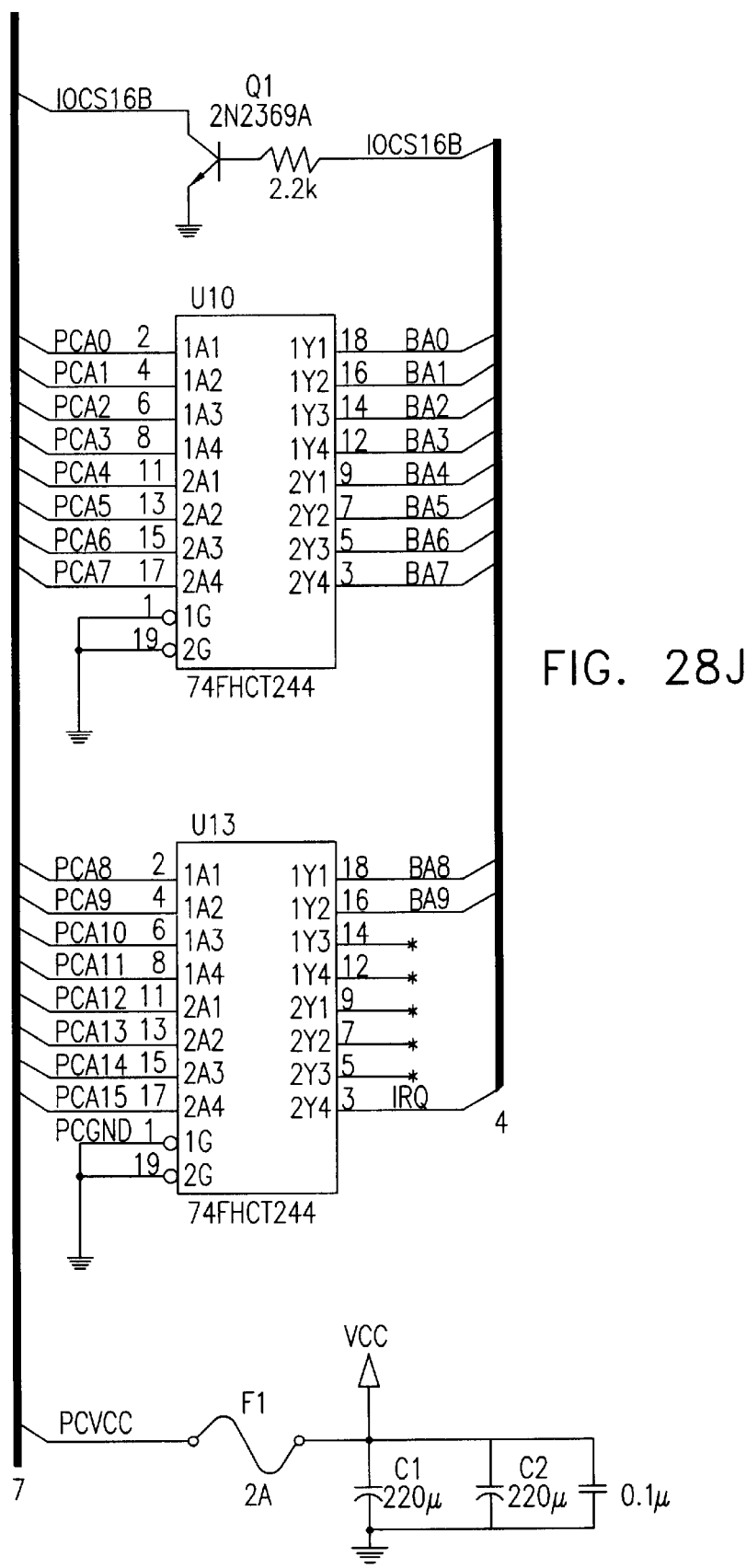
Figure 28K:
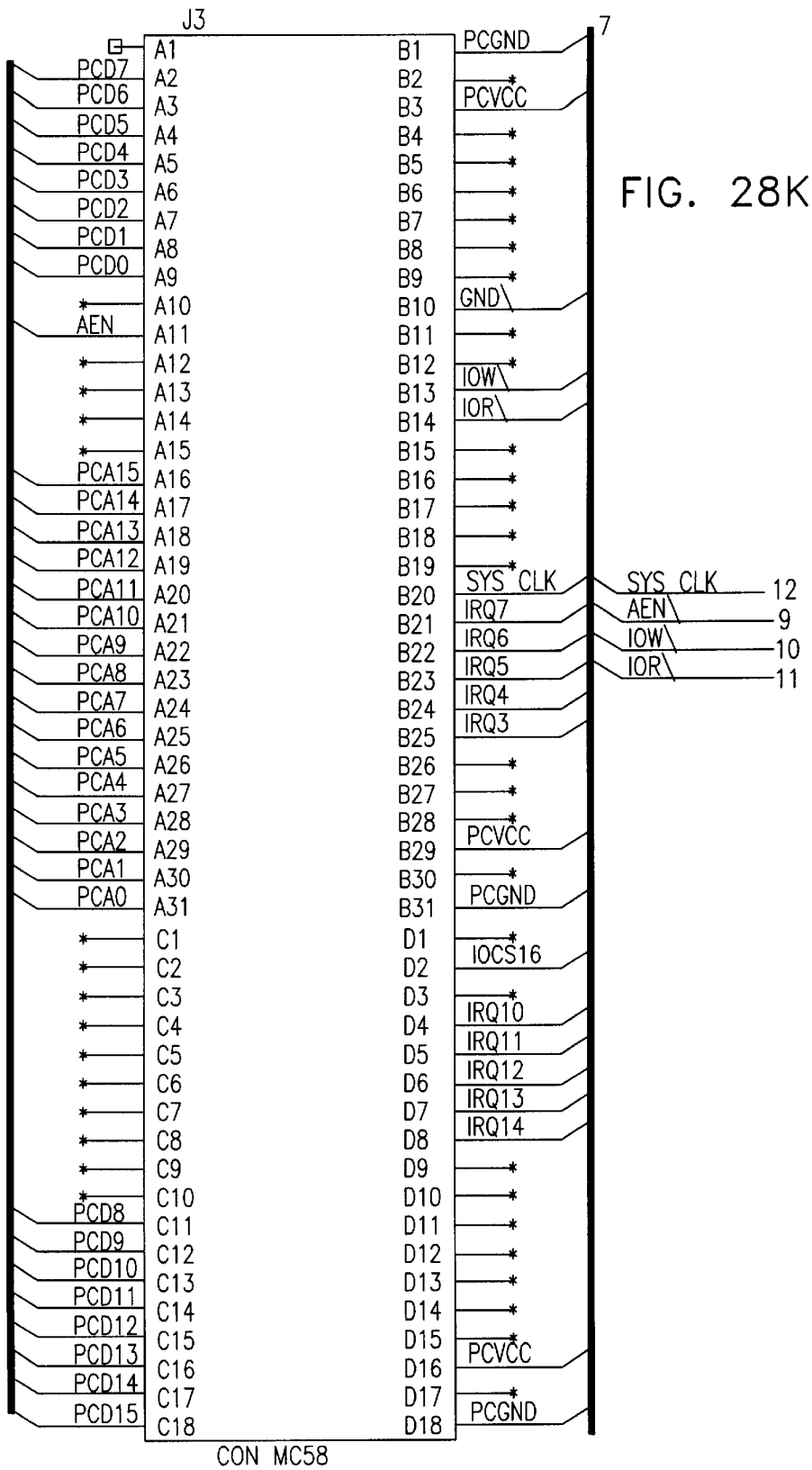
Figure 29A:
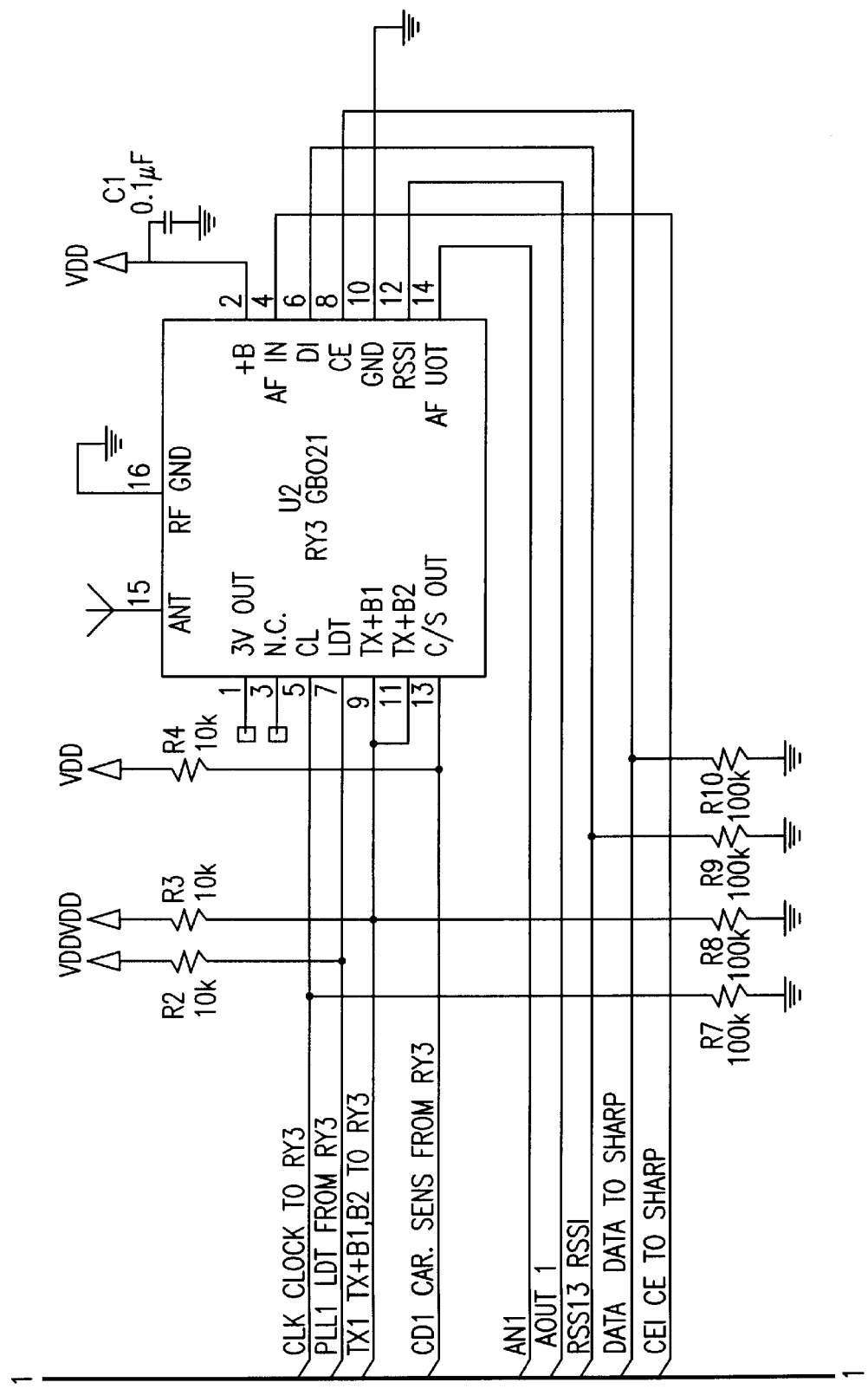
Figure 29B:
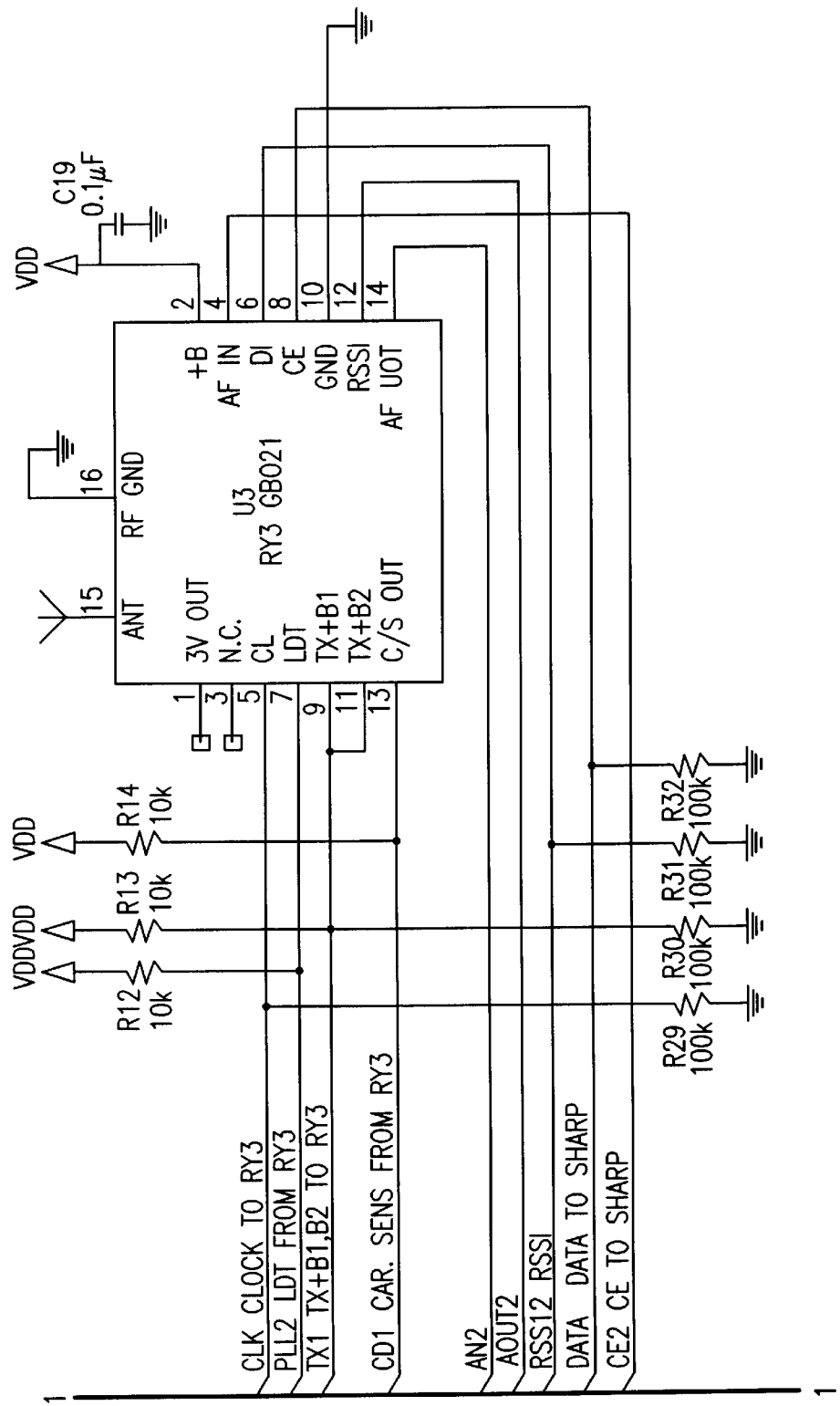
Figure 29C:
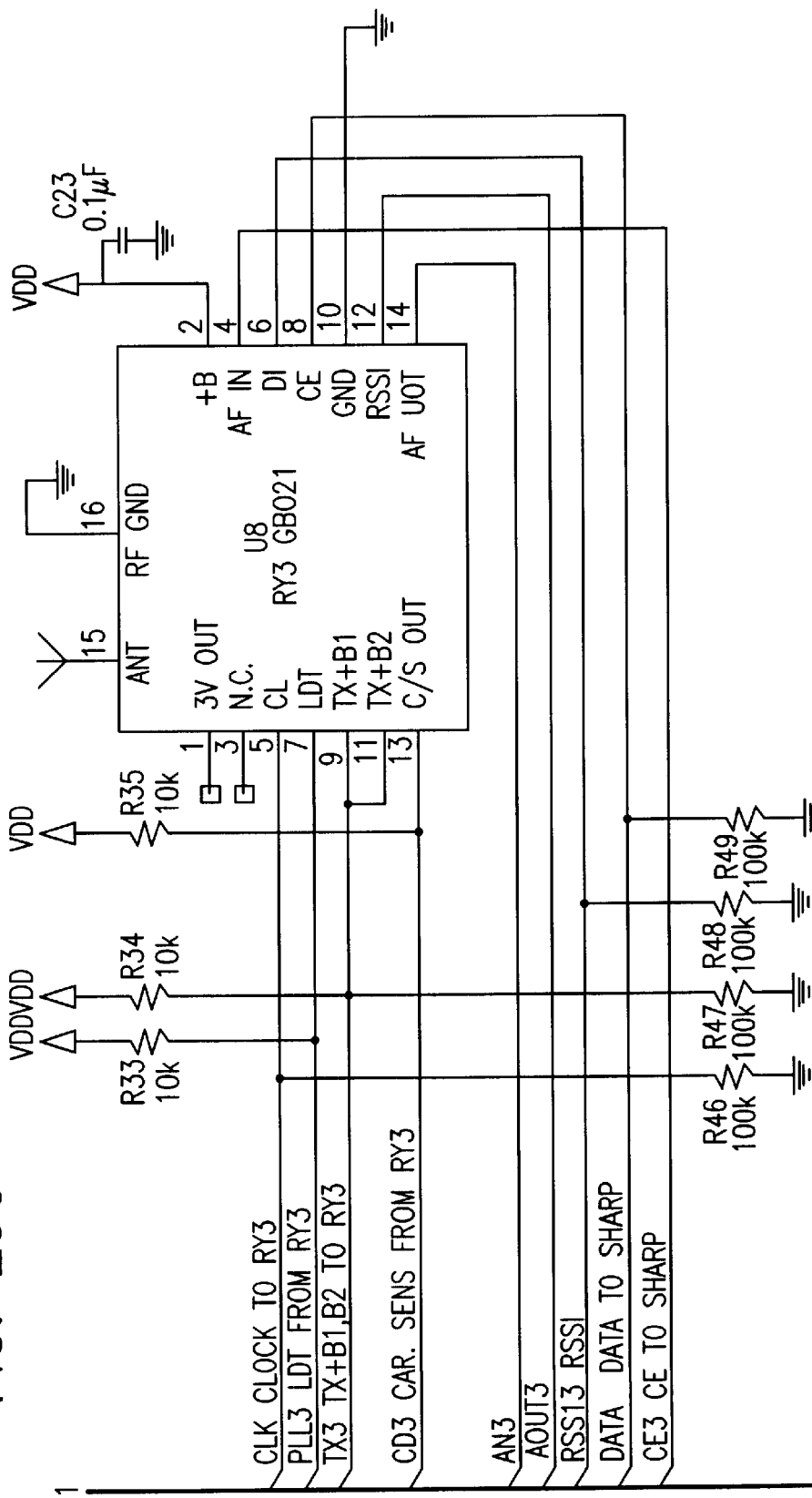
Figure 29D:
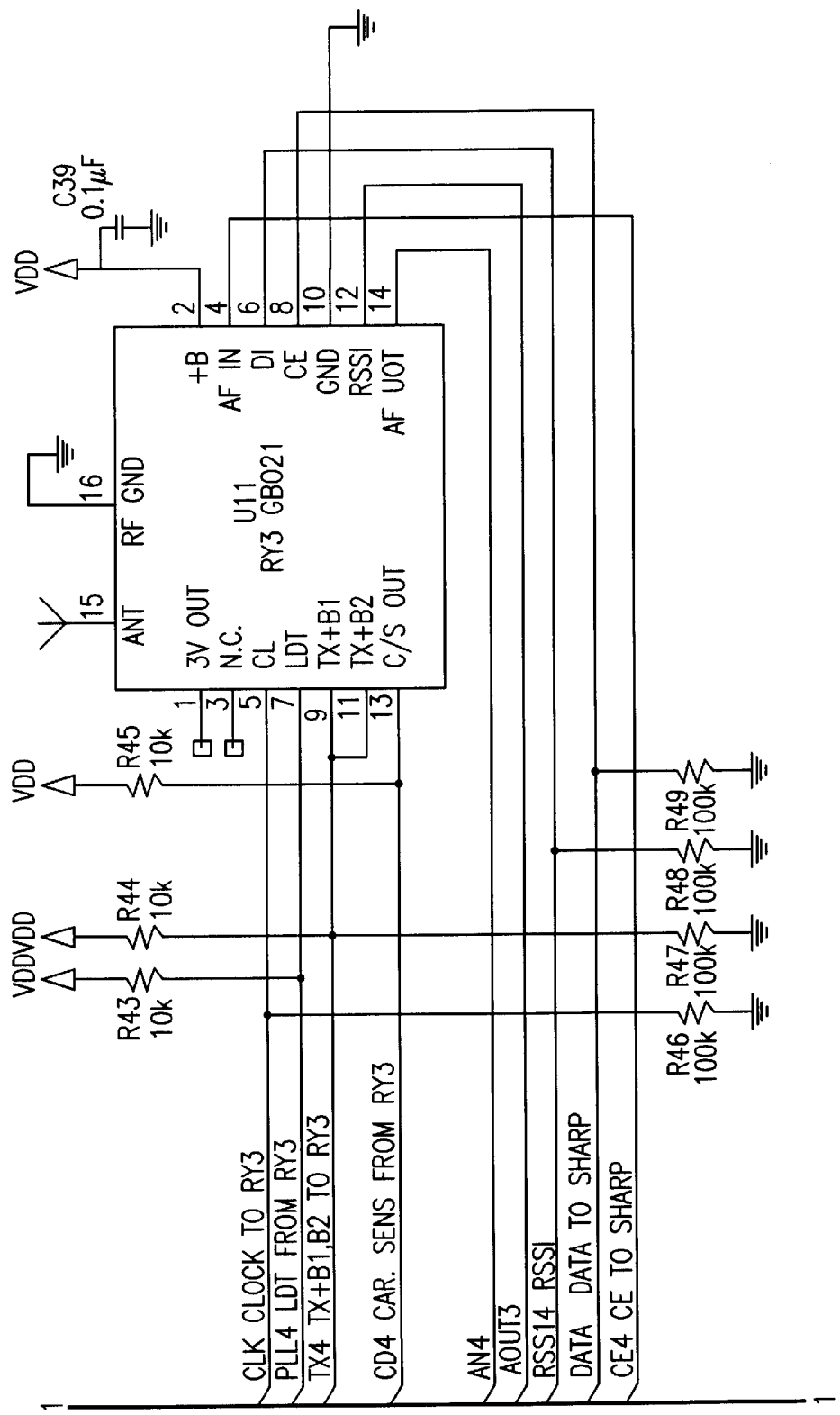
Figure 29E:
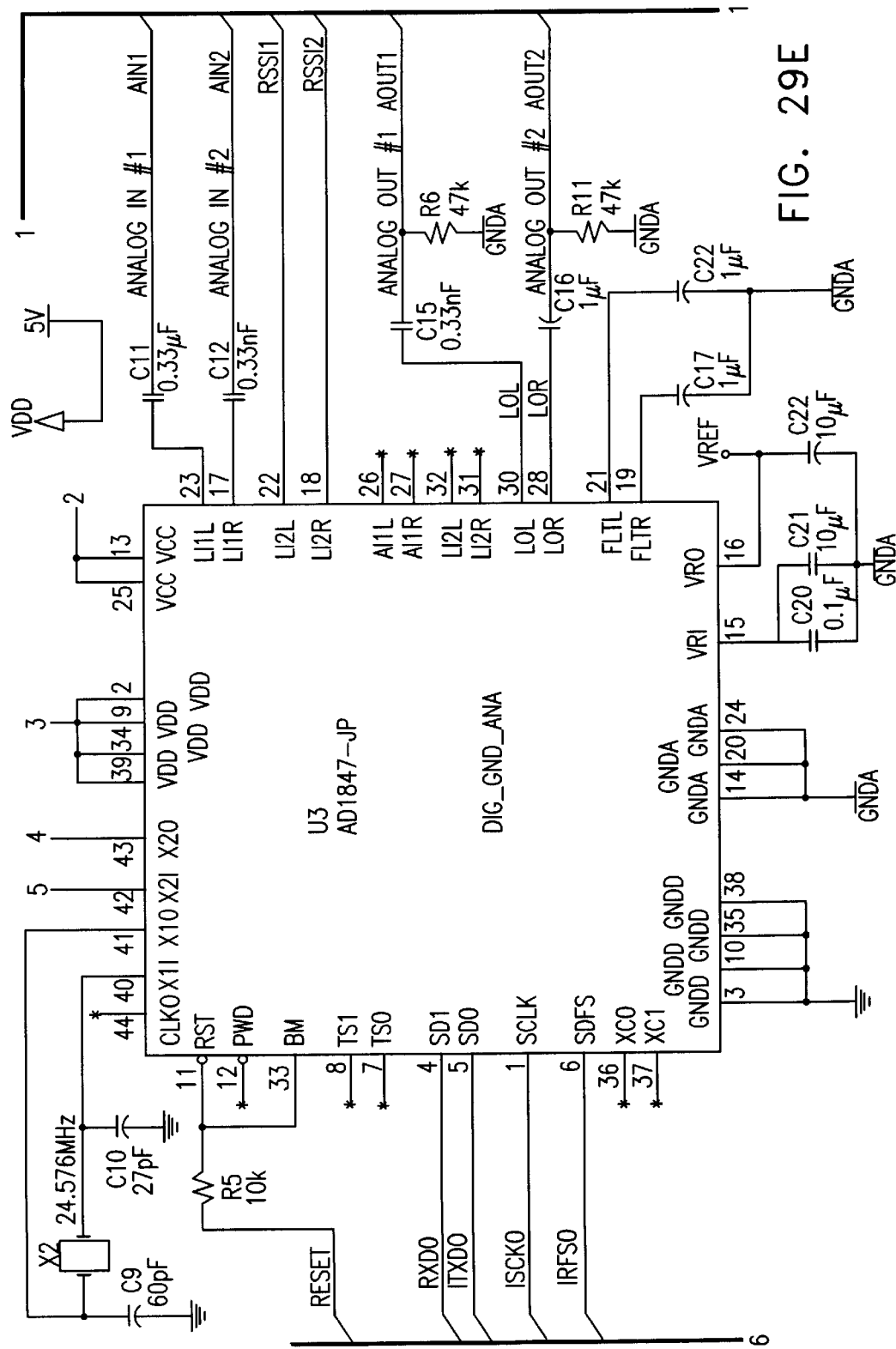
Figure 29F:
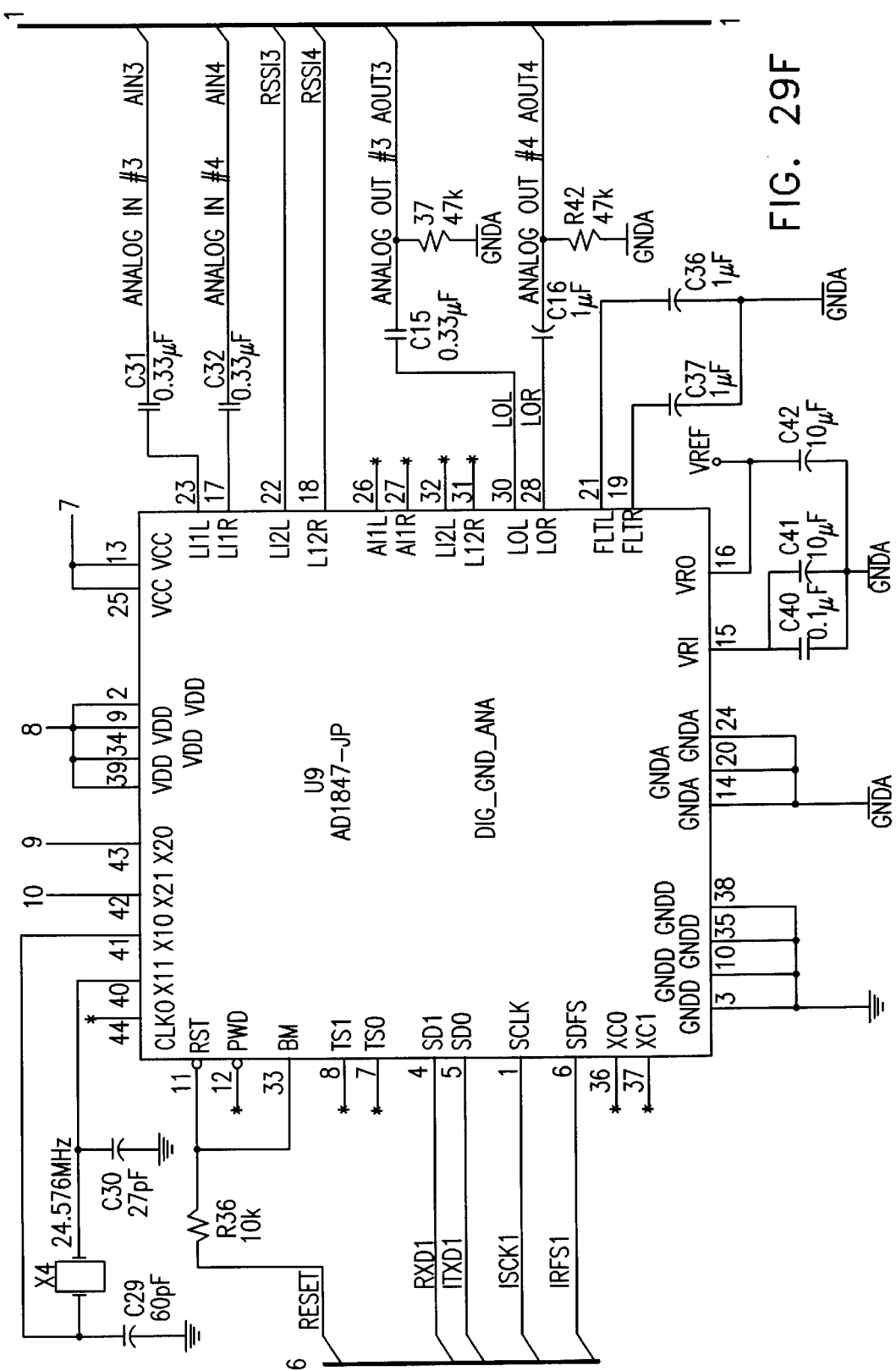
Figure 29I:
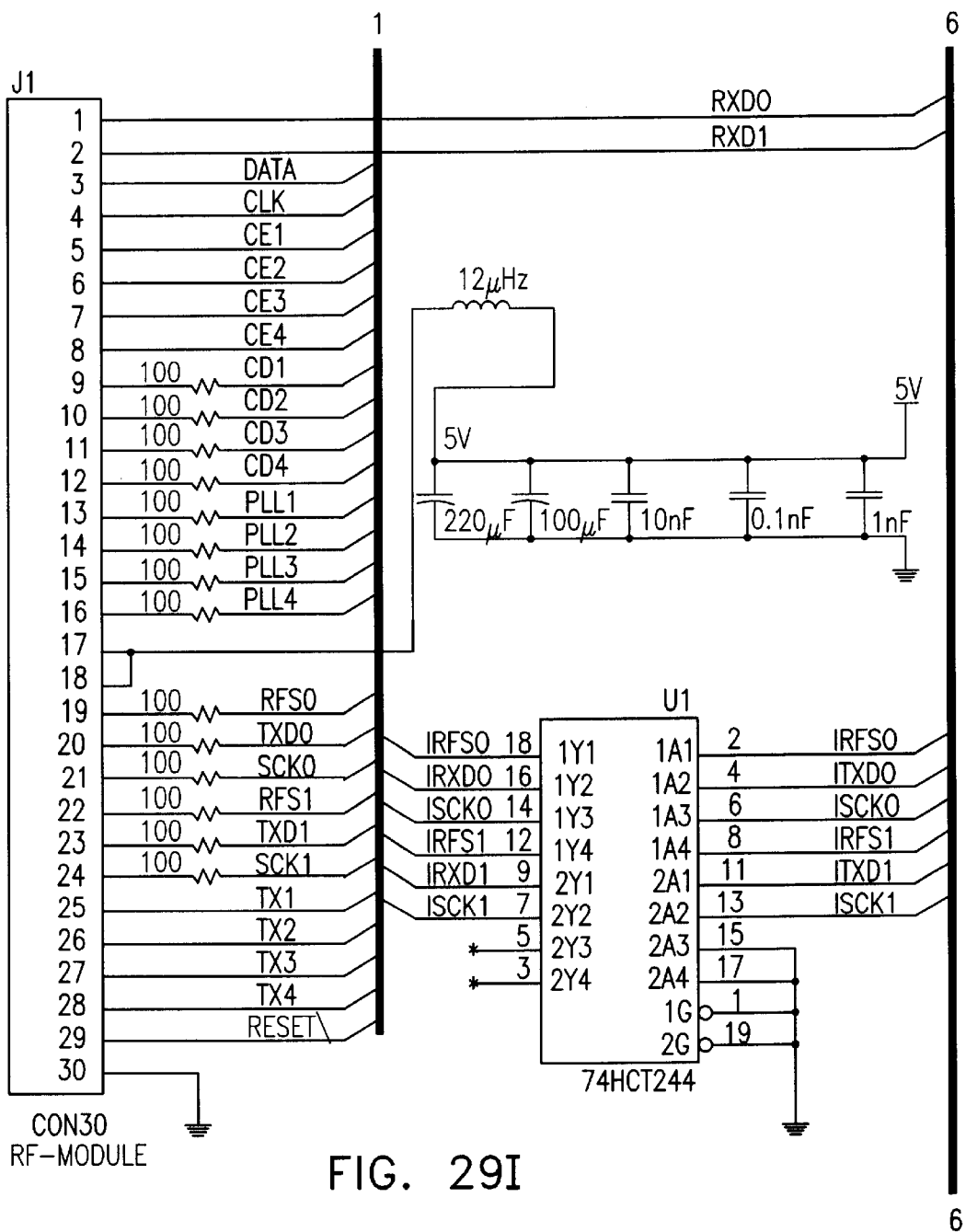
Figure 30:
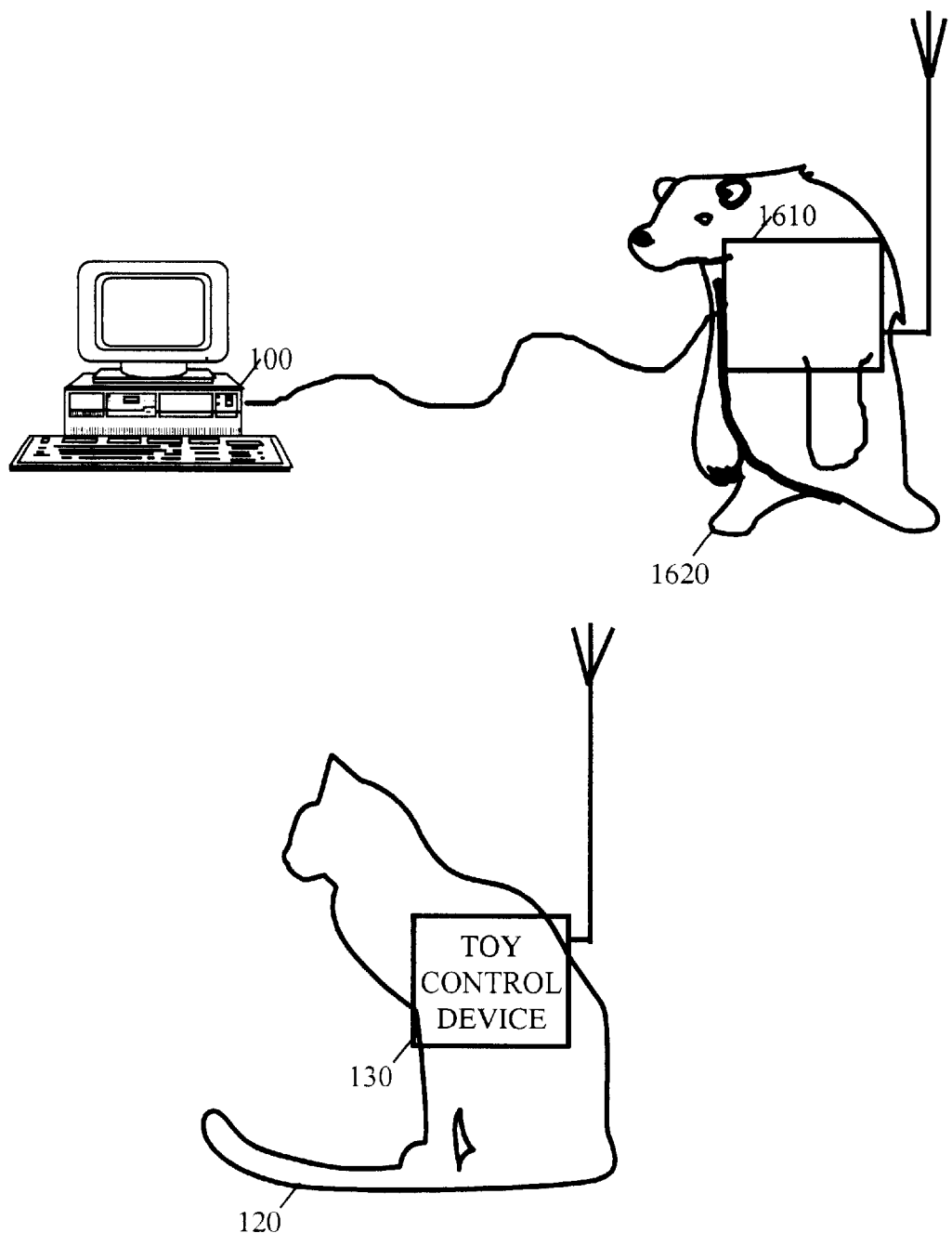
Figure 31:
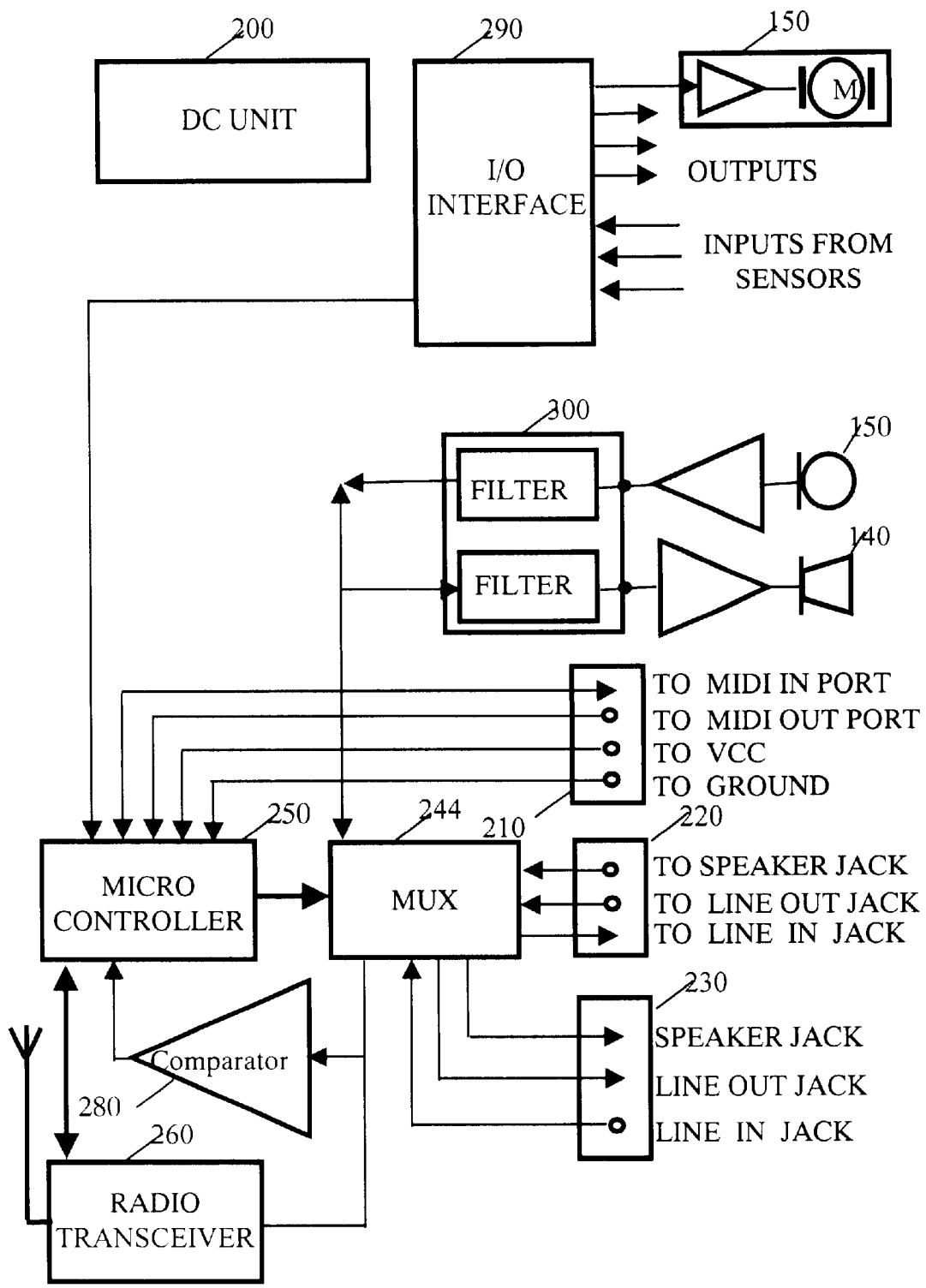
Figure 32A:
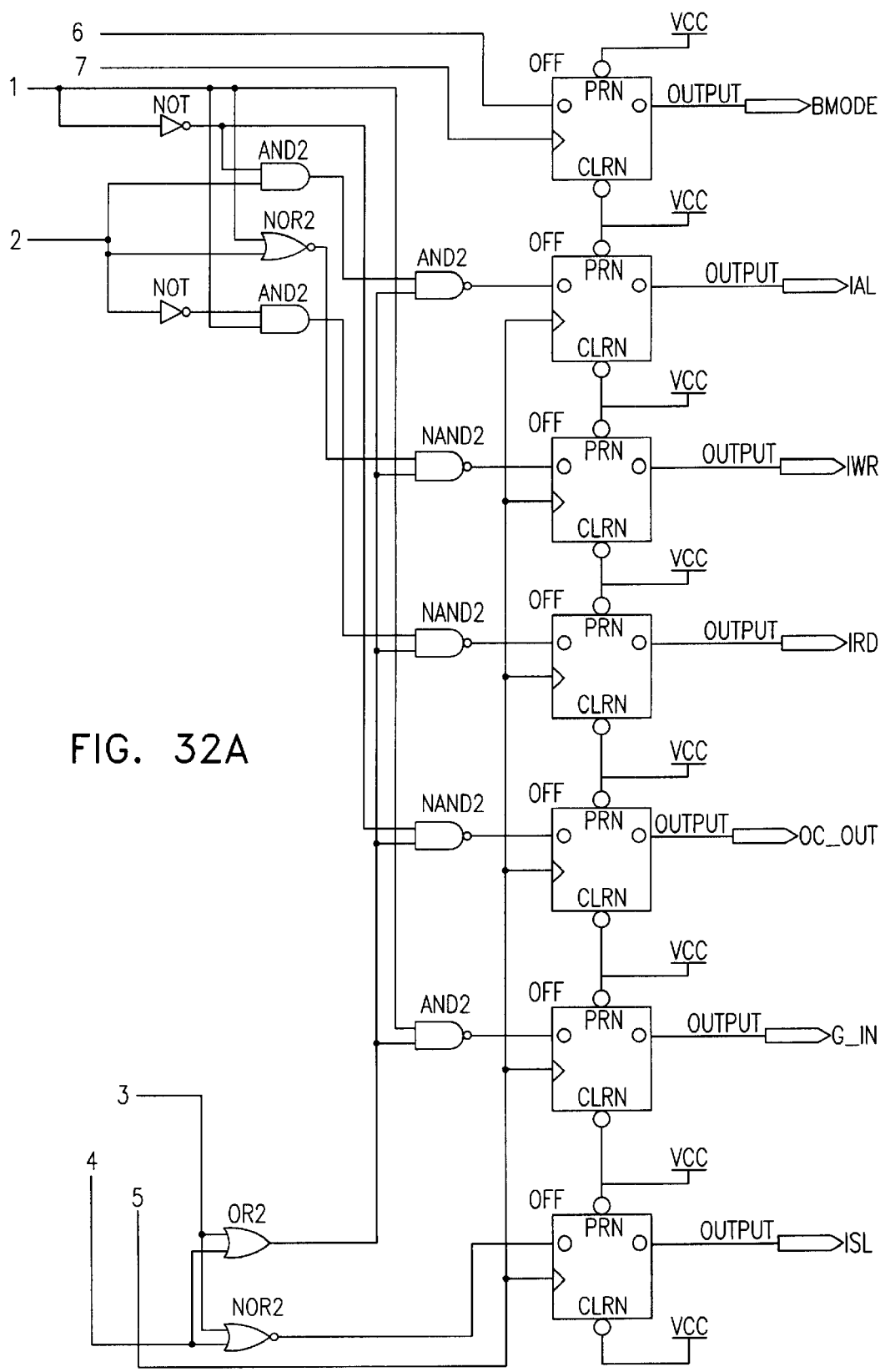
Figure 32B:
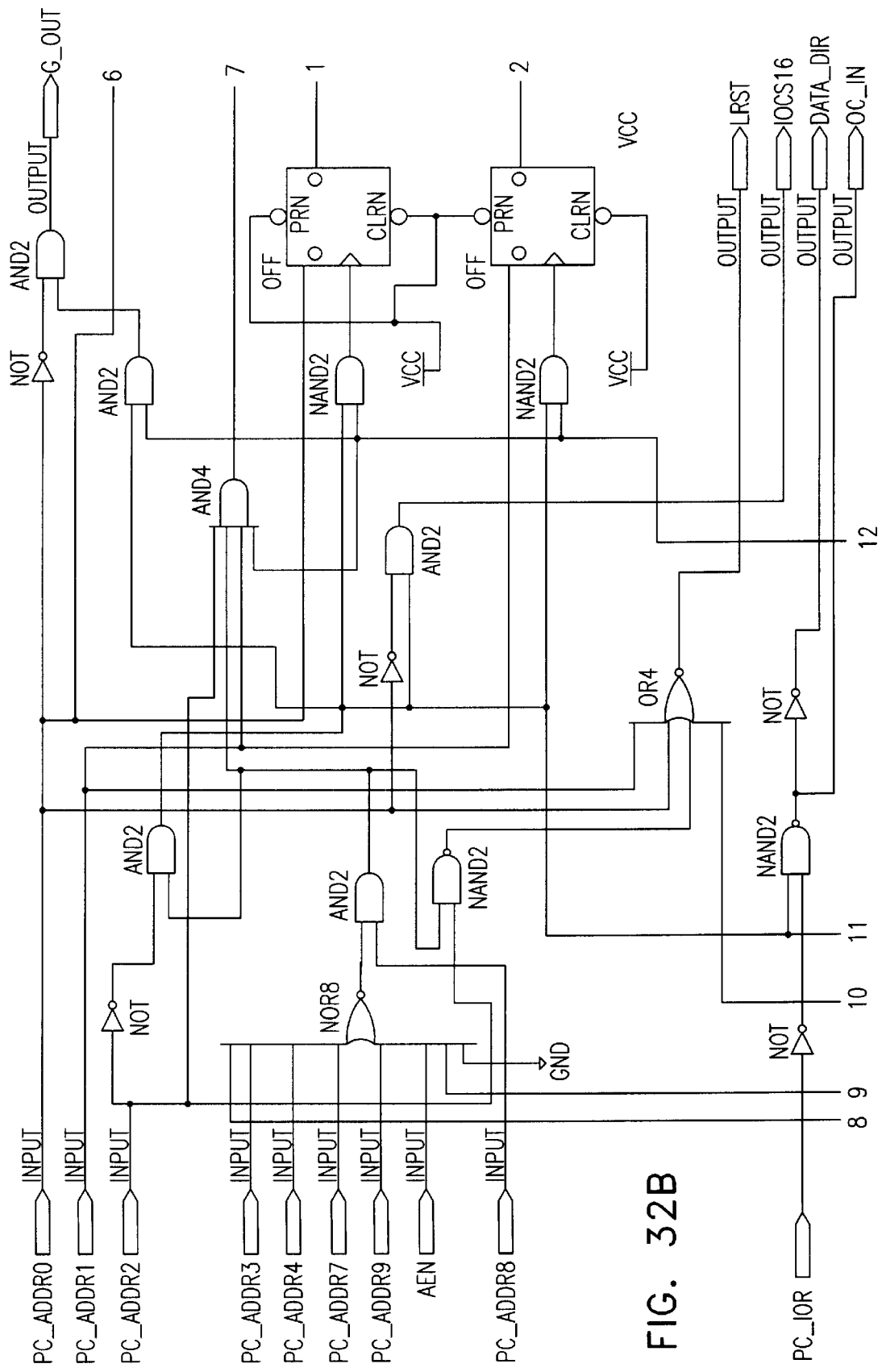
Figure 32C:
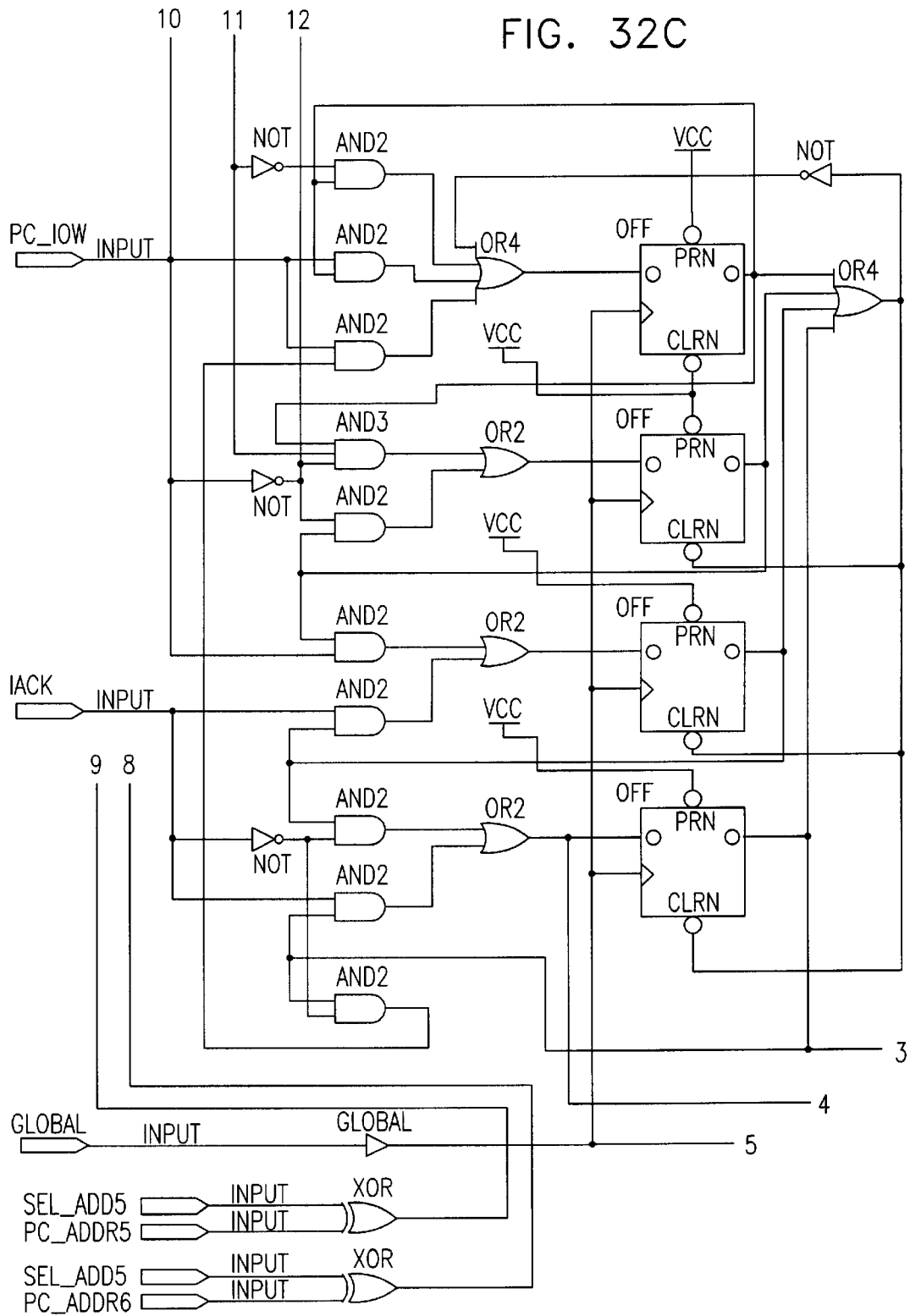
Figure 33:
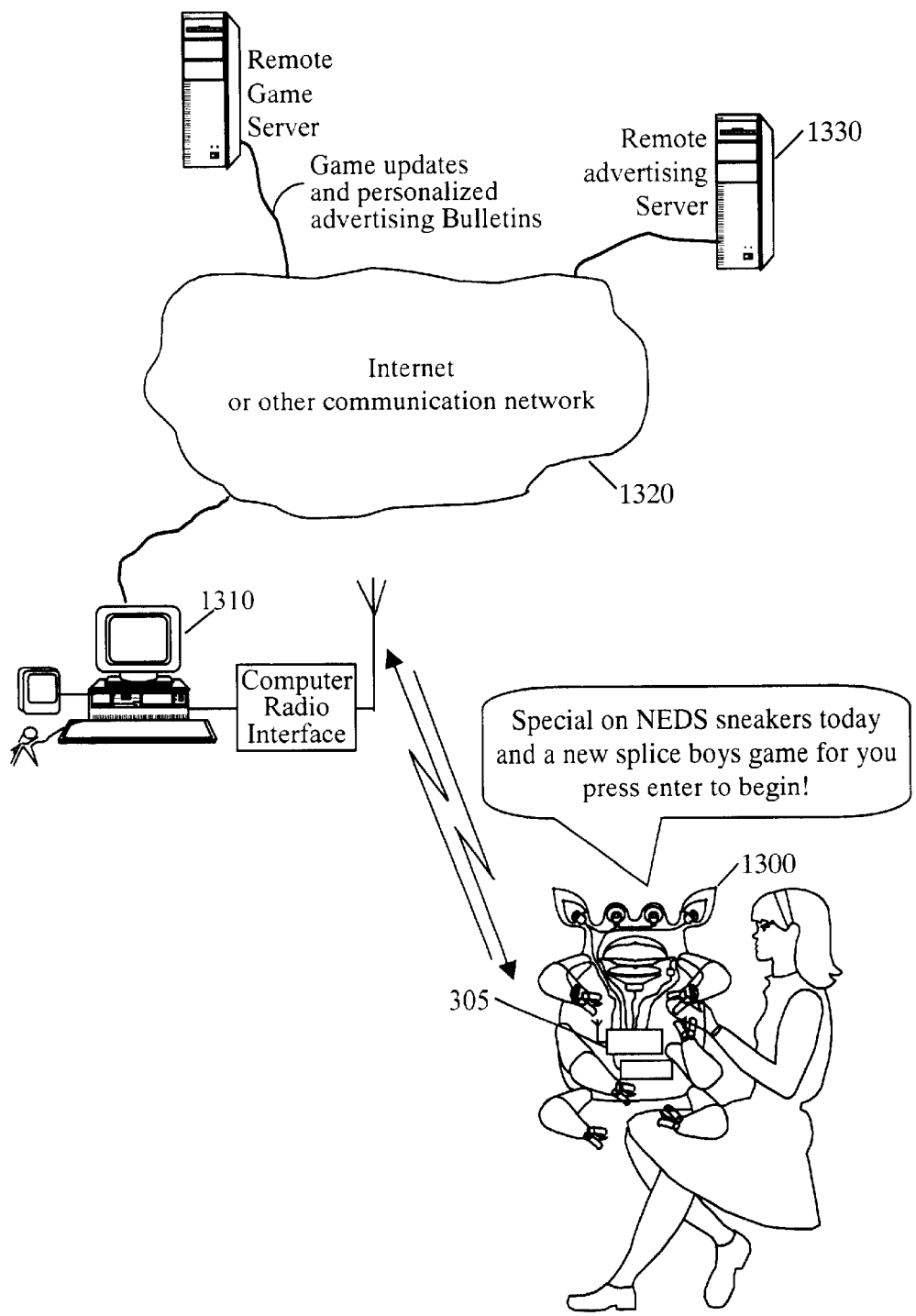
Figure 34:
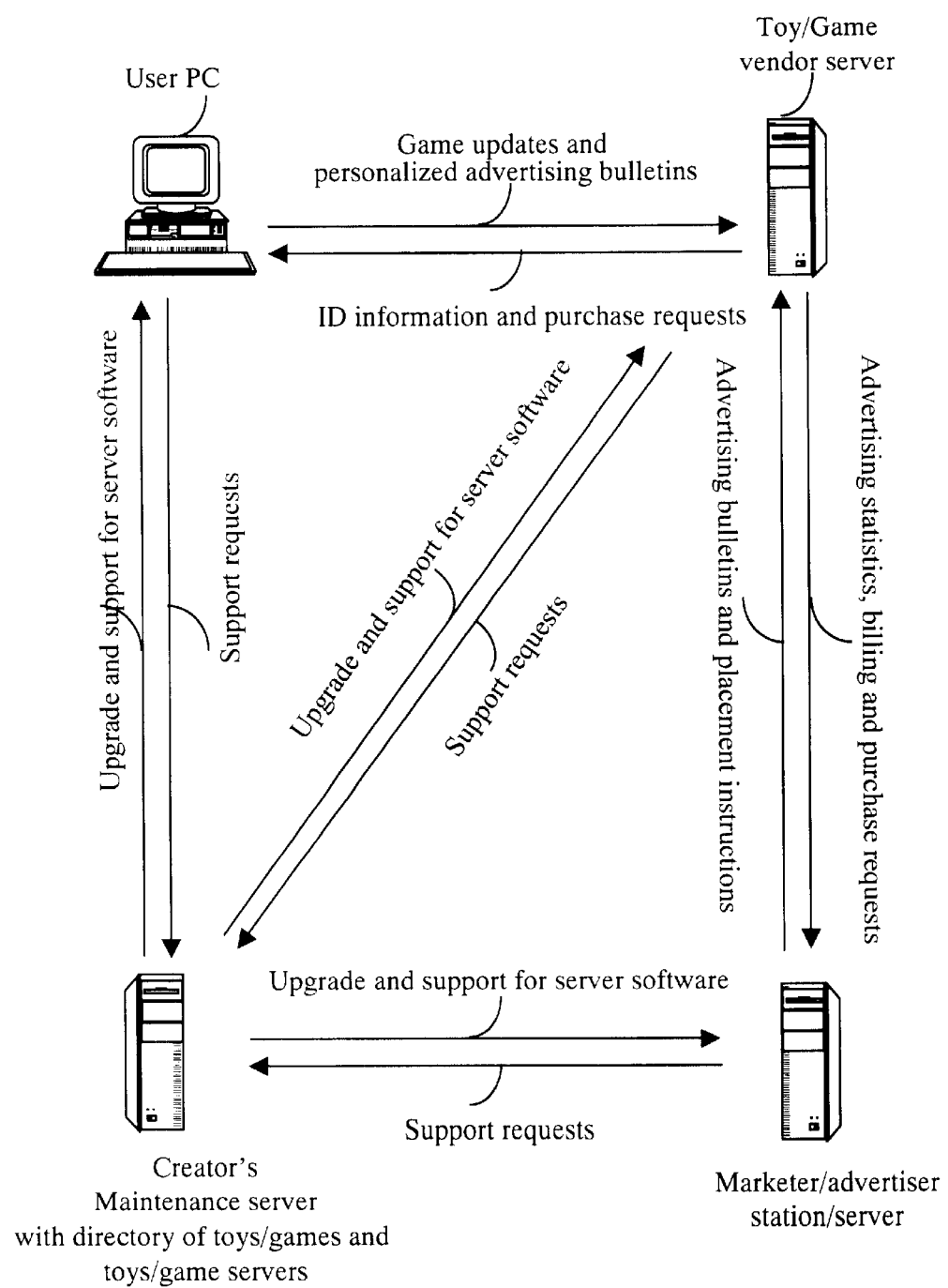
Figure 35:
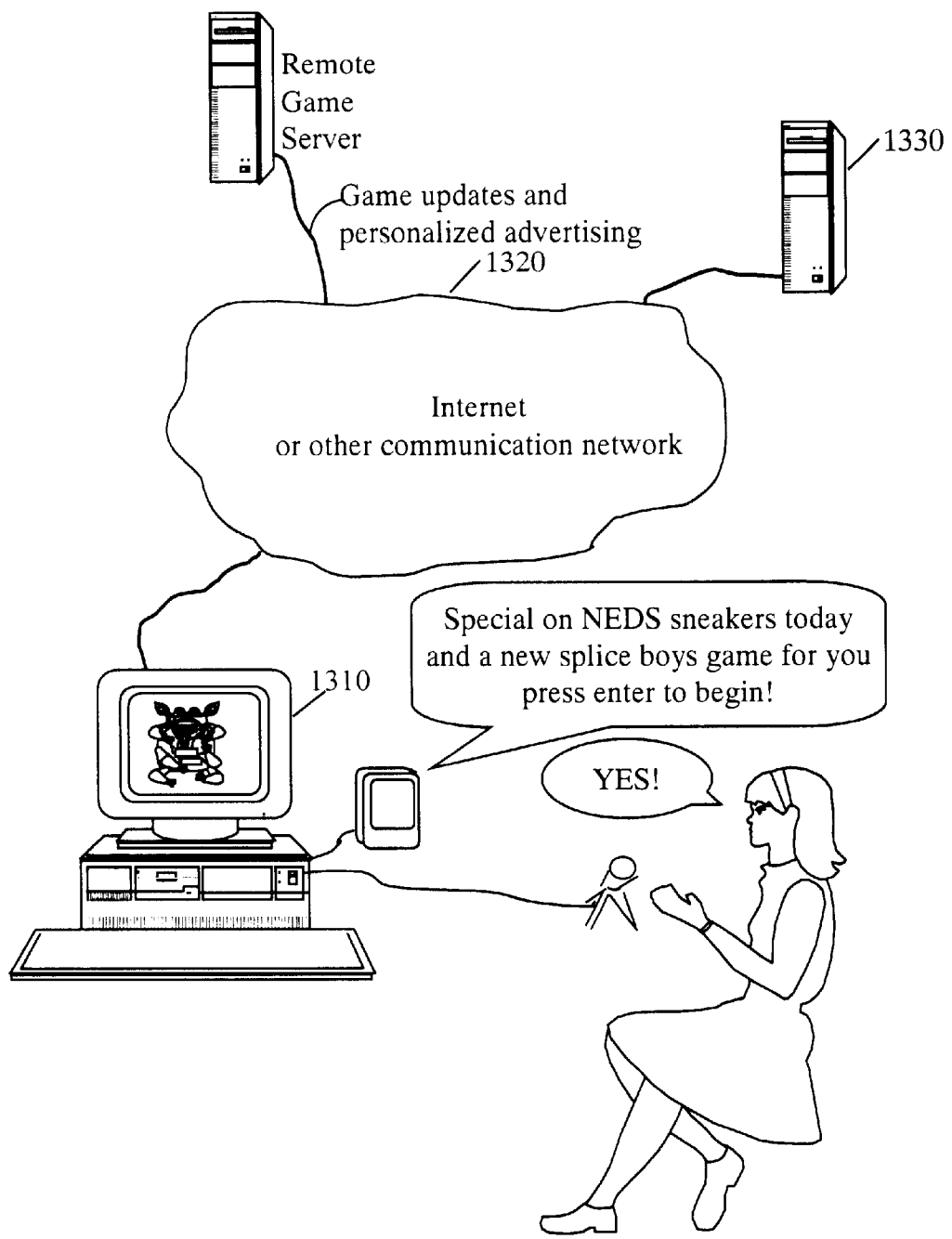
Figure 36:
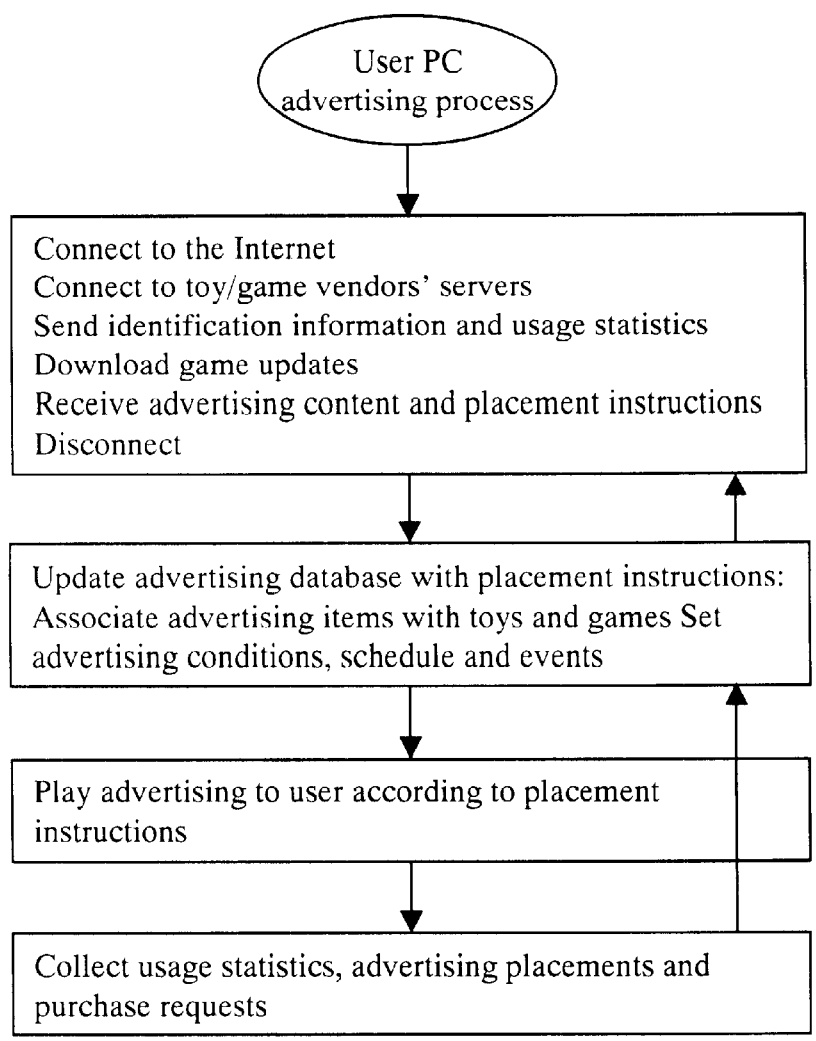
Figure 37:
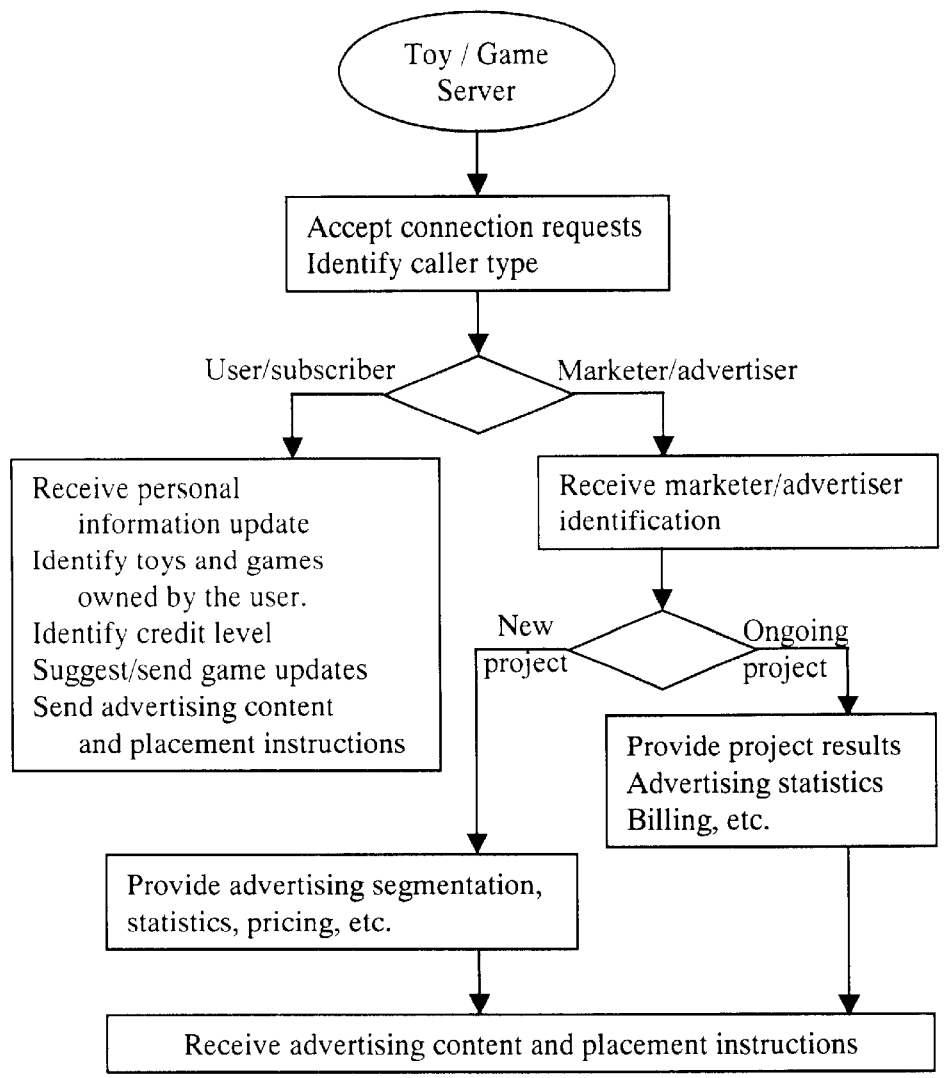
Figure 38:
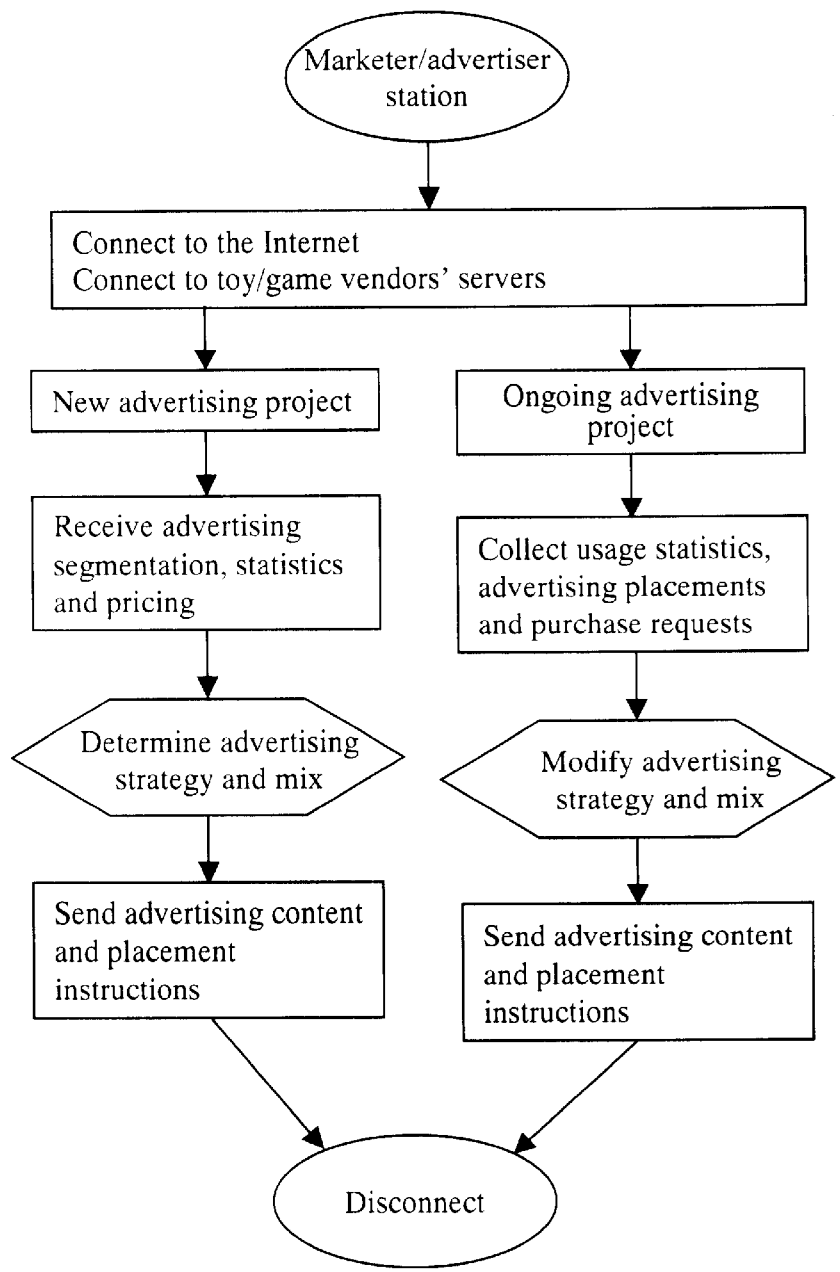
Figure 39:
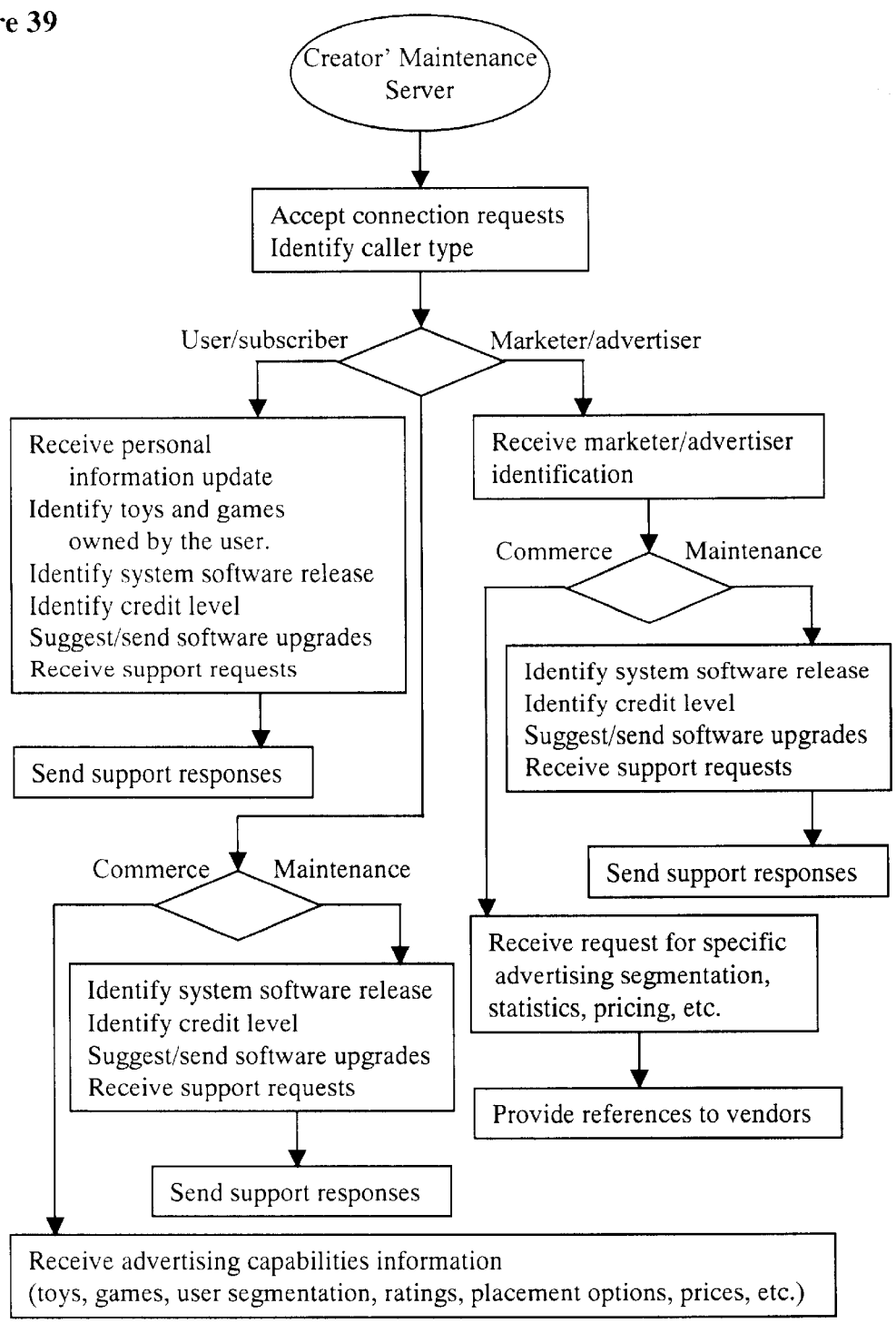
Figure 40:
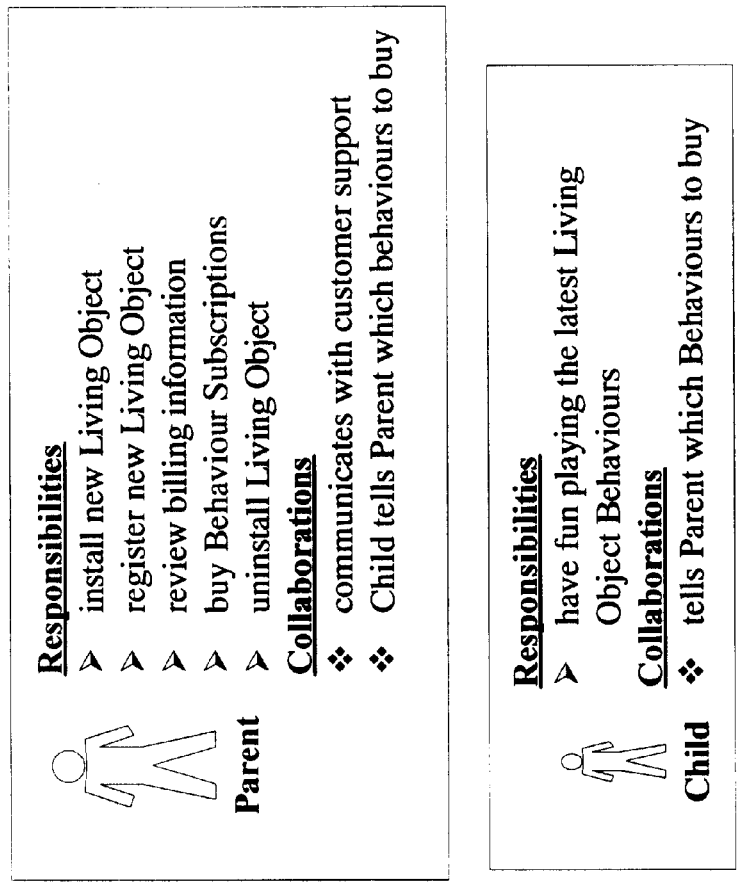
Figure 41:
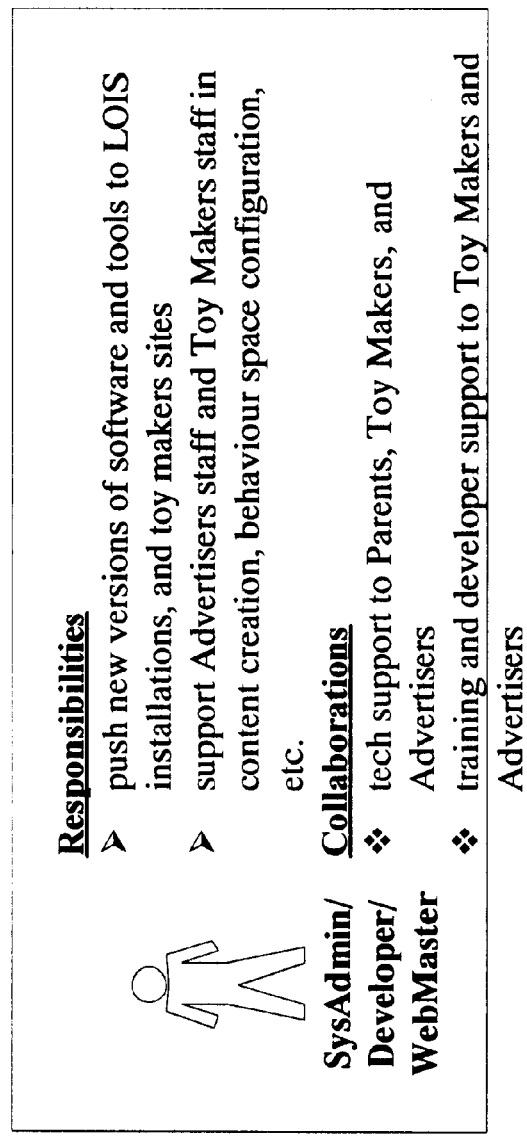
Figure 42:
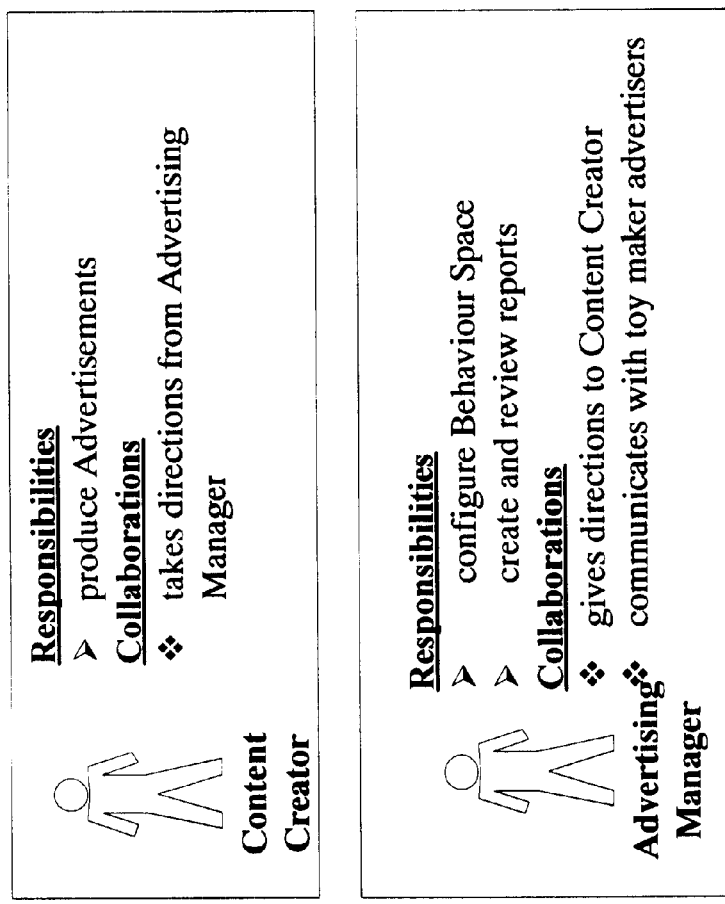

FIGS. 5A–5D taken together comprise a schematic diagram of the apparatus of FIG. 4;

FIG. 5E is an schematic diagram of an alternative implementation of the apparatus of FIG. 5D;

FIG. 6 is a simplified block diagram of a preferred implementation of the toy control device 130 of FIG. 1A;

FIGS. 7–7F, taken together with either FIG. 5D or FIG. 5E, comprise a schematic diagram of the apparatus of FIG. 6;

FIG. 8A is a simplified flowchart illustration of a preferred method for receiving radio signals, executing commands comprised therein, and sending radio signals, within the toy control device 130 of FIG. 1A;

FIGS. 8B–8T, taken together, comprise a simplified flowchart illustration of a preferred implementation of the method of FIG. 8A;

FIG. 9A is a simplified flowchart illustration of a preferred method for receiving MIDI signals, receiving radio signals, executing commands comprised therein, sending radio signals, and sending MIDI signals, within the computer radio interface 110 of FIG. 1A;

FIGS. 9B–9N, taken together with FIGS. 8D–8M, comprise a simplified flowchart illustration of a preferred implementation of the method of FIG. 9A;

FIGS. 10A–10C are simplified pictorial illustrations of a signal transmitted between the computer radio interface 110 and the toy control device 130 of FIG. 1A;

FIG. 11 is a simplified flowchart illustration of a preferred method for generating control instructions for the apparatus of FIG. 1A;

FIGS. 12A–12C are pictorial illustrations of a preferred implementation of a graphical user interface implementation of the method of FIG. 11;

FIG. 13 is a block diagram of a first sub-unit of a multi-port multi-channel implementation of the computer radio interface 110 of FIG. 1A, which sub-unit resides within computer 100 of FIG. 1A;

FIG. 14 is a block diagram of a second sub-unit of a multi-port multi-channel implementation of the computer radio interface 110 of FIG. 1A, which sub-unit complements the apparatus of FIG. 13 and resides exteriorly to computer 100 of FIG. 1A;

Figure 15D:
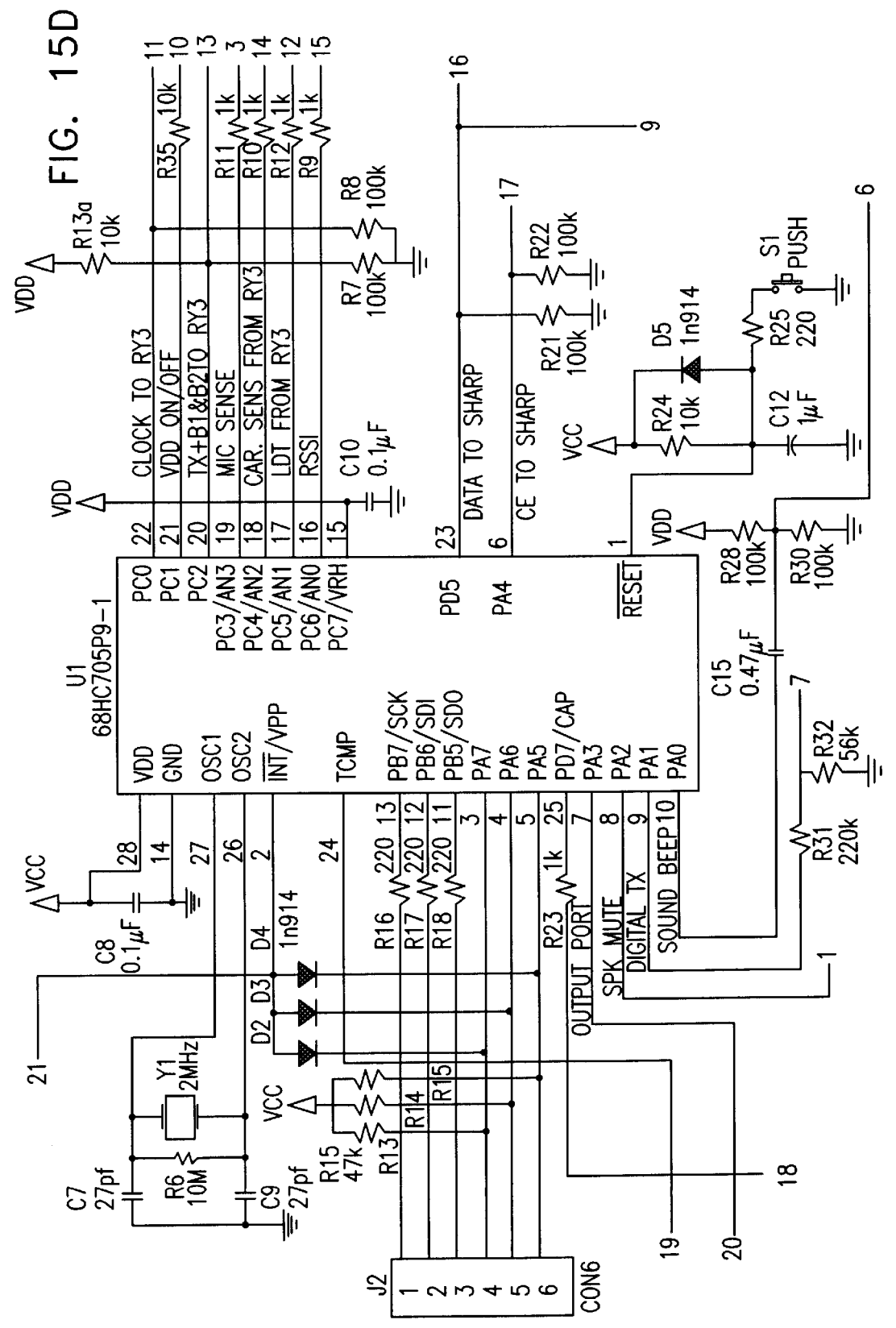

FIGS. 15A–15E, taken together, form a detailed electronic schematic diagram of the toy control device of FIG. 6, suitable for the multi-channel implementation of FIGS. 13 and 14;

FIG. 16 is a simplified flowchart illustration of a preferred method by which a computer selects a control channel pair in anticipation of a toy becoming available and starts a game-defining communication over the control channel each time both a toy and a transceiver of the computer radio interface are available;

FIG. 17 is a simplified flowchart illustration of a preferred method for implementing the "select control channel pair" step of FIG. 16;

FIG. 18A is a simplified flowchart illustration of a preferred method for implementing the "select information communication channel pair" step of FIG. 16;

FIG. 18B is a simplified flowchart illustration of a preferred method for performing the "locate computer" step of FIG. 18A;

FIG. 19 is a simplified flowchart illustration of a preferred method of operation of the toy control device 130;

FIG. 20 is a simplified illustration of a remote game server in association with a wireless computer controlled toy system which may include a network computer;

FIG. 21 is a simplified flowchart illustration of the operation of the computer or of the network computer of FIG. 20, when operating in conjunction with the remote server;

FIG. 22 is a simplified flowchart illustration of the operation of the remote game server of FIG. 20;

FIG. 23 is a semi-pictorial semi-block diagram illustration of a wireless computer controlled toy system including a proximity detection subsystem operative to detect proximity between the toy and the computer;

FIGS. 24A–24E, taken together, form a detailed electronic schematic diagram of a multi-channel implementation of the computer radio interface 110 of FIG. 3 which is similar to the detailed electronic schematic diagrams of FIGS. 5A–5D except for being multi-channel, therefore capable of supporting full duplex applications, rather than single-channel;

FIGS. 25A–25F, taken together, form a detailed schematic illustration of a computer radio interface which connects to a serial port of a computer rather than to the soundboard of the computer;

FIGS. 26A–26D, taken together, form a detailed schematic illustration of a computer radio interface which connects to a parallel port of a computer rather than to the soundboard of the computer;

FIGS. 27A–27J are preferred flowchart illustrations of a preferred radio coding technique which is an alternative to the radio coding technique described above with reference to FIGS. 8E, 8G–8M and 10A–C;

FIGS. 28A–28K, taken together, form a detailed electronic schematic diagram of the multi-port multi-channel computer radio interface sub-unit of FIG. 13; FIGS. 29A–29I, taken together, form a detailed electronic schematic diagram of the multi-port multi-channel computer radio interface sub-unit of FIG. 14;

FIG. 30 is a partly pictorial, partly block diagram illustration of a computer control system including a toy, constructed and operative in accordance with a further preferred embodiment of the present invention;

FIG. 31 is a block diagram is a simplified block diagram illustrating the combination of the computer radio interface and the toy control device as used in the embodiment of FIG. 30;

FIGS. 32A, 32B and 32C taken together form a simplified block diagram of the EPLD chip of FIG. 28H;

FIG. 33 is a semi-pictorial semi-block diagram illustration of a computerized networked advertisement system constructed and operative in accordance with a preferred embodiment of the present invention in which a physical toy conveys advertisement bulletins to a user of the toy;

FIG. 34 is a data transmission diagram describing data transmissions between various network service providers which support the advertisement system of FIG. 33 according to one preferred embodiment of the present invention;

FIG. 35 is a semi-pictorial semi-block diagram illustration of a computerized networked advertisement system constructed and operative in accordance with a preferred embodiment of the present invention in which a virtual toy conveys advertisement bulletins to a user of the toy;

FIG. 36 is a simplified flowchart illustration of a preferred mode of operation for the user PC of FIG. 34;

FIG. 37 is a simplified flowchart illustration of a preferred mode of operation for the game software server of FIG. 34;

FIG. 38 is a simplified flowchart illustration of a preferred mode of operation for the marketer/advertisement provider of FIG. 34;

FIG. 39 is a simplified flowchart illustration of a preferred mode of operation for the software maintenance center of FIG. 34;

FIGS. 40–58 describe a Living Object Internet Service System (LOIS) constructed and operative in accordance with a preferred embodiment of the present invention.

Figure 9N:
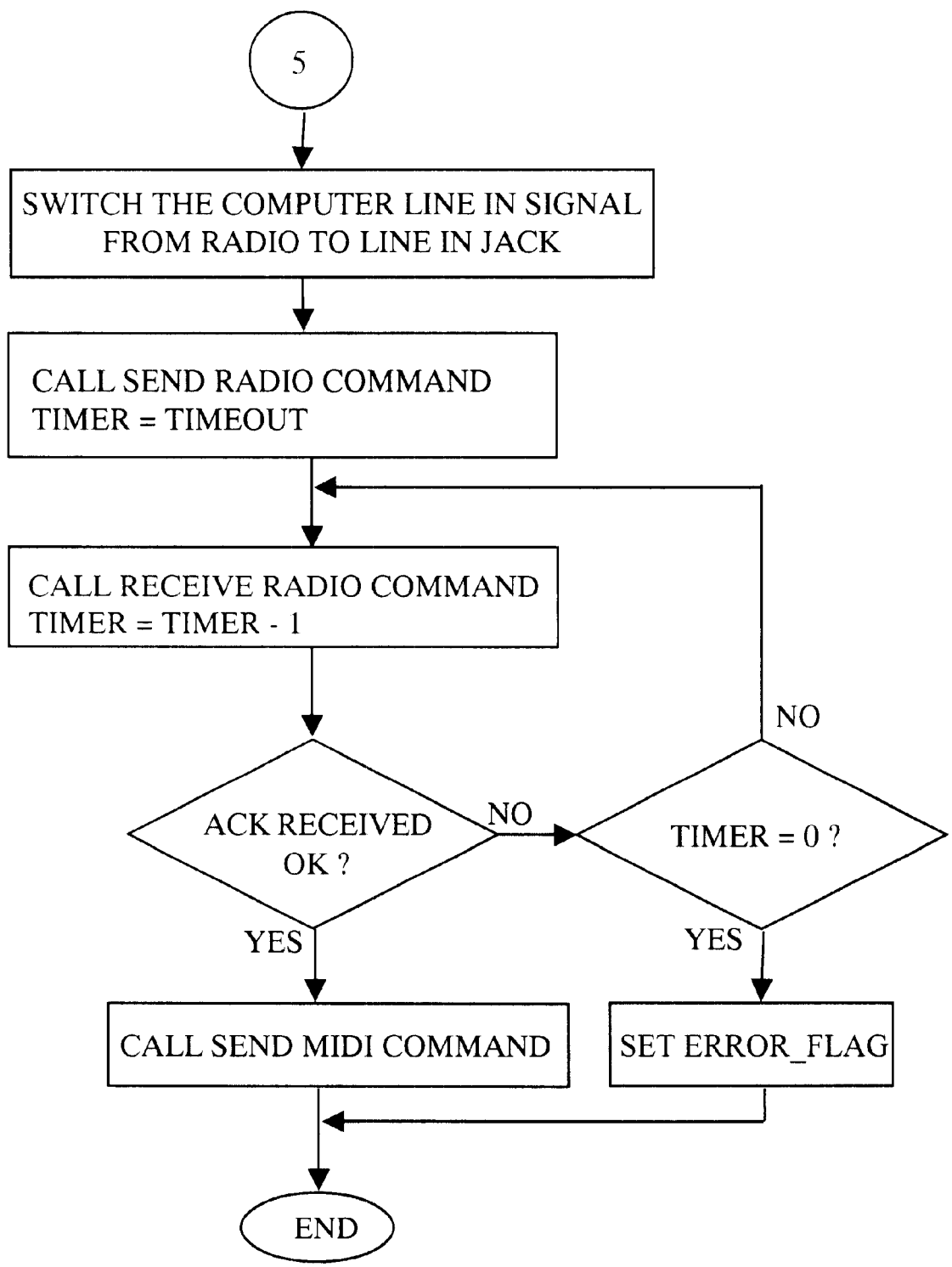

Appendix A is a computer listing of a preferred software implementation of the method of FIGS. 9A–9N, together with the method of FIGS. 8D–8M;

Appendix B is a computer listing of a preferred software implementation of the method of FIGS. 8A–8T;

Appendix C is a computer listing of a preferred software implementation of an example of a computer game for use in the computer 100 of FIG. 1;

Appendix D is a computer listing of a preferred software implementation of the method of FIG. 11 and FIGS. 12A–12C.

Figure 59:
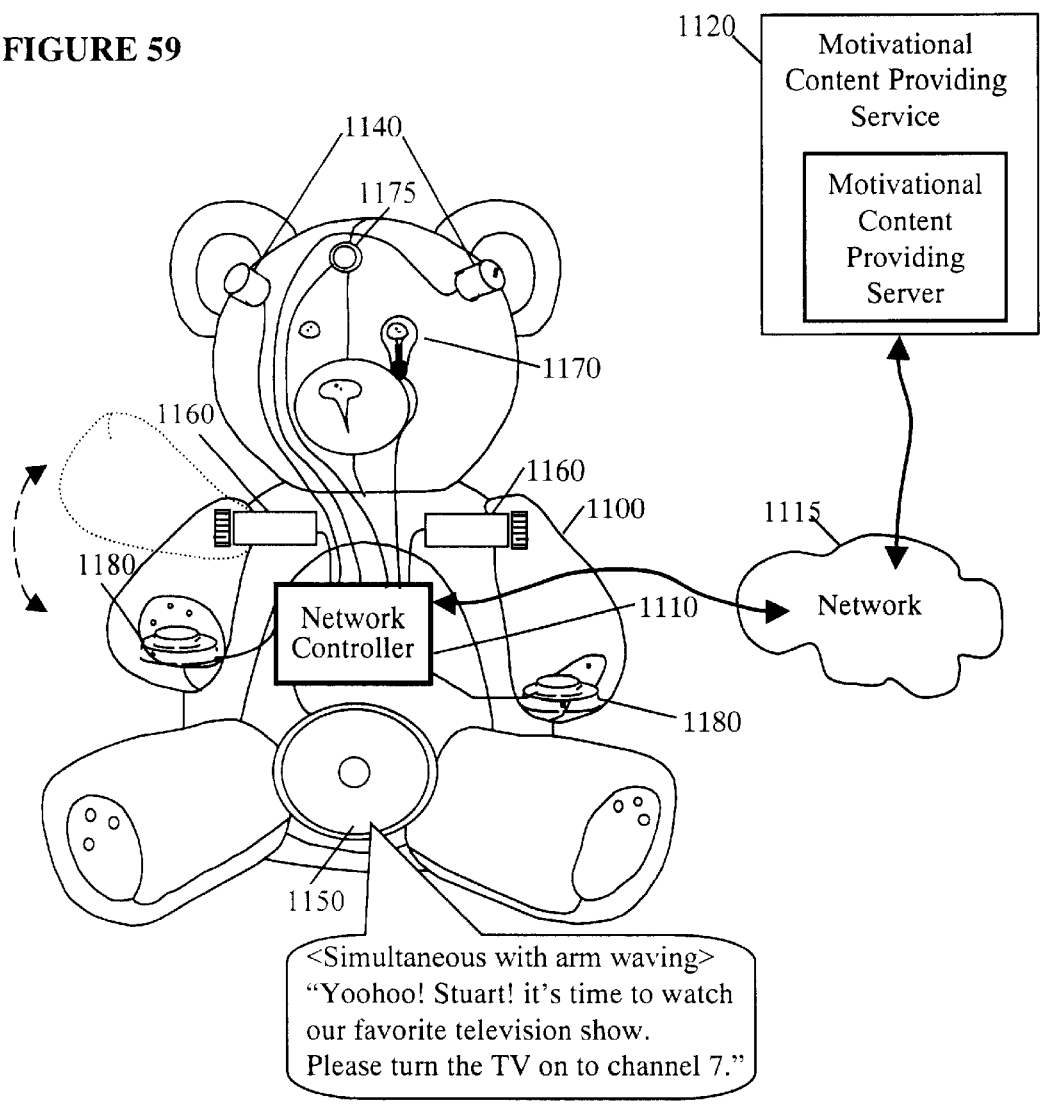
Figure 60:
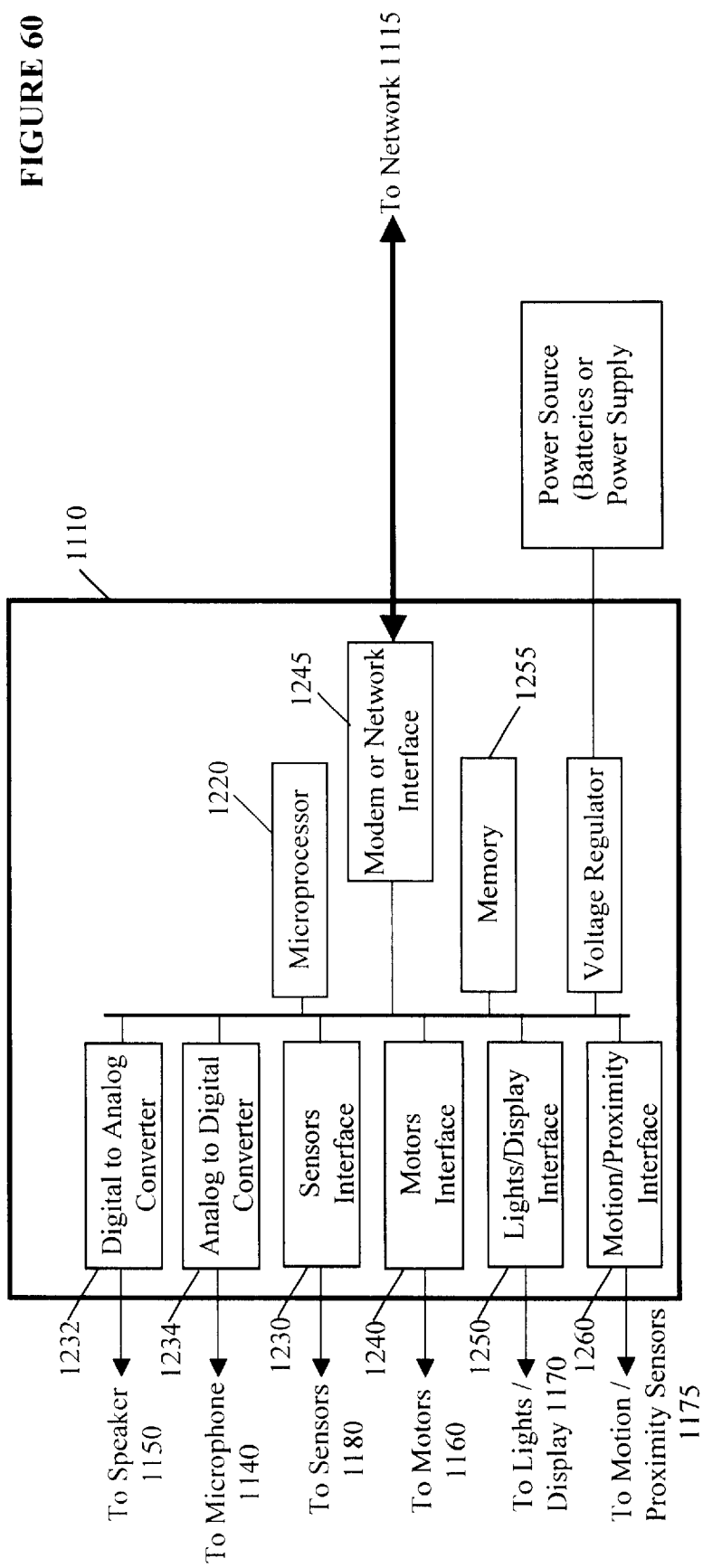
Figure 61:
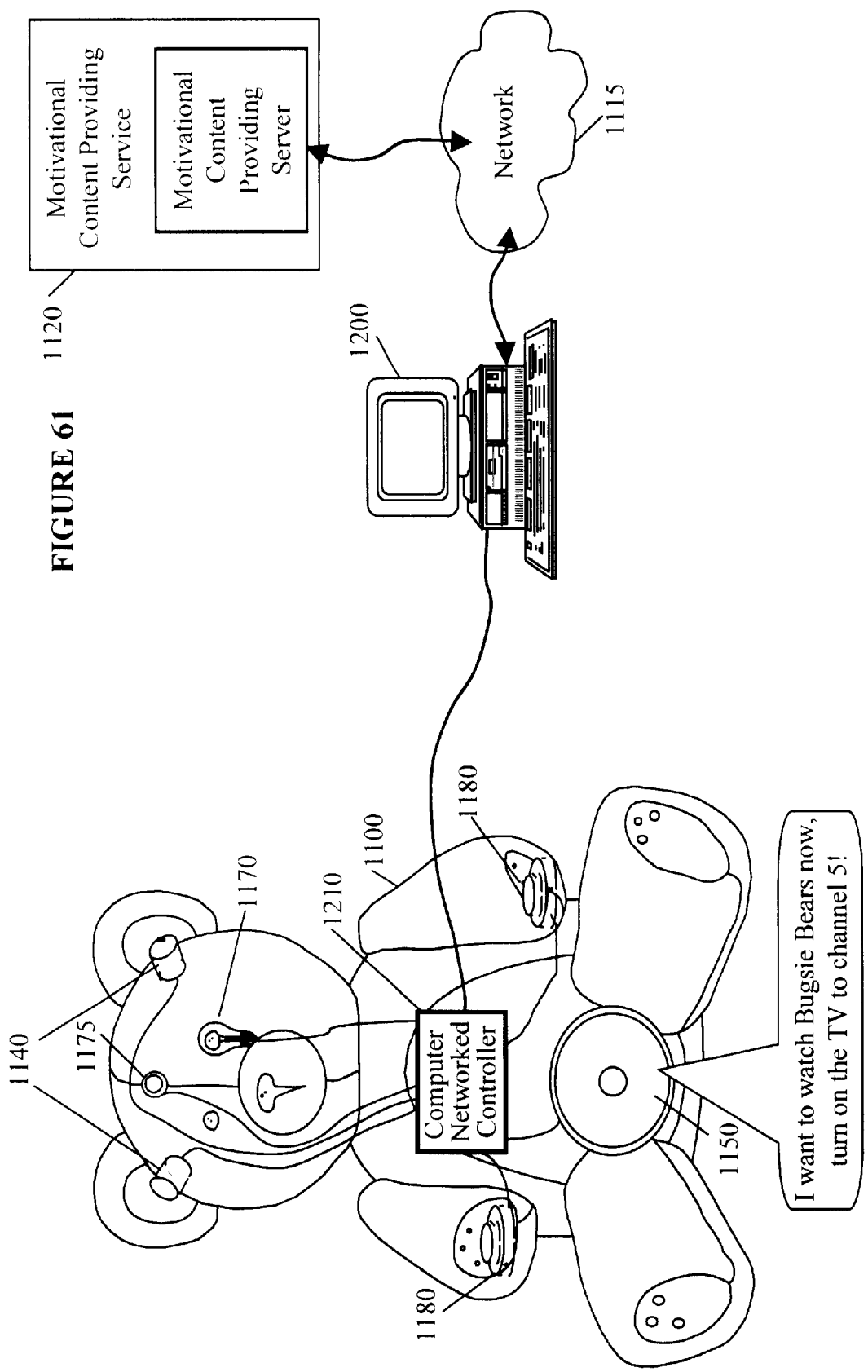
Figure 62:
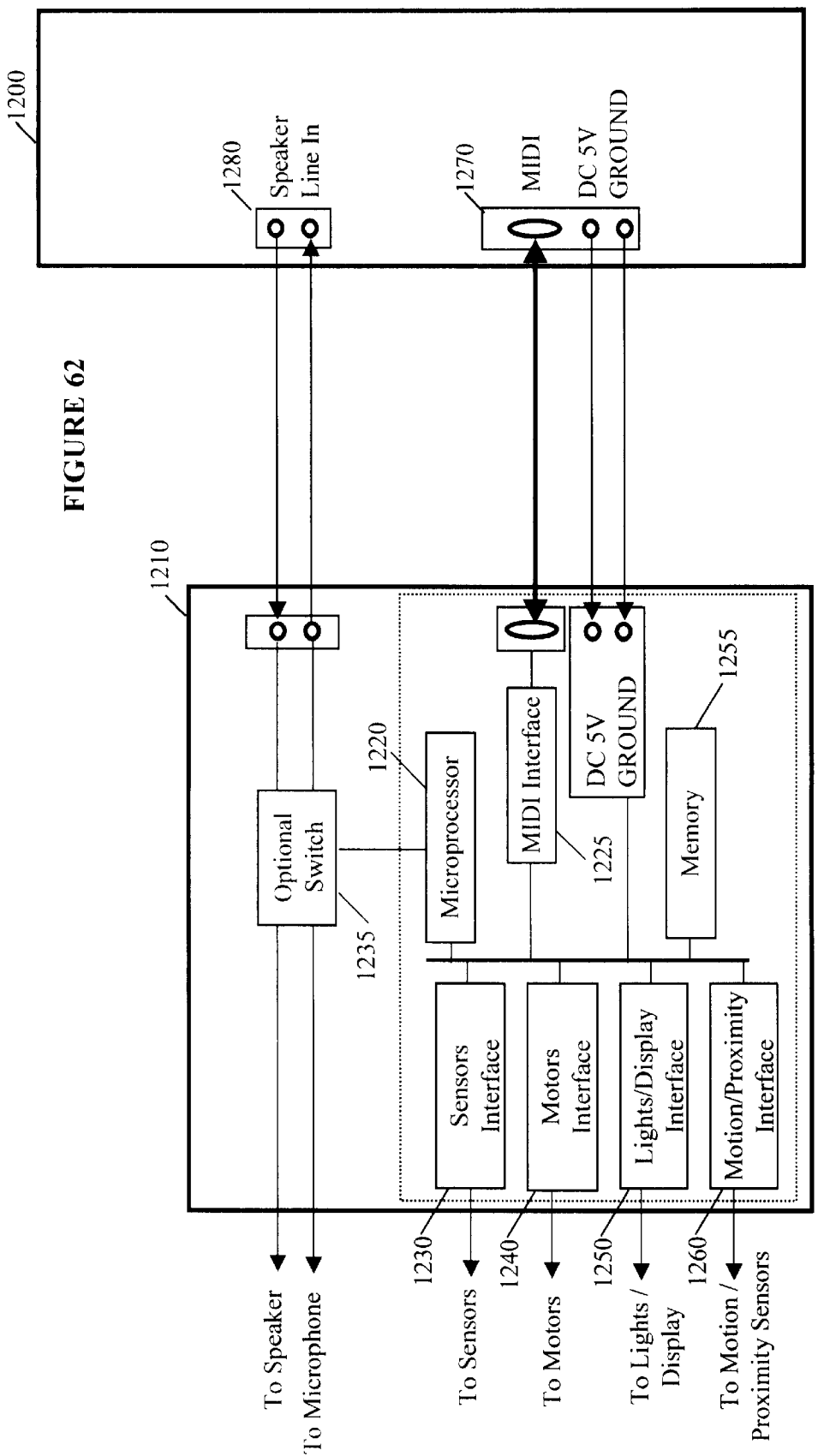
Figure 63:
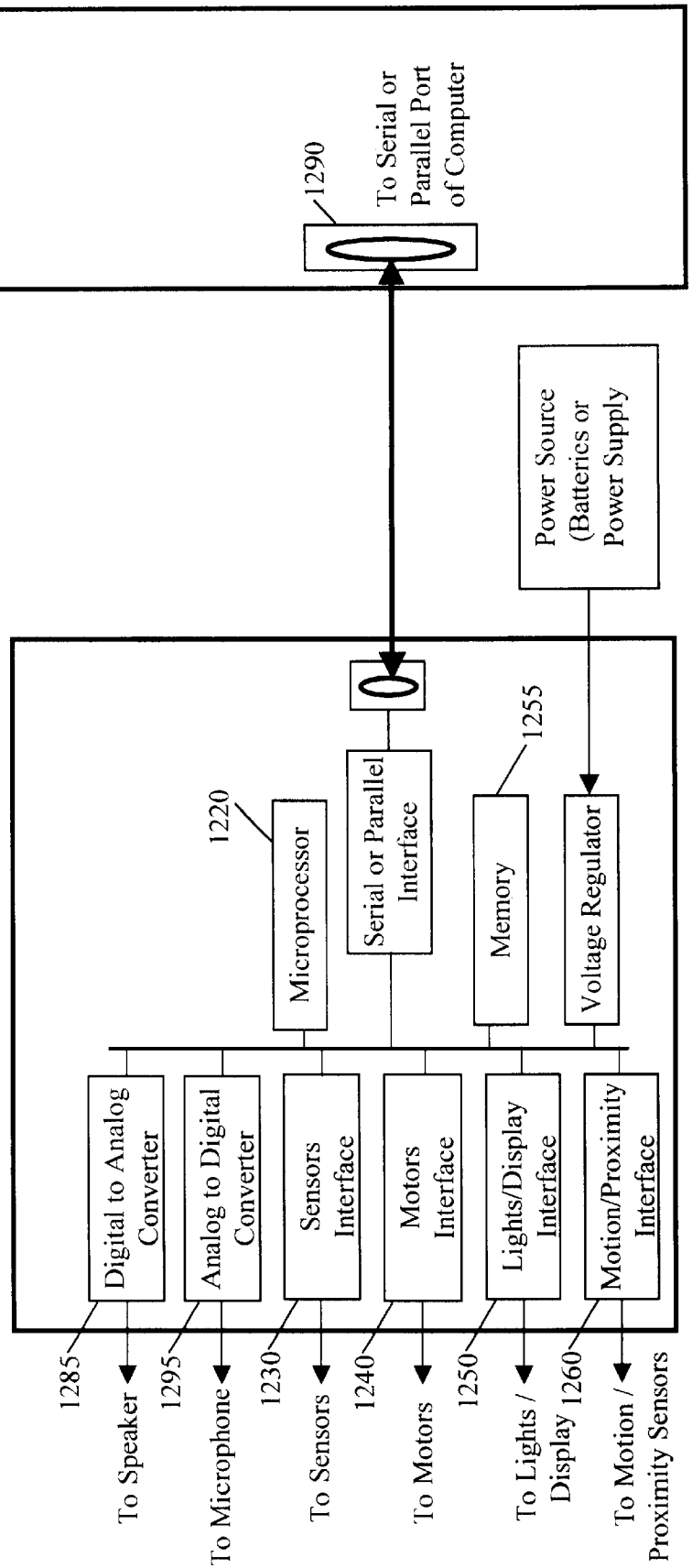
Figure 64:
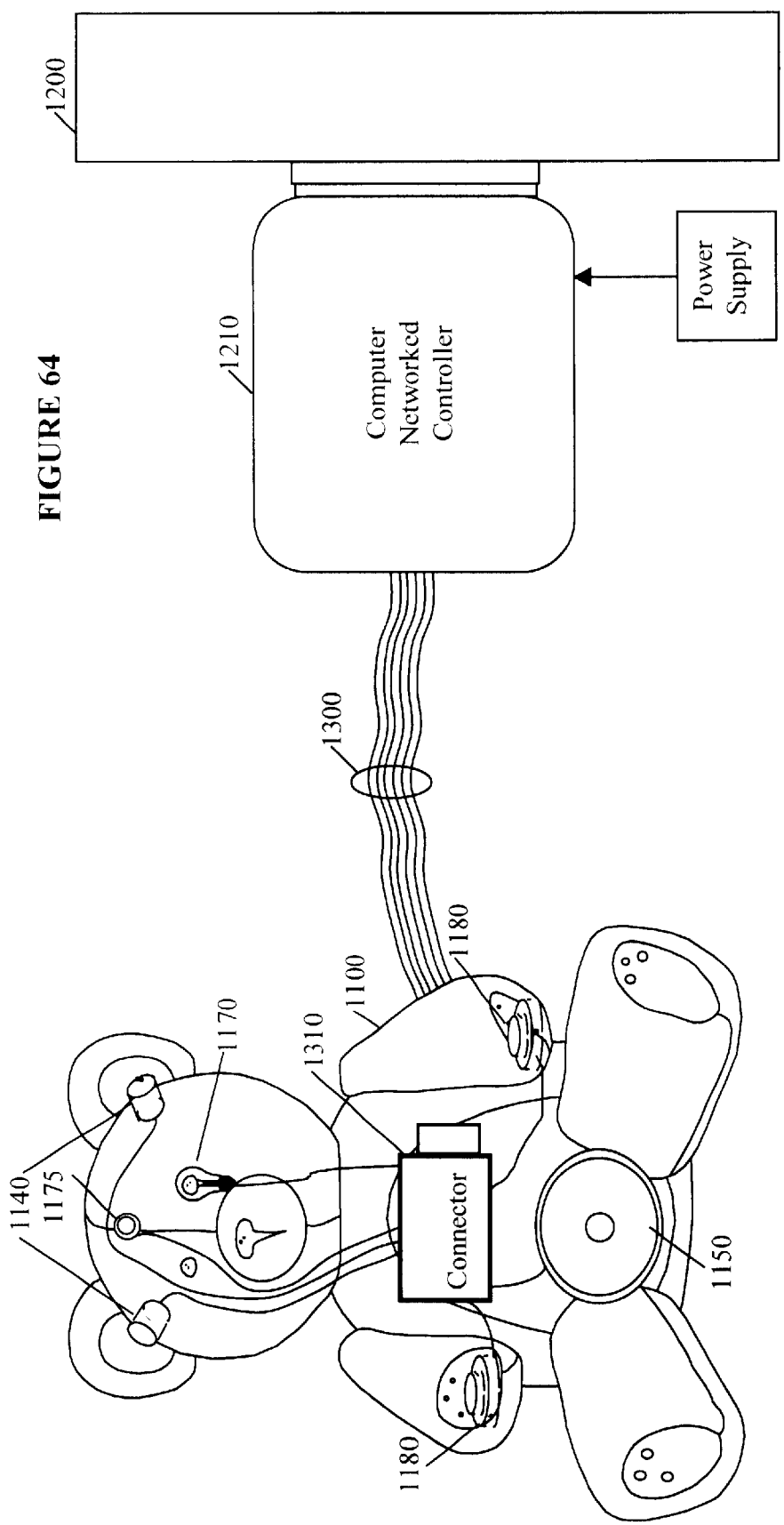
Figure 65:
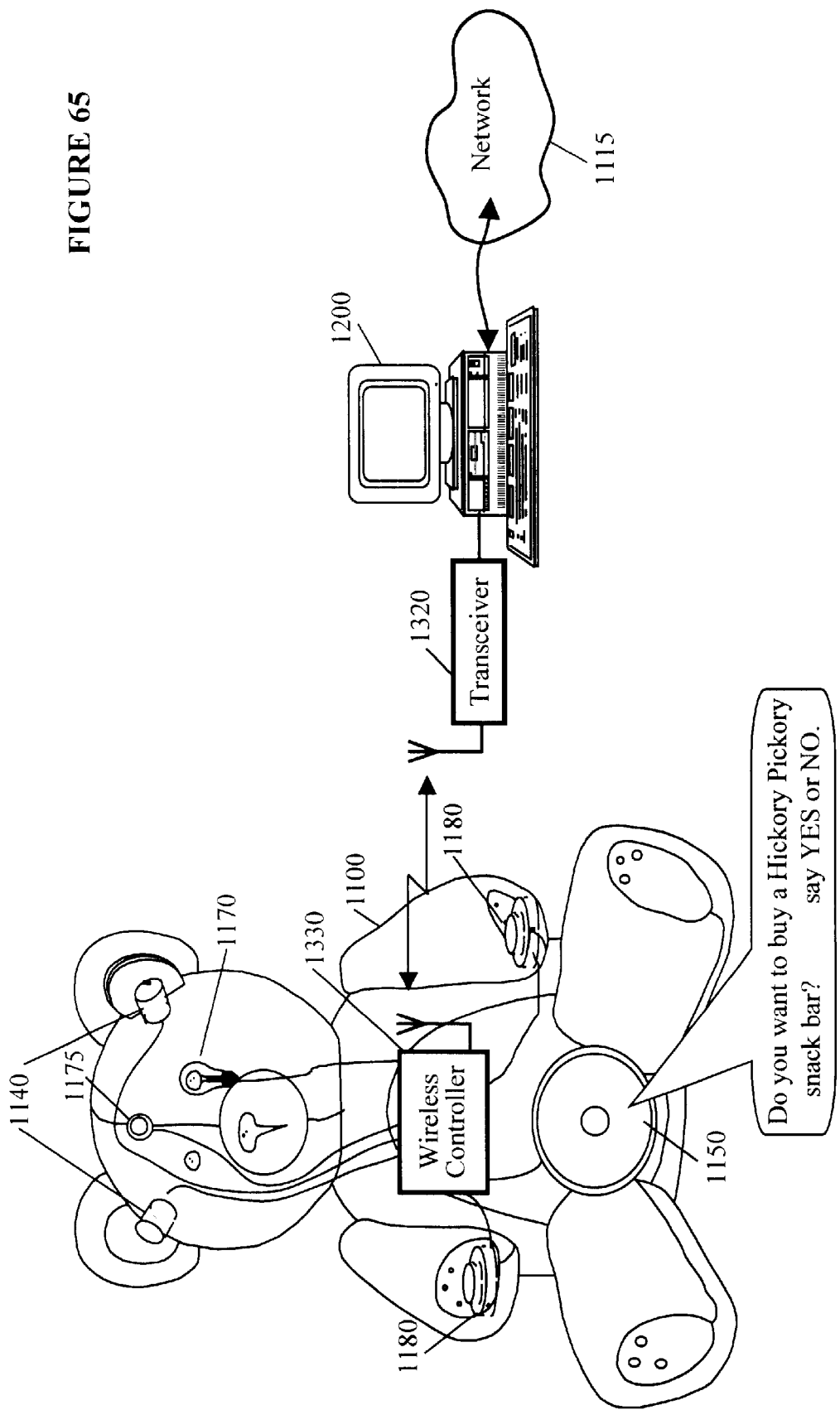
Figure 66:
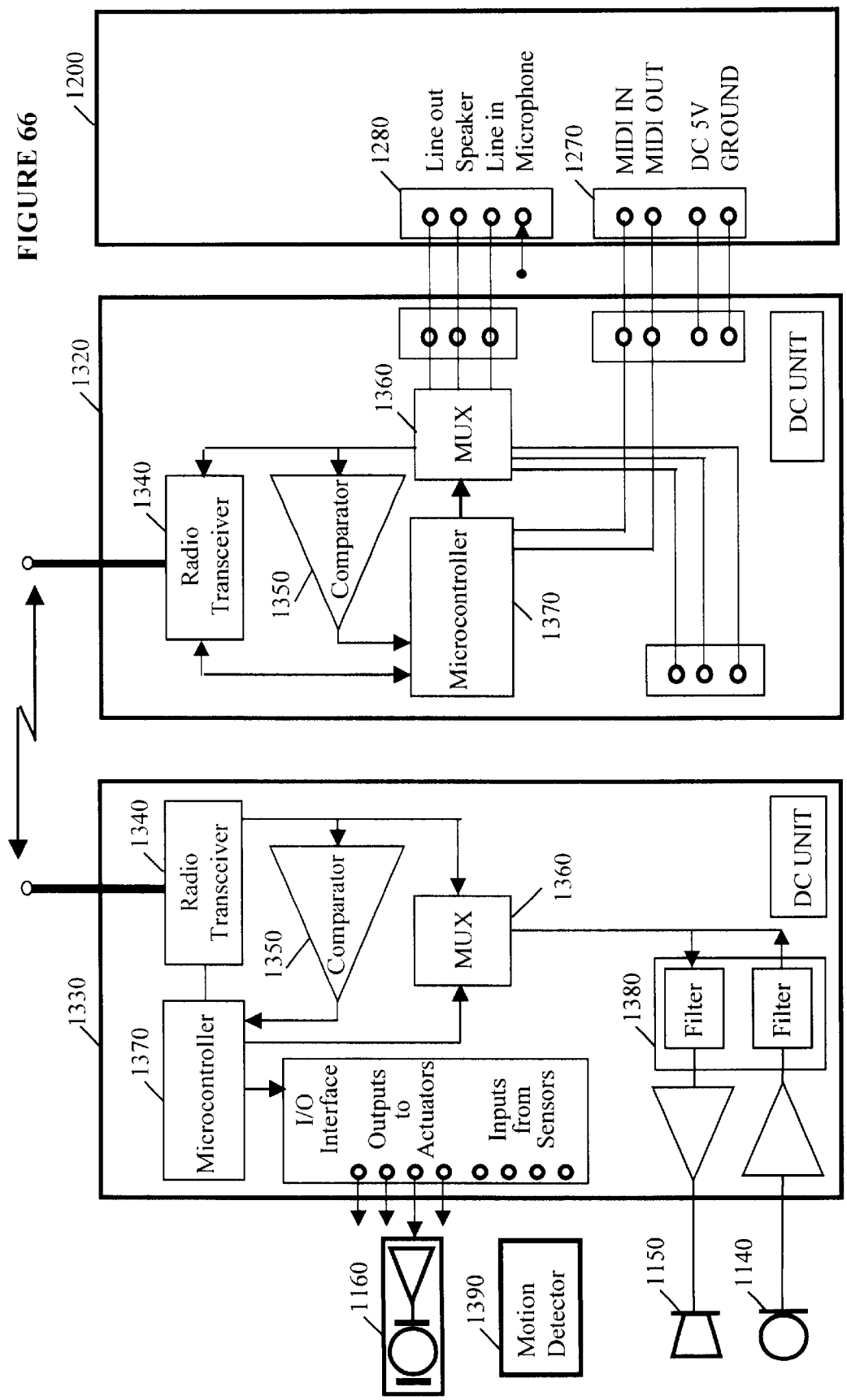
Figure 67:
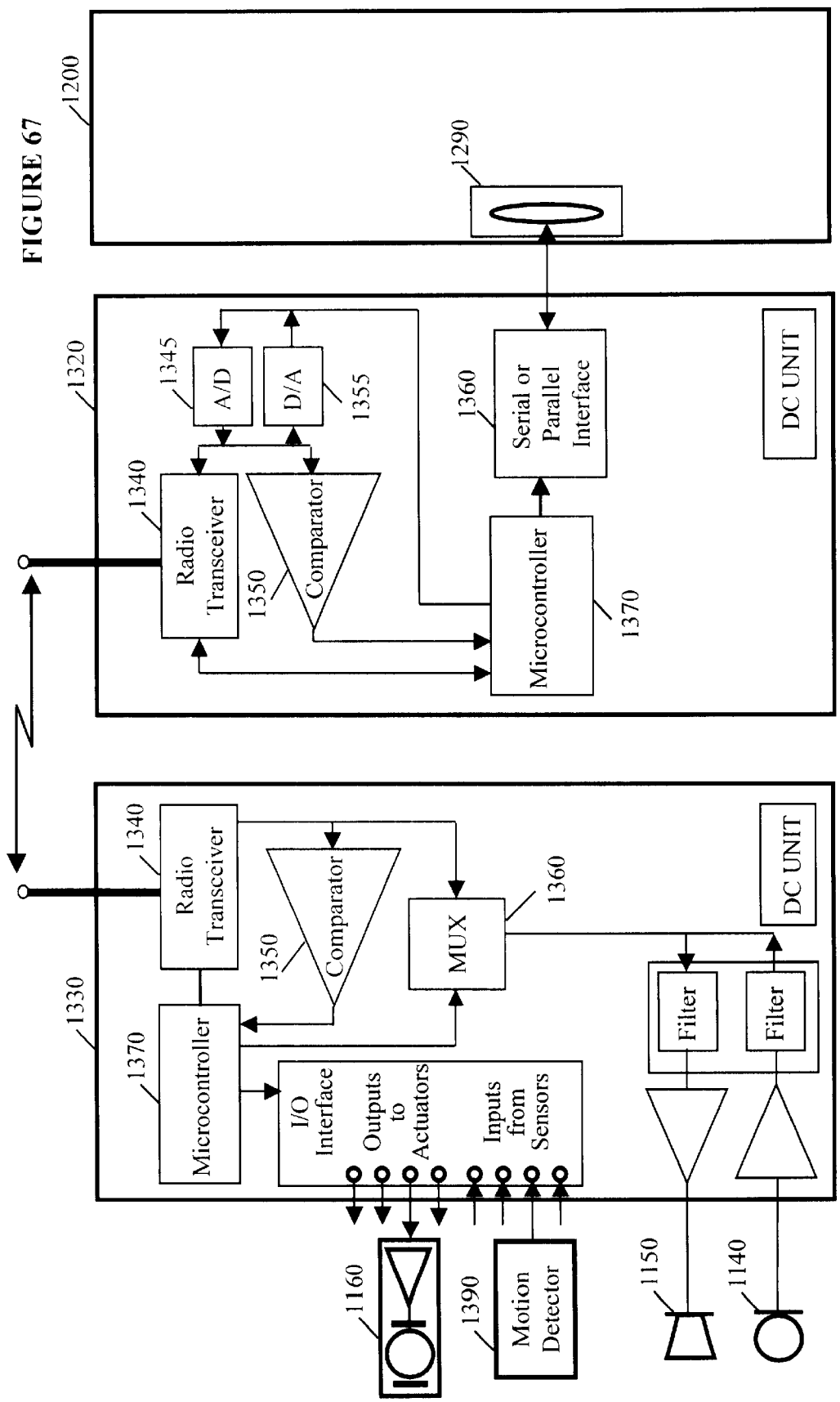
Figure 68:
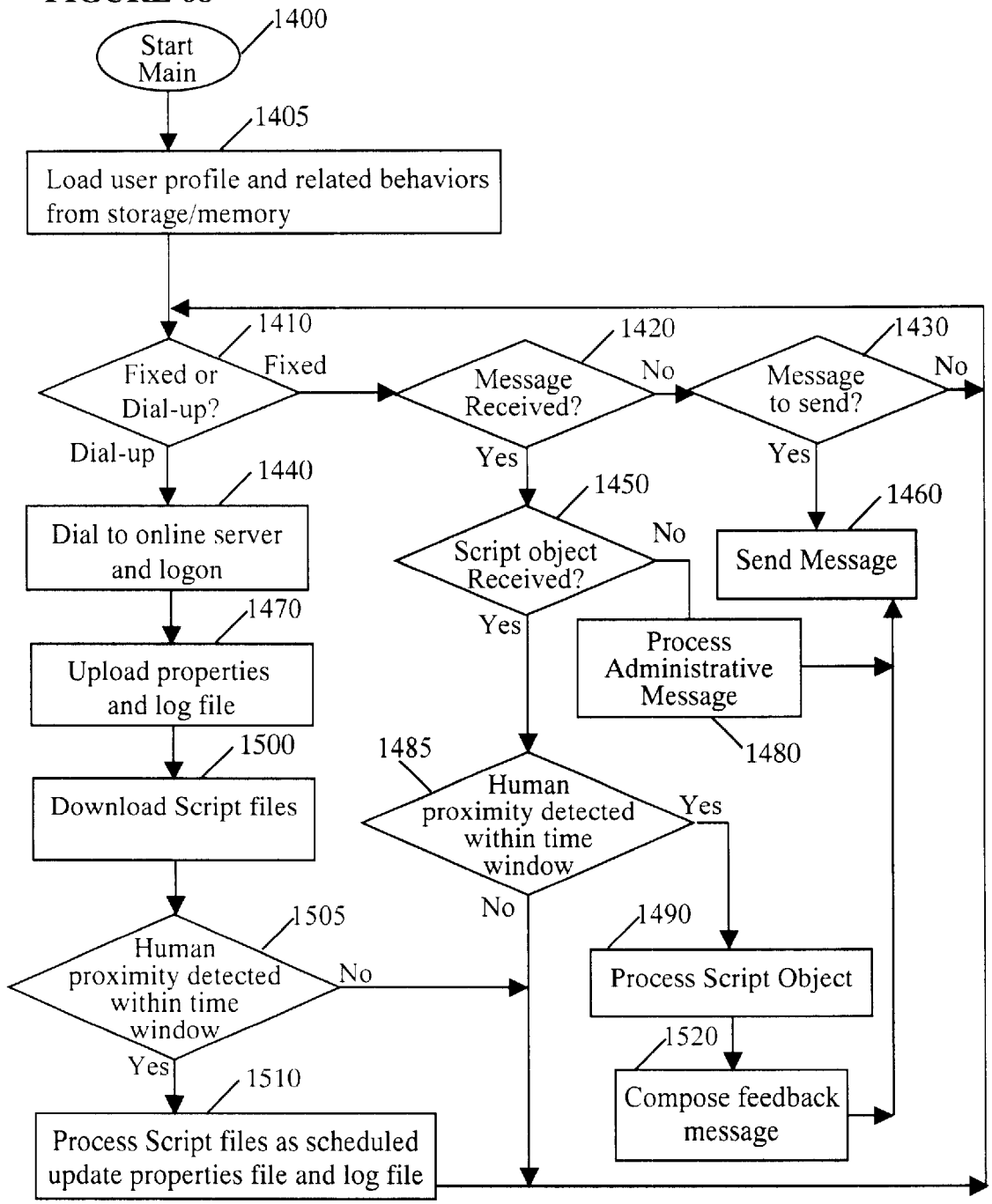
Figure 69:
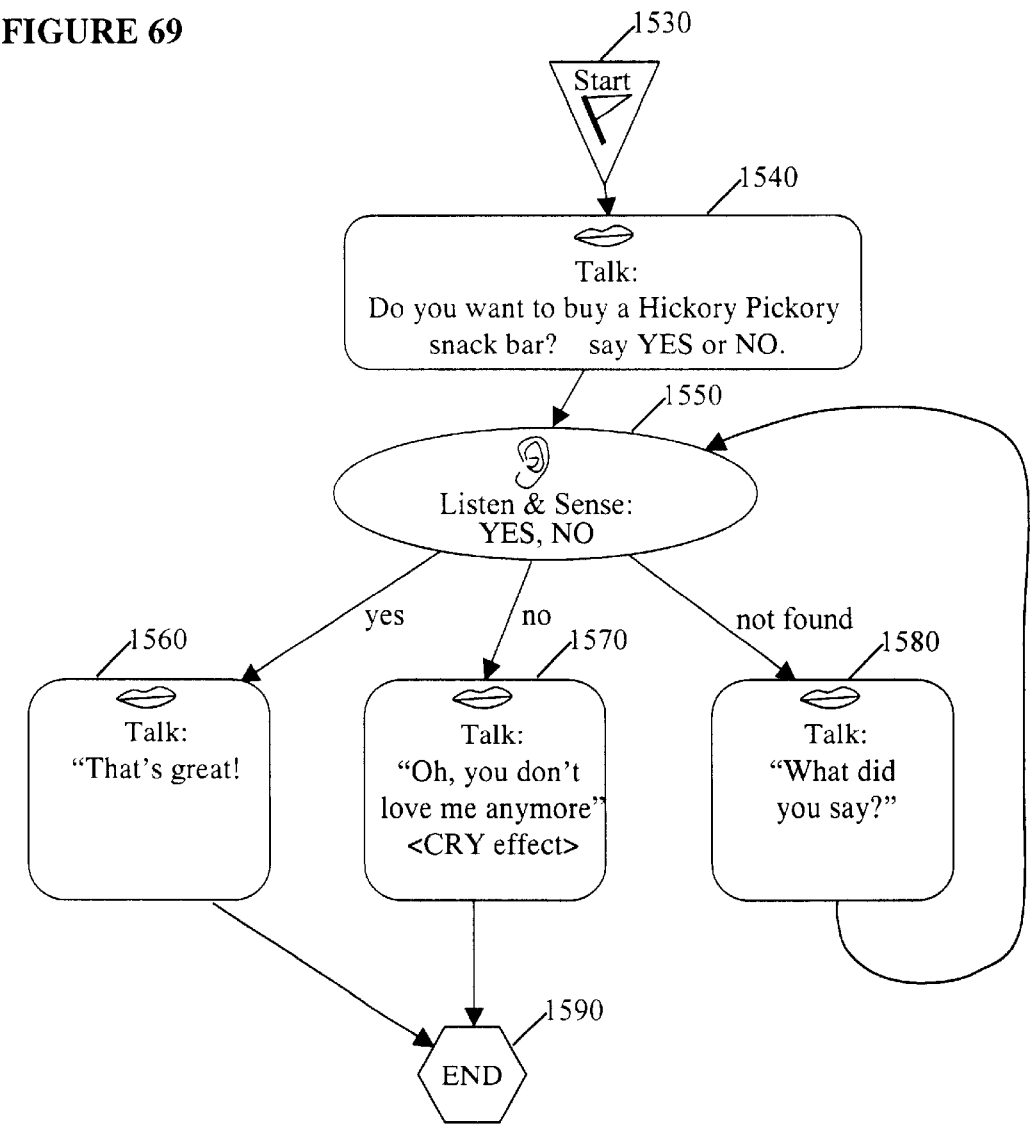
Figure 70:
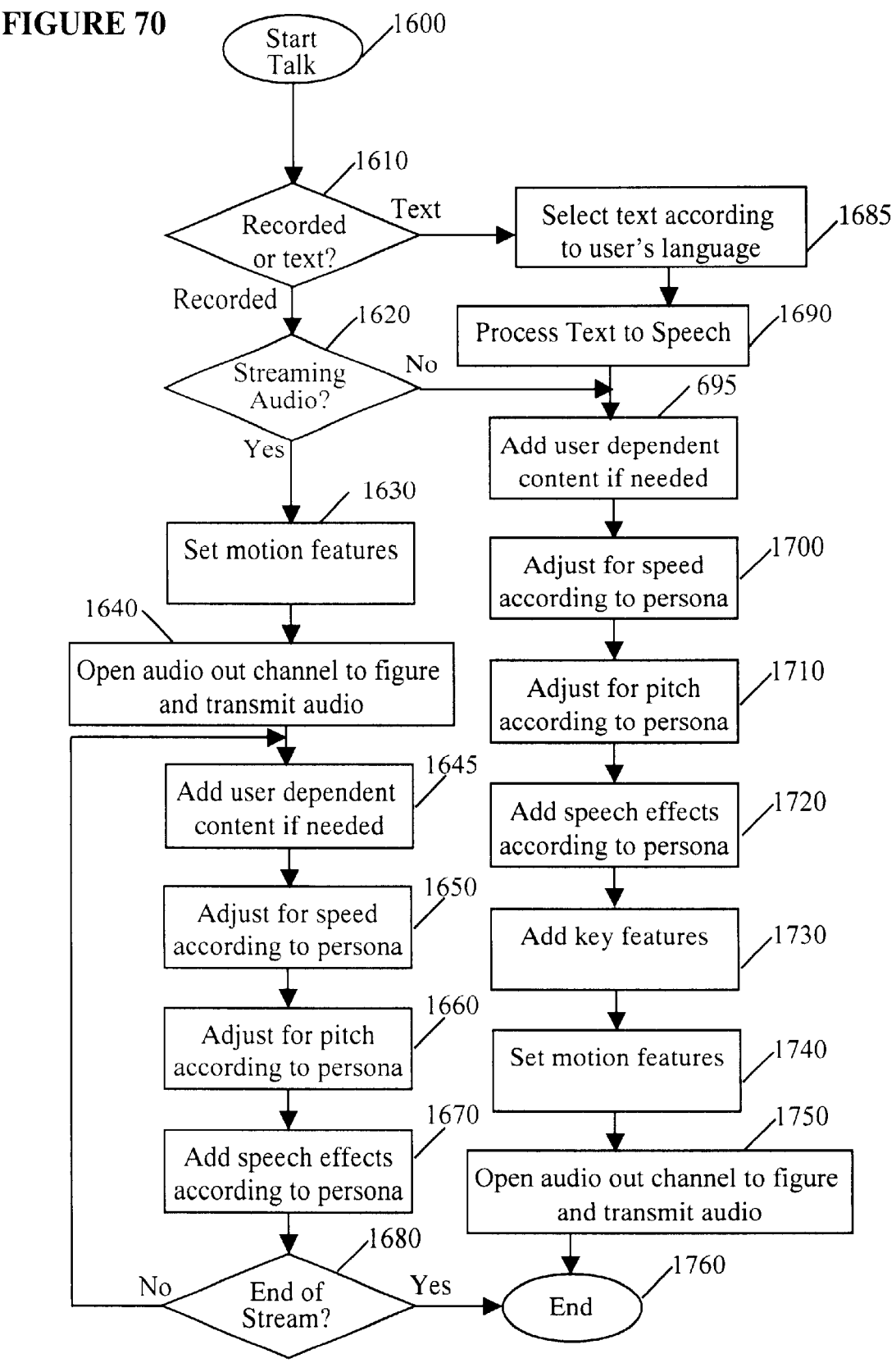
Figure 71:
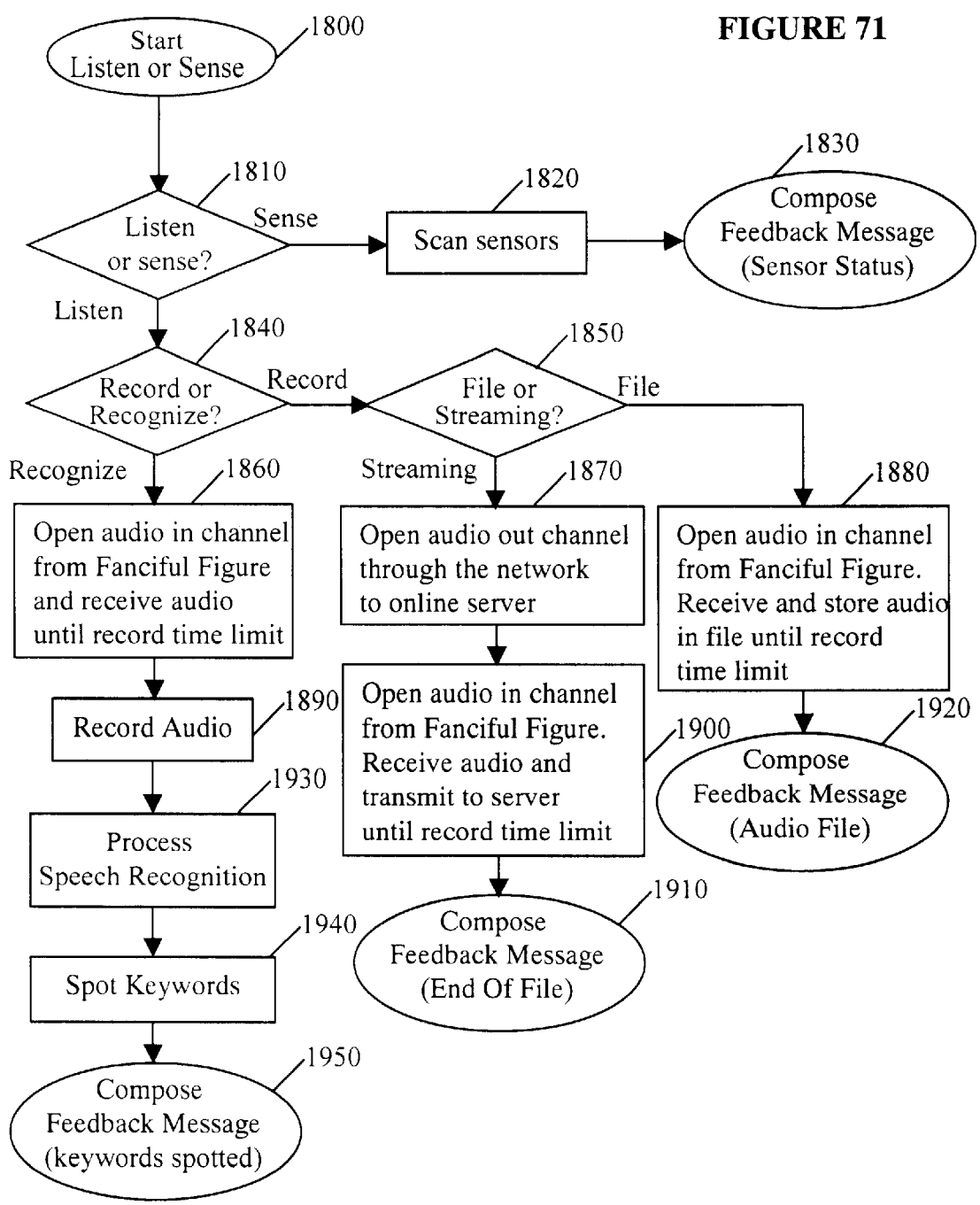
Figure 72:
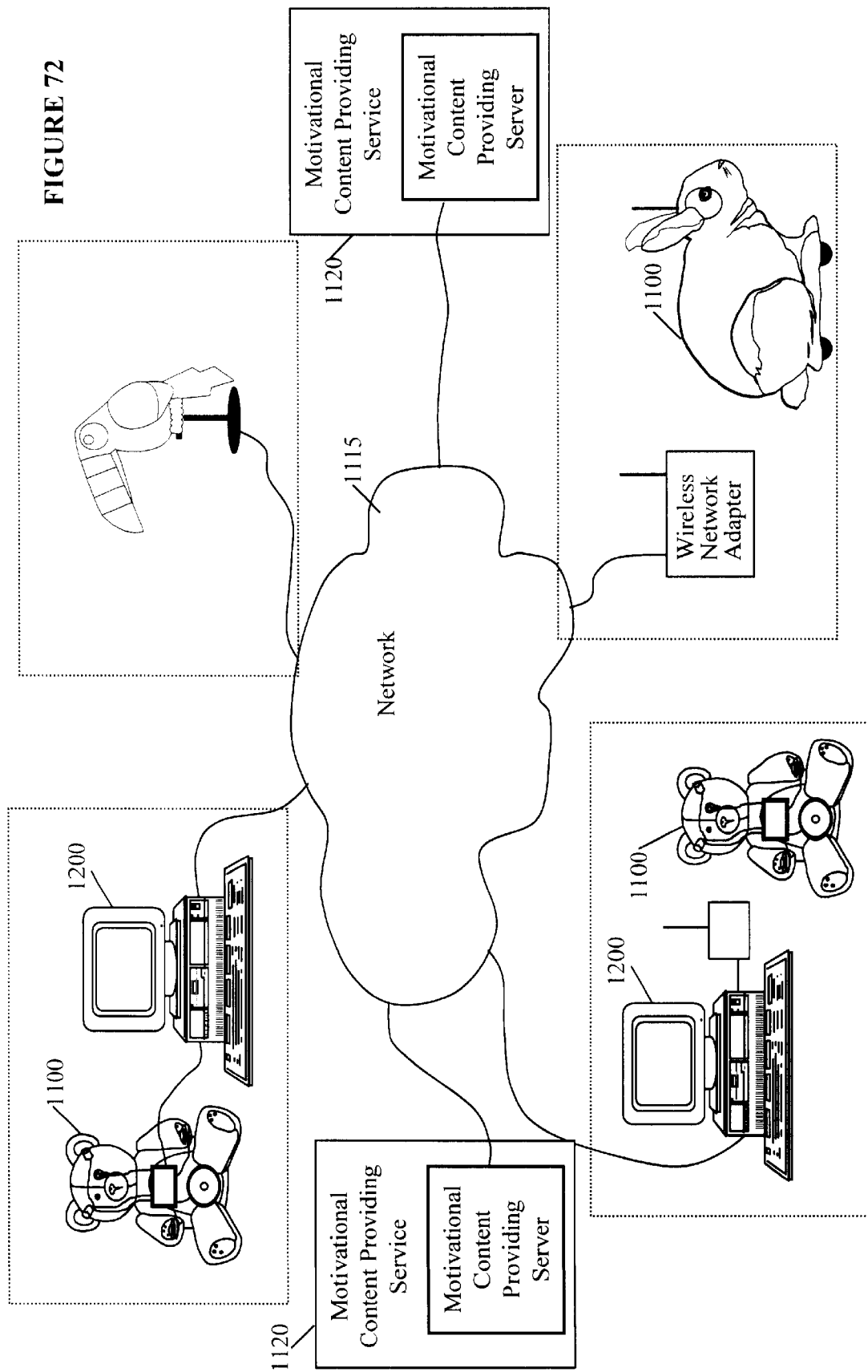
Figure 73:
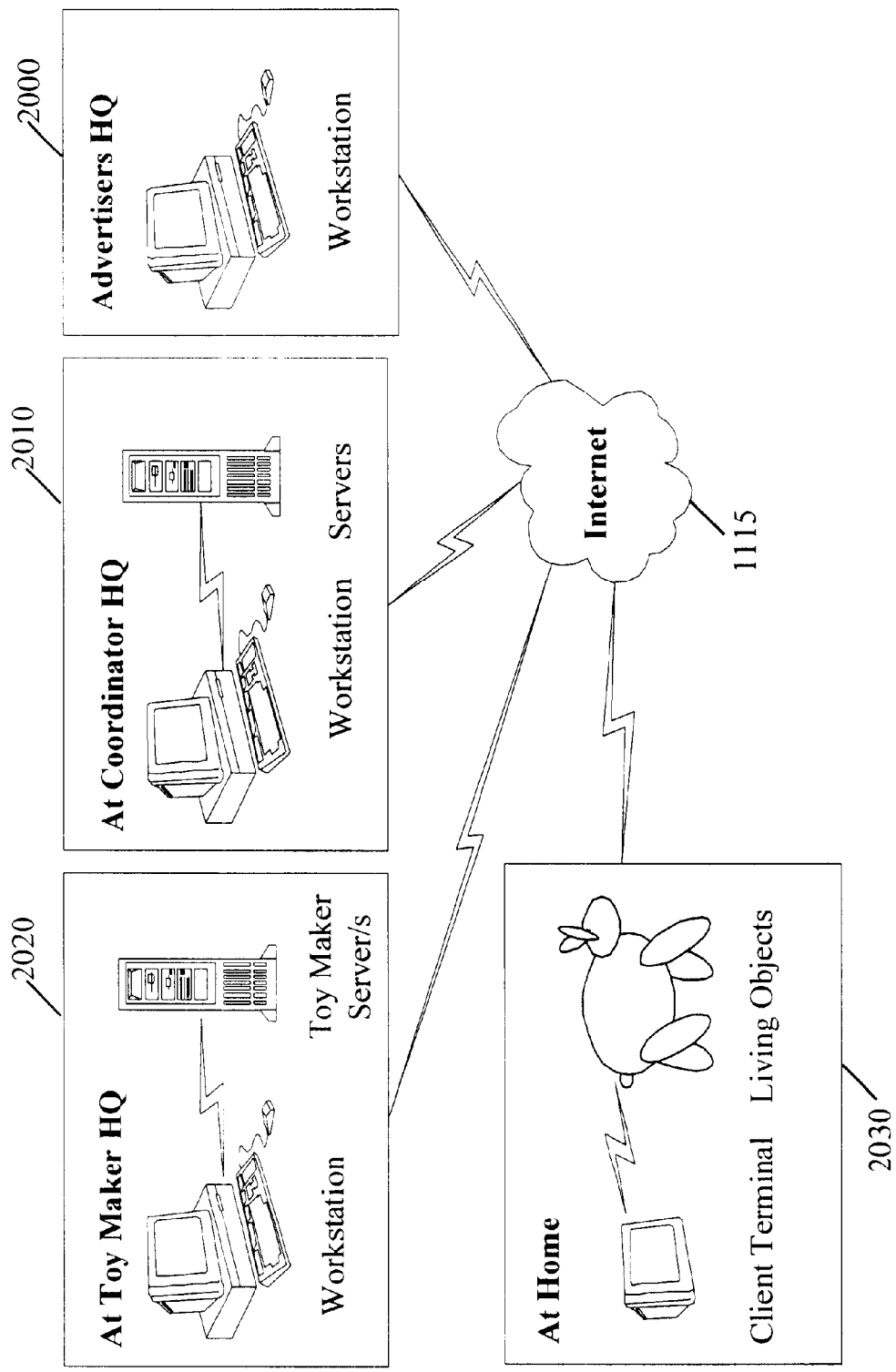
Figure 74:
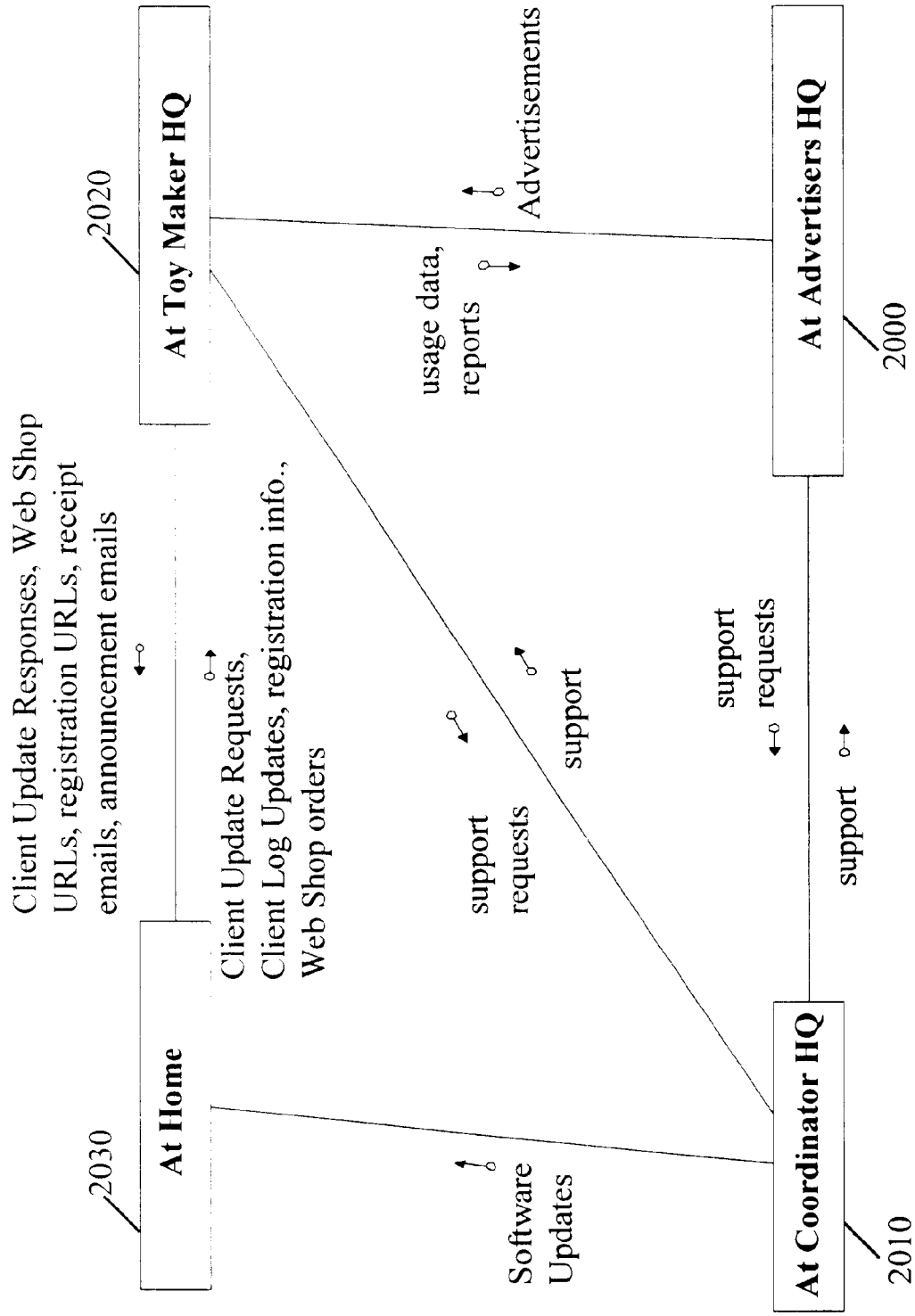
Figure 75:
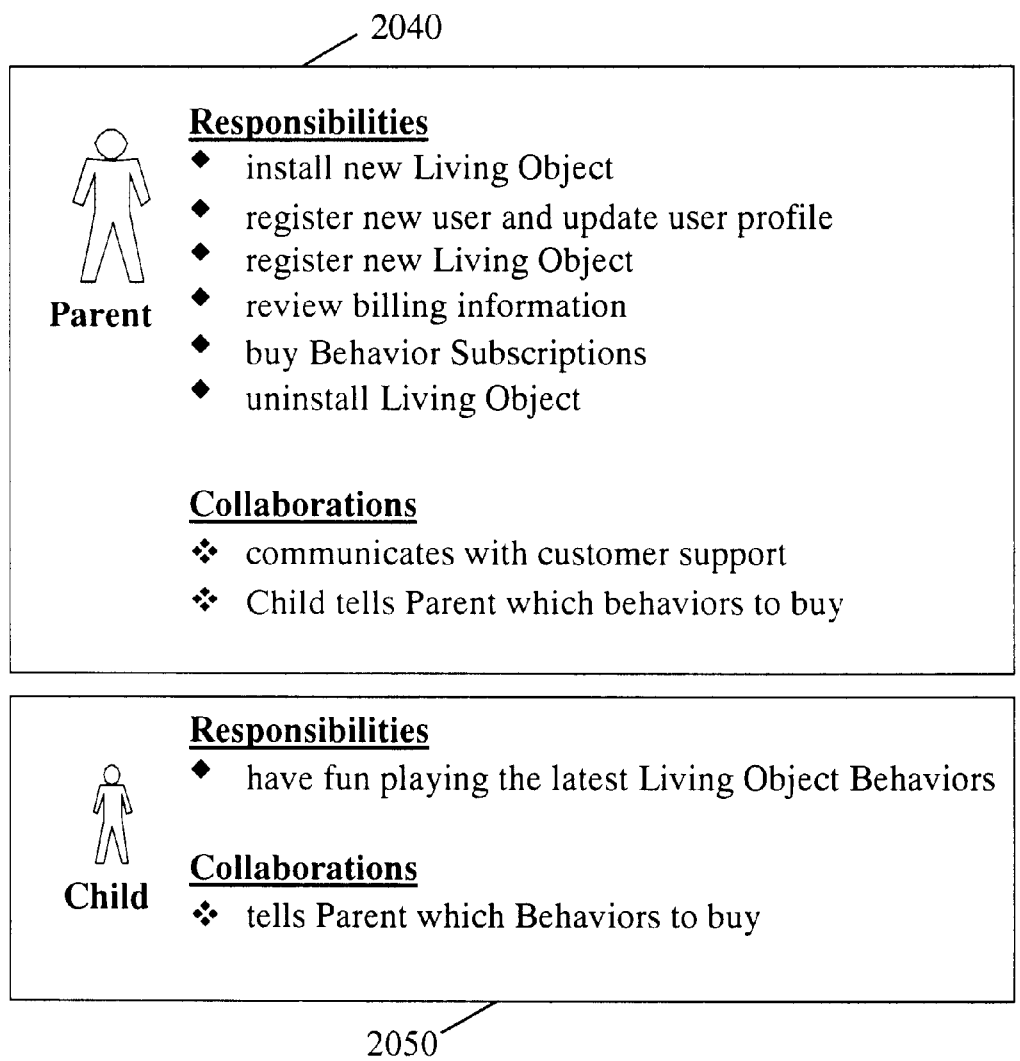
Figure 76:
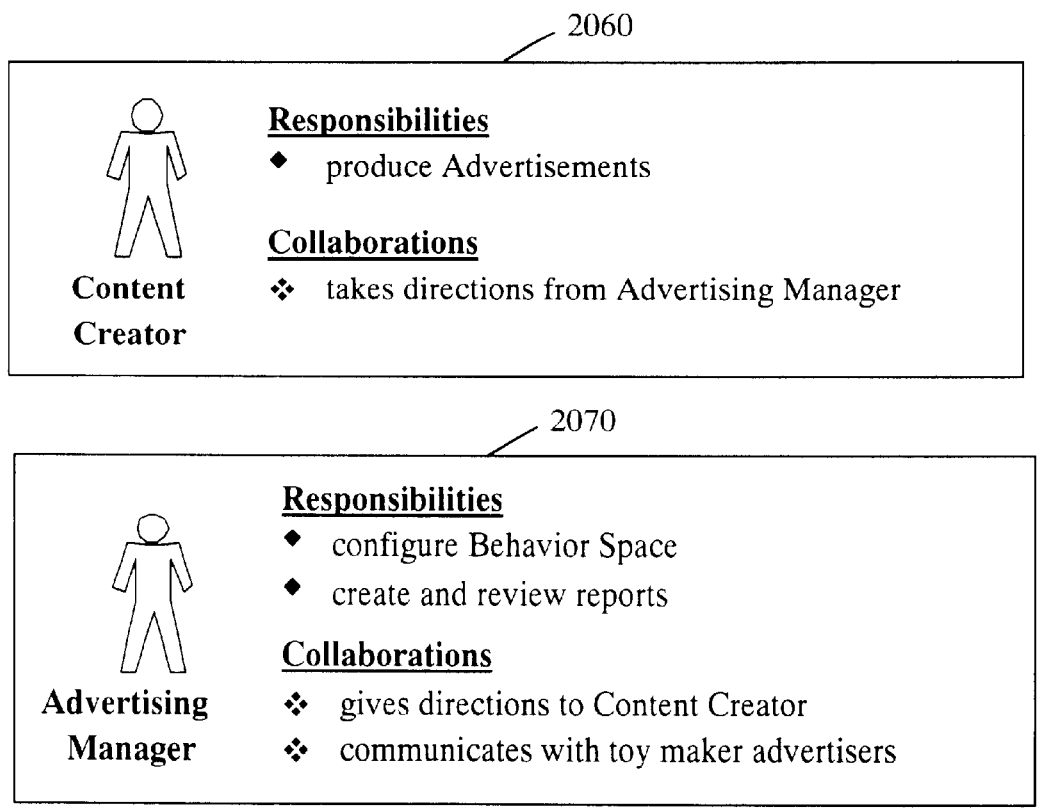
Figure 77:
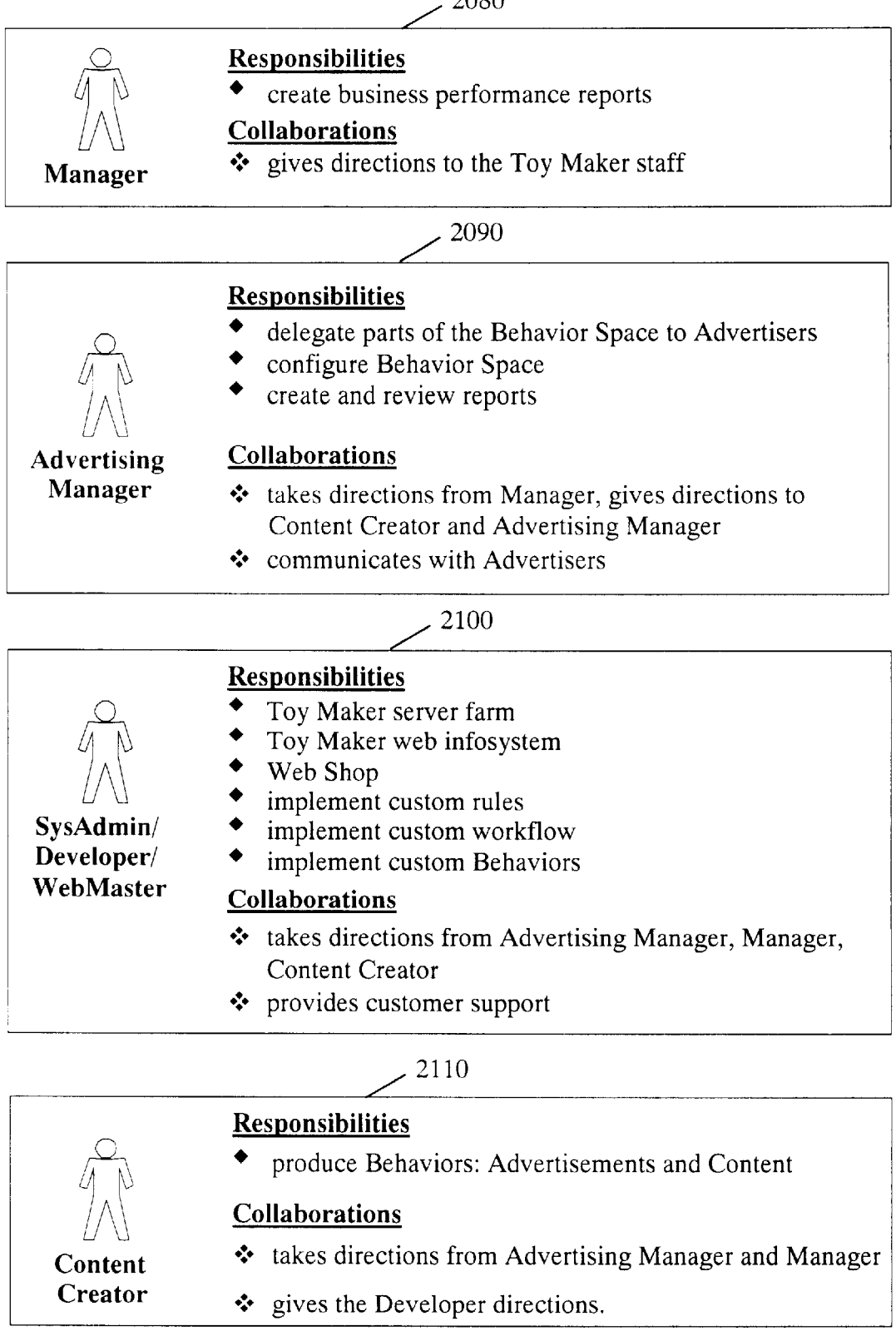
Figure 78:
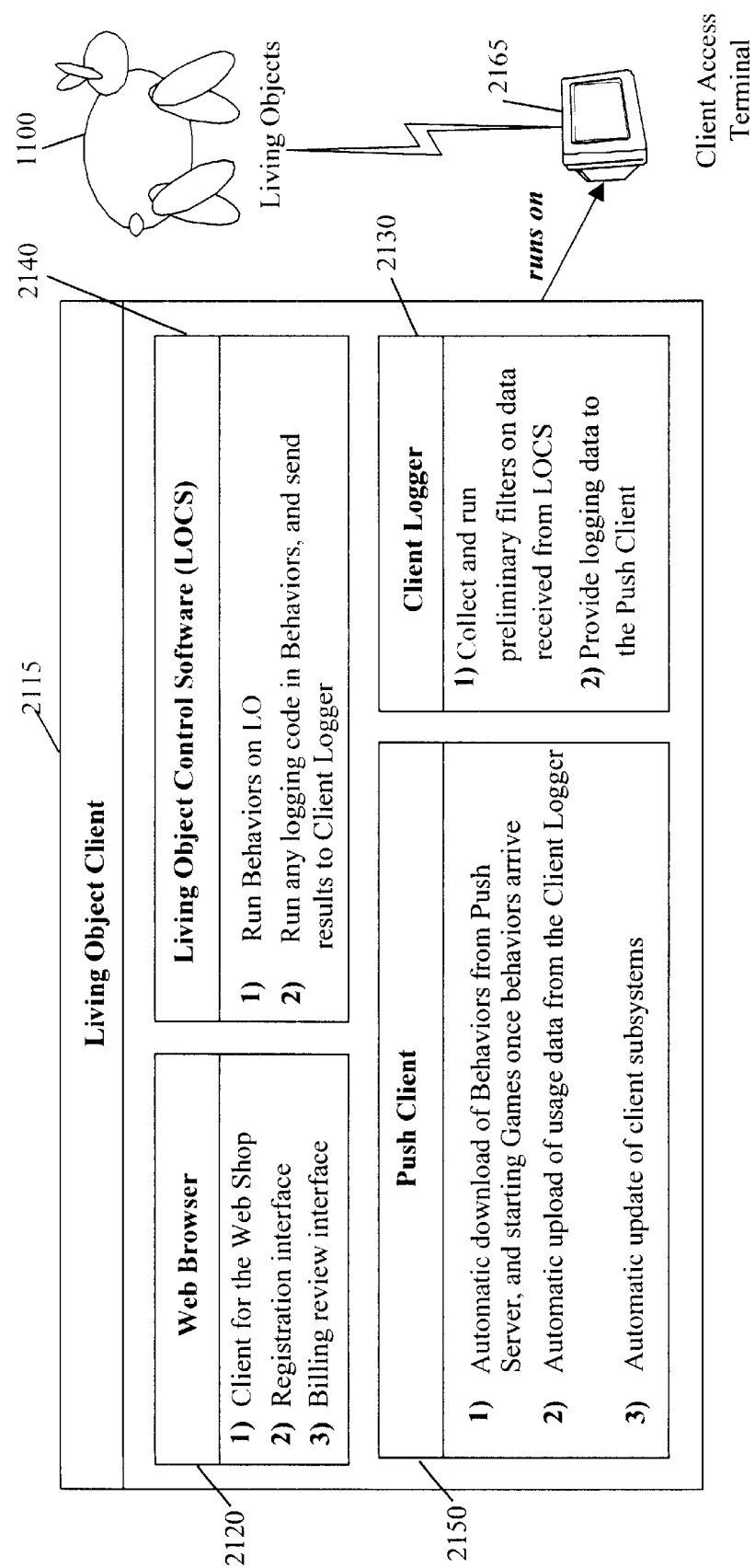
Figure 79:
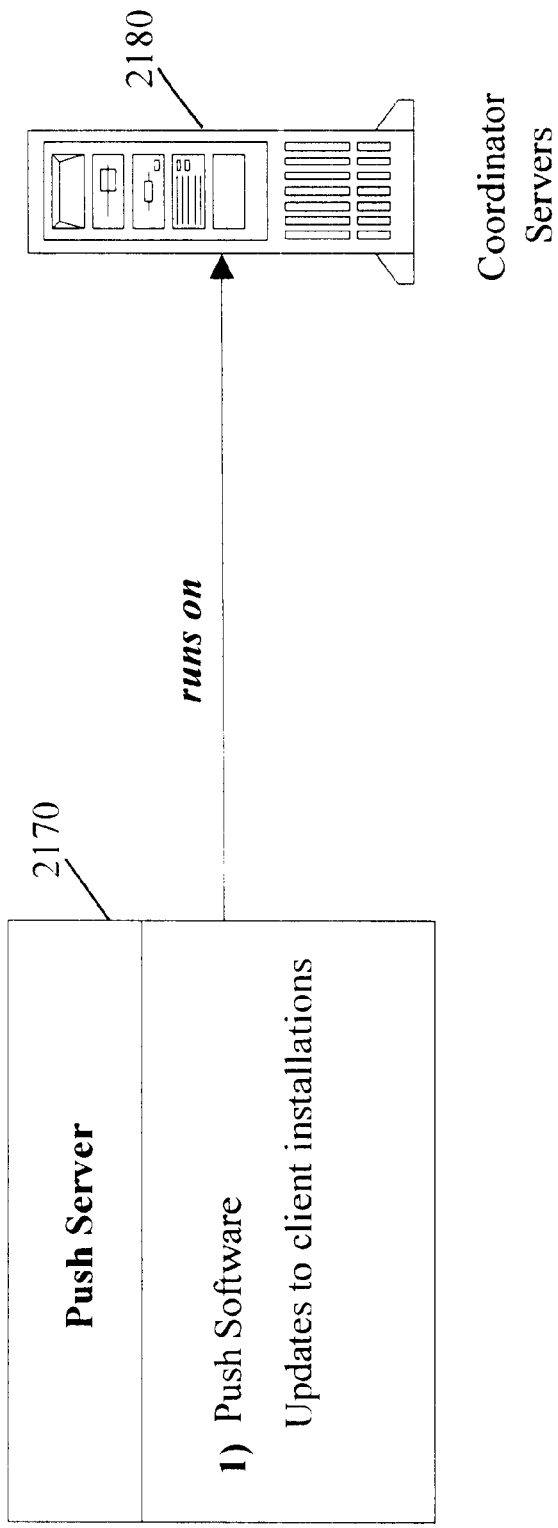
Figure 80:
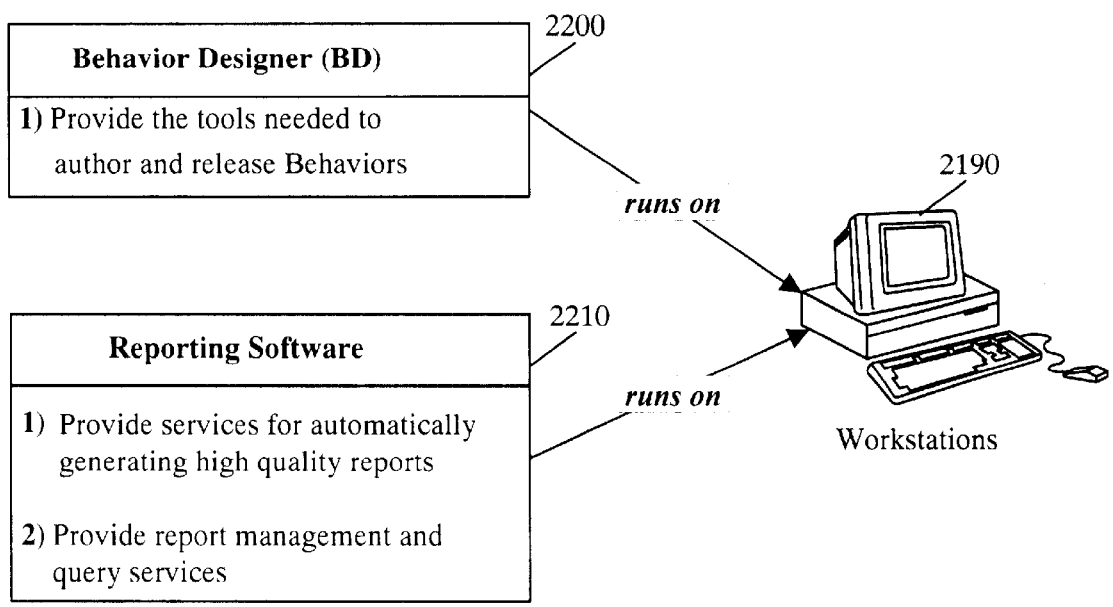
Figure 81:
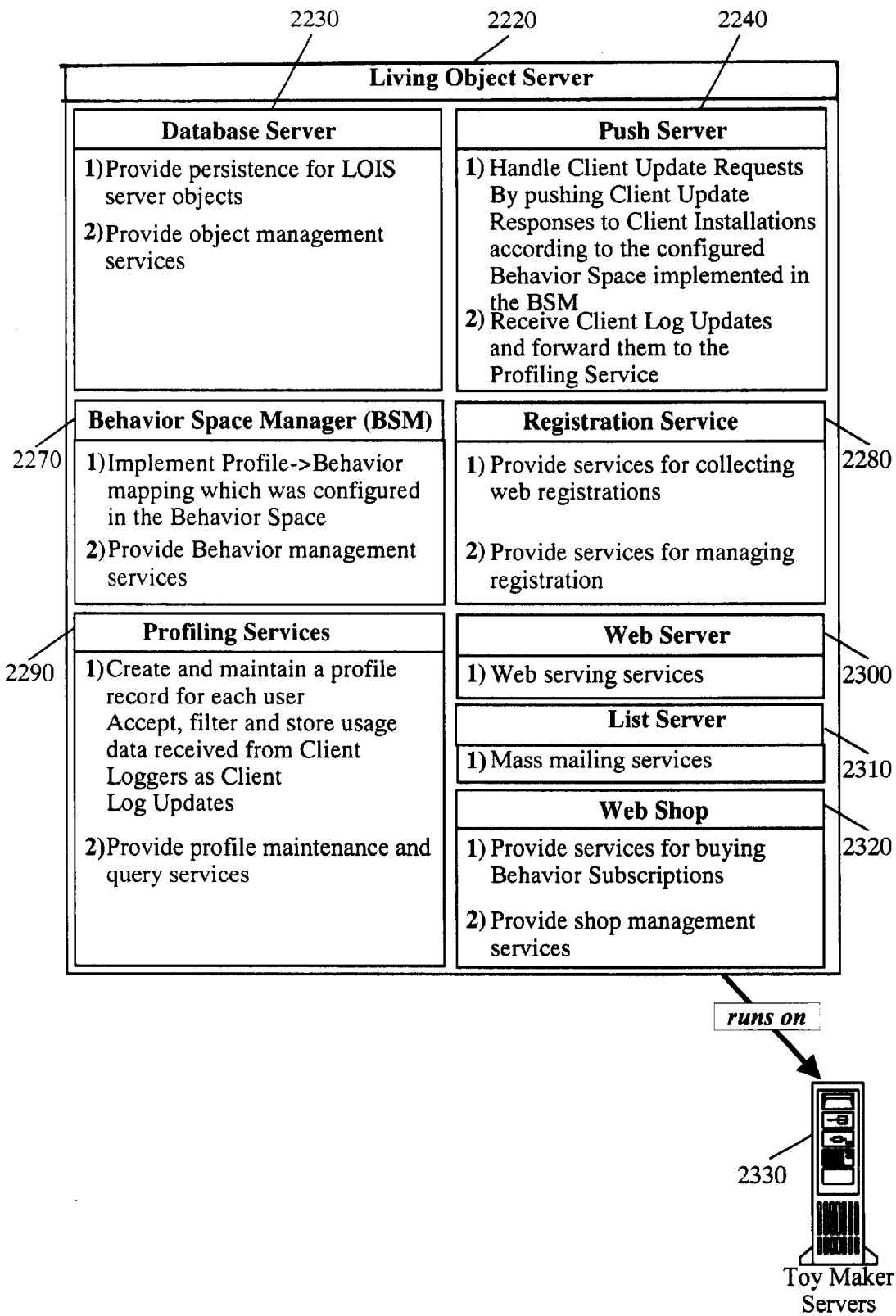
Figure 82:
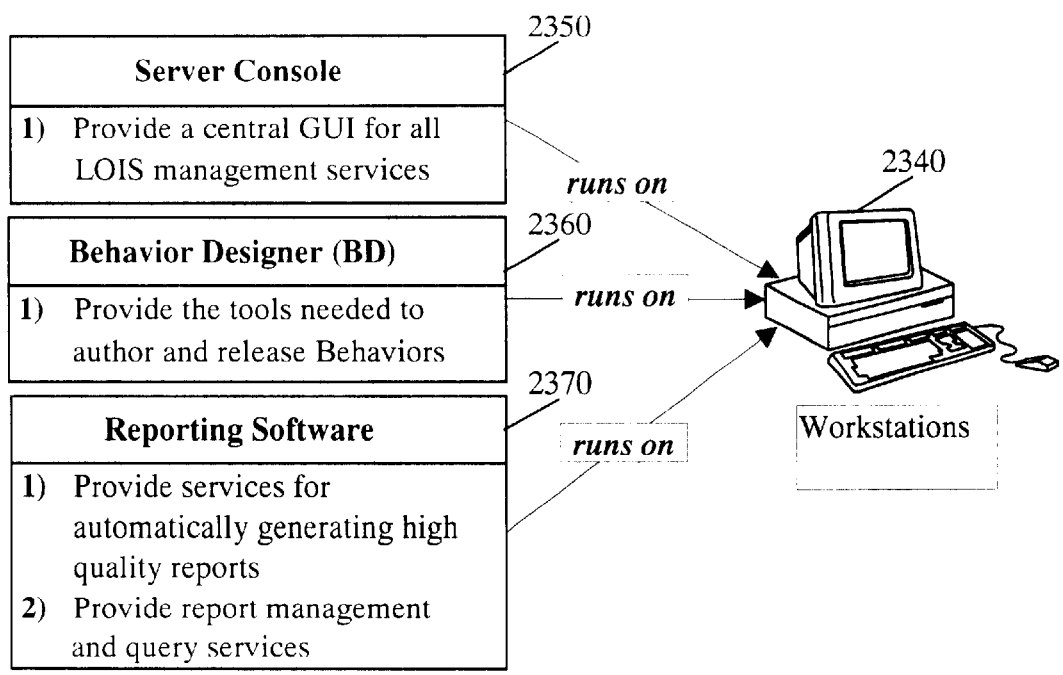
Figure 83:
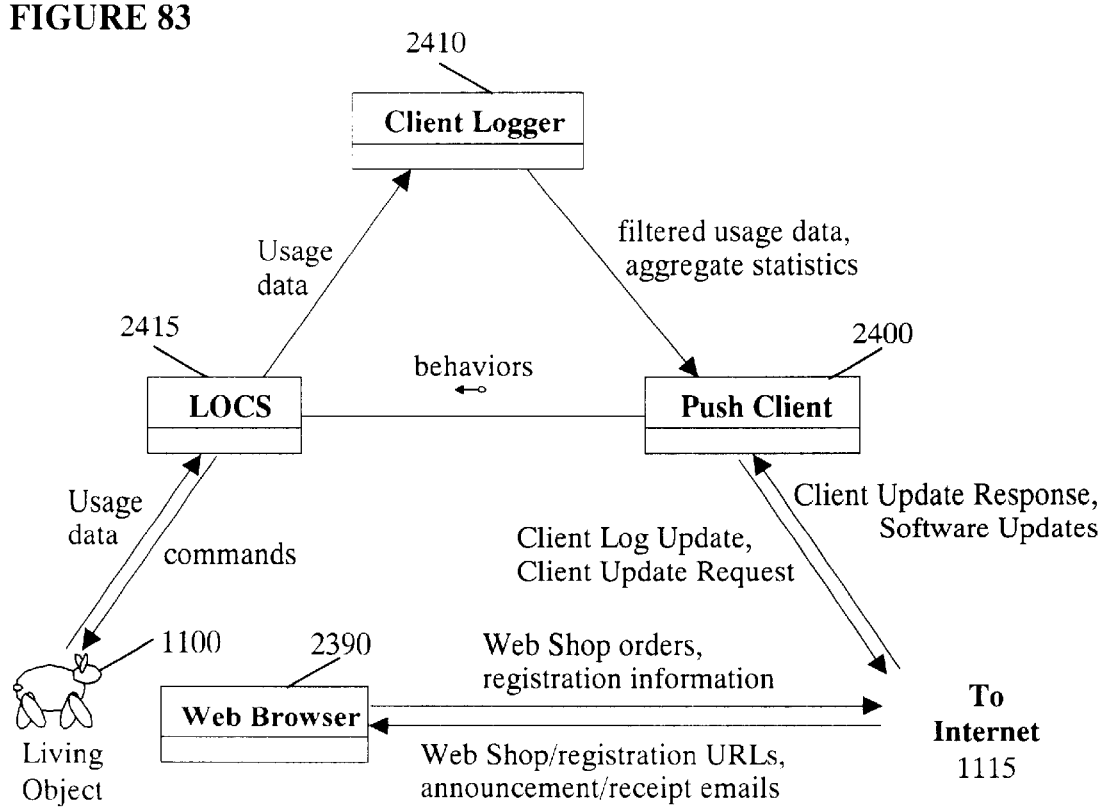
Figure 84:
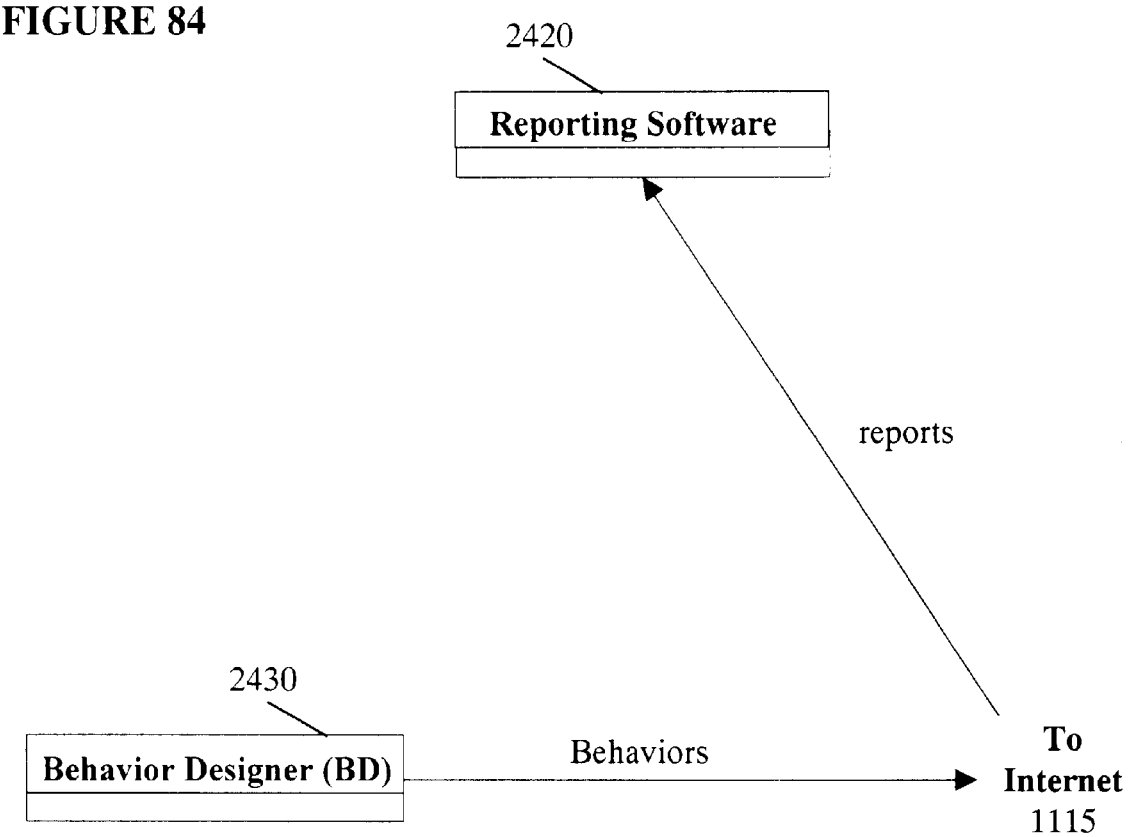
Figure 85:
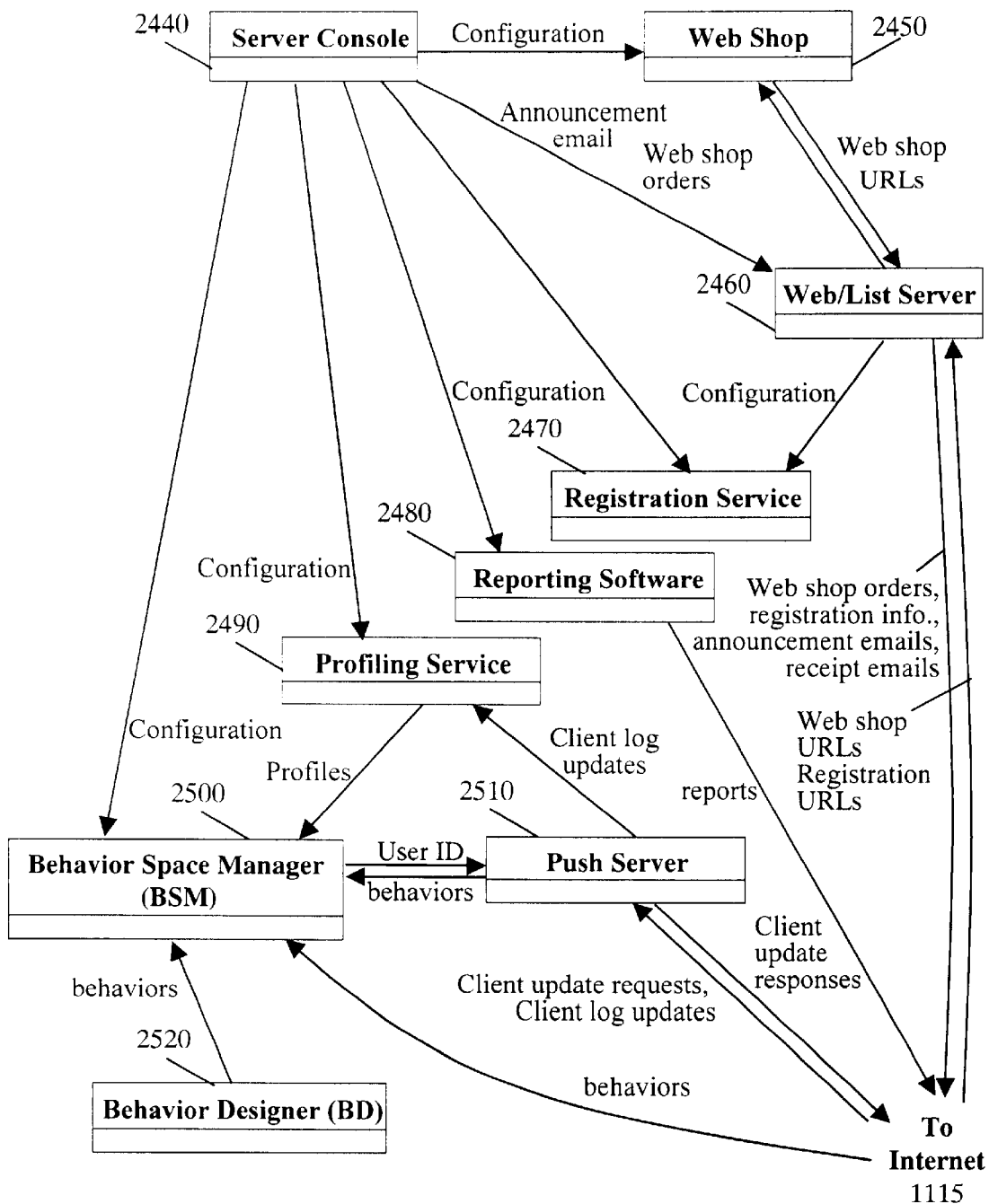
Figure 86:
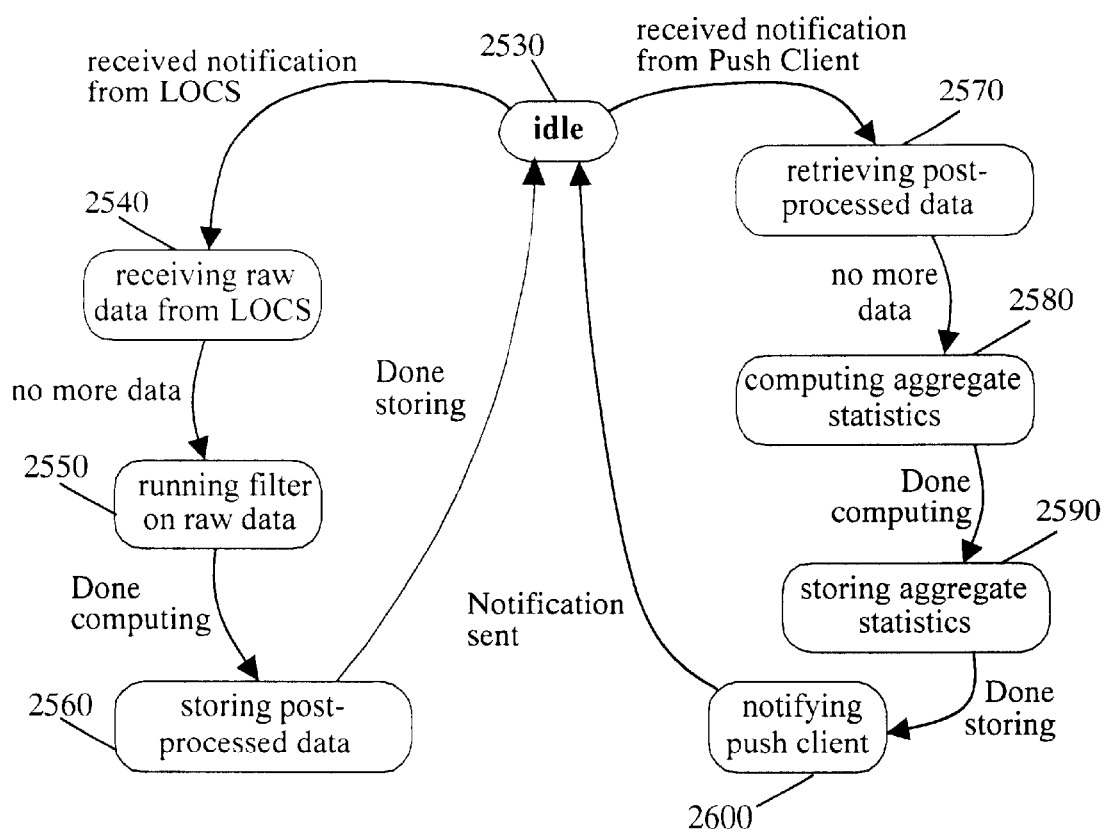
Figure 87:
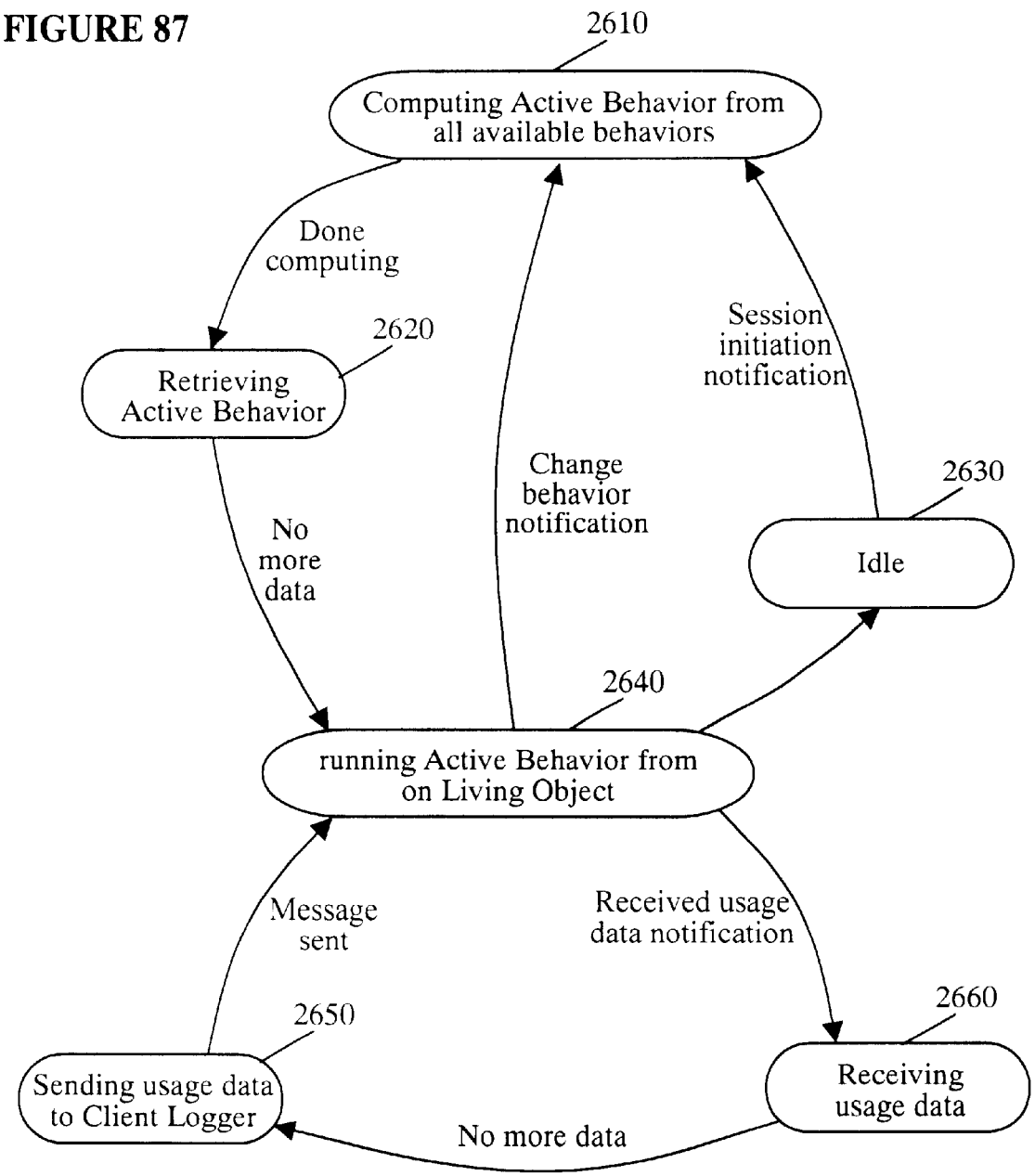
Figure 88:
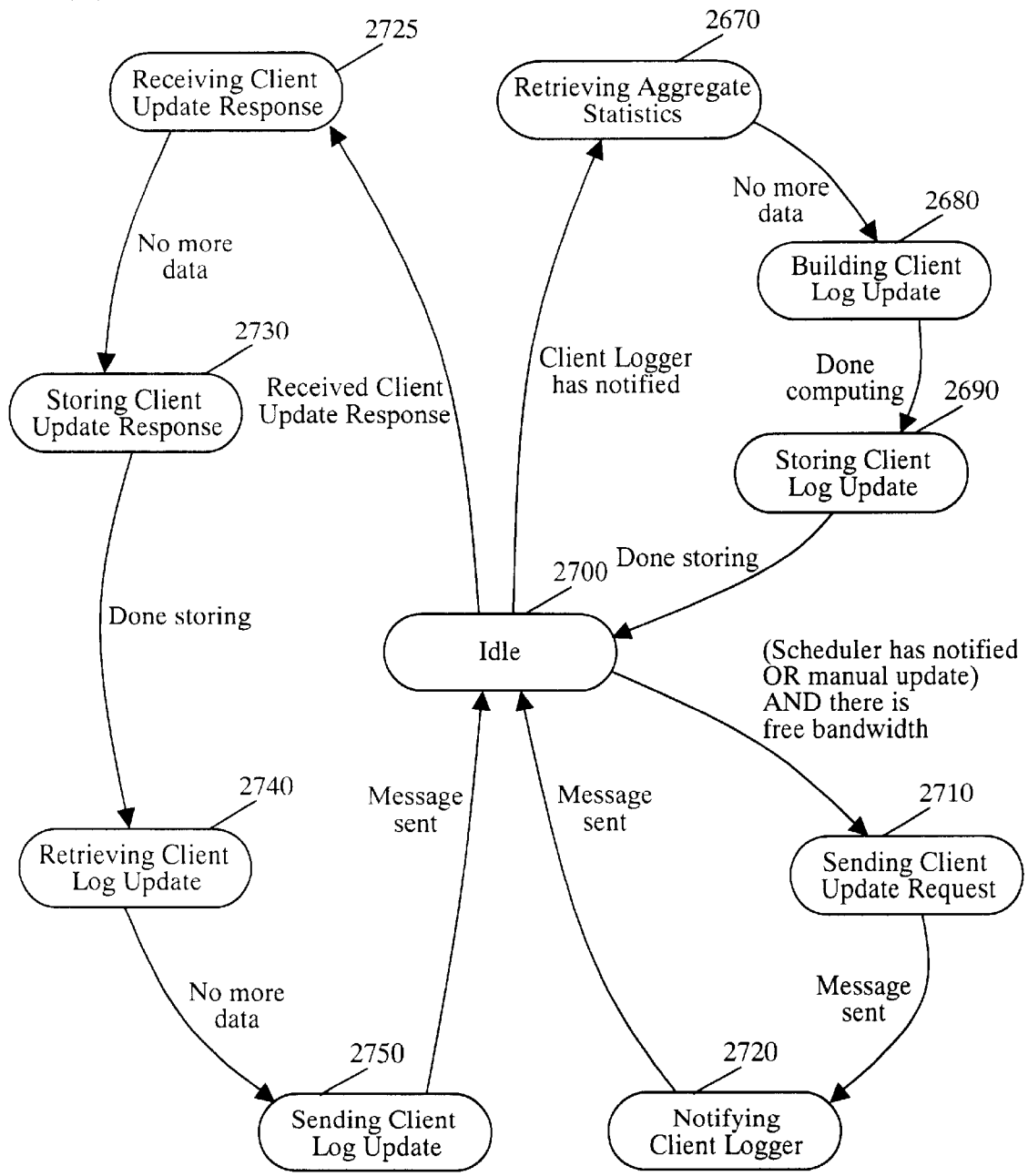
Figure 89:
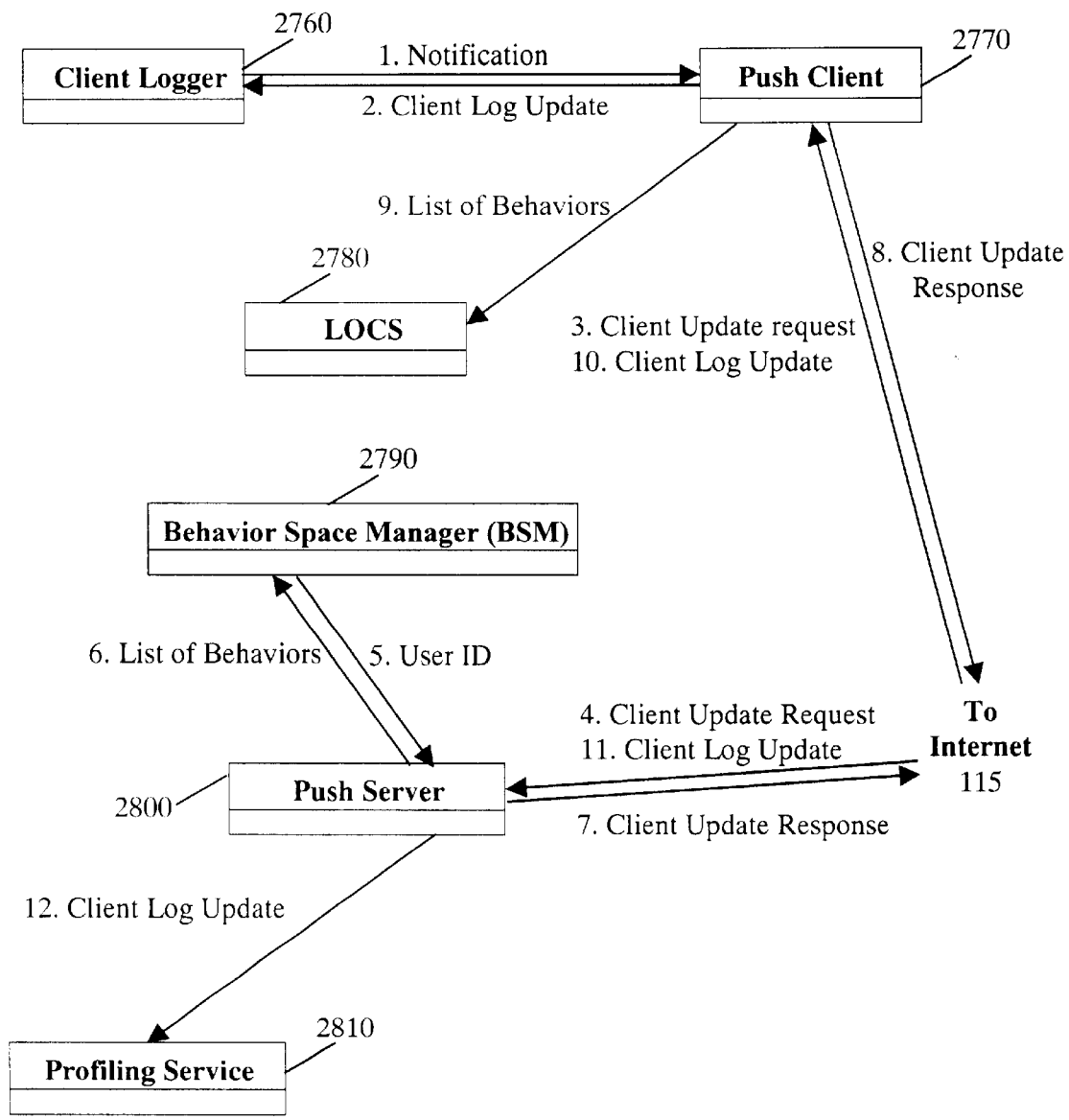
Figure 90:
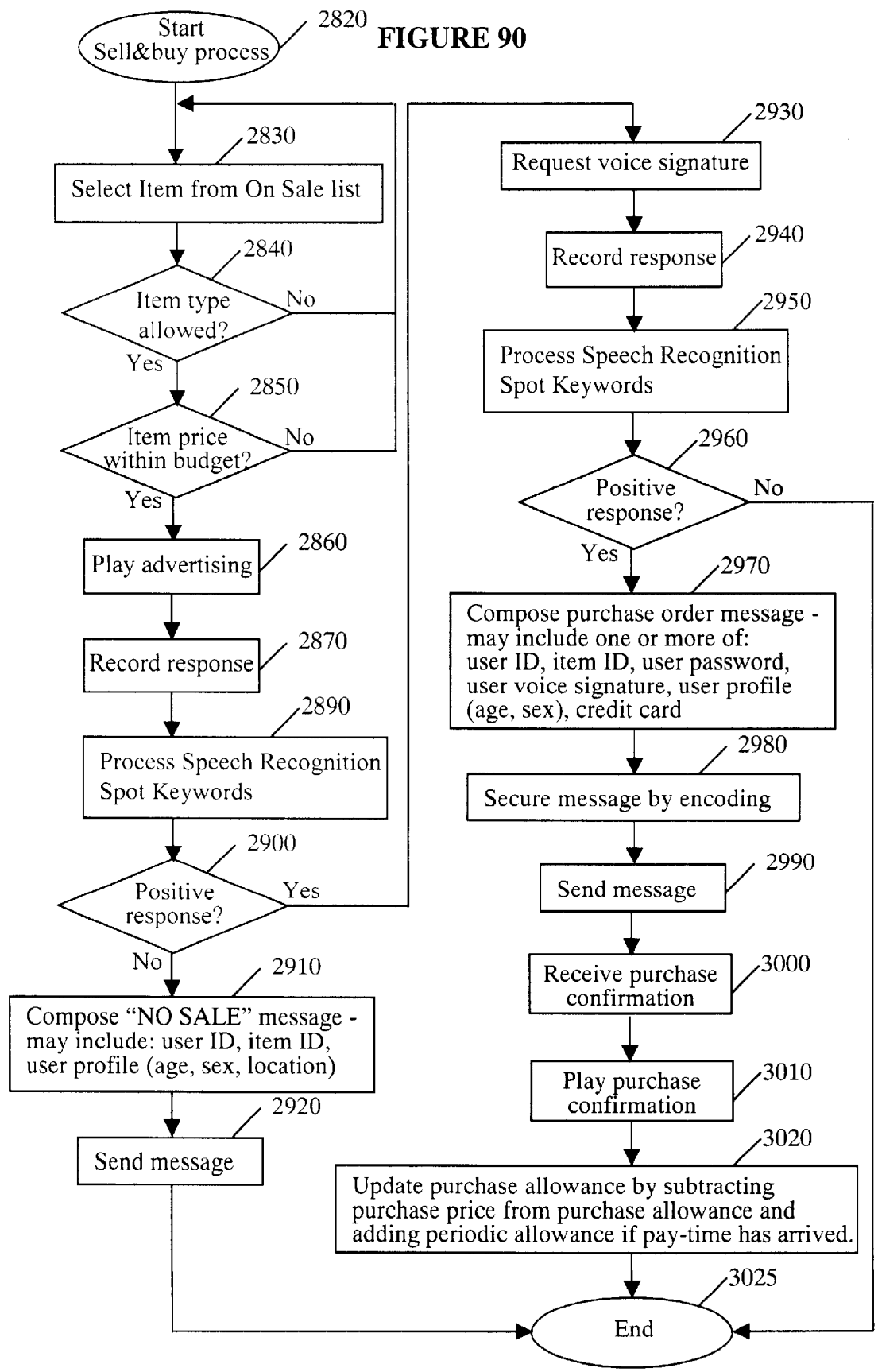
Figure 91:
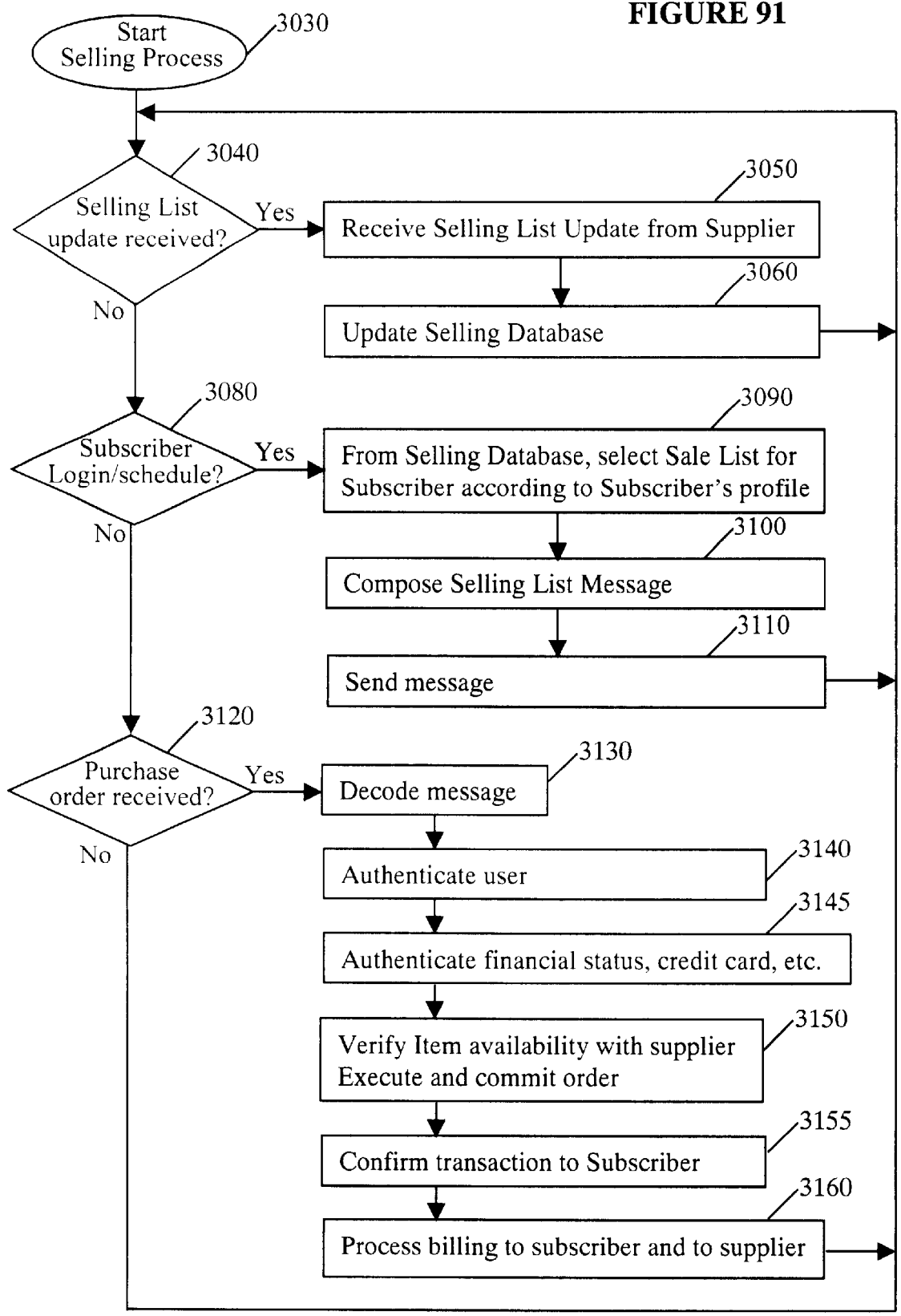
Figure 92:
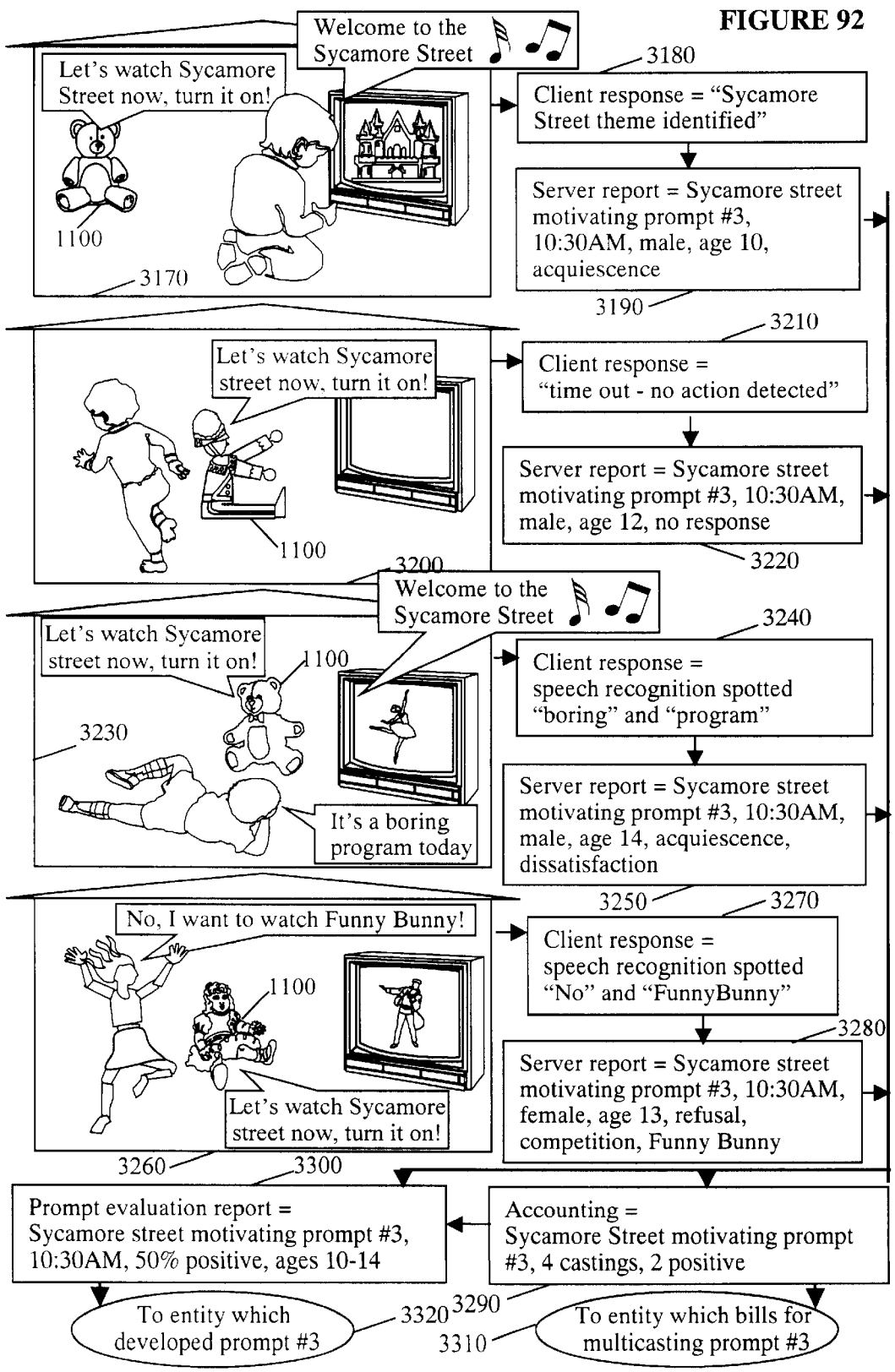
Figure 93:
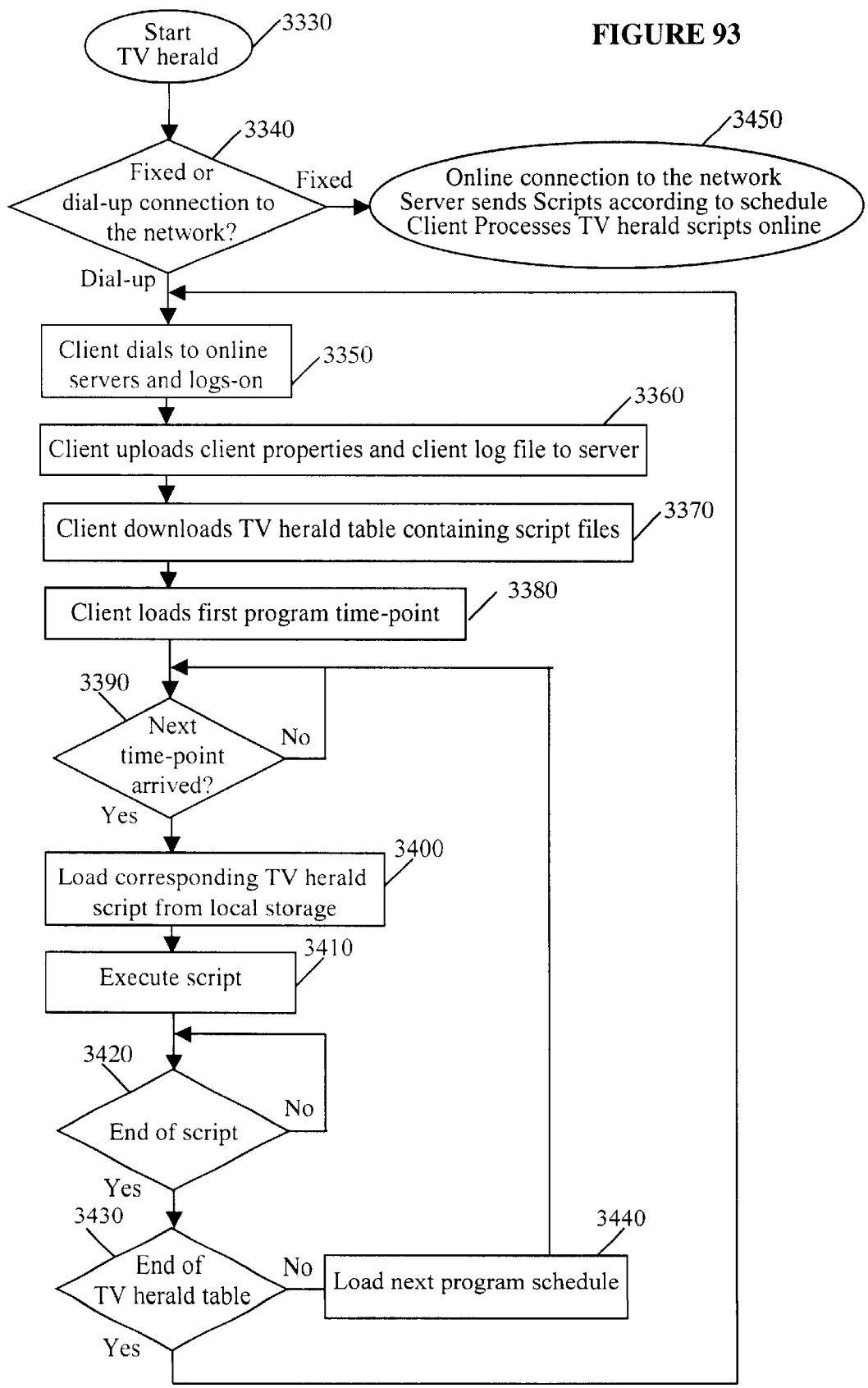
Figure 94:
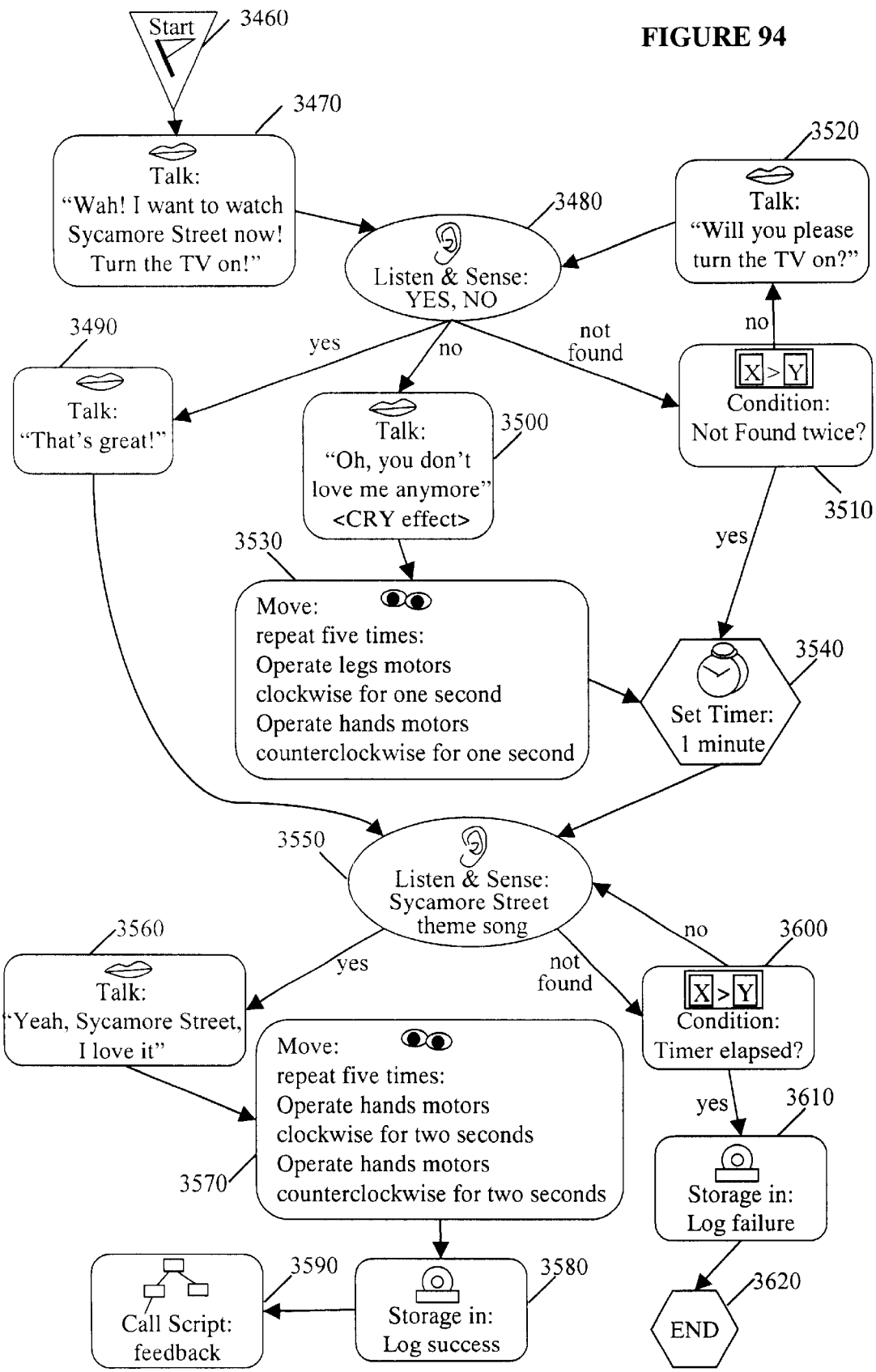
Figure 95:
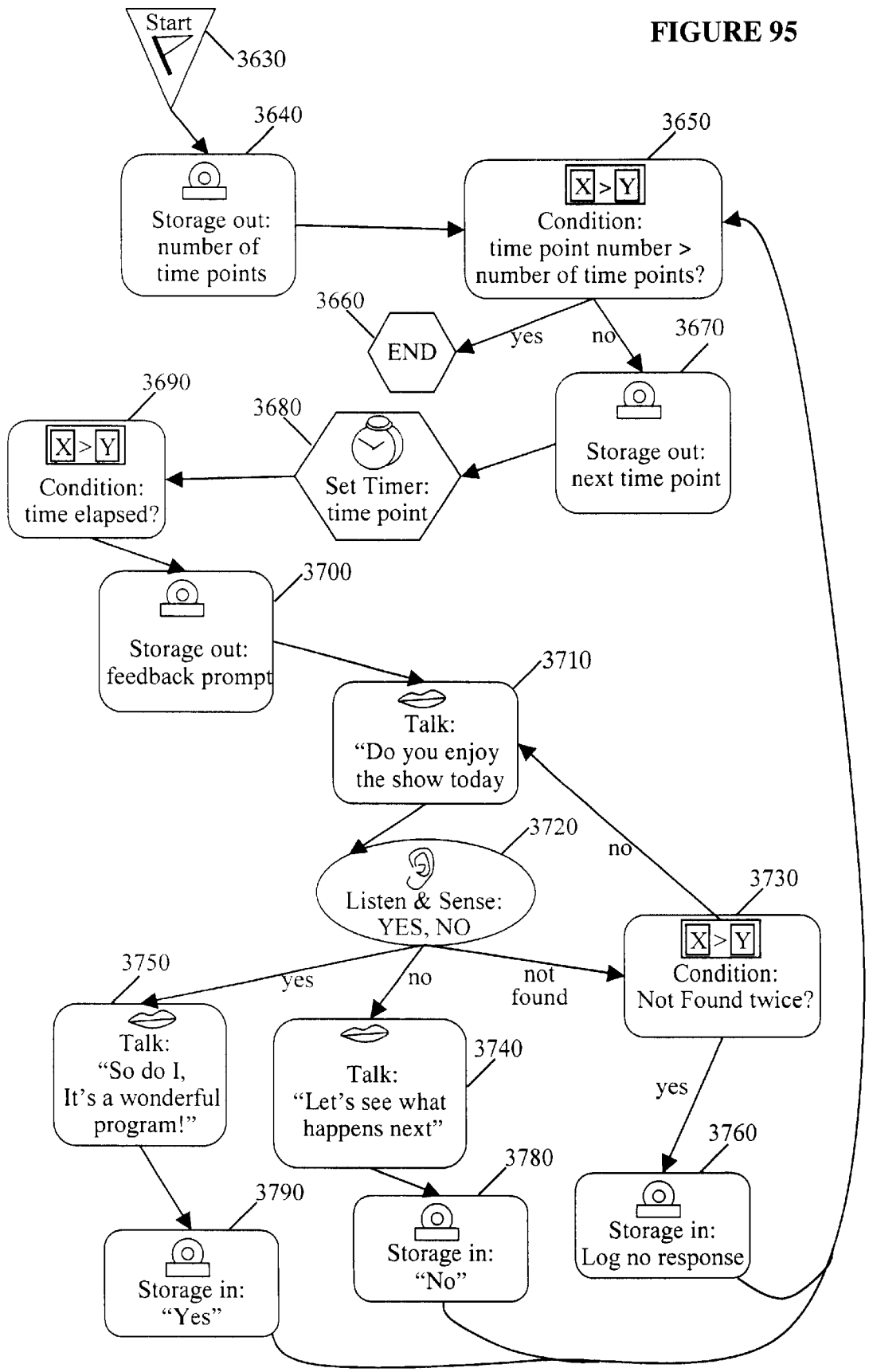
Figure 114:
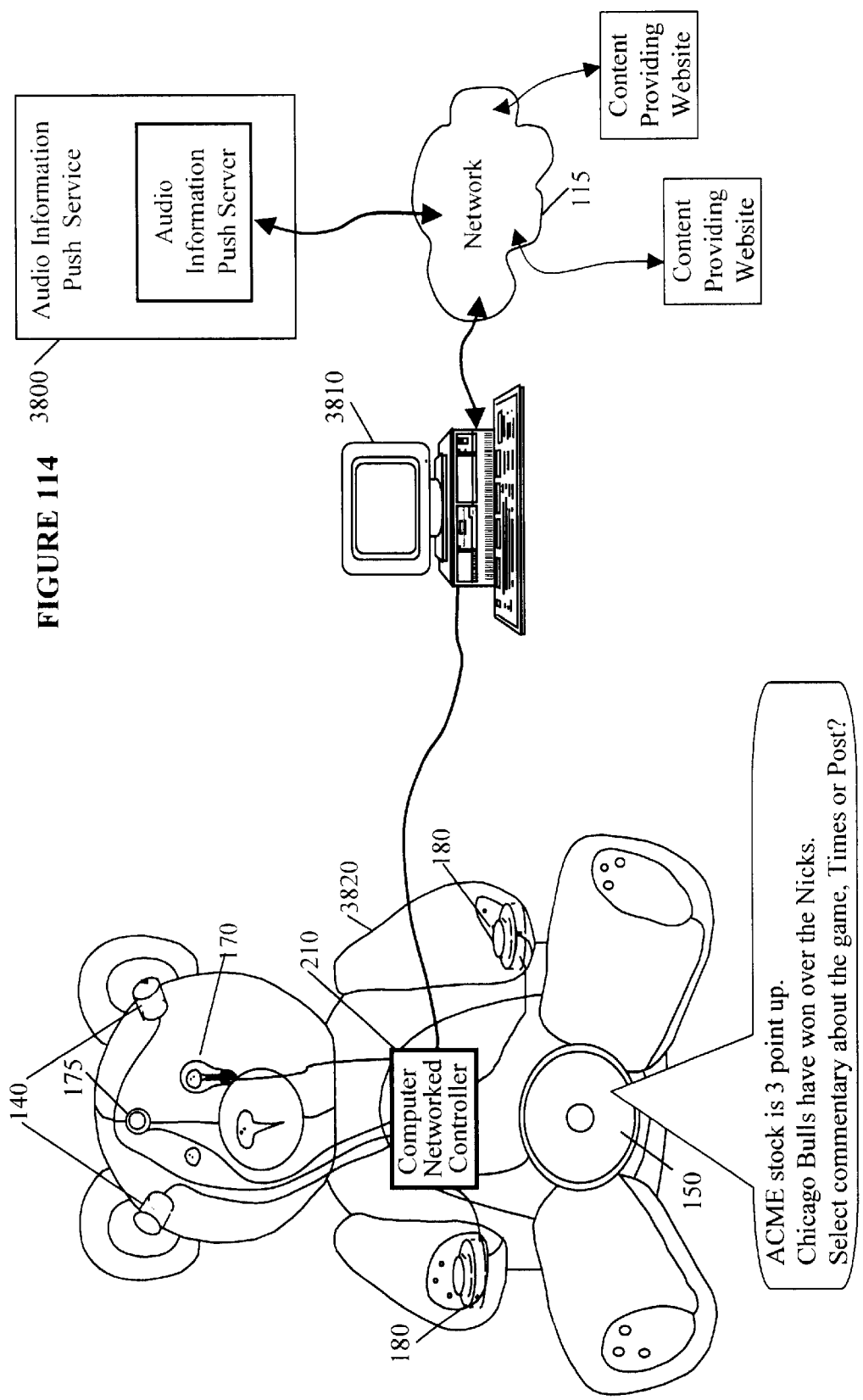
Figure 115:
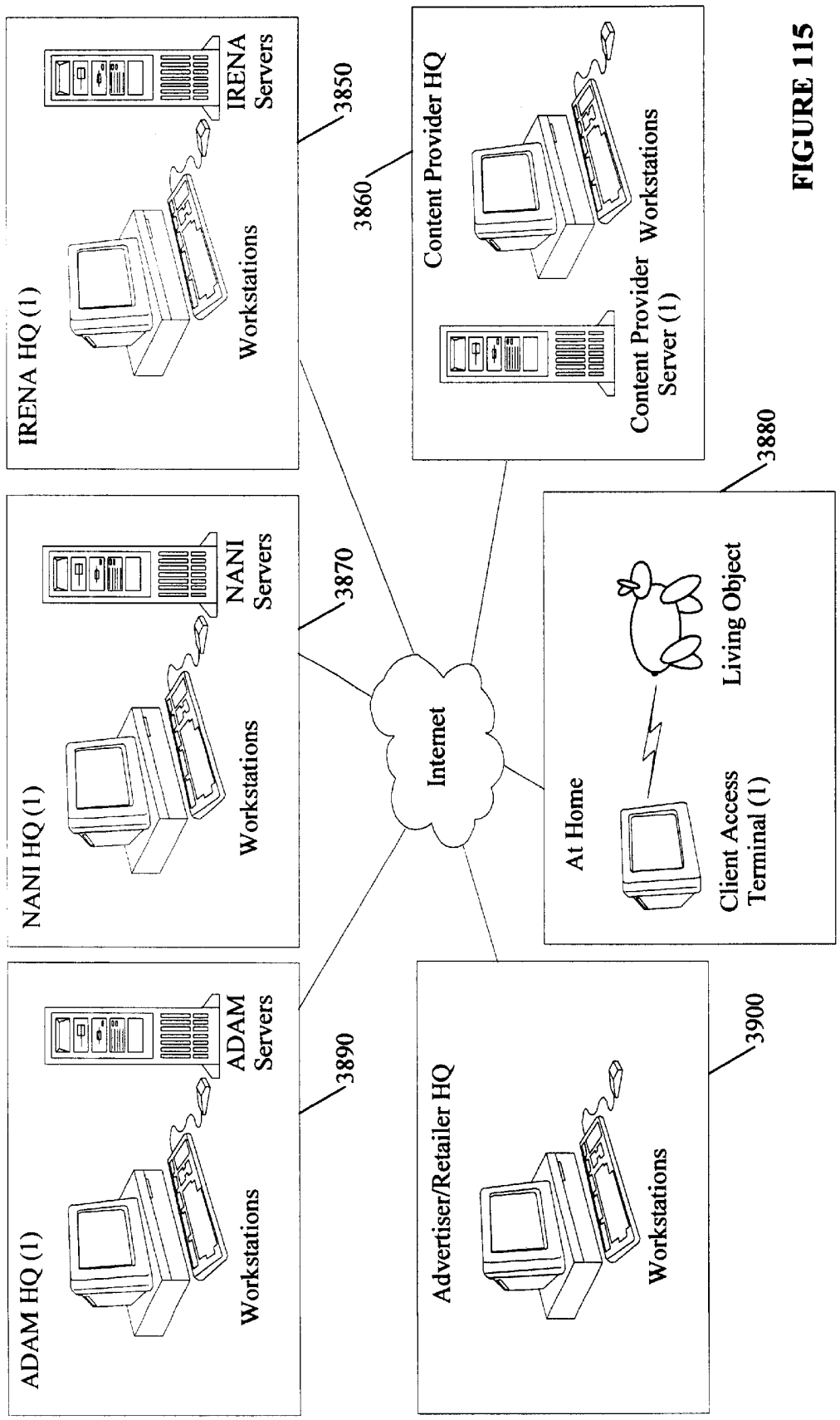
Figure 116:
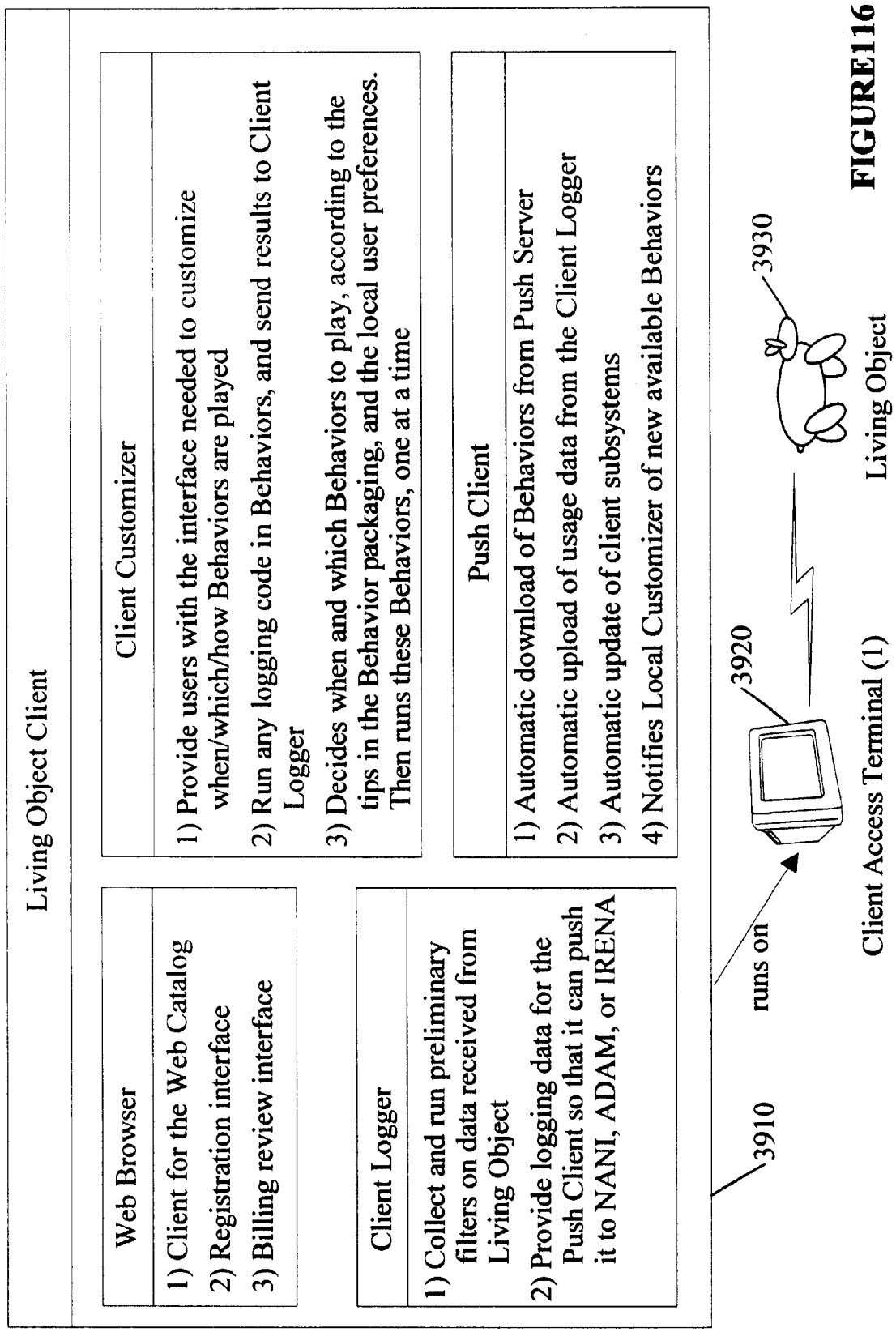
Figure 117:
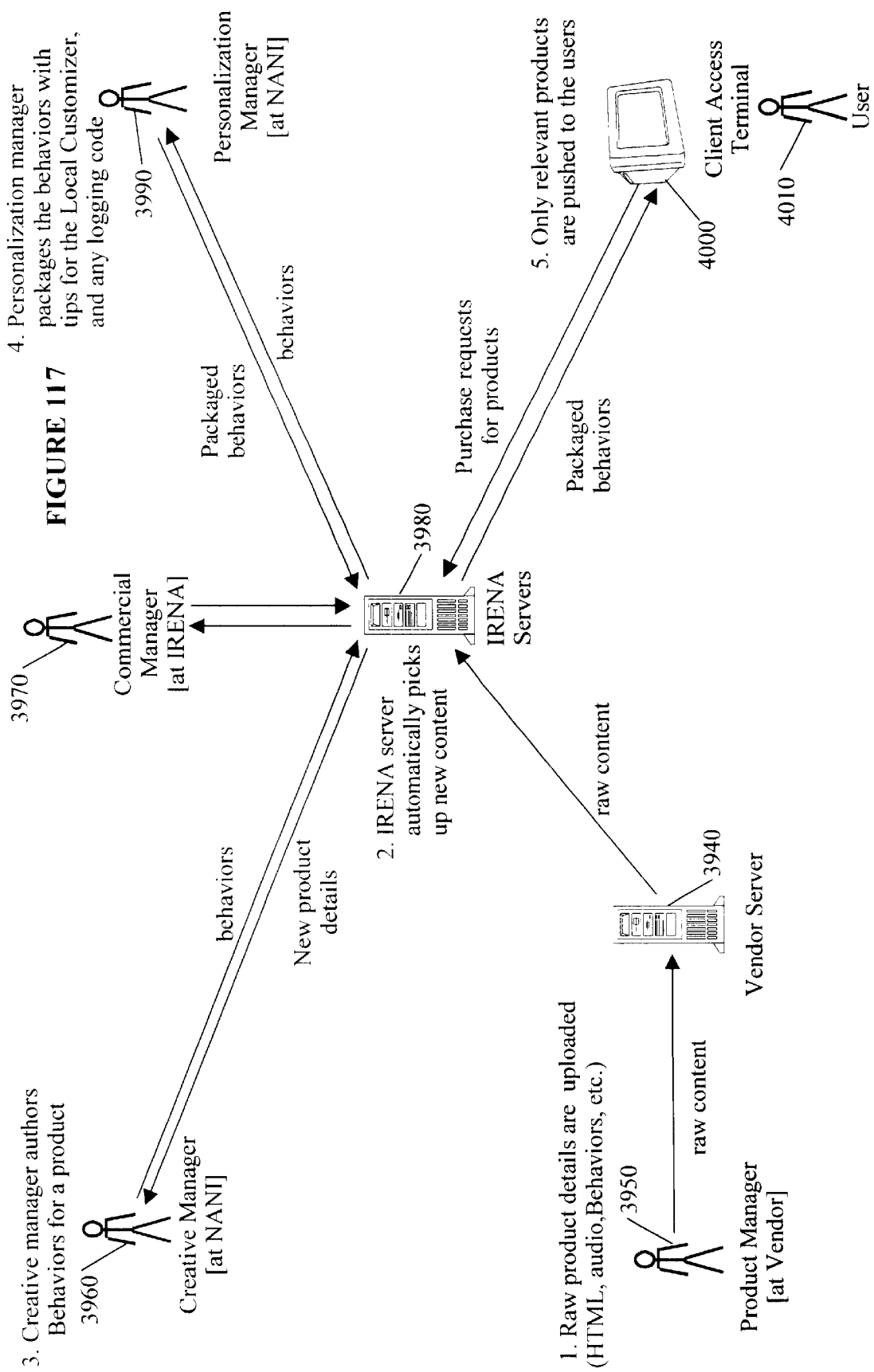
Figure 118:
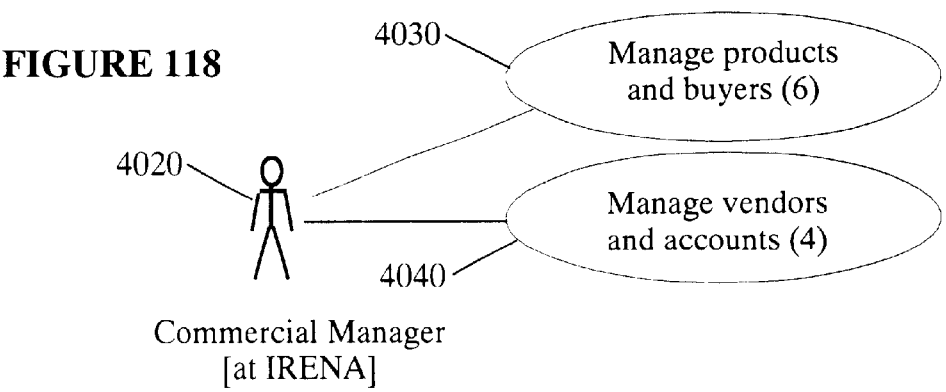
Figure 119:
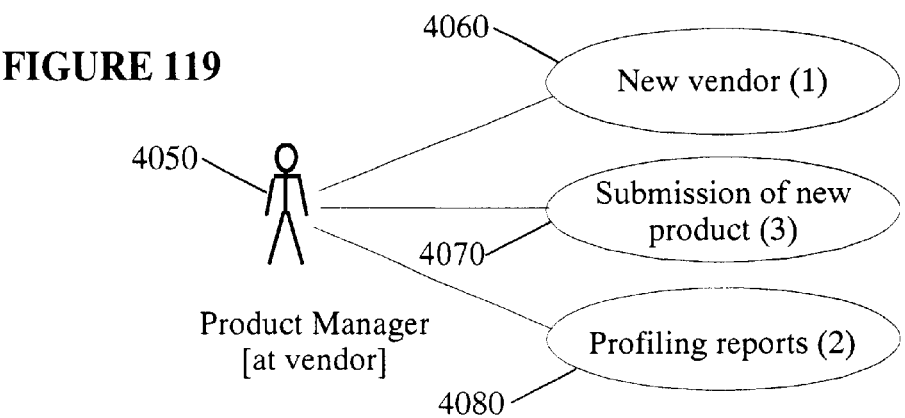
Figure 120:
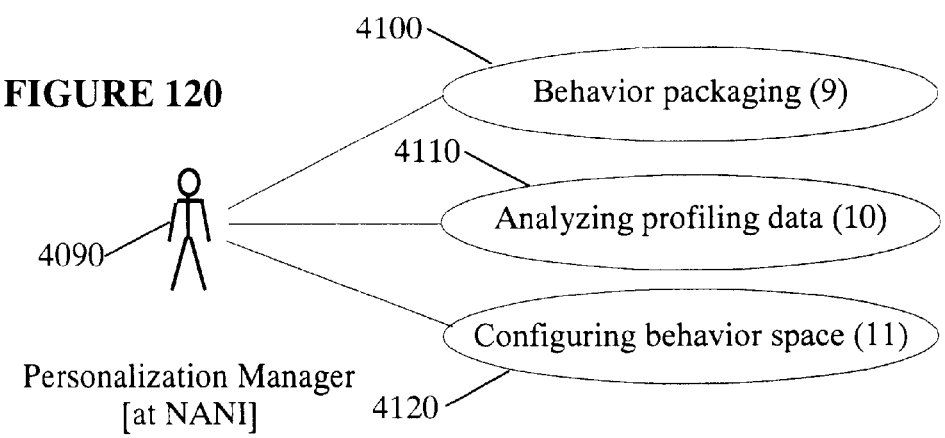
Figure 121:
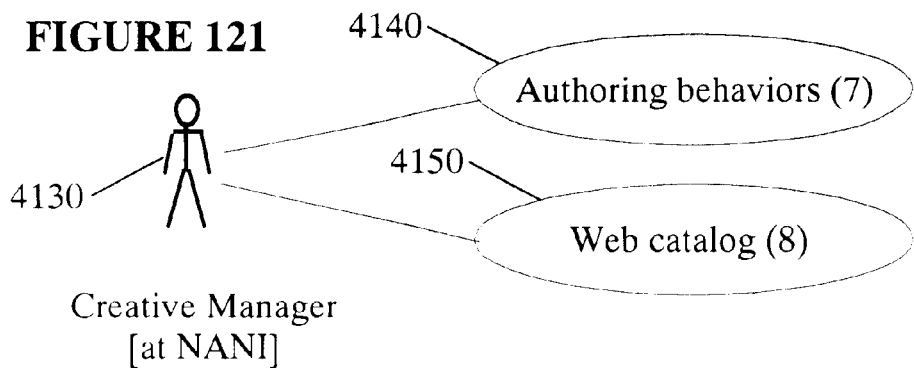
Figure 122:
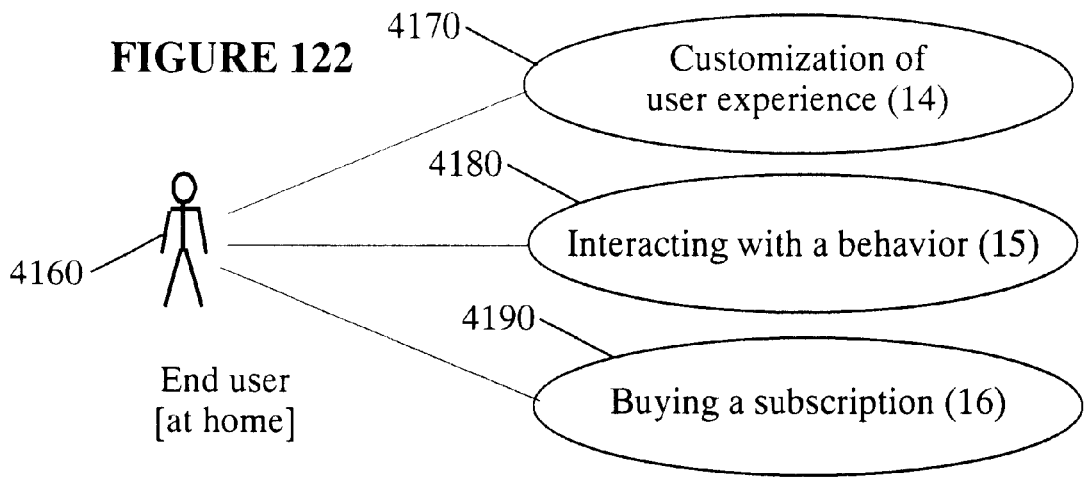

Appendices E–H, taken together, are computer listings from which a first, DLL-compatible, functions library may be constructed;

Appendices I–O, taken together, are computer listings of a second functions library which may be used to generate a variety of games for any of the computer control systems shown and described herein;

FIG. 59 is a simplified semi-pictorial semi-block diagram illustration of a toy/marketing system constructed and operative in accordance with a preferred embodiment of the present invention, the toy communicating directly with the Internet;

FIG. 60 is a simplified block diagram of a preferred implementation of the network controller of FIG. 59;

FIG. 61 is a simplified semi-pictorial semi-block diagram illustration of a toy/marketing system constructed and operative in accordance with a preferred embodiment of the present invention, the toy communicating with the Internet via a household computer connected to the toy by wire;

FIG. 62 is a simplified block diagram of a preferred analog implementation of the computer networked controller of FIG. 61 and its audio communication link to the household computer;

FIG. 63 is a simplified block diagram of a preferred digital implementation of the computer networked controller of FIG. 61 and its audio communication link to the household computer;

FIG. 64 is a variation on the apparatus of FIG. 63 in which the computer networked controller of FIG. 61 is disposed adjacently to the computer rather than being disposed adjacently to the toy;

FIG. 65 is a simplified semi-pictorial semi-block diagram illustration of a toy/marketing system constructed and operative in accordance with a preferred embodiment of the present invention, the toy communicating with the Internet via a household computer connected wirelessly to the toy;

FIG. 66 is a simplified block diagram of a preferred implementation of the wireless controller and of the transceiver, both of FIG. 65, the transceiver being connected to the computer via its MIDI connector and its audio connectors;

FIG. 67 is a simplified block diagram of a preferred implementation of wireless controller and of transceiver, both of FIG. 65, the transceiver being connected to the computer via its serial or parallel ports;

FIG. 68 is a diagram of an example of a collection of script objects organized as a script;

FIG. 69 is a simplified flowchart illustration of a preferred method for processing any one of the "talk"-type script objects of FIG. 68;

FIG. 70 is a simplified flowchart illustration of a preferred method for processing a "listen and sense"-type script object such as the "listen and sense" script object of FIG. 68;

FIG. 71 is a simplified flowchart illustration of a preferred method for processing a "listen and sense"-type script object such as the "listen and sense" script object of FIG. 68;

FIG. 72 is a simplified semi-pictorial semi-block diagram illustration of a toy/marketing system including a plurality of toys associated via a network with a plurality of motivational content providers/servers;

FIG. 73 is a top-level diagram showing major hardware components located at various sites of a toy/marketing system constructed and operative in accordance with a preferred embodiment of the present invention;

FIG. 74 is a top-level dataflow diagram showing dataflow between the various sites of FIG. 73;

FIG. 75 is a diagram describing operation of two actors operating in an "at home" system operation site;

FIG. 76 is a diagram describing operation of two actors operating in an "advertisers headquarters" (also termed herein "motivational content provider") system operation site;

FIG. 77 is a diagram describing operation of four actors operating in an "at toy maker" system operation site;

FIG. 78 is a simplified functional breakdown of a portion of the toy/marketing system which resides at the "at-home" site;

FIG. 79 is a simplified functional breakdown of a portion of the toy/marketing system which resides at a site termed herein "coordinator of motivational content providers" site;

FIG. 80 is a simplified functional breakdown of a portion of the toy/marketing system which resides at the "advertising headquarters" site;

FIG. 81 is a simplified functional breakdown of a portion of the toy/marketing system, including a server, which portion resides at the "toy maker" site;

FIG. 82 is a simplified functional breakdown of a portion of the toy/marketing system which resides at the "toy maker" site and which does not include a server;

FIG. 83 is a dataflow diagram illustrating dataflow relationships between the functional units of the "at home" site;

FIG. 84 is a dataflow diagram illustrating dataflow relationships between the functional units of the "advertising headquarters" site;

FIG. 85 is a dataflow diagram illustrating dataflow relationships between the functional units of the "toy maker" site;

FIG. 86 is a state diagram of the client logger of FIG. 78;

FIG. 87 is a state diagram of the LOCS (living object control software) of FIG. 78;

FIG. 88 is a state diagram of the push client unit of FIG. 78;

FIG. 89 is a dataflow diagram showing dataflow between the "home" site and the "motivational content provider" site, during a home software updating process operative in accordance with a preferred embodiment of the present invention;

FIG. 90 is a simplified flowchart illustration of a preferred implementation of a selling script or selling process for the network controller of FIG. 59 or FIG. 61 at home;

FIG. 91 is a simplified flowchart illustration of a preferred implementation of a selling script or selling process carried out by the motivational content provider server in conjunction with the network controller, both of FIG. 59, at home;

FIG. 92 is a semi-pictorial semi-data flow diagram illustration depicting a preferred method for processing user responses to motivational content, in order to provide the entities generating the motivational content with feedback and/or in order to bill the entities generating the motivational content;

FIG. 93 is a simplified flowchart illustration of a preferred method for generating TV program heralding messages which are a form of motivational prompt;

FIG. 94 is an example of a "script file";

FIG. 95 is an example of a feedback script file which is called by the script file of FIG. 94, and which is operative to prompt a user to provide feedback regarding television shows which s/he has been watching;

FIG. 96 is an example of a screen display which may be generated by the web browser of the living object client of FIG. 78;

FIG. 97 is another example of a screen display which may be generated by the web browser of the living object client of FIG. 78;

FIG. 98 is a table of functions supported by the system which are typically actuated by a child user of the system;

FIG. 99 is a table of installation functions supported by the system which are typically actuated by a parent user of the system who is a parent of the child user of the system;

FIG. 158 is a table of registration functions supported by the system which are typically actuated by the parent user of the system;

FIG. 101 is a table of billing functions supported by the system which are typically actuated by the parent user of the system;

FIG. 102 is a table of purchasing functions supported by the system which are typically actuated by the parent user of the system;

FIG. 103 is a table of registration configuration functions supported by the system which are typically actuated by a corporate user of the system such as a toy manufacturer;

FIG. 104 is a table of user profiling data gathering functions supported by the system which are typically actuated by a corporate user of the system such as a toy manufacturer;

FIG. 105 is a table of living object configuration update functions supported by the system which are typically actuated by a corporate user of the system such as a toy manufacturer;

FIG. 106 is a table of server update functions supported by the system which are typically actuated by a corporate user of the system such as a toy manufacturer;

FIG. 107 is a table of new living object configuration functions supported by the system which are typically actuated by a corporate user of the system such as a toy manufacturer;

FIG. 108 is a table of new living object update adding functions supported by the system which are typically actuated by a corporate user of the system such as a toy manufacturer;

FIG. 109 is a table of new living object update management functions supported by the system which are typically actuated by a corporate user of the system such as a toy manufacturer;

FIG. 110 is a table of webstore layout and styling functions supported by the system which are typically actuated by a corporate user of the system such as a toy manufacturer;

FIG. 111 is a table of server's purchase-related functions supported by the system which are typically actuated by a corporate user of the system such as a toy manufacturer;

FIG. 112 is a table of user management functions supported by the system which are typically actuated by a corporate user of the system such as a toy manufacturer;

FIG. 113 is a table of usage analysis functions supported by the system which are typically actuated by a corporate user of the system such as a toy manufacturer;

FIG. 114 is a simplified semi-pictorial semi-block diagram of an audible-information-providing system constructed and operative in accordance with a preferred embodiment of the present invention;

FIG. 115 is a simplified block diagram of sites and computing devices of a motivational information providing system constructed and operative in accordance with a preferred embodiment of the present invention;

FIG. 116 is a diagram of functions preferably performed at the at-home site of FIG. 115;

FIG. 117 is a preferred data flow diagram for the system of FIG. 115;

FIG. 118 is a diagram of preferred use cases for the commercial manager of FIG. 117;

FIG. 119 is a diagram of preferred use cases for the content provider/content manager of FIG. 117;

FIG. 120 is a diagram of preferred use cases for the NANI personalization manager of FIG. 117;

FIG. 121 is a diagram of preferred use cases for the NANI creative manager of FIG. 117;

FIG. 122 is a diagram of preferred use cases for the commercial manager of FIG. 117;

FIG. 123 is a table of use cases of a motivational message providing system or service constructed and operative in accordance with a preferred embodiment of the present invention;

FIG. 124 is a table of possible implementations of the use cases of FIG. 123;

FIGS. 125 and 126 are tables of additional use cases of a motivational message providing system or service constructed and operative in accordance with a preferred embodiment of the present invention;

FIG. 127 is a table of possible implementations of the use cases of FIG. 126;

FIG. 128 is a table of additional use cases of a motivational message providing system or service constructed and operative in accordance with a preferred embodiment of the present invention;

FIG. 129 is a table of possible implementations of the use cases of FIG. 128;

FIG. 130 is a table of additional use cases of a motivational message providing system or service constructed and operative in accordance with a preferred embodiment of the present invention;

FIG. 131 is a table of possible implementations of the use cases of FIG. 130;

FIG. 132 is a table of additional use cases of a motivational message providing system or service constructed and operative in accordance with a preferred embodiment of the present invention;

FIG. 133 is a table of possible implementations of the use cases of FIG. 132;

FIGS. 134 and 135 are tables of additional use cases of a motivational message providing system or service constructed and operative in accordance with a preferred embodiment of the present invention;

FIG. 136 is a table of possible implementations of the use cases of FIG. 135;

FIG. 137 is a table of additional use cases of a motivational message providing system or service constructed and operative in accordance with a preferred embodiment of the present invention;

FIG. 138 is a table of possible implementations of the use cases of FIG. 79;

FIG. 139 is a table of additional use cases of a motivational message providing system or service constructed and operative in accordance with a preferred embodiment of the present invention;

FIG. 140 is a table of possible implementations of the use cases of FIG. 139;

FIG. 141 is a table of additional use cases of a motivational message providing system or service constructed and operative in accordance with a preferred embodiment of the present invention;

FIG. 142 is a table of possible implementations of the use cases of FIG. 141;

FIG. 143 is a table of additional use cases of a motivational message providing system or service constructed and operative in accordance with a preferred embodiment of the present invention;

FIG. 144 is a table of possible implementations of the use cases of FIG. 143;

FIG. 145 is a table of additional use cases of a motivational message providing system or service constructed and operative in accordance with a preferred embodiment of the present invention;

FIG. 146 is a table of possible implementations of the use cases of FIG. 145;

FIGS. 147 and 148 are tables of additional use cases of a motivational message providing system or service constructed and operative in accordance with a preferred embodiment of the present invention;

FIG. 149 is a table of possible implementations of the use cases of FIG. 148;

FIG. 150 is a table of additional use cases of a motivational message providing system or service constructed and operative in accordance with a preferred embodiment of the present invention;

FIG. 151 is a table of possible implementations of the use cases of FIG. 150;

FIG. 152 is a simplified illustration of a screen display of the computer of FIG. 114 which enables a user to register to the audible-push service and to provide the service with his/her personal selection of information that he or she would like to receive from the service.

Figure 154:
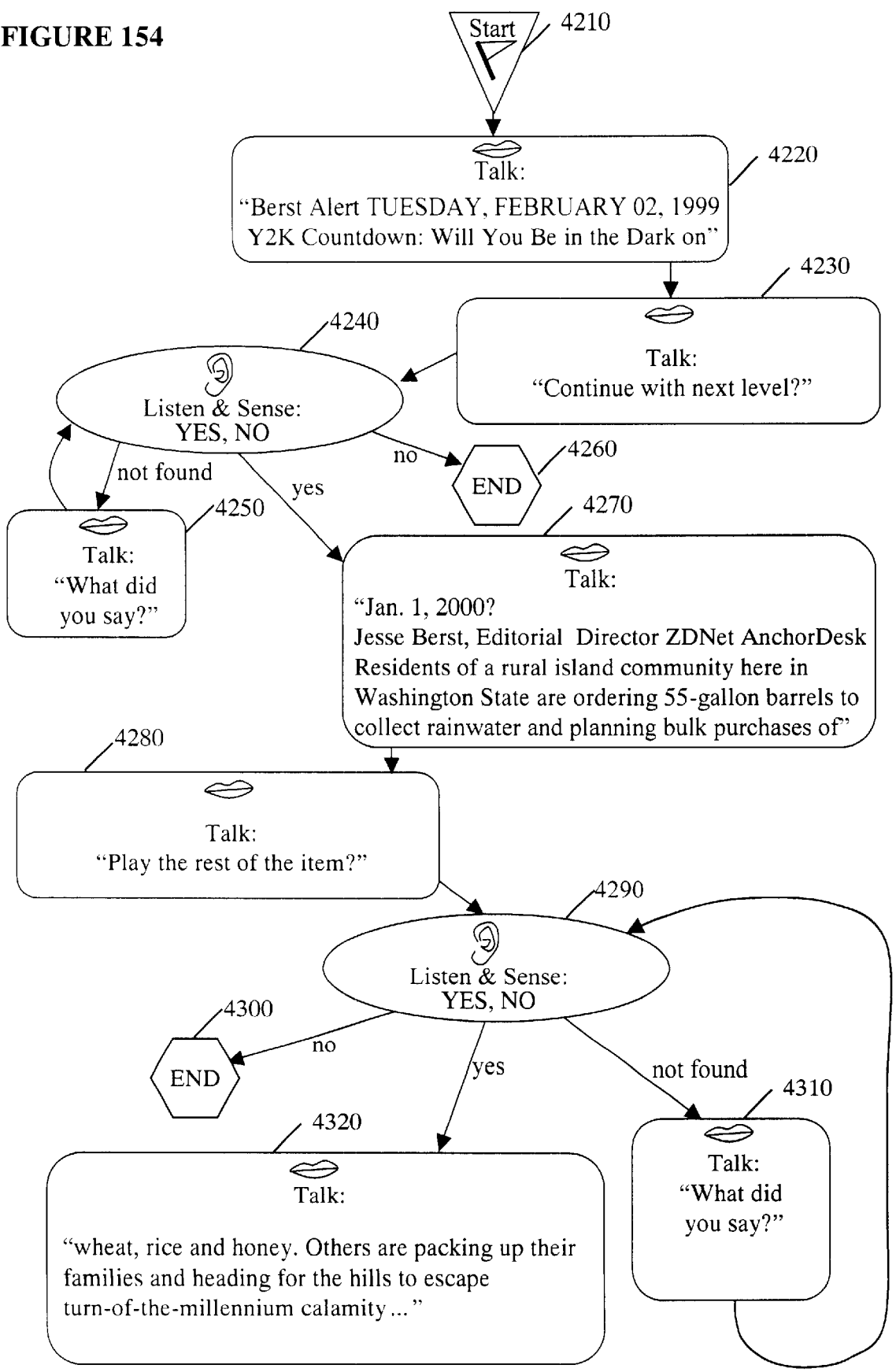
Figure 155:
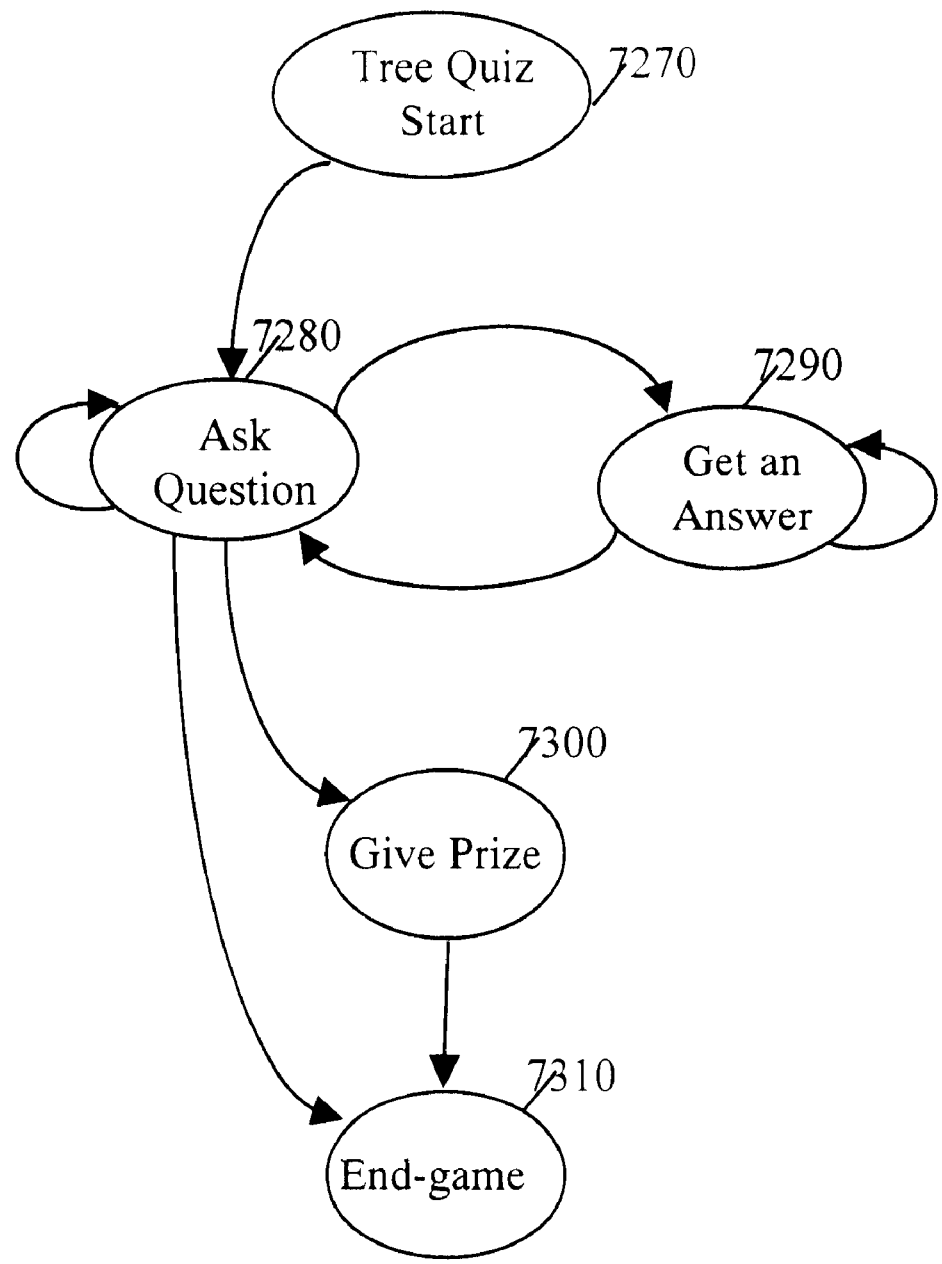

FIG. 153 is a simplified illustration of the typical textual content of a web-page;

FIG. 154 is a script illustrating a possible manner of distribution of the web-page of FIG. 153;

FIG. 155 is a bubble diagram of a game for an individual, "tree-quiz", in which a prize or other token is dispensed to the individual player by one of the nodes in the amusement park;

FIGS. 156A–B, taken together, form a diagram of one alternative "Game State Record" data structure of FIGS. 43A–43C of copending U.S. patent application Ser. No. 09/062,500, storing information regarding one of the game states, "ask question", within the individual game of FIG. 155;

FIGS. 156A and 56C, taken together, form a diagram of another alternative "Game State Record" data structure of FIGS. 143A–143C of copending U.S. patent application Ser. No. 09/062,500, storing information regarding one of the game states, "ask question", within the individual game of FIG. 155;

FIG. 157 is a diagram of two "Game State Record", data structures of FIGS. 43A–43C of copending U.S. patent application Ser. No. 09/062,500 storing information regarding two additional game states, "record answer" and "give present", within the individual game of FIG. 155;

FIG. 158 is a diagram of a "Visitor Record" data structure of FIGS. 43A–43C of copending U.S. patent application Ser. No. 09/062,500 storing information regarding an individual visitor playing the individual game of FIGS. 155–157;

FIG. 159 is a diagram of a "Node Record" data structure of FIGS. 43A–43C of copending U.S. patent application Ser. No. 09/062,500 storing information regarding two nodes, "tree" and "clown", which are operating within the individual game of FIGS. 155–158; and FIGS. 160A–160B, taken together, form a simplified flowchart illustration of a preferred chain of events including the events which typically occur in playing the "tree-quiz" game of FIGS. 155–159.

DETAILED DESCRIPTION OF PREFERRED EMBODIMENTS

Reference is now made to FIG. 1A which is a partly pictorial, partly block diagram illustration of a computer control system including a toy, constructed and operative in accordance with a preferred embodiment of the present invention. The system of FIG. 1A comprises a computer 100, which may be any suitable computer such as, for example, an IBM-compatible personal computer. The computer 100 is equipped with a screen 105. The computer 100 is preferably equipped with a sound card such as, for example, a Sound Blaster Pro card commercially available from Creative Labs, Inc., 1901 McCarthy Boulevard, Milpitas Calif. 95035 or from Creative Technology Ltd., 67 Ayer Rajah Crescent #03-18, Singapore, 0513; a hard disk; and, optionally, a CD-ROM drive.

The computer 100 is equipped with a computer radio interface 110 operative to transmit signals via wireless transmission based on commands received from the computer 100 and, in a preferred embodiment of the present invention, also to receive signals transmitted elsewhere via wireless transmission and to deliver the signals to the computer 100. Typically, commands transmitted from the computer 100 to the computer radio interface 110 are transmitted via both analog signals and digital signals, with the digital signals typically being transmitted by way of a MIDI port. Transmission of the analog and digital signals is described below with reference to FIG. 3.

The transmitted signal may be an analog signal or a digital signal. The received signal may also be an analog signal or a digital signal. Each signal typically comprises a message. A preferred implementation of the computer radio interface 110 is described below with reference to FIG. 3.

The system of FIG. 1A also comprises one or more toys 120. The system of FIG. 1A comprises a plurality of toys, namely three toys 122, 124, and 126 but it is appreciated that, alternatively, either one toy only or a large plurality of toys may be used.

Figure 1B:
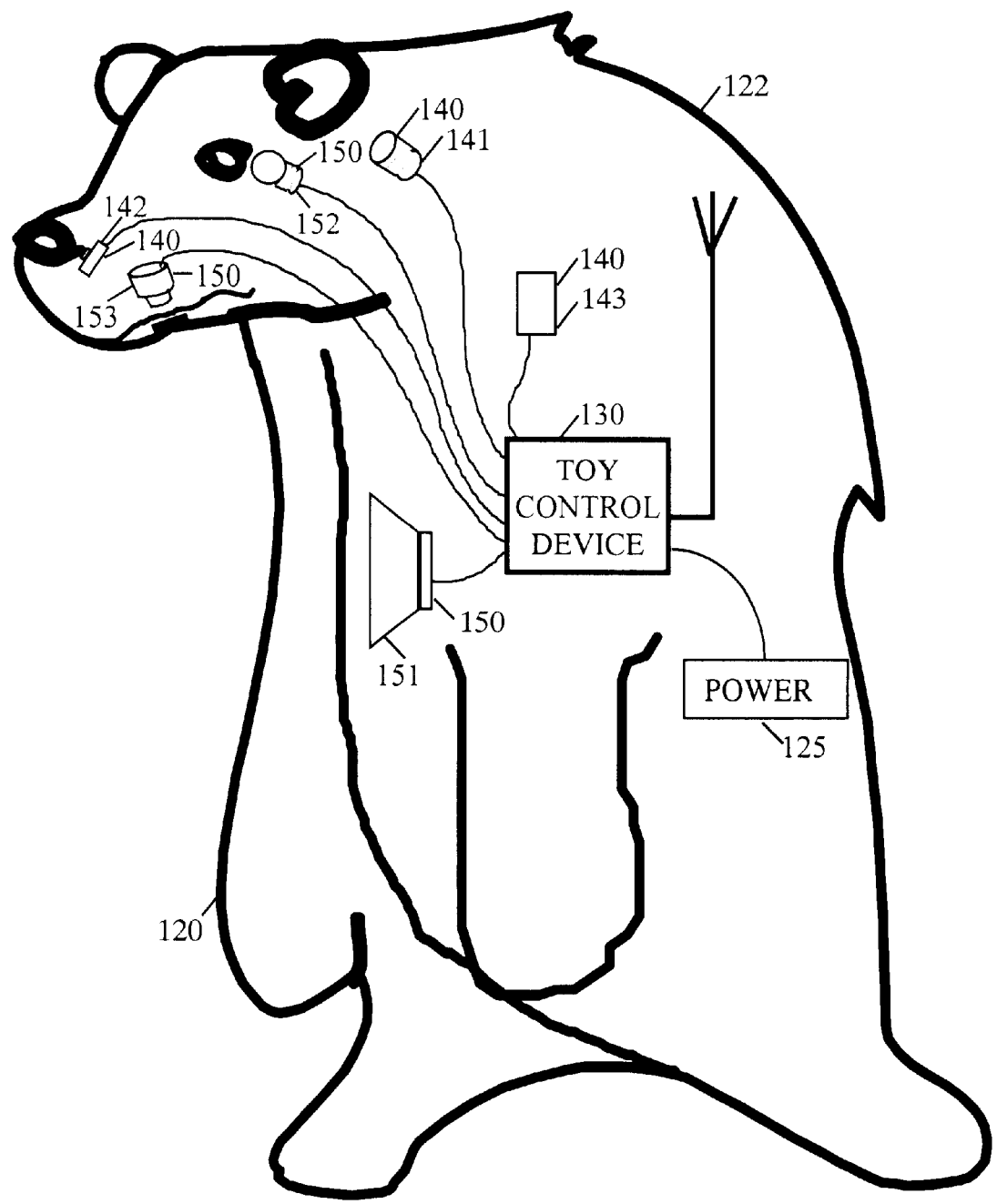
FIG. 1B is a partly pictorial, partly block diagram illustration a preferred implementation of the toy 122 of FIG. 1A.

Reference is now additionally made to FIG. 1B, which is a partly pictorial, partly block diagram illustration of the toy 122 of FIG. 1A.

Each toy 120 comprises a power source 125, such as a battery or a connection to line power. Each toy 120 also comprises a toy control device 130, operative to receive a wireless signal transmitted by the computer 100 and to cause each toy 120 to perform an action based on the received signal. The received signal may be, as explained above, an analog signal or a digital signal. A preferred implementation of the toy control device 130 is described below with reference to FIG. 6.

Each toy 120 preferably comprises a plurality of input devices 140 and output devices 150, as seen in FIG. 1B. The input devices 140 may comprise, for example on or more of the following: a microphone 141; a microswitch sensor 142; a touch sensor (not shown in FIG. 1B); a light sensor (not shown in FIG. 1B); a movement sensor 143, which may be, for example, a tilt sensor or an acceleration sensor. Appropriate commercially available input devices include the following: position sensors available from Hamlin Inc., 612 East Lake Street, Lake Mills, Wis. 53551, USA; motion and vibration sensors available from Comus International, 263 Hillside Avenue, Nutley, N.J. 07110, USA; temperature, shock, and magnetic sensors available from Murata Electronics Ltd., Hampshire, England; and switches available from C & K Components Inc., 15 Riverdale Avenue, Newton, Mass. 02058–1082, USA or from Micro Switch Inc., a division of Honeywell, USA The output devices 150 may comprise, for example, one or more of the following: a speaker 151; a light 152; a solenoid 153 which may be operative to move a portion of the toy; a motor, such as a stepping motor, operative to move a portion of the toy or all of the toy (not shown in FIG. 1B). Appropriate commercially available output devices include the following: DC motors available from Alkatel (dunkermotoren), Postfach 1240, D-7823, Bonndorf/Schwarzald, Germany; stepping motors and miniature motors available from Haydon Switch and Instruments, Inc. (HSI), 1500 Meriden Road, Waterbury, Conn., USA; and DC solenoids available from Communications Instruments, Inc., P.O. Box 520, Fairview, N.C. 28730, USA Examples of actions which the toy may perform include the following: move a portion of the toy; move the entire toy; or produce a sound, which may comprise one or more of the following: a recorded sound, a synthesized sound, music including recorded music or synthesized music, speech including recorded speech or synthesized speech.

The received signal may comprise a condition governing the action as, for example, the duration of the action, or the number of repetitions of the action.

Typically, the portion of the received signal comprising a message comprising a command to perform a specific action as, for example, to produce a sound with a given duration, comprises a digital signal. The portion of the received signal comprising a sound, for example, typically comprises an analog signal. Alternatively, in a preferred embodiment of the present invention, the portion of the received signal comprising a sound, including music, may comprise a digital signal, typically a signal comprising MIDI data.

The action the toy may perform also includes reacting to signals transmitted by another toy, such as, for example, playing sound that the other toy is monitoring and transmitting.

In a preferred embodiment of the present invention, the toy control device 130 is also operative to transmit a signal intended for the computer 100, to be received by the computer radio interface 110. In this embodiment, the computer radio interface 110 is preferably also operative to poll the toy control device 130, that is, transmit a signal comprising a request that the toy control device 130 transmit a signal to the computer radio interface 110. It is appreciated that polling is particularly preferred in the case where there are a plurality of toys having a plurality of toy control devices 130.

The signal transmitted by the toy control device 130 may comprise one or more of the following: sound, typically sound captured by a microphone input device 141; status of sensor input devices 140 as, for example, light sensors or micro switch; an indication of low power in the power source 125; or information identifying the toy.

It is appreciated that a sound signal transmitted by the device 130 may also include speech. The computer system is operative to perform a speech recognition operation on the speech signals. Appropriate commercially available software for speech recognition is available from companies such as: Stylus Innovation Inc., One Kendall Square, Building 300, Cambridge, Mass. 02139, USA; A&G Graphics Interface, USA, Telephone No. (617)492-0120, Telefax No. (617)427-3625; "Dragon Dictate For Windows", available from Dragon Systems Inc., 320 Nevada Street, Mass. 02160, USA, and "SDK" available from Lernout & Hausple Speech Products, Sint-Krispijnstraat 7, 8900 Leper, Belgium.

The signal from the radio control interface 110 may also comprise, for example, one or more of the following: a request to ignore input from one or more input devices 140; a request to activate one or more input devices 140 or to stop ignoring input from one or more input devices 140; a request to report the status of one or more input devices 140; a request to store data received from one or more input devices 140, typically by latching a transition in the state of one or more input devices 140, until a future time when another signal from the radio control interface 110 requests the toy control device 130 to transmit a signal comprising the stored data received from the one or more input devices 140; or a request to transmit analog data, typically comprising sound, typically for a specified period of time.

Typically, all signals transmitted in both directions between the computer radio interface 110 and the toy control device 130 include information identifying the toy.

Figure 1C:
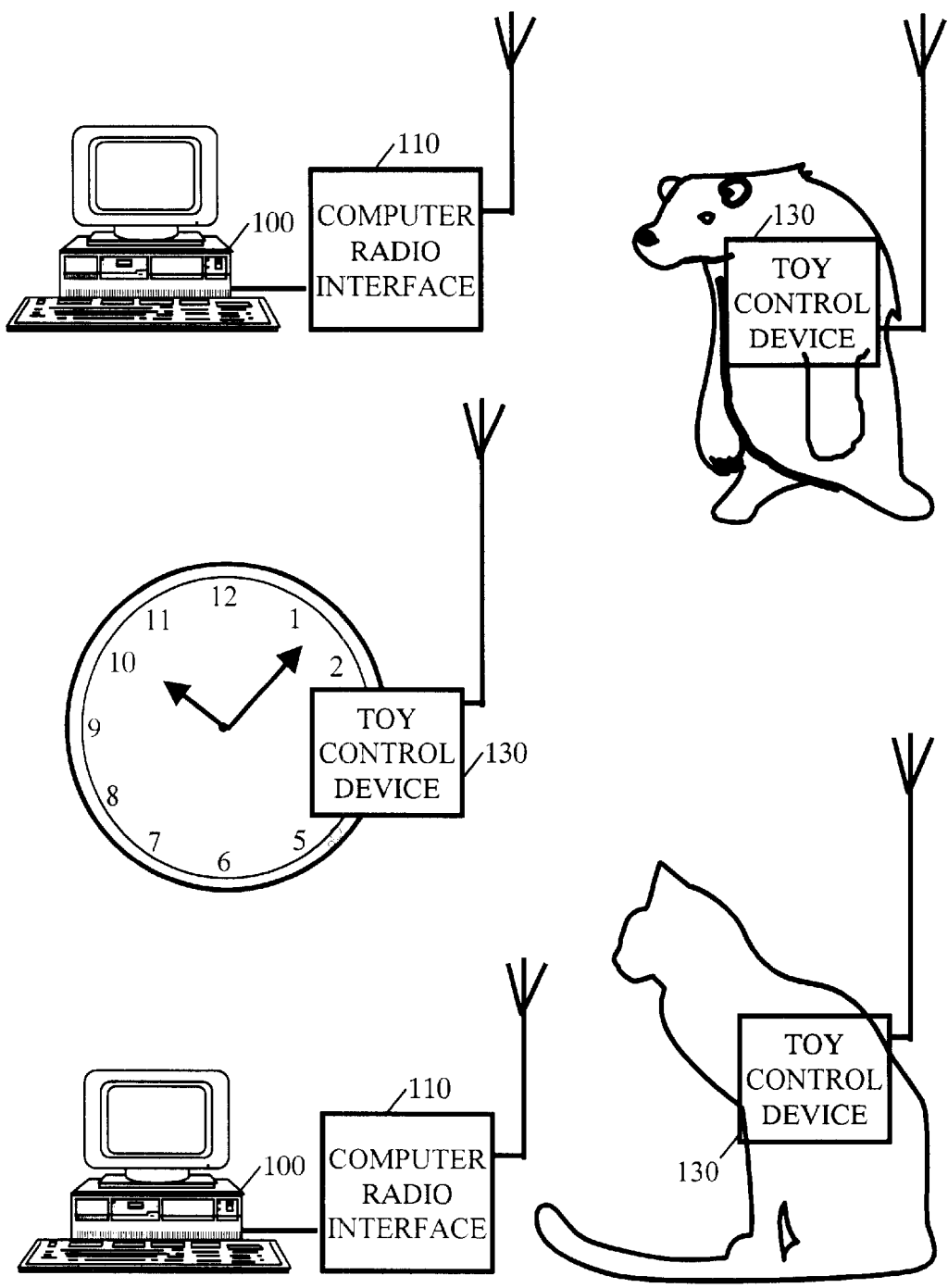
FIG. 1C is a partly pictorial, partly block diagram illustration of a computer control system including a toy, constructed and operative in accordance with an alternative preferred embodiment of the present invention.

Reference is now made to FIG. 1C, which is a partly pictorial, partly block diagram illustration of a computer control system including a toy, constructed and operative in accordance with an alternative preferred embodiment of the present invention. The system of FIG. 1C comprises two computers 100. It is appreciated that, in general, a plurality of computers 100 may be used. In the implementation of FIG. 1C, all signals transmitted in both directions between the computer radio interface 110 and the toy control device 130 typically include information identifying the computer.

The operation of the system of FIG. 1A is now briefly described. Typically, the computer 100 runs software comprising a computer game, typically a game including at least one animated character. Alternatively, the software may comprise educational software or any other interactive software including at least one animated object. As used herein, the term "animated object" includes any object which may be depicted on the computer screen 105 and which interacts with the user of the computer via input to and output from the computer. An animated object may be any object depicted on the screen such as, for example: a doll; an action figure; a toy, such as, for example, an activity toy, a vehicle, or a ride-on vehicle; a drawing board or sketch board; or a household object such as, for example, a clock, a lamp, a chamber pot, or an item of furniture.

Figure 2A:
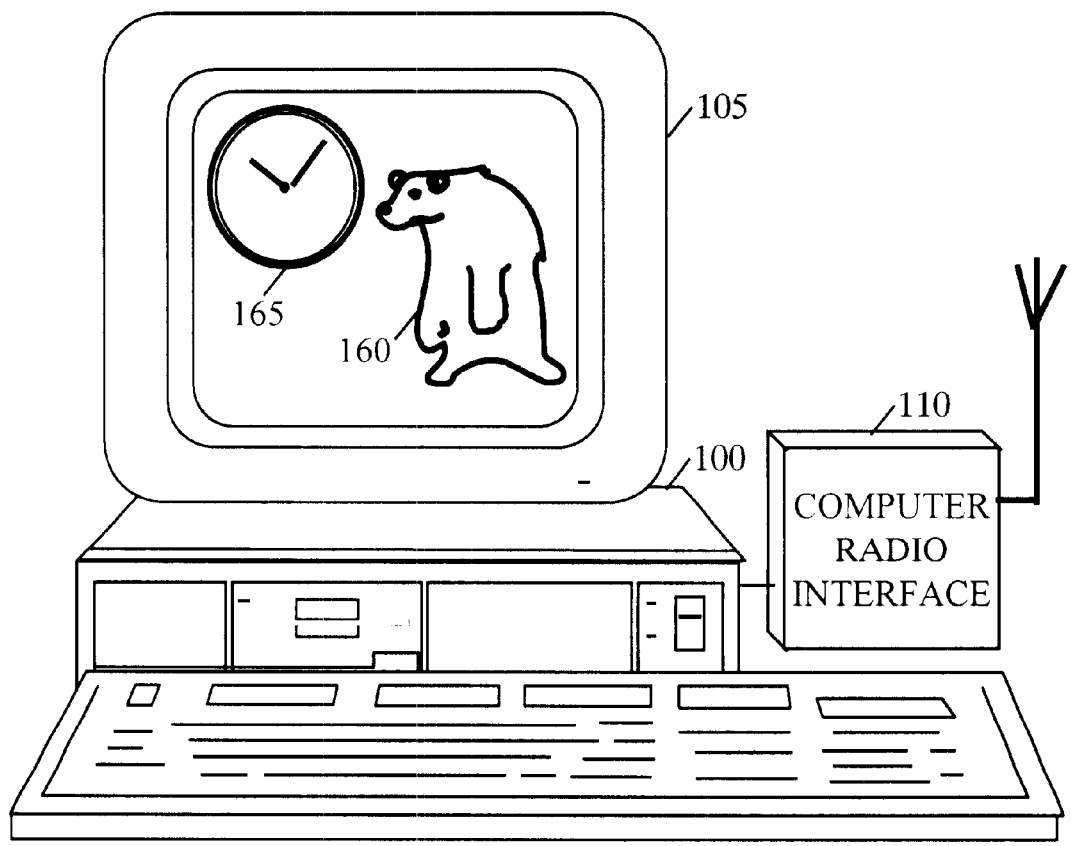

Reference is now additionally made to FIGS. 2A–2C, which depict a portion of the system of FIG. 1A in use. The apparatus of FIG. 2A comprises the computer screen 105 of FIG. 1A. On the computer screen are depicted animated objects 160 and 165.

FIG. 2B depicts the situation after the toy 122 has been brought into range of the computer radio interface 10 of FIG. 1A, typically into the same room therewith. Preferably, the toy 122 corresponds to the animated object 160. For example, in FIG. 2B the toy 122 and the animated object 160, shown in FIG. 2A, are both a teddy bear. The apparatus of FIG. 2B comprises the computer screen 105, on which is depicted the animated object 165. The apparatus of FIG. 2B also comprises the toy 122. The computer 100, having received a message via the computer radio interface 110, from the toy 122, no longer displays the animated object 160 corresponding to the toy 122. The functions of the animated object 160 are now performed through the toy 122, under control of the computer 100 through the computer radio interface 10 and the toy control device 130.

FIG. 2C depicts the situation after the toy 126 has also been brought into range of the computer radio interface 110 of FIG. 1A, typically into the same room therewith. Preferably, the toy 126 corresponds to the animated object 165. For example, in FIG. 2C the toy 126 and the animated object 165, shown in FIGS. 2A and 2B, are both a clock. The apparatus of FIG. 2C comprises the computer screen 105, on which no animated objects are depicted.

The apparatus of FIG. 2C also comprises the toy 126. The computer 100, having received a message via the computer radio interface 110 from the toy 126, no longer displays the animated object 165 corresponding to the toy 126. The functions of the animated object 165 are now performed through the toy 126, under control of the computer 100 through the computer radio interface 110 and the toy control device 130.

In FIG. 2A, the user interacts with the animated objects 160 and 165 on the computer screen, typically using conventional methods. In FIG. 2B the user also interacts with the toy 122, and in FIG. 2C typically with the toys 122 and 126, instead of interacting with the animated objects 160 and 165 respectively. It is appreciated that the user may interact with the toys 122 and 126 by moving the toys or parts of the toys; by speaking to the toys; by responding to movement of the toys which movement occurs in response to a signal received from the computer 100; by responding to a sound produced by the toys, which sound is produced in response to a signal received from the computer 100 and which may comprise music, speech, or another sound; or otherwise.

Reference is now made to FIG. 3 which is a simplified block diagram of a preferred embodiment of the computer radio interface 110 of FIG. 1A. The apparatus of FIG. 3 comprises the computer radio interface 110. The apparatus of FIG. 3 also comprises a sound card 190, as described above with reference to FIG. 1A. In FIG. 3, the connections between the computer radio interface 110 and the sound card 190 are shown.

The computer radio interface 110 comprises a DC unit 200 which is fed with power through a MIDI interface 210 from a sound card MIDI interface 194, and the following interfaces: a MIDI interface 210 which connects to the sound card MIDI interface 194; an audio interface 220 which connects to an audio interface 192 of the sound card 190; and a secondary audio interface 230 which preferably connects to a stereo sound system for producing high quality sound under control of software running on the computer 100 (not shown).

The apparatus of FIG. 3 also comprises an antenna 240, which is operative to send and receive signals between the computer radio interface 110 and one or more toy control devices 130.

FIG. 4 is a more detailed block diagram of the computer radio interface 110 of FIG. 3. The apparatus of FIG. 4 comprises the DC unit 200, the MIDI interface 210, the audio interface 220, and the secondary audio interface 230. The apparatus of FIG. 4 also comprises a multiplexer 240, a micro controller 250, a radio transceiver 260, a connection unit 270 connecting the radio transceiver 260 to the micro controller 250, and a comparator 280.

Reference is now made to FIGS. 5A–5D, which taken together comprise a schematic diagram of the apparatus of FIG. 4.

The following is a preferred parts list for the apparatus of FIGS. 5A–5C:

| | | |
|---|---|---|
| 1. K1 | | Relay Dept, Idec, 1213 Elco Drive, Sunnyvale, Calif. 94089-2211, USA. |
| 2. U1 | | 8751 microcontroller, Intel Corporation, San Tomas 4, 2700 Sun Tomas Expressway, 2nd Floor, Santa Clara 95051, CA USA. |
| 3. U2 | | CXO-12 MHZ (crystal oscillator), Raltron, 2315 N.W. 107th Avenue, Miami, FL 33172, USA. |

-continued

| | |
|---|---|
| 4. U4 | MC33174, Motorola, Phoenix, AZ USA., Tel. No. (602)897-5056. |
| 5. Diodes | 1N914, Motorola, Phoenix, AZ, USA. Tel. No. (602)897-5056. |
| 6. Transistors | 2N2222 and MPSA14, Motorola, Phoenix, AZ, USA. Tel. No. (602)897-5056. |

The following is a preferred parts list for the apparatus of FIG. 5D:

| | |
|---|---|
| 1. U1 | SILRAX-418-A UHF radio telemetry receive module, Ginsburg Electronic GmbH, Am Moosfeld 85, D-81829, Munchen, Germany. |

Alternatively, U1 of FIG. 5D may be replaced by:

| | |
|---|---|
| U1 | 433.92 MHz Receive Module Part No. 0927, available from CEL SALES LTD., Cel House, Unit 2, Block 6, Shenstone Trading Estate Bromsgrove, Halesowen, West Midlands B36 3XB, UK. |
| 2. U2 | TXM-418-A low power UHF radio telemetry transmit module, Ginsburg Electronic GmbH, Am Moosfeld 85, D-81829, Munchen, Germany. |

Alternatively, U2 of FIG. 5D may be replaced by:

| | |
|---|---|
| U2 | 433.92 SIL FM Transmitter Module Part No, 5229, available from CEL SALES LTD., Cel House, Unit 2, Block 6, Shenstone Trading Estate Bromsgrove, Halesowen, West Midlands B36 3XB, UK. |

Reference is now additionally made to FIG. 5E, which is a schematic diagram of an alternative implementation of the apparatus of FIG. 5D. The following is a preferred parts list for the apparatus of FIG. 5E:

| | |
|---|---|
| 1. U1 | BIM-418-F low power UHF data transceiver module, Ginsburg Electronic GmbH, Am Moosfeld 85, D-81829, Munchen, Germany. |
| Alternate 1. U1 | S20043 spread spectrum full duplex transceiver, AMI Semiconductors-American Microsystems, Inc., Idaho, USA. |
| Alternate 1. U1 | SDT-300 synthesized transceiver, Circuit Design, Inc., Japan. |

Alternatively, U1 may be replaced by:

| | |
|---|---|
| U1 | RY3GB021 RF 900 Mhz units, available from SHARP ELECTRONIC COMPONENTS GROUP, 5700 Northwest, Pacific Rim Boulevard #20, Camas, Washington, USA. |

-continued

| | |
|---|---|
| U1 | RY3GB100 RF Units For DECT, available from SHARP ELECTRONIC COMPONENTS GROUP, 5700 Northwest, Pacific Rim Boulevard #20, Camas, Washington, USA. |

In the parts list for FIG. 5E, one of item 1 or either of the alternate items 1 may be used for U1.

It is appreciated that the appropriate changes will have to be made to all the circuit boards for alternate embodiments of the apparatus.

The apparatus of FIG. 5E has similar functionality to the apparatus of FIG. 5D, but has higher bit rate transmission and reception capacity and is, for example, preferred when MIDI data is transmitted and received.

FIGS. 5A–5E are self-explanatory with regard to the above parts lists.

Reference is now made to FIG. 6 which is a simplified block diagram of a preferred embodiment of the toy control device 130 of FIG. 1A. The apparatus of FIG. 6 comprises a radio transceiver 260, similar to the radio transceiver 260 of FIG. 4. The apparatus of FIG. 6 also comprises a microcontroller 250 similar to the microcontroller 250 of FIG. 4.

The apparatus of FIG. 6 also comprises a digital input/output interface (digital I/O interface) 290, which is operative to provide an interface between the microcontroller 250 and a plurality of input and output devices which may be connected thereto such as, for example, four input device and four output devices. A preferred implementation of the digital I/O interface 290 is described in more detail below with reference to FIGS. 7A–7F.

The apparatus of FIG. 6 also comprises an analog input/output interface (analog I/O interface) 300 operatively connected to the radio transceiver 260, and operative to receive signals therefrom and to send signals thereto.

The apparatus of FIG. 6 also comprises a multiplexer 305 which is operative, in response to a signal from the microcontroller 250, to provide output to the analog I/O interface 300 only when analog signals are being transmitted by the radio transceiver 260, and to pass input from the analog I/O interface 300 only when such input is desired.

The apparatus of FIG. 6 also comprises input devices 140 and output devices 150. In FIG. 6, the input devices 140 comprise, by way of example, a tilt switch operatively connected to the digital I/O interface 290, and a microphone operatively connected to the analog I/O interface 300. It is appreciated that a wide variety of input devices 140 may be used.

In FIG. 6, the output devices 150 comprise, by way of example, a DC motor operatively connected to the digital I/O interface 290, and a speaker operatively connected to the analog I/O interface 300. It is appreciated that a wide variety of output devices 150 may be used.

The apparatus of FIG. 6 also comprises a DC control 310, a preferred implementation of which is described in more detail below with reference to FIGS. 7A–7F.

The apparatus of FIG. 6 also comprises a comparator 280, similar to the comparator 280 of FIG. 4.

The apparatus of FIG. 6 also comprises a power source 125, shown in FIG. 6 by way of example as batteries, operative to provide electrical power to the apparatus of FIG. 6 via the DC control 310.

Reference is now made to FIGS. 7A–7F which, taken together with either FIG. 5D or 5E, comprise a schematic diagram of the toy control device of FIG. 6. If the schematics of FIG. 5E is employed to implement the computer radio interface of FIG. 4, using RY3GB021 as U1 of FIG. 5E, then the same schematics of FIG. 5E are preferably employed to implement the toy control device of FIG. 6 except that RY3GH021 is used to implement U1 rather than RY3GB021.

The following is a preferred parts list for the apparatus of FIGS. 7A–7F:

| | |
|---|---|
| 1. U1 | 8751 microcontroller, Intel Corporation, San Tomas 4, 2700 Sun Tomas Expressway, 2nd Floor, Santa Clara 95051, CA USA. |
| 2. U2 | LM78L05, National Semiconductor, 2900 Semiconductor Drive, Santa Clara, CA 95052, USA. |
| 3. U3 | CXO-12 MHz (crystal oscillator), Raltron, 2315 N.W. 107th Avenue, Miami, FL 33172, USA. |
| 4. U4 | MC33174, Motorola, Phoenix, AZ USA. Tel. No. (602)897-5056. |
| 5. U5 | MC34119, Motorola, Phoenix, AZ USA. Tel. No. (602)897-5056. |
| 6. U6 | 4066, Motorola, Phoenix, AZ, USA. Tel. No. (602)897-5056. |
| 7. Diode | 1N914, 1N4005, Motorola, Phoenix, AZ USA. Tel. No. (602)897-5056. |
| 8. Transistor | 2N2222, 2N3906, Motorola, Phoenix, AZ USA. Tel. No. (602)897-5056. |
| 9. Transistors | 2N2907 and MPSA14, Motorola, Phoenix, AZ USA. Tel. No. (602)897-5056. |

FIGS. 7A–7F are self-explanatory with reference to the above parts list.

As stated above with reference to FIG. 1A, the signals transmitted between the computer radio interface 110 and the toy control device 130 may be either analog signals or digital signals. It the case of digital signals, the digital signals preferably comprise a plurality of predefined messages, known to both the computer 100 and to the toy control device 130.

Each message sent by the computer radio interface 110 to the toy control device 130 comprises an indication of the intended recipient of the message. Each message sent by the toy control device 130 to the computer radio interface 110 comprises an indication of the sender of the message.

In the embodiment of FIG. 1C described above, messages also comprise the following:

each message sent by the computer radio interface 110 to the toy control device 130 comprises an indication of the sender of the message; and each message sent by the toy control device 130 to the computer radio interface 110 comprises an indication of the intended recipient of the message.

A preferred set of predefined messages is as follows:

Command Structure

| byte 0 | byte 1 | | byte 2 | byte 3 | byte 4 | byte 5 | byte 6 | | byte 7 | | byte 8 | | byte 9 |
|---|---|---|---|---|---|---|---|---|---|---|---|---|---|
| Head | PC add | Unit # A-sb | Unit # B-sb | Unit # C-sb | CMD msb | CMD lsb | -8 bits- | | -8 bits- | | -8 bits- | | CRC |
| | | | | | | | Dat1 msb | Dat1 lsb | Dat2 msb | Dat2 lsb | Dat3 msb | Dat3 lsb | |
| 8 bit | 2 bit | 6 bit | 8 bit | 8 bit | 8 bit | 8 bit | 4 bit | 4 bit | 4 bit | 4 bit | 4 bit | 4 bit | 8 bits |

Commands List
From the Computer to the Toy control device.

A. Output Commands

SET_IO_TO_DATA

| byte 0 | byte 1 | | byte 2 | byte 3 | byte 4 | byte 5 | byte 6 | | byte 7 | | byte 8 | | byte 9 |
|---|---|---|---|---|---|---|---|---|---|---|---|---|---|
| Head | PC add | Unit # A-sb | Unit # B-sb | Unit # C-sb | CMD msb | CMD lsb | -8 bits- | | -8 bits- | | -8 bits- | | CRC |
| | | | | | | | Dat1 msb | Dat1 lsb | Dat2 msb | Dat2 lsb | Dat3 msb | Dat3 lsb | |
| 8 bit | 2 bit | 6 bit | 8 bit | 8 bit | 8 bit | 8 bit | 4 bit | 4 bit | 4 bit | 4 bit | 4 bit | 4 bit | 8 bits |
| 01 | P | 00 | 00 | A | 00 | 01 | IO | 00 | D | x | x | | |

Set Toy control device output pin to a digital level D.

- P: Computer address — 00-03 H
- A: unit address - — 00-FF H
- IO: i/o number - — 00-03 H
- D: Data- — 00-01 H Example
1. 01 00 0005 00 01 03 01 00 00    set io 3 to "1"
2. 01 00 0005 00 01 03 00 00 00    set io 3 to "0"

CHANGE_IO_FOR_TIME

| byte 0 | byte 1 | | byte 2 | byte 3 | byte 4 | byte 5 | byte 6 | | byte 7 | | byte 8 | | byte 9 |
|---|---|---|---|---|---|---|---|---|---|---|---|---|---|
| Head | PC add | Unit # A-sb | Unit # B-sb | Unit # C-sb | CMD msb | CMD lsb | -8 bits- | | -8 bits- | | -8 bits- | | CRC |
| | | | | | | | Dat1 msb | Dat1 lsb | Dat2 msb | Dat2 lsb | Dat3 msb | Dat3 lsb | |
| 8 bit | 2 bit | 6 bit | 8 bit | 8 bit | 8 bit | 8 bit | 4 bit | 4 bit | 4 bit | 4 bit | 4 bit | 4 bit | 8 bits |
| 01 | P | 00 | 00 | A | 00 | 02 | 00 | IO | 00 | D | T1 | T2 | |

Change Toy control device output pin to D for a period of time and then return to previous state.

- P: Computer address — 00-03 H
- A: unit address - — 00-FF H
- IO: i/o number - — 00-03 H
- T1, T2: time - — 00-FF H
- D: Data- — 00-01 H example:
1. 01 00 0005 00 02 03 05 00 00    set io 3 to "1" for 5 seconds

B. Input Commands

SEND_STATUS_OF_SENSORS

| byte 0 | byte 1 | byte 2 | byte 3 | byte 4 | byte 5 | byte 6 | | byte 7 | | byte 8 | | byte 9 |
|---|---|---|---|---|---|---|---|---|---|---|---|---|
| Head | PC add | Unit # A-sb | Unit # B-sb | Unit # C-sb | CMD msb | CMD lsb | -8 bits- | | -8 bits- | | -8 bits- | | CRC |
| | | | | | | | Dat1 msb | Dat1 lsb | Dat2 msb | Dat2 lsb | Dat3 msb | Dat3 lsb |
| 8 bit | 2 bit | 6 bit | 8 bit | 8 bit | 8 bit | 8 bit | 4 bit | 4 bit | 4 bit | 4 bit | 4 bit | 4 bit | 8 bits |
| 01 | P | 00 | 00 | A | <u>01</u> | <u>00</u> | x | x | x | x | x | x | | send the Toy control device status of all sensors.
P: Computer address       00-03  H
A: unit address -              00-FF  H
example:
1.   01 00 <u>0005</u> 00 00 00 00 00   send current status of sensors

SENSORS_SCAN_MODE_ON

| byte 0 | byte 1 | byte 2 | byte 3 | byte 4 | byte 5 | byte 6 | | byte 7 | | byte 8 | | byte 9 |
|---|---|---|---|---|---|---|---|---|---|---|---|---|
| Head | PC add | Unit # A-sb | Unit # B-sb | Unit # C-sb | CMD msb | CMD lsb | -8 bits- | | -8 bits- | | -8 bits- | | CRC |
| | | | | | | | Dat1 msb | Dat1 lsb | Dat2 msb | Dat2 lsb | Dat3 msb | Dat3 lsb |
| 8 bit | 2 bit | 6 bit | 8 bit | 8 bit | 8 bit | 8 bit | 4 bit | 4 bit | 4 bit | 4 bit | 4 bit | 4 bit | 8 bits |
| 01 | P | 00 | 00 | A | <u>01</u> | <u>01</u> | x | x | x | x | x | x | |

Start scanning the Toy control device sensors, and if one of them is closed (pressed to '0'), send back an ack.
P: Computer address       00-03  H
A: unit address -              00-FF  H
example:
1.   01 00 <u>0005</u> 01 01 00 00 00   scan mode of sensors ON

SENSORS_SCAN_MODE_ON_ONCE

| byte 0 | byte 1 | byte 2 | byte 3 | byte 4 | byte 5 | byte 6 | | byte 7 | | byte 8 | | byte 9 |
|---|---|---|---|---|---|---|---|---|---|---|---|---|
| Head | PC add | Unit # A-sb | Unit # B-sb | Unit # C-sb | CMD msb | CMD lsb | -8 bits- | | -8 bits- | | -8 bits- | | CRC |
| | | | | | | | Dat1 msb | Dat1 lsb | Dat2 msb | Dat2 lsb | Dat3 msb | Dat3 lsb |
| 8 bit | 2 bit | 6 bit | 8 bit | 8 bit | 8 bit | 8 bit | 4 bit | 4 bit | 4 bit | 4 bit | 4 bit | 4 bit | 8 bits |
| 01 | P | 00 | 00 | A | <u>01</u> | <u>02</u> | x | x | x | x | x | x | |

Start scanning the Toy control device sensors, and if one of them is closed (press to '0'), send back an ack,
then disable scanning the sensors.
P: Computer address       00-03  H
A: unit address -              00-FF  H
1.   01 00 <u>0005</u> 01 02 00 00 00   scan mode of sensors ON once

SENSORS_SCAN_MODE_OFF

| byte 0 | byte 1 | byte 2 | byte 3 | byte 4 | byte 5 | byte 6 | | byte 7 | | byte 8 | | byte 9 |
|---|---|---|---|---|---|---|---|---|---|---|---|---|
| Head | PC add | Unit # A-sb | Unit # B-sb | Unit # C-sb | CMD msb | CMD lsb | -8 bits- | | -8 bits- | | -8 bits- | | CRC |
| | | | | | | | Dat1 msb | Dat1 lsb | Dat2 msb | Dat2 lsb | Dat3 msb | Dat3 lsb |
| 8 bit | 2 bit | 6 bit | 8 bit | 8 bit | 8 bit | 8 bit | 4 bit | 4 bit | 4 bit | 4 bit | 4 bit | 4 bit | 8 bits |
| 01 | P | 00 | 00 | A | <u>01</u> | <u>03</u> | x | x | x | x | x | x | |

Stop scanning the Toy control device sensors.
P: Computer address       00-03  H

SENSORS_SCAN_MODE_OFF

| byte 0 | byte 1 | byte 2 | byte 3 | byte 4 | byte 5 | byte 6 | byte 7 | byte 8 | byte 9 |
|---|---|---|---|---|---|---|---|---|---|
| A: | unit address - | | | 00-FF | H | | | | |
| 1. | 01 00 0005 01 03 00 00 00 00 | | | scan mode of sensors OFF | | | | | |

C. Audio Out Commands

START_AUDIO_PLAY

| byte 0 | byte 1 | byte 2 | byte 3 | byte 4 | byte 5 | byte 6 | byte 7 | byte 8 | byte 9 |
|---|---|---|---|---|---|---|---|---|---|
| Head | PC add | Unit # A-sb | Unit # B-sb | Unit # C-sb | CMD msb | CMD lsb | -8 bits- | -8 bits- | -8 bits- | CRC |
| | | | | | | | Dat1 msb / Dat1 lsb | Dat2 msb / Dat2 lsb | Dat3 msb / Dat3 lsb | |
| 8 bit | 2 bit | 6 bit | 8 bit | 8 bit | 8 bit | 8 bit | 4 bit / 4 bit | 4 bit / 4 bit | 4 bit / 4 bit | 8 bits |
| 01 | P | 00 | 00 | A | 02 | 00 | x / x | x / x | xx / xx | |

Start playing an audio in a speaker of the Toy control device The Audio is sent to the Toy control device by the computer sound card and the Computer ratio interface.
P:    Computer address    00-03    H
A:    unit address -      00-FF    H
1.    01 00 0005 02 00 00 00 00 00    Start audio-play

STOP_AUDIO_PLAY

| byte 0 | byte 1 | byte 2 | byte 3 | byte 4 | byte 5 | byte 6 | byte 7 | byte 8 | byte 9 |
|---|---|---|---|---|---|---|---|---|---|
| Head | PC add | Unit # A-sb | Unit # B-sb | Unit # C-sb | CMD msb | CMD lsb | -8 bits- | -8 bits- | -8 bits- | CRC |
| | | | | | | | Dat1 msb / Dat1 lsb | Dat2 msb / Dat2 lsb | Dat3 msb / Dat3 lsb | |
| 8 bit | 2 bit | 6 bit | 8 bit | 8 bit | 8 bit | 8 bit | 4 bit / 4 bit | 4 bit / 4 bit | 4 bit / 4 bit | 8 bits |
| 01 | P | 00 | 00 | A | 02 | 01 | x / x | x / x | x / x | |

Stop playing an audio in a speaker of the Toy control device.
P:    Computer address    00-03    H
A:    unit address -      00-FF    H
1.    01 00 0005 02 01 00 00 00 00    Stop audio-play

START_AUDIO_AND_TO_PLAY_FOR_TIME

| byte 0 | byte 1 | byte 2 | byte 3 | byte 4 | byte 5 | byte 6 | byte 7 | byte 8 | byte 9 |
|---|---|---|---|---|---|---|---|---|---|
| Head | PC add | Unit # A-sb | Unit # B-sb | Unit # C-sb | CMD msb | CMD lsb | -8 bits- | -8 bits- | -8 bits- | CRC |
| | | | | | | | Dat1 msb / Dat1 lsb | Dat2 msb / Dat2 lsb | Dat3 msb / Dat3 lsb | |
| 8 bit | 2 bit | 6 bit | 8 bit | 8 bit | 8 bit | 8 bit | 4 bit / 4 bit | 4 bit / 4 bit | 4 bit / 4 bit | 8 bits |
| 01 | P | 00 | 00 | A | 02 | 04 | T1 / T2 | T0 / td | SC / IO | |

Start playing an audio in a speaker of the Toy control device and set an io pin to '1'. After time T, stop audio and set IO to '0'. start this command after a delay td* 100 ms if SC - "1" then after the execution of this command, start the input command SCAN_SENSORS_ON_ONCE (if any sensor is pressed, even during the audio play, send a message to the computer).
P:        Computer address        00-03    H
A:        unit address -          00-FF    H
IO:       i/o number -            0-3      H    (if IO > 3 then don't set IO)
T0, T1, T2    TIME                000-FFF  H    (*100 ms) (T0 = MMSB, T1 = MSB T0 = LSB)
td:       delay time befor execute 0-F          (*100 ms)
1.    01 00 0005 02 04 80 2A 03 00    Start audio-play and IO #3 for 6.4 second
                                      640 = 28011
                                      delay before execution - 10* 100 ms = 1 sec -continued

START_AUDIO_AND_TO_PLAY_FOR_TIME

| byte 0 | byte 1 | byte 2 | byte 3 | byte 4 | byte 5 | byte 6 | byte 7 | byte 8 | byte 9 |
|---|---|---|---|---|---|---|---|---|---|
| 2. | 01 00 | 0005 | 02 04 | 80 | 2A | 13 | 00 | Start audio-play and IO #3 for 6.4 second and set scan sensors on once mode. delay before execution = 10* 100 ms = 1 sec | |

D. Audio In Commands

TRANSMIT_MIC_FOR_TIME

| byte 0 | byte 1 | byte 2 | byte 3 | byte 4 | byte 5 | byte 6 | byte 6 | byte 7 | byte 7 | byte 8 | byte 8 | byte 9 |
|---|---|---|---|---|---|---|---|---|---|---|---|---|
| Head | PC add | Unit # A-sb | Unit # B-sb | Unit # C-sb | CMD msb | CMD lsb | | -8 bits- | | -8 bits- | | -8 bits- | CRC |
| | | | | | | | Dat1 msb | Dat1 lsb | Dat2 msb | Dat2 lsb | Dat3 msb | Dat3 lsb | |
| 8 bit | 2 bit | 6 bit | 8 bit | 8 bit | 8 bit | 8 bit | 4 bit | 4 bit | 4 bit | 4 bit | 4 bit | 4 bit | 8 bits |
| 01 | P | 00 | 00 | A | 03 | 00 | T1 | T2 | x | x | x | x | |

Requests the Toy control device to Transmit microphone audio from the Toy control device to the Computer ratio interface and to the sound card of the computer for time T.
P:       Computer address         00-03    H
A:       unit address -           00-FF    H
T1, T2:  TIME                     00-FF    H    (SEC)
example:
1. 01 00 0005 03 00 0A 00 00 00   start mic mode for 10 seconds

E. General Toy Commands

GOTO_SLEEP_MODE

| byte 0 | byte 1 | byte 2 | byte 3 | byte 4 | byte 5 | byte 6 | byte 6 | byte 7 | byte 7 | byte 8 | byte 8 | byte 9 |
|---|---|---|---|---|---|---|---|---|---|---|---|---|
| Head | PC add | Unit # A-sb | Unit # B-sb | Unit # C-sb | CMD msb | CMD lsb | | -8 bits- | | -8 bits- | | -8 bits- | CRC |
| | | | | | | | Dat1 msb | Dat1 lsb | Dat2 msb | Dat2 lsb | Dat3 msb | Dat3 lsb | |
| 8 bit | 2 bit | 6 bit | 8 bit | 8 bit | 8 bit | 8 bit | 4 bit | 4 bit | 4 bit | 4 bit | 4 bit | 4 bit | 8 bits |
| 01 | P | 00 | 00 | A | 04 | 01 | x | x | x | x | x | x | |

Requests the Toy control device to go into power save mode (sleep).
P:       Computer address         00-03    H
A:       unit address -           00-FF    H
1. 01 00 0005 04 01 00 00 00     switch the Toy control device into sleep mode.

GOTO_AWAKE_MODE

| byte 0 | byte 1 | byte 2 | byte 3 | byte 4 | byte 5 | byte 6 | byte 6 | byte 7 | byte 7 | byte 8 | byte 8 | byte 9 |
|---|---|---|---|---|---|---|---|---|---|---|---|---|
| Head | PC add | Unit # A-sb | Unit # B-sb | Unit # C-sb | CMD msb | CMD lsb | | -8 bits- | | -8 bits- | | -8 bits- | CRC |
| | | | | | | | Dat1 msb | Dat1 lsb | Dat2 msb | Dat2 lsb | Dat3 msb | Dat3 lsb | |
| 8 bit | 2 bit | 6 bit | 8 bit | 8 bit | 8 bit | 8 bit | 4 bit | 4 bit | 4 bit | 4 bit | 4 bit | 4 bit | 8 bits |
| 01 | P | 00 | 00 | A | 04 | 02 | x | x | x | x | x | x | |

Requests the Toy control device to go into an awake mode.

-continued

GOTO_AWAKE_MODE

| byte 0 | byte 1 | byte 2 | byte 3 | byte 4 | byte 5 | byte 6 | byte 7 | byte 8 | byte 9 |
|--------|--------|--------|--------|--------|--------|--------|--------|--------|--------|

P:          Computer address        00-03   H
A:          unit address -          00-F    H
1.   01 00 0005 04 02 00 00 00 00   switch the Toy control device into awake mode.

TOY RESET

| byte 0 | byte 1 | byte 2 | byte 3 | byte 4 | byte 5 | byte 6 | byte 7 | byte 8 | byte 9 |
|--------|--------|--------|--------|--------|--------|--------|--------|--------|--------|
| Head | PC add | Unit # A-sb | Unit # B-sb | Unit # C-sb | CMD msb | CMD lsb | -8 bits- | -8 bits- | -8 bits- | CRC |
| | | | | | | | Dat1 msb / Dat1 lsb | Dat2 msb / Dat2 lsb | Dat3 msb / Dat3 lsb | |
| 8 bit | 2 bit | 6 bit | 8 bit | 8 bit | 8 bit | 8 bit | 4 bit / 4 bit | 4 bit / 4 bit | 4 bit / 4 bit | 8 bits |
| 01 | P | 00 | 00 | A | 04 | 0F | x  x | x  x | x  x | |

Requests the Toy control device to perform RESET
P:          Computer address        00-03   H
A:          unit address -          00-FF   H
1.   01 00 0005 04 0F 00 00 00 00   Toy reset

TOY_USE_NEW_RF_CHANNELS

| byte 0 | byte 1 | byte 2 | byte 3 | byte 4 | byte 5 | byte 6 | byte 7 | byte 8 | byte 9 |
|--------|--------|--------|--------|--------|--------|--------|--------|--------|--------|
| Head | PC add | Unit # A-sb | Unit # B-sb | Unit # C-sb | CMD msb | CMD lsb | -8 bits- | -8 bits- | -8 bits- | CRC |
| | | | | | | | Dat1 msb / Dat1 lsb | Dat2 msb / Dat2 lsb | Dat3 msb / Dat3 lsb | |
| 8 bit | 2 bit | 6 bit | 8 bit | 8 bit | 8 bit | 8 bit | 4 bit / 4 bit | 4 bit / 4 bit | 4 bit / 4 bit | 8 bits |
| 01 | P | 00 | 00 | A | 04 | 0A | CH1  CH2 | x  x | x  x | |

Requests the Toy control device to switch to new RF transmit and receive channels.
P:          Computer address            00-03   H
A:          unit address -              00-FF   H
CH1:        Transmit RF channel number  0-F     H
CH2:        Receive RF Channel number   0-F     H
1.   01 00 0005 04 0A 12 00 00 00   Switch to new RX and TX RF channels Note: This command is available only with enhanced radio modules (alternate U1 of FIG. 5E) or with the modules described if FIG 15A–15E and 23A–24E.

E. Telemetry
Information sent by the Toy control device, as an ACK to
the command recieved from the Computer radio interface.

OK_ACK

| byte 0 | byte 1 | byte 2 | byte 3 | byte 4 | byte 5 | byte 6 | byte 7 | byte 8 | byte 9 |
|--------|--------|--------|--------|--------|--------|--------|--------|--------|--------|
| Head | PC add | Unit # A-sb | Unit # B-sb | Unit # C-sb | CMD msb | CMD lsb | -8 bits- | -8 bits- | -8 bits- | CRC |
| | | | | | | | Dat1 msb / Dat1 lsb | Dat2 msb / Dat2 lsb | Dat3 msb / Dat3 lsb | |
| 8 bit | 2 bit | 6 bit | 8 bit | 8 bit | 8 bit | 8 bit | 4 bit / 4 bit | 4 bit / 4 bit | 4 bit / 4 bit | 8 bits |
| 01 | P | 00 | 00 | A | 0A | 00 | cmd1  cmd2 | cmd3  cmd4 | sen1  sen2 | |

Send back an ACK about the command that was received ok.
P:          Computer address            00-03   H
A:          unit address -              00-FF   H
cmd 1, 2:        Received command MSB ok ack.   00-FF   H

-continued

OK_ACK

| byte 0 | byte 1 | byte 2 | byte 3 | byte 4 | byte 5 | byte 6 | byte 7 | byte 8 | byte 9 |
|---|---|---|---|---|---|---|---|---|---|
| cmd 3, 4: | | Received command | | LSB ok ack. | | 00-FF | H | | |
| sen 1, 2 | | Sensors 0–7 status | | | | 00-FF | H | | |
| 1. | 01 60 0005 0A 00 01 01 FF 00 | | | | OK ack for 0101 command. (sensors scan mode on command). status: all sensors are not pressed (FF). | | | | |
| 2. | 01 60 0005 0A 00 01 01 FE 00 | | | | OK ack for 0101 command. (sensors scan mode on command). status: sensor #8 is pressed (FE) the computer_radio_interface number is 6. | | | | |

15

E. Requests
Request sent by the Toy control device, after an event

TOY_IS_AWAKE_REQ

| byte 0 | byte 1 | byte 2 | byte 3 | byte 4 | byte 5 | byte 6 | byte 7 | byte 8 | byte 9 |
|---|---|---|---|---|---|---|---|---|---|
| Head | PC add | Unit # A-sb | Unit # B-sb | Unit # C-sb | CMD msb | CMD lsb | -8 bits- | -8 bits- | -8 bits- | CRC |
| | | | | | | | Dat1 msb / Dat1 lsb | Dat2 msb / Dat2 lsb | Dat3 msb / Dat3 lsb | |
| 8 bit | 2 bit | 6 bit | 8 bit | 8 bit | 8 bit | 8 bit | 4 bit / 4 bit | 4 bit / 4 bit | 4 bit / 4 bit | 8 bits |
| 01 | P | 00 | 00 | A | 0A | 00 | c1 / c2 | x / x | x / x | |

Send a message to the Computer radio interface if the Toy control device goes from sleep mode to awake mode.
P: Computer address 00-03 H
A: unit address - 00-FF H
c1, c2: status command AB H
1. 01 60 0005 0A 00 AB 00 FF 00 Toy is awake message.

E. CRI (Computer Ratio Interface)-commands
Commands that are sent to the Computer radio interface.

SWITCH_AUDIO_OUT_TO_RADIO_&_TRANSMIT

| byte 0 | byte 1 | byte 2 | byte 3 | byte 4 | byte 5 | byte 6 | byte 7 | byte 8 | byte 9 |
|---|---|---|---|---|---|---|---|---|---|
| Head | PC add | Unit # A-sb | Unit # B-sb | Unit # C-sb | CMD msb | CMD lsb | -8 bits- | -8 bits- | -8 bits- | CRC |
| | | | | | | | Dat1 msb / Dat1 lsb | Dat2 msb / Dat2 lsb | Dat3 msb / Dat3 lsb | |
| 8 bit | 2 bit | 6 bit | 8 bit | 8 bit | 8 bit | 8 bit | 4 bit / 4 bit | 4 bit / 4 bit | 4 bit / 4 bit | 8 bits |
| 01 | P | 00 | 00 | x | 0C | 00 | x / x | x / x | x / x | |

Requests the Computer radio interface to switch audio_out from the computer sound card to the radio wireless transceiver and transmit.
P: Computer address 00-03 H

SWITCH_AUDIO_OUT_TO_JACK_&_STOP_TRANSMIT

| byte 0 | byte 1 | byte 2 | byte 3 | byte 4 | byte 5 | byte 6 | byte 7 | byte 8 | byte 9 |
|---|---|---|---|---|---|---|---|---|---|
| Head | PC add | Unit # A-sb | Unit # B-sb | Unit # C-sb | CMD msb | CMD lsb | -8 bits- | -8 bits- | -8 bits- | CRC |
| | | | | | | | Dat1 msb / Dat1 lsb | Dat2 msb / Dat2 lsb | Dat3 msb / Dat3 lsb | |
| 8 bit | 2 bit | 6 bit | 8 bit | 8 bit | 8 bit | 8 bit | 4 bit / 4 bit | 4 bit / 4 bit | 4 bit / 4 bit | 8 bits |
| 01 | P | 00 | 00 | x | 0C | 01 | x / x | x / x | x / x | |

-continued

SWITCH_AUDIO_OUT_TO_JACK_&_STOP_TRANSMIT

| byte 0 | byte 1 | byte 2 | byte 3 | byte 4 | byte 5 | byte 6 | byte 7 | byte 8 | byte 9 |
|--------|--------|--------|--------|--------|--------|--------|--------|--------|--------|

Requests the Computer radio interface to switch audio_out from the radio RF wireless transceiver to the speakers jack and to stop transmit.
P:           Computer address      00-03      H

MUTE_RADIO

| byte 0 | byte 1 | byte 2 | byte 3 | byte 4 | byte 5 | byte 6 | | byte 7 | | byte 8 | | byte 9 |
|--------|--------|--------|--------|--------|--------|--------|--------|--------|--------|--------|--------|--------|
| Head | PC add | Unit # A-sb | Unit # B-sb | Unit # C-sb | CMD msb | CMD lsb | | -8 bits- | | -8 bits- | | -8 bits- | CRC |
| | | | | | | | Dat1 msb | Dat1 lsb | Dat2 msb | Dat2 lsb | Dat3 msb | Dat3 lsb | |
| 8 bit | 2 bit | 6 bit | 8 bit | 8 bit | 8 bit | 8 bit | 4 bit | 4 bit | 4 bit | 4 bit | 4 bit | 4 bit | 8 bits |
| 01 | P | 00 | 00 | x | 0C | 02 | x | x | x | x | x | x | |

Mute the radio transmit.
P:           Computer address      00-03      H

25

G. CRI-ACK

ACK sent only to the Computer by the Computer radio interface, only after CRl commands

CRI_COMMAND_ACK

| byte 0 | byte 1 | byte 2 | byte 3 | byte 4 | byte 5 | byte 6 | | byte 7 | | byte 8 | | byte 9 |
|--------|--------|--------|--------|--------|--------|--------|--------|--------|--------|--------|--------|--------|
| Head | PC add | Unit # A-sb | Unit # B-sb | Unit # C-sb | CMD msb | CMD lsb | | -8 bits- | | -8 bits- | | -8 bits- | CRC |
| | | | | | | | Dat1 msb | Dat1 lsb | Dat2 msb | Dat2 lsb | Dat3 msb | Dat3 lsb | |
| 8 bit | 2 bit | 6 bit | 8 bit | 8 bit | 8 bit | 8 bit | 4 bit | 4 bit | 4 bit | 4 bit | 4 bit | 4 bit | 8 bits |
| 01 | P | 00 | 00 | x | 0D | 00 | cmd1 | cmd2 | cmd3 | cmd4 | x | x | |

This is an ACK for a CRI command. this ACK is sent to the computer by the computer-radio-interface, after executing a command successfully.
P:           Computer address      00-03      H
cmd 1, 2:    Received CRI command MSB ok ack.   00-FF     H
cmd 3, 4:    Received CRI command LSB ok ack.   00-FF     H
1.  01 60 0000 0D 00 0C 01 00 00   OK ack for 0C01 CRI command (SWITCH AUDIO OUT TO JACK)
                                   the computer_radio_interface number is 6.
2.  01 60 0000 0D 00 0C 0F 00 00   OK ack for 0C0F CRI command (CRI reset)
                                   the computer_radio_interface number is 6.
                                   This ack is also sent on POWER UP RESET

UN-MUTE_RADIO

| byte 0 | byte 1 | byte 2 | byte 3 | byte 4 | byte 5 | byte 6 | | byte 7 | | byte 8 | | byte 9 |
|--------|--------|--------|--------|--------|--------|--------|--------|--------|--------|--------|--------|--------|
| Head | PC add | Unit # A-sb | Unit # B-sb | Unit # C-sb | CMD msb | CMD lsb | | -8 bits- | | -8 bits- | | -8 bits- | CRC |
| | | | | | | | Dat1 msb | Dat1 lsb | Dat2 msb | Dat2 lsb | Dat3 msb | Dat3 lsb | |
| 8 bit | 2 bit | 6 bit | 8 bit | 8 bit | 8 bit | 8 bit | 4 bit | 4 bit | 4 bit | 4 bit | 4 bit | 4 bit | 8 bits |
| 01 | 00 | 00 | 00 | x | 0C | 03 | x | x | x | x | x | x | |

UN-Mute the radio transmit.

CRI_RESET

| | | | | | | | | | | | | |
|--|--|--|--|--|--|--|--|--|--|--|--|--|
| Head | PC add | Unit # A-sb | Unit # B-sb | Unit # C-sb | CMD msb | CMD lsb | -8 bits- | | -8 bits- | | -8 bits- | CRC |
| | | | | | | | Dat1 | Dat1 | Dat2 | Dat2 | Dat3 | Dat3 |

-continued

| 8 bit | 2 bit | 6 bit | 8 bit | 8 bit | 8 bit | 8 bit | msb 4 bit | lsb 4 bit | msb 4 bit | lsb 4 bit | msb 4 bit | lsb 4 bit | 8 bits |
|---|---|---|---|---|---|---|---|---|---|---|---|---|---|
| 01 | P | 00 | 00 | x | <u>0C</u> | <u>0F</u> | x | x | x | x | x | x | |

Perform software reset on the Computer radio interface unit.
P:          Computer address     00-03     H Reference is now made to FIG. 8A, which is a simplified flowchart illustration of a preferred method for receiving radio signals, executing commands comprised therein, and sending radio signals, within the toy control device 130 of FIG. 1A. Typically, each message as described above comprises a command, which may include a command to process information also comprised in the message. The method of FIG. 8A preferably comprises the following steps:

A synchronization signal or preamble is detected (step 400). A header is detected (step 403).

A command contained in the signal is received (step 405).

The command contained in the signal is executed (step 410). Executing the command may be as described above with reference to FIG. 1A.

A signal comprising a command intended for the computer radio interface 110 is sent (step 420).

Reference is now made to FIGS. 8B–8T which, taken together, comprise a simplified flowchart illustration of a preferred implementation of the method of FIG. 8A. The method of FIGS. 8B–8T is self-explanatory.

Reference is now made to FIG. 9A, which is a simplified flowchart illustration of a preferred method for receiving MIDI signals, receiving radio signals, executing commands comprised therein, sending radio signals, and sending MIDI signals, within the computer radio interface 110 of FIG. 1A. Some of the steps of FIG. 9A are identical to steps of FIG. 8A, described above. FIG. 9A also preferably comprises the following steps:

A MIDI command is received from the computer 100 (step 430). The MIDI command may comprise a command intended to be transmitted to the toy control device 130, may comprise an audio in or audio out command, or may comprise a general command.

A MIDI command is sent to the computer 100 (step 440). The MIDI command may comprise a signal received from the toy control device 130, may comprise a response to a MIDI command previously received by the computer radio interface 110 from the computer 100, or may comprise a general command.

The command contained in the MIDI command or in the received signal is executed (step 450). Executing the command may comprise, in the case of a received signal, reporting the command to the computer 100, whereupon the computer 100 may typically carry out any appropriate action under program control as, for example, changing a screen display or taking any other appropriate action in response to the received command. In the case of a MIDI command received from the computer 100, executing the command may comprise transmitting the command to the toy control device 130. Executing a MIDI command may also comprise switching audio output of the computer control device 110 between the secondary audio interface 230 and the radio transceiver 260.

Normally the secondary audio interface 230 is directly connected to the audio interface 220 preserving the connection between the computer sound board and the peripheral audio devices such as speakers, microphone and stereo system.

Reference is now made to FIGS. 9B–9N, and additionally reference is made back to FIGS. 8D–8M, all of which, taken together, comprise a simplified flowchart illustration of a preferred implementation of the method of FIG. 9A. The method of FIGS. 9B–9M, taken together with FIGS. 8D–8M, is self-explanatory.

Reference is now additionally made to FIGS. 10A–10C, which are simplified pictorial illustrations of a signal transmitted between the computer radio interface 110 and the toy control device 130 of FIG. 1A. FIG. 10A comprises a synchronization preamble. The duration T_SYNC of the synchronization preamble is preferably 0.500 millisecond, being preferably substantially equally divided into on and off components.

FIG. 10B comprises a signal representing a bit with value 0, while FIG. 10C comprises a signal representing a bit with value 1.

It is appreciated that FIGS. 10B and 10C refer to the case where the apparatus of FIG. 5D is used. In the case of the apparatus of FIG. 5E, functionality corresponding to that depicted in FIGS. 10B and 10C is provided within the apparatus of FIG. 5E.

Preferably, each bit is assigned a predetermined duration T, which is the same for every bit. A frequency modulated carrier is transmitted, using the method of frequency modulation keying as is well known in the art. An "off" signal (typically less than 0.7 Volts) presented at termination 5 of U2 in FIG. 5D causes a transmission at a frequency below the median channel frequency. An "on" signal (typically over 2.3 Volts) presented at pin 5 of U2 in FIG. 5D causes a transmission at a frequency above the median frequency. These signals are received by the corresponding receiver U1. Output signal from pin 6 of U1 is fed to the comparator 280 of FIGS. 4 and 6 that is operative to determine whether the received signal is "off" or "on", respectively.

It is also possible to use the comparator that is contained within U1 by connecting pin 7 of U1 of FIG. 5D, through pin 6 of the connector J1 of FIG. 5D, pin 6 of connector J1 of FIG. 5A, through the jumper to pin 12 of U1 of FIG. 5A.

Preferably, receipt of an on signal or spike of duration less than 0.01*T is ignored. Receipt of an on signal as shown in FIG. 10B, of duration between 0.01*T and 0.40*T is is preferably taken to be a bit with value 0. Receipt of an on signal as shown in FIG. 10C, of duration greater than 0.40*T is preferably taken to be a bit with value 1. Typically, T has a value of 1.0 millisecond.

Furthermore, after receipt of an on signal, the duration of the subsequent off signal is measured. The sum of the durations of the on signal and the off signal must be between 0.90 T and 1.10 T for the bit to be considered valid. Otherwise, the bit is considered invalid and is ignored.

Reference is now made to FIG. 11, which is a simplified flowchart illustration of a method for generating control instructions for the apparatus of FIG. 1A. The method of FIG. 11 preferably includes the following steps:

A toy is selected (step 550). At least one command is selected, preferably from a plurality of commands associated with the selected toy (steps 560–580). Alternatively, a command may be entered by selecting, modifying, and creating a new binary command (step 585).

Typically, selecting a command in steps 560–580 may include choosing a command and specifying one or more control parameters associated with the command. A control parameter may include, for example, a condition depending on a result of a previous command, the previous command being associated either with the selected toy or with another toy. A control parameter may also include an execution condition governing execution of a command such as, for example: a condition stating that a specified output is to occur based on a status of the toy, that is, if and only if a specified input is received; a condition stating that the command is to be performed at a specified time; a condition stating that performance of the command is to cease at a specified time; a condition comprising a command modifier modifying execution of the command, such as, for example, to terminate execution of the command in a case where execution of the command continues over a period of time; a condition dependent on the occurrence of a future event; or another condition.

The command may comprise a command to cancel a previous command.

The output of the method of FIG. 11 typically comprises one or more control instructions implementing the specified command, generated in step 590. Typically, the one or more control instructions are comprised in a command file. Typically, the command file is called from a driver program which typically determines which command is to be executed at a given point in time and then calls the command file associated with the given command.

Preferably, a user of the method of FIG. 11 performs steps 550 and 560 using a computer having a graphical user interface.

Reference is now made to FIGS. 12A–12C, which are pictorial illustrations of a preferred embodiment of a graphical user interface implementation of the method of FIG. 11.

FIG. 12A comprises a toy selection area 600, comprising a plurality of toy selection icons 610, each depicting a toy. The user of the graphical user interface of FIGS 12A–12C typically selects one of the toy selection icons 610, indicating that a command is to be specified for the selected toy.

FIG. 12A also typically comprises action buttons 620, typically comprising one or more of the following:

- a button allowing the user, typically an expert user, to enter a direct binary command implementing an advanced or particularly complex command not otherwise available through the graphical user interface of FIGS. 12A–12C;
- a button allowing the user to install a new toy, thus adding a new toy selection icon 610; and
- a button allowing the user to exit the graphical user interface of FIGS. 12A–12C.

FIG. 12B depicts a command generator screen typically displayed after the user has selected one of the toy selection icons 610 of FIG. 12A. FIG. 12B comprises an animation area 630, preferably comprising a depiction of the selected toy selection icon 610, and a text area 635 comprising text describing the selected toy.

FIG. 12B also comprises a plurality of command category buttons 640, each of which allow the user to select a category of commands such as, for example: output commands; input commands; audio in commands; audio out commands; and general commands.

FIG. 12B also comprises a cancel button 645 to cancel command selection and return to the screen of FIG. 12A.

FIG. 12C comprises a command selection area 650, allowing the user to specify a specific command. A wide variety of commands may be specified, and the commands shown in FIG. 12C are shown by way of example only.

FIG. 12C also comprises a file name area 655, in which the user may specify the name of the file which is to receive the generated control instructions. FIG. 12C also comprises a cancel button 645, similar to the cancel button 645 of FIG. 12B. FIG. 12C also comprises a make button 660. When the user actuates the make button 660, the control instruction generator of FIG. 11 generates control instructions implementing the chosen command for the chosen toy, and writes the control instructions to the specified file.

FIG. 12C also comprises a parameter selection area 665, in which the user may specify a parameter associated with the chosen command.

Reference is now made to Appendix A, which is a computer listing of a preferred software implementation of the method of FIGS. 8A–8T.

Appendix A is an INTEL hex format file. The data bytes start from character number 9 in each line. Each byte is represented by 2 characters. The last byte (2 characters) in each line, should be ignored.

For example, for a sample line:
The original line reads- :070000000201000203209F
The data bytes- 02010002032032 (02,01,00,02,03,20,32)
Starting address of the data bytes- 0000 (00,00)

Appendix A may be programmed into the memory of microcontroller 250 of FIG. 6.

Appendix B is a computer listing of a preferred software implementation of the method of FIGS. 9A–9N, together with the method of FIGS. 8D–8M.

Appendix B is an INTEL hex format file. The data bytes start from character number 9 in each line. Each byte is represented by 2 characters. The last byte (2 characters) in each line, should be ignored.

For example, for a sample line:
The original line reads- :070000000201000205A73216
The data bytes- 0201000205A732 (02,01,00,02,05,A7,32)
Starting address of the data bytes- 0000 (00,00)

Appendix B may be programmed into the memory of microcontroller 250 of FIG. 4.

Appendix C is a computer listing of a preferred software implementation of an example of a computer game for use in the computer 100 of FIG. 1.

Appendix D is a computer listing of a preferred software implementation of the method of FIGS. 11 and FIGS. 12A–12C.

For Appendices C and D, these programs were developed using VISUAL BASIC. To run the programs you need to install the VISUAL BASIC environment first. The application needs a Visual Basic custom control for performing MIDI I/O similar to the one called MIDIVBX.VBX. VISUAL BASIC is manufactured by Microsoft Corporation, One Microsoft Way, Redmond, Wash. 98052-6399, USA. MIDIVBX.VBX is available from Wayne Radinsky, electronic mail address a-wayner@microsoft.com.

The steps for programming the microcontrollers of the present invention include the use of a universal programmer, such as the Universal Programmer, type EXPRO 60/80, manufactured by Sunshine Electronics Co. Ltd., Taipei, Japan.

The method for programming the microcontrollers with the data of Appendices A and B, includes the following steps:

1. Run the program EXPRO.EXE, which is provided with the EXPRO 60/80".
2. Choose from the main menu the EDIT/VIEW option.
3. Choose the EDIT BUFFER option.

4. Enter the string E 0000.
5. Enter the relevant data (given in Appendices A or B), byte after byte, starting from the address 0000. In each line there is a new starting address for each data byte which appears in this line.
6. Press ESC.
7. Enter the letter Q.
8. Choose from the main menu the DEVICE option.
9. Choose the MPU/MCU option.
10. Choose the INTEL option.
11. Choose the 87C51.
12. Choose from the main menu the RUNFUNC option.
13. Choose the PROGRAM option.
14. Place the 87C51 chip in the programmer's socket.
15. Enter Y and wait until the OK message.
16. The chip is now ready to be installed in the board.

The method for creating the relevant files for the computer 100, with the data of Appendices C and D, includes using a HEX EDITOR which is able to edit DOS formatted files. A typical HEX and ASCII editor is manufactured by Martin Doppelbauer, Am Spoerkel 17, 44227 Dortmund, Germany, UET401 at electronic mail address hrz.unidozr.uni-dortmund.de.

The steps necessary for creating the files by means of a HEX editor, such as by the Martin Doppelbauer editor include the following:
1. Copy any DOS file to a new file with the desired name and with the extension .EXE. (For example, write COPY AUTOEXEC.BAT TOY1.EXE).
2. Run the program ME.EXE.
3. From the main menu press the letter L(load file).
04. Write the main menu of the new file (for example TOY1.EXE).
5. From the main menu, press the letter (insert).
6. Enter the relevant data (written in Appendices C or D), byte after byte, starting from the address 0000.
7. Press ESC.
8. From the main menu, enter the letter W(write file).
9. Press the RETURN key and exit from the editor by pressing the letter Q.

The above-described embodiment of FIG. 1C includes a description of a preferred set of predefined messages including a category termed "General commands". Other General Commands are defined by the following description:

Multiport Commands

| AVAILABILITY_INTERROGATION_COMMAND | | | | | | | | | | | | | | |
|---|---|---|---|---|---|---|---|---|---|---|---|---|---|---|
| byte 0 | byte 1 | byte 2 | byte 3 | byte 4 | byte 5 | byte 6 | | byte 7 | | byte 8 | | byte 9 | | |
| Head | PC add | Unit # A-sb | Unit # B-sb | Unit # C-sb | CMD msb | CMD lsb | -8 bits- | | -8 bits- | | -8 bits- | | CRC | |
| | | | | | | | Dat1 msb | Dat1 lsb | Dat2 msb | Dat2 lsb | Dat3 msb | Dat3 lsb | | |
| 8 bit | 2 bit | 6 bit | 8 bit | 8 bit | 8 bit | 8 bit | 4 bit | 4 bit | 4 bit | 4 bit | 4 bit | 4 bit | 8 bits | |
| 01 | P | 00 | 00 | A | 04 | 05 | 00 | 00 | 00 | 00 | x | x | | |

A computer transmits this command to verify that the radio channel is vacant. If another computer is already using this channel it will respond with the Availability Response Command. If no response is received within 250 msec the channel is deemed vacant.
P:        Computer address    00-03    H
A:        unit address -       00-FF    H

| AVAILABILITY_RESPONSE_COMMAND | | | | | | | | | | | | | | |
|---|---|---|---|---|---|---|---|---|---|---|---|---|---|---|
| byte 0 | byte 1 | byte 2 | byte 3 | byte 4 | byte 5 | byte 6 | | byte 7 | | byte 8 | | byte 9 | | |
| Head | PC add | Unit # A-sb | Unit # B-sb | Unit # C-sb | CMD msb | CMD lsb | -8 bits- | | -8 bits- | | -8 bits- | | CRC | |
| | | | | | | | Dat1 msb | Dat1 lsb | Dat2 msb | Dat2 lsb | Dat3 msb | Dat3 lsb | | |
| 8 bit | 2 bit | 6 bit | 8 bit | 8 bit | 8 bit | 8 bit | 4 bit | 4 bit | 4 bit | 4 bit | 4 bit | 4 bit | 8 bits | |
| 01 | P | 00 | 00 | A | 04 | 06 | 00 | 00 | 00 | 00 | x | x | | |

A computer transmits this command in response to an Availability Interrogation Command to announce that the radio channel is in use.
P:        Computer address    00-03    H
A:        unit address -       00-FF    H

| TOY_AVAILABILITY_COMMAND | | | | | | | | | | | | | | |
|---|---|---|---|---|---|---|---|---|---|---|---|---|---|---|
| byte 0 | byte 1 | byte 2 | byte 3 | byte 4 | byte 5 | byte 6 | | byte 7 | | byte 8 | | byte 9 | | |
| Head | PC add | Unit # A-sb | Unit # B-sb | Unit # C-sb | CMD msb | CMD lsb | -8 bits- | | -8 bits- | | -8 bits- | | CRC | |
| | | | | | | | Dat1 msb | Dat1 lsb | Dat2 msb | Dat2 lsb | Dat3 msb | Dat3 lsb | | |

-continued

TOY_AVAILABILITY_COMMAND

| byte 0 | byte 1 | byte 2 | byte 3 | byte 4 | byte 5 | byte 6 | byte 7 | | byte 8 | | byte 9 |
|---|---|---|---|---|---|---|---|---|---|---|---|
| 8 bit | 2 bit | 6 bit | 8 bit | 8 bit | 8 bit | 8 bit | 4 bit | 4 bit | 4 bit | 4 bit | 8 bits |
| 01 | P | 00 | 00 | A | 04 | 07 | 00 | 00 | 00 | 00 | |
| | | | | | | | | | x | x | |

A Toy transmits this command to declare its existence and receive in response a Channel Pair Selection Command designating the computer that will control it and the radio channels to use.
P:         Computer address       00-03    H
A:         unit address -         00-FF    H

CHANNEL_PAIR_SELECTION_COMMAND

| byte 0 | byte 1 | byte 2 | byte 3 | byte 4 | byte 5 | byte 6 | byte 7 | byte 8 | byte 9 |
|---|---|---|---|---|---|---|---|---|---|
| Head | PC add | Unit # A-sb | Unit # B-sb | Unit # C-sb | CMD msb | CMD lsb | -8 bits- | -8 bits- | -8 bits- | CRC |
| | | | | | | | Dat1 msb / Dat1 lsb | Dat2 msb / Dat2 lsb | Dat3 msb / Dat3 lsb | |
| 8 bit | 2 bit | 6 bit | 8 bit | 8 bit | 8 bit | 8 bit | 4 bit / 4 bit | 4 bit / 4 bit | 4 bit / 4 bit | 8 bits |
| 01 | P | 00 | 00 | A | 04 | 08 | CH1 / CH2 | 00 / 00 | x / x | |

A computer transmits this command in response to a Toy Availability Command to inform the toy the radio channels to be used.
P:         Computer address       00-03    H
A:         unit address -         00-FF    H
CH1:       Toy transmit channel   0-F      H
CH1:       Toy receive channel    0-F      H In FIGS. 13 and 14 there are illustrated block diagrams of multiport multi-channel implementation of the computer radio interface 110 of FIG. 1A. FIG. 13 illustrates the processing sub-unit of the computer interface that is implemented as an add-in board installed inside a PC. FIG. 14 is the RF transceiver which is a device external to the computer and connects to the processing subunit by means of a cable. In the present application of the RF unit there are 4 transceivers each capable of utilizing two radio channels simultaneously.

Referring briefly to FIG. 3, it is appreciated that, optionally, both sound and control commands may be transmitted via the MIDI connector 210 rather than transmitting sound commands via the analog connector 220. It is additionally appreciated that the functions of the interfaces 210 and 220 between the computer radio interface 110 and the sound card 190 may, alternatively, be implemented as connections between the computer radio interface 110 to the serial and/or parallel ports of the computer 100, as shown in FIGS. 25A–25F.

If it is desired to provide full duplex communication, each transceiver 260 which forms part of the computer radio interface 110 of FIG. 1A preferably is operative to transmit on a first channel pair and to receive on a different, second channel pair. The transceiver 260 (FIG. 4) which forms part of the toy control device 130 of FIG. 1A preferably is operative to transmit on the second channel and to receive on the first channel.

Any suitable technology may be employed to define at least two channel pairs such as narrow band technology or spread spectrum technologies such as frequency hopping technology or direct sequence technology, as illustrated in FIGS. 15A–15E, showing a Multi-Channel Computer Radio Interface, and in FIGS. 24A–24E showing a Multi-Channel Toy Control Device.

Appendices E–H, taken together, are computer listings from which a first, DLL-compatible, functions library may be constructed. The DLL-compatible functions library may be subsequently used by a suitable computer system such as an IBM PC to generate a variety of games for any of the computer control systems shown and described herein. Alternatively, games may be generated using the applications generator of FIGS. 11–12C.

To generate a DLL (dynamic loading and linking) function library based on Appendices E–H, the following operations are performed:
1) Open Visual C++4.0
2) Go to File Menu
3) Choose New from File Menu
4) Choose Project Workspace
5) Choose Dynamic-Link Library
6) The Project Name is: DLL32.MDP
7) Press Create button
8) Go to File Menu
9) Choose New from File Menu
10) Choose Text File
11) Now write the Source
12) Write on the current page a file containing the contents of Appendix E
13) Press the mouse right button and choose: Insert File Into Project
14) Click on DLL32 project
15) On the save dialog write CREATOR.C
16) Press the OK button
17) Go to File Menu
18) Choose New from File Menu
19) Choose Text File
20) Write on this page a file containing the contents of Appendix F;
21) Go to File Menu 22) Press Save
23) On the save dialog write CRMIDI.H
24) Press the OK button
25) Go to File Menu
26) Choose New from File Menu
27) Choose Text File
28) Write on this page a file containing the contents of Appendix G;
29) Go to File Menu
30) Press Save
31) On the save dialog write a file CREATOR.H
32) Press the OK button
33) Go to File Menu
34) Choose New from File Menu
35) Choose Text File
36) Write on this page a file containing the contents of Appendix H;
37) Press the mouse right button and choose: Insert File Into Project
38) Click on DLL32 project
39) On the save dialog write CREATOR.DEF
40) Press the OK button
41) Go to Insert Menu
42) Press File Into Project . . .
43) On the List Files of Type: Choose Library Files (*.lib)
44) Go to the Visual C++library directory and choose WINMM.LIB
45) Press the OK button
46) Go to the Build menu
47) Press Rebuild ALL A description of the commands included in the DLL function library based on Appendices E–H now follows:

A. MIDI input functions 1–2:

1. Open MIDI input device

Syntax: long MIDIInOpen(long Device)

This function opens the MIDI device for input.
Return 0 for success, −1 otherwise.

Delphi Example:

Device:=0;

if MIDIInOpen(Device)<>0 Then
     MessageDlg('Error opening MIDI input device', mtError, mbOk, 0);

2. Reset MIDI input device

Syntax: long MIDIInReset(void)

this function resets MIDI input device.
Return 0 for success, −1 otherwise.

Delphi Example:

if MIDIInRest<>0 Then
     MessageDlg('Error reseting MIDI input device', mtError, mbOk, 0);

B. MIDI output functions 3–6:

3. Close MIDI input device

Syntax: long MIDIInClose(void)

This function close MIDI input device.
Return 0 for success, −1 otherwise.

Delphi Example:

if MIDIInClose<>0 Then
     MessageDlg('Error closing MIDI input device', mtError, mbOk, 0);

4. Open MIDI output device

Syntax: long MIDIOutOpen(long Device)

This function opens MIDI output device.
Return 0 if success, −1 otherwise.
m
Delphi Example:

Device:=0;

if MIDIOutOpen(Device)<>0 Then
     MessageDlg('Error opening MIDI output device', mtError, mbOk, 0);

5. Reset MIDI Output device

Syntax: long MIDIOutReset(void)

This function resets MIDI output device.
Return 0 if success, −1 otherwise.

Delphi Example:

if MIDIOutReset<>0 Then
     MessageDlg('Error reseting MIDI output device', mtError, mbOk, 0);

6. Close MIDI output device

Syntax: long MIDIOutClose(void)

This function close MIDI output device.
Return 0 if success, −1 otherwise.

Delphi Example:

Device:=0;

if MIDIOutClose<>0 Then
     MessageDlg('Error opening MIDI output device', mtError, mbOk, 0);

C. General functions 7–10:

7. Send Data

Syntax: long SendData(long Data)

This function sends 4 bytes to toy card.
Currently used to send 144 for init toy card.

Return 0 if succesfull, −1 otherwise.

Delphi Example:

```
If SendData(144)<>0 Then
    MessageDlg('Error sending data to toy', mtError,
        mbOk, 0);
```

8. Send Message

Syntax: long SendMessage(char*Mess)

This function sends string to toy card.
Return 1 if successful, or error code otherwise.

Delphi Example:

```
Mess:='00 01 00 00 00 00 00 05 00
    00 00 01 00 03 00 01 00 00 00';

If SendMessage(Mess)<>1 Then
    MessageDlg('Error opening MIDI output device',
        mtError, mbOk, 0);
```

9. Check message

Syntax: long CheckMessage(void)

This function returns 0 if no message found from toy card.

Delphi Example:

```
If CheckMessage Then
    Mess:=GetMessage;
```

10. Get Message

Syntax: char*GetMessage(char*Mess)

This function returns 20 chars toy message if present, or "Time Out" otherwise.

Delphi Example:

```
If GetMessage="Time Out" Then
    MessageDlg('No message received', mtError, mbOk,
        0);
```

D. Toy control functions 11–16:

11. Get Toy Number

Syntax: char*GetToyNumber(void)

This function returns Toy Number of last receiving message, or "00 00 00 00" if no message was received.

12. Get Sensor Number

Syntax: long GetSensorNumber(void)

This function returns Sensor Number of last receiving message, or 255 if no message was received.

13. Toy Reset
Syntax: long ToyReset(char*ToyNumber)

This function sends a reset string to toy.
Return 0 if successful, or −1 otherwise.

14. Toy Transceive
Syntax: char*ToyTranceive(char*ToyNumber,char*Mess)
This function sends message to toy and waits 3 sec to acknowledge.
Return "Ack. Ok" if received, or "Time Out" if not.

15. Prepare Toy Talk yntax: char*PrepareToyTalk(char*ToyNumber, char*WaveFile)

This function prepares toy card to generate sound using toy speaker.
After calling this function, WaveFile may be played and heard at toy speaker.
Return "Ack. Ok" if successful, or "Time Out" otherwise.

16. Go To Sleep Mode

Syntax: char*GoSleep(char*ToyNumber)

This function sends to toy the sleep command.
Return "Ack. Ok" if successful, or "Time Out" otherwise.

Appendices I–O, taken together, are computer listings of a second functions library which may be used to generate a variety of games for any of the computer control systems shown and described herein in conjunction with a Director 5.0 software package, marketed by Macromedia Inc., 600 Townsend St., San Francisco, Calif., 94103.

To generate an XObject function library based on Appendices I–O, the following operations are performed:

1) Create a new directory: C:\XOBJECT\ by writing (MD C:\XOBJECT\)
2) Open Visual C++1.5
3) On the File menu choose NEW
4) Generate a file which contains the contents of Appendix I;
5) Choose Save As from the File Menu
6) Give the file generated in step (4) a name by punching C:\XOBJECT\CREATOR.MAK
7) Press the OK button
8) On the File menu choose NEW
9) Generate a file which contains the contents of Appendix J;
10) On the File menu choose Save As.
11) In the File Name: dialog, write C:\XOBJECT\CREATOR.C
12) Press the OK button
13) On the File menu choose NEW
14) Generate a file which contains the contents of Appendix K;
15) On the File menu choose Save As.
16) In the File Name: dialog write C:\XOBJECT\CREATOR.H
17) Press the OK button
18) On the File menu choose NEW
19) Generate a file which contains the contents of Appendix L;
20) On the File menu choose Save As.
21) In the File Name: dialog write C:\XOBJECT\CRMIDI.H 22) Press the OK button
23) On the File menu choose NEW
24) Generate a file which contains the contents of Appendix M;
25) On the File menu choose Save As.
26) In the File Name: dialog write C:\XOBJECT\XOBJECT.H
27) Press the OK button
28) On the File menu choose NEW
29) Generate a file which contains the contents of Appendix N;
30) On the File menu choose Save As.
31) In the File Name: dialog write C:\XOBJECT\CREATOR.DEF
32) Press the OK button
33) On the File menu choose NEW
34) Generate a file which contains the contents of Appendix O;
35) On the File menu choose Save As.
36) In the File Name: dialog write C:\XOBJECT\CREATOR.RC
37) Press the OK button
38) On the Project Menu choose Open
39) In the File Name dialog write C:\XOBJECT\CREATOR.MAK40) Press Rebuild All from the Project Menu A description of the commands included in the XObject function library based on Appendices I–O now follows:

A. MIDI input functions 1–3:

1. Open MIDI input device

Syntax: long MIDIInOpen(long Device)

This function opens the MIDI device for input.
Return 0 for success, −1 otherwise.

Delphi Example:

Device:=0;

if MIDIInOpen(Device)<>0 Then
       MessageDlg('Error opening MIDI input device', mtError, mbOk, 0);

2. Reset MIDI input device

Syntax: long MIDIInReset(void)

This function resets MIDI input device.
Return 0 for success, −1 otherwise.

Delphi Example:

if MIDIInRest<>0 Then
       MessageDlg('Error reseting MIDI input device', mtError, mbOk, 0);

3. Close MIDI input device

Syntax: long MIDIInClose(void)

This function turns off MIDI input device.
Return 0 for success, −1 otherwise.

Delphi Example:

if MIDIInClose<>0 Then
       MessageDlg('Error closing MIDI input device', mtError, mbOk, 0);

B. MIDI output functions 4–6:

4. Open MIDI output device

Syntax: long MIDIOutOpen(long Device)

This function opens MIDI output device.
Return 0 if success, −1 otherwise.

Delphi Example:

Device:=0;

if MIDIOutOpen(Device)<>0 Then
       MessageDlg('Error opening MIDI output device', mtError, mbOk, 0);

5. Reset MIDI Output device

Syntax: long MIDIOutReset(void)

This function resets MIDI output device.
Return 0 if success, −1 otherwise.

Delphi Example:

if MIDIOutReset<>0 Then
       MessageDlg('Error reseting MIDI output device', mtError, mbOk, 0);

6. Close MIDI output device

Syntax: long MIDIOutClose(void)

This function close MIDI output device.
Return 0 if success, −1 otherwise.

Delphi Example:

Device:=0;

if MIDIOutClose<>0 Then
       MessageDlg('Error opening MIDI output device', mtError, mbOk, 0);

C. General functions 7–11:

7. New

Syntax: Creator(mNew)

This function creates a new instance of the XObject
The result is 1 if successful, or error code otherwise.

Example:

openxlib "Creator.Dll"
   Creator(mNew)

Creator(mDispose)

See also: Dispose

8. Dispose

Syntax: Creator(mNew)

This function disposes of XObject instance.
The result is1 if successful, or error code otherwise.

Example:

openxlib "Creator.Dll"
  Creator(mNew)
  ...
  Creator(mDispose)

9. Send Message

Syntax: long SendMessage(char*Mess)

This function sends string to toy card.
Return 1 if successful, or error code otherwise.

Delphi Example:
  Mess:='00 01 00 00 00 00 00 05 00
    00 00 01 00 03 00 01 00 00 00';

If SendMessage(Mess)<>1 Then
    MessageDlg('Error opening MIDI output device',
      mtError, mbOk, 0);

10. Check message

Syntax: long CheckMessage(void)

This function returns 0 if no message found from toy card.

Delphi Example:

If CheckMessage Then
    Mess:=GetMessage;

11. Get Toy Message

Syntax: GetToyMessage

This function receives message from toy.
The result is a message.

If during 3 sec there is no message, the result is "Time Out".
Example:

set message=GetToyMessage
  If message="Time Out" Then
    put "No message receiving"
  End If See also: Check for Message D. Toy control functions 12–17:

12. Get Toy Number

Syntax: cha*GetToyNumber(void)
This function returns Toy Number of last receiving message, or "00 00 00 00" if no message was received.

13. Get Sensor Number

Syntax: long GetSensorNumber(void)

This function returns Sensor Number of last receiving message, or 255 if no message was received.

14. Toy Reset

Syntax: long ToyReset(char*ToyNumber)

This function sends a reset string to toy.

Return 0 if successful, or −1 otherwise.

15. Toy Tranceive

Syntax: char*ToyTranceive(char*ToyNumber,char*Mess)

This function sends to toy message and waits 3 sec to acknowledge.
Return "Ack. Ok" if received, or "Time Out" if not.

16. Prepare Toy Talk

Syntax: char*PrepareToyTalk(char*ToyNumber, char*WaveFile)

This function prepares toy card to generate sound using from toy speaker.
After calling this function, WaveFile may be played and heard at toy speaker.
Return "Ack. Ok" if successful, or "Time Out" otherwise.

17. Go To Sleep Mode

Syntax: char*GoSleep(char*ToyNumber)

This function sends to toy the sleep command.
Return "Ack. Ok" if successful, or "Time Out" otherwise.

To use the XObject function library in conjunction with the Director, the following method may be employed.
1) Open Director Version 5.0 program
2) From File Menu, choose New
3) Press the Movie Option
4) Go to Windows menu and press Cast
5) Go to the first Script on the cast
6) On the Window menu choose Script
7) Write the script of the desired game.
8) Repeat from step 5 until all desired script(s) have been written. Press (Ctrl+Alt+P) to run the Application Reference is now made to FIG. 16 which is a simplified flowchart illustration of a preferred method of operation of a computer radio interface (CRI) 110 operative to service an individual computer 100 of FIG. 1A without interfering with other computers or being interfered with by the other computers, each of which is similarly serviced by a similar CRI. Typically, the method of FIG. 16 is implemented in software on the computer 100 of FIG. 1A.

The CRI includes a conventional radio transceiver (260 of FIG. 4) which may, for example, comprise an RY3 GB021 having 40 channels which are divided into 20 pairs of channels. Typically, 16 of the channel pairs are assigned to information communication and the remaining 4 channel pairs are designated as control channels.

In the method of FIG. 16, one of the 4 control channel pairs is selected by the radio interface (step 810) as described in detail below in FIG. 17. The selected control channel pair i is monitored by a first transceiver (step 820) to detect the appearance of a new toy which is signalled by arrival of a toy availability command from the new toy (step 816). When the new toy is detected, an information communication channel pair is selected (step 830) from among the 16 such channel pairs provided over which game program information will be transmitted to the new toy. A preferred method for implementing step 830 is illustrated in self-explanatory flowchart FIG. 18A. The "Locate Computer" command in FIG. 18A (step 1004) is illustrated in the flowchart of FIG. 18B.

The identity of the selected information communication channel pair, also termed herein a "channel pair selection command", is sent over the control channel pair to the new toy (step 840). A game program is then begun (step 850), using the selected information communication channel pair. The control channel pair is then free to receive and act upon a toy availability command received from another toy. Therefore, it is desirable to assign another transceiver to that control channel pair since the current transceiver is now being used to provide communication between the game and the toy.

To assign a further transceiver to the now un-monitored control channel, the transceiver which was formerly monitoring that control channel is marked as busy in a transceiver availability table (step 852). The transceiver availability table is then scanned until an available transceiver, i.e. a transceiver which is not marked as busy, is identified (step 854). This transceiver is then assigned to the control channel i (step 858).

FIG. 17 is a simplified flowchart illustration of a preferred method for implementing "select control channel pair" step 810 of FIG. 16. In FIG. 17, the four control channels are scanned. For each channel pair in which the noise level falls below a certain threshold (step 895), the computer sends an availability interrogation command (step 910) and waits for a predetermined time period, such as 250 ms, for a response (steps 930 and 940). If no other computer responds, i.e. sends back an "availability response command", then the channel pair is deemed vacant. If the channel pair is found to be occupied the next channel is scanned. If none of the four channel pairs are found to be vacant, a "no control channel available" message is returned.

FIG. 19 is a self-explanatory flowchart illustration of a preferred method of operation of the toy control device 130 which is useful in conjunction with the "multi-channel" embodiment of FIGS. 16–18B. i=1, . . . , 4 is an index of the control channels of the system. The toy control device sends a "toy availability command" (step 1160) which is a message advertising the toy's availability, on each control channel i in turn (steps 1140, 1150, 1210), until a control channel is reached which is being monitored by a computer. This becomes apparent when the computer responds (step 1180) by transmitting a "channel pair selection command" which is a message designating the information channel pair over which the toy control device may communicate with the game running on the computer. At this point (step 1190), the toy control device may begin receiving and executing game commands which the computer transmits over the information channel pair designated in the control channel i.

According to a preferred embodiment of the present invention, a computer system is provided, in communication with a remote game server, as shown in FIG. 20. The remote game server 1250 is operative to serve to the computer 100 at least a portion of at least one toy-operating game, which operates one or more toys 1260. Optionally, an entire game may be downloaded from the remote game server 1250. However, alternatively, a new toy action script or new text files may be downloaded from the remote game server 1250 whereas the remaining components of a particular game may already be present in the memory of computer 100.

Downloading from the remote game server 1250 to the computer 100 may take place either off-line, before the game begins, or on-line, in the course of the game. Alternatively, a first portion of the game may be received off-line whereas an additional portion of the game is received on-line.

The communication between the remote game server 1250 and the computer 100 may be based on any suitable technology such as but not limited to ISDN; X.25; Frame-Relay; and Internet.

An advantage of the embodiment of FIG. 20 is that a very simple computerized device may be provided locally, i.e. adjacent to the toy, because all "intelligence" may be provided from a remote source. In particular, the computerized device may be less sophisticated than a personal computer, may lack a display monitor of its own, and may, for example, comprise a network computer 1270.

FIG. 21 is a simplified flowchart illustration of the operation of the computer 100 or of the network computer 1260 of FIG. 20, when operating in conjunction with the remote server 1250.

FIG. 22 is a simplified flowchart illustration of the operation of the remote game server 1250 of FIG. 20.

FIG. 23 is a semi-pictorial semi-block diagram illustration of a wireless computer controlled toy system including a toy 1500 having a toy control device 1504, a computer 1510 communicating with the toy control device 1504 by means of a computer-radio interface 1514 and a proximity detection subsystem operative to detect proximity between the toy and the computer. The proximity detection subsystem may for example include a pair of ultrasound transducers 1520 and 1530 associated with the toy and computer respectively. The toy's ultrasound transducer 1520 typically broadcasts ultrasonic signals which the computer's ultrasound transducer 1530 detects if the computer and toy are within ultrasonic communication range, e.g. are in the same room.

FIGS. 24A–24E, taken together, form a detailed electronic schematic diagram of a multi-channel implementation of the computer radio interface 110 of FIG. 3 which is similar to the detailed electronic schematic diagrams of FIGS. 5A–5D except for being multi-channel, therefore capable of supporting full duplex applications, rather than single-channel.

FIGS. 25A–25F, taken together, form a detailed schematic illustration of a computer radio interface which connects to a serial port of a computer rather than to the soundboard of the computer.

FIGS. 26A–26D, taken together, form a detailed schematic illustration of a computer radio interface which connects to a parallel port of a computer rather than to the soundboard of the computer.

FIGS. 27A–27J are preferred self-explanatory flowchart illustrations of a preferred radio coding technique, based on the Manchester coding, which is an alternative to the radio coding technique described above with reference to FIGS. 8E, 8G–8M and 10A–C.

FIGS. 28A–28K, taken together, form a detailed electronic schematic diagram of the multi-port multi-channel computer radio interface sub-unit of FIG. 13.

FIGS. 29A–29I, taken together, form a detailed electronic schematic diagram of the multi-port multi-channel computer radio interface sub-unit of FIG. 14.

FIG. 30 illustrates a further embodiment of the present invention which includes a combination of a Computer Radio Interface (CRI) and a Toy Control Device (TCD), 1610.

The combined unit 1610 controls a toy 1620 which is connected to the computer 100 by a device, such as a cable, and communicates with other toys, 120, by means such as radio communication, using the computer radio interface 110. The toy 1620 is operated in a similar manner as the toy device 120.

FIG. 31 illustrates a simplified block diagram of the combined unit 1610.

FIGS. 32A, 32B and 32C taken together form a simplified schematic diagram of the EP900 EPLD chip (U9) of FIG. 28H. The code to program the EPLD chip for this schematic diagram preferably uses the programming package "Max Plus II Ver. 6.2" available from Altera Corporation, 3525 Monroe Street, Santa Clara, Calif. 5051, USA.

FIG. 33 is a semi-pictorial semi-block diagram illustration of a computerized networked advertisement system constructed and operative in accordance with a preferred embodiment of the present invention.

As shown, a computerized toy or doll 300 is computer-controlled, preferably via a wireless connection between the toy 300 and a computer or workstation 310. The computer or workstation 310 is associated, via the Internet or another communications network 320, with an advertisement server 330.

FIG. 34 is a data transmission diagram describing data transmissions between various network service providers which support the advertisement system of FIG. 33 according to one preferred embodiment of the present invention.

FIG. 35 is a semi-pictorial semi-block diagram illustration of a computerized networked advertisement system constructed and operative in accordance with a preferred embodiment of the present invention in which a virtual toy conveys advertisement bulletins to a user of the toy.

FIG. 36 is a simplified flowchart illustration of a preferred mode of operation for the user PC of FIG. 34.

FIG. 37 is a simplified flowchart illustration of a preferred mode of operation for the game software server of FIG. 34.

FIG. 38 is a simplified flowchart illustration of a preferred mode of operation for the marketer/advertisement provider of FIG. 34.

FIG. 39 is a simplified flowchart illustration of a preferred mode of operation for the software maintenance center of FIG. 34.

An overview of FIGS. 40–58, which describe a Living Object Internet Service System (LOIS) constructed and operative in accordance with a preferred embodiment of the present invention, is as follows:

FIG. 56

Sites and Computing Devices: shows what computing devices that participate in LOIS

FIG. 57

Sites and Top Level Data Flow: describes the top level data flow between LOIS sites Sites and Actors
================

There is a diagram for each site that presents the LOIS actors at that site, their responsibilities, and their collaborations.

FIG. 40

At Home

FIG. 41

At Creator HQ

FIG. 42

At Advertisers HQ

FIG. 43

At Toy Maker HQ

Sites and Subsystems
====================

There is a diagram for each site that presents the subsystems running there, their responsibilities, and the computing devices on which they run.

FIG. 44

At Home

FIG. 45

At Creator HQ

FIG. 46

At Advertisers HQ

FIG. 47

At Toy Maker HQ 1: presents the Living Object Server

FIG. 48

At Toy Maker HQ 2: presents other LOIS subsystems running at the Toy Maker headquarters Subsystems and Data Flow
========================

There is a diagram for each site that presents the subsystems running there, and the data flow between them.

FIG. 49

At Home

FIG. 50

At Advertisers HQ

FIG. 51

At Toy Maker HQ

Collaboration Diagrams
======================

There is a diagram for each of the major LOIS dynamics, showing how it accomplished by subsystems collaborating.

FIG. 58

Client Update: the collaborations that accomplish the update of a client installation, with a new Behavior

FIG. 52

Playing a Game: describes the collaborations involved in the entire process from authoring to deployment State Diagrams
==============

There are diagrams for each of the major subsystems in LOIS, showing the inner state transition network of the subsystem.

FIG. 53

Client Logger

FIG. 54

Push Client

Figure 55:
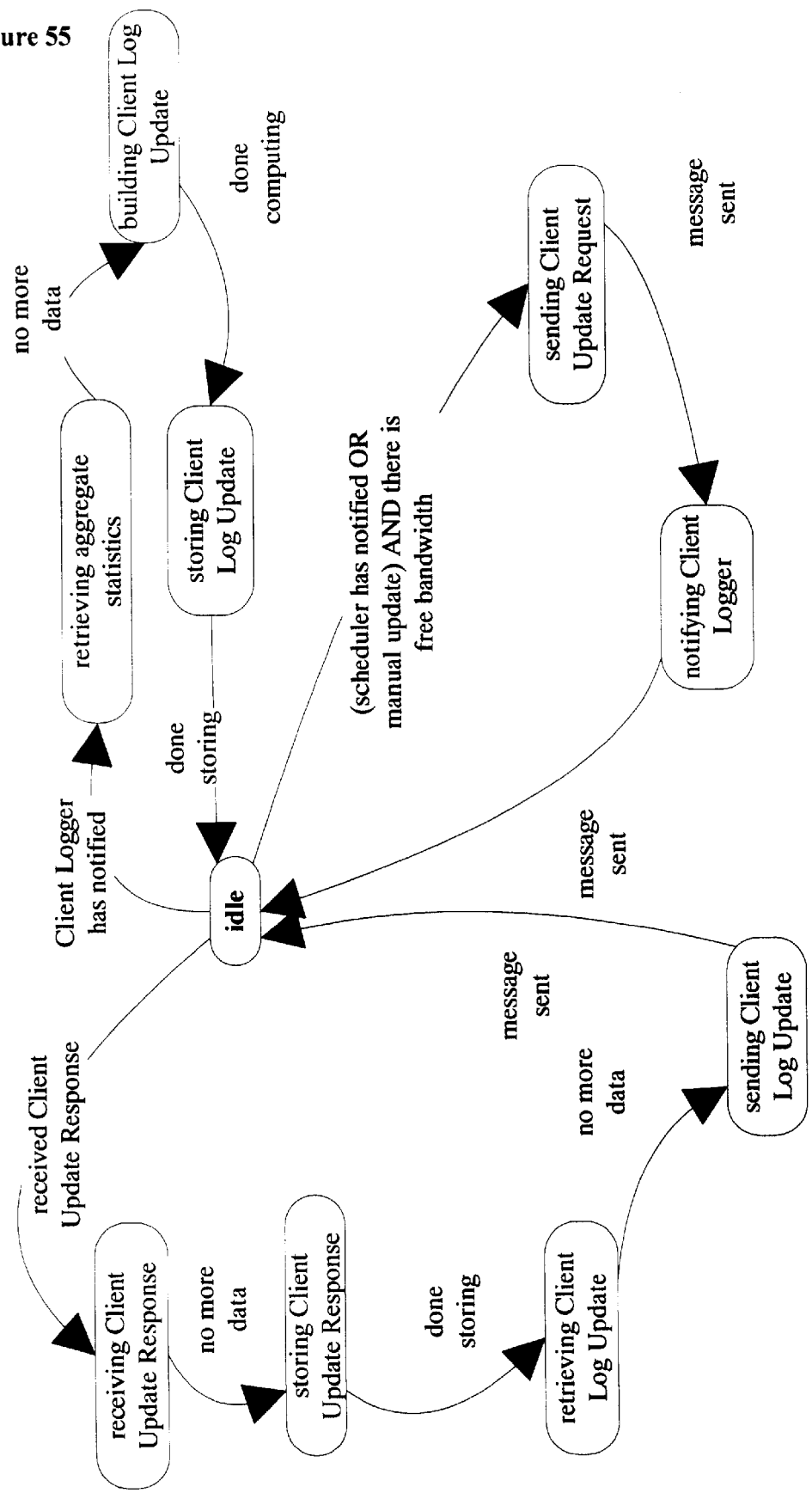

FIG. 55
   Living Object Control Software
---

Figure 56:
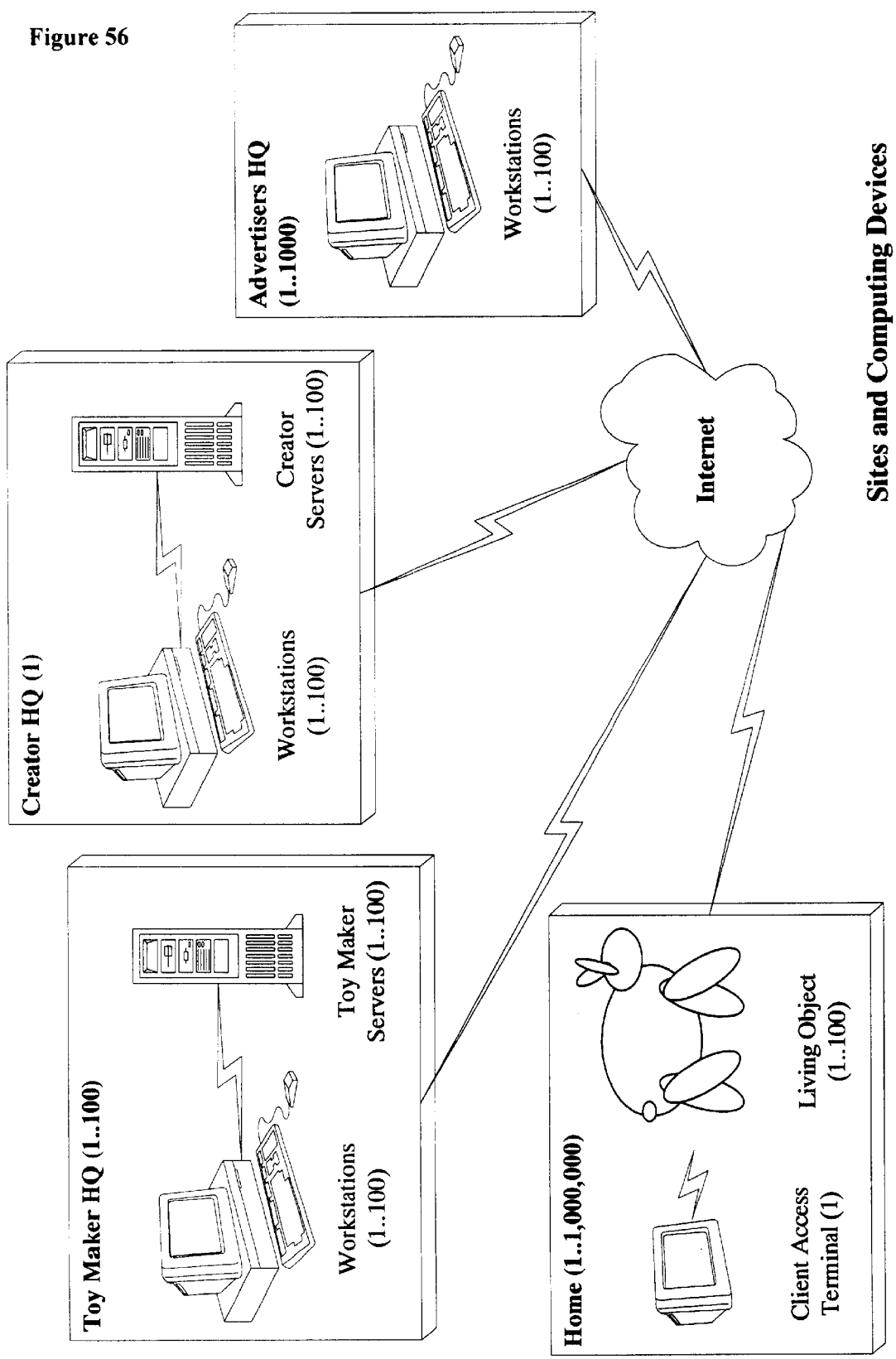

FIG. 56: Sites and Computing Devices
=====================================
   The diagram shows the sites that participate in LOIS, and the computing devices running LOIS software at these sites.
Notation
--------
   1. A 3-D block is a site. A site is defined as the aggregate of all subsystems owned by one organization, or home. The block is labeled with the name of the site and its cardinality.
   2. Lightning connectors are communication links.
   3. There are three types of computing devices inside the sites: a server, a workstation, and a Living Object.
Elements
--------
   1. Home: LOIS can support up to a million Client Installations.
   Each client installation features at least one Living Object, and a Client Access Terminal. Initially the only possible computing device is a Win32 PC. In the future Mac, Java, and other platforms will be supported.
   2. Toy Maker HQ: Up to a 100 Toy Makers can coexist in the initial implementation of LOIS. Each Toy Maker site features Staff Workstations and Toy Maker Servers.
   3. Advertisers HQ: Up to a 1000 Advertisers are supported in the initial implementation of LOIS. Each site features a Staff Workstation.
   4. Creator HQ: The Creator site consists of servers and Staff Workstations. There is only one Creator site. "Creator" is a name used for convenience to denote a supplier of living objects technology which may, for example, provide maintenance service for other HQs.
---

Figure 57:
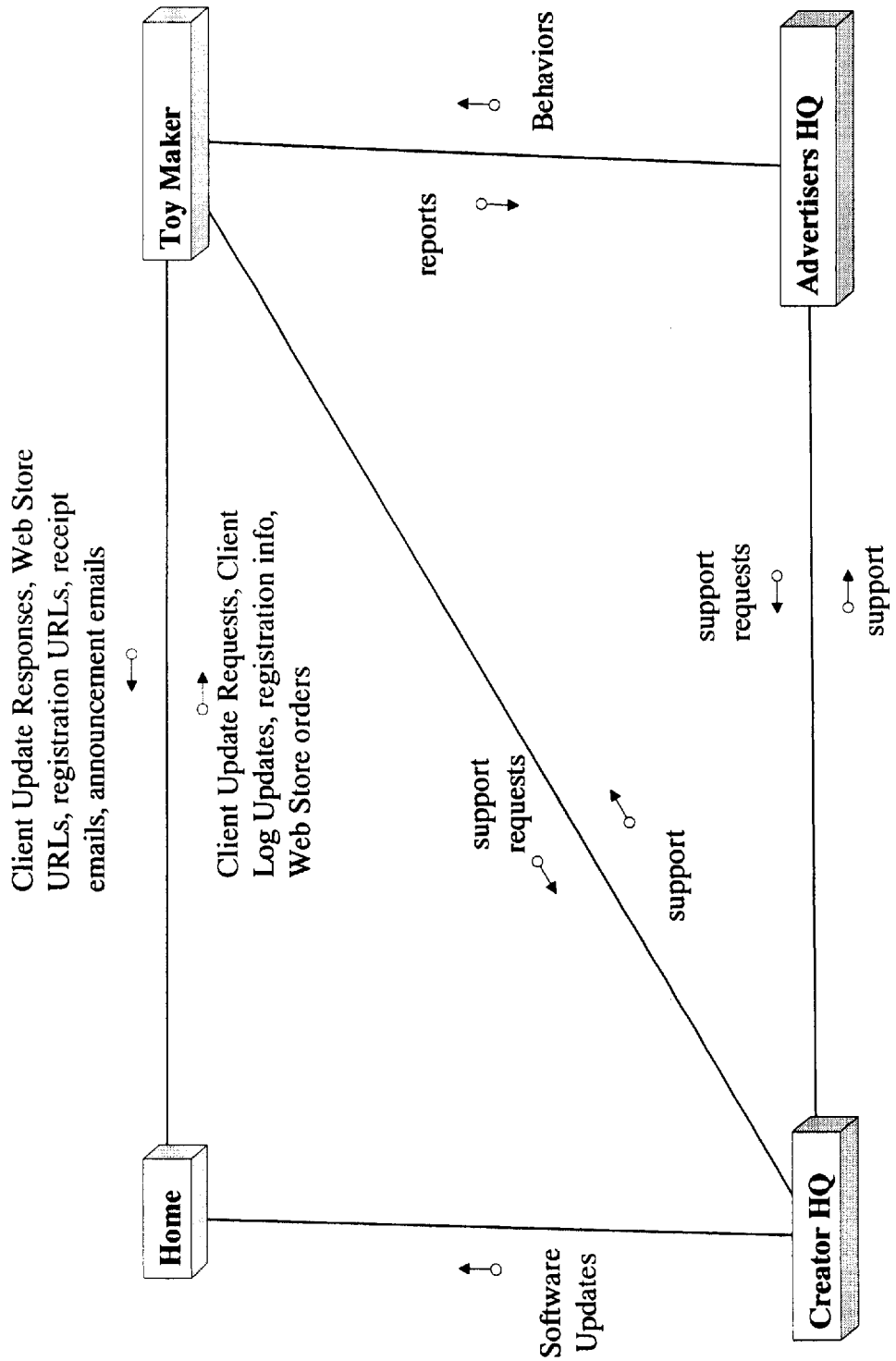

FIG. 57: Sites and Top Level Data Flow
=====================================
   The diagram shows the sites that participate in LOIS, and the computing devices running LOIS software at these sites.
Notation
--------
   1. A 3-D block is a site labeled with the site name.
   2. A line connector indicates communication between the two connected sites.
   3. The circle arrow elements represents the direction of the data flow. The attached text categorizes the data flow.
Connections
-----------
   1. Toy Maker=>Home
   Client Update Responses: these are the Behaviors that the Toy Maker Push Server returns in response to a Client Update Response.Web Shop URLs: these are the URLs the Toy Maker Web Store publishes. This includes catalog pages, search pages, purchase pages, and billing pages.
   registration URLs: these are the URLs the Toy Maker Registration Service publishes as forms to accept/modify registration info from users.
   receipt emails: emails from the Toy Maker that is receipt for online purchases.
   announcement emails: emails from the Toy Maker with announcements that might interest Living Object owners.
   2. Home=>Toy Maker HQ
   Client Update Requests: these are requests sent according to the Push Client schedule. They contain a unique client id.
   Client Log Updates: these are usage reports collected (and filtered/computed) on the client side by the Client Logger, and sent to the Profiling Service.
   registration info: this is the info collected by the registration forms. It is sent to the Registration Service at the Toy Maker site, from the web browser at the Client Installation.
   Web Store orders: order sent through the web for specific Behavior Subscriptions.
   3. Creator HQ=>Home
   Software Updates: these are the latest version of LOIS client software. It is pushed and installed automatically.
   4. Advertiser HQ=>Toy Maker HQ
   Behaviors: these are Advertisement Behaviors authored on the Advertiser staff workstations, and uploaded to the Toy Maker Server.
   5. Toy Maker HQ=>Advertiser HQ
   reports: that are used by the advertiser to better target users.
   6. Creator=>Advertiser/Toy Maker HQ
   Support requests/support: Creator provides online technical and end user support.
---
Sites and Actors
FIGS. 40–42: At Home, At Advertisers HQ, At Creator HQ
   These diagrams show the actors at the LOIS sites that participate in LOIS dynamics.
Notation
--------
   1. A 2-D block is an actor. It may represent several actual people. The block is labeled with the role name of the actor. The responsibilities list presents the LOIS dynamics where the actor participates. The collaborations list presents collaborating actors, and their relationships.
---

Figure 43:
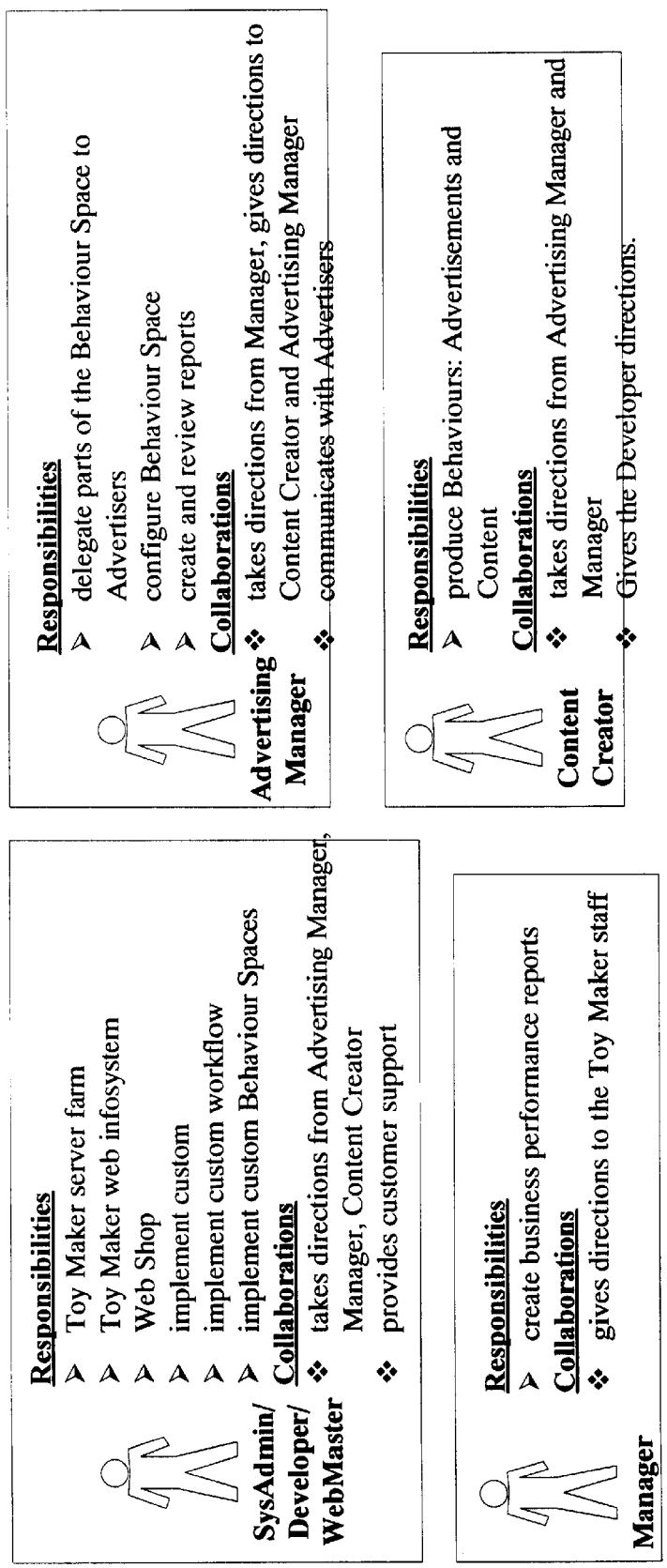

Sites and Actors
FIG. 43: At Toy Makers HQ
=============================
   The diagram shows the members of the Toy Maker organization that participate in LOIS dynamics.
Notation
--------
   1. A 2-D block is an actor. It may represent several actual people. The block is labeled with the role name of the actor. The responsibilities list presents the LOIS dynamics where the actor participates. The collaborations list presents collaborating actors, and their relationships.
Elements
--------
   1. SysAdmin/Developer/WebMaster: The Toy Maker technical personnel. No other actors at the Toy Maker site are required to have technical skills. The exact skills required depend on: The type of Behaviors produced at the Toy Maker (regular/complex). Complex Behaviors require custom programming, and knowledge of the LOIS API. Most Behaviors can be created by non-technical Content Creators.
   The nature of the Behavior Space required by the Toy Maker (regular/complex). Complex mappings between profiles/external data, and Behaviors, require custom programming, and knowledge of the LOIS API. Most of the Behavior Spaces that a Toy Maker will require, can be created by non-technical Advertising Managers.
   The number of Client Installations subscribed to the Toy Maker (100,000 s/millions). The higher the load on the Toy Maker servers, the harder it is to manage them and guarantee clients the performance they demand. Toy Makers with millions of subscribers will definitely require a skilled system administrator, if only for their web infosystem.
   The level of workflow automation required between Advertisement Managers, Content Creators, and Managers (regular/complex). This includes workflow automation for the intranet, as well as for the Toy Maker extranet, communicating with Advertisers. Complex automation requires custom programming, and knowledge of the LOIS API. Simple workflow can be configured by any of the non-technical members of the Toy Maker staff.

The requirements of the Toy Maker web infosystem/Web Store (regular/complex). Complex Web Stores, linked to the Toy Maker main infosystem, require custom programming, and knowledge of the third party Commerce Software. Most Web Stores can be configured by any of the non-technical members of the Toy Maker staff.

The main responsibility of the SysAdmin is keeping the Toy Maker servers running. The Developer helps the Content Creator in creating complex Behaviors and web infosystem components, helps the Advertising Manager in creating complex Behavior Spaces, and helps everyone in creating complex workflow automations. The WebMaster is responsible for the web infosystem.

2. Content Creator: Creates Behaviors using the Behavior Designer. The Content Creator might also help the WebMaster in preparing a web infosystem that will convince parents to buy Behavior Subscriptions.

3. Advertising Manager: Is responsible for getting more Behavior Subscriptions sold, and for selling parts of the Behavior Space to Advertisers. Also responsible usage and profile data reports.

4. Manager: Manages the operation where Content Behavior Subscriptions are sold to users, and Advertisement Behaviors are pushed to users. Interacts mostly with reporting facilities in LOIS.

Sites and Subsystems
FIG. 44: At Home
=================

The diagram shows LOIS software subsystems, and the computing devices they run on, at the Client Installation.
Notation
--------

1. A 2-D block is a software subsystem. It shows the subsystem name, and a list of its responsibilities. Software subsystems can nest. The responsibilities of a container subsystem are defined all the responsibilities assumed by contained subsystems.

2. Lightning connections represent a communication link between computing devices.

3. Directed connections are labeled with their stereotype.
Elements
--------

1. Living Object: An interactive toy controlled by the LOCS. Communicates through radio link with Client Access Terminal.

2. Client Access Terminal: A personal/network computer running the Living Object Client. Communicates through radio with Living Object.

3. Living Object Client: Defined as the subsystem that includes all software running on a Client Access Terminal: the Client Logger, the LOCS, and the Push Client.

4. Client Logger: A software package which collects usage data from the LOCS, passes it through client side filters, and sends it to the Profiling Service, via the Push Client. It exists to facilitate client side filtering of usage data. For example: instead of sending 100 scores of a 100 vocabulary drills, the Client Logger computes averages, and these are sent to the Toy Maker Profiling Service.

5. Living Object Control Software: (LOCS) The software package which controls the Living Object. It translates Behavior data submitted from the Push Client, into interactive commands which run on the Living Object.

6. Push Client: A third party software package, customized by Creator for LOIS. It provides the client side of the push layer of LOIS.

7. Web Browser: A third party software package. It is used as a client for registration/billing, and for the Web Store. This allows us to simplify the client.
Connections
-----------

1. The Living Object Client runs on the Client Access Terminal.

Figure 45:
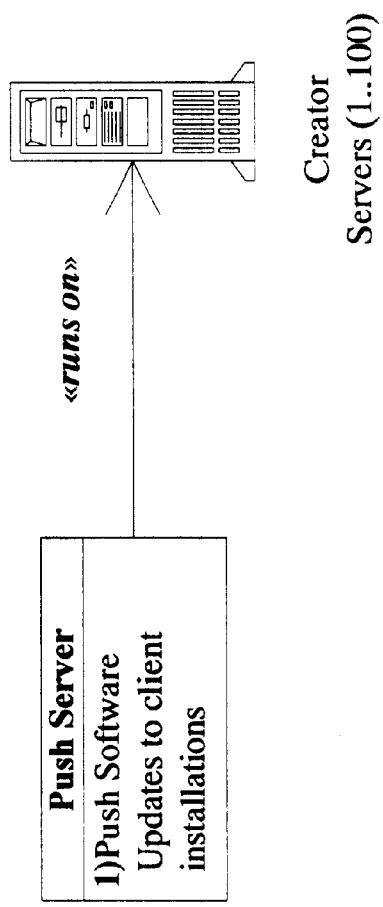
Figure 46:
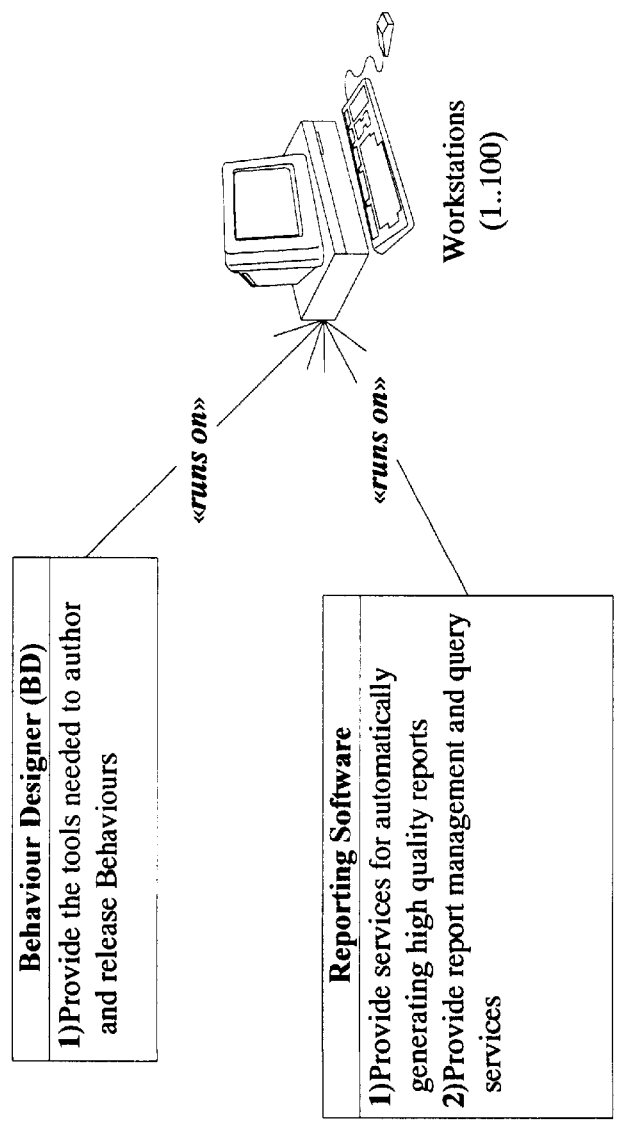

Sites and Subsystems
FIG. 45: At Creator HQ

The diagram shows LOIS software subsystems, and the computing devices they run on, at the Creator headquarters.
Notation
--------

1. A 2-D block is a software subsystem. It shows the subsystem name, and a list of its responsibilities. Software subsystems can nest. The responsibilities of a container subsystem are defined all the responsibilities assumed by contained subsystems.

2. Lightning connections represent a communication link between computing devices.

3. Directed connections are labeled with their stereotype.
Elements

1. Creator Server: The server that runs LOIS software at the Creator site.

2. Push Server: A software the provides the server side of the LOIS push layer.
Connections
-----------

1. The Push Server runs on the Creator Server.
Sites and Subsystems
FIG. 46: At Advertisers HQ The diagram shows LOIS software subsystems, and the computing devices they run on, at the Advertisers headquarters.
Notation
--------

1. A 2-D block is a software subsystem. It shows the subsystem name, and a list of its responsibilities. Software subsystems can nest. The responsibilities of a container subsystem are defined all the responsibilities assumed by contained subsystems.

2. Lightning connections represent a communication link between computing devices.

3. Directed connections are labeled with their stereotype.
Elements
--------

1. Workstation: The workstation that runs LOIS software at the Advertisers site.

2. Behavior Designer: A friendly application for authoring complex Behaviors. The output of working with this software, is an authored Behavior.

3. Reporting Software: A subsystem that helps the Advertisers understand the who is using LOIS, and how they are using it.
Connections
-----------

1. The Behavior Designer runs on the Workstation.
2. The Reporting Software runs on the Workstation.

Figure 47:
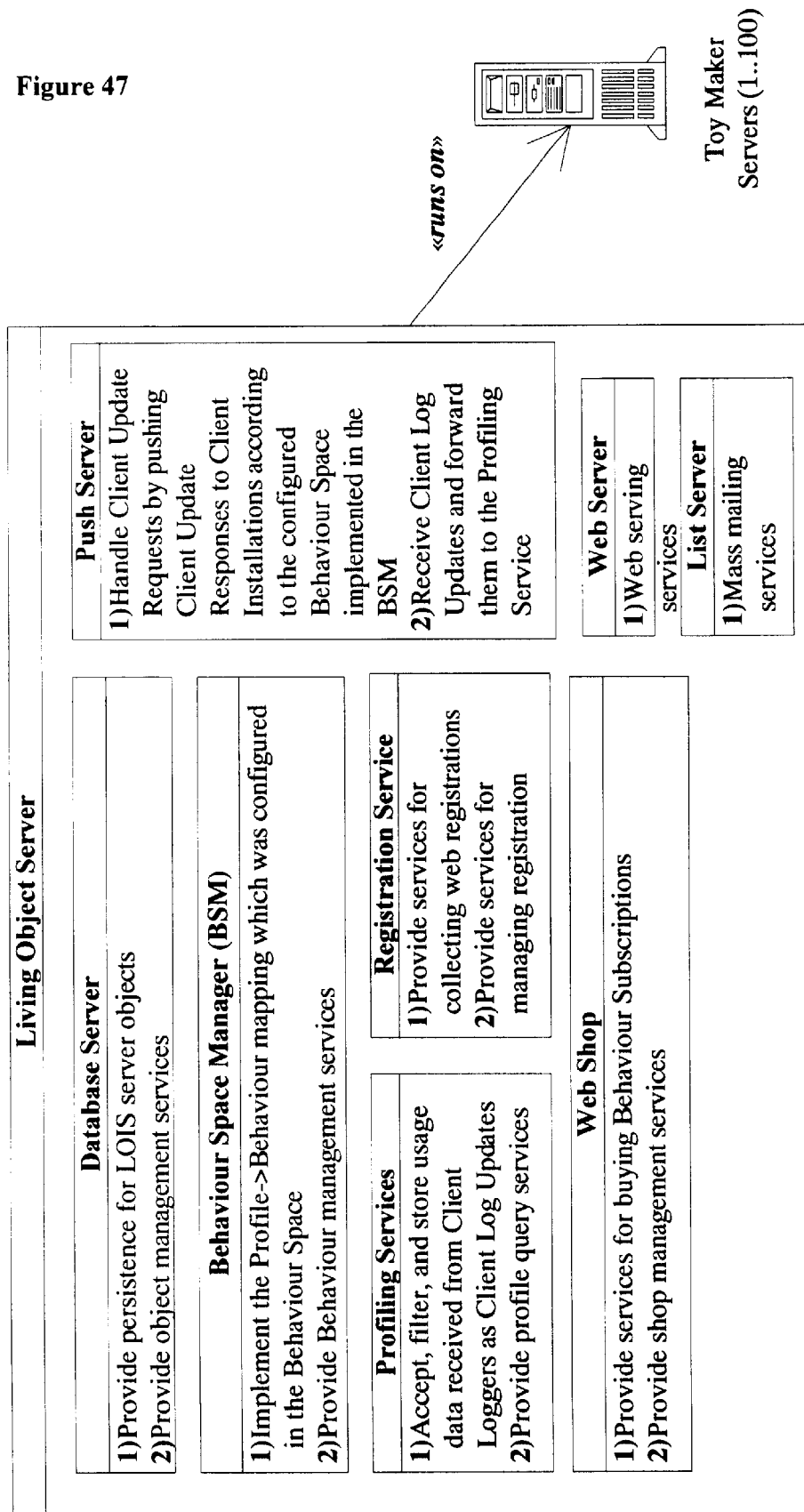

Sites and Subsystems
FIG. 47: At Toy Maker HQ 1

The diagram shows LOIS software subsystems, and the computing devices they run on, at the Toy Maker headquarters. In this diagram we focus on the elements of the Living Object Server.

Notation
--------

1. A 2-D block is a software subsystem. It shows the subsystem name, and a list of its responsibilities. Software subsystems can nest. The responsibilities of a container subsystem are defined all the responsibilities assumed by contained subsystems.

2. Lightning connections represent a communication link between computing devices.

3. Directed connections are labeled with their stereotype.

Elements
--------

1. Toy Maker Servers: A computing device/s that runs the Living Object Server software.

2. Living Object Server: The subsystem that includes the Push Server, database server, Web Shop, Registration Service, Behavior Space Manager, and Profiling Service, web server, and list server 3. Database server: All subsystems use the ODBMS libraries for handling persistent objects. Most important objects in LOIS are persistent in the database server. Because we are working with ODMG-93 there is no database code such as embedded SQL. We do not mention the database server anymore, since the ODMG mappings allow us to treat it as transparent.

4. Behavior Space Manager: A software subsystem that has two roles. For design-time, it provides services for effectively managing large Behavior Spaces, uploading Behaviors, query and reporting services, etc. For run-time, it provides a function that maps any user ID to a Behavior.

5. Living Object Control Software: (LOCS) The software package which controls the Living Object. It translates Behavior data submitted from the Push Client, into interactive commands which run on the Living Object.

6. Push Client: A third party software package, customized by Creator for LOIS. It provides the client side of the push layer of LOIS.

7. Web Browser: A third party software package. It is used as a client for registration/billing, and for the Web Store. This allows us to simplify the client.

Connections
-----------

1. The Living Object Client runs on the Client Access Terminal.

----------------------------------------------------------------

Sites and Subsystems

Figure 48:
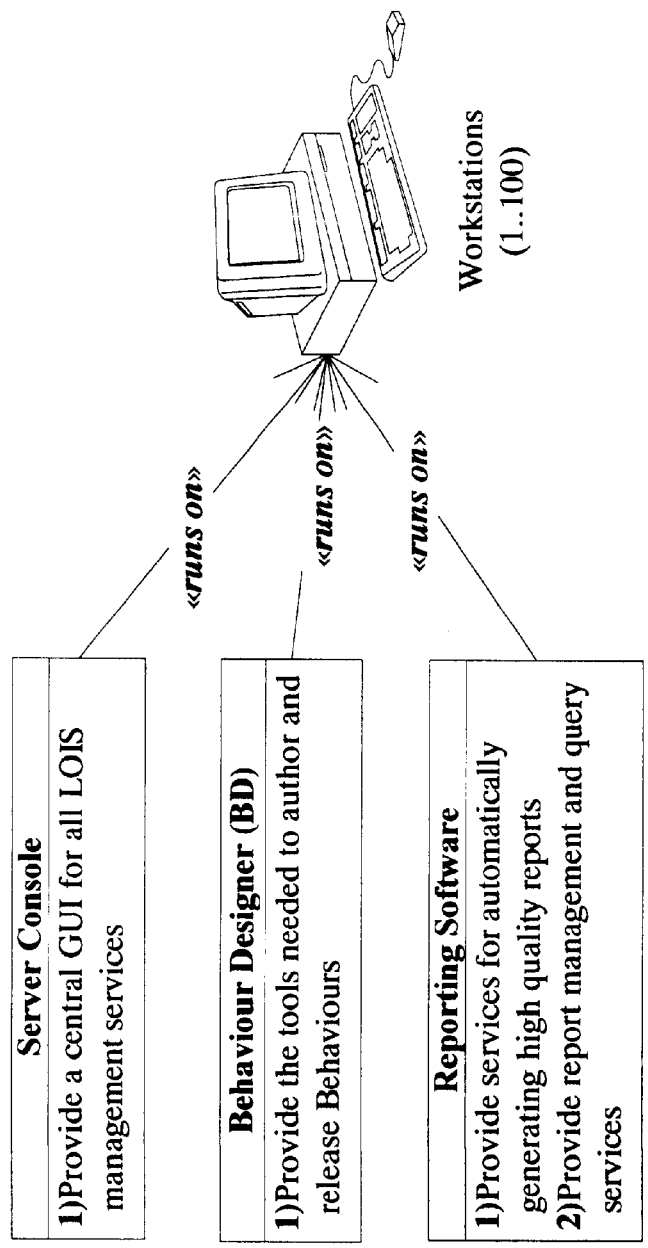
Figure 49:
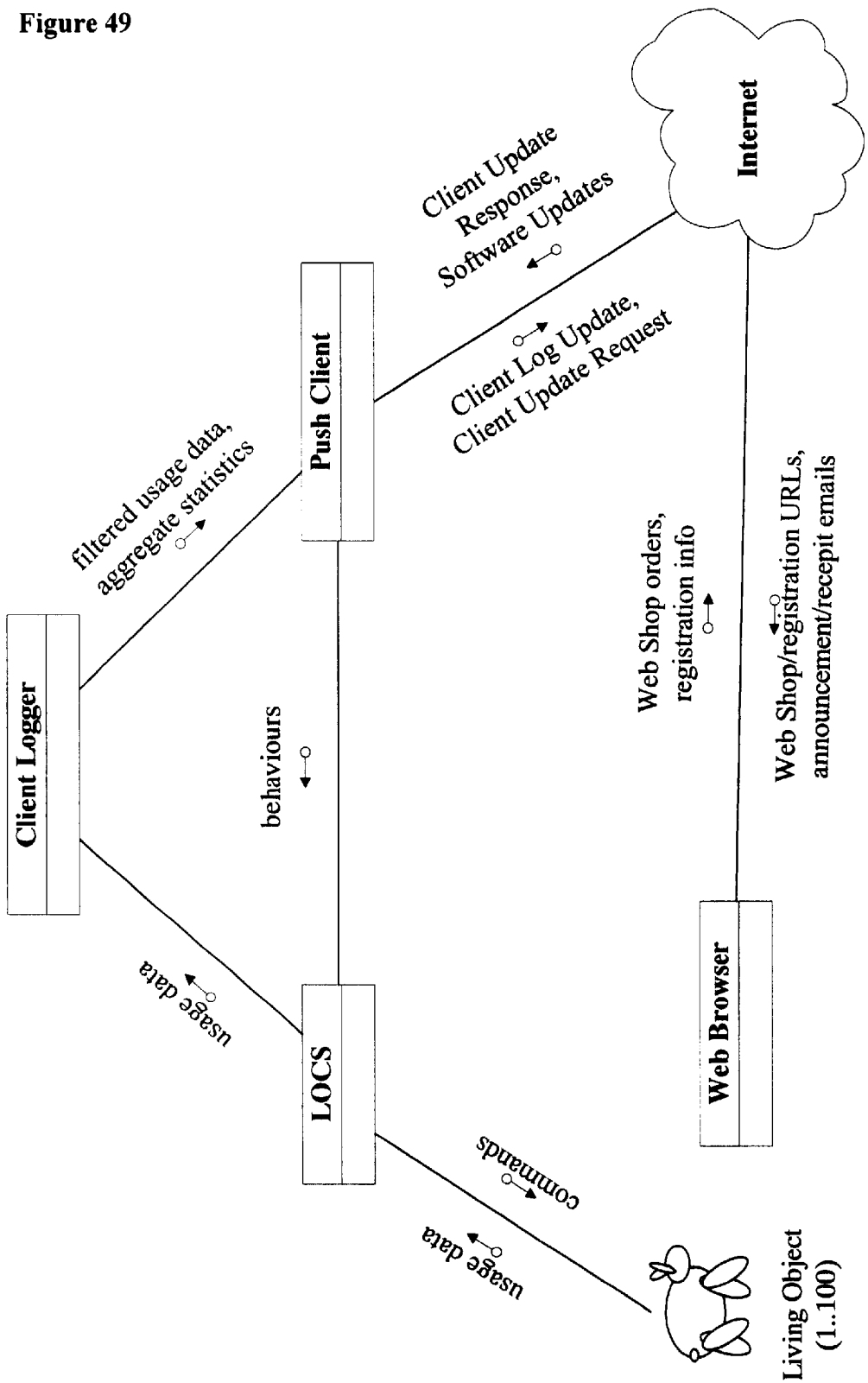

FIG. 48: At Toy Maker HQ 2

The diagram shows LOIS software subsystems, and the computing devices they run on, at the Toy Maker headquarters. In this diagram we focus on the subsystems not in the Living Object Server.

Notation

1. A 2-D block is a software subsystem. It shows the subsystem name, and a list of its responsibilities. Software subsystems can nest. The responsibilities of a container subsystem are defined all the responsibilities assumed by contained subsystems.

2. Lightning connections represent a communication link between computing devices.

3. Directed connections are labeled with their stereotype.

Elements
--------

1. Workstation: A workstation that runs LOIS software.

2. Reporting Software: A subsystem that helps the Toy Maker understand the who is using LOIS, and how they are using it. It works against all existing information, to create customizable reports. It has the capability to create automatic reports, on schedule.

3. Behavior Designer: A friendly application for authoring complex Behaviors. The output of working with this software, is an authored Behavior.

4. Server Console: The main interface to LOIS. Its main features are:

Manage Behaviors and configure the Behavior Space Manager

Configure the Web Shop

Configure the Profiling Service

Configure the Registration Service

Manage Users, registration, billing

Configure automation for the Reporting Software

Initiate sending of announcement emails

Connections
-----------

1. All subsystems run on the Workstation.

----------------------------------------------------------------

Subsystems and Data Flow

FIG. 49: At Home

The diagram shows the data flow between the subsystems at the ClientInstallation.

Notation
--------

1. A 2-D block is a software subsystem. It shows the subsystem name.

2. Connections imply communications between the subsystems/devices.

3. Data flow symbols show the direction, and a list of the message classes that flow in the link. Nothing is implied about the order of the data flow.

Connections
-----------

1. LOCS<=>Living Object: The LOCS translates Behaviors into commands that can be run on the Living Object. All usage data is sent from the Living Object to the LOCS.

2. LOCS=>Client Logger: Behaviors may contain code that passes specific usage data to the Client Logger.

3. Push Client=>LOCS: New Behaviors are passed to the LOCS.

4. Client Logger=>Push Client: Usage data is filtered by the Client Logger, and only filtered data aggregate statistics are passed to the Push Client.

5. Push Client<=>Internet: The Push Client passes Client Update Requests to the Internet, signifying a Behavior update is requested. It also passes Client Log Updates, that contain data prepared by the Client Logger. From the Internet the Push Client receives Client Update Responses (Behaviors), and software updates that it installs.

6. Web Browser<=>Internet: The web browser is used to browse the Web Store, purchase Behavior Subscriptions, and for LOIS email.

----------------------------------------------------------------

Subsystems and Data Flow

Figure 50:
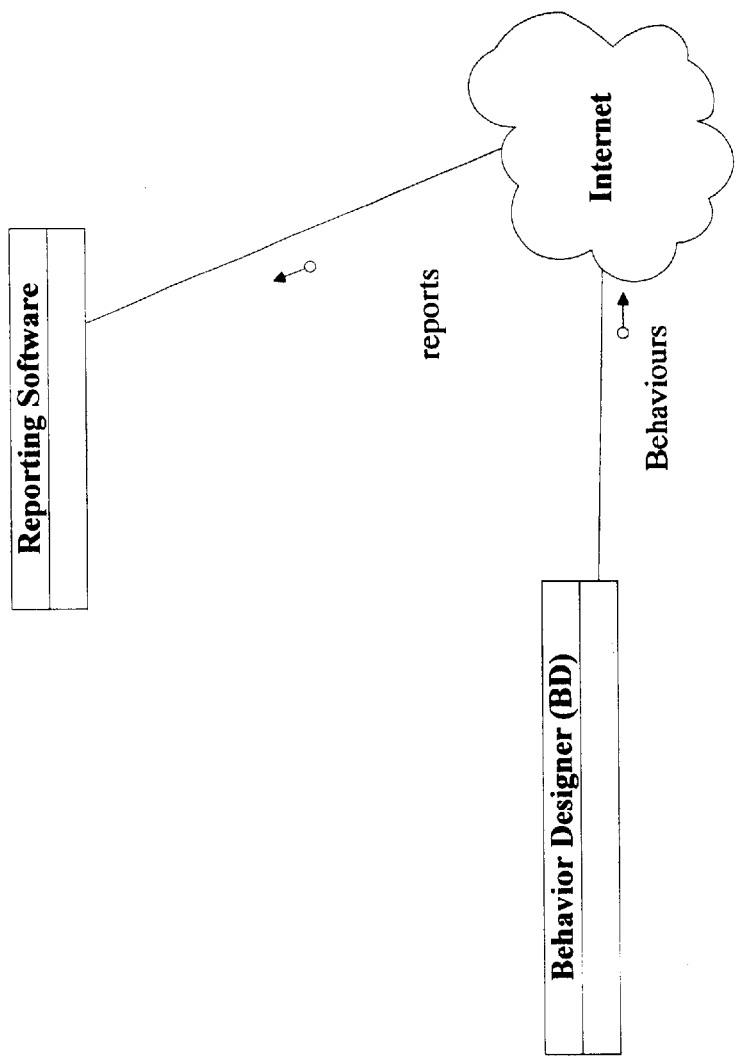

FIG. 50: At Advertisers HQ

The diagram shows the data flow between the subsystems at the Advertisers headquarters.

Notation

1. A 2-D block is a software subsystem. It shows the subsystem name.

2. Connections imply communications between the subsystems/devices.

3. Data flow symbols show the direction, and a list of the message classes that flow in the link. Nothing is implied about the order of the data flow.

Connections

1. Internet=>Reporting Software: Usage reports are received from the Toy Maker, and are used to create campaigns.

2. Behavior Designer=>Internet: Advertisement Behaviors are uploaded to the Toy Maker Server, where they will be pushed to Client Installations.

---

Subsystems and Data Flow

Figure 51:
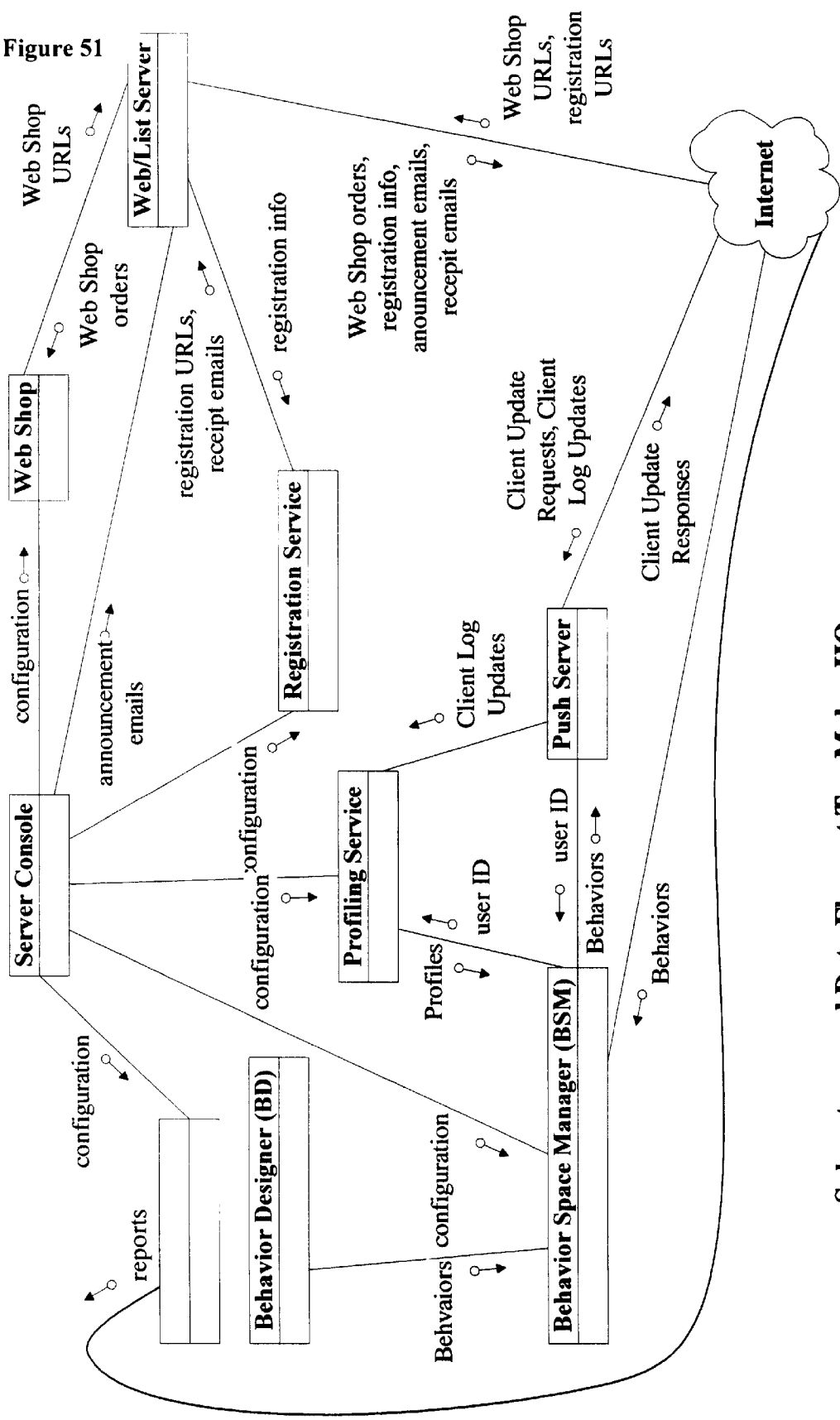

FIG. 51: At Toy Maker HQ

The diagram shows the data flow between the subsystems at the ToyMaker headquarters.

Notation

1. A 2-D block is a software subsystem. It shows the subsystem name.

2. Connections imply communications between the subsystems/devices.

3. Data flow symbols show the direction, and a list of the message classes that flow in the link. Nothing is implied about the order of the data flow.

Connections

1. Server Console=>Reporting Software: The Server Console applies configuration to the Reporting Software.

2. Server Console=>Profiling Service: The Server Console applies configuration to the Profiling Service.

3. Server Console=>Registration Service: The Server Console applies configuration to the Registration Service.

4. Server Console=>Web Store: The Server Console applies configuration to the Web Store.

5. Server Console=>Behavior Space Manager: The Server Console applies configuration to the Behavior Space Manager.

6. Behavior Designer=>Behavior Space Manager: Behaviors are authored and passed to the BSM, where they are added to all available Behaviors.

7. Server Console=>Web/List Server: announcement emails are authored/uploaded and edited in the Server Console, then passed to the List Server for mass mailing.

8. Behavior Space Manager<=>Profiling Service: The Behavior Space Manager performs queries on profiling data using user IDs as keys.

9. Behavior Space Manager<=>Push Server: The Push Server passes user IDs of Client Update Requests to the BSM. It maps them to Behaviors that are returned to the Push Server.

10. Push Server=>Profiling Service: Client Log Updates from Client Loggers are sent to the Profiling Service from the Push Server.

11. Internet=>Behavior Space Manager: Behaviors authored at the Advertisers site are sent to the BSM, where they are added to all available Behaviors, and any special rules are applied.

12. Internet<=>Push Server: The Push Server sends out Behaviors, and receives requests, and usage data.

13. Web Shop<=>Web/List Server: Web Shop URLs are produced on the fly by the Web Shop. It also accepts orders from the web server.

14. Web/List Server<=>Registration Service: This data flow is required for registration services.

15. Web/List Server<=>Internet: This data flow is required for registration services, Web Store services, and email communications.

---

Collaboration Diagrams

Figure 58:
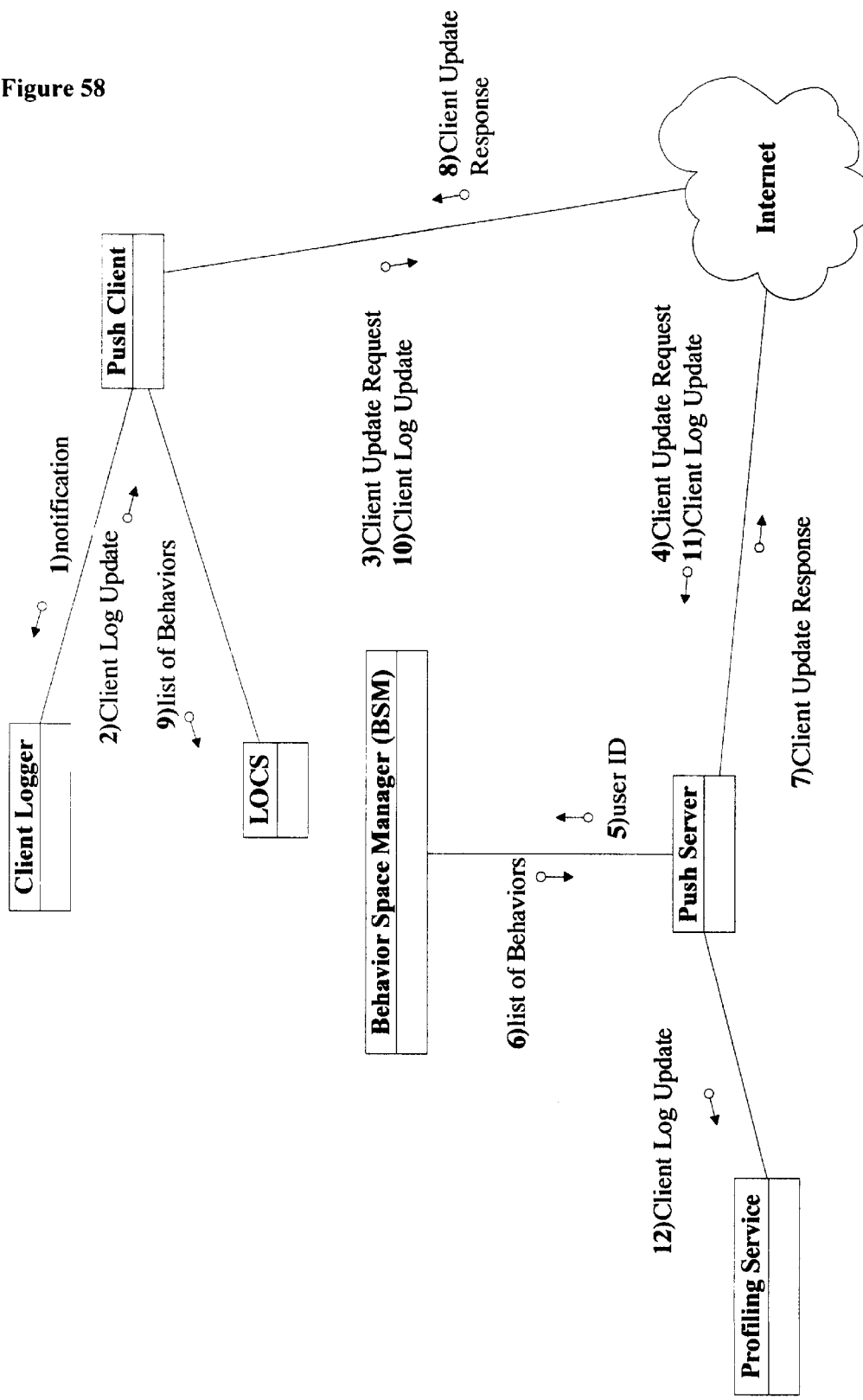

FIG. 58: Client Update

The diagram shows the collaborations involved in a client update.

Notation

1. A 2-D block is a software subsystem. It shows the subsystem name.

2. Connections imply communications between the subsystems/devices.

3. Data flow symbols show the direction, and a list of the message classes that flow in the link. Each message shows its sequential order in the diagram.

Dynamics

1. The Push Client notifies the Client Logger that a client update is about to take place. It does this on schedule, and only when 'bandwidth niceness' permits.

2. The Client Logger passes the usage data to the Push Client. This is asynchronous to the rest of the process, but must happen during the client update.

3. The Push Client sends Client Update Request with the user ID.

4. The Client Update Request is received by the Push Server.

5. The Push Server requests a mapping from the BSM by passing it a user ID.

6. The BSM replies with a list of Behaviors that are fitting for the Client Installation.

7. The Behaviors are packaged into a Client Update Response and sent to the Push Client.

8. The Push Client receives the Client Update Response.

9. The Behaviors are sent to the LOCS after being extracted from the Client Update Response.

10. Asynchronous to the rest of the process, but during the Client Update, a Client Log Update is sent from the Push Client, from the usage data sent by the Client Logger.

11. Push Server receives the Client Log Update.

12. Client Log Update is sent to the Profiling Service.

---

Collaboration Diagrams

Figure 52:
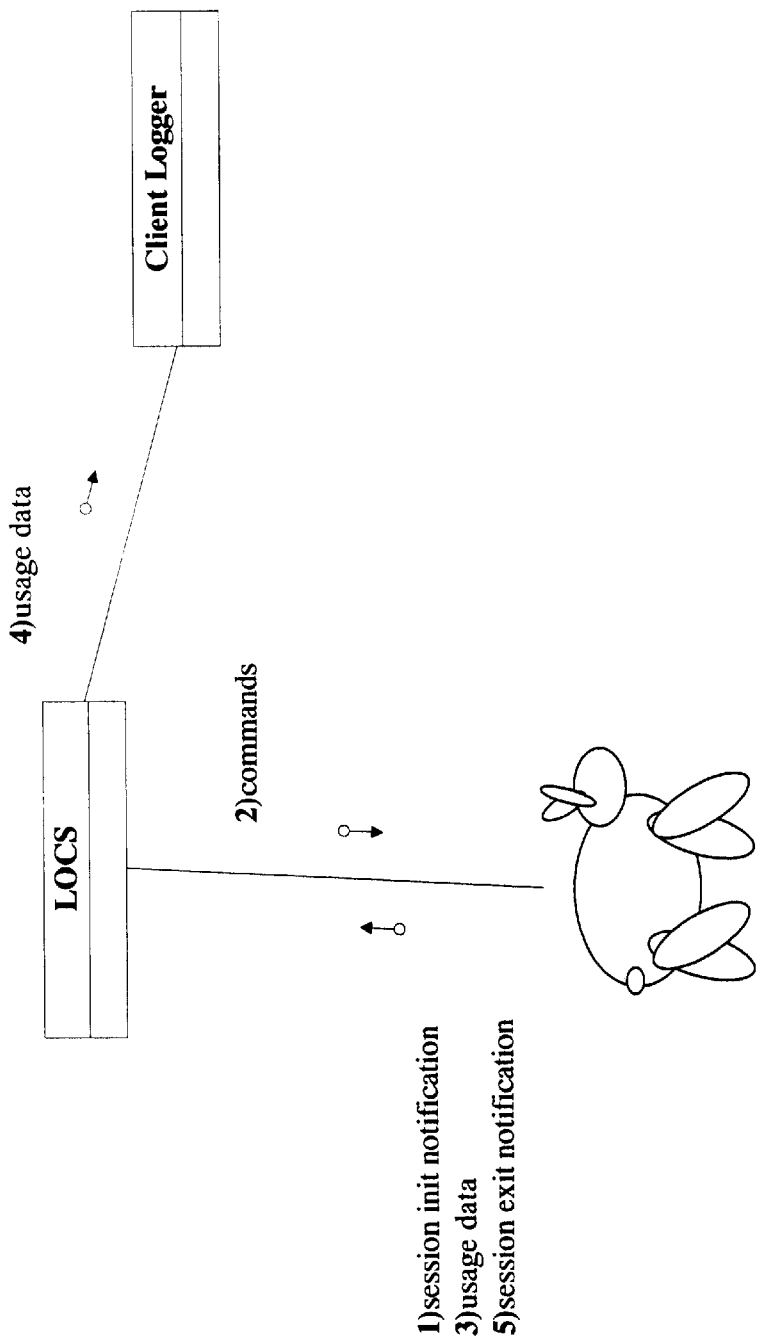

FIG. 52: Playing a Game

The diagram shows the collaborations involved when a game is played on the Living Object.

Notation

1. A 2-D block is a software subsystem. It shows the subsystem name.

2. Connections imply communications between the subsystems/devices.

3. Data flow symbols show the direction, and a list of the message classes that flow in the link. Each message shows its sequential order in the diagram.

Dynamics

1. The Living Object notifies the LOCS of a session init event. This could be because it has sensed the Child, or because the Child initiated a session.

2. The LOCS and the Living Object now communicate commands and interactions, that implement the running Behavior.

3. During the session the Living Object passes any usage data that the running Behavior specifies to the LOCS.

4. The Usage Data is sent to the Client Logger.

5. Eventually a session exit event is raised by the Living Object. This may be because a timeout has occurred.

---

State Diagrams

Figure 53:
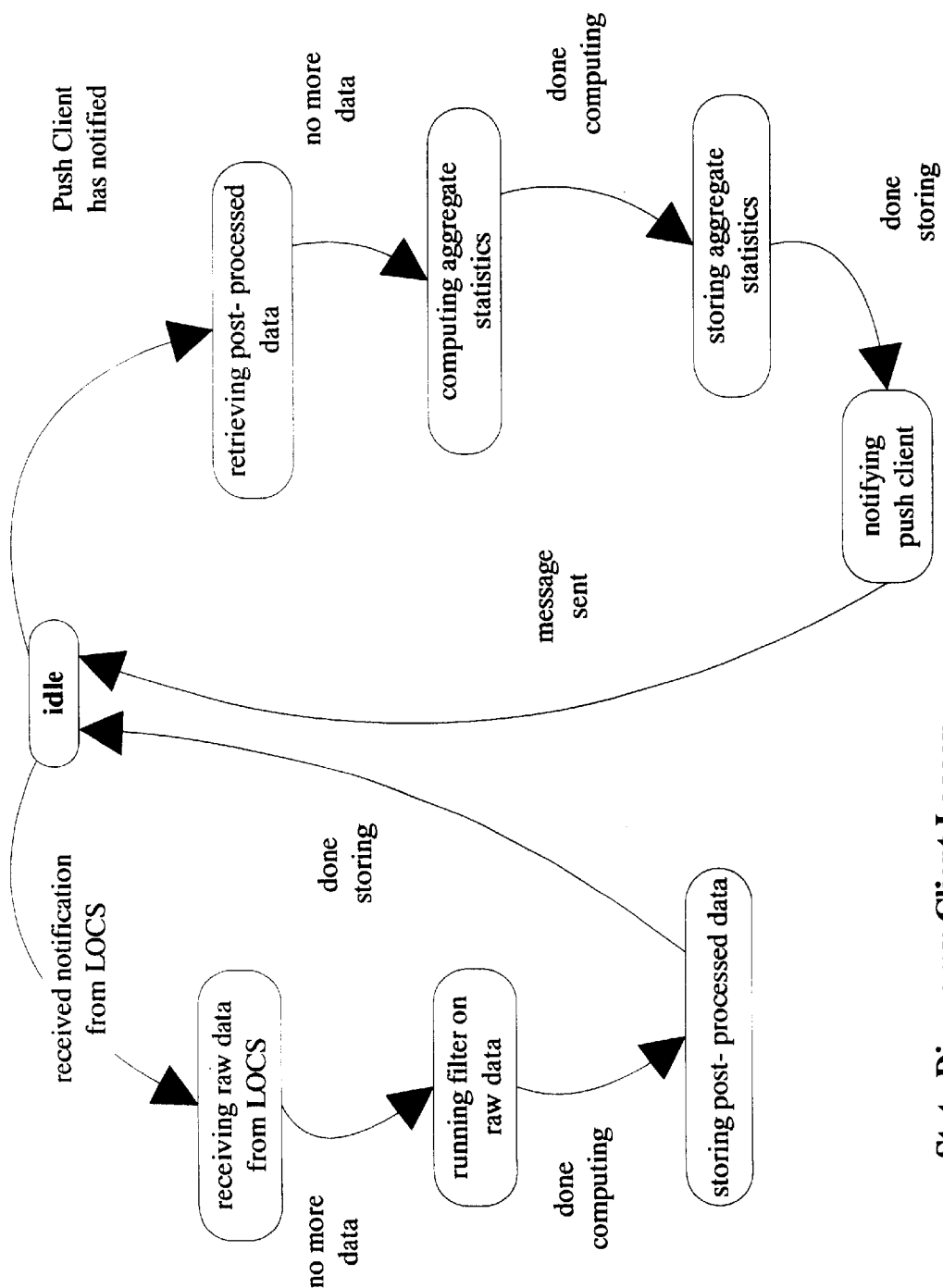

FIG. 53: Client Logger

The diagram shows the internal states and transitions at the ClientLogger subsystem.

Notation

1. A round block is a state. It shows the name of the state.

2. Directed connections imply a possible state transition. The text shows the condition for the transition.

Notes

There are 2 super states for the Client Logger. They are shown as two loops from the idle state. The first is initiated by the LOCS, and the second by the Push Client.

Having the Client Logger compute statistics at the latest possible time (when Push Client notifies it is going online), provides better accuracy.

---

State Diagrams

Figure 54:
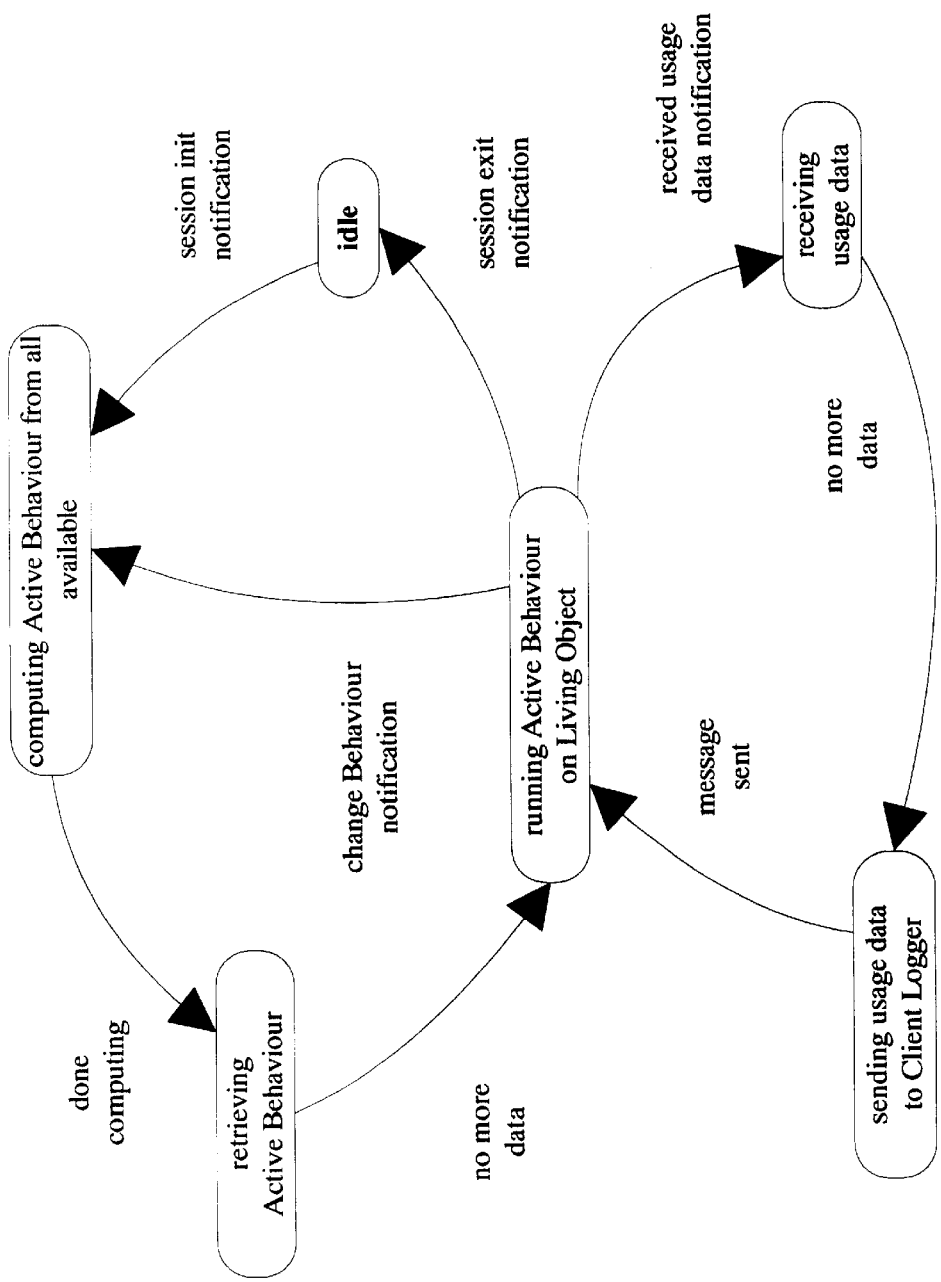

FIG. 54: Living Object Control Software

The diagram shows the internal states and transitions at the LOCS.

Notation

1. A round block is a state. It shows the name of the state.

2. Directed connections imply a possible state transition. The text shows the condition for the transition.

Notes

Most of the time the LOCS is either idle, or running Active Behavior on Living Object. When changing Behavior, or initializing a new one, LOCS computes a new active behavior, and retrieves it from disk. When instructed to do so by the active behavior, LOCS will send any usage data to the Client Logger.

---

State Diagrams

FIG. 55: Push Client

The diagram shows the internal states and transitions at the PushClient.

Notation

1. A round block is a state. It shows the name of the state.

2. Directed connections imply a possible state transition. The text shows the condition for the transition.

Notes

There are three super states at the Push Client, shown as three loops going out of the idle state. When conditions permit us to go online, a Client Update Request is sent and the Client Logger is notified to prepare any last minute statistics. When the Client Logger notifies they are ready, a Client Log Update is prepared. When Client Update Responses are received, the Client Log Update is uploaded to the Push Server.

Various terms used in the specification and claims are now discussed:

Advertisement Class;

A type of Behavior which was paid for by an Advertiser, but is not different in other aspect from Content.Advertiser Class;

An organization that buys Behavior Space from the Toy Maker, and populates it with Behaviors it creates.

Advertising Manager Actor;

The member of Toy Maker or Advertiser staff ultimately responsible for a Behavior Space. Advertising Managers collaborate to split the entire Behavior Space between them. The Toy Maker Advertising Manager has supreme control over the entire Behavior Space.

List Server Subsystem;

The Living Object Server subsystem that manages mass mailings of announcements and receipts.

Behavior Class;

The smallest unit of the living object behavior published from the Behavior Designer. It defines Living Object interactivity for some period of time. A Behavior may be dependent on other Behaviors.

Behavior Designer Subsystem;

(BD) A Creator application, part of LOIS, that allows Content Creators to create interactive Behaviors.

Behavior Space Class;

An object that models a part of the entire behavior space, defined as the mapping that defines at any time and situation, what Behavior should be run at each client. Example: the Behavior Space called: 'Young Children Afternoon' defines what behaviors young children will receive for their afternoons.

Behavior Space Manager (BSM) Subsystem;

The software installed on the Living Object Server that manages the Toy Maker Behavior Spaces. It implements the mappings between Profiles and Behaviors (i.e. narrowcasting/personalization).

Behavior Subscription Class;

A subscription that a Parent purchases at the Web Store, or receives with a purchased Living Object. If a User is subscribed to a Behavior Subscription, then LOIS will guarantee the delivery of certain Behaviors to the subscriber.

Child Actor;

A user that interacts with a Living Object.

Client Access Terminal Subsystem;

A computer that runs the Living Object Client software. Exists in the Client Installation.

Client Installation Subsystem;

A subsystem that includes the Child, Parent, Client Access Terminal, and any number of Living Objects.

Client Log Update Class;

A message sent from the Client Logger to the Profiling Service, sent through the push software. It contains filtered usage data of the Living Object.

Client Logger Subsystem;

A client subsystem responsible for collecting usage data, and sending it to the Profiling Service, after running client side filters, and perhaps computing client side aggregate statistics.

Client Update Request Class;

A message from the Push Client to the Push Server, through the push software, with a User id. It implies the client is ready to receive a Client Update Response.

Client Update Response Class;

A message from the Push Server to the Push Client, through the push software. Contains a group of Behaviors.

Content Class;

A type of Behavior that was purchased at the Web Shop, or distributed as a customer service.

Content Creator Actor;

The member of the Toy Maker or Advertiser staff that creates Behaviors.

Database Server Subsystem;

The software that provides object and schema storage/query/management services for other Toy Maker subsystems. Runs on the Living Object Server.

Game Class;

The time between the session init notification, and the session exit notification. This is the time the Living Object recognizes the Child, and the child wants to interact. Any number of Behaviors may be run during a single game.

Living Object Subsystem;

(LO) An interactive computing device controlled by the Living Object Control Software Living Object Client Subsystem;

The subsystem that includes all software running on a Client Access Terminal: the Client Logger, Living Object Control Software, and the Push Client.

Living Object Control Software Subsystem;

(LOCS) The software that controls the Living Object. It runs behaviors. Runs on the Client Access Terminal.

Living Object Internet System System;

(LOIS) The system that provides Toy Makers and Advertisers with effective, high-resolution control over Behavior Spaces, and the transparent publishing of the correct Behaviors to millions of subscribers.

Living Object Server Subsystem;

The subsystem that includes the Push Server, database server, Web Shop, Registration Service, Behavior Space Manager, and Profiling Service, web server, and list server. It is at the Toy Maker site.

Living Object Provider Software Subsystem;

The subsystem that includes all software running at Site Maker and Advertiser sites: Behavior Designer, Server Console, Behavior Space Manager, Profiling Service, Push Server, database server, Reporting Software, Registration Service, and Web Shop.

Manager Actor;

The member of the Toy Maker in charge of setting business policy and analyzing business performance reports.

Parent Actor;

The user that purchases, registers, and installs Living Objects, purchases subscriptions, and helps the Child.

Profile Class;

The object that models all usage and registration information concerning a User.

Profile Group Class;

A customizable set of Profiles defining a meaningful group. Example: pre-schoolers on weekdays.

Profiling Service Subsystem;

The Living Object Server subsystem that manages profiling data. Runs on the Living Object Server.

Push client Subsystem;

The software installed on the Client Access Terminal that provides push services over the Internet.

Push server Subsystem;

The software installed on the Living Object Server, and the Creator server, that provides push services over the Internet.

Registration Service Subsystem;

The software that handles user registration through the web.

Reporting Software Subsystem;

The software that generates reports and analysis from usage data generated by the Profiling Service.

Server Console Subsystem;

The end-user software used to control LOIS. Runs on the Toy Makers workstations.

Software Update Class;

A message from the Creator Server to the Push Client, through the push software. Contains updates to the Client Software.

Staff Workstation Subsystem;

A computer/s that runs the Behavior Designer/Server Console/Reporting Software, and any web development tools, at the Toy Maker or Advertiser site.

Toy Maker Organization;

An organization which sells Living Objects, and runs a subscription fee/advertisement revenue based operation, creating and distributing Behaviors.

User Class;

The object that models a Client Installation, and is persistent at the Living Object Server.

Web Shop Subsystem;

A WWW site that allows Parents and Children to browse, sample, and purchase Content. Content is purchased as a Behavior Subscription.

One possible implementation of a LOIS system is now described.

1.1. Goals of First Implementation

The first implementation of LOIS is targeted at toy makers, who wish to centrally manage their living toys, which are at user's homes. These are the high level goals of the project:

Easy installation and usage for parents and kids

Easy control of living object behaviors by toy makers and/or toy content providers, but with very high resolution Leverage the strengths of the latest commercial push software Provide a basic framework for future product plans—more specifically, it is best if we could provide a software which will not require any modifications in source code, when it is tightly integrated in the future, with the Creator software for managing the behavior tree of a living object 1.2. Services and Their Use Case Analysis The product should provide the following services, grouped by the users targeted by the service: children, parent, and big corporations. We describe the services, and an analysis of the related use cases.

1.2.1. Child Services

The main service offered to children, who are the direct users of the living objects, is the transparent updating of object behaviors.

Name

Client side of living object update

Actors

The child is involved only in that he may trigger the use case, but there are other ways for it to be triggered. The child is the actor the use case is servicing.

Goal

That the living object be updated automatically.

Forces in Context

1) Automatic, transparent

2) Graceful, silent handling of errors

3) Error correction, guaranteed delivery

4) Bandwidth 'niceness'

5) Security, privacy

6) Several providers per toy

Trigger

Depends on exact configuration.

1) Generally users will configure the push client to run updates at specific intervals, so the trigger is the scheduler 2) Users may manually initiate a download Summary This use case captures the scenario where the client requests and receives a new living object update.

1) client asks server for new updates 2) new updates are sent to the client 3) at the end of each complete living object update, Creator software is notified Pre-conditions
1) No download will occur if the client is completely 'refreshed'
2) The push client must be installed first
3) The client must be registered first Post-conditions
1) There is now a new complete living object update on the users HD
2) Creator client software is notified Related use cases
1) Registration is a requirement
2) Configuring the living object update process determines what is updated 1.2.2. Parent Services Parents are responsible for all aspects of operating and updating the living object at their home, which the children cannot perform.

1.2.2.1. Installation

The product should be safe and easy to install, so parents can install new toys painlessly.

Name
Installation of push client

Actors
Parent

Goal
That the push client be installed correctly, so that registration can commence.

Forces in Context
1) Installshield type installation
2) There could have been previous installation, i.e. this could be a 2nd, 3rd, etc. living object
3) There are several different types of win32 OSs
4) The client itself must look unique and reflect some corporate identity, definitely not the 3rd party push software maker identity Trigger
User manually starts the installation process from CD, or from a downloaded file Summary
This use case captures the first, and later installations of the LOIS client.
1) User is asked several configuration parameters, or if this is not a first toy, old parameters are used
2) User advances to the registration use case Pre-conditions
User downloaded the package, or has a CD Post-conditions
Everything is setup for registration Related use cases
1) Registration should follow immediately, or be deferred to a later time at the users convenience 1.2.2.2. Registration These services include everything involving registration and billing.

Name
Registration

Actors
Parent

Goal
That the specific living object, recently purchased, be registered at the central database, or that information previously entered in registration be modified Forces in Context
1) Should be similar in feel (to the user) to web site registrations
2) Security, privacy
3) The exact nature of the registration info connected is not fixed, and is determined by the big corporation
4) Layout and styling are important
5) There is probably required, and optional registration information
6) Changing registration information should be the same type of experience for the user
7) There is some information which needs to be passed to the server which should not be generated manually, but which is burnt on the installation CDROM Trigger
1) User has completed the installation of push client, and moves on to registration immediately or at a later time
2) User wishes to refresh any of his registration attributes Summary
This use case captures the scenario where the user registers, or modifies his registration information.
1) User is taken to the registration web site automatically
2) User fills in form, or changes a form with existing values
3) User submit form
4) If form is complete user is shown a thank
5) User is emailed a receipt Pre-conditions
That the push client be installed Post-conditions
Living object is now registered, user has received receipt Related use cases
1) Installation of push client should be completed
2) Configuring the registration process determines the specifics of the process Name
Reviewing billing information Actors
Parent Goal
That the actor be able to review his billing status anytime, i.e. his subscriptions, history etc.

Forces in Context
1) Should be a simple web page
2) Should include the option to communicate with technical, and billing support of the big corporation
3) Security, privacy
4) Support of multiple currencies Trigger
User initializes the use case by going to a secure URL. This may be done by clicking the 'review billing' button in the push client, or on the big corporations web site Summary
This use case captures the scenario where the user checks his billing status
1) User logs in to the billing page
2) All information is displayed on one page
3) User may cancel any outstanding subscriptions
4) User may contact billing or technical support through the page Pre-conditions
That the user have at least one living object installed and registered Post-conditions
  User is now aware of the exact details concerning any billing she was involved with
Related use cases
  1) Registration should have been completed
1.2.2.3. Buying Behaviors
  This service allows parents to purchase subscriptions, behaviors, and groups of living object behaviors, over a secure web store front.
Name
  Buying behaviors
Actors
  Parent
Goal
  That the actor be able to purchase behaviors for his living object
Forces in Context
  1) Security, privacy
  2) Should have the look and feel of normal web store fronts
  3) Behaviors might be available as a single update, subscription, or a group of updates
  4) Support of multiple currencies
Trigger
  User may reach the web store though the big corporations web site, by clicking on a 'check out new behaviors' button in the push client, or by interacting with the living object
Summary
  This use case captures the scenario where the user buys behaviors.
  1) User logs in to the web store
  2) User surfs the store, and adds to shopping bag wanted items
  3) User is presented with billing information
  4) User reviews billing, and once she approves the central server is notified about a change in policy concerning the user
Pre-conditions
  That the user have at least one living object installed and registered
Post-conditions
  Server should now attempt to push the new behaviors to the user
Related use cases
  1) Registration should have been completed
1.2.3. Big Corporation Services
  The focus of the initial implementation is providing useful services to big corporations. The goal of these services is to allow them to provide constantly updating behaviors for the home users living objects, to make sure that the behaviors match the home user preferences, and to sell behaviors over the Internet. Several types of services are required to support these goals. We do not examine the 'install server software' use case, since it is assumed that Creator technical personnel will perform this task.
1.2.3.1. Control Over Narrow-Casting
  We preferably provide the services to allow the big corporations extra-fine resolution control over personalization aspects of the living object updates process, so that they can effectively narrow-cast to the individual users. Another very important requirement of these services, is that they scale to 100,000 users.
Name
  Configuring the registration process
Actors
  Big corporation
Goal
  That the actor be able to configure the registration process
Forces in Context
  1) Security
  2) Corporation wants to know as much as possible about users
  3) Corporations don't want users to be totally aware of item 2
  4) Corporations want to layout and style the process to their liking
  5) Each corporation requires different registration information
  6) There are some universally common aspects of such questionnaires, such as 'user name', 'user email', etc. Thus we can give the users a jump start by providing several default questionnaires
Trigger
  Big corporations have a button which takes them to the web page which configures the process
Summary
  This use case captures the scenario where the user determines the specifics of registration
  1) User adds/removes an existing question from the registration form
  2) User edits an existing question: is it optional or required? What is its text? Is it a choice question, or a text box? Must it be numeric?
  3) User can loop back to step 1
  4) User designs an HTML template for the questionnaire, starting from the automatically generated template defined by the registration details
Pre-conditions
  That the big corporation server software is installed
Post-conditions
  Big corporation now has a registration web page for its users of living objects
Related use cases
  1) The Registration is determined by the results of this use case
  2) Configuring the living object update process uses the registration information
Name
  Gathering user profiling data
Actors
  Big corporation server
Goal
  That the actor be able to automatically gather all profiling data, and place it in the correct context, i.e. the user object which represents the user generating the data
Forces in Context
  1) Privacy
  2) Corporation wants to know as much as possible about users
  3) Corporations don't want users to be totally aware of item 2
  4) Profiling data may come from: server logs of behavior downloads, living objects, registration, purchases of behaviors
  5) This data may be potentially huge, we must allow some filtering, compression, or summaries to control the volume 6) The data must be placed in the correct context in the central database to support analysis Trigger 1) Server registers a download
2) Living object sends profiling data
3) Registration data has been accepted
4) A purchase in the web store has occurred Summary This use case captures the scenario where the server automatically gathers and sorts profiling data from a variety of sources. It is an automated process, where the user can only control which data is gathered (should be all by default), i.e. there is a form with checkboxes where the user may stop the server from gathering data from a specific aspect of the system Pre-conditions That registration be configured Post-conditions Big corporation now has all possible data about all its users Related use cases 1) The Configuring the registration process use case determines which data is available from registration
2) The Server side of update process use case contributes data
3) The Handle the server side of a purchase use case contributes data Name Configuring the living object update process Actors Big corporation Goal That the actor be able to configure the living object update Forces in Context 1) Security
2) Corporation want to match users with behaviors according to their ideas of 'match'
3) Corporations can have very different ideas on what 'match' means exactly
4) There is something in common among all 'match' ideas, namely that they can be best described as a vector of rules, and several rules which probably everybody will use, such as: 'decide by age', 'decide by subscription information', 'decide by locale', etc.
5) The match should be made (if needed) against all available profile data
6) Non-technical users should be able to configure a pretty good update process using rules which we should provide in the base package
7) Each living object should have its own set of configured rules
8) There are several views (by profile, toy, living object update) for designing an update process, users want to be able to choose Trigger Big corporations have a button which takes them to the web page which configures the process Summary This use case captures the scenario where the user determines the specifics of the living object update process. Here is an example:

1) User chooses a specific living object to configure
2) User adds/removes rules from the process. Rules are chosen from available rule classes
3) User modifies existing rules. Each available rule class has configuration parameters
4) User rearranges, copies and pastes rules
5) User can loop back to step 2
6) User tests the update process she has configured for the living object, and views prototypical results Pre-conditions 1) That the living object has been defined in the central server
2) That registration format is configured Post-conditions Big corporation now has a configured living object update process which will manifest itself in every update Related use cases 1) Add new living object updates is a requirement 1.2.3.2.

Name

Server side of update process

Actors

Big corporation server

Goal

That the actor be able to implement the update process previously defined

Forces in Context

1) Security, privacy
2) There could be up to 100,000 users, where 100s of them are updating at once
3) Servers are expensive, so the process should be optimal as can be
4) Corporations should be able to increase their load capacity in a scalable manner, i.e. without a lot of work
5) The update process itself could have been configured in any number of ways
6) We must log everything
7) The process could be interrupted while running (e.g. user disconnects, etc.) so saving exact state is important
8) There has to be built in default behavior when overloaded, so we never end up in a limbo state Trigger LOIS push client connects to the server and requests an update Summary This use case captures the scenario where the server is refreshing the clients 1) Server receives an update request
2) Server runs through the rules configured earlier, resulting in any number of updates which are now to be passed to the client
3) Server passes updates to the client Pre-conditions 1) That registered clients exist
2) That the living object update process has been completely defined Post-conditions Clients have been updated, or have been partially updated Related use cases 1) Add new living object updates is a requirement
2) Configuring the living object update process is a requirement 1.2.3.3. Control Over Living Object Behavior Database The goal of these services is to allow the big corporations to create an easy to manage, large store of behaviors for living objects.

Name
  Add new living object to the database
Actors
  Big corporation
Goal
  That the actor be able to add new living objects to the living objects database on the server
Forces in Context
  1) Security
  2) Living objects can be very different from each other
  3) There is much that all living objects share—they are all controlled by many living object updates, but only one at a time
Trigger
  Actor pushes a button which takes him to the 'add living object' wizard
Summary
  This use case captures the scenario where the actor tells the system that it must recognize a new living object
  1) User fills in the minimum details needed to define a new living object
  2) Server creates a new object modeling the living object
Pre-conditions
  That the big corporation server software is installed
Post-conditions
  The server is now aware of the new living object
Related use cases
  1) Add new living object updates is the next logical step
Name
  Add new living object updates
Actors
  Big corporation and their advertisers
Goal
  That the actor be able to add new living objects updates to the server
Forces in Context
  1) Security
  2) There can be many types of updates: text, scripts, multimedia, executables, etc.
  3) This is one the most common processes, so it should be as streamlined as possible
  4) This is the simplest place to interface between Creator written software which produces behavior packs
  5) This may be done at different places in the Internet
Trigger
  Actor pushes a button which takes him to the 'add living object update' wizard
Summary
  This use case captures the scenario where the actor tells the system that to add a new living object update to a specific living object
  1) User chooses a living object
  2) User uploads the update package
  3) Server should notify all relevant observing objects of this new update
Pre-conditions
  1) That the living object has been defined in the central server
  2) That the actor has specific files from which to create the living object update. The creation of these updates is beyond the scope of this document
Post-conditions
  The server is now aware of the new living object update, and it will be available in the web store, rules manager, and analysis subsystems
Related use cases
  1) Add new living object to the database is a requirement
1.2.3.4.
Name
  Manage living object updates
Actors
  Big corporation
Goal
  That the actor be able to manage living object updates
Forces in Context
  1) Security
  2) There can be many types of updates: text, scripts, multimedia, executables, etc.
  3) This is one the most common processes, so it should be as streamlined as possible
  4) There could be hundreds of living object updates, so users must be able to quickly find the update they need to manage
  5) We have no capability to manage the internals of an update pack, but it is important to provide a basis for interfacing with Creator software in this use case
Trigger
  Actor pushes a button which takes him to the 'manage living object update' wizard
Summary
  This use case captures the scenario where the actor tells the system that to remove a living object update, change its properties, or replace it by another update
  1) User chooses a living object
  2) User chooses a living object update
  3) User removes the living object update or edits its properties or replaces it by another she has previously prepared
Pre-conditions
  That the living object update has been defined in the central server
Post-conditions
  The living object is now different in one update from what it was
Related use cases
  1) Add new living object updates is a requirement
1.2.3.5. Control over the Web Behaviors Store
  Corporations want to make money selling behaviors on the web. This means they need a tool to create and manage a store of behaviors.
Name
  Layout and style the web behaviors store
Actors
  Big corporation
Goal
  That the actor be able to determine what the store where living object updates are sold in will look like
Forces in Context
  1) Security
  2) Big corporations want their stores to look unique
  3) There is much in common among all stores: they are basically a searchable, easy to navigate catalog
  4) Thus we can provide default templates
  5) The templates must be simple to work with, with only HTML knowledge as a requirement 6) Users will want to integrate the store with the rest of their WWW infosystem
7) Users might already (and probably will already) have some kind of store, billing system, etc. of their own, as part of their web site Trigger Actor pushes a button which takes him to the 'style the web behaviors store' wizard Summary This use case captures the scenario where the actor manages all aspects of the web store 1) User chooses a page in the store, i.e. search results page, product page, etc.
2) User chooses a template
3) User reviews the effect of the template on the system by previewing
4) User replaces the current template with the new one and submits the change Pre-conditions 1) That living object updates are configured
2) That users have HTML files to use as templates for the store. Note that these could have originated from our default templates, or they could have been written according to our documentation Post-conditions The store is now styled according to the users preferences Related use cases 1) Manage living object updates is where big corporations determine prices, subscription information, etc. for living object updates
2) Handle the server side of a purchase is where the server interpolates the store templates into complete HTML pages sent to the users web browser 1.2.3.6.

Name

Handle the server side of a purchase

Actors

Big corporation server

Goal

That the actor be able to respond correctly to web orders of living object updates, and to page requests for the catalog Forces in Context 1) Security
2) Many users could purchase at once, probably 100s
3) Billing, taxes Trigger Web browser client enters the store and starts interacting with it Summary This is just a normal web store process, like many others Pre-conditions 1) That templates for the web store are configured
2) That living object updates exist
3) That registered users exist Post-conditions The purchase is logged, billing details updated, living object update Related use cases 1) Layout and style the web behaviors store is where big corporations determine what the HTML pages will look like
2) Manage living object updates is where big corporations determine prices, subscription information, etc. for living object updates 1.2.3.7. Control Over Users Corporations require a group of services that allow them to manage the user database and related information: billing and profiling data.

Name

Manage users

Actors

Big corporation

Goal

That the actor be able to manually control the user database

Forces in Context

1) Security
2) 100,000 users
3) Big corporations have people who can work with RDBMSs through Access
4) Our users are objects which need to encapsulate many different types of information, which we cannot know in advance. This includes all profiling data Trigger Actor presses button which takes him to the user management application Summary This is just a normal add/delete/modify type of use case Pre-conditions That users were registered Post-conditions User objects have been modified Related use cases 1) Configuring the registration process determines a lot of the properties of the corporations user object
2) Almost every other use case dumps logs into the user object 1.2.3.8. Analysis Services To help them in decision such as: 'what type of behaviors should we create today?' and in other decisions, big corporations require analysis of usage patterns and profiles. These services allow them to generate and view reports.

Name

Analyzing usage

Actors

Big corporation

Goal

That the actor be able to generate and view sophisticated reports about system usage Forces in Context 1) Big data
2) Corporations have standard report formats and tools
3) We cannot know in advance ALL the report types needed, but we can assume that several will definitely be needed Trigger Ad management exec from Disney starts the reporting tool Summary This depends on the tool used. Generally it should be:

1) Define a time period
2) Define a segment of users
3) Run a query on them, refine
4) Put query results in template and send to manager Pre-conditions 1) That there is usage data in the database Post-conditions
  A report has been generated
Related use cases
  1) Server side of update process is where the data we post-process here gets created
  2) Gathering user profiling data also determines what gets logged
  A preferred LOIS Advertising system is now described.
1) Segmentation
  Through television advertisers can reach segments of the population defined by constraints like:
5–9 year old females that watch TV on weekday afternoons
  The content provider at the TV station airs a show that is known to attract that kind of viewing audience, and sells it to an interested advertiser. There are several unsolvable problems in this system: The segmentation is never accurate, the advertiser is limited to very simple constraints, effective market feedback is not immediate, and the advertiser cannot choose the time at which the ad will air. In LOIS there are constraints like:
8 year old males that like sci-fi stuff
8 year old males that like fantasy stuff
8 year old males that like military stuff
  That allow for very accurate targeting. Since children are quite different from each other, advertisers can now construct accurate campaigns. The LOIS Behavior Space management system allows advertisers to:
Create campaigns with arbitrarily complex segmentation
Control campaigns in real-time in very high resolution
Collect accurate reports automatically
Choose any time of the day for their advertisement
LOIS supports of course the classical matching of advertisement to content type. The toy maker may sell slots inside subscription/free content to advertisers, as in TV/radio/web.
2) Content vs. Advertisements
  Behaviors decompose into Content and Advertisements. Parents and Children will not be aware of this decomposition. The behaviors they receive contain no information about it. This is just like TV. Broadcast technology is transparent to the insides of what is being aired. Video editing software is aware of the distinction. It might provide special tools for composing video from ads and content. The LOIS design is similar. At the Toy Maker and Advertiser sites content is distinct from advertisements: different logs are kept for each, content is usually purchased as a Behavior Subscription while advertisements are not, and other differences. But this information never enters the Toy Maker<=>Client Installations extranet. This does not mean that children and parents will never know what is an ad and what is content. Television stations choose (mostly) to tell viewers when switching between the two. It is considered appropriate, and is also considered the Right Thing(r) in the LOIS context. Toy Makers and Advertisers may agree to more subtle forms of advertisement, but these cannot be too subtle, or they will annoy parents and children.

One embodiment of a LOIS system is now described:
  Living Objects™ Internet Services (LOIS) is the general name for a group of software products that are a part of the broad family of Creator's Living Objects(tm) technology. Like the entire family, LOIS is an enabling technology. LOIS enables Creator's customers to establish Sophisticated Internet services. LOIS is offered by Creator to its customers for two obvious reasons:
To help the customers develop effective services easily and reliably.
To help Creator establish its leadership and competitive advantage in the market.

There are two types of LOIS products designed to serve two types of applications (and markets):
INTERNET services for vendors selling consumer products such as toys and smart home appliances.
INTRANET services for operators of entertainment and shopping sites.

Both products are made of two parts: a server product and a client product. There is plenty of products to enable companies to develop and provide various types of Internet services. Creator do not intend to compete with these products and LOIS is designed to complement the available product with features that are not available elsewhere.
2.1. The Internet Advantage
  In Intranet applications of Living Objects the client side, namely the PC, runs several programs concurrently. Each of these programs control one or more devices such as toys or smart home appliances. These devices and their control programs may be from different vendors. Therefore this situation is named "Multi Vendor Environment". To enable all these programs to share the required peripherals such as the radio base station, the computer screen and the Internet Creator provides the Executive. The Executive program is responsible to run the control program and provide them with all the necessary peripheral services including Internet access.
2.2. The Intranet Advantage
  Living Objects Intranet Services are implemented in large sites with several radio base stations in radio communication with many Living Objects. Each radio base station covers a part of the site and the living Objects are mobile throughout the site. Therefore the Living Objects may roam between the radio base stations conserving continuous communication with the central computer. This situation is unique for Intranet application and is not supported by available Intranet software packages.
2.3. The LOIS Advantage
  An advantage of LOIS that is common to all applications is the LOIS SDK. This part of the SDK product enables Creator's customers to develop, quickly, inexpensively and reliably, sophisticated applications for the Living Objects technology. The LOIS SDK integrates between available development tools for Internet applications and the special features and requirements of the other Living Objects products.
3. The Invention Definition
  The Living Objects™ Internet Services (LOIS) is a software product, a member of the Living Objects™ family of products from Creator. Living Objects is a group of enabling technologies that enable easy development of "robots" with the capability of natural interaction with humans. The Living Objects is a family of products, including hardware, control software, application software development kit and the Internet server software. Living Objects is oriented for diverse markets. The primary markets are:
Toys
Smart home
Amusement parks
Retail outlets-Point of Sale
  Living Objects technology is marketed by Creator to vendors of finished products to these markets. The vendors use the Living Objects technology to develop sophisticated products for their markets.
  The Living Objects Internet Server is used in two circumstances:
By vendors of finished products to provide services over the Internet to their customers.
By operators (of amusement parks, retail outlets, etc.) to communicate between their sites.

Typical Internet based services are:
Customer support/central sites administration.
Distribution of system software updates.
Marketing of new software products.
Central management and distribution of personal/site information.
Research and analysis of the usage of system features and preferences by end-users
Advertising The Living Objects Internet Server enables the vendors and the operators to establish their Internet service easily, reliably and fast.

4. Creator's Goals

LOIS is developed in anticipation of the future competition to Creator's Living Objects. Creator's plan is to secure its leading position as a supplier of "Living Objects" technology by providing the market with the best offering in three aspects:
Cost mainly the cost of the hardware
Sophistication mainly the sophistication of the application development tools
Breath of the family of the Living Objects products The use of the Internet to provide some kind of service to products related to computers and software is very common today, if not essential. Therefore, Creator assumes that vendors and operators of products based on the Living Toys technology will seek ways to provide services over the Internet to their clients (vendors) or sites (operators). Offering an Internet solution as a part of the Living Objects family creates a definite marketing advantage.

The Living Objects Internet Server serves the following goals for Creator:
Competitive Advantage
Captive Customers
Market Information
Revenues and Profits Though LOIS is an accessory product in the Living Objects family, it is regarded as a profit center and it is expected to provide about 10% of the total revenues of the Living Objects family.

5. Perceived Customers' Objectives 5.1. Objectives of Toy Vendors

The Living Object technology is based on the concept of a toy (one or more) in radio communication with a near-by personal computer that controls the toy(s). The personal computer may be in continuous or dial-up communication with the Internet Server of the manufacturer of the toy(s). Toy vendors will purchase LOIS and use it for the following reasons:
Customer support
Increase sales through on-line sales
Split software sales (previews, complete product, updates & extensions)
Fan club subscriptions
On-line games
Electronic coupons
Advertising
Collecting and analyzing buying patterns and users' demographics 5.2. Objectives of Smart Home Vendors Customer support
Maintain brand name and customer loyalty
Electronic coupons
Advertising
Collecting and analyzing buying patterns and users' demographics 5.3. Objectives of Amusement Parks Operators
Site support
Inter-site communication
Inter-site visitor identification
Fan club subscriptions
Home and on-line games
Electronic coupons
Advertising
Collecting and analyzing buying patterns and users' demographics 5.4. Objectives of Retail Operators
Site support
Inter-site communication
Inter-site client identification
Maintain client loyalty through buyers clubs
Increase sales through on-line sales
Electronic coupons
Advertising
Collecting and analyzing buying patterns and users' demographics 6. System Architecture LOIS is made of two main parts: the server side and the client side, in two basic configurations:
Internet or Server/Client Typical of the toys and the smart home markets, the client software resides in a personal computer in occasional communication with the server.
Intranet or Server/Node Typical of the amusement parks and the retail outlets markets, the client software resides in the site's central computer, acting as an Intranet node in continuous communication with the server.

It is noted that vendors of products to the toys market and the smart home market may also use the Server-Node configuration to communicate with retail outlets and that operators of amusement parks and retail outlets may also use the Server-Client configuration to communicate with their customers at home.

The rest of this document is dedicated to Internet-Server/Client configuration and the toys and smart homes applications.

6.1. Client Architecture 6.1.1. Operating System Support

LOIS client software should be able to run on all the following platforms.
Windows 95 (windows 98)
Windows NT Client
Windows CE
Macintosh
Java/NC It is expected that a pure Java based software will be able to run on all these platforms.

6.1.2. Multi-Vendor Environment

Creator sells technology to its customers. The customers uses the technology to develop devices (toys, smart home appliances, etc.) and the PC software to run them. The most basic situation is where there is one device and one program to control it. A multi device environment is when there are several devices controlled by a single program. A multi-program environment is when there are several devices that are controlled by several different programs. On one hand all the programs run independently, on the other hand all the programs access the same Computer Radio Interface (CRI, also named Radio Hub or Radio Base Station). This creates a complicated situation that requires a sophisticated mechanism to support it. The most complicated situation is when there are several programs from several vendors running concurrently on the same PC controlling different devices. This may be common with toys and a must with smart home appliances.

Internet applications creates an even more complicated multi-vendor environment. LOIS must support the situation where there are several programs, some of them of different vendors, trying to access several different web-sites.

There are two basic possibilities to support multi-vendor environment:

Cooperation Tools

The control software packages are self-contained and independent of each other. Creator provides its customers with a piece of software that is incorporated into the vendor's software package. This piece of software enables cooperation between several programs to perform concurrent access to shared peripherals such as the CRI and the Internet. All access requests by control programs to shared peripherals are performed by a call to the Cooperation Tool. The tools linked to the various programs are able to cooperate between themselves and provide concurrent access to the required peripheral.

Common Executive

Creator provides an Executive program that launches an runs all the control programs. All access requests to shared peripherals are submitted by the control programs to the Executive and by the executive to the required peripheral.

A further requirement is that LOIS do not interfere with the operation of any common manual browser and other Internet software products such as "push technology", Internet-Telephony, etc.

The Executive approach is the common solution (the operating system solution). It is simpler to support coordination between programs b means of an executive. It is also easier to support downgrade compatibility (where new program can enjoy new features while old programs can still run). The Executive approach has a significant marketing power for Creator. This advantage to Creator may intimidate large vendors.

6.1.3. Dialer Support

The client software is able of creating an Internet connection automatically. Therefore the client software is able of launching the Internet dialer and performing all the required actions (such as password entry) to establish the connection to the Internet Service Provider (ISP). Since there are many ISPs and many dialers the client software is able to adapt itself automatically to the Internet environment of the user.

A preferred Advertising Distribution And Management (ADAM) system for a Living Objects Internet Services (LOIS) system is now described:

The Invention

Providing means for the placement of advertising via computerized toys and dolls. These means enable:

Advertising via a character that is friendly with the target audience

Sharply focused target audience

Customizing the advertising content to the user (sex, age, location, preferences)

Providing varying advertising content to the same user, thus avoiding boredom.

Sharing advertising space between advertisers

Customizing the advertising to the situation, such as time of day, day of the week Providing advertising that changes and develops with time Changing the advertising after the toy or the doll are sold to the user Overview of the System (From now on the term toy refers to toys and dolls in general)

Living Objects™ (LO) is a technology that enables the implementation of toys that are controlled by a computer, specifically a regular home computer. The toys are able to play sophisticated games with their users, effectively imitating human behavior. The user is able to interact with the toy on human terms and the toy is able to adopt the game content to the particular requirement of the user at that time.

The games are implemented as software programs that are executed by the computer. Game software can be distributed bundled with the toy or separately, as an after-market product. Games can be developed by the vendor of the toy or by an independent game developer, for toys available in the market. Games are typically distributed by means of computer diskettes and CD-ROMs.

The toys can provide advertising content to the user, mainly by verbal means. Advertising space can be used by the vendors of the toys and the game software to promote their own products and services or can be sold by the vendors to other parties.

The computer can connected to the Internet and via the Internet to various Internet sites (web sites). The primary reason to connect to the Internet is to download upgrades of system software from Creator's web site and updates of game software from the vendor's sites. This mechanism can serve also to distribute and download advertising content. The advertising Internet sites can be Creator's web site, sites of the toys and game vendors and sites (of advertising companies) that specialize in the distribution of advertising content to Living Object toys.

Advertising content is primarily sound, namely verbal content with or without music and associated motion (e.g. song and dance). Advertising items can be placed before, after or within specific games or independently.

ADAM for LOIS Topology and Configuration

ADAM for LOIS consists of four main subsystems:

Living Object User System

The Living Object User System is the infrastructure software (and hardware) that enables the computer to execute the game software and control the Living Object toys. The Living Object User System contains the LOIS Client software that enables the computer to connect to the Internet and to the sites of the various vendors and communicate with them as needed. ADAM User Client is a software module that enable the computer to exchange advertising data and content with the Internet sites.

Vendor's LOIS Server

Vendor's LOIS Server is a Creator's product, provided to Creator's customers (developers and distributors of Living Object toys and games) to enable them to maintain continuous connection with their clients. The Vendor LOIS Server is a software package for an Internet Server that communicates with the LOIS User Client software. The ADAM module for the Vendor LOIS Server supports all the communication needs and programming facilities required to distribute advertising through the Internet.

Advertiser's ADAM Client

The Advertiser ADAM Client is a software program that enables an advertiser to communicate with various LOIS servers and their ADAM modules and:

Research and select the appropriate advertising vehicles (namely toys and games in the market).

Prepare the advertising content in the appropriate format

Distribute the advertising content to the appropriate LOIS Servers

Further control the advertising process

The Advertiser ADAM Client can be used by the vendor to design and implement advertising of other products and by other advertisers (or advertising agencies) to distribute advertising content through Vendor LOIS Servers. Advertisers that are not vendors can have their own LOIS Servers to distribute advertising content but it is unlikely that the users' LOIS (ADAM) Client will initiate contact directly to advertisers' sites.

Creator's LOIS Server

Creator's LOIS Server supports the entire LOIS network and particularly the ADAM application. Creator's web site provides software upgrades and support to all the other three entities: the users, the vendors and the advertisers.

ADAM Properties

ADAM is a unique mechanism for advertising. ADAM collects detailed information about each and every user. This information is gathered by the user system and communicated to the vendor's server. The advertiser can therefore send the advertisement to an accurately focused audience. The advertiser can associate the advertisement with specific situations such as specific game situations (discussing cloths) or environmental situations (wake-up, dinner). An advertising can presented to different users at different situations. All this is provided and managed by means of a distributed database of the following data objects, communicated and processed by the four subsystems of the ADAM for LOIS system.

It is appreciated that the software components of the present invention may, if desired, be implemented in ROM (read-only memory) form. The software components may, generally, be implemented in hardware, if desired, using conventional techniques.

It is appreciated that the particular embodiment described in the Appendices is intended only to provide an extremely detailed disclosure of the present invention and is not intended to be limiting.

Reference is now made to FIG. 59 which is a simplified semi-pictorial semi-block diagram illustration of a toy/marketing system constructed and operative in accordance with a preferred embodiment of the present invention, the toy communicating directly with a network such as the Internet, an intranet or a LAN.

The toy/marketing system of FIG. 1 includes a toy 1100 having associated therewith, e.g. at least partly embedded therewithin, a network controller 1110 operative to:

a. Communicate via a network 1115 with a motivational content provider 1120 also associated with the network. This communication may employ any suitable protocol such as plain ASCII, mixed analog and digital, full digital, electronic mail messaging, Internet WWW (world wide web) site access, Internet FTP (file transfer protocol), Internet chat, Internet telephony (VOIP—voice over IP (Internet protocol)). Electronic mail messaging may include transferring audible content e.g. as an attachment.

b. Control all peripheral components within the toy such as microphones 1140, loudspeaker 1150, motors 1160, lightbulbs 1170, proximity sensor 1175, and/or switches 1180. Many other peripheral components, such as but not limited to motion sensors, light sensors, solenoids, and the like, may be provided; and c. Process motivational content received from the provider 1120 which typically comprises a conventional network server.

The term "motivational content" is intended to include any message or other meaningful content which is designed to motivate a recipient of the message or content to perform an action which is desirable to the originator or provider of the message or meaningful content. For example, the following motivational message is operative to motivate a child to switch on a television show, thereby exposing the child to educational or commercial content which is desirable from the point of view of the originator or provider of the message:

"Yoohoo! Stuart! it's time to watch our favorite television show. Please turn the TV on to channel 7."

FIG. 60 is a simplified block diagram of a preferred implementation of the network controller of FIG. 59 which may reside entirely interiorly of the toy body 1100.

FIG. 61 is a simplified semi-pictorial semi-block diagram illustration of a toy/marketing system constructed and operative in accordance with a preferred embodiment of the present invention, the toy 1100 communicating with the Internet 1115 via a household computer 1200 connected to the toy by wire. In the embodiment of FIG. 61, preferably, most of the software operating the computer networked controller 1210, such as software performing functions (a)–(c) listed above, resides in the computer 1200 rather than interiorly of the toy 1100.

FIG. 62 is a simplified block diagram of a preferred analog implementation of the computer networked controller of FIG. 61 and its audio communication link to the household computer. In FIG. 62, as well as in FIGS. 63 and 64, the computer 1200 operates the peripheral components of the toy 1100 via the computer networked controller 1210 by sending commands to the microprocessor 1220 which in turn actuates the designated peripheral components via an appropriate one of interfaces 1230–1260. In the embodiment of FIG. 62, the commands are sent via the MIDI port 1270 of the computer 1200 and audio content is sent to the speaker 1150 and is received from the microphones 1140 in analog mode via the analog output and input of the computer's sound board.

FIG. 63 is a simplified block diagram of a preferred digital implementation of the computer networked controller of FIG. 61 and its audio communication link to the household computer. In FIG. 63, unlike in FIG. 62, the computer 1200 sends both commands and audio content in digital form via its serial or parallel ports.

FIG. 64 is a variation on the apparatus of FIG. 63 in which the computer networked controller of FIG. 61 is disposed adjacently to the computer rather than being disposed adjacently to the toy. In FIG. 64, the computer network controller 1210 is attached to the serial or parallel port of the computer 1200 and is connected by wires 1300 to connector 1310 in the toy 1100. The audio content and control (analog equivalent of commands) are both transmitted to the speakers 1150 and other actuating peripherals, and from the microphones 1140 and other sensing peripherals, as analog signals.

FIG. 65 is a simplified semi-pictorial semi-block diagram illustration of a toy/marketing system constructed and operative in accordance with a preferred embodiment of the present invention, the toy 1100 communicating with the Internet 1115 via a household computer 1200 connected wirelessly to the toy 1100. Transceiver 1320 may be connected to the computer 1200 via the sound board as shown in FIG. 62, or alternatively to the serial or parallel ports as shown in FIG. 63. Audio communication between the transceiver 1320 and the wireless controller 1330 residing within the doll 1100 may be in analog mode or in digital mode.

FIG. 66 is a simplified block diagram of a preferred implementation of wireless controller 1330 and of transceiver 1320, both of FIG. 65, the transceiver 1320 being connected to the computer 1200 via its MIDI connector 1270 and its audio connectors 1280;

FIG. 67 is a simplified block diagram of a preferred implementation of wireless controller 1330 and of transceiver 1320, both of FIG. 65, the transceiver 1320 being connected to the computer 1200 via its serial or parallel ports 1290;

FIG. 68 is a simplified flowchart illustration of a preferred method of operation of the network controller 1110 of FIG. 1, or alternatively of computer 1200 of FIG. 61. As shown, the network controller 1110 or computer 1200 preferably initially loads a user's profile and related behaviors from storage memory. The storage/memory is typically either the disk of the PC in PC based configurations of FIGS. 61–67, or the memory 1225 of the network controller 1110 of FIG. 60.

The network controller 1110 or computer 1200 are operative in conjunction with either a fixed or a dial-up connection to the network. If the connection is a dial-up connection, the network controller or computer preferably initially dials up and connects to the motivational content provider 1120 via the network 1115. The controller or computer then uploads properties and a log file.

The term "properties" refers to information describing characteristics of the toy 1100 ("persona") and of the end-user/s. For example, the toy's type may be stored, e.g. there may be animal-type toys, people-type toys, bird-type toys, etc. The end-user/s characteristics may include age, sex and mother tongue. The toy's properties preferably are programmed into the toy's software. The term "log file" refers to feedback data collected from and regarding the user, in the course of execution of all scripts processed since the previous upload. For example, the "log file" may include data on user's oral responses to motivational messages and/or data indicative of user actions such as an identification of a particular television show indicating that the user acquiesced to a motivational message to turn on that particular television show.

The file of the next script to be performed is then downloaded. The connection to the network 1115 is terminated and the downloaded script is processed and the properties and log files are updated as necessary.

If the connection to the network 1115 is fixed, then it is not necessary to receive an entire script. Instead, the script may be received and processed one object at a time. Similarly, it is not necessary to aggregate all feedback accumulating during execution of a script into a log file and instead, feedback may be sent back to the motivational content provider as it occurs.

In a preferred embodiment of the present invention, the toy is operative to collect sensory information indicative of human proximity to the toy. As shown in steps 1485 and 1505, if the motion/proximity sensor 1175, which may comprise an infra-red or Doppler radar capable of detecting motion of large enough objects, detects human proximity to the toy within a predetermined time window, the toy processes the script object 1490 or file 1510 as scheduled. The toy preferably does not process the script object or file in the absence of such sensory information.

FIG. 69 is a diagram of an example of a collection of script objects organized as a script. Preferably, each sensed user response (YES or NO in the illustrated example) is fed back to the motivational content provider.

FIG. 70 is a simplified flowchart illustration of a preferred method for processing any one of the "talk"-type script objects of FIG. 68. In the illustrated embodiment, the script object can generate speech output in 3 modes: text-to-speech; playback of prerecorded, stored speech transferred as a file before playback begins; and streaming audio i.e., if the connection is fixed, immediate rendition of recorded speech, as it is received. As shown, at least one characteristic of speech output is adjusted. The characteristic may, for example, comprise speed, pitch, speech effects simulating emotions such as joy and sadness and/or simulating speech effects according to the persona of the toy. For example, a female fanciful figure typically speaks in a higher pitch than a male fanciful figure.

For example, defects such as stutter may preferably be provided and may be adjusted to fit the persona of the toy 1100, which typically resides in the toy's software as described above. Other speech effects include a "yuk-yuk" noise interspersed between pronouncements of the toy, hoarseness, interspersing of colorful exclamations, etc.

As shown in step 1695, the speech output generated by the fanciful figure preferably includes user-dependent content such as mention of the user's name (e.g. Stuart) as illustrated in FIG. 59 or such as correct gender-language in languages such as French which differentiate between gender. Preferably, for each session, the fanciful FIG. 1100 asks "What's your name?", and upon receiving a reply, e.g. "Stuart", the doll is operative to access Stuart's attributes.

FIG. 71 is a simplified flowchart illustration of a preferred method for processing a "listen and sense"-type script object such as the "listen and sense" script object of FIG. 68. In the illustrated embodiment, the script object can perform sensing operations in any of three different modes: sensor scanning to identify sensor states; recording of audio and transferring file (or transferring in streaming mode) to motivational content provider; and speech recognition and subsequent transfer of speech recognition results (not of the original audio) to the motivational content provider.

FIG. 72 is a simplified semi-pictorial semi-block diagram illustration of a toy/marketing system including a plurality of toys 1100 associated via a network 1115 with a plurality of motivational content providers/servers 1120. As shown, the rabbit toy is a modification of the apparatus of FIG. 59 in that the rabbit toy is wirelessly associated with the motivational content provider/server.

FIGS. 73–89, taken together, form a system analysis of a toy/marketing system constructed and operative in accordance with a preferred embodiment of the present invention.

FIG. 73 is a top-level diagram showing major hardware components located at various sites of a toy/marketing system constructed and operative in accordance with a preferred embodiment of the present invention.

FIG. 74 is a top-level dataflow diagram showing dataflow between the various sites of FIG. 73. It is appreciated that the "toy maker" may not necessarily be the actual manufacturer or designer of any specific toy participating in the system but rather may be a broadcaster or communication provider serving several toy makers and/or advertisers. Preferably, according to this embodiment, one or more computerized accounting systems are integrated into the system of the present invention such that information flowing through the system of the present invention which impacts on billing is automatically routed to the appropriate computerized accounting system or systems.

FIGS. 75–77, taken together, describe a breakdown of a toy/marketing system into sites at which the system operates, and into actors operating at each site. Typically, the actors interact with the system by interacting with a computer located at their site, such as a workstation or terminal, on which software programs reside which provide or facilitate the functionalities described in FIGS. 75–77.

FIG. 75 is a diagram describing the operation of two actors operating in an "at home" system operation site. The actors which operate "at home" are, in the illustrated embodiment, a parent and a child. For each actor, the diagram lists the actor's "responsibilities", i.e. tasks performed by the actor alone, and the actor's "collaborations", i.e. operations performed by the actor in conjunction with another actor who may or may not be located at the same site.

FIG. 76 is a diagram describing operation of two actors operating in an "advertisers headquarters" (also termed herein "motivational content provider") system operation site.

FIG. 77 is a diagram describing operation of four actors operating in an "at toy maker" system operation site.

The term "toy maker" typically refers to the entity which manages the design, manufacture, and distribution of the client side of the toy/marketing system shown and described herein. The "toy maker" optionally also operates the toy/marketing system.

FIGS. 78–82 are simplified functional breakdowns of five respective portion of the toy/marketing system which resides at five respective sites. Specifically:

FIG. 78 is a simplified functional breakdown of a portion of the toy/marketing system which resides at the "at-home" site. The at-home site preferably includes, as shown, a web browser 2120 which may comprise a conventional web-browser such as Microsoft Explorer or Netscape Navigator. Additionally, the at-home site of FIG. 78 preferably comprises a client logger 2130, living object control software (LOCS) 2140, and a client pusher 2150. State diagrams of functional units 2130, 2140 and 2150 are provided in FIGS. 86–88 respectively.

FIG. 79 is a simplified functional breakdown of a portion of the toy/marketing system which resides at a site termed herein "coordinator of motivational content providers" site.

FIG. 80 is a simplified functional breakdown of a portion of the toy/marketing system which resides at the "advertising headquarters" site.

FIG. 81 is a simplified functional breakdown of a portion of the toy/marketing system, including a server, which portion resides at the "toy maker" site. The LOIS (Living Object Internet Services) are equivalent to Motivational Content Providing Services FIG. 82 is a simplified functional breakdown of a portion of the toy/marketing system which resides at the "toy maker" site and which does not include a server. The GUI is the Graphical User Interface.

FIGS. 83–85 describe dataflow relationships between functional units illustrated in FIGS. 78, 80 and 81.

FIG. 83 is a dataflow diagram illustrating dataflow relationships between the functional units of the "at home" site.

FIG. 84 is a dataflow diagram illustrating dataflow relationships between the functional units of the "advertising headquarters" site.

FIG. 85 is a dataflow diagram illustrating dataflow relationships between the functional units of the "toy maker" site.

The dataflow between the functional units of the serverless motivation content provider are generally similar to the dataflow shown in FIG. 84 except that in the serverless motivation content provider no server is utilized.

FIGS. 86–88 are state diagrams of various of the functional units illustrated in FIGS. 78–82. Specifically:

FIG. 86 is a state diagram of the client logger of FIG. 78.

FIG. 87 is a state diagram of the LOCS of FIG. 78.

FIG. 88 is a state diagram of the push client unit of FIG. 78.

FIG. 89 is a dataflow diagram showing dataflow between the "at home" site and the "motivational content provider" site, during a home software updating process operative in accordance with a preferred embodiment of the present invention.

FIG. 90 is a simplified flowchart illustration of a preferred implementation of a selling script or selling process for the network controller 1110 (FIG. 59) or 1200 (FIG. 61) at home. As shown, the network controller 1110 is operative to restrict items that the user can purchase based upon the type 2840 and the cost 2850 of the item, where such restrictions are actuated by a parent user of the system.

The network controller typically authenticates at least one of user ID, user password and user voice signature before permitting a purchase order message to be sent. Authentification of a user's voice signature may comprise the steps of requesting the user's voice signature 2930, recording the user's verbal response 2940, performing a speech recognition process on the recorded response 2950, and if positive 2960, the purchase order message is allowed to be sent.

The network controller 1110 also ensures the privacy of the purchasing/selling interaction between the user and the toy maker by the at home encoding 2980 of purchase information, including credit-card information, before being sent 2990 to the toy maker.

FIG. 91 is a simplified flowchart illustration of a preferred implementation of a selling script or selling process carried out by the motivational content provider server 1120 of FIG. 59, in conjunction with the network controller 1110 at home. As shown the motivational content provider 1120 receives (step 3120) a purchase order message from the toy, and (step 3130) decodes the encoded message 2980, which message is re-encoded before being sent on to the supplier of the item to be purchased. The server then sends purchase confirmation to the toy as shown in FIG. 91, step 3155, and in FIG. 90, step 3010.

Steps 3040, 3080 and 3120 are steps which characterize the latest interrupt or event as either receipt of a new selling list, or a subscriber login or arrival at a schedule time-trigger, or receipt of a purchase order from a logged-in subscriber. The method proceeds according to the characterization of the interrupt or event as one of the above possibilities and then returns to characterize the next interrupt or event and proceed accordingly.

FIG. 92 is a semi-pictorial semi-data flow diagram illustration depicting a preferred method for processing user responses to motivational content, in order to provide the entities generating the motivational content with feedback and/or in order to bill the entities generating the motivational content.

As shown, a single prompt ("Let's watch Sycamore Street now, turn it on!") is being employed which is termed "motivating prompt #3". It is appreciated that other prompts might be employed to get across the same motivational content such as using the same text followed by crying sound effects unless the user acquiesces, or such as using a different text, e.g. ("Turn on Sycamore Street now or else I'll never talk to you again!") These prompts might be termed Motivating Prompts #4 and #5 respectively. As shown, many different users' responses to Prompt #3 are all recorded as the motivating prompt #3 is multicasted to the different users (only four users are shown for simplicity).

Acquiescence, in the illustrated embodiment, comprises turning on a designated television program and is measured by detecting preselected aspects of the television program such as by word-spotting keywords in the television program's theme song.

Preferably, a server report is generated including, for each motivating prompt and for each at-home site, an ID of the motivating prompt, demographic particulars of the user, and at least one parameter of user response such as whether or not the user acquiesced, and also preferably parameters of non-acquiescence such as whether or not the user made any response to the prompt and if so, at least one characteristic of that response such as identification of a competing option (e.g. another program such as "Funny Bunny") which the user preferred over the option being promoted by the motivating prompt (program entitled "Sycamore Street", in the illustrated embodiment).

The server report may be used to generate an accounting instruction in which an entity accepting billing for provision of the Sycamore Street prompt is billed differentially depending on the success of the Sycamore Street prompt. The server report also may be used to generate a prompt evaluation report useful in developing new prompts based on feedback regarding success of previously employed prompts.

FIG. 93 is a simplified flowchart illustration of a preferred method for generating TV program heralding messages which are a form of motivational prompt.

The "log file" typically comprises all records which have accumulated since the last upload, where each record typically comprises an individual server report pertaining to an individual at-home site and an individual occurrence of a motivational prompt, such as the server reports illustrated in FIG. 34.

The "TV herald table" is a table which stores a schedule of motivational prompts including a "script file" for each of a plurality of "time-points" or points in time. Each script file typically comprises a motivational prompt to be provided at that time and, preferably an indication of keywords which, if spotted, define acquiescence and/or other user responses.

FIG. 94 is an example of a "script file".

FIG. 95 is an example of a feedback script file which is called by the script file of FIG. 94 in block 3590, and which is operative to prompt a user to provide feedback regarding the his/her extent of satisfaction with the television shows which s/he has been watching. The terms "Storage in" and "Storage out" refer to store and retrieve operations. At several points in time, either pre-determined or event-driven, the system typically prompts the user to provide feedback. "Predetermined" points in time typically refer to points in time which are separated by a predetermined interval from the beginning of the program. "Event-driven" points in time typically refer to points in time which may be identified by an event, e.g. a prompt which is provided when the word "Sycamore" is first played by the television and is first recognized using speech recognition.

If the prompt is a closed question, the user's response may be processed on the fly by speech recognition and stored in a feedback file as a code. If the prompt is an open question, the user's response is typically recorded and stored as a recording in the feedback file.

FIG. 96 is an example of a screen display which may be generated by the web browser 2120 of living object client 2115. The web browser 2120 has a registration interface function, as shown in FIG. 78, which is typically performed by a parent actor at an at home site, as shown in FIG. 75. The registration screen display prompts for demographic information regarding the child user, which may include information on the user's sex, age, mother tongue, culture, address, relatives, friends and teacher.

FIG. 97 is another example of a screen display which may be generated by the web browser 2120 of living object client 2115. The screen display of FIG. 97, unlike the screen display of FIG. 94, is suitable for embodiments in which the user is allotted a periodic allowance which is paid periodically e.g. every Sunday. For example, a user may be entitled to spend no more than 5 dollars daily, no more than 10 dollars weekly, and no more than 50 dollars monthly.

The "Record voice signature" button allows a user to record a voice signature such as a password, which voice signature may be stored by the system and used for authentication, for security purposes and transaction authentication, as shown in steps 2930–2960 in FIG. 90.

FIG. 98 is a table of functions supported by the system which are typically actuated by a child user of the system.

FIG. 99 is a table of installation functions supported by the system which are typically actuated by a parent user of the system who is a parent of the child user of the system.

FIG. 100 is a table of registration functions supported by the system which are typically actuated by the parent user of the system who is a parent of the child user of the system.

FIG. 101 is a table of billing functions supported by the system which are typically actuated by the parent user of the system who is a parent of the child user of the system.

FIG. 102 is a table of purchasing functions supported by the system which are typically actuated by the parent user of the system who is a parent of the child user of the system.

FIG. 103 is a table of registration configuration functions supported by the system which are typically actuated by a corporate user of the system such as a toy manufacturer.

FIG. 104 is a table of user profiling data gathering functions supported by the system which are typically actuated by a corporate user of the system such as a toy manufacturer.

FIG. 105 is a table of living object configuration update functions supported by the system which are typically actuated by a corporate user of the system such as a toy manufacturer.

FIG. 106 is a table of server update functions supported by the system which are typically actuated by a corporate user of the system such as a toy manufacturer.

FIG. 107 is a table of new living object configuration functions supported by the system which are typically actuated by a corporate user of the system such as a toy manufacturer.

FIG. 108 is a table of new living object update adding functions supported by the system which are typically actuated by a corporate user of the system such as a toy manufacturer.

FIG. 109 is a table of new living object update management functions supported by the system which are typically actuated by a corporate user of the system such as a toy manufacturer.

FIG. 110 is a table of webstore layout and styling functions supported by the system which are typically actuated by a corporate user of the system such as a toy manufacturer.

FIG. 111 is a table of server's purchase-related functions supported by the system which are typically actuated by a corporate user of the system such as a toy manufacturer.

FIG. 112 is a table of user management functions supported by the system which are typically actuated by a corporate user of the system such as a toy manufacturer. The RDBMS is a Relational Database Management System.

FIG. 113 is a table of usage analysis functions supported by the system which are typically actuated by a corporate user of the system such as a toy manufacturer.

FIGS. 98–113 each include the conditions under which each function included therein is performed.

FIG. 114 is a simplified semi-pictorial semi-block diagram of an audible-information-providing system constructed and operative in accordance with a preferred embodiment of the present invention.

In this preferred embodiment, the motivational content providing service is known as a personally-customized-information providing service, or as an audible information push service 3800, with audible information provided by an audible information push server. The audible information provided by the personally-customized-information providing service 3800 includes any types of information that has been at least partially specified by the user.

This preferred embodiment differs from Internet push technology by pushing audible rather than graphical textual information to a user via a "fanciful object" 3820, which may be separate from and typically distanced from the computer 3810. The audible information may be derived from sites having textual content by conventional text-to-speech conversion techniques which are preferably applied to only a portion of the screen display of the site. For example, the largest frame on each screen display may be derived from the HTML information provided by the website and the text-to-speech conversion may be applied only to text disposed interiorly of the largest frame.

Preferably, as shown in FIG. 114, the system of the present invention comprises an information providing object including a fanciful body 3820, a personally-customized-information provider 3800 located at least partially within the fanciful body and including a computer network communicator operative to provide communication between a user and a computer network 1115 and an annunciator 1150 providing oral personally customized information, including at least an audible output, to the user, via the computer network communicator, wherein the computer network communicator is operative to allow the user to at least partially determine at least one of the content, timing, type and style of the personally customized information.

The information providing object 3820 may be connected to the network 1115 via a computer 3810 as shown in FIG. 114, or be directly connected to the network 1115 by wire as shown in FIG. 59, or wirelessly as shown in FIG. 65. The object 3820, when connected through the computer 3810, may be connected via the computer's audio port, MIDI port, serial port or parallel port. When the object 3820 is connected via a digital port, such as the MIDI port, serial port or parallel port, the analog-to-digital, and digital-to-analog conversions can be made either inside the object 3820 with digital transmission to the object, or adjacent to the computer 3810 with analog transmission to the object 3820.

The "content" of information refers to a specific reference to a source of information, the reference being defined by the user, such as a specific page of a specific website, which, when it is updated, is to be provided to the user.

The "timing" of information refers to the time at which information is to be sent.

The "type" of information refers to a categorization of information without indicating a reference to a specific source of information. For example, one "type" of information is: Information regarding the Chicago Bulls.

The "style" of information refers to the style of presentation of the information, such as the characteristics of the voice presenting the information (male/female, loud/soft, mimicking a particular celebrity, etc.).

Preferably, in the "push" embodiment, the system accepts feedback from a user e.g. by presenting all hypertext links associated with information being presented to the user in accordance with a "push" request made by her or him, and prompting the user to select one of the hypertext links. The system is also typically capable of receiving additional user feedback such as "stop", "back", "leave message" and "home".

Information may be provided either by searching, i.e. accessing all information relating to a specified cue, or a subset thereof, or by pushing, i.e. selecting websites or other sources of information relevant to a specified cue and providing an information update to a user each time one of the selected websites is updated.

It is appreciated that in this personally-customized-information providing embodiment of the present invention, the user of the system is not necessarily a child and that the toy/marketing system 3820 may not necessarily comprise a toy.

The responsibilities of a user also include specifying the type of information required by the user. The information type can be as specific as desired, e.g. requesting information about sport, requesting information about football, requesting information about a specific team, requesting information about a specific player, requesting information about the goals scored by a specific player.

The personally-customized-information providing server 3800 collects and collates, from the Internet 1115, or from an intranet, the information which is most closely related to that requested by the user. The personally-customized-information providing server converts this information into an audible format, which is transmitted, via a computer network 1115, and via the user's computer 3810, to the fanciful object 3820, and is broadcast to the user as illustrated in the FIGS. 68 and 70.

FIG. 115 is a simplified block diagram of sites and computing devices of a motivational information providing system constructed and operative in accordance with a preferred embodiment of the present invention. FIG. 115 includes three subsystems providing different information functions. The ADAM (advertising distribution and management) subsystem 3890 provides advertisement information. The NANI (natural access to network information) 3870 subsystem provides natural access to network information. The IRENA (Internet REtail Natural Access) 3850 is operative to provide e-commerce (electronic commerce) functions. The motivational information providing system also includes a "Content provider headquarters" site 3860, an "At home" site 3880, and an Advertiser/retailer headquarters" site 3900.

The IRENA subsystem of FIG. 115 is preferably an e-commerce company that provides a shopping experience based on a combination of personalized e-commerce and quality content. This combination is characterized in that it is delivered via a friendly toy using natural language, requiring no computer literacy. This preferably allows Internet users to more easily conduct e-commerce and become consumers. Receiving information on relevant products and purchasing is preferably easier using IRENA than using other channels in the real or virtual worlds. Users typically make purchases through IRENA, using an IRENA account, thus avoiding the need to get involved with any other aspects of e-commerce.

IRENA typically creates a virtual database of selected products from many vendors and retailers. Relevant product information is gathered from vendors and other relevant content sources.

Behaviors are attached to each product, the behavior forming a script presented to the user by the toy in order to convince him/her to buy the product. The behavior typically consists of information about the product, a comparison to other products, and advertising elements etc. The toy is preferably able to deliver the behavior, either alone, or in combination with the desktop.

Scheduling tips are typically attached to the behavior. Such tips typically determine when a user receive the behavior, during which other behaviors the specified behavior will be played etc.

The behavior is preferably interactive such that the user interacts with the behavior presented by the living toy.

Users are preferably able to issue a purchase order for a product, either orally, or through the web. The payment is typically taken from a preset IRENA account.

FIG. 116 is a diagram of functions preferably performed at the at-home site 3880 of FIG. 115.

FIG. 117 is a preferred data flow diagram for the system of FIG. 115.

FIG. 118 is a diagram of preferred use cases for the commercial manager 3970 of FIG. 117. The commercial manager 3970 typically markets IRENA's services to vendors and users. The commercial manager preferably also handles all financial and business aspects within IRENA, with external players and end-users.

FIG. 119 is a diagram of preferred use cases for the content provider/content manager (product manager) 3950 of FIG. 117. The product manager 3950 typically submits new vendors, the vendor being any firm interested in selling products through the IRENA framework, submits products with relevant product information and scheduling tips. The product manager 3950 also preferably manages a space on the server for download of new products, sets preferences for profiling reports and analyzes the reports when received, and processes orders received through IRENA.

FIG. 120 is a diagram of preferred use cases for the NANI personalization manager 3990 of FIG. 117. The personalization manager typically manages behavior space, e.g., attaches scheduling tips, and links behaviors to profiles etc. The personalization manager 3990 preferably also issues profiling reports to vendors.

FIG. 121 is a diagram of preferred use cases for the NANI creative manager 2960 of FIG. 117. The creative manager 3960 typically defined IRENA's product categories, manages a product web catalog, collects relevant product information from other sources, and creates behaviors for products.

FIG. 122 is a diagram of preferred use cases for the end user 4010 of FIG. 117. The end user 4010 is any person that is using a living toy that was installed while the relevant sub-systems were installed on the users desktop. A parent end-user typically interacts with a behavior, buys products, sets limits for child-users' exposure and expenses, and personalizes the experience. A child end-user typically interacts with a behavior, personalizes the experience, and buys products.

FIG. 123 is a table of use cases of a motivational message providing system or service constructed and operative in accordance with a preferred embodiment of the present invention.

FIG. 124 is a table of possible implementations of the use cases of FIG. 123.

FIGS. 125 and 126 are tables of additional use cases of a motivational message providing system or service constructed and operative in accordance with a preferred embodiment of the present invention.

FIG. 127 is a table of possible implementations of the use cases of FIG. 126.

FIG. 128 is a table of additional use cases of a motivational message providing system or service constructed and operative in accordance with a preferred embodiment of the present invention.

FIG. 129 is a table of possible implementations of the use cases of FIG. 128.

FIG. 130 is a table of additional use cases of a motivational message providing system or service constructed and operative in accordance with a preferred embodiment of the present invention.

FIG. 131 is a table of possible implementations of the use cases of FIG. 130.

FIG. 132 is a table of additional use cases of a motivational message providing system or service constructed and operative in accordance with a preferred embodiment of the present invention.

FIG. 133 is a table of possible implementations of the use cases of FIG. 132.

FIGS. 134 and 135 are tables of additional use cases of a motivational message providing system or service constructed and operative in accordance with a preferred embodiment of the present invention.

FIG. 136 is a table of possible implementations of the use cases of FIG. 135.

FIG. 137 is a table of additional use cases of a motivational message providing system or service constructed and operative in accordance with a preferred embodiment of the present invention.

FIG. 138 is a table of possible implementations of the use cases of FIG. 137.

FIG. 139 is a table of additional use cases of a motivational message providing system or service constructed and operative in accordance with a preferred embodiment of the present invention.

FIG. 140 is a table of possible implementations of the use cases of FIG. 139.

FIG. 141 is a table of additional use cases of a motivational message providing system or service constructed and operative in accordance with a preferred embodiment of the present invention.

FIG. 142 is a table of possible implementations of the use cases of FIG. 141.

FIG. 143 is a table of additional use cases of a motivational message providing system or service constructed and operative in accordance with a preferred embodiment of the present invention.

FIG. 144 is a table of possible implementations of the use cases of FIG. 143.

FIG. 145 is a table of additional use cases of a motivational message providing system or service constructed and operative in accordance with a preferred embodiment of the present invention.

FIG. 146 is a table of possible implementations of the use cases of FIG. 145.

FIGS. 147 and 148 are tables of additional use cases of a motivational message providing system or service constructed and operative in accordance with a preferred embodiment of the present invention.

FIG. 149 is a table of possible implementations of the use cases of FIG. 148.

FIG. 150 is a table of additional use cases of a motivational message providing system or service constructed and operative in accordance with a preferred embodiment of the present invention.

FIG. 151 is a table of possible implementations of the use cases of FIG. 150.

FIG. 152 is a simplified illustration of a screen display of the computer 3810 of FIG. 114 which enables a user to register to the audible-push service and to provide the service with his/her personal selection of information that he or she would like to receive from the service.

The screen form enables the user to select information by subjects and sub-subjects such as sport, basketball, NBA, etc. and by sources such as CNN, UK, business. The user is preferably able to set the relative priorities of the selected items, so that stock news is presented first, local weather news second, etc. The user preferably also sets the rate at which items are presented.

The service typically presents the information to the user in several size levels. The screen form example in FIG. 152 allows three levels: the first level is presented first and, in this example, will contain the first 15 word of the original information item. The system then typically asks the user if he or she would like to hear the next level. If the user approves the service presents the user with the next level containing the next 30 words. The system preferably then asks the user if he or she would like to hear the next level, in this case the entire item. If the user approves, the service presents the user with the next level containing the entire item.

FIG. 153 is a simplified illustration of the typical textual content of a web-page, in this case a page of the Anchordesk by Jesse Berst hosted by Zdnet at http://www.zdnet.com/anchordesk/story/story_3050.html.

The graphical content of the page is omitted as well as some of the textual content that does not fit into the formal page size. The middle part 4200 of FIG. 153 contains most of the text in the web page and is selected for delivery to those subscribers that have selected to receive Anchordesk articles as they are presented over the Internet.

The service preferably retrieves the text, converts the text to several languages as requested by various subscribers using conventional machine translation engines. The service typically converts the text of each language to speech using conventional text to speech engines, and distributes the items to the appropriate subscribers.

For each subscriber, the item is typically divided into several levels according to the subscriber's requirements. In the example of user customization shown in FIG. 152, the first 15 words are presented first: "Berst Alert TUESDAY, FEB. 02, 1999 Y2K Countdown: Will You Be in the Dark on". Then if the user decides to hear the next level the next 30 words are played: "Jan. 1, 2000? Jesse Berst, Editorial Director ZDNet AnchorDesk Residents of a rural island community here in Washington State are ordering 55-gallon barrels to collect rainwater and planning bulk purchases of". If the user selects to continue the rest of the item is played.

FIG. 154 is a script illustrating a possible manner of distribution of the web-page of FIG. 153.

FIG. 155 is a bubble diagram of a game for an individual, "tree-quiz", in which a prize or other token is dispensed to the individual player by one of the nodes in the amusement park.

FIGS. 156A–B, taken together, form a diagram of one alternative "Game State Record" data structure of FIGS. 43A–43C of copending U.S. patent application Ser. No. 09/062,500, storing information regarding one of the game states, "ask question", within the individual game of FIG. 155.

FIGS. 156A and 156C, taken together, form a diagram of another alternative "Game State Record" data structure of FIGS. 43A–43C of copending U.S. patent application Ser. No. 09/062,500, storing information regarding one of the game states, "ask question", within the individual game of FIG. 155. In FIG. 156C, each correct answer increments a counter filed in the Visitor Profile Record and each incorrect answer decrements the counter. This counter is available for several different games and enables the visitor to gain a point that can later be converted in a gift or coupon.

FIG. 157 is a diagram of two "Game State Record" data structures of FIGS. 43A–43C of copending U.S. patent application Ser. No. 09/062,500 storing information regarding two additional game states, "record answer" and "give present", within the individual game of FIG. 155.

FIG. 158 is a diagram of two "Visitor Record" data structures of FIGS. 43A–43C of copending U.S. patent application Ser. No. 09/062,500 storing information regarding two visitors playing the individual game of FIGS. 155–157.

FIG. 159 is a diagram of a "Node Record" data structure of FIGS. 43A–43C of copending U.S. patent application Ser. No. 09/062,500 storing information regarding a node, "tree", which is operating within the individual game of FIGS. 155–158.

Figure 160A:
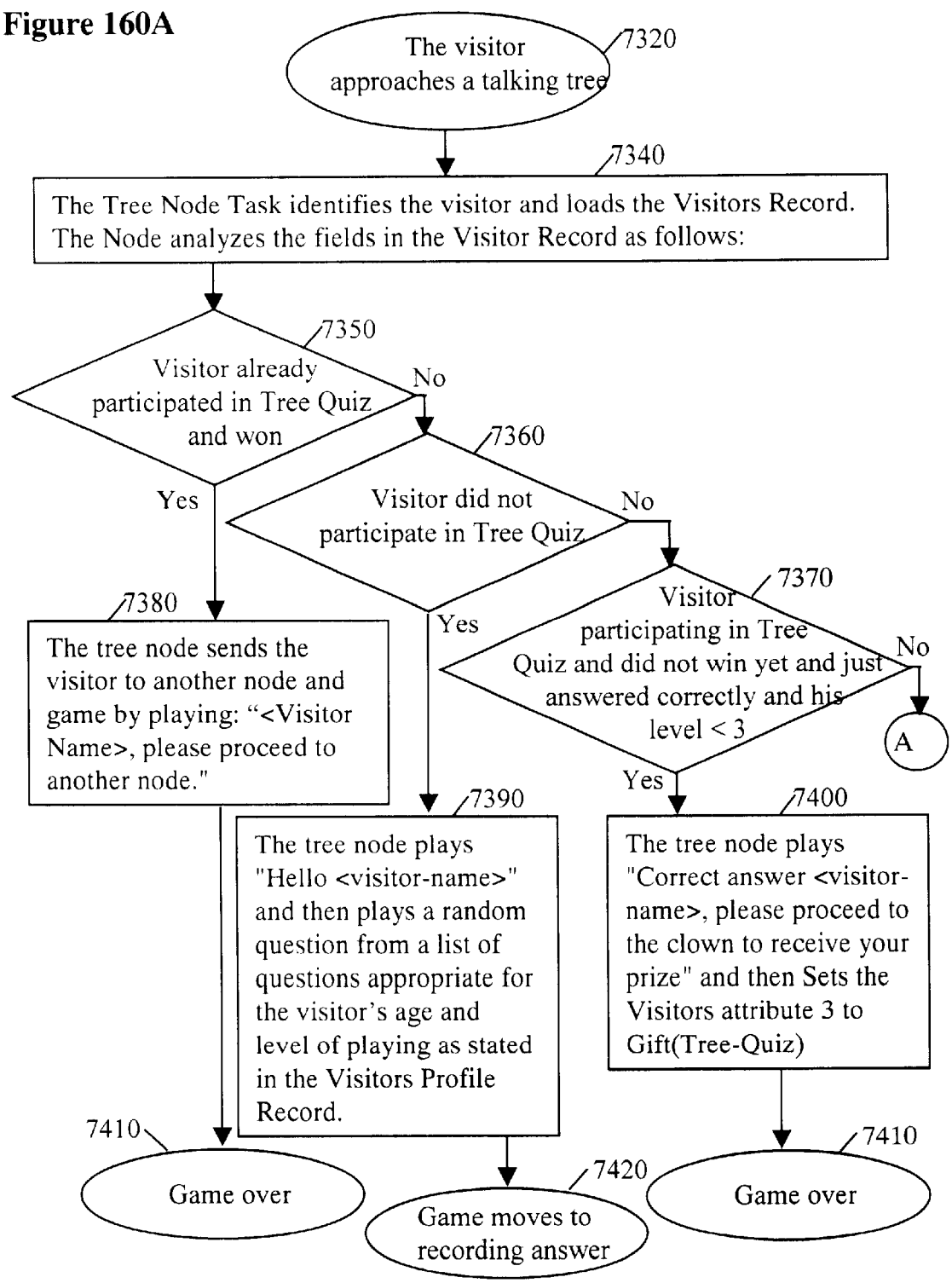
Figure 160B:
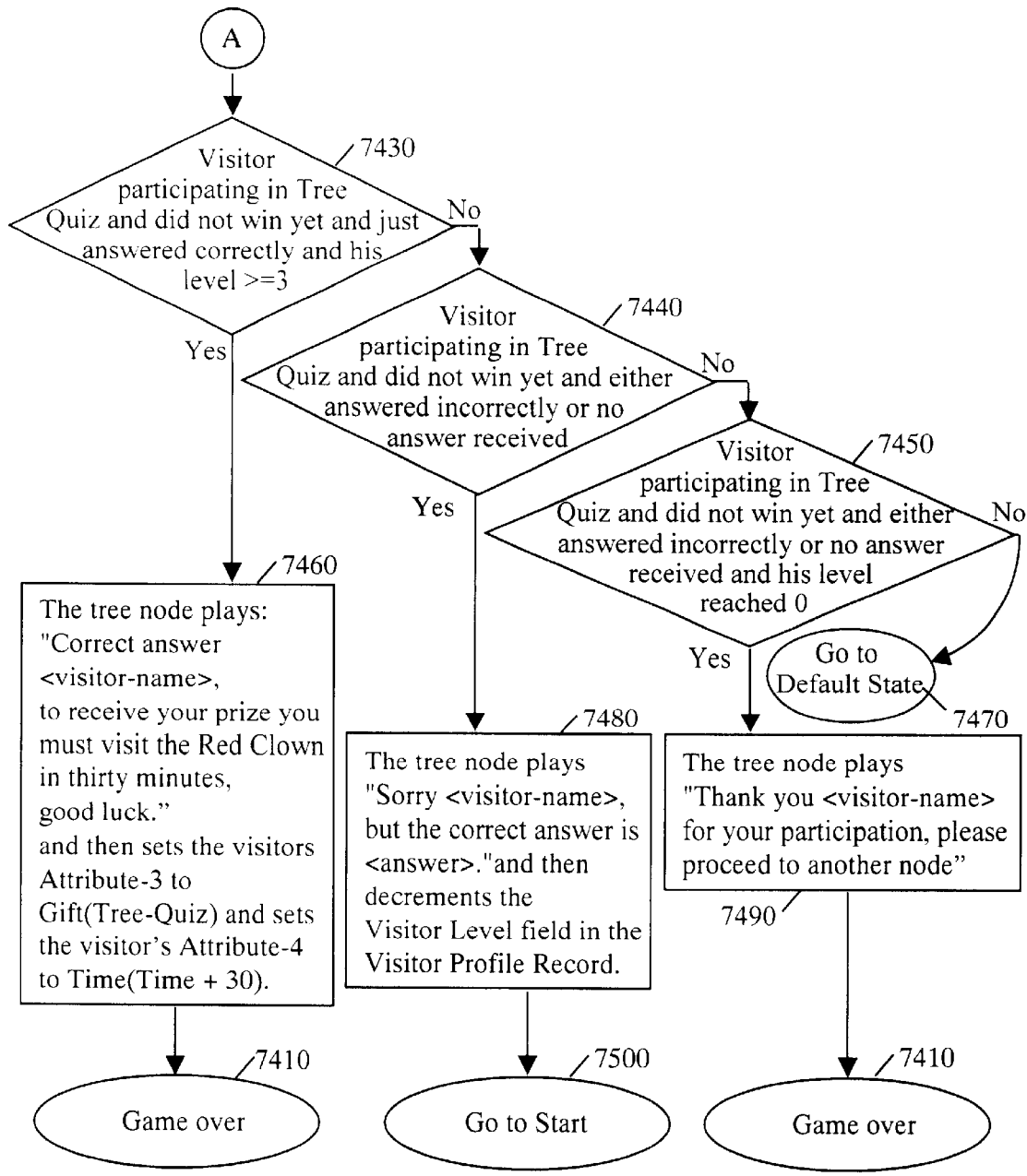

FIGS. 160A–160B, taken together, form a simplified flowchart illustration of a preferred chain of events including the events which typically occur in playing the "tree-quiz" game of FIGS. 155–159.

It is noted that throughout this specification the term "audible" is used as meaning "capable of being perceived and understood by the human ear".

It is appreciated that the software components of the present invention may, if desired, be implemented in ROM (read-only memory) form. The software components may, generally, be implemented in hardware, if desired, using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

What is claimed is:

1. A method for using a toy for effecting sales over a public network, the method comprising:
   providing a toy having interactive speaking and listening functionality;
   connecting said toy via a public network to at least one server having transactional functionality; and
   effecting sales by employing said transactional functionality via the interactive speaking and listening functionality of said toy.

2. A method according to claim 1 wherein said step of effecting sales comprises employing said interactive speaking and listening functionality of said toy as an interface between a customer and the transactional functionality.

3. A method according to claim 1 wherein said step of effecting resulting sales comprises using the speaking and listening functionality to obtain payment authorization from the user.

4. A method according to claim 1 and also comprising recording sales effected through said toy and crediting a commercial entity associated with the toy.

5. A method according to claim 1 wherein said step of providing comprises providing a toy having a persona and wherein said step of effecting sales comprises providing a script according to which said interactive speaking and listening functionality operates.

6. A method according to claim 5 wherein the script matches the persona of the toy.

7. A method according to claim 1 wherein said step of effecting sales comprises actuating said toy to execute a reinforcing response if a sale is effected and to execute a negative response if a sale is not effected.

8. A method according to claim 1 and also comprising obtaining information regarding at least one users interacting with the toy and wherein said step of effecting sales is effected by differential operation of the interactive speaking and listening functionality for different users, depending on said information regarding said different users.

9. A method according to claim 1 and also comprising:

accepting a filtering request from a user; and modifying the scope of the sales effecting step responsive to said filtering request.

10. A method for using a toy for promoting sales over a public network, the method comprising:

providing a toy having interactive speaking and listening functionality;

connecting said toy via a public network to at least one server providing at least one sales promotion scripts;

actuating said interactive speaking and listening functionality of said toy, using at least one sales promotion scripts; and recording at least one parameter characterizing a user's response to said at least one sales promotion scripts.

11. A method according to claim 10 and also comprising automatically billing at least one entities associated respectively with the at least one sales promotion scripts, depending on the user's response to said at least one sales promotion scripts.

12. A method according to claim 10 and also comprising:

accepting a filtering request from a user; and modifying the scope of the actuating step responsive to said filtering request.

13. A method according to claim 10 wherein said step of actuating comprises providing a user with an entitlement to a discount, at a sales outlet.

14. A method according to claim 13 wherein said step of entitlement providing comprises the step of printing out a coupon.

15. A method for using a toy for enhancing television rating, the method comprising:

providing a toy having interactive speaking and listening functionality;

connecting said toy via a public network to at least one server providing at least one scripts promoting viewing of at least one program of an individual television channel;

actuating said interactive speaking and listening functionality of said toy, using at least one viewing promoting scripts.

16. A method according to claim 15 and also comprising recording at least one parameter characterizing a user's response to said at least one sales promotion scripts.

17. A method according to claim 16 wherein said step of recording comprises recognizing a broadcast of the program.

18. A method according to claim 16 wherein said step of recording comprises directly monitoring the user's response.

19. A method according to claim 15 and also comprising automatically billing at least one entities associated respectively with the at least one viewing promoting scripts, depending on the user's response to said at least one viewing promoting scripts.

* * * * *